US011782167B2

(12) United States Patent
Dundorf et al.

(10) Patent No.: US 11,782,167 B2
(45) Date of Patent: Oct. 10, 2023

(54) METHODS OF AND SYSTEMS, NETWORKS AND DEVICES FOR REMOTELY DETECTING AND MONITORING THE DISPLACEMENT, DEFLECTION AND/OR DISTORTION OF STATIONARY AND MOBILE SYSTEMS USING GNSS-BASED TECHNOLOGIES

(71) Applicant: 2KR Systems, LLC, Barrington, NH (US)

(72) Inventors: Christopher C. Dundorf, Barrington, NH (US); Patrick Melvin, Lee, NH (US)

(73) Assignee: 2KR SYSTEMS, LLC, Barrington, NH (US)

( * ) Notice: Subject to any disclaimer, the term of this patent is extended or adjusted under 35 U.S.C. 154(b) by 166 days.

(21) Appl. No.: 17/087,629

(22) Filed: Nov. 3, 2020

(65) Prior Publication Data

US 2022/0137235 A1 May 5, 2022

(51) Int. Cl.
*G01S 19/24* (2010.01)
*G01S 19/43* (2010.01)
(Continued)

(52) U.S. Cl.
CPC ......... *G01S 19/243* (2013.01); *G01M 5/0041* (2013.01); *G01S 19/02* (2013.01);
(Continued)

(58) Field of Classification Search
CPC .......... G01S 19/14; G01S 19/43; G01S 19/51; G01M 5/0008; G01M 5/0016; G01M 5/0041
See application file for complete search history.

(56) References Cited

U.S. PATENT DOCUMENTS

| | | | |
|---|---|---|---|
| 2,267,257 | A | 12/1941 | Leopold |
| 4,047,042 | A | 9/1977 | Wada |

(Continued)

FOREIGN PATENT DOCUMENTS

| | | |
|---|---|---|
| CA | 2573711 | 7/2008 |
| CA | 3022235 | 4/2019 |

(Continued)

OTHER PUBLICATIONS

C. Inal et al., The Comparison of KOSAGA and CORS-TR in Real Time Kinematic Positioning, International Refereed Journal of Engineering And Sciences, 17 pages, 2015 (Year: 2015).*

(Continued)

*Primary Examiner* — Bernarr E Gregory
*Assistant Examiner* — Fred H Mull
(74) *Attorney, Agent, or Firm* — Thomas J. Perkowski, ESQ., PC

(57) ABSTRACT

A system network and methods supported by a constellation of GNSS satellites orbiting around the Earth, and deployed for precise remote monitoring of the spatial displacement, distortion and/or deformation of stationary and/or mobile systems, including buildings, bridges, and roadways. The methods involve (i) embodying multiple GNSS rovers within the boundary of the stationary and/or mobile system being monitored by the GNSS system network, (ii) receiving GNSS signals transmitted from GNSS satellites orbiting the Earth, and (iii) determining the geo-location and time-stamp of each GNSS rover while the stationary and/or mobile system is being monitored for spatial displacement, distortion and/or deformation, using GNSS-based rover data processing methods practiced aboard the system, or remotely within the application and database servers of the data center of the GNSS system network. The GNSS rovers also include (Continued)

on-board instrumentation for sensing and measuring the depth of water ponding about the GNSS rovers.

20 Claims, 255 Drawing Sheets

(51) Int. Cl.

| | |
|---|---|
| ***G01S 19/33*** | (2010.01) |
| ***G01S 19/02*** | (2010.01) |
| ***G01S 19/41*** | (2010.01) |
| ***G01M 5/00*** | (2006.01) |
| ***G01S 19/14*** | (2010.01) |
| ***G01S 19/51*** | (2010.01) |

(52) U.S. Cl.

CPC .............. *G01S 19/14* (2013.01); *G01S 19/33* (2013.01); *G01S 19/41* (2013.01); *G01S 19/43* (2013.01); *G01S 19/51* (2013.01)

(56) References Cited

U.S. PATENT DOCUMENTS

| | | | | |
|---|---|---|---|---|
| 4,843,372 | A | 6/1989 | Savino | |
| 4,927,232 | A | 5/1990 | Griffiths | |
| 4,936,060 | A | 6/1990 | Gelinas | |
| 5,594,250 | A | 1/1997 | Condreva | |
| 5,850,185 | A | 12/1998 | Canty | |
| 6,727,841 | B1 | 4/2004 | Mitra | |
| 6,826,664 | B2 | 11/2004 | Hocker, III | |
| 6,832,522 | B2 | 12/2004 | Schaefer | |
| 6,957,166 | B1 | 10/2005 | Howie | |
| 6,988,661 | B2 | 1/2006 | Tsikos | |
| 7,139,471 | B1 | 11/2006 | Durham | |
| 7,516,094 | B2 | 4/2009 | Perkowski | |
| 7,646,309 | B2 | 1/2010 | Visser | |
| 8,040,273 | B2 | 10/2011 | Tomich | |
| 8,552,396 | B2 | 10/2013 | Frolik | |
| 8,594,936 | B1 | 11/2013 | Koval | |
| 8,982,207 | B2 | 3/2015 | Jang | |
| 9,057,804 | B2 | 6/2015 | Christian | |
| 9,082,015 | B2 | 7/2015 | Christopulos | |
| 9,139,310 | B1 | 9/2015 | Wang | |
| 9,262,788 | B1 | 2/2016 | Freeman | |
| 9,262,789 | B1 | 2/2016 | Tofte | |
| 9,292,630 | B1 | 3/2016 | Freeman | |
| 9,346,560 | B2 | 5/2016 | Wang | |
| 9,420,042 | B2 | 8/2016 | Raymond | |
| 9,784,887 | B1 | 10/2017 | Ulmer | |
| 10,579,028 | B1 | 3/2020 | Jacob | |
| 10,889,989 | B1 | 1/2021 | Olen | |
| 11,644,805 | B1 | 5/2023 | Jacob | |
| 2002/0194922 | A1 | 12/2002 | Schaefer | |
| 2006/0249622 | A1 | 11/2006 | Steele | |
| 2007/0135989 | A1 | 6/2007 | Hengst | |
| 2007/0164874 | A1 | 7/2007 | Visser | |
| 2008/0087837 | A1 | 4/2008 | Desilets | |
| 2008/0278311 | A1 | 11/2008 | Grange | |
| 2009/0120179 | A1 | 5/2009 | Nylander | |
| 2010/0076624 | A1 * | 3/2010 | Hinnant, Jr. | G01M 5/0041 701/4 |
| 2011/0073771 | A1 | 3/2011 | Frolik | |
| 2012/0044106 | A1 | 2/2012 | De Lorenzo | |
| 2013/0173062 | A1 | 7/2013 | Koenig-Richardson | |
| 2014/0249693 | A1 | 9/2014 | Stark | |
| 2014/0316614 | A1 | 10/2014 | Newman | |
| 2014/0366648 | A1 | 12/2014 | Christian | |
| 2014/0379179 | A1 | 12/2014 | Goossen | |
| 2015/0120094 | A1 | 4/2015 | Kimchi | |
| 2015/0219767 | A1 | 8/2015 | Humphreys | |
| 2015/0236779 | A1 | 8/2015 | Jalali | |
| 2015/0336667 | A1 | 11/2015 | Srivastava | |
| 2016/0001878 | A1 | 1/2016 | Lee | |
| 2016/0001884 | A1 | 1/2016 | Fleck | |
| 2016/0004795 | A1 | 1/2016 | Novak | |
| 2016/0033966 | A1 | 2/2016 | Farris | |
| 2016/0105233 | A1 | 4/2016 | Jalali | |
| 2016/0115323 | A1 | 4/2016 | Belcher | |
| 2016/0144358 | A1 | 5/2016 | Patel | |
| 2016/0144978 | A1 | 5/2016 | Cheron | |
| 2016/0159496 | A1 | 6/2016 | O'Toole | |
| 2016/0179096 | A1 | 6/2016 | Bradlow | |
| 2016/0327653 | A1 | 11/2016 | Humphreys | |
| 2017/0180460 | A1 | 6/2017 | High | |
| 2018/0092295 | A1 | 4/2018 | Sugumaran | |
| 2019/0107646 | A1 | 4/2019 | Trustman | |
| 2019/0127985 | A1 * | 5/2019 | Dundorf | G05D 1/0291 |
| 2019/0383967 | A1 | 12/2019 | Polebitski | |
| 2022/0137235 | A1 | 5/2022 | Dundorf | |

FOREIGN PATENT DOCUMENTS

| | | | | | |
|---|---|---|---|---|---|
| CN | 103093586 | | | 3/2016 | |
| CN | 108398074 | A | * | 8/2018 | G01B 5/18 |
| CN | 111736170 | | | 10/2020 | |
| EP | 1806461 | A1 | | 7/2007 | |
| EP | 2813870 | A1 | | 12/2014 | |
| EP | 2818957 | A1 | | 12/2014 | |
| FR | 3038069 | A1 | * | 12/2016 | G01S 19/14 |
| GB | 191420267 | A | | 9/1915 | |
| GB | 516444 | | | 1/1940 | |
| GB | 946087 | | | 1/1964 | |
| GB | 1112553 | A | | 5/1968 | |
| JP | 2015102529 | A | * | 6/2015 | G01S 19/14 |
| JP | 2018179734 | A | * | 11/2018 | |
| JP | 6602176 | B2 | * | 11/2019 | |
| WO | 9933272 | | | 7/1999 | |
| WO | 0047966 | | | 8/2000 | |
| WO | 03068537 | | | 8/2003 | |
| WO | 2009129496 | | | 10/2009 | |
| WO | 2010059125 | A1 | | 5/2010 | |
| WO | 2013186438 | A1 | | 12/2013 | |
| WO | 2014151819 | | | 9/2014 | |
| WO | 2015102706 | A2 | | 7/2015 | |
| WO | 2015123623 | A1 | | 8/2015 | |
| WO | 2016057098 | A2 | | 4/2016 | |
| WO | 2016083897 | A2 | | 6/2016 | |

OTHER PUBLICATIONS

J. Yu et al, Global Navigation Satellite System-based positioning technology for structural health monitoring: a review, Struct Control Health Monit. 27 pages, Oct. 2019 (Year: 2019).*

Y.J. Morton et al., Position, Navigation, and Timing Technologies in the 21st Century: Integrated Satellite Navigation, Sensor Systems, and Civil Applications, vol. 2, Wiley-IEEE Press, p. 1713-1733, Jan. 2020 (Year: 2020).*

"Permanent, autonomous monitoring of landslide movements with GPS", L. Manetti, M. Frapolli, and A. Knecht, by GEODEV Earth Technologies SA, Manno, Switzerland, published in the book titled Landslides, 1st Edition, Published by Routledge, 2002 (6Sheets).

"GPS Monitoring of Slow-Moving Landslides", Richard Giraud and Greg McDonald, Utah Geological Surey, Survey Notes, vol. 43, No. 1, Jan. 2011 (2 Pages), also published as text at https://geology.utah.gov/map-pub/survey-notes/gps-monitoring-of-slow-moving-landslides/#:~:text . . . .

"Landslide Mapping on the Wasatch Plateau: Comparision of Methods Including High-Resolution LIDAR" by Greg McDoland, Richard Giraud (Utah Geological Survey) and Karl Boyer (Manti-La Sal National Forest), Utah Geological Survey, Digital Mapping Techniques 2015, presented at DNT' 15—May 17-20, 2015, Utah Geological Survey, Salt Lake City, Utah (34 Sheets).

Data Sheet for ADS RAINALERT® III Rainfall Monitoring System, Doc # RAIII—Jul. 11, 2022, by ADS LLC, Jul. 2022 (2 Sheets).

Data Sheet for ONSET® RXW-RGF-XXX Sensor—HOBONet Rainfall Sensor, by Onset Computer Corporation, Bourne, MA, 2018 (3 Sheets).

Specification Sheet for ST VL53L1X Time of Flight Sensor, STMicroelectronics NV, DocID 0311281, Nov. 2018 (35 Sheets).

(56) References Cited

OTHER PUBLICATIONS

Specification Sheet for DIGI XBEE-PRO 900HP RF Module, DIGI International Inc., 2018, Document #91002310 B5/518, 2018 (3 Sheets).
"Vertical Deformation Monitoring of the Suspension Bridge Tower Using GNSS: A Case Study of the Forth Road Bridge in the UK", Qusen Chen , Weiping Jiang , Xiaolin Meng , Peng Jiang, Kaihua Wang, Yilin Xie, and Jun Ye, Remote Sensing, 2018, vol. 10, No. 365, MDPI, (19 Sheets).
"Recent Advances of Structures Monitoring and Evaluation Using GPS-Time Series Monitoring Systems: A Review", Mosbeh R. Kaloop, Emad Elbeltagi , Jong Wan Hu, and Ahmed Elrefai, ISPRS, 2017, vol. 6, No. 682, MDPI, Nov. 2017 (17 Sheets).
Product Specification Sheet for ST LPS33HW MEMS Pressure Sensor, STMicroelectronics NV., Doc. # 030522 Rev 1, Jul. 2017, (50 Sheets).
"Rooftop Unit Embedded Diagnostics: Automated Fault Detection and Diagnostics (AFDD) Development, Field Testing and Validation", S. Katipamula, W. Kim, R. Lutes, RM Underhill, Prepared for US Department of Energy (DOE), PNNL-2379, Sep. 2015 (126 Sheets).
"Risk Control Bulletin: The Snow Loading and Roof Collapse Preparation Guide", CNA Financial Corporation, RC156M RC Roof FL 120915, 2015 (3 Sheets).
"Risk Control Bulletin Safe Work Practices on Snow-Covered Roots," CNA Financial Corporation, 2010 (2 Sheets).
"Advances in GNSS-RTK for Structural Deformation Monitoring in Regions of High Ionospheric Activity", Chris Rizos, Joël van Cranenbroeck, and Vincent Lui, FIG Congress 2010, Facing The Challenges—Building the Capacity, Apr. 2010 (13 Sheets).
"Automatic Roof Plane Detection and Analysis in Airborne Lidar Point Clouds for Solar Potential Assessment", Andreas Jochem, Bernhard Hofle , Martin Rutzinger and Norbert Pfeifer, Sensors, 2009, vol. 9, Jul. 2019, pp. 5241-5262 (22 Sheets).
Installation Instructions for Honeywell 24PC Series Pressure Sensors 50047629 (Issue 1), Honeywell Sensing and Control, Honeywell International, Inc. 2009 (4 Sheets).
"Methods for Detection of Inapropriate Discharges to Storm Drainage Systems-Background Literature and Summary of Findings", by Robert Pitt, Department of Civil and Environmental Engineering, the University of Alabama, Contract EPA No. X-82907801-0, Nov. 2001, (431 Sheets).
ABS Guide for Hull Condition Monitoring Systems, American Bureau of Shipping, Jul. 2020 (31 Sheets).
"Geomembrane Linear Failure: Modelling of its Influence on Containment Transfer", by V. Nosko and N. Touze-Foltz, EuroGeo 2—2000, Bologna Italy—vol. 2 2000 (4 Sheets).
International Preliminary Report on Patentability (IPRP—Chapter II) dated Apr. 28, 2023 issued in PCT Application No. PCT/US2021/057933 (8 Sheets).
Bayern Innovativ, "Snow Patrol", Jan. 2017, (pp. 1-14).
Hydrological Systems, "Snow Load Roof Monitor", Nov. 2013, (pp. 1-2).
Intellicom Innovation, "NetBiter Case Study: Snow Load Scales", Jan. 2017, (pp. 1-2).
Roof Guards Gmbh, "Roof Guards", Jan. 2015, (pp. 1-3).
Roof Guards Gmbh, "Roof Guard and NetBiter", Nov. 2013, (pp. 1-3).
Safe Roof Systems Inc., "Roof Deflection Monitoring", Jan. 2017, (pp. 1-7).
Ruukki, "Ruukki's Load-Bearing Roof Solution", Jan. 2010, (pp. 1-11).
Ruukki, "Smart Roof Sensor", Nov. 2011, (pp. 1).
Ruuki, "Roof Snow Load System", Nov. 2013, (pp. 1).
Ruukki, "Ruukki's Design Toolbox", Jan. 2014, (pp. 1-4).
Ruukki, "Smart Roof", Jan. 2014, (pp. 1-3).
CNA, "Risk Control Bulletin: Safe Work Practices on Snow Covered Roofs", Jan. 2010, (pp. 1-2).
Ruukki, "Ruukki Smart Roof Now Ready", Jan. 2014, (pp. 1-3).
2KR Systems, "Snow Sentry Brochure", Jan. 2017, (pp. 1-9).
Alpine Hydromet, "FSP: Fluidless Snow Pillow", Jan. 2017, (pp. 1-2).
Robotex Inc., "Avatar II Brochure", Jun. 2012, (pp. 1-7).
Promicron Inc., "Snow Load Sensor", Jul. 2014, (pp. 1-3).
Campbell Scientific, "CS725 Instruction Manual", Jan. 2012, (pp. 1-48).
Campbell Scientific, "CS725 Snow Water Equivalent Sensor", Jan. 2017, (pp. 1-2).
Sommer Messtechnik, "Snow Scale SSG", Dec. 2014, (pp. 1-4).
Sommer Messtechnik, "Snow Scales SSG", Aug. 2016, (pp. 1-2).
Sommer Messtechnik, "Snow Scale Screenshots", Jan. 2017, (pp. 1-15).
Pro-Micron, "SnowCHECK: Early Warning System for Excessive Roof Loads", Jan. 2015, (pp. 1-3).
NH Business Review, "N.H. firm may have solution for roof snow loads", Mar. 2015, (pp. 1-7).
Pro-Micron, "SnowCheck: Snow Load Sensor", Sep. 2015, (pp. 1-4).
CNA, "Risk Control Bulletin: The Snow Loading and Roof Collapse Preparation Guide", Dec. 2015, (pp. 1-3).
Indiegogo, "Weather Flow: Smart Weather Stations", Dec. 2016, (pp. 1-31).
Lockton Inc., Lucas Pfannenstiel, "How Well Will Your Property Weather the Winter Weather?", Nov. 2017, (pp. 1-4).
Lockton Inc., Lucas Pfannenstiel, "Extending the Life of Your Company's Roof", Sep. 2018, (pp. 1-4).
Office Action dated Jun. 22, 2020 for U.S. Appl. No. 15/794,263 (pp. 1-15).
Lendzioch et al. "Combined Study of Snow Depth Determination and Winter Leaf Area Index Retrieval by Unmanned Aerial Vehicle Photogrammetry" 19th EGU General Assembly, EGU2017, proceedings from the conference held Apr. 23-28, 2017 in Vienna, Austria., p. 7016 (Year: 2017).
Office Action dated Feb. 28, 2020 for U.S. Appl. No. 15/794,283 (pp. 1-8).
Notice of Allowance dated Sep. 10, 2020 for U.S. Appl. No. 15/794,283 (pp. 1-5).
Notice of Allowance dated Mar. 3, 2021 for U.S. Appl. No. 15/794,263 (pp. 1-9).
Product Brochure for ZED-F9P Module—by U-Bloc For High Precision GNSS Module, Document #UBX-17005151, RO6, U-BLOX AG, 2020 (2 Sheets).
Data Sheet for ZED-F9P Module—by U-Bloc For High Precision GNSS Module, Document # UBX-17051259-R05, U-blox AG, 2020 (24 Sheets).
U-Bloc GNSS Product Overview, Document # UBX-14000426-R14, U-Blox AG, 2021 (4 Pages).
International Preliminary Report on Patentability (IPRP-Chapter II) dated Jan. 19, 2023 issued in PCT Application No. PCT/US2021/057964 (8 Sheets).
Applicant's Response to Written Opinion dated Nov. 21, 2022 filed in PCT Application No. PCT/US2021/67964 (9 Sheets).
International Search Report (ISR) and Written Opinion issued in PCT Application No. PCT/US2021/67964 dated Apr. 22, 2022 (68 Sheets).
International Search Report (ISR) and Written Opinion issued in PCT Application No. PCT/US2021/67933 dated Mar. 7, 2022 (56 Sheets).
Applicant's Response to Written Opinion dated Nov. 19, 2022 filed in PCT Application No. PCT/US2021/67933 (8 Sheets).
"Analytical Computation of the Spatial Resolution in GNSS-R and Experimental Validation at L1 and L5" by Adriano Camps, and Joan Francesc Munoz-Martin, Remote Sensing, 2020, vol. 12, No. 3910, MDPI, Nov. 2020 (15 Sheets).
"GPS Accuracy" by GPS.Gov, published at https://www.gps.gov/systems/gps/performance/accuracy/ , captured Jul. 3, 2020 (3 Sheets).
"GNSS/INS Integration with Integrity Monitoring for UAV No-Fly Zone Management" by Rui Sun, Wenyu Zhang, Jiazhu Zheng, and Washington Yotto Ochieng, Remote Sensing, 2020, vol. 12, No. 524, MDPI, Feb. 2020 (22 Sheets).
"GNSS Receiver Architecture for Remote Sensing Applications", Sara J. Hrbek, Phd Thesis, University of Colorado, Department of Aeospace Engineering Sciences, 2019, (164 Sheets).

(56) References Cited

OTHER PUBLICATIONS

"Deep Learning for Detecting Building Defects Using Convolutional Neural Networks", Husein Perez, Joseph H. Tah and Amir Mosavi, Sensors, 2019, vol. 19, 3556, MDPI, Aug. 2019, (22 Sheets).
"Commercial Roof Drains and Drainage Systems" Guide to Commerical Roof Drains, Siphonic Drains for Flat Roofs, IKO Commerical, published Apr. 15, 2019, at https://www.iko.com/comm/blog/commercial-roof-drains/ , captured Dec. 11, 2019 (17 Sheets).
"Heat Mapping Drones: An Autonomous Computer Vision-based Procedure for Building Envelope Inspection using Unmanned Aerial Systems (UAS ) " Tarek Rakha, Amanda Linberty, Alice Gorodetsky, Burak Kakillioglu, and Senem Velipasalar, Jan. 2, 2018, Technology|Architecture + Design, vol. 2, Issue 1 (41 Sheets).
"Heat Mapping Drones: An Autonomous Computer Vision-based Procedure for Building Envelope Inspection using Unmanned Aerial Systems (UAS )" Tarek Rakha, Amanda Linberty, Alice Gorodetsky, Burak Kakillioglu, and Senem Velipasalar, Sep. 23-26, 2018, International Building Physics Conference (IBPC) 2018, Proceedings, Syracuse, NY, USA, (7 Sheets).

* cited by examiner

Figure 8A:
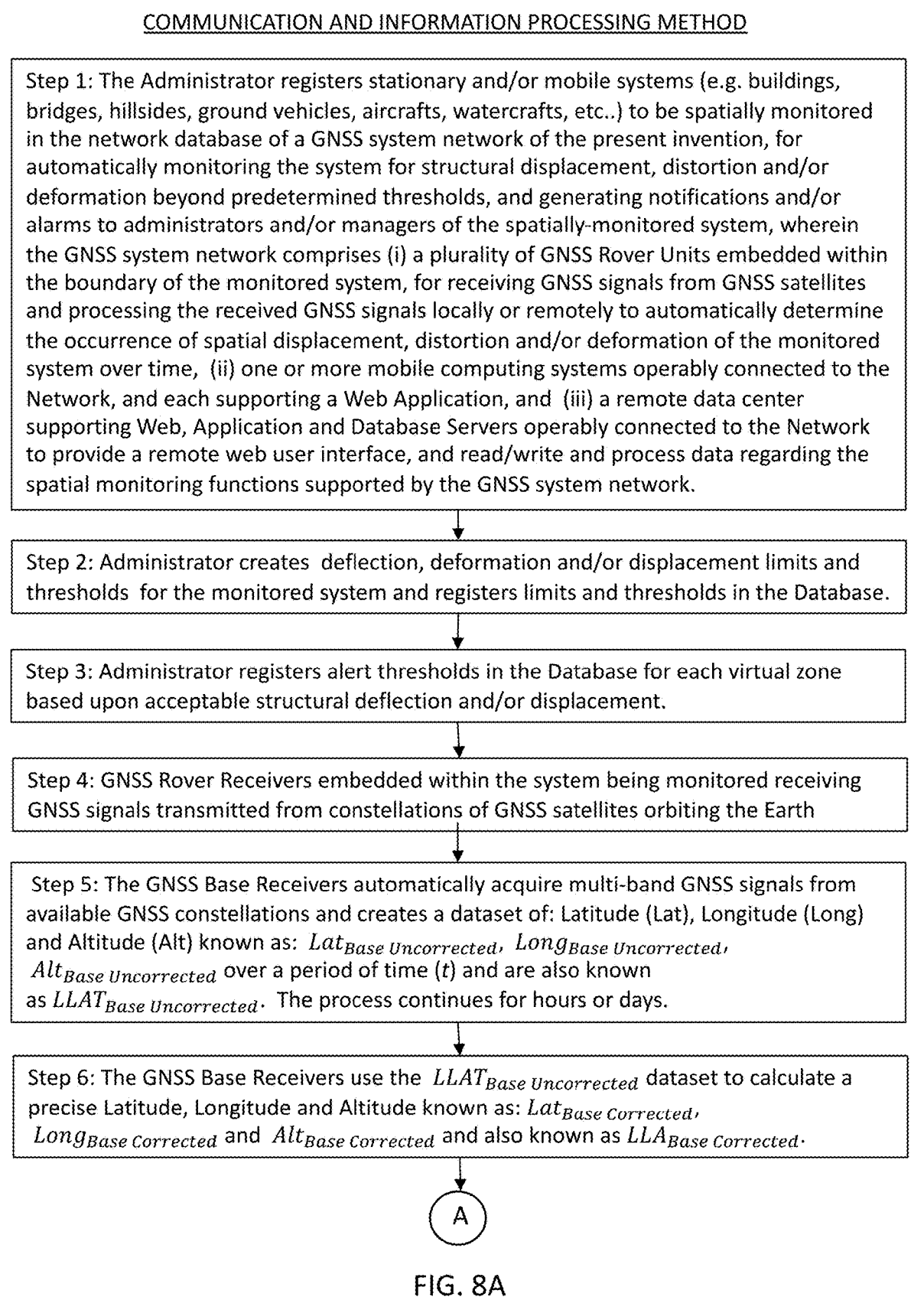

COMMUNICATION AND INFORMATION PROCESSING METHOD

Step 1: The Administrator registers stationary and/or mobile systems (e.g. buildings, bridges, hillsides, ground vehicles, aircrafts, watercrafts, etc..) to be spatially monitored in the network database of a GNSS system network of the present invention, for automatically monitoring the system for structural displacement, distortion and/or deformation beyond predetermined thresholds, and generating notifications and/or alarms to administrators and/or managers of the spatially-monitored system, wherein the GNSS system network comprises (i) a plurality of GNSS Rover Units embedded within the boundary of the monitored system, for receiving GNSS signals from GNSS satellites and processing the received GNSS signals locally or remotely to automatically determine the occurrence of spatial displacement, distortion and/or deformation of the monitored system over time, (ii) one or more mobile computing systems operably connected to the Network, and each supporting a Web Application, and (iii) a remote data center supporting Web, Application and Database Servers operably connected to the Network to provide a remote web user interface, and read/write and process data regarding the spatial monitoring functions supported by the GNSS system network.

↓

Step 2: Administrator creates deflection, deformation and/or displacement limits and thresholds for the monitored system and registers limits and thresholds in the Database.

↓

Step 3: Administrator registers alert thresholds in the Database for each virtual zone based upon acceptable structural deflection and/or displacement.

↓

Step 4: GNSS Rover Receivers embedded within the system being monitored receiving GNSS signals transmitted from constellations of GNSS satellites orbiting the Earth

↓

Step 5: The GNSS Base Receivers automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

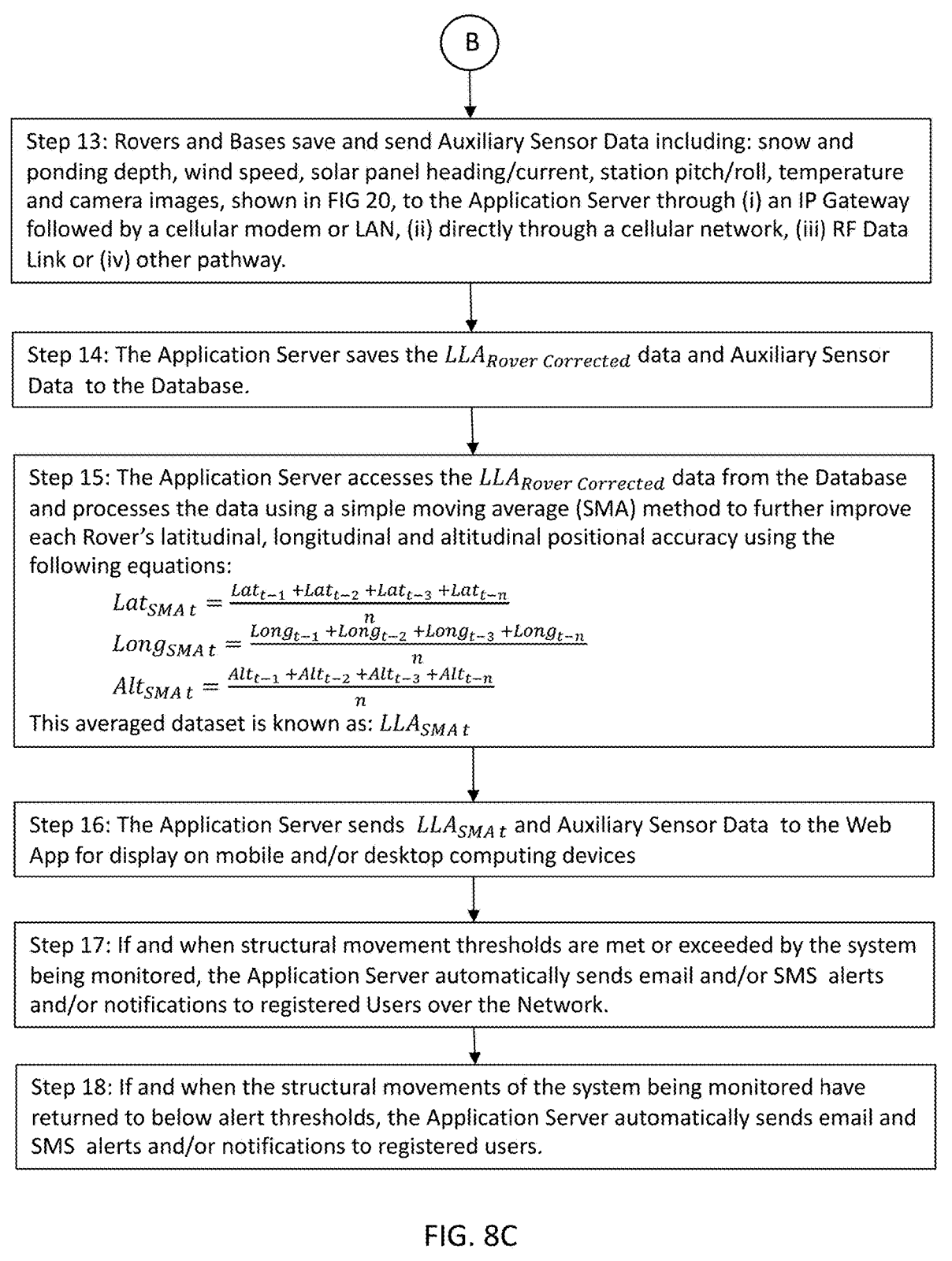

Step 13: Rovers and Bases save and send Auxiliary Sensor Data including: snow and ponding depth, wind speed, solar panel heading/current, station pitch/roll, temperature and camera images, shown in FIG 20, to the Application Server through (i) an IP Gateway followed by a cellular modem or LAN, (ii) directly through a cellular network, (iii) RF Data Link or (iv) other pathway.

Step 14: The Application Server saves the $LLA_{Rover\ Corrected}$ data and Auxiliary Sensor Data to the Database.

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 16: The Application Server sends $LLA_{SMA\,t}$ and Auxiliary Sensor Data to the Web App for display on mobile and/or desktop computing devices Step 17: If and when structural movement thresholds are met or exceeded by the system being monitored, the Application Server automatically sends email and/or SMS alerts and/or notifications to registered Users over the Network.

Step 18: If and when the structural movements of the system being monitored have returned to below alert thresholds, the Application Server automatically sends email and SMS alerts and/or notifications to registered users.

FIG. 8C

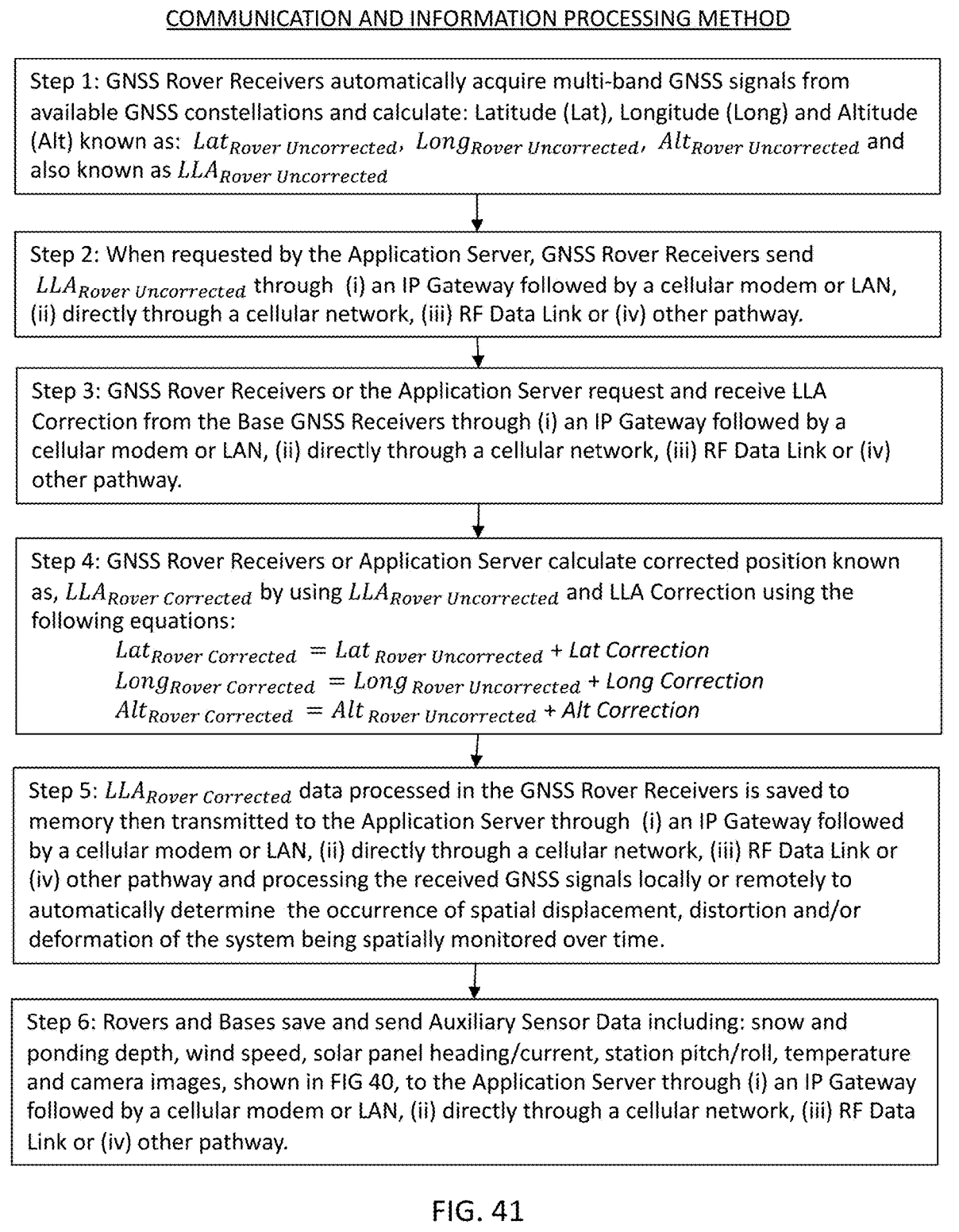

COMMUNICATION AND INFORMATION PROCESSING METHOD

Step 1: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$

↓

Step 2: When requested by the Application Server, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

↓

Step 3: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

↓

Step 4: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

↓

Step 5: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway and processing the received GNSS signals locally or remotely to automatically determine the occurrence of spatial displacement, distortion and/or deformation of the system being spatially monitored over time.

↓

Step 6: Rovers and Bases save and send Auxiliary Sensor Data including: snow and ponding depth, wind speed, solar panel heading/current, station pitch/roll, temperature and camera images, shown in FIG 40, to the Application Server through (i) an IP Gateway followed by a cellular modem or LAN, (ii) directly through a cellular network, (iii) RF Data Link or (iv) other pathway.

FIG. 41

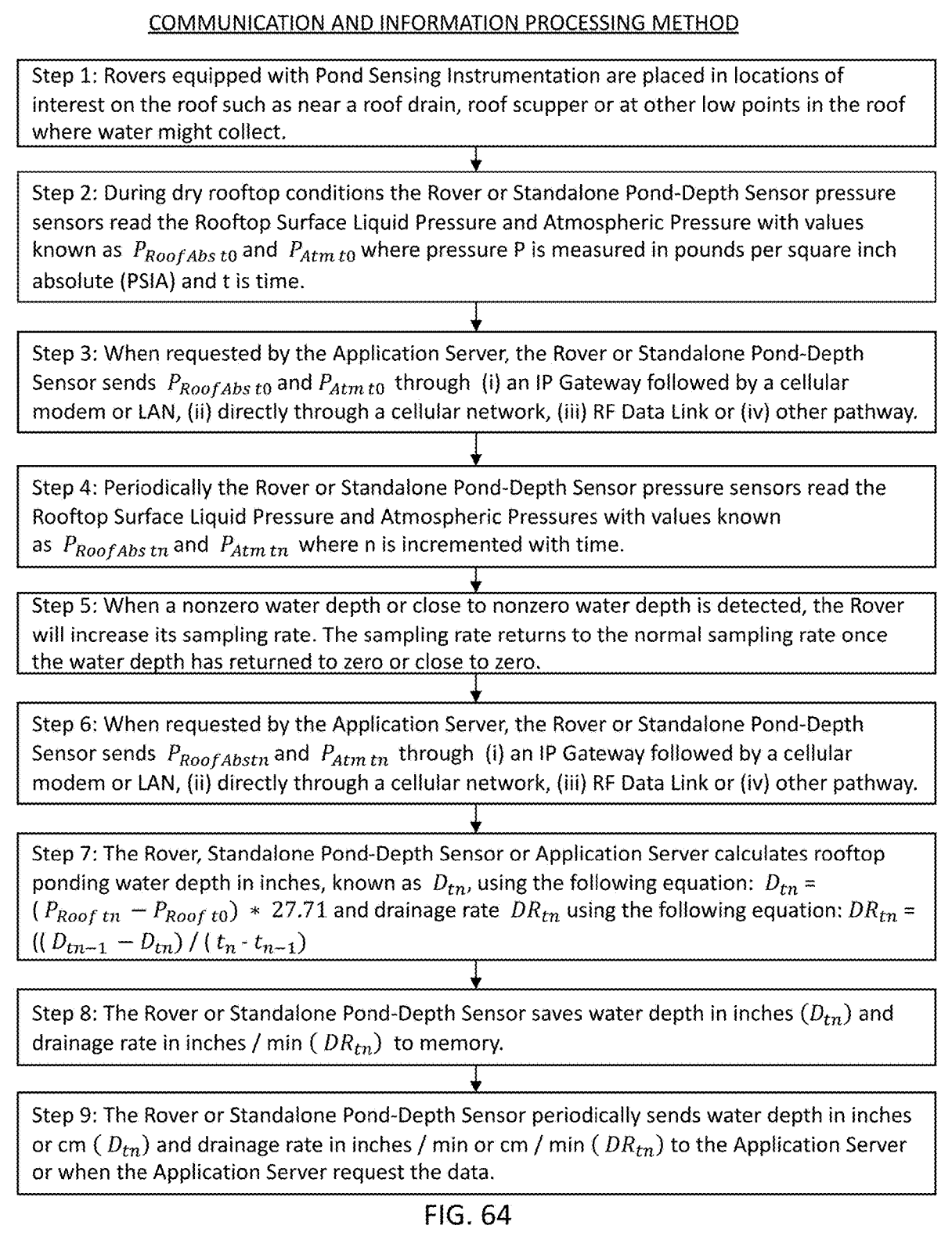

COMMUNICATION AND INFORMATION PROCESSING METHOD

Step 1: Rovers equipped with Pond Sensing Instrumentation are placed in locations of interest on the roof such as near a roof drain, roof scupper or at other low points in the roof where water might collect.

↓

Step 2: During dry rooftop conditions the Rover or Standalone Pond-Depth Sensor pressure sensors read the Rooftop Surface Liquid Pressure and Atmospheric Pressure with values known as $P_{RoofAbs\,t0}$ and $P_{Atm\,t0}$ where pressure P is measured in pounds per square inch absolute (PSIA) and t is time.

↓

Step 3: When requested by the Application Server, the Rover or Standalone Pond-Depth Sensor sends $P_{RoofAbs\,t0}$ and $P_{Atm\,t0}$ through (i) an IP Gateway followed by a cellular modem or LAN, (ii) directly through a cellular network, (iii) RF Data Link or (iv) other pathway.

↓

Step 4: Periodically the Rover or Standalone Pond-Depth Sensor pressure sensors read the Rooftop Surface Liquid Pressure and Atmospheric Pressures with values known as $P_{RoofAbs\,tn}$ and $P_{Atm\,tn}$ where n is incremented with time.

↓

Step 5: When a nonzero water depth or close to nonzero water depth is detected, the Rover will increase its sampling rate. The sampling rate returns to the normal sampling rate once the water depth has returned to zero or close to zero.

↓

Step 6: When requested by the Application Server, the Rover or Standalone Pond-Depth Sensor sends $P_{RoofAbstn}$ and $P_{Atm\,tn}$ through (i) an IP Gateway followed by a cellular modem or LAN, (ii) directly through a cellular network, (iii) RF Data Link or (iv) other pathway.

↓

Step 7: The Rover, Standalone Pond-Depth Sensor or Application Server calculates rooftop ponding water depth in inches, known as $D_{tn}$, using the following equation: $D_{tn} = (P_{Roof\,tn} - P_{Roof\,t0}) * 27.71$ and drainage rate $DR_{tn}$ using the following equation: $DR_{tn} = ((D_{tn-1} - D_{tn}) / (t_n - t_{n-1})$

↓

Step 8: The Rover or Standalone Pond-Depth Sensor saves water depth in inches ($D_{tn}$) and drainage rate in inches / min ($DR_{tn}$) to memory.

↓

Step 9: The Rover or Standalone Pond-Depth Sensor periodically sends water depth in inches or cm ($D_{tn}$) and drainage rate in inches / min or cm / min ($DR_{tn}$) to the Application Server or when the Application Server request the data.

FIG. 64

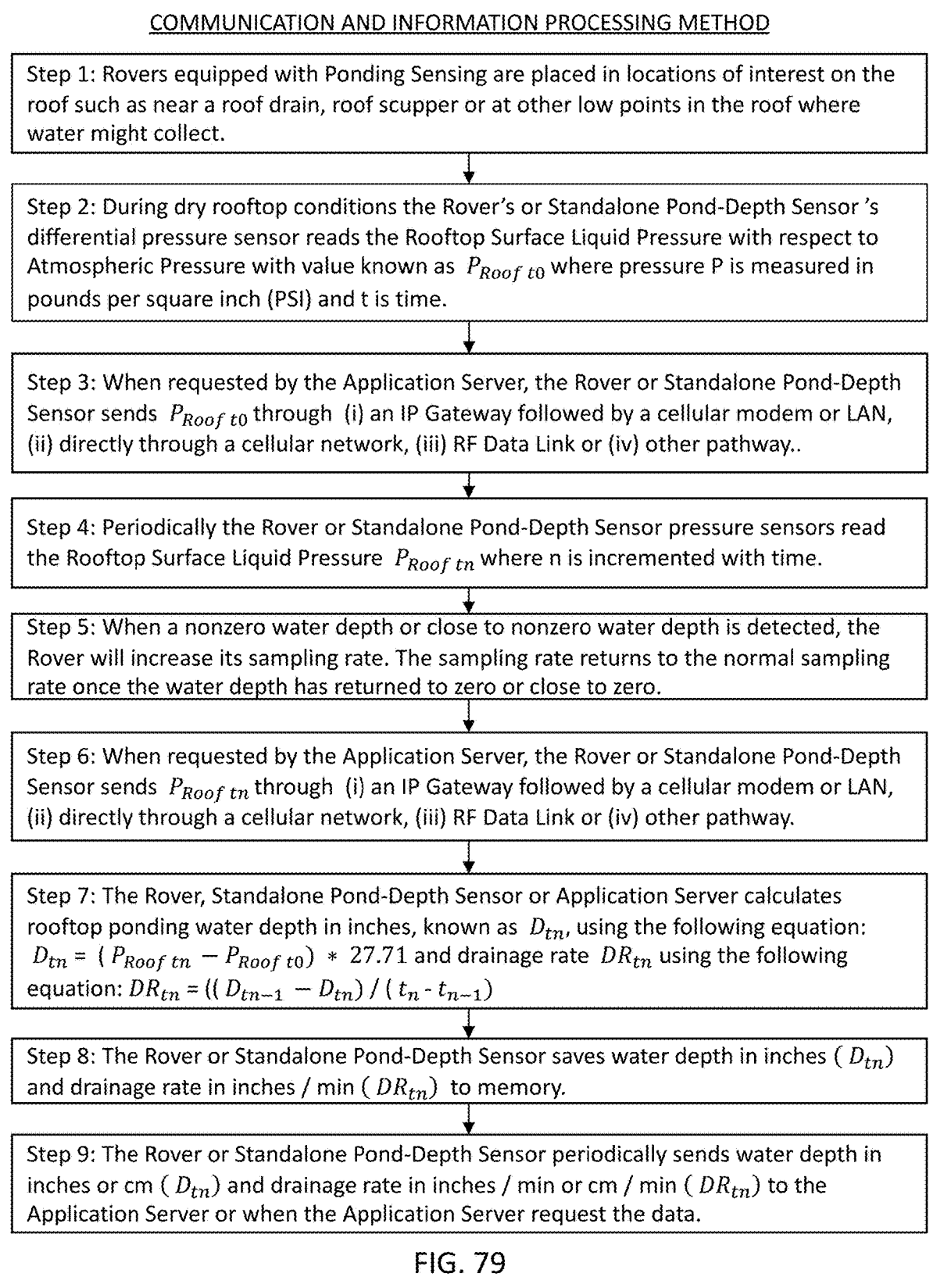

COMMUNICATION AND INFORMATION PROCESSING METHOD

Step 1: Rovers equipped with Ponding Sensing are placed in locations of interest on the roof such as near a roof drain, roof scupper or at other low points in the roof where water might collect.

↓

Step 2: During dry rooftop conditions the Rover's or Standalone Pond-Depth Sensor 's differential pressure sensor reads the Rooftop Surface Liquid Pressure with respect to Atmospheric Pressure with value known as $P_{Roof\ t0}$ where pressure P is measured in pounds per square inch (PSI) and t is time.

↓

Step 3: When requested by the Application Server, the Rover or Standalone Pond-Depth Sensor sends $P_{Roof\ t0}$ through (i) an IP Gateway followed by a cellular modem or LAN, (ii) directly through a cellular network, (iii) RF Data Link or (iv) other pathway..

↓

Step 4: Periodically the Rover or Standalone Pond-Depth Sensor pressure sensors read the Rooftop Surface Liquid Pressure $P_{Roof\ tn}$ where n is incremented with time.

↓

Step 5: When a nonzero water depth or close to nonzero water depth is detected, the Rover will increase its sampling rate. The sampling rate returns to the normal sampling rate once the water depth has returned to zero or close to zero.

↓

Step 6: When requested by the Application Server, the Rover or Standalone Pond-Depth Sensor sends $P_{Roof\ tn}$ through (i) an IP Gateway followed by a cellular modem or LAN, (ii) directly through a cellular network, (iii) RF Data Link or (iv) other pathway.

↓

Step 7: The Rover, Standalone Pond-Depth Sensor or Application Server calculates rooftop ponding water depth in inches, known as $D_{tn}$, using the following equation: $D_{tn} = (P_{Roof\ tn} - P_{Roof\ t0}) * 27.71$ and drainage rate $DR_{tn}$ using the following equation: $DR_{tn} = ((D_{tn-1} - D_{tn}) / (t_n - t_{n-1})$

↓

Step 8: The Rover or Standalone Pond-Depth Sensor saves water depth in inches ($D_{tn}$) and drainage rate in inches / min ($DR_{tn}$) to memory.

↓

Step 9: The Rover or Standalone Pond-Depth Sensor periodically sends water depth in inches or cm ($D_{tn}$) and drainage rate in inches / min or cm / min ($DR_{tn}$) to the Application Server or when the Application Server request the data.

FIG. 79

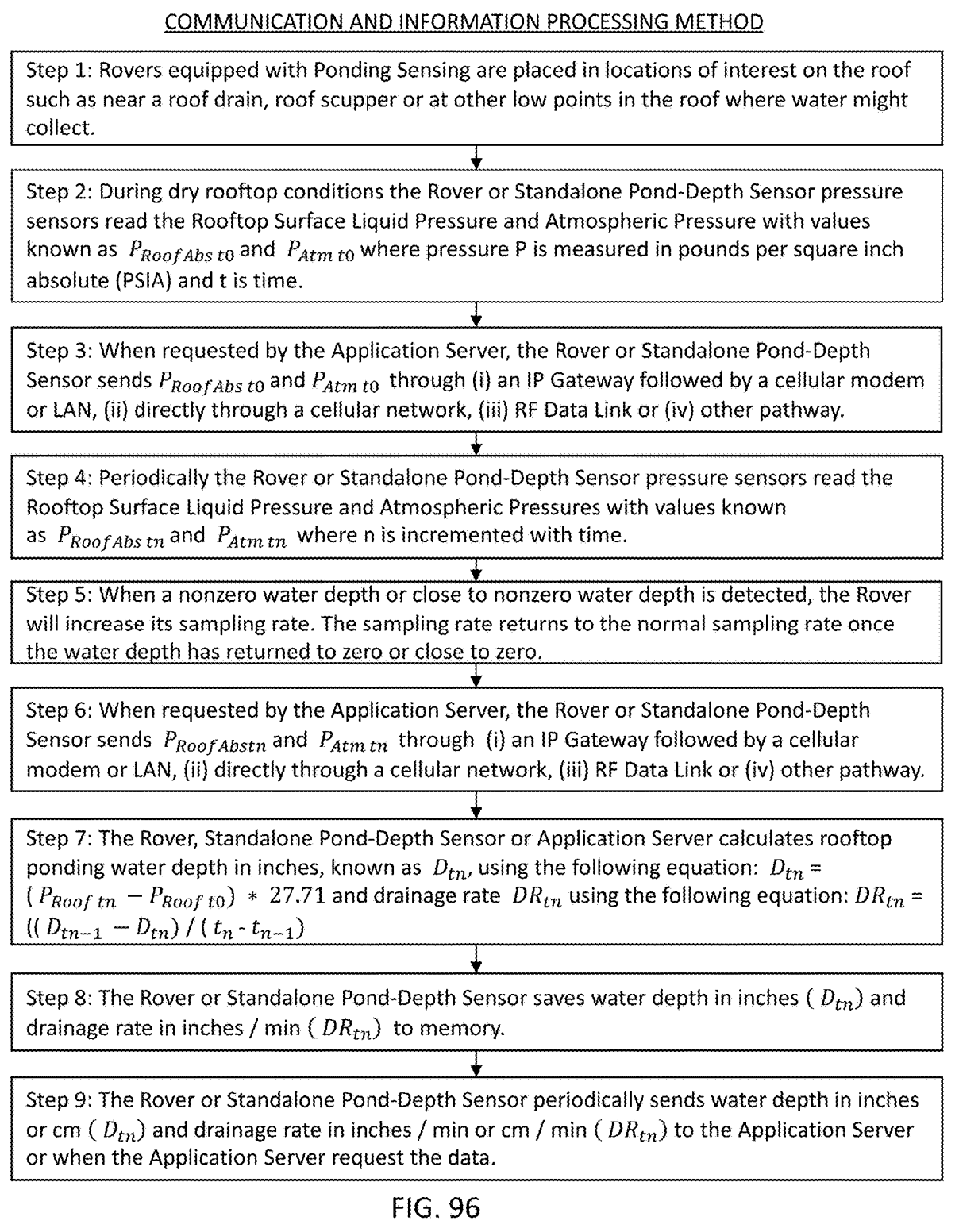

COMMUNICATION AND INFORMATION PROCESSING METHOD

Step 1: Rovers equipped with Ponding Sensing are placed in locations of interest on the roof such as near a roof drain, roof scupper or at other low points in the roof where water might collect.

↓

Step 2: During dry rooftop conditions the Rover or Standalone Pond-Depth Sensor pressure sensors read the Rooftop Surface Liquid Pressure and Atmospheric Pressure with values known as $P_{RoofAbs\ t0}$ and $P_{Atm\ t0}$ where pressure P is measured in pounds per square inch absolute (PSIA) and t is time.

↓

Step 3: When requested by the Application Server, the Rover or Standalone Pond-Depth Sensor sends $P_{RoofAbs\ t0}$ and $P_{Atm\ t0}$ through (i) an IP Gateway followed by a cellular modem or LAN, (ii) directly through a cellular network, (iii) RF Data Link or (iv) other pathway.

↓

Step 4: Periodically the Rover or Standalone Pond-Depth Sensor pressure sensors read the Rooftop Surface Liquid Pressure and Atmospheric Pressures with values known as $P_{RoofAbs\ tn}$ and $P_{Atm\ tn}$ where n is incremented with time.

↓

Step 5: When a nonzero water depth or close to nonzero water depth is detected, the Rover will increase its sampling rate. The sampling rate returns to the normal sampling rate once the water depth has returned to zero or close to zero.

↓

Step 6: When requested by the Application Server, the Rover or Standalone Pond-Depth Sensor sends $P_{RoofAbstn}$ and $P_{Atm\ tn}$ through (i) an IP Gateway followed by a cellular modem or LAN, (ii) directly through a cellular network, (iii) RF Data Link or (iv) other pathway.

↓

Step 7: The Rover, Standalone Pond-Depth Sensor or Application Server calculates rooftop ponding water depth in inches, known as $D_{tn}$, using the following equation: $D_{tn} = (P_{Roof\ tn} - P_{Roof\ t0}) * 27.71$ and drainage rate $DR_{tn}$ using the following equation: $DR_{tn} = ((D_{tn-1} - D_{tn}) / (t_n - t_{n-1})$

↓

Step 8: The Rover or Standalone Pond-Depth Sensor saves water depth in inches ($D_{tn}$) and drainage rate in inches / min ($DR_{tn}$) to memory.

↓

Step 9: The Rover or Standalone Pond-Depth Sensor periodically sends water depth in inches or cm ($D_{tn}$) and drainage rate in inches / min or cm / min ($DR_{tn}$) to the Application Server or when the Application Server request the data.

FIG. 96

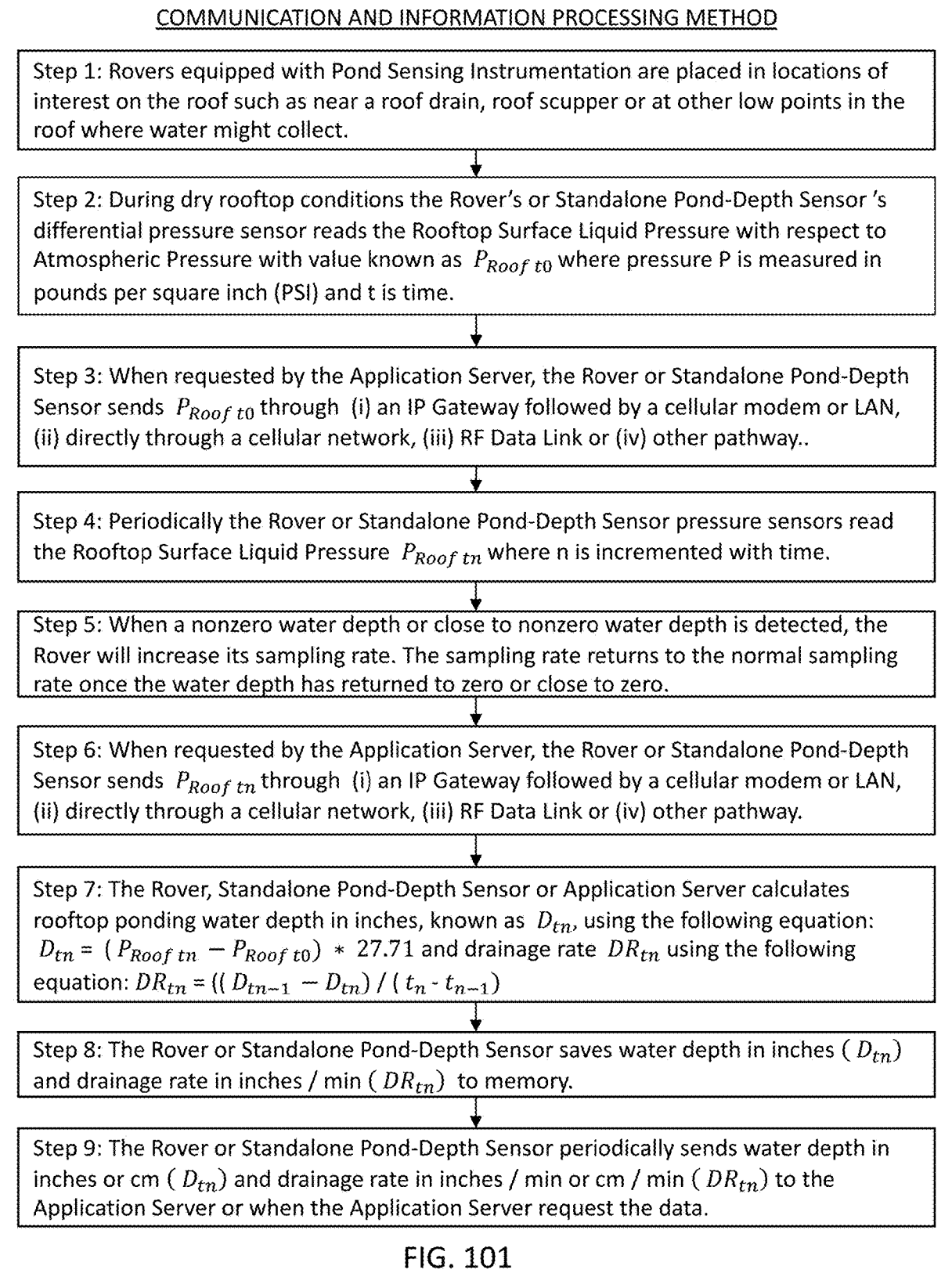

COMMUNICATION AND INFORMATION PROCESSING METHOD

Step 1: Rovers equipped with Pond Sensing Instrumentation are placed in locations of interest on the roof such as near a roof drain, roof scupper or at other low points in the roof where water might collect.

↓

Step 2: During dry rooftop conditions the Rover's or Standalone Pond-Depth Sensor 's differential pressure sensor reads the Rooftop Surface Liquid Pressure with respect to Atmospheric Pressure with value known as $P_{Roof\ t0}$ where pressure P is measured in pounds per square inch (PSI) and t is time.

↓

Step 3: When requested by the Application Server, the Rover or Standalone Pond-Depth Sensor sends $P_{Roof\ t0}$ through (i) an IP Gateway followed by a cellular modem or LAN, (ii) directly through a cellular network, (iii) RF Data Link or (iv) other pathway..

↓

Step 4: Periodically the Rover or Standalone Pond-Depth Sensor pressure sensors read the Rooftop Surface Liquid Pressure $P_{Roof\ tn}$ where n is incremented with time.

↓

Step 5: When a nonzero water depth or close to nonzero water depth is detected, the Rover will increase its sampling rate. The sampling rate returns to the normal sampling rate once the water depth has returned to zero or close to zero.

↓

Step 6: When requested by the Application Server, the Rover or Standalone Pond-Depth Sensor sends $P_{Roof\ tn}$ through (i) an IP Gateway followed by a cellular modem or LAN, (ii) directly through a cellular network, (iii) RF Data Link or (iv) other pathway.

↓

Step 7: The Rover, Standalone Pond-Depth Sensor or Application Server calculates rooftop ponding water depth in inches, known as $D_{tn}$, using the following equation: $D_{tn} = (P_{Roof\ tn} - P_{Roof\ t0}) * 27.71$ and drainage rate $DR_{tn}$ using the following equation: $DR_{tn} = ((D_{tn-1} - D_{tn}) / (t_n - t_{n-1})$

↓

Step 8: The Rover or Standalone Pond-Depth Sensor saves water depth in inches ($D_{tn}$) and drainage rate in inches / min ($DR_{tn}$) to memory.

↓

Step 9: The Rover or Standalone Pond-Depth Sensor periodically sends water depth in inches or cm ($D_{tn}$) and drainage rate in inches / min or cm / min ($DR_{tn}$) to the Application Server or when the Application Server request the data.

FIG. 101

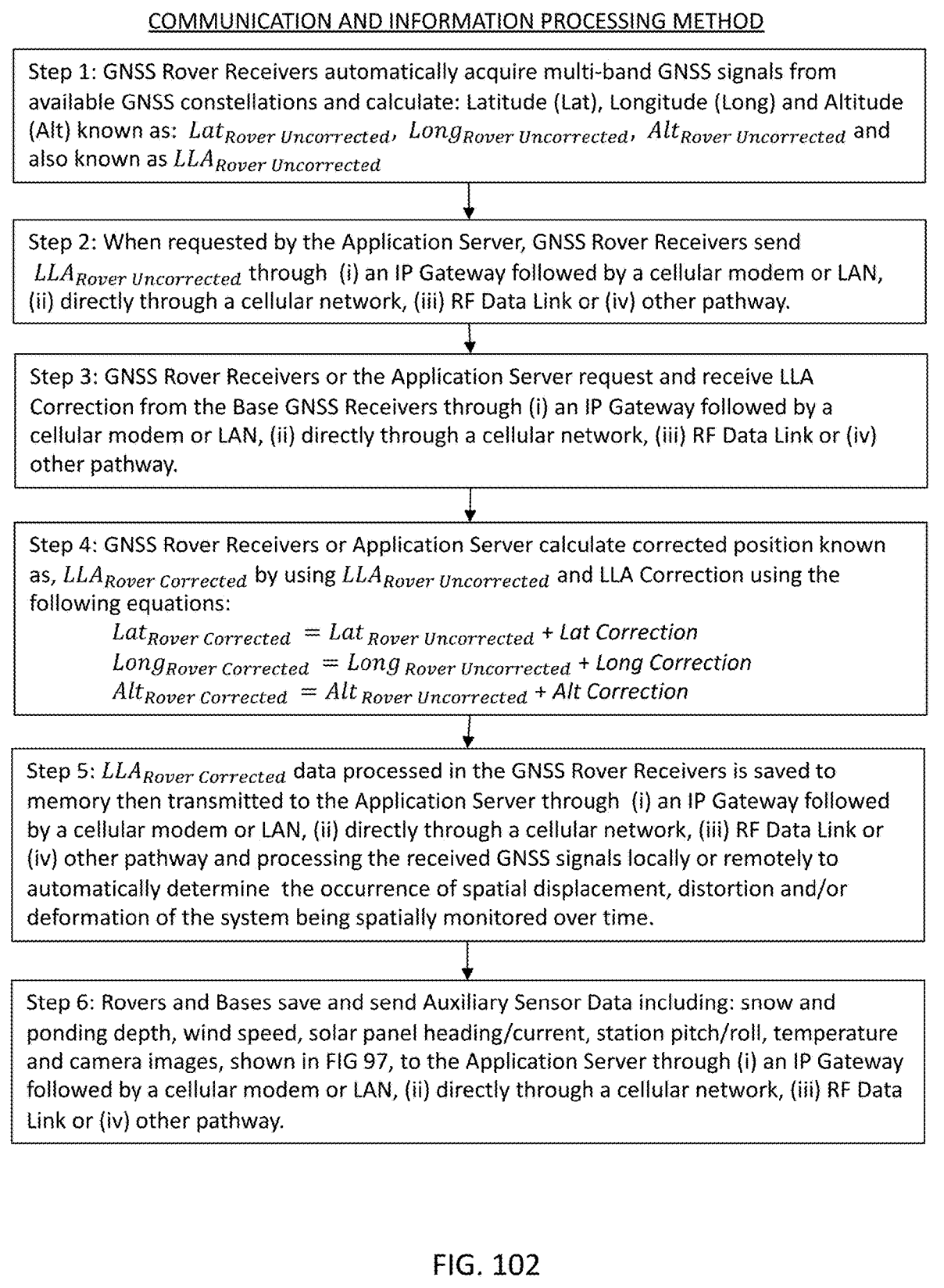

COMMUNICATION AND INFORMATION PROCESSING METHOD

Step 1: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$

↓

Step 2: When requested by the Application Server, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

↓

Step 3: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

↓

Step 4: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

↓

Step 5: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway and processing the received GNSS signals locally or remotely to automatically determine the occurrence of spatial displacement, distortion and/or deformation of the system being spatially monitored over time.

↓

Step 6: Rovers and Bases save and send Auxiliary Sensor Data including: snow and ponding depth, wind speed, solar panel heading/current, station pitch/roll, temperature and camera images, shown in FIG 97, to the Application Server through (i) an IP Gateway followed by a cellular modem or LAN, (ii) directly through a cellular network, (iii) RF Data Link or (iv) other pathway.

FIG. 102

Figure 108A:
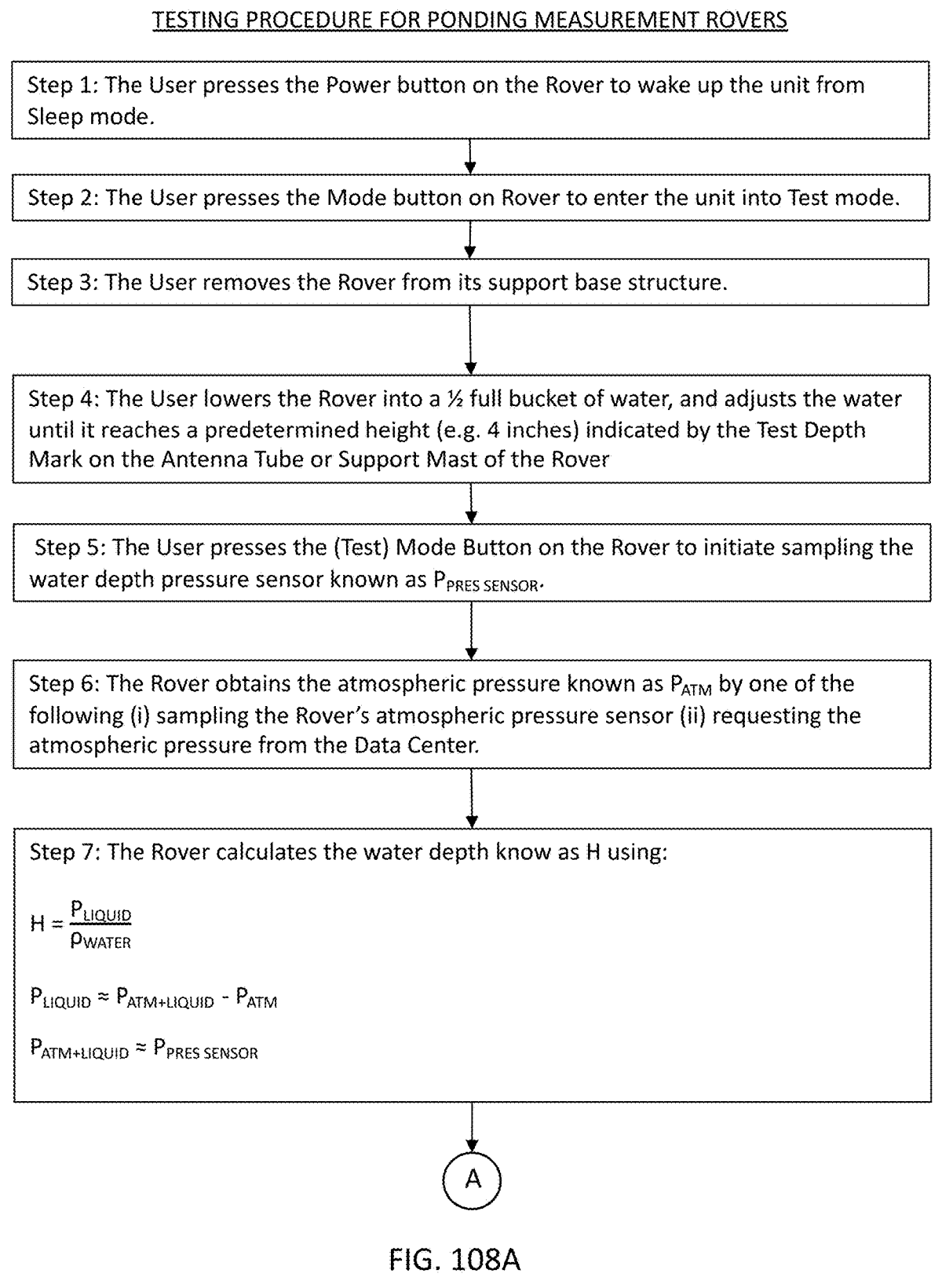

TESTING PROCEDURE FOR PONDING MEASUREMENT ROVERS

Step 1: The User presses the Power button on the Rover to wake up the unit from Sleep mode.

Step 2: The User presses the Mode button on Rover to enter the unit into Test mode.

Step 3: The User removes the Rover from its support base structure.

Step 4: The User lowers the Rover into a ½ full bucket of water, and adjusts the water until it reaches a predetermined height (e.g. 4 inches) indicated by the Test Depth Mark on the Antenna Tube or Support Mast of the Rover Step 5: The User presses the (Test) Mode Button on the Rover to initiate sampling the water depth pressure sensor known as $P_{PRES\ SENSOR}$.

Step 6: The Rover obtains the atmospheric pressure known as $P_{ATM}$ by one of the following (i) sampling the Rover's atmospheric pressure sensor (ii) requesting the atmospheric pressure from the Data Center.

Step 7: The Rover calculates the water depth know as H using:

$$H = \frac{P_{LIQUID}}{\rho_{WATER}}$$

$$P_{LIQUID} \approx P_{ATM+LIQUID} - P_{ATM}$$

$$P_{ATM+LIQUID} \approx P_{PRES\ SENSOR}$$

MONITORING DRAIN RESPONSE USING SYSTEM OF PRESENT INVENTION OPERATING IN PONDING MONITORING AND ALERT MODE

NORMAL OPERATION

EXCEEDED SAFE WATER DEPTH LIMIT

SLOW DRAINING ALERT

AUTOMATED REASSIGNMENT OF A ROVER UNIT TO A BASE UNIT IN A SYSTEM UPON PREDICTION OR DETECTION OF PRIMARY BASE UNIT FAILURE

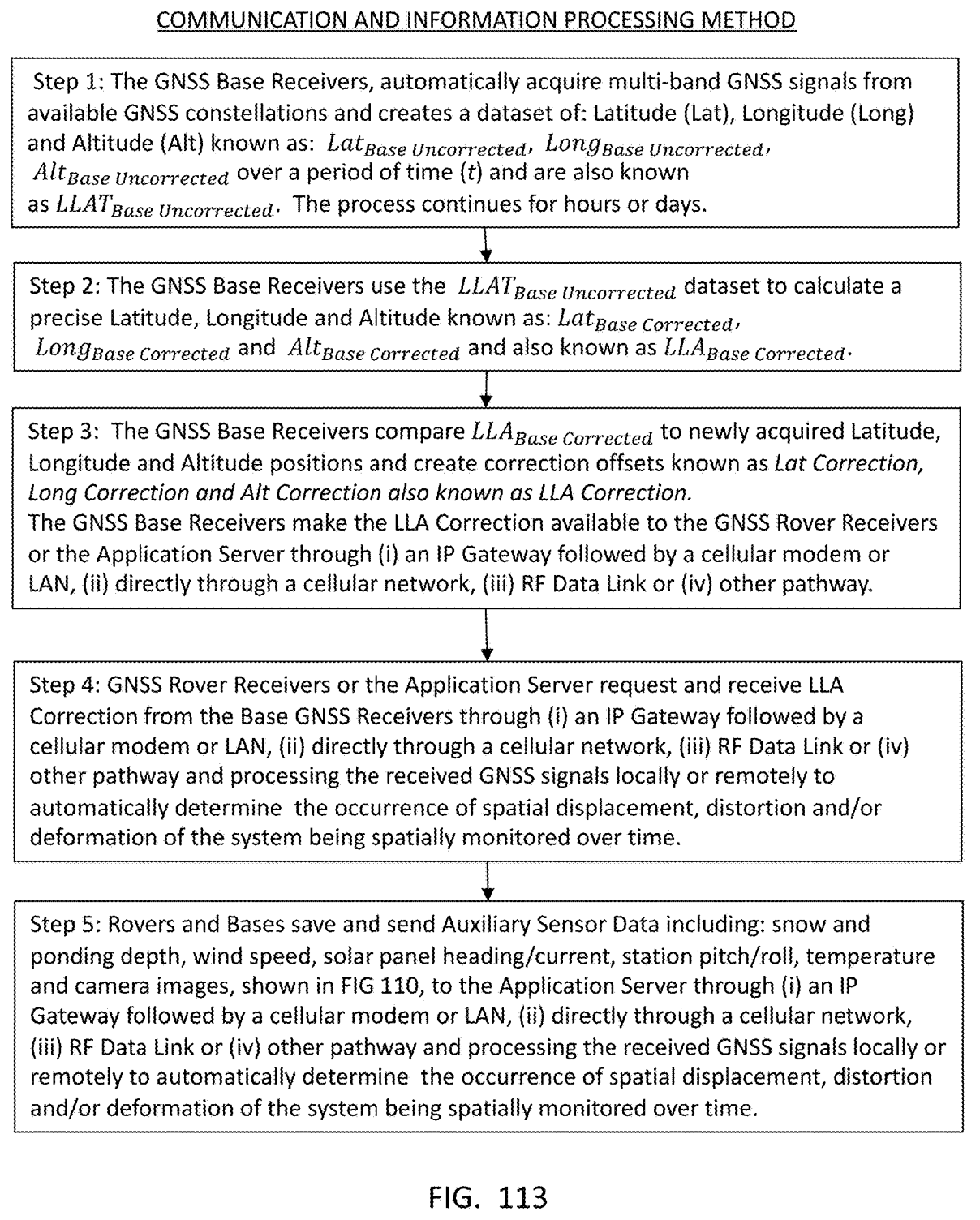

COMMUNICATION AND INFORMATION PROCESSING METHOD

Step 1: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 2: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

↓

Step 3: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

↓

Step 4: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway and processing the received GNSS signals locally or remotely to automatically determine the occurrence of spatial displacement, distortion and/or deformation of the system being spatially monitored over time.

↓

Step 5: Rovers and Bases save and send Auxiliary Sensor Data including: snow and ponding depth, wind speed, solar panel heading/current, station pitch/roll, temperature and camera images, shown in FIG 110, to the Application Server through (i) an IP Gateway followed by a cellular modem or LAN, (ii) directly through a cellular network, (iii) RF Data Link or (iv) other pathway and processing the received GNSS signals locally or remotely to automatically determine the occurrence of spatial displacement, distortion and/or deformation of the system being spatially monitored over time.

FIG. 113

SPECIFICATION OF SERVICES FOR USER GROUPS ON THE SYSTEM NETWORK

| SERVICES | ADMINISTRATOR | MANAGER | RESPONSER | VIEWER |
|---|---|---|---|---|
| SETUP SYSTEM | X | X | | |
| MANAGE STATIONS | X | X | | |
| INITIATE SYSTEM TEST | X | X | | |
| ENABLE SYSTEM AND INITIATE COMMUNICATIONS | X | X | | |
| VIEW STATION STATUS AND MONITOR DATA FOR: PONDING, ROOFTOP AND GROUND-BASED IMAGING, DEFLECTION AND DISPLACEMENT MEASUREMENTS, SNOW PRESSURE, WIND SPEED, TEMERATURE AND STRUCTURAL VIBRATIONS | X | X | X | X |
| RECEIVE ALERTS AND NOTIFICATIONS, RESPOND AND REPORT | X | X | X | X |
| DEFINE ADMINISTRATOR | X | | | |

FIG. 118

METHOD OF SETTING UP THE SYSTEM
USING THE GNSS SYSTEM NETWORK OF THE PRESENT INVENTION

METHOD OF MANAGING STATIONS ON THE SYSTEM NETWORK USING THE GNSS SYSTEM NETWORK OF THE PRESENT INVENTION

METHOD OF INITIATING THE SYSTEM TEST
USING THE GNSS SYSTEM NETWORK OF THE PRESENT INVENTION

METHOD OF ENABLING THE SYSTEM AND INITIATING COMMUNICATIONS USING THE GNSS SYSTEM NETWORK OF THE PRESENT INVENTION

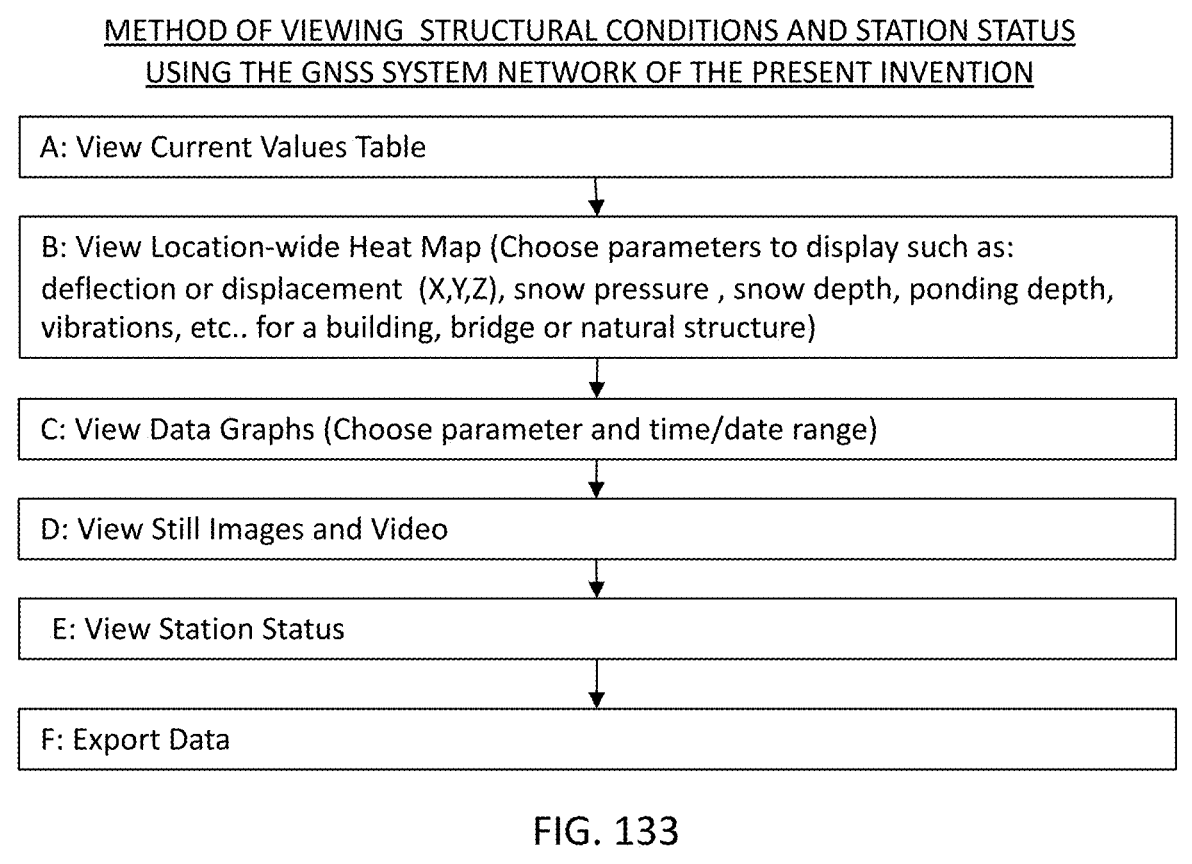

METHOD OF VIEWING STRUCTURAL CONDITIONS AND STATION STATUS USING THE GNSS SYSTEM NETWORK OF THE PRESENT INVENTION

A: View Current Values Table

↓

B: View Location-wide Heat Map (Choose parameters to display such as: deflection or displacement (X,Y,Z), snow pressure , snow depth, ponding depth, vibrations, etc.. for a building, bridge or natural structure)

↓

C: View Data Graphs (Choose parameter and time/date range)

↓

D: View Still Images and Video

↓

E: View Station Status

↓

F: Export Data

FIG. 133

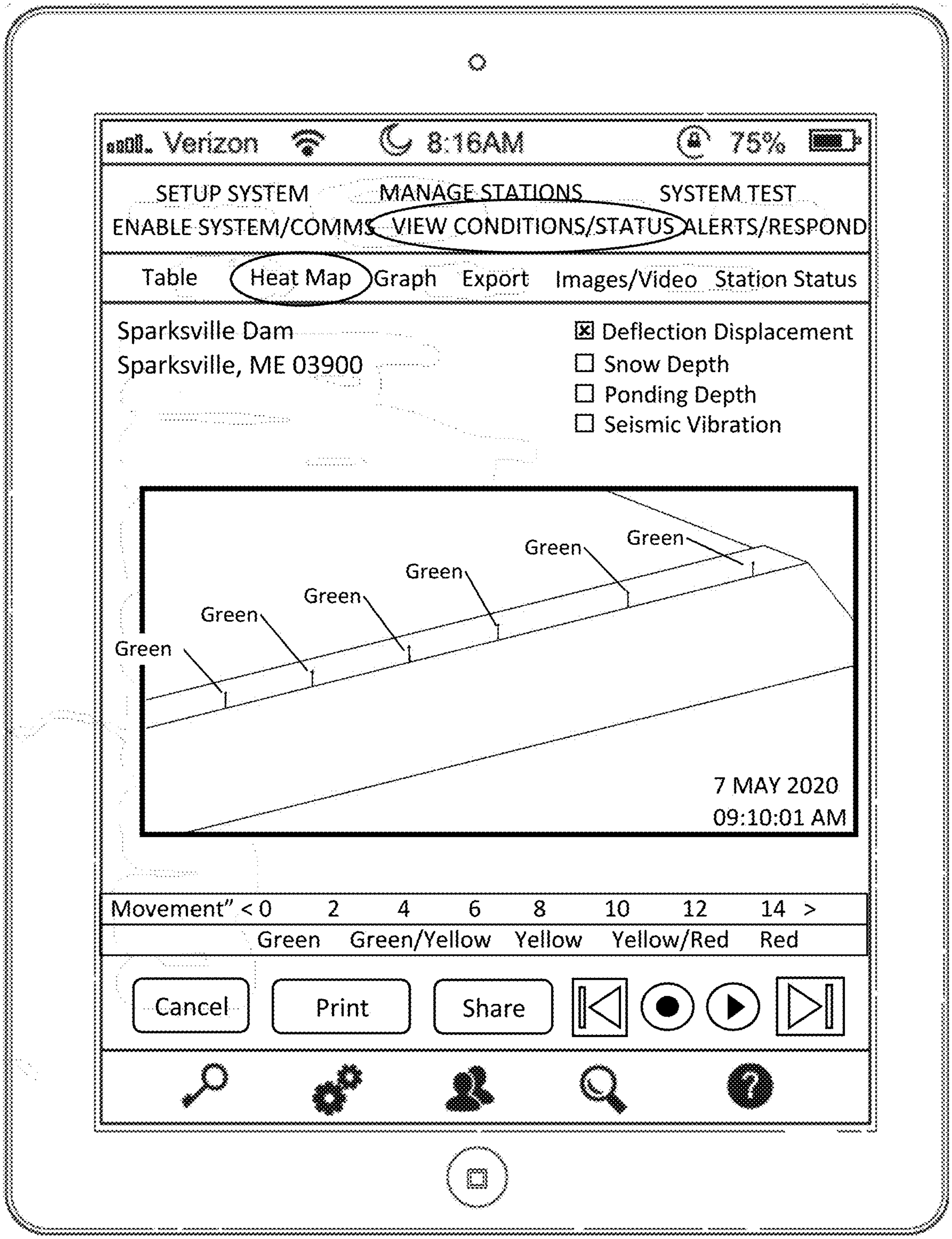
FIG. 135B1

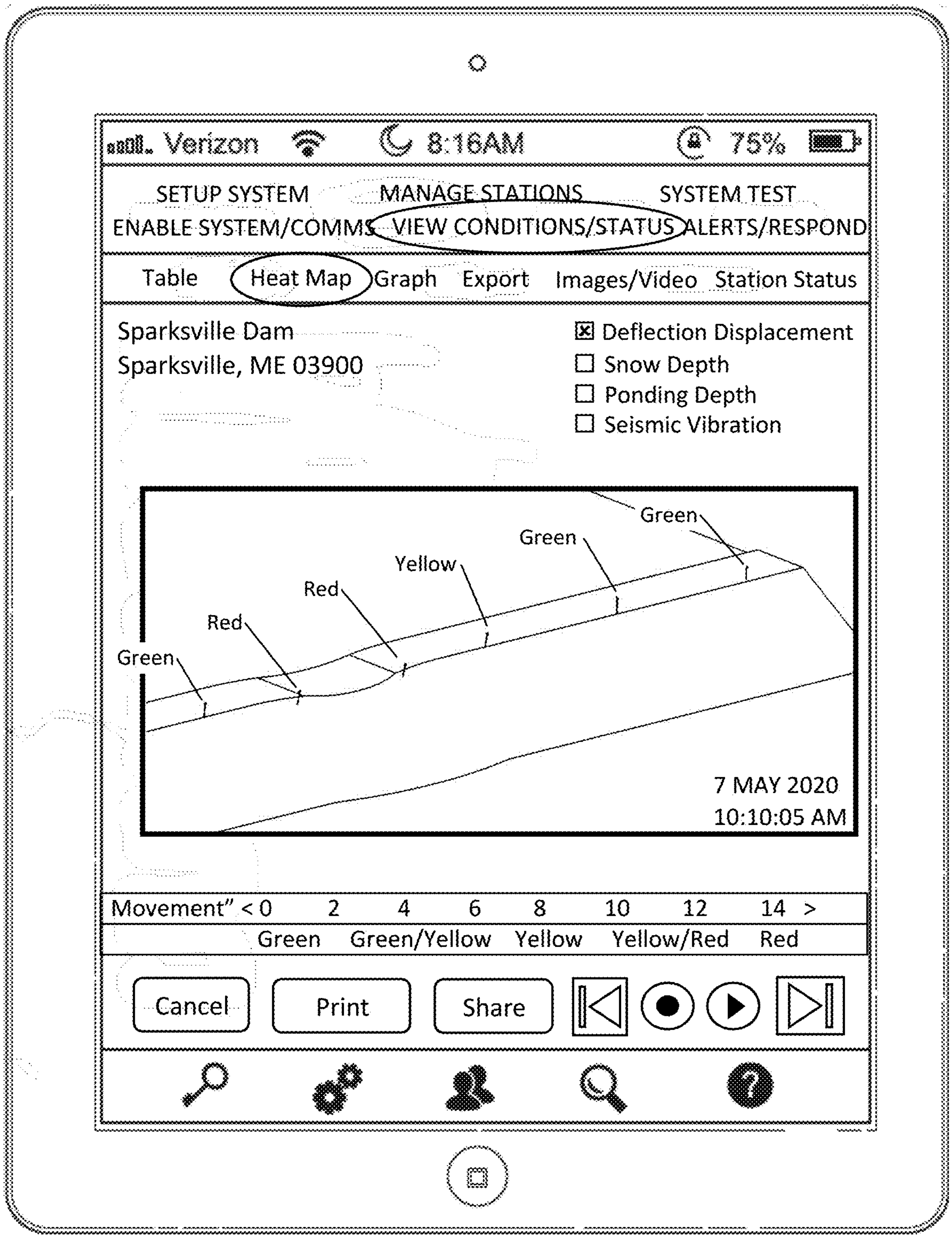
FIG. 135B2

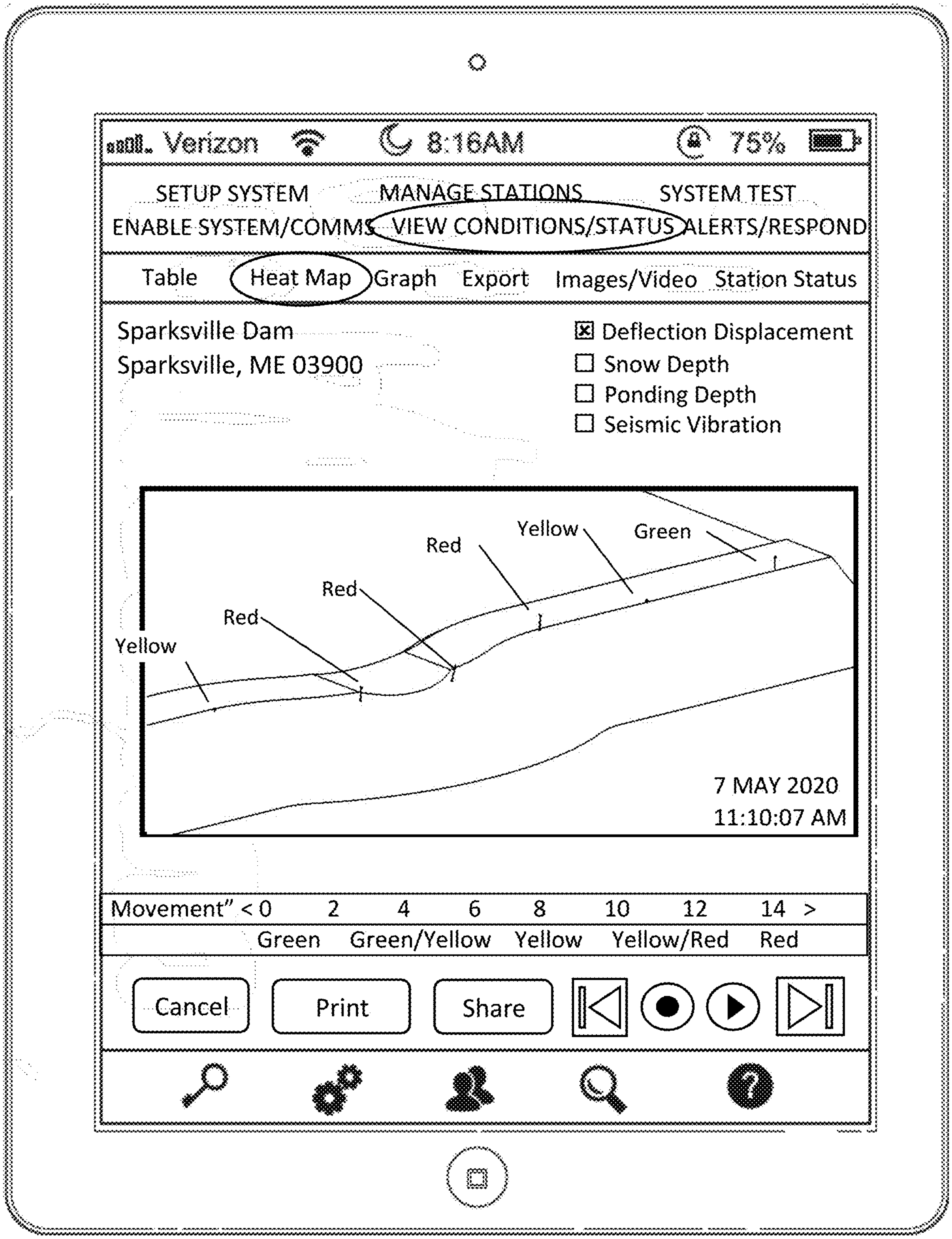
FIG. 135B3

METHOD OF RECEIVING ALERTS AND NOTIFICATIONS, RESPONDING AND REPORTING USING THE GNSS SYSTEM NETWORK OF THE PRESENT INVENTION

Figure 150A:
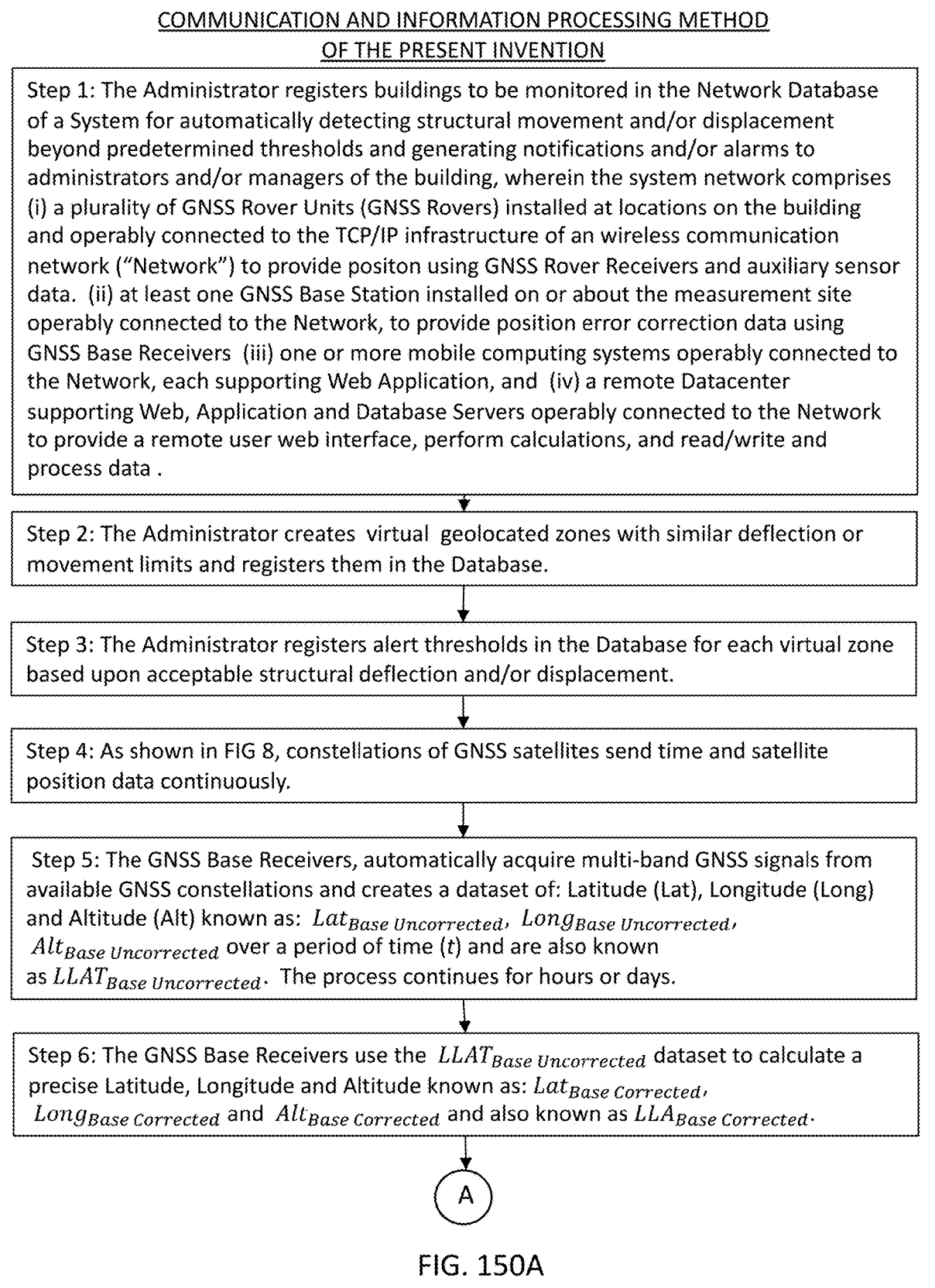

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, wherein the system network comprises (i) a plurality of GNSS Rover Units (GNSS Rovers) installed at locations on the building and operably connected to the TCP/IP infrastructure of an wireless communication network ("Network") to provide positon using GNSS Rover Receivers and auxiliary sensor data. (ii) at least one GNSS Base Station installed on or about the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 8, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 150B:
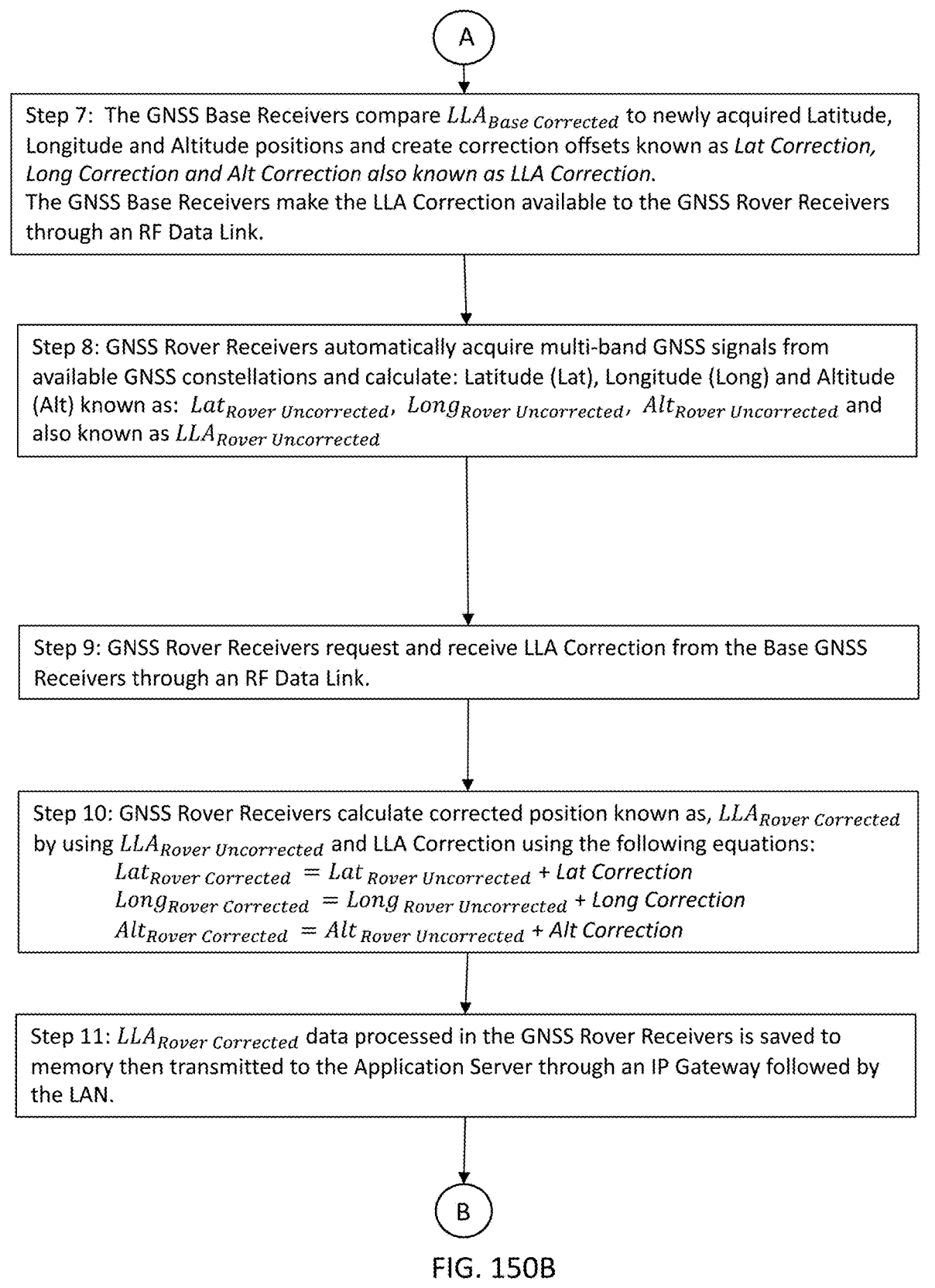

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers through an RF Data Link.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: GNSS Rover Receivers request and receive LLA Correction from the Base GNSS Receivers through an RF Data Link.

Step 10: GNSS Rover Receivers calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 11: $LLA_{Rover\ Corrected}$ data processed in the GNSS Rover Receivers is saved to memory then transmitted to the Application Server through an IP Gateway followed by the LAN.

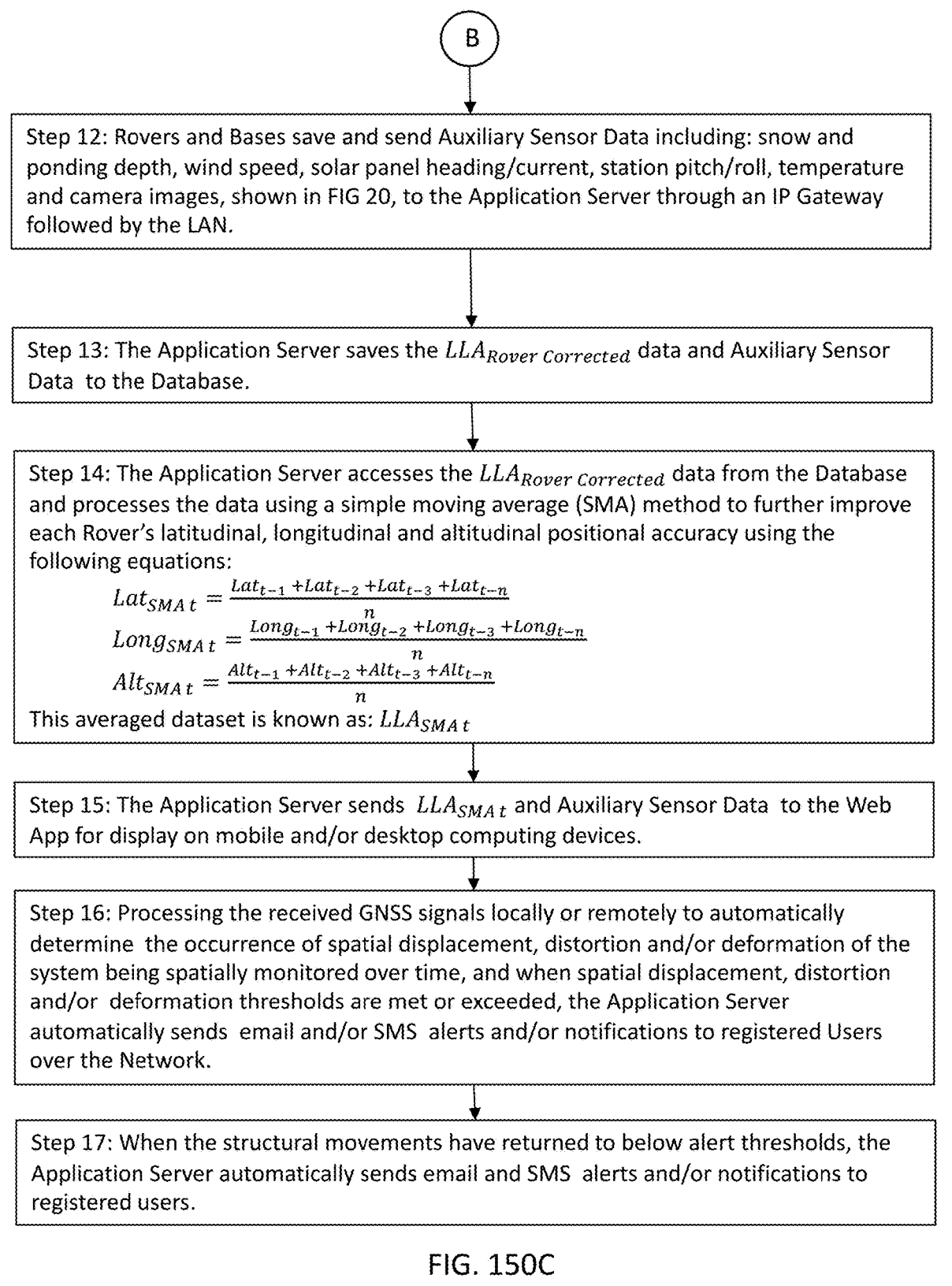

Step 12: Rovers and Bases save and send Auxiliary Sensor Data including: snow and ponding depth, wind speed, solar panel heading/current, station pitch/roll, temperature and camera images, shown in FIG 20, to the Application Server through an IP Gateway followed by the LAN.

Step 13: The Application Server saves the $LLA_{Rover\ Corrected}$ data and Auxiliary Sensor Data to the Database.

Step 14: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 15: The Application Server sends $LLA_{SMA\,t}$ and Auxiliary Sensor Data to the Web App for display on mobile and/or desktop computing devices.

Step 16: Processing the received GNSS signals locally or remotely to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the Network.

Step 17: When the structural movements have returned to below alert thresholds, the Application Server automatically sends email and SMS alerts and/or notifications to registered users.

FIG. 150C

Figure 154A:
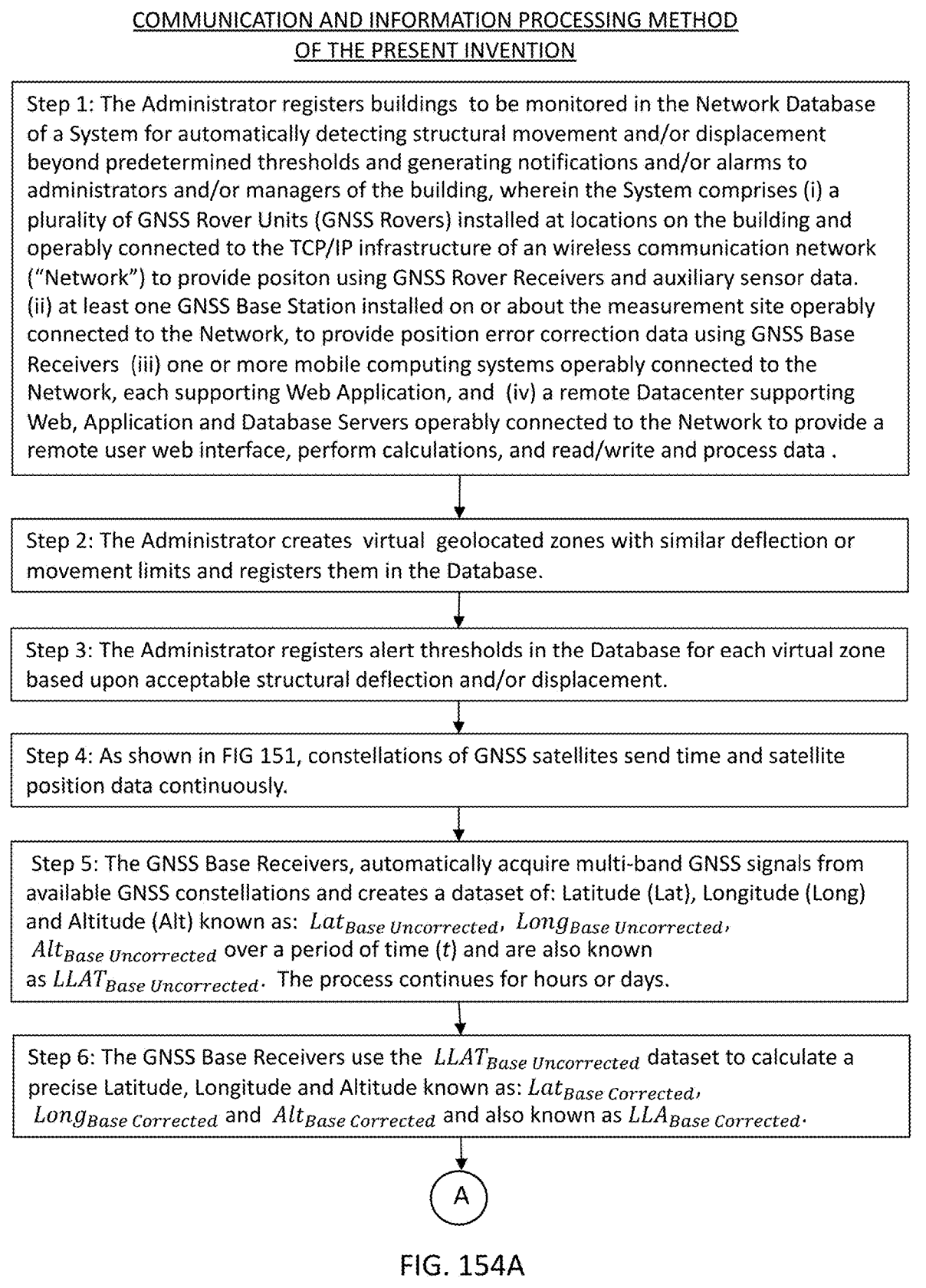

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, wherein the System comprises (i) a plurality of GNSS Rover Units (GNSS Rovers) installed at locations on the building and operably connected to the TCP/IP infrastructure of an wireless communication network ("Network") to provide positon using GNSS Rover Receivers and auxiliary sensor data. (ii) at least one GNSS Base Station installed on or about the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 151, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 154B:
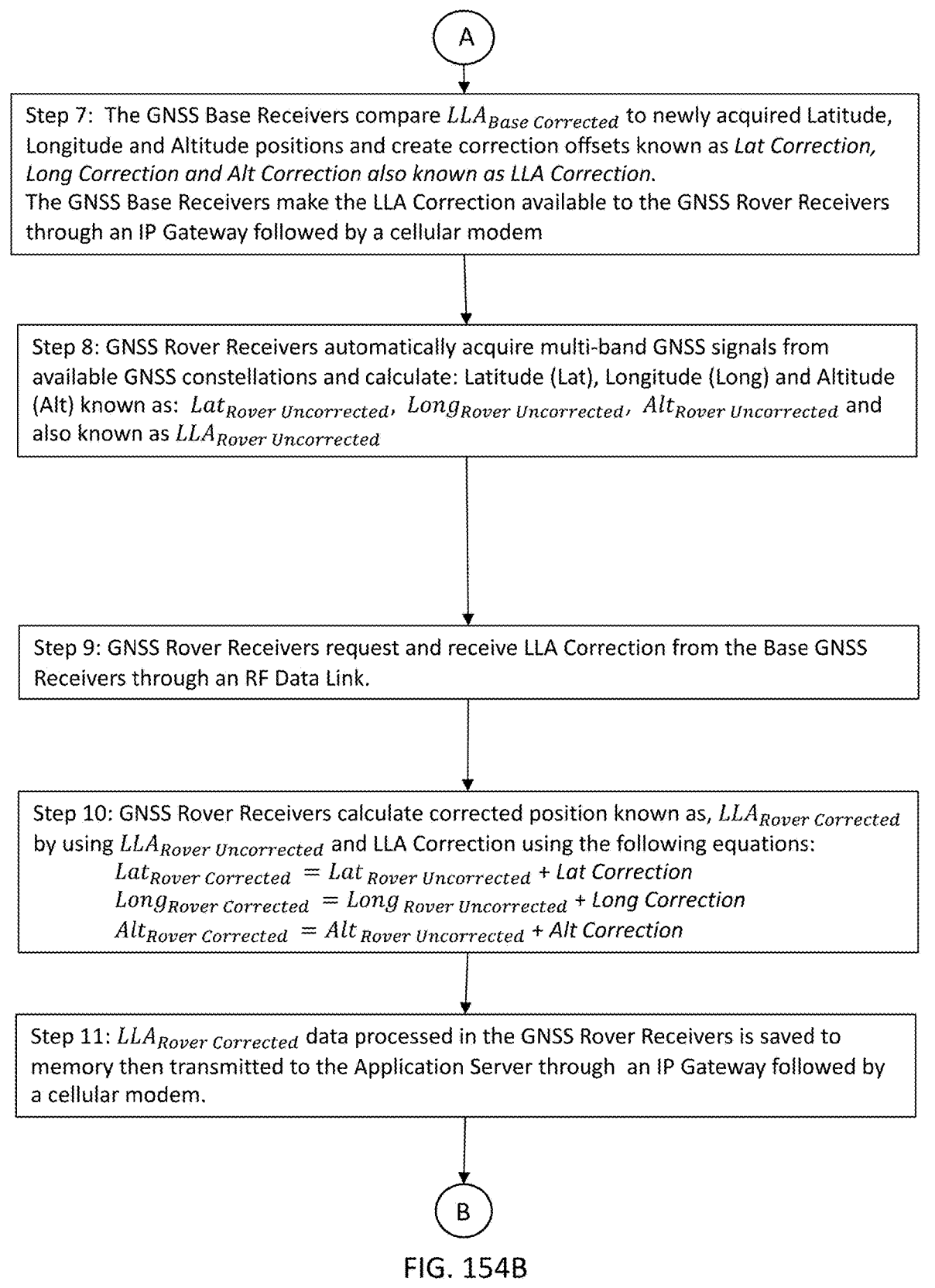

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers through an IP Gateway followed by a cellular modem Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: GNSS Rover Receivers request and receive LLA Correction from the Base GNSS Receivers through an RF Data Link.

Step 10: GNSS Rover Receivers calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 11: $LLA_{Rover\ Corrected}$ data processed in the GNSS Rover Receivers is saved to memory then transmitted to the Application Server through an IP Gateway followed by a cellular modem.

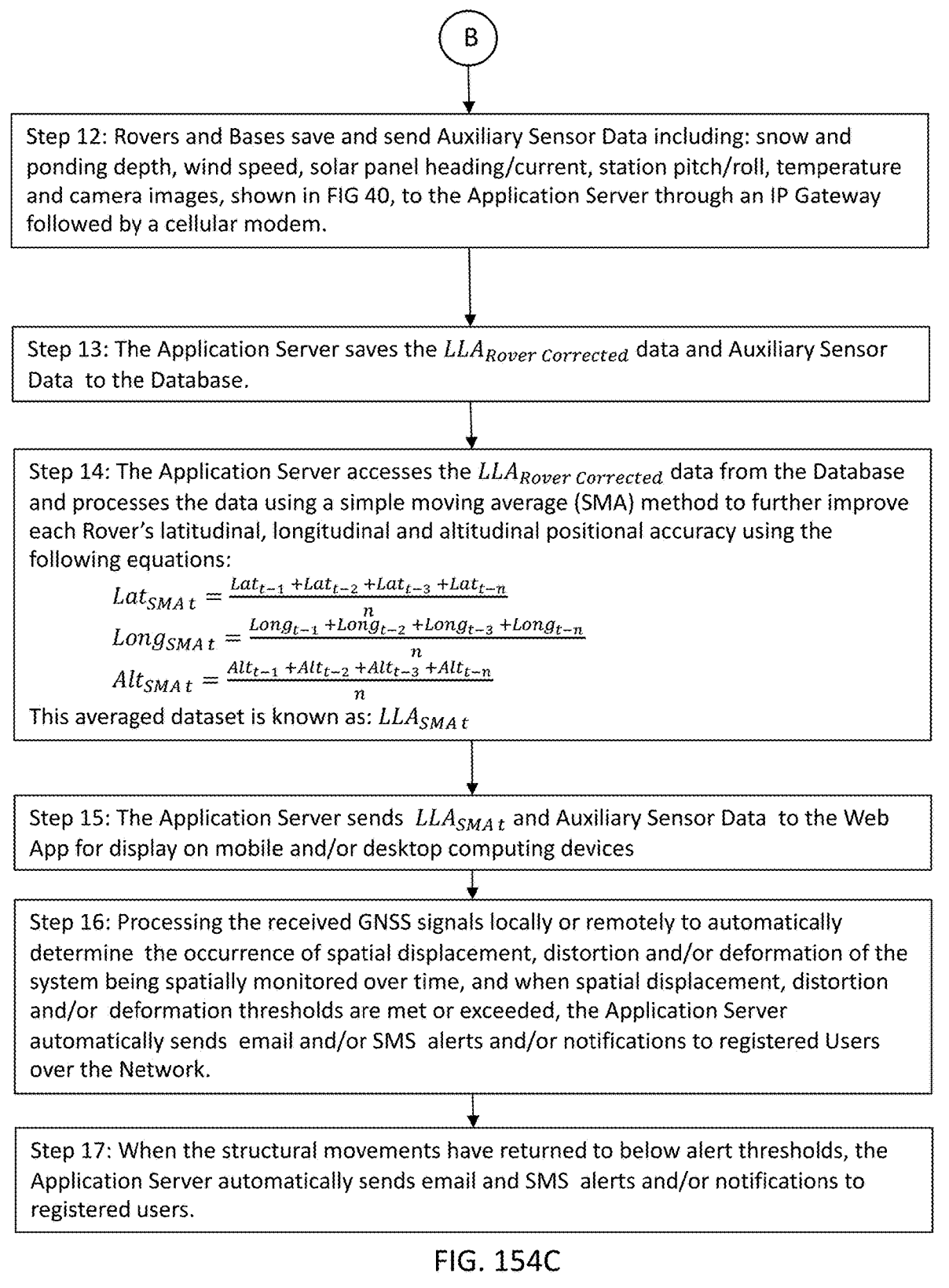

Step 12: Rovers and Bases save and send Auxiliary Sensor Data including: snow and ponding depth, wind speed, solar panel heading/current, station pitch/roll, temperature and camera images, shown in FIG 40, to the Application Server through an IP Gateway followed by a cellular modem.

Step 13: The Application Server saves the $LLA_{Rover\ Corrected}$ data and Auxiliary Sensor Data to the Database.

Step 14: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 15: The Application Server sends $LLA_{SMA\,t}$ and Auxiliary Sensor Data to the Web App for display on mobile and/or desktop computing devices Step 16: Processing the received GNSS signals locally or remotely to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the Network.

Step 17: When the structural movements have returned to below alert thresholds, the Application Server automatically sends email and SMS alerts and/or notifications to registered users.

FIG. 154C

Figure 158A:
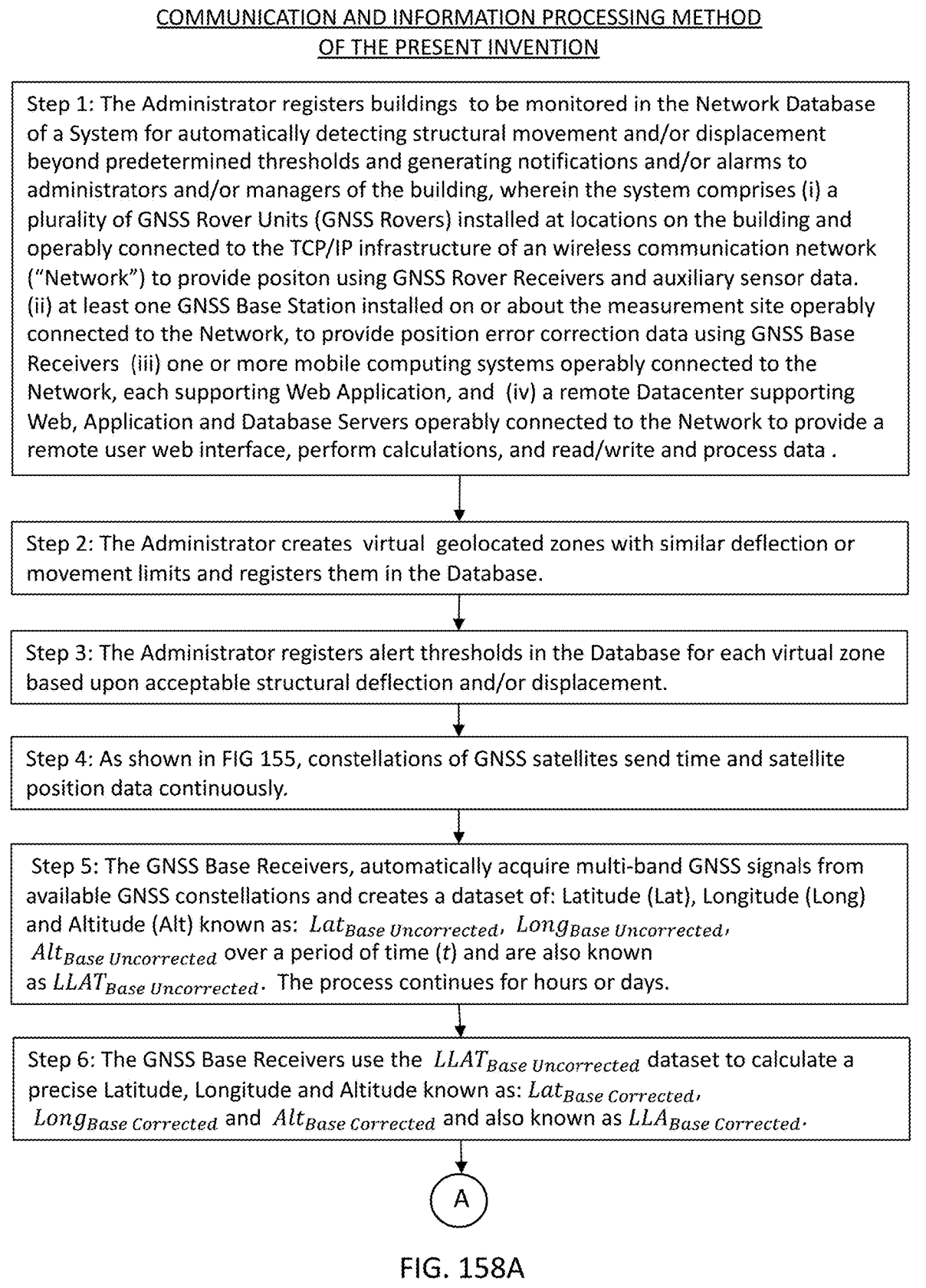

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, wherein the system comprises (i) a plurality of GNSS Rover Units (GNSS Rovers) installed at locations on the building and operably connected to the TCP/IP infrastructure of an wireless communication network ("Network") to provide positon using GNSS Rover Receivers and auxiliary sensor data. (ii) at least one GNSS Base Station installed on or about the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 155, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 158B:
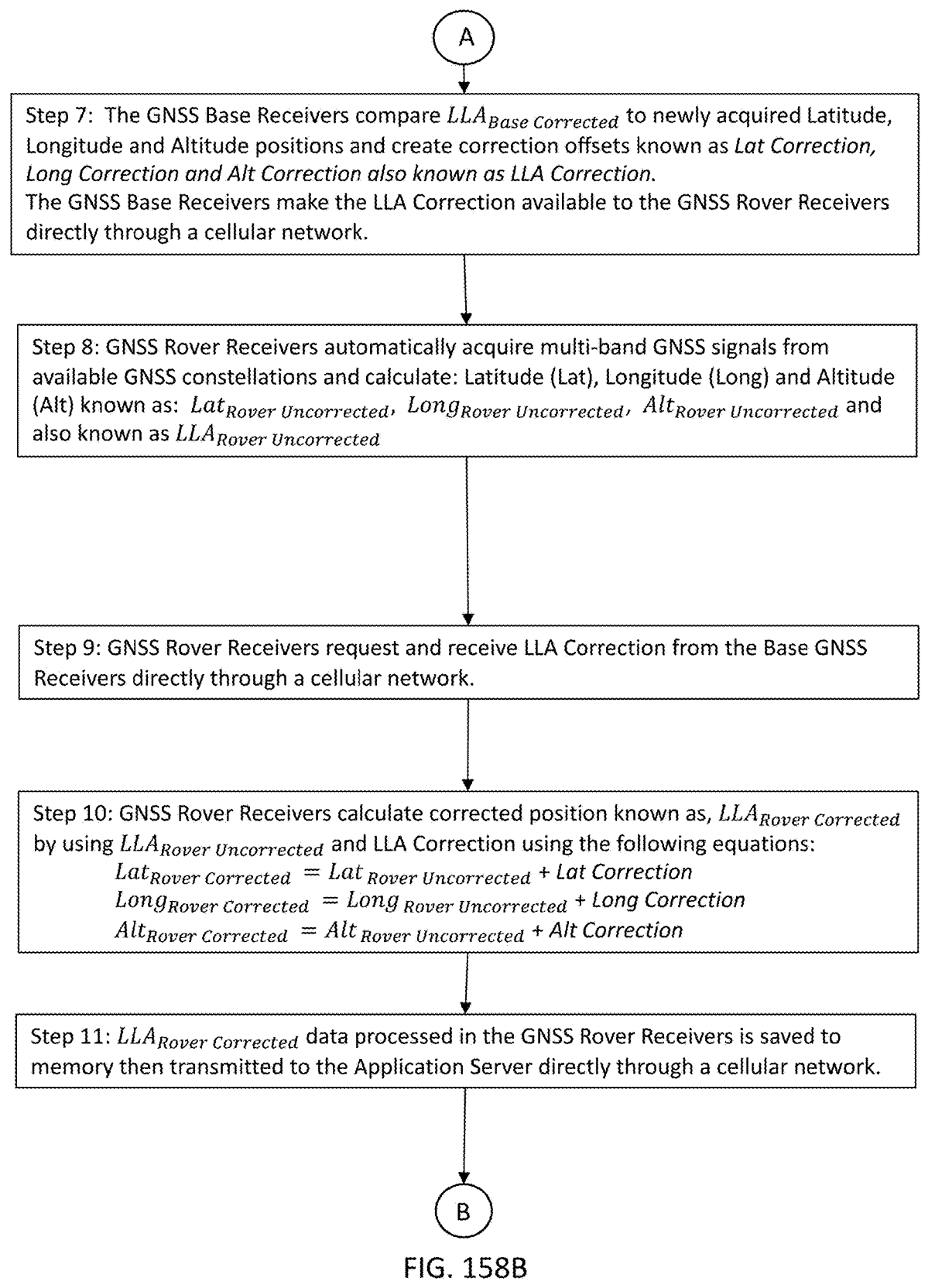

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers directly through a cellular network.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: GNSS Rover Receivers request and receive LLA Correction from the Base GNSS Receivers directly through a cellular network.

Step 10: GNSS Rover Receivers calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 11: $LLA_{Rover\ Corrected}$ data processed in the GNSS Rover Receivers is saved to memory then transmitted to the Application Server directly through a cellular network.

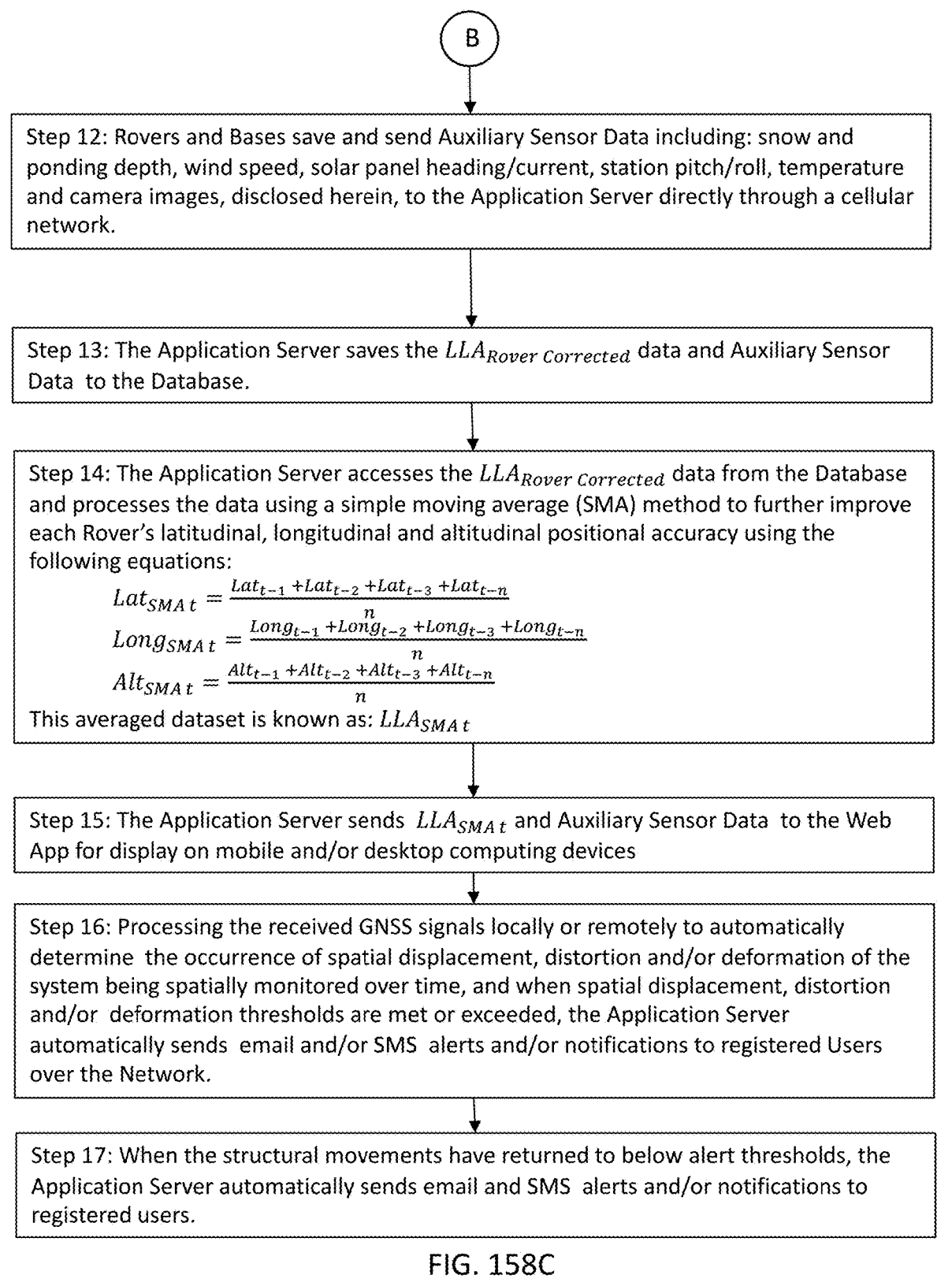

Step 12: Rovers and Bases save and send Auxiliary Sensor Data including: snow and ponding depth, wind speed, solar panel heading/current, station pitch/roll, temperature and camera images, disclosed herein, to the Application Server directly through a cellular network.

Step 13: The Application Server saves the $LLA_{Rover\ Corrected}$ data and Auxiliary Sensor Data to the Database.

Step 14: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 15: The Application Server sends $LLA_{SMA\,t}$ and Auxiliary Sensor Data to the Web App for display on mobile and/or desktop computing devices Step 16: Processing the received GNSS signals locally or remotely to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the Network.

Step 17: When the structural movements have returned to below alert thresholds, the Application Server automatically sends email and SMS alerts and/or notifications to registered users.

FIG. 158C

Figure 161A:
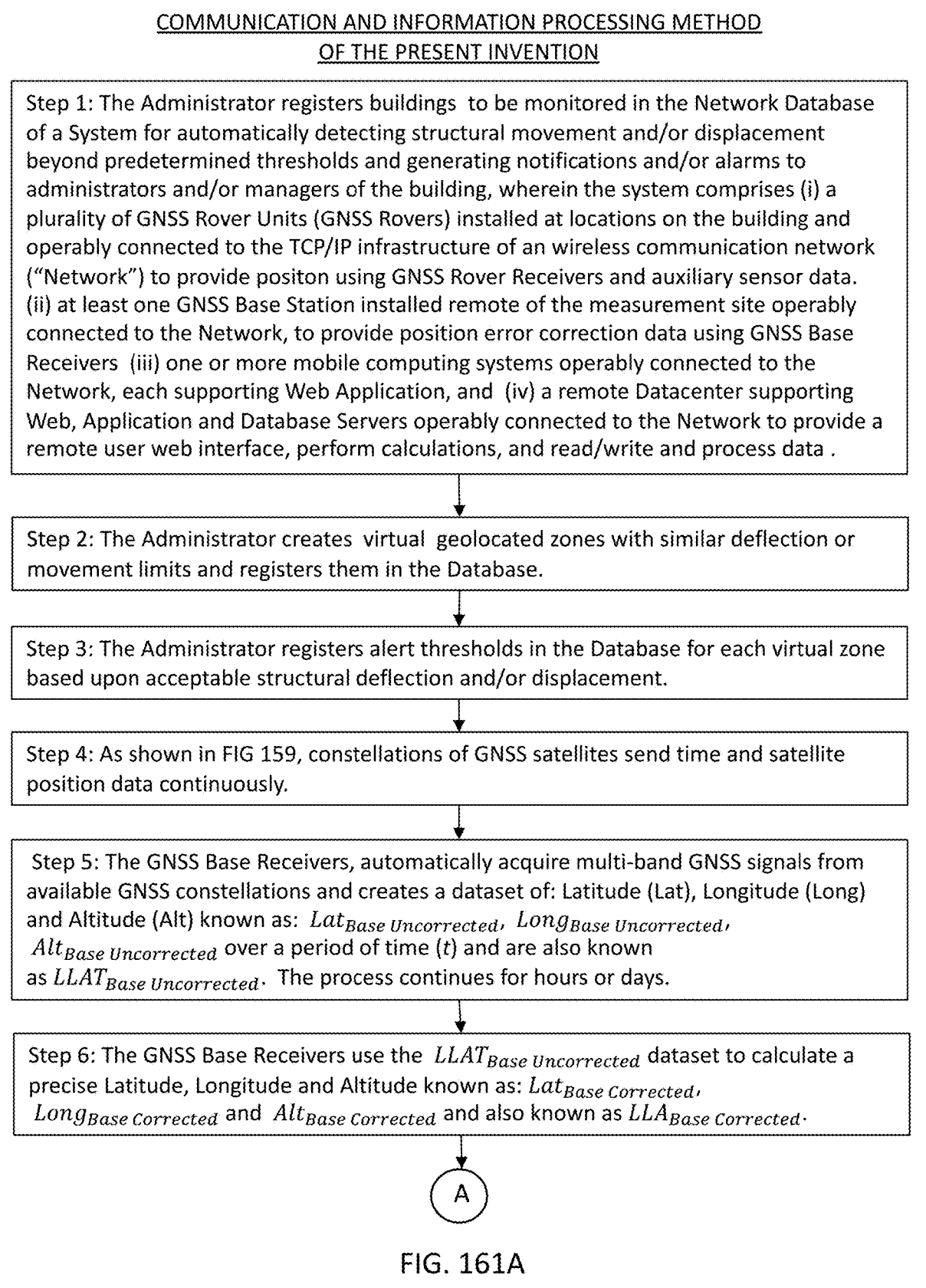

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, wherein the system comprises (i) a plurality of GNSS Rover Units (GNSS Rovers) installed at locations on the building and operably connected to the TCP/IP infrastructure of an wireless communication network ("Network") to provide positon using GNSS Rover Receivers and auxiliary sensor data. (ii) at least one GNSS Base Station installed remote of the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 159, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 161B:
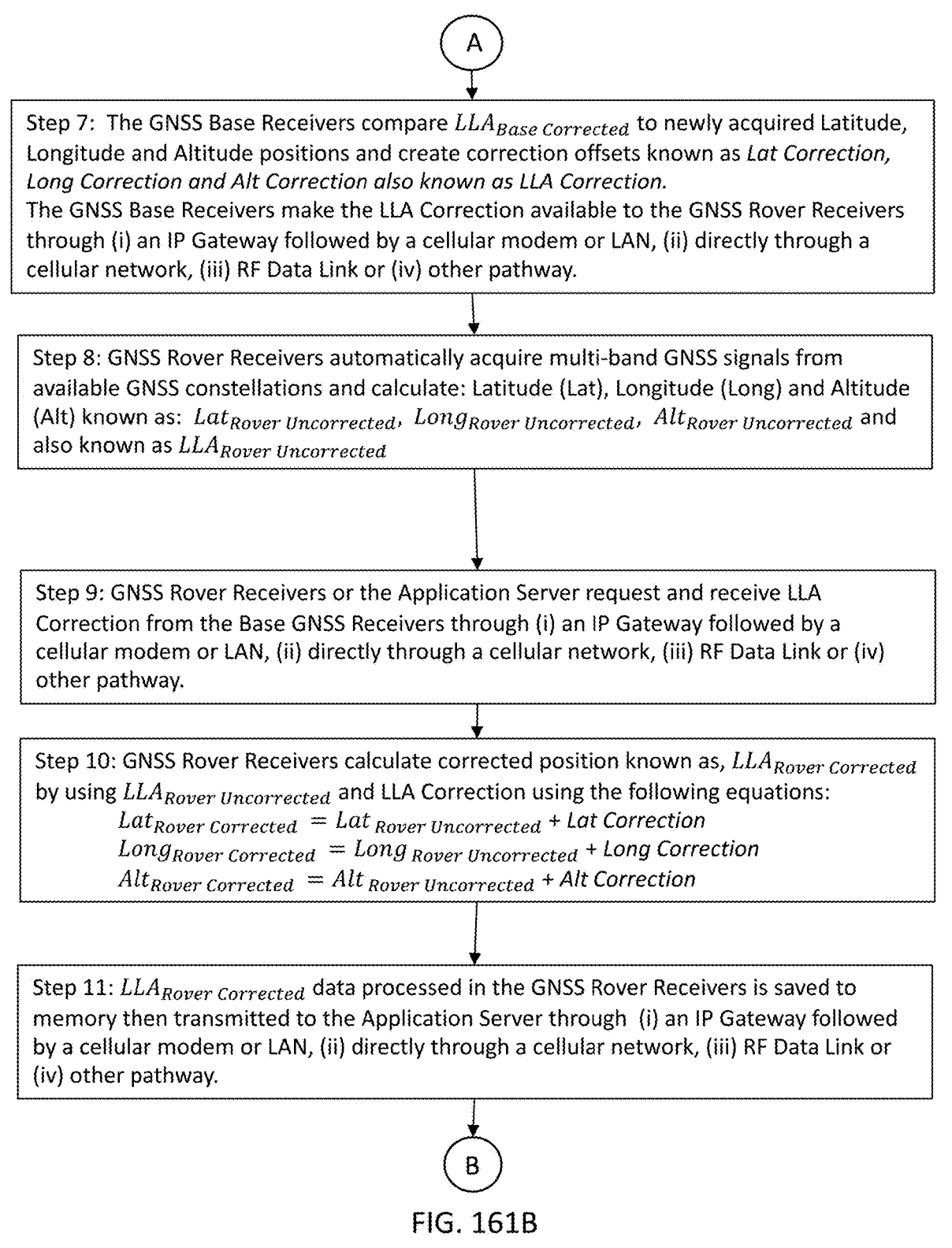

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 10: GNSS Rover Receivers calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 11: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

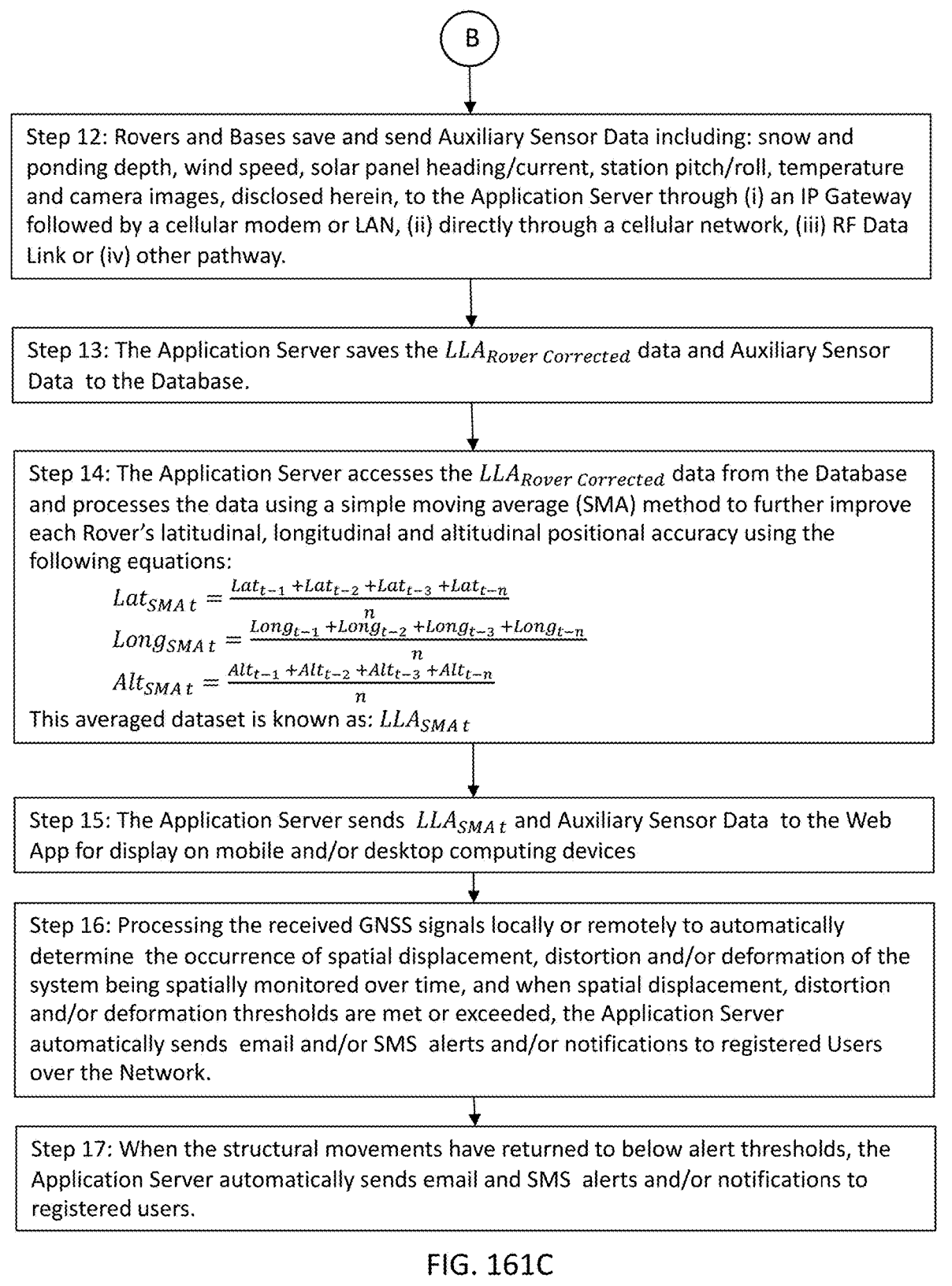

Step 12: Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

Step 13: The Application Server saves the $LLA_{Rover\ Corrected}$ data and Auxiliary Sensor Data to the Database.

Step 14: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\ t} = \frac{Lat_{t-1} + Lat_{t-2} + Lat_{t-3} + Lat_{t-n}}{n}$$

$$Long_{SMA\ t} = \frac{Long_{t-1} + Long_{t-2} + Long_{t-3} + Long_{t-n}}{n}$$

$$Alt_{SMA\ t} = \frac{Alt_{t-1} + Alt_{t-2} + Alt_{t-3} + Alt_{t-n}}{n}$$

This averaged dataset is known as: $LLA_{SMA\ t}$

Step 15: The Application Server sends $LLA_{SMA\ t}$ and Auxiliary Sensor Data to the Web App for display on mobile and/or desktop computing devices Step 16: Processing the received GNSS signals locally or remotely to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the Network.

Step 17: When the structural movements have returned to below alert thresholds, the Application Server automatically sends email and SMS alerts and/or notifications to registered users.

FIG. 161C

Figure 166A:
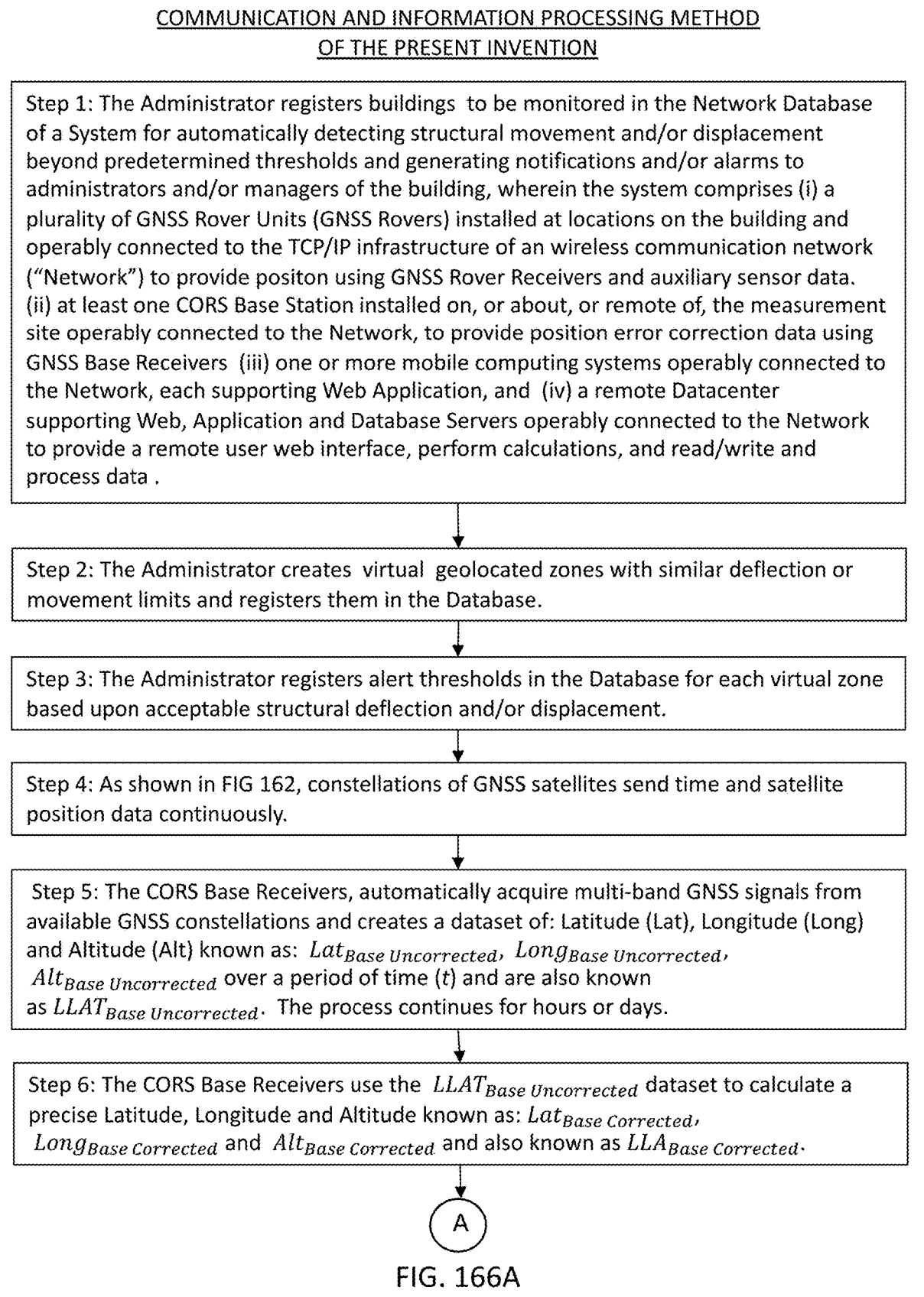

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, wherein the system comprises (i) a plurality of GNSS Rover Units (GNSS Rovers) installed at locations on the building and operably connected to the TCP/IP infrastructure of an wireless communication network ("Network") to provide positon using GNSS Rover Receivers and auxiliary sensor data. (ii) at least one CORS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 162, constellations of GNSS satellites send time and satellite position data continuously.

↓

Step 5: The CORS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The CORS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 166B:
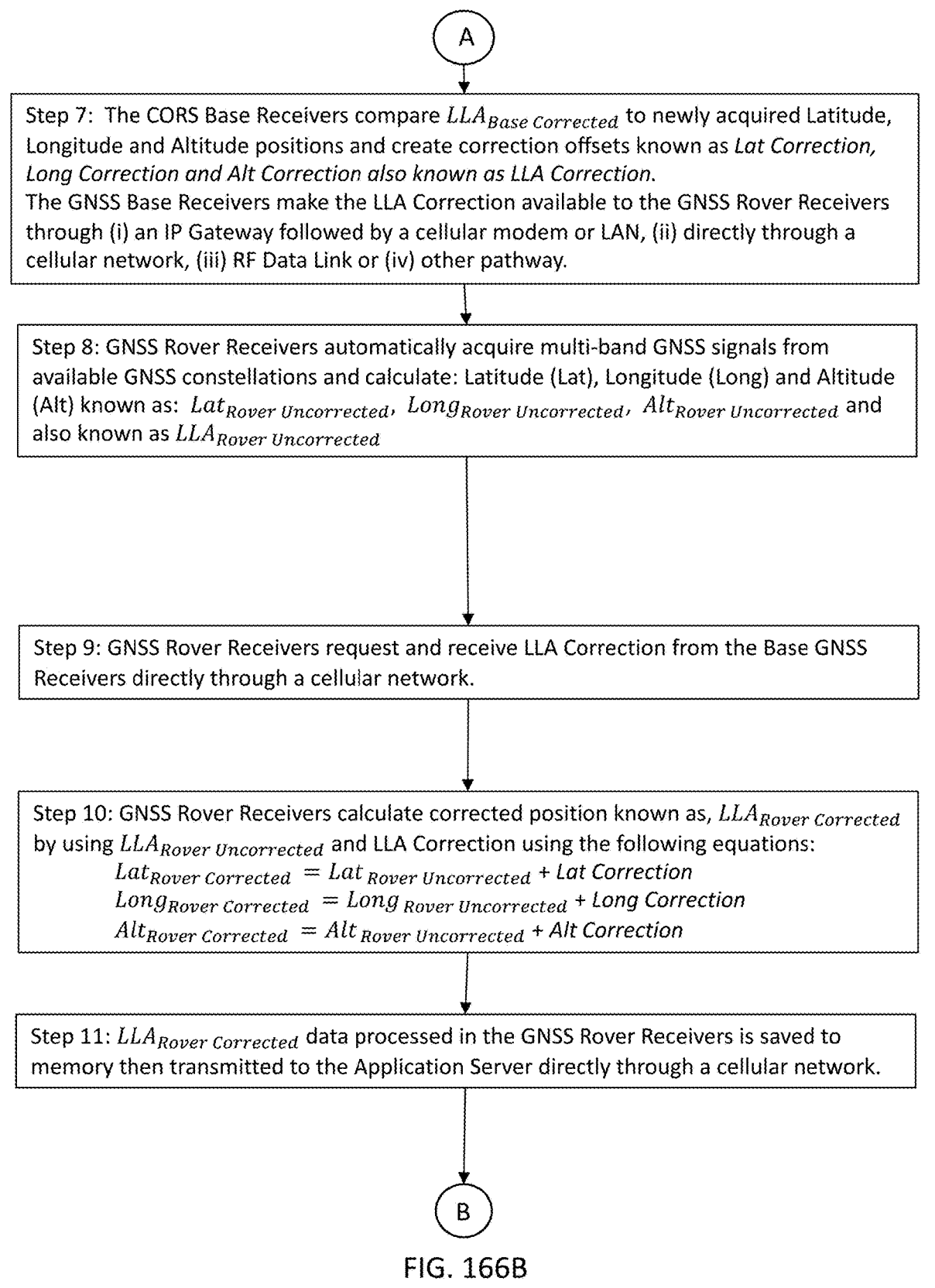

Step 7: The CORS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: GNSS Rover Receivers request and receive LLA Correction from the Base GNSS Receivers directly through a cellular network.

Step 10: GNSS Rover Receivers calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 11: $LLA_{Rover\ Corrected}$ data processed in the GNSS Rover Receivers is saved to memory then transmitted to the Application Server directly through a cellular network.

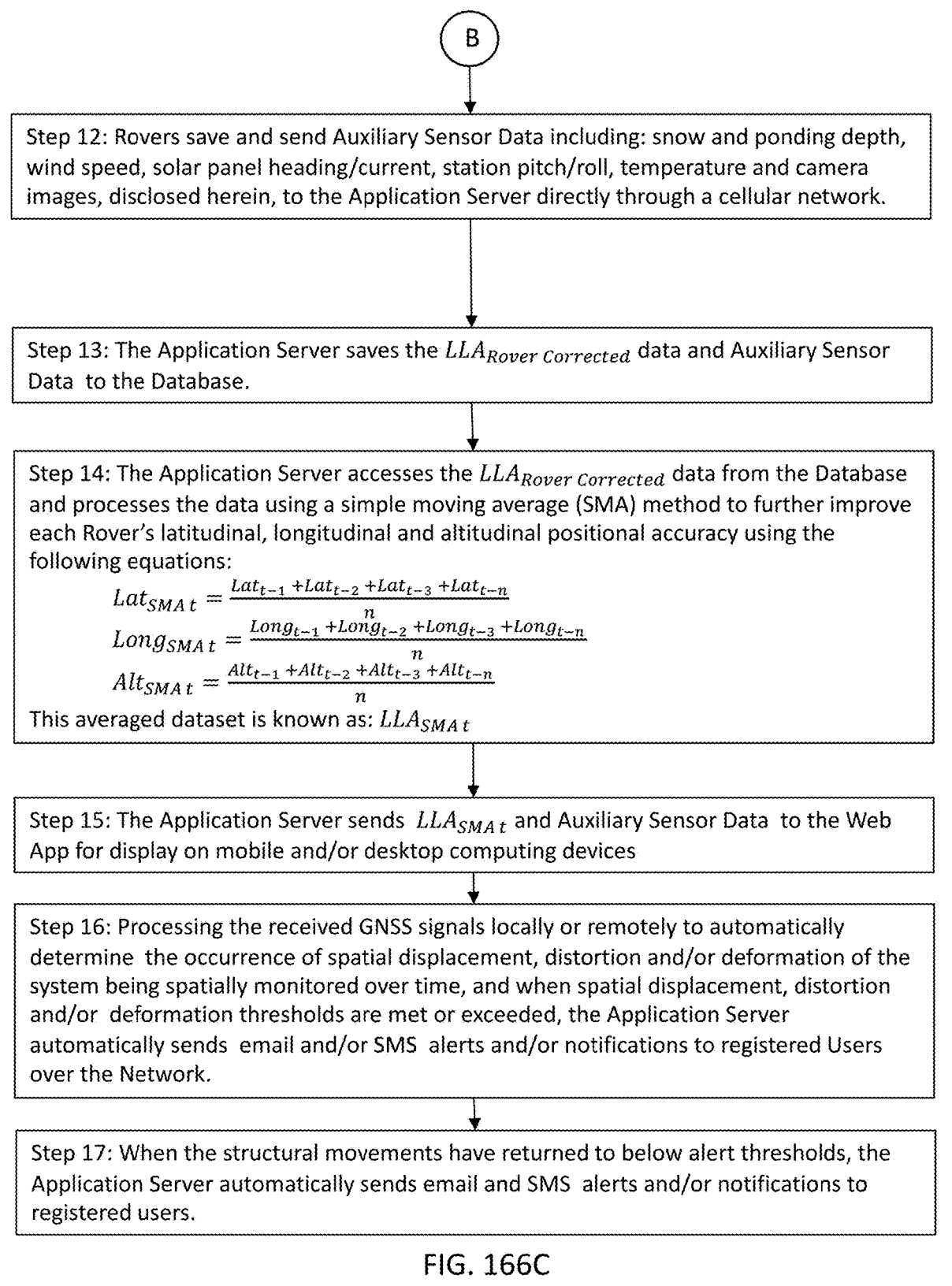

Step 12: Rovers save and send Auxiliary Sensor Data including: snow and ponding depth, wind speed, solar panel heading/current, station pitch/roll, temperature and camera images, disclosed herein, to the Application Server directly through a cellular network.

Step 13: The Application Server saves the $LLA_{Rover\ Corrected}$ data and Auxiliary Sensor Data to the Database.

Step 14: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 15: The Application Server sends $LLA_{SMA\,t}$ and Auxiliary Sensor Data to the Web App for display on mobile and/or desktop computing devices Step 16: Processing the received GNSS signals locally or remotely to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the Network.

Step 17: When the structural movements have returned to below alert thresholds, the Application Server automatically sends email and SMS alerts and/or notifications to registered users.

FIG. 166C

Figure 171A:
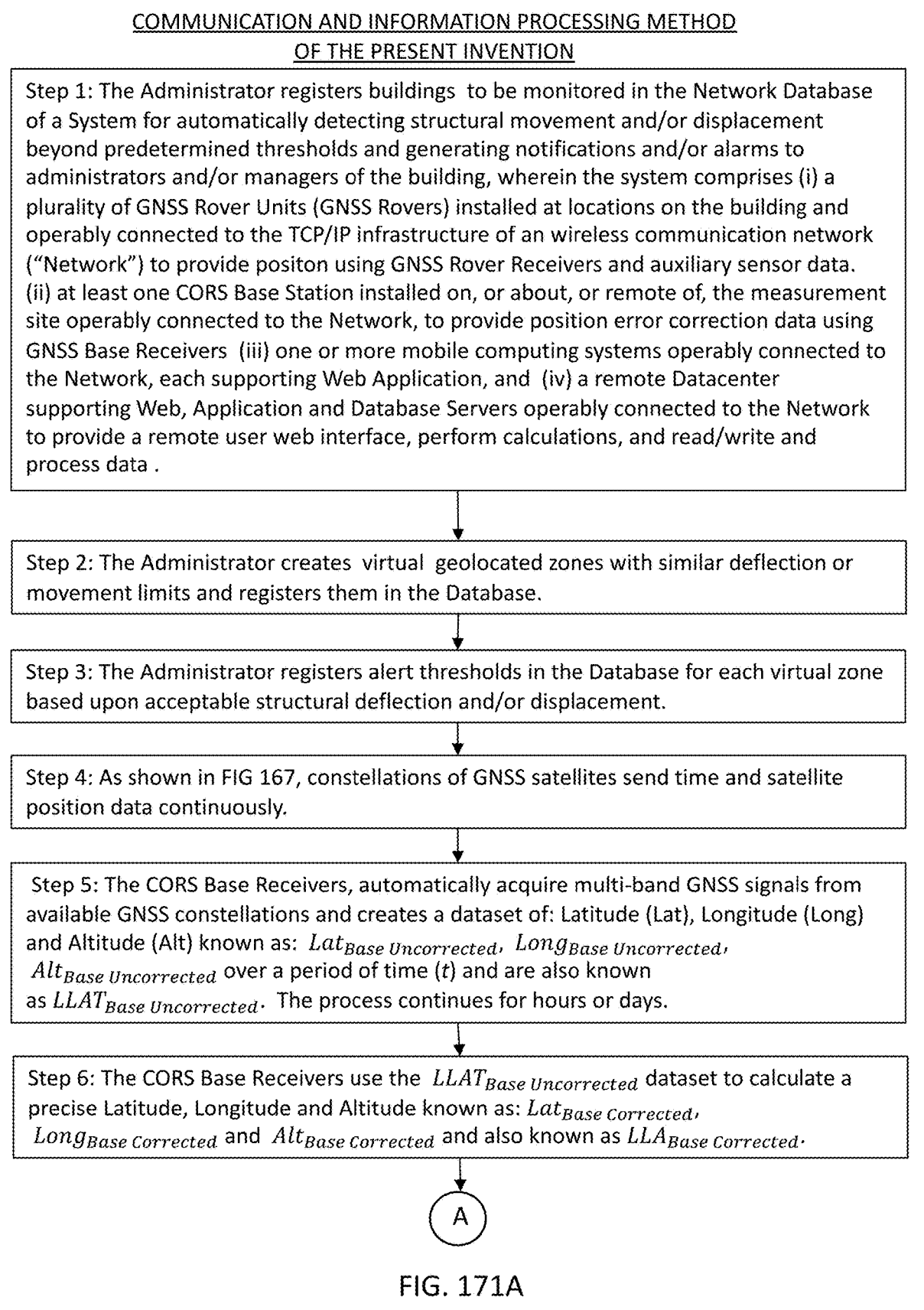

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, wherein the system comprises (i) a plurality of GNSS Rover Units (GNSS Rovers) installed at locations on the building and operably connected to the TCP/IP infrastructure of an wireless communication network ("Network") to provide positon using GNSS Rover Receivers and auxiliary sensor data. (ii) at least one CORS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 167, constellations of GNSS satellites send time and satellite position data continuously.

↓

Step 5: The CORS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The CORS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

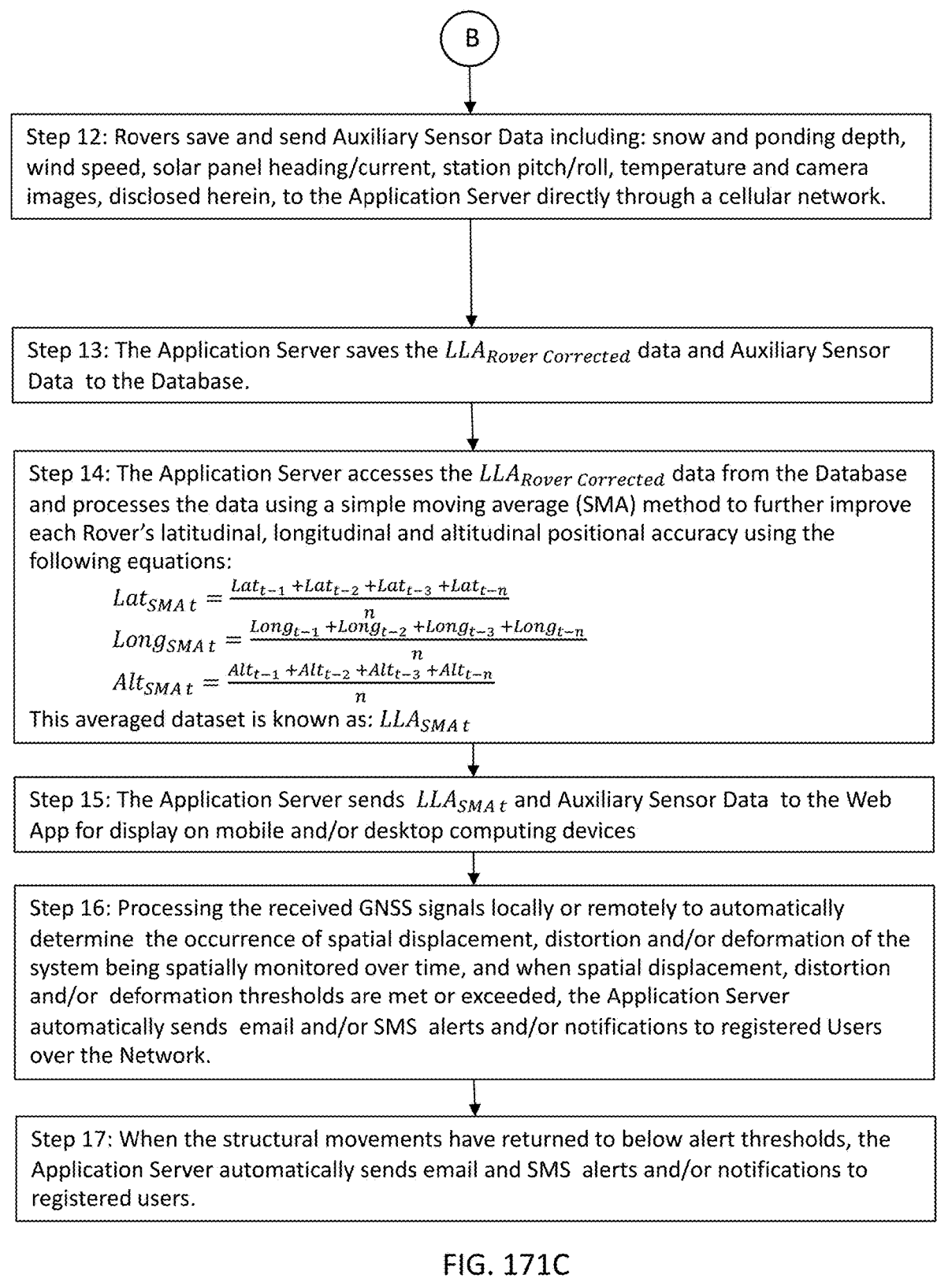

Step 12: Rovers save and send Auxiliary Sensor Data including: snow and ponding depth, wind speed, solar panel heading/current, station pitch/roll, temperature and camera images, disclosed herein, to the Application Server directly through a cellular network.

Step 13: The Application Server saves the $LLA_{Rover\ Corrected}$ data and Auxiliary Sensor Data to the Database.

Step 14: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 15: The Application Server sends $LLA_{SMA\,t}$ and Auxiliary Sensor Data to the Web App for display on mobile and/or desktop computing devices Step 16: Processing the received GNSS signals locally or remotely to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the Network.

Step 17: When the structural movements have returned to below alert thresholds, the Application Server automatically sends email and SMS alerts and/or notifications to registered users.

FIG. 171C

Figure 178A:
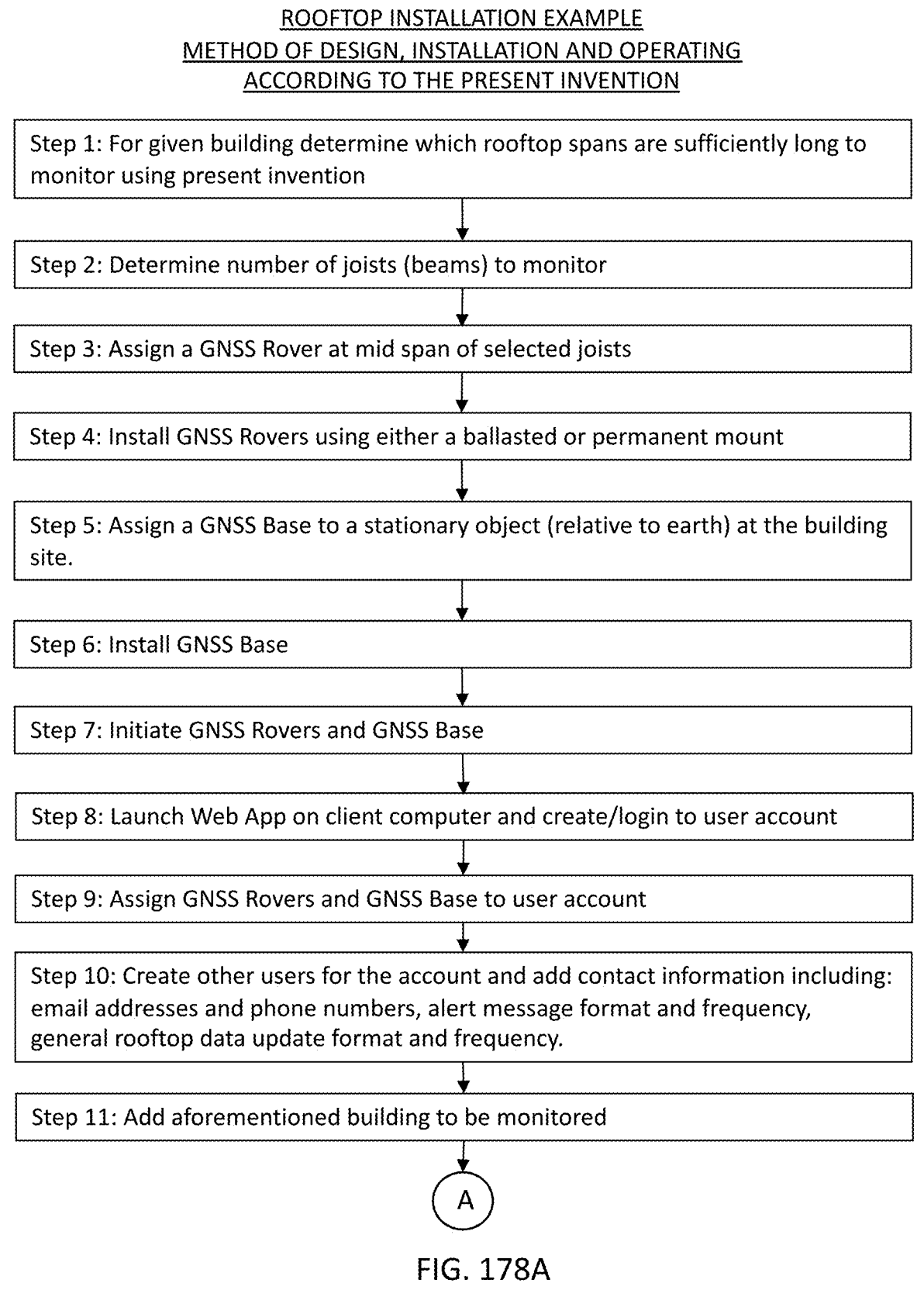

ROOFTOP INSTALLATION EXAMPLE
METHOD OF DESIGN, INSTALLATION AND OPERATING
ACCORDING TO THE PRESENT INVENTION

Step 1: For given building determine which rooftop spans are sufficiently long to monitor using present invention

↓

Step 2: Determine number of joists (beams) to monitor

↓

Step 3: Assign a GNSS Rover at mid span of selected joists

↓

Step 4: Install GNSS Rovers using either a ballasted or permanent mount

↓

Step 5: Assign a GNSS Base to a stationary object (relative to earth) at the building site.

↓

Step 6: Install GNSS Base

↓

Step 7: Initiate GNSS Rovers and GNSS Base

↓

Step 8: Launch Web App on client computer and create/login to user account

↓

Step 9: Assign GNSS Rovers and GNSS Base to user account

↓

Step 10: Create other users for the account and add contact information including: email addresses and phone numbers, alert message format and frequency, general rooftop data update format and frequency.

↓

Step 11: Add aforementioned building to be monitored

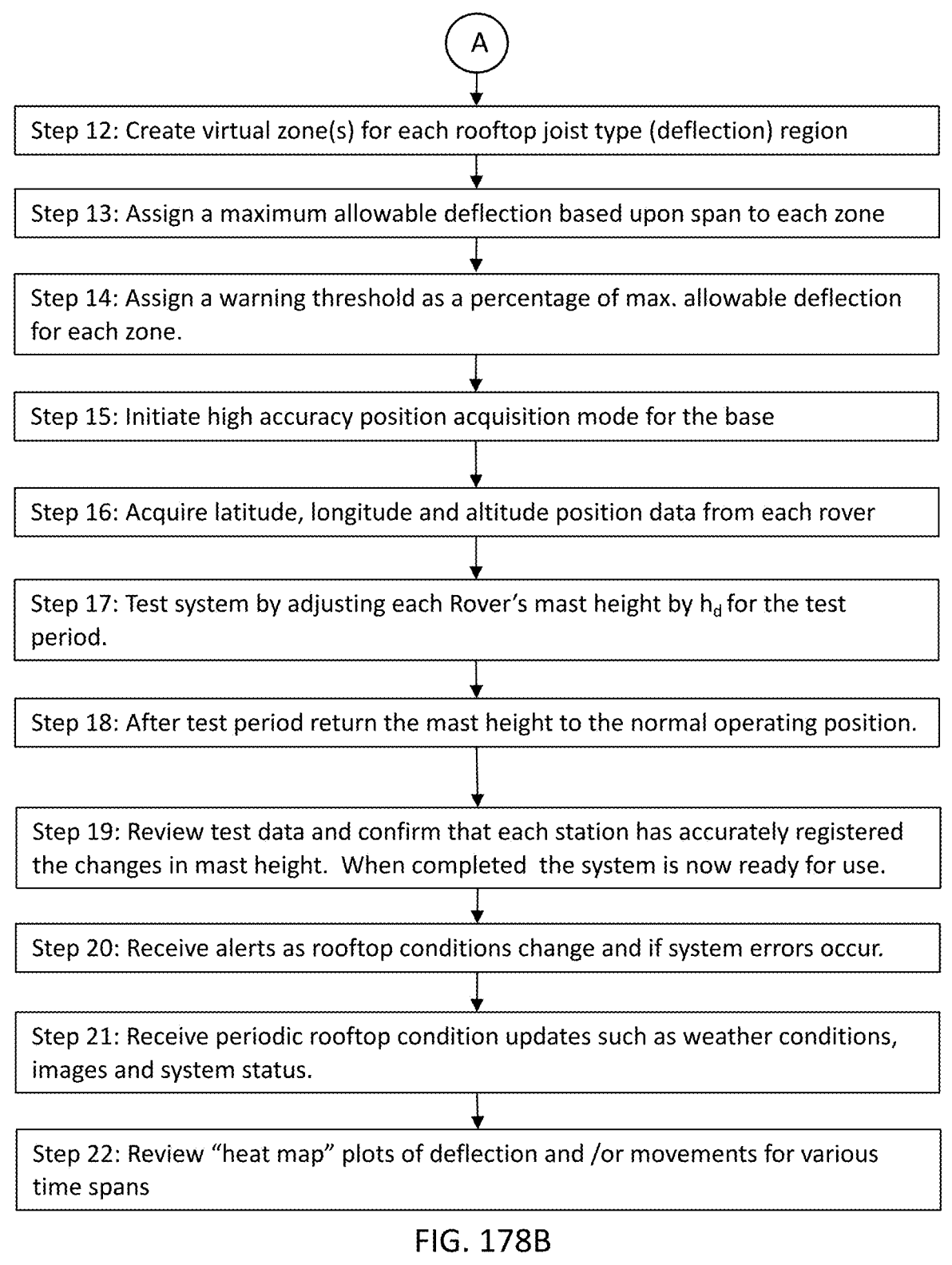

Step 12: Create virtual zone(s) for each rooftop joist type (deflection) region

Step 13: Assign a maximum allowable deflection based upon span to each zone

Step 14: Assign a warning threshold as a percentage of max. allowable deflection for each zone.

Step 15: Initiate high accuracy position acquisition mode for the base

Step 16: Acquire latitude, longitude and altitude position data from each rover

Step 17: Test system by adjusting each Rover's mast height by $h_d$ for the test period.

Step 18: After test period return the mast height to the normal operating position.

Step 19: Review test data and confirm that each station has accurately registered the changes in mast height. When completed the system is now ready for use.

Step 20: Receive alerts as rooftop conditions change and if system errors occur.

Step 21: Receive periodic rooftop condition updates such as weather conditions, images and system status.

Step 22: Review "heat map" plots of deflection and /or movements for various time spans

FIG. 178B

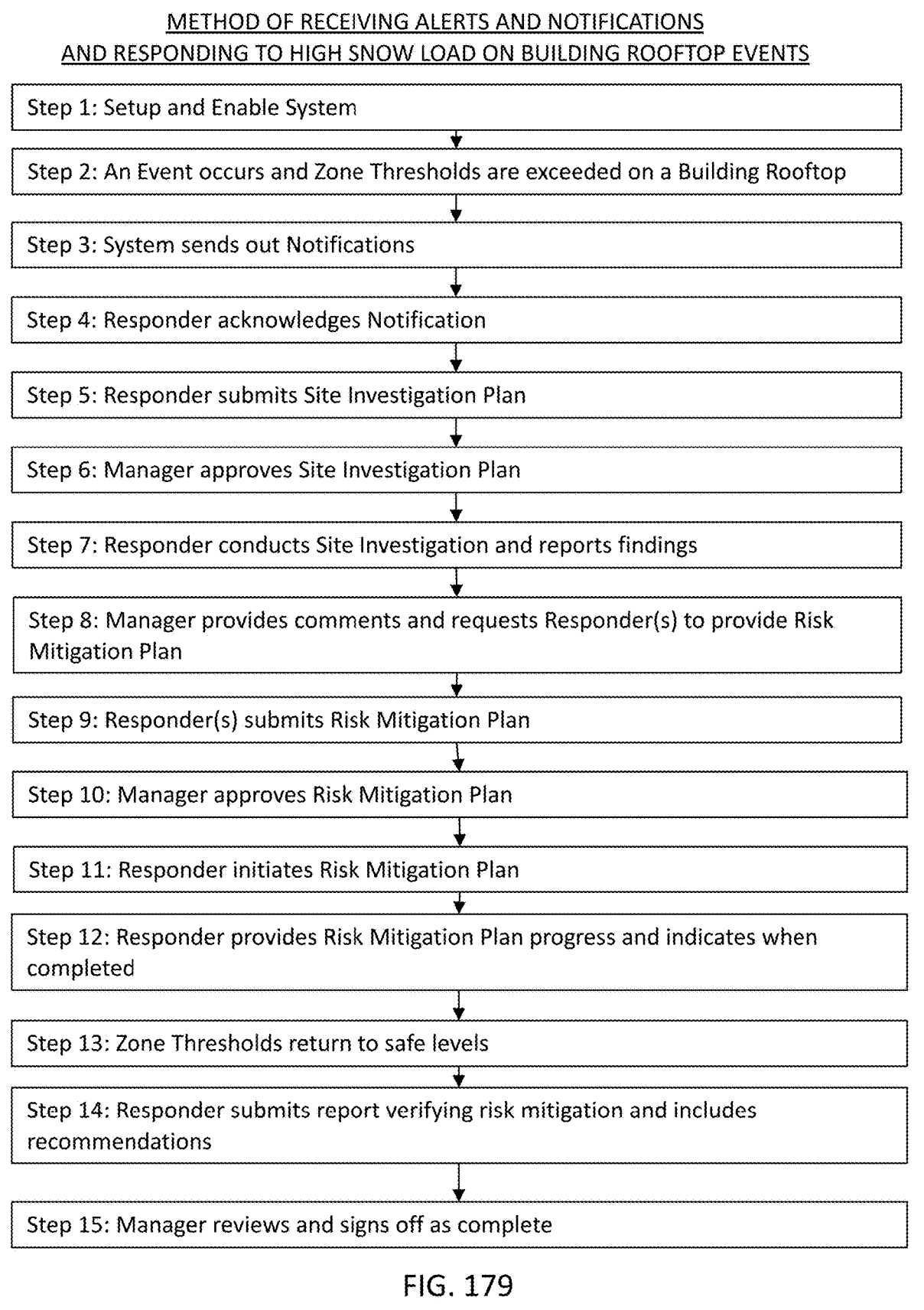

METHOD OF RECEIVING ALERTS AND NOTIFICATIONS
AND RESPONDING TO HIGH SNOW LOAD ON BUILDING ROOFTOP EVENTS

Step 1: Setup and Enable System

↓

Step 2: An Event occurs and Zone Thresholds are exceeded on a Building Rooftop

↓

Step 3: System sends out Notifications

↓

Step 4: Responder acknowledges Notification

↓

Step 5: Responder submits Site Investigation Plan

↓

Step 6: Manager approves Site Investigation Plan

↓

Step 7: Responder conducts Site Investigation and reports findings

↓

Step 8: Manager provides comments and requests Responder(s) to provide Risk Mitigation Plan

↓

Step 9: Responder(s) submits Risk Mitigation Plan

↓

Step 10: Manager approves Risk Mitigation Plan

↓

Step 11: Responder initiates Risk Mitigation Plan

↓

Step 12: Responder provides Risk Mitigation Plan progress and indicates when completed

↓

Step 13: Zone Thresholds return to safe levels

↓

Step 14: Responder submits report verifying risk mitigation and includes recommendations

↓

Step 15: Manager reviews and signs off as complete

FIG. 179

L/240 IS THE TYPICAL DEFLECTION LIMIT FOR SNOW AND PONDING LOADS FOR STRUCTURAL CEILING JOISTS

Figure 192A:
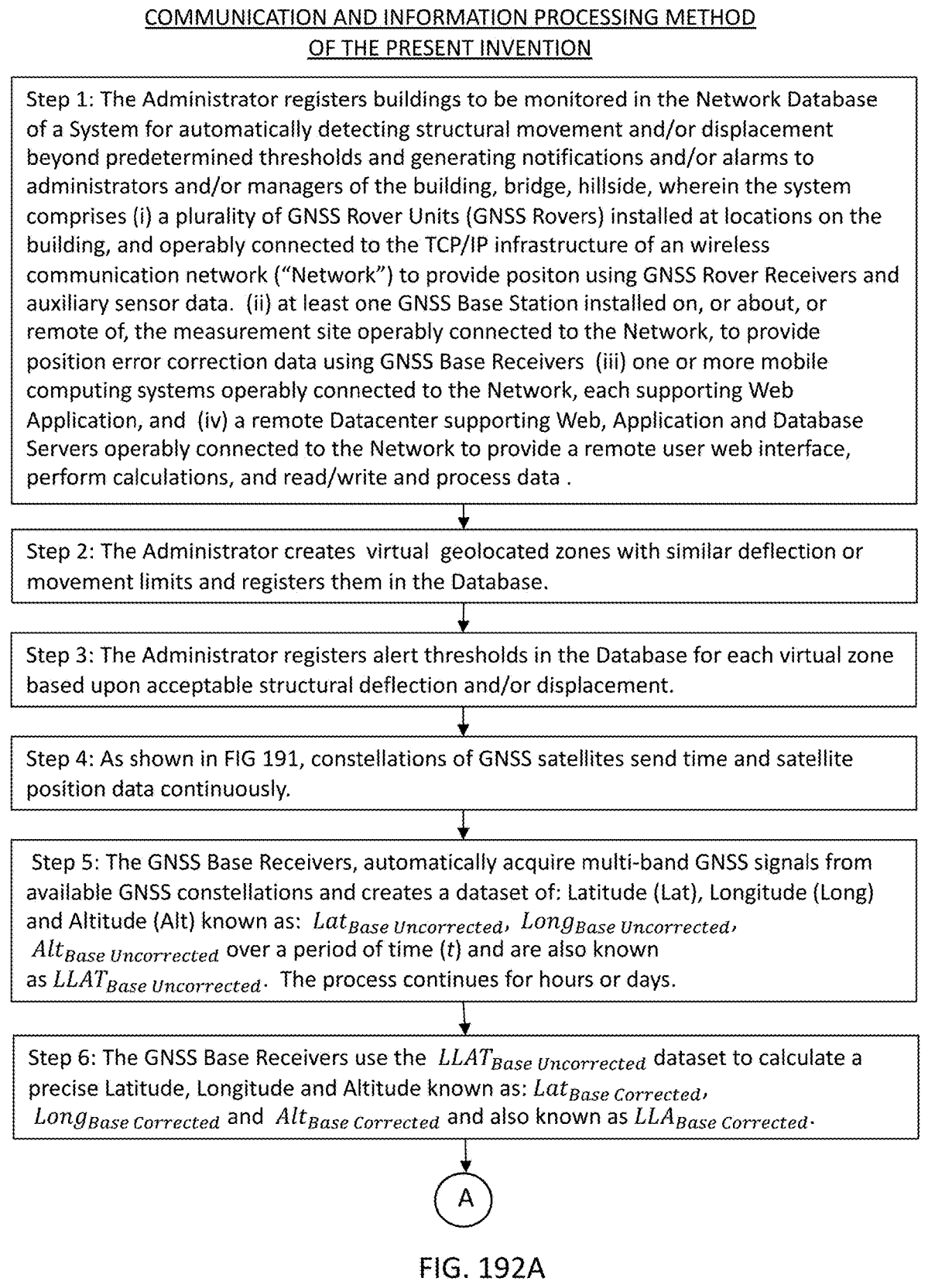

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, bridge, hillside, wherein the system comprises (i) a plurality of GNSS Rover Units (GNSS Rovers) installed at locations on the building, and operably connected to the TCP/IP infrastructure of an wireless communication network ("Network") to provide positon using GNSS Rover Receivers and auxiliary sensor data. (ii) at least one GNSS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 191, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 192B:
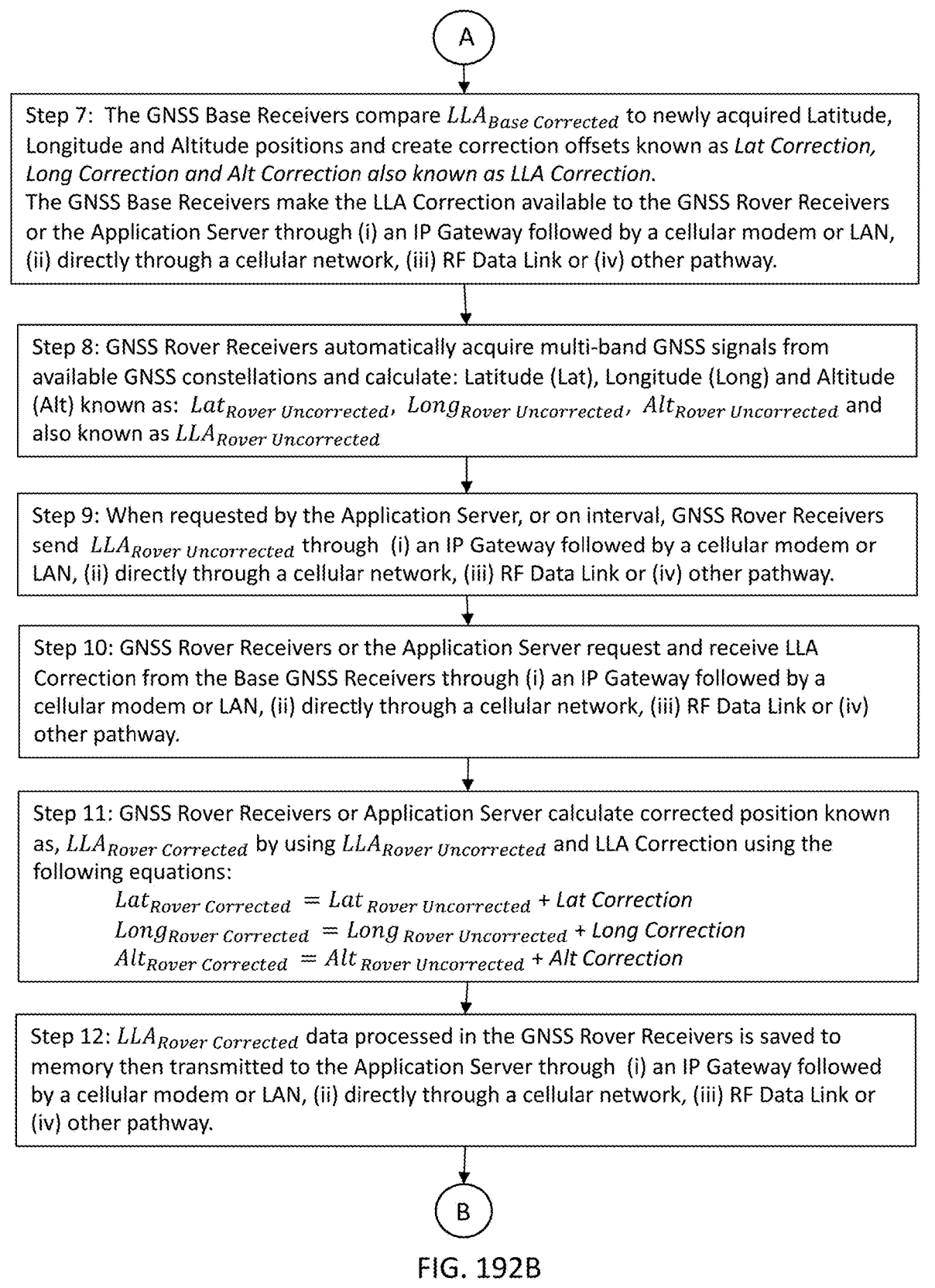

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: When requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

Step 10: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 11: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 12: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

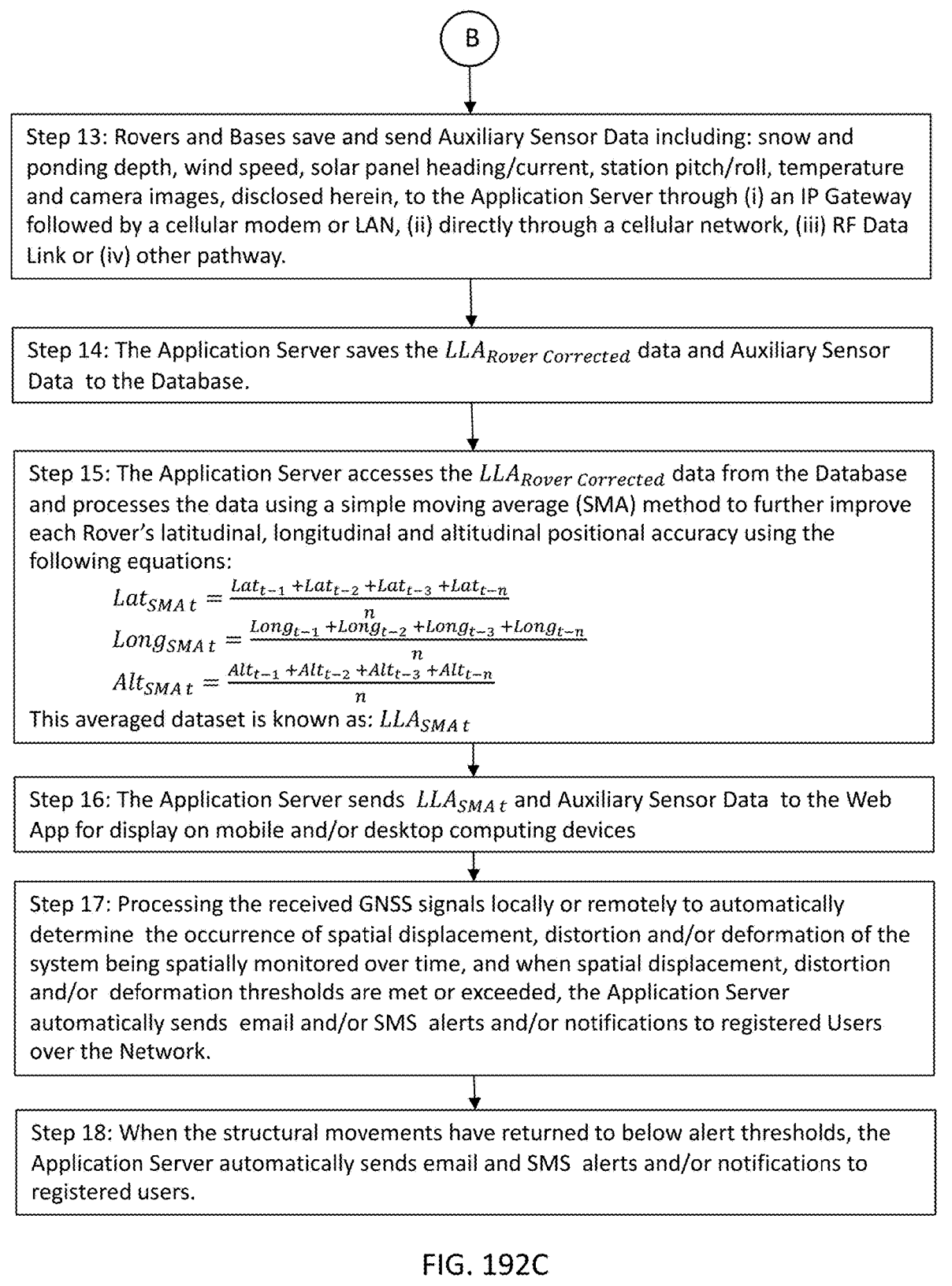

Step 13: Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

Step 14: The Application Server saves the $LLA_{Rover\ Corrected}$ data and Auxiliary Sensor Data to the Database.

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\ t} = \frac{Lat_{t-1} + Lat_{t-2} + Lat_{t-3} + Lat_{t-n}}{n}$$

$$Long_{SMA\ t} = \frac{Long_{t-1} + Long_{t-2} + Long_{t-3} + Long_{t-n}}{n}$$

$$Alt_{SMA\ t} = \frac{Alt_{t-1} + Alt_{t-2} + Alt_{t-3} + Alt_{t-n}}{n}$$

This averaged dataset is known as: $LLA_{SMA\ t}$

Step 16: The Application Server sends $LLA_{SMA\ t}$ and Auxiliary Sensor Data to the Web App for display on mobile and/or desktop computing devices Step 17: Processing the received GNSS signals locally or remotely to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the Network.

Step 18: When the structural movements have returned to below alert thresholds, the Application Server automatically sends email and SMS alerts and/or notifications to registered users.

FIG. 192C

MONITORING STRUCTURAL DEFLECTION RESPONSE USING SYSTEM OF PRESENT INVENTION OPERATING IN PONDING MONITORING AND ALERT MODE

Figure 197A:
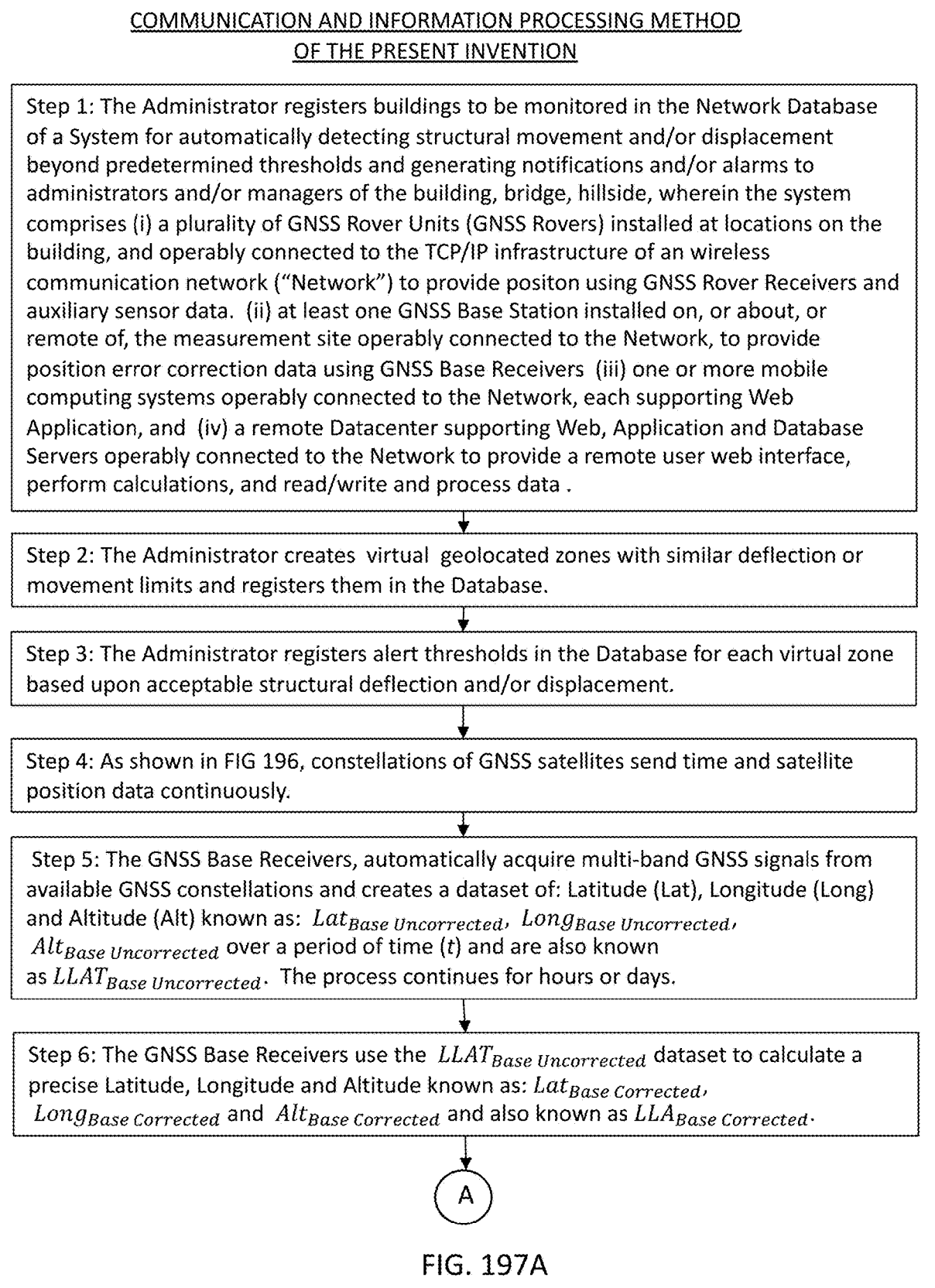

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, bridge, hillside, wherein the system comprises (i) a plurality of GNSS Rover Units (GNSS Rovers) installed at locations on the building, and operably connected to the TCP/IP infrastructure of an wireless communication network ("Network") to provide positon using GNSS Rover Receivers and auxiliary sensor data. (ii) at least one GNSS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 196, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 197B:
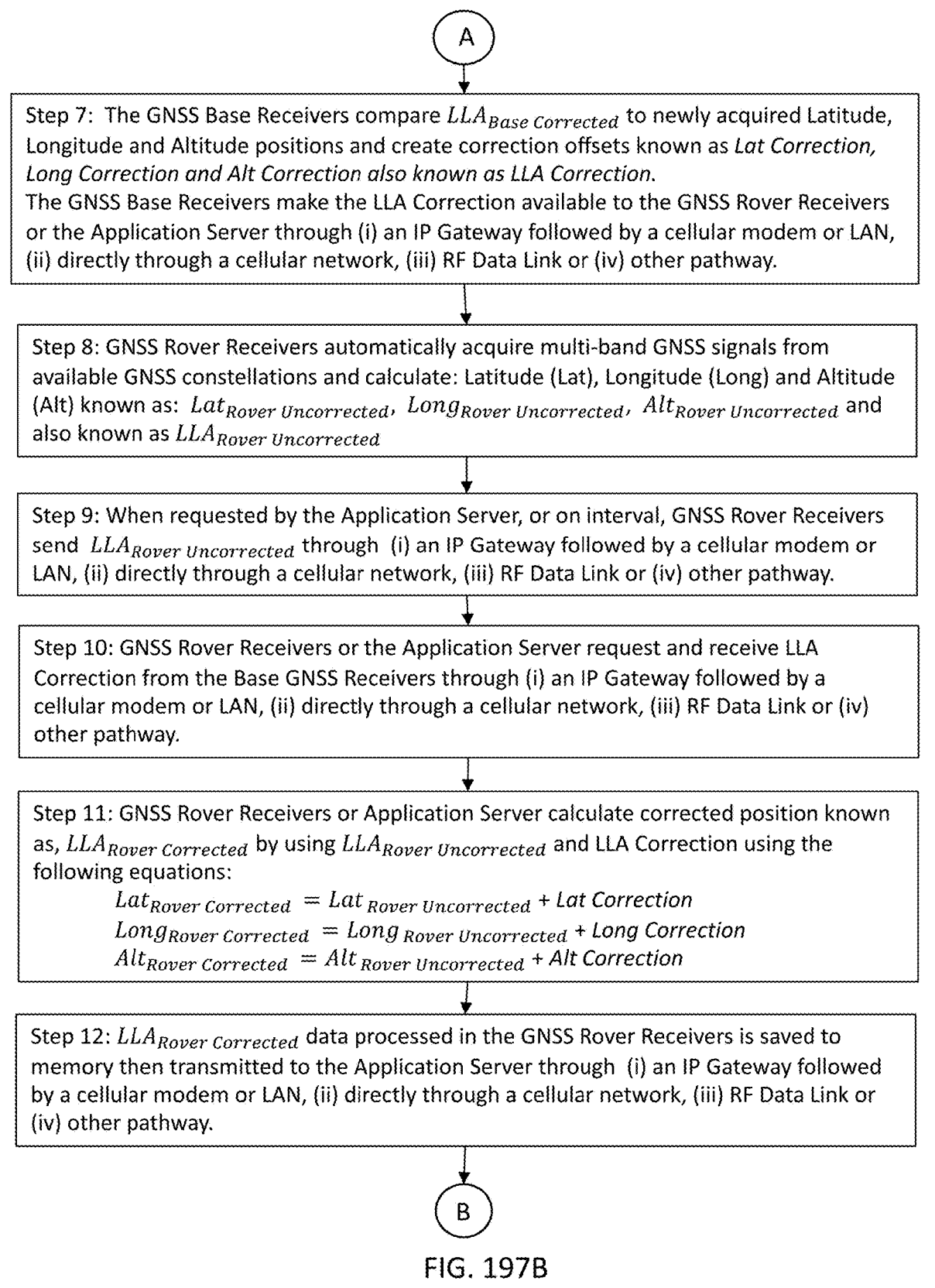

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: When requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

Step 10: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 11: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + \textit{Lat Correction}$$
$$Long_{Rover\ Corrected} = Long_{Rover\ Uncorrected} + \textit{Long Correction}$$
$$Alt_{Rover\ Corrected} = Alt_{Rover\ Uncorrected} + \textit{Alt Correction}$$

Step 12: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

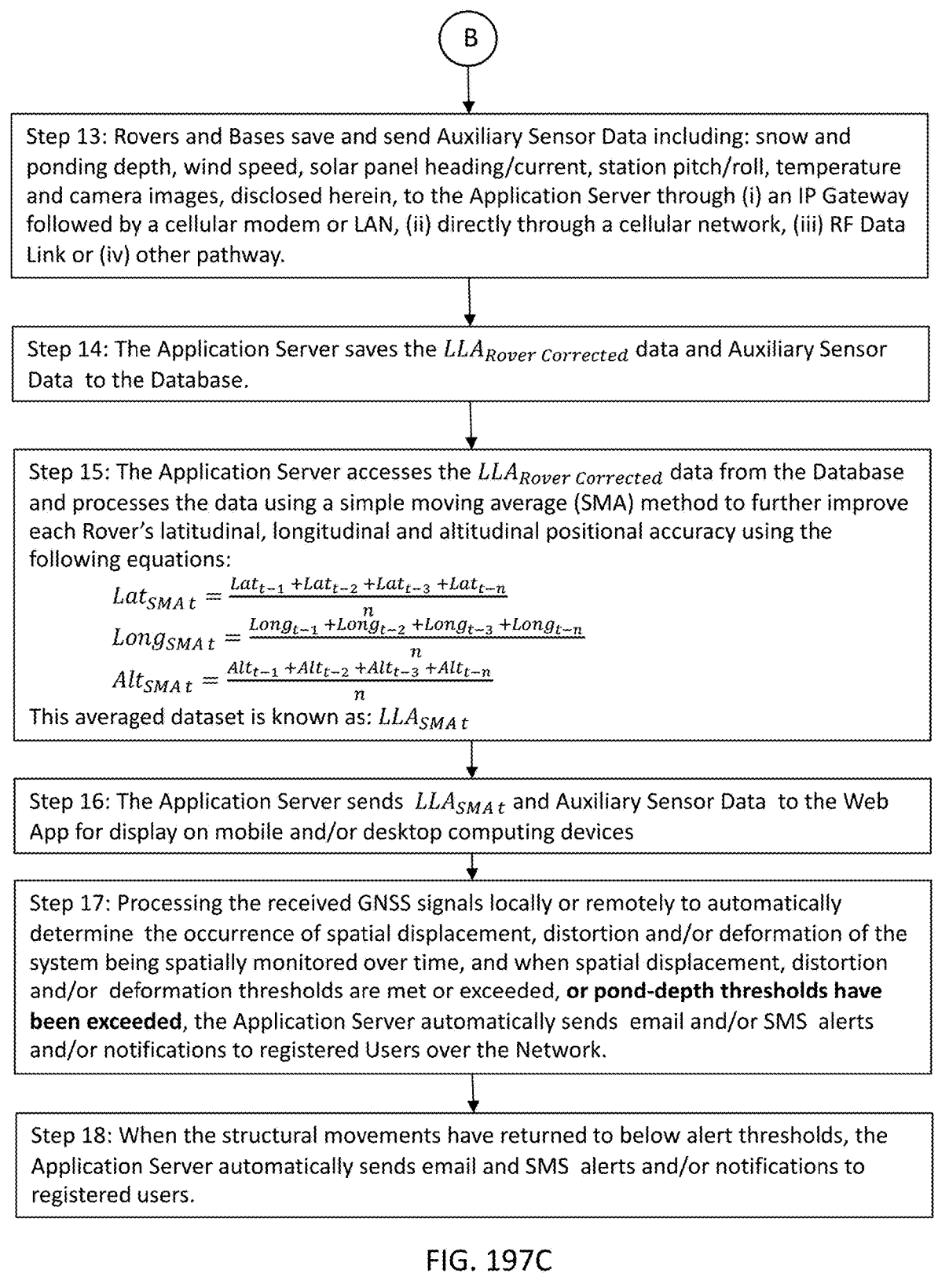

Step 13: Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

↓

Step 14: The Application Server saves the $LLA_{Rover\ Corrected}$ data and Auxiliary Sensor Data to the Database.

↓

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

↓

Step 16: The Application Server sends $LLA_{SMA\,t}$ and Auxiliary Sensor Data to the Web App for display on mobile and/or desktop computing devices

↓

Step 17: Processing the received GNSS signals locally or remotely to automatically determine the occurrence of spatial displacement, distortion and/or deformation of the system being spatially monitored over time, and when spatial displacement, distortion and/or deformation thresholds are met or exceeded, or pond-depth thresholds have been exceeded, the Application Server automatically sends email and/or SMS alerts and/or notifications to registered Users over the Network.

↓

Step 18: When the structural movements have returned to below alert thresholds, the Application Server automatically sends email and SMS alerts and/or notifications to registered users.

FIG. 197C

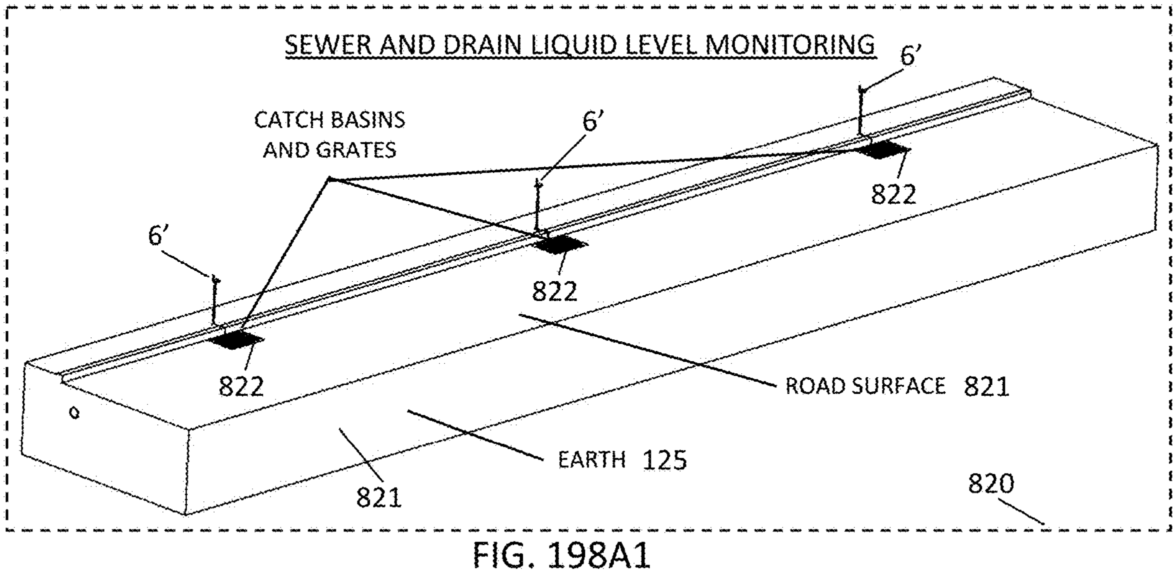
FIG. 198A1
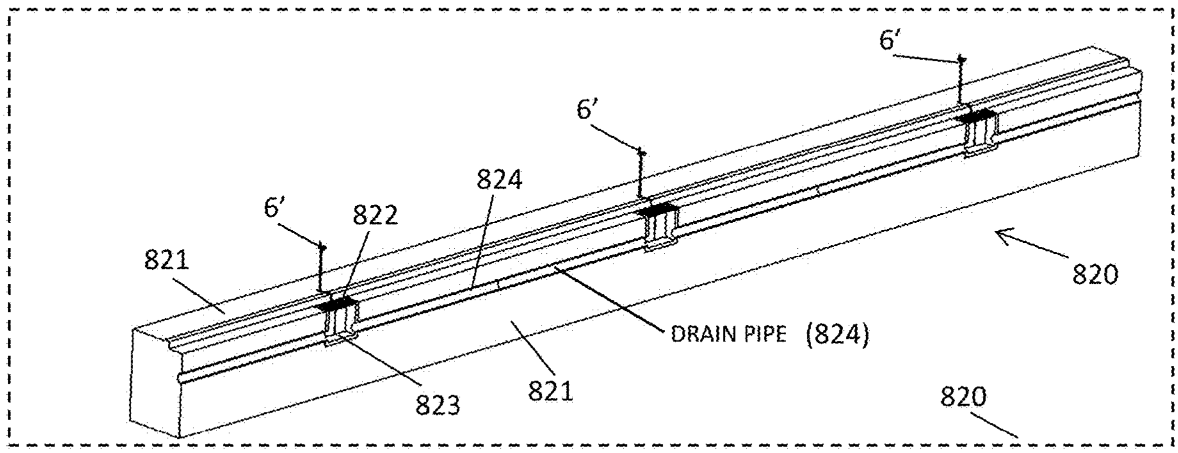
FIG. 198A2
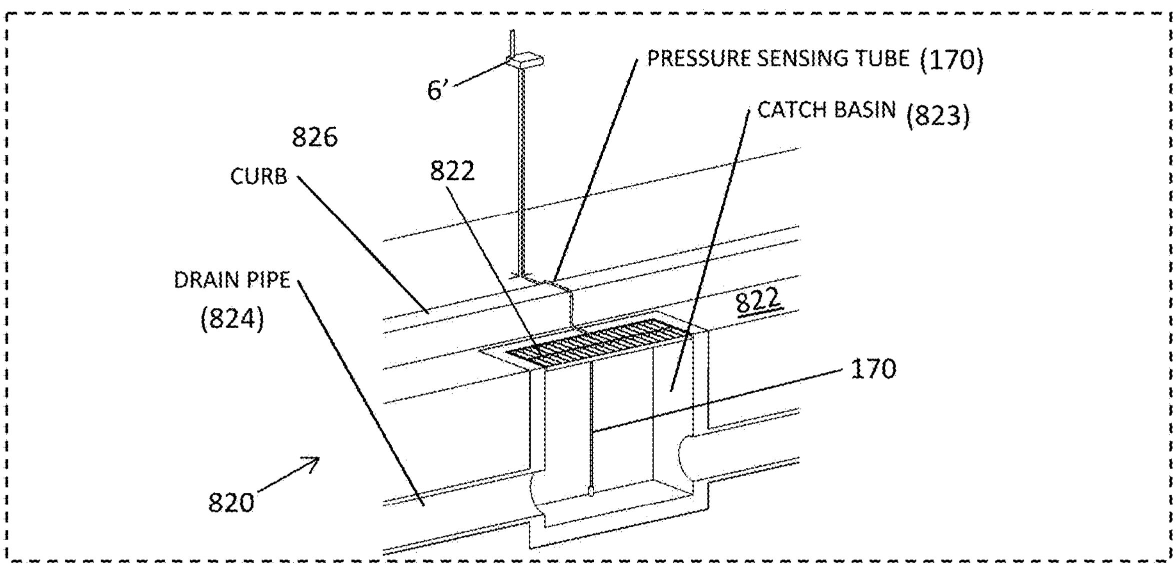
FIG. 198A3

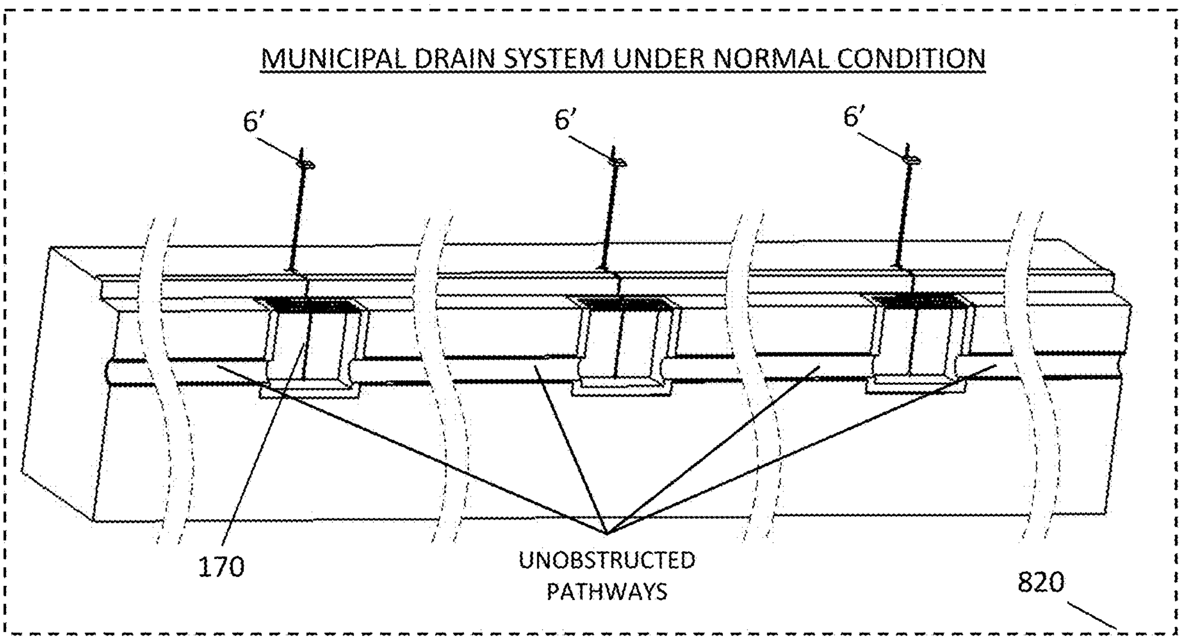
FIG. 198B1
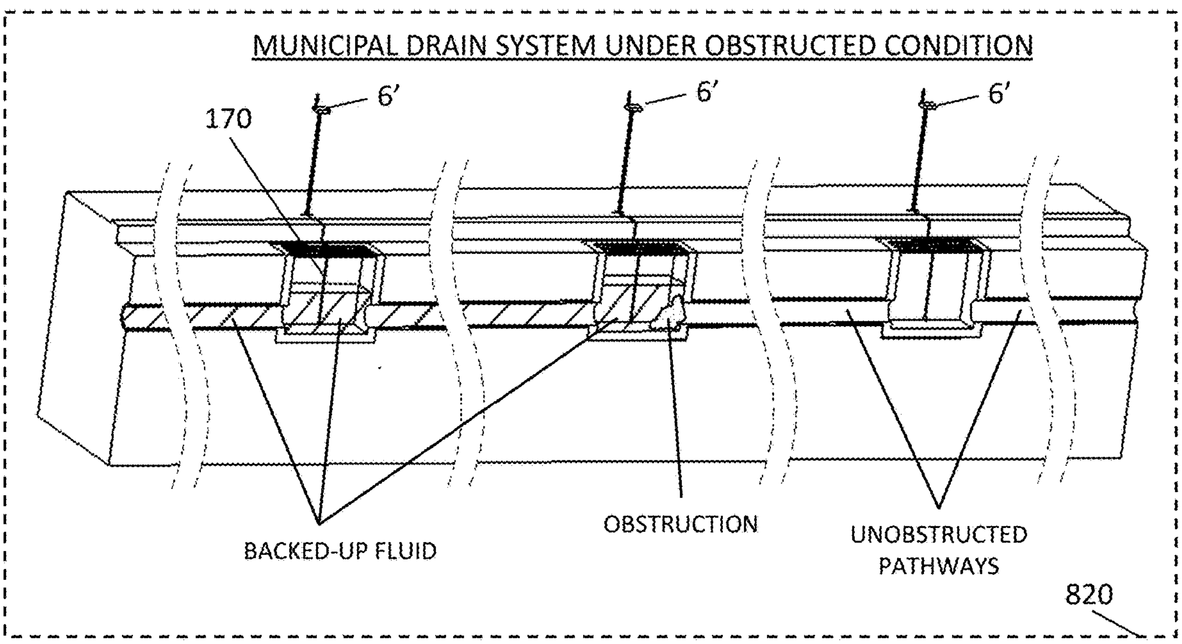
FIG. 198B2

MONITORING STRUCTURAL DEFLECTION RESPONSE USING SYSTEM OF PRESENT INVENTION OPERATING IN PONDING MONITORING AND ALERT MODE

Figure 198F1:
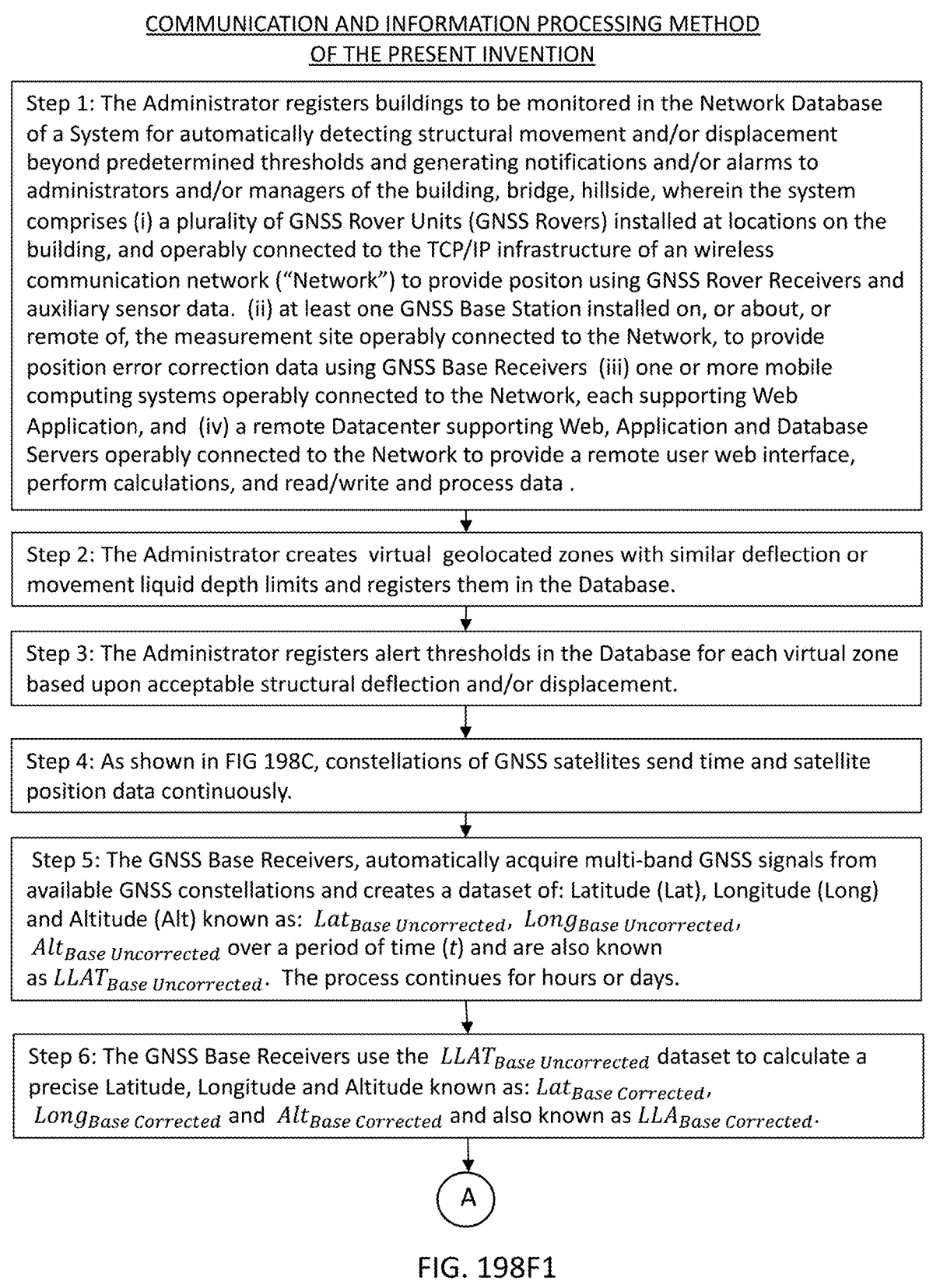

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, bridge, hillside, wherein the system comprises (i) a plurality of GNSS Rover Units (GNSS Rovers) installed at locations on the building, and operably connected to the TCP/IP infrastructure of an wireless communication network ("Network") to provide positon using GNSS Rover Receivers and auxiliary sensor data. (ii) at least one GNSS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement liquid depth limits and registers them in the Database.

↓

Step 3: The Administrator registers alert thresholds in the Database for each virtual zone based upon acceptable structural deflection and/or displacement.

↓

Step 4: As shown in FIG 198C, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 198F2:
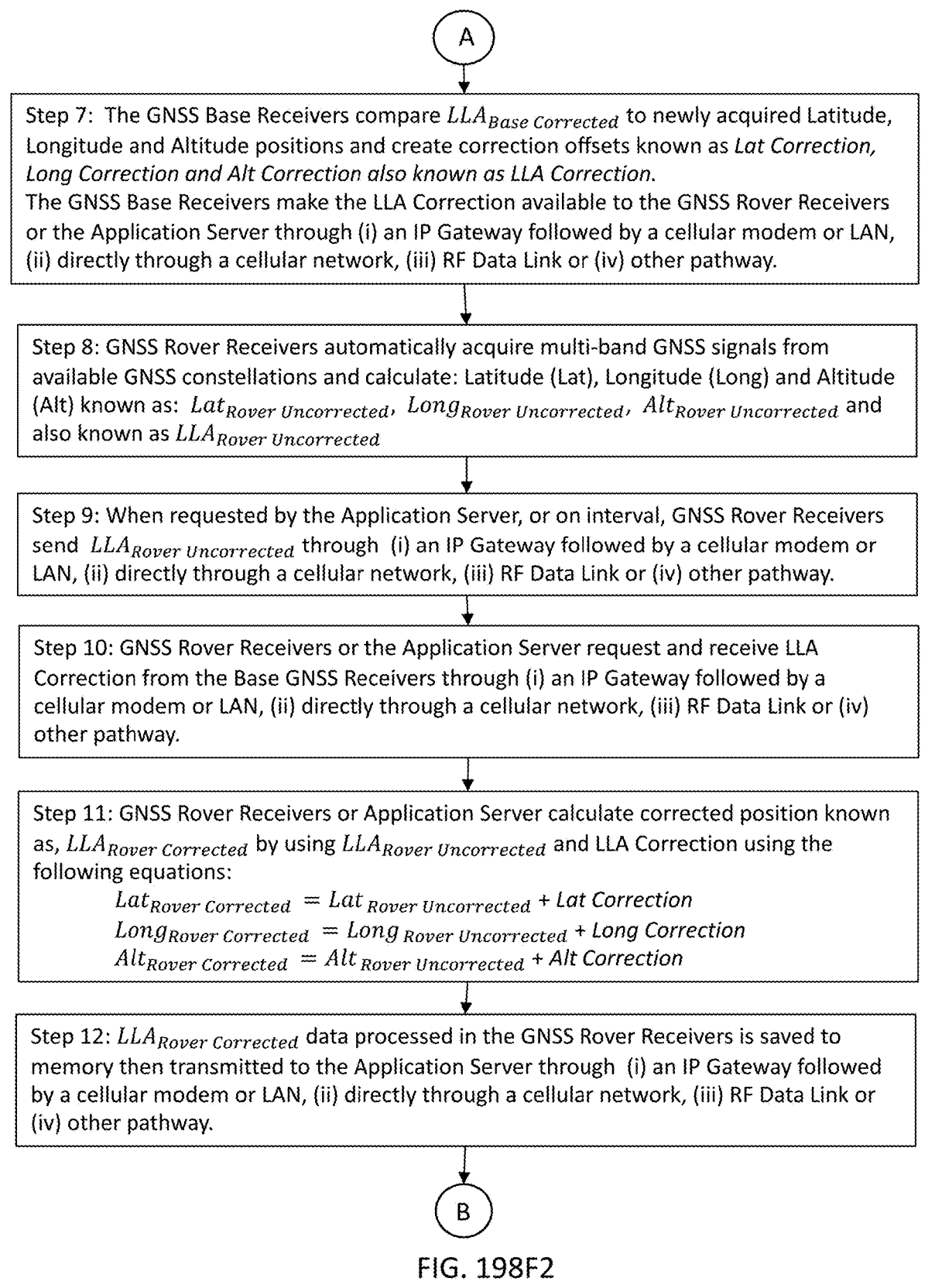

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: When requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

Step 10: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 11: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 12: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

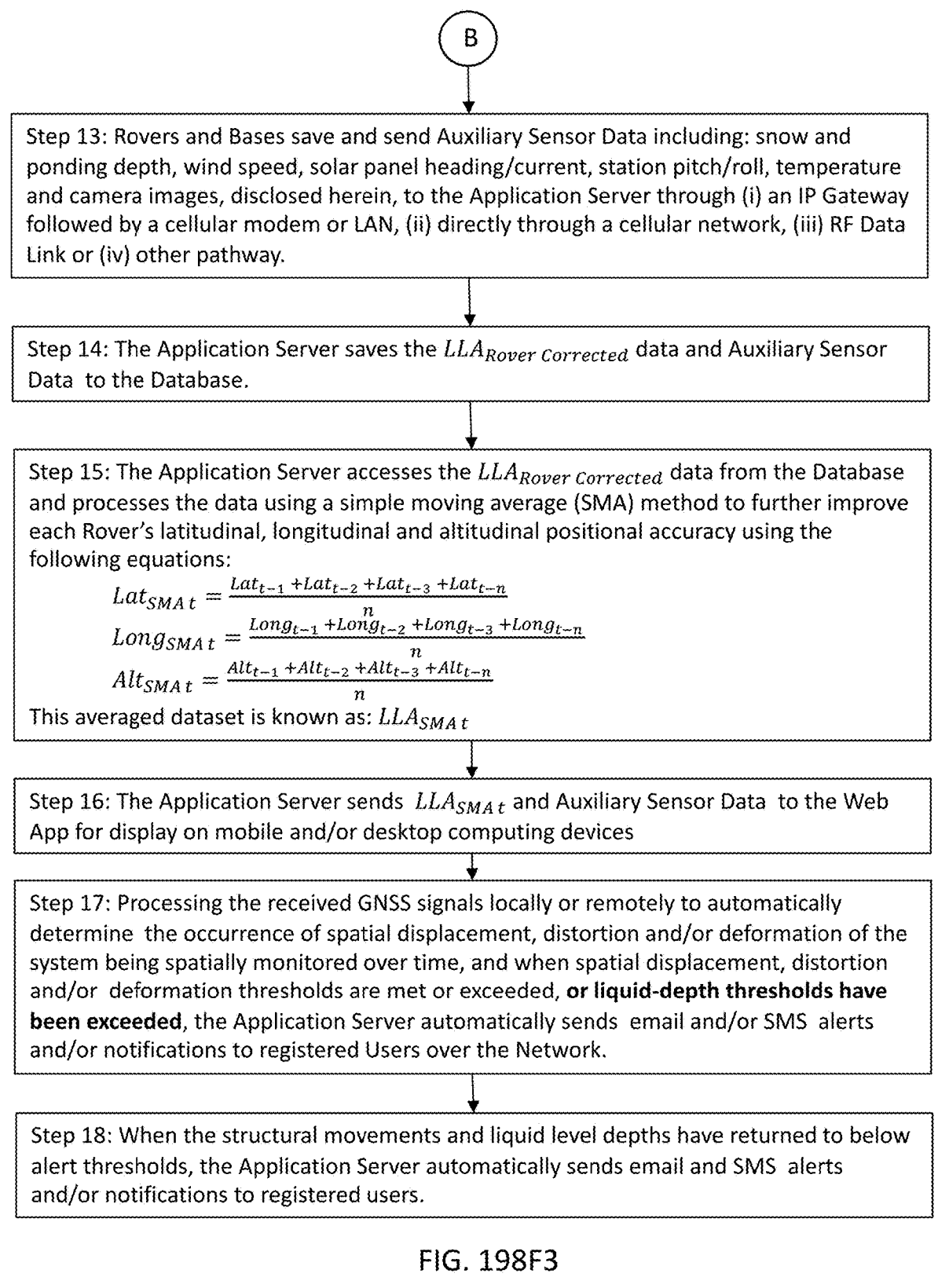

Step 13: Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

Step 14: The Application Server saves the $LLA_{Rover\ Corrected}$ data and Auxiliary Sensor Data to the Database.

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 16: The Application Server sends $LLA_{SMA\,t}$ and Auxiliary Sensor Data to the Web App for display on mobile and/or desktop computing devices Step 17: Processing the received GNSS signals locally or remotely to automatically determine the occurrence of spatial displacement, distortion and/or deformation of the system being spatially monitored over time, and when spatial displacement, distortion and/or deformation thresholds are met or exceeded, or liquid-depth thresholds have been exceeded, the Application Server automatically sends email and/or SMS alerts and/or notifications to registered Users over the Network.

Step 18: When the structural movements and liquid level depths have returned to below alert thresholds, the Application Server automatically sends email and SMS alerts and/or notifications to registered users.

FIG. 198F3

MONITORING WIND ACTIVITY AND STRUCTURAL DISPLACEMENT RESPONSE USING SYSTEM OF PRESENT INVENTION OPERATING IN WIND MONITORING AND ALERT MODE

@ = TIME AVERAGING DISPLACEMENT DATA EXTRACTION PROCESSING

Figure 206A:
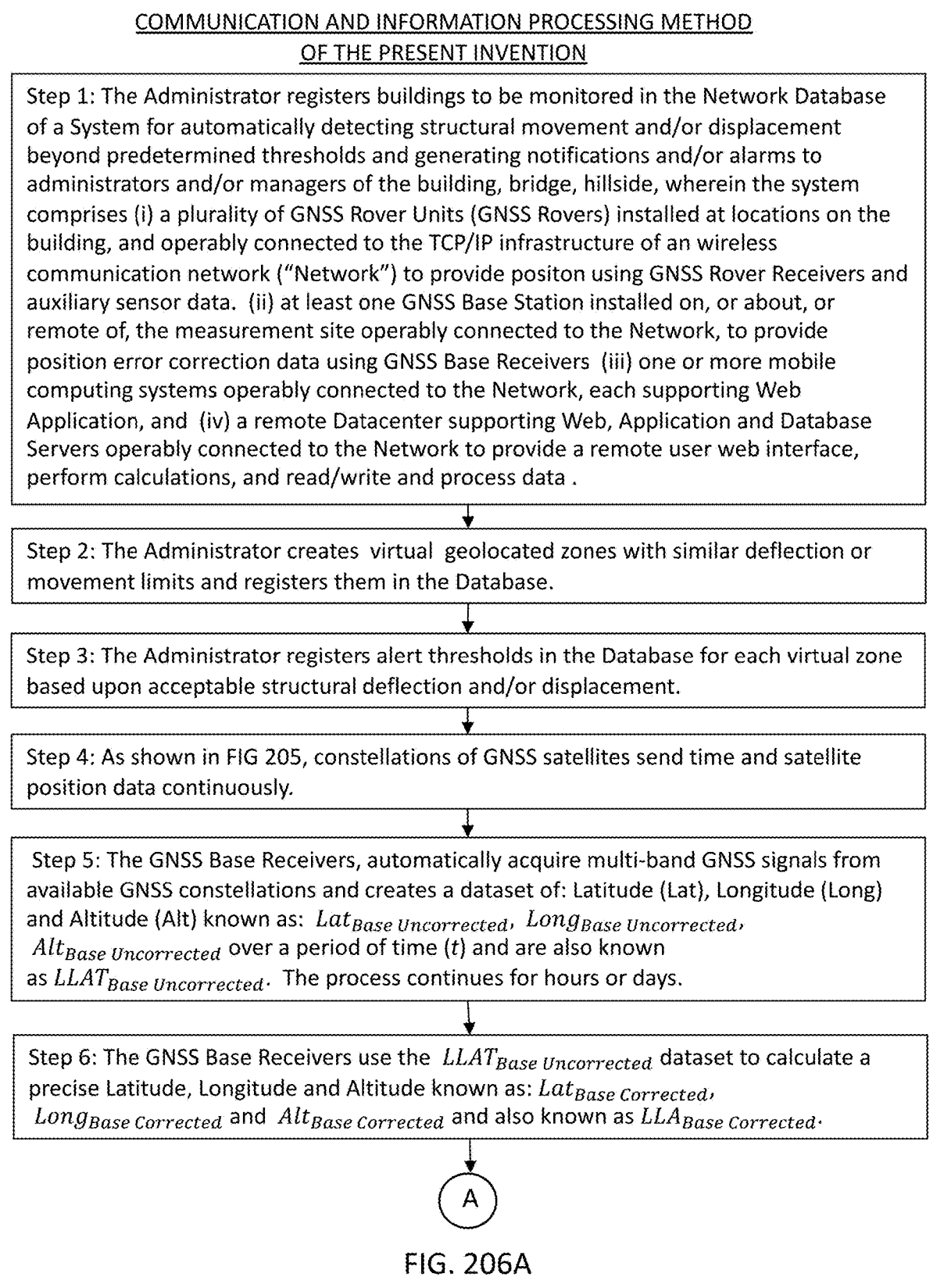

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, bridge, hillside, wherein the system comprises (i) a plurality of GNSS Rover Units (GNSS Rovers) installed at locations on the building, and operably connected to the TCP/IP infrastructure of an wireless communication network ("Network") to provide positon using GNSS Rover Receivers and auxiliary sensor data. (ii) at least one GNSS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 205, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 206B:
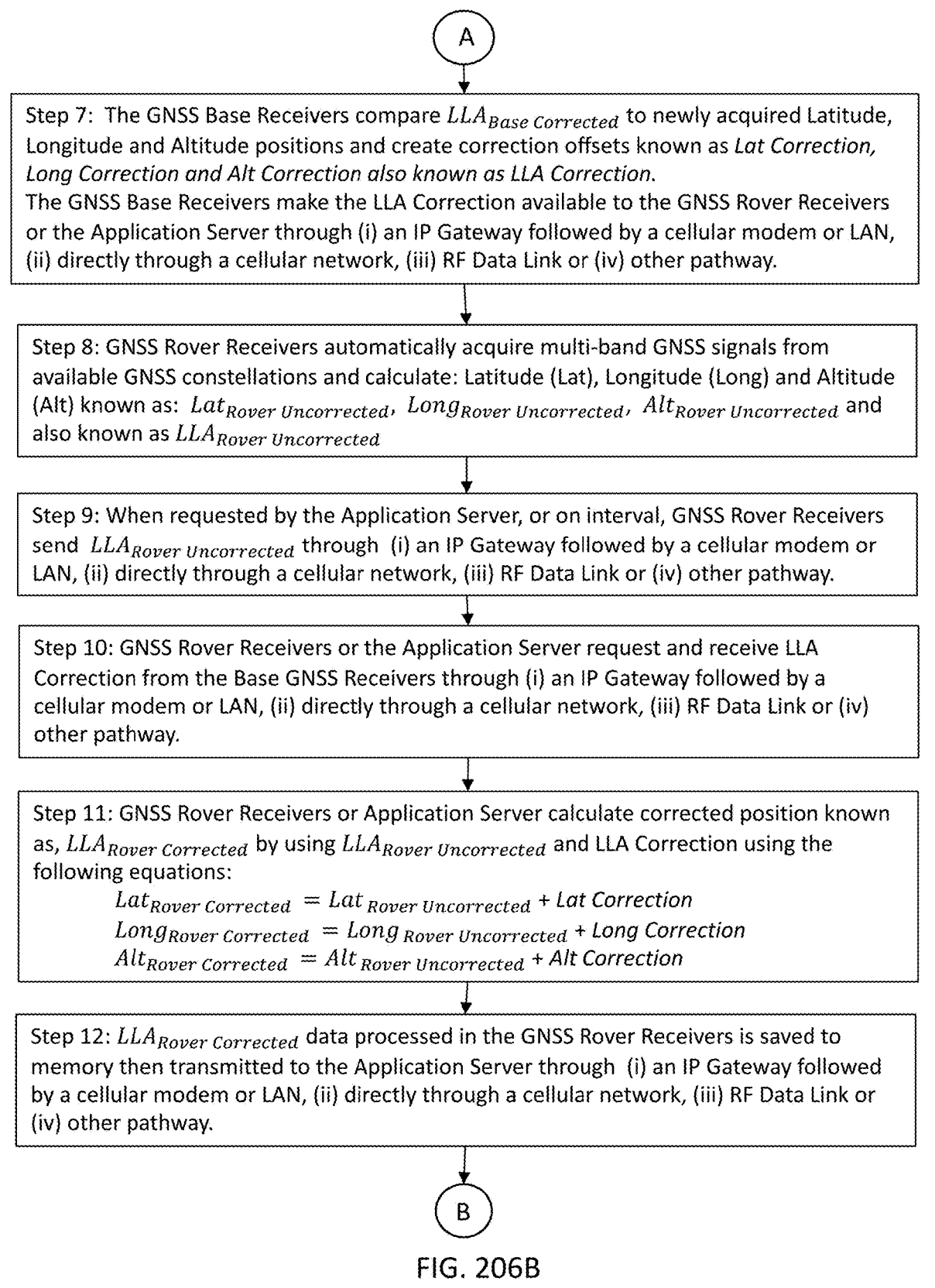

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: When requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

Step 10: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 11: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{\ Rover\ Uncorrected} + Lat\ Correction$$
$$Long_{Rover\ Corrected} = Long_{\ Rover\ Uncorrected} + Long\ Correction$$
$$Alt_{Rover\ Corrected} = Alt_{\ Rover\ Uncorrected} + Alt\ Correction$$

Step 12: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

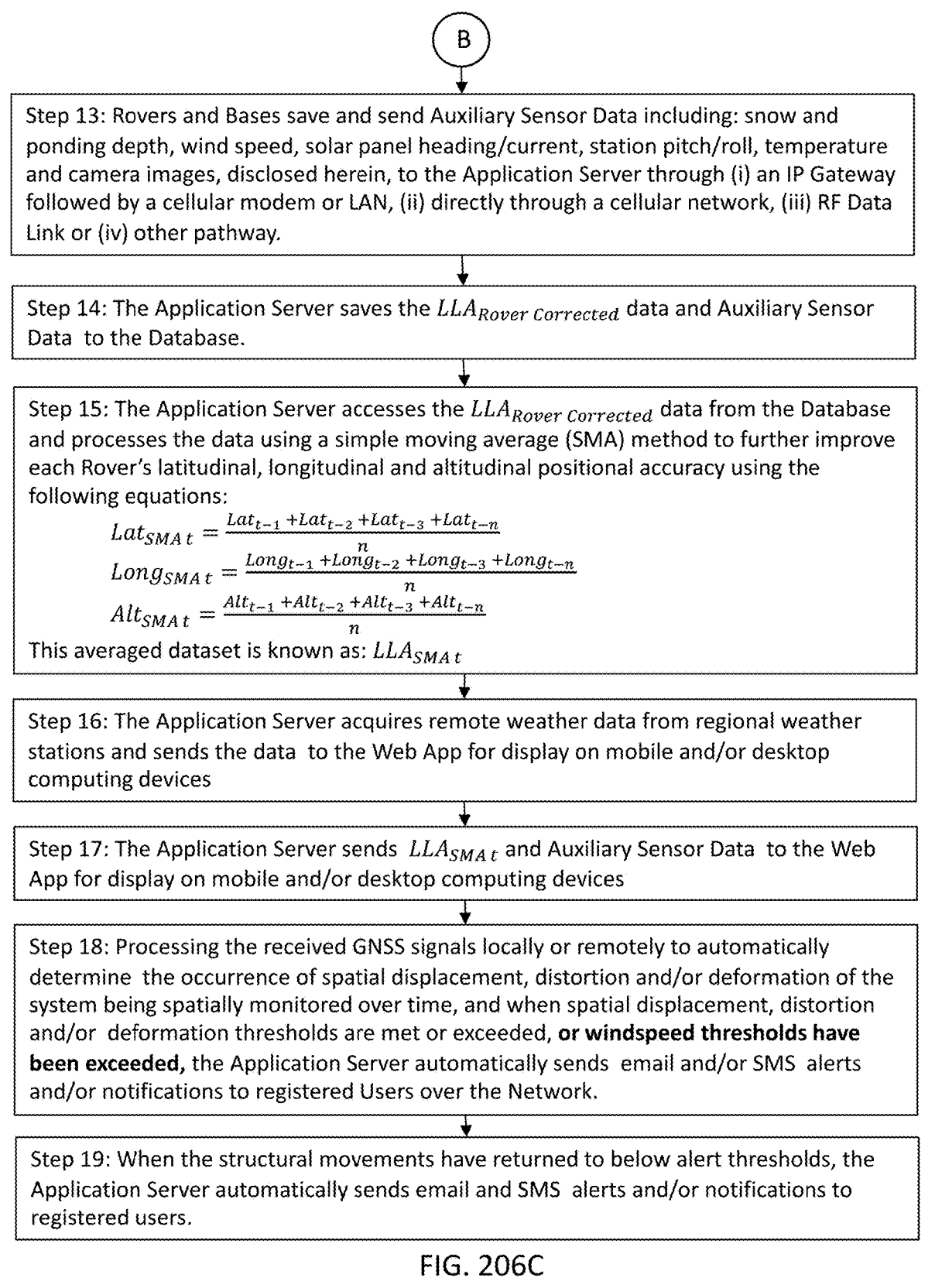

Step 13: Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

Step 14: The Application Server saves the $LLA_{Rover\ Corrected}$ data and Auxiliary Sensor Data to the Database.

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 16: The Application Server acquires remote weather data from regional weather stations and sends the data to the Web App for display on mobile and/or desktop computing devices Step 17: The Application Server sends $LLA_{SMA\,t}$ and Auxiliary Sensor Data to the Web App for display on mobile and/or desktop computing devices Step 18: Processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the Network.

Step 19: When the structural movements have returned to below alert thresholds, the Application Server automatically sends email and SMS alerts and/or notifications to registered users.

FIG. 206C

MONITORING WIND ACTIVITY AND STRUCTURAL DISPLACEMENT RESPONSE USING SYSTEM OF PRESENT INVENTION OPERATING IN WIND MONITORING AND ALERT MODE

@ = TIME AVERAGING DISPLACEMENT DATA EXTRACTION PROCESSING

Figure 214A:
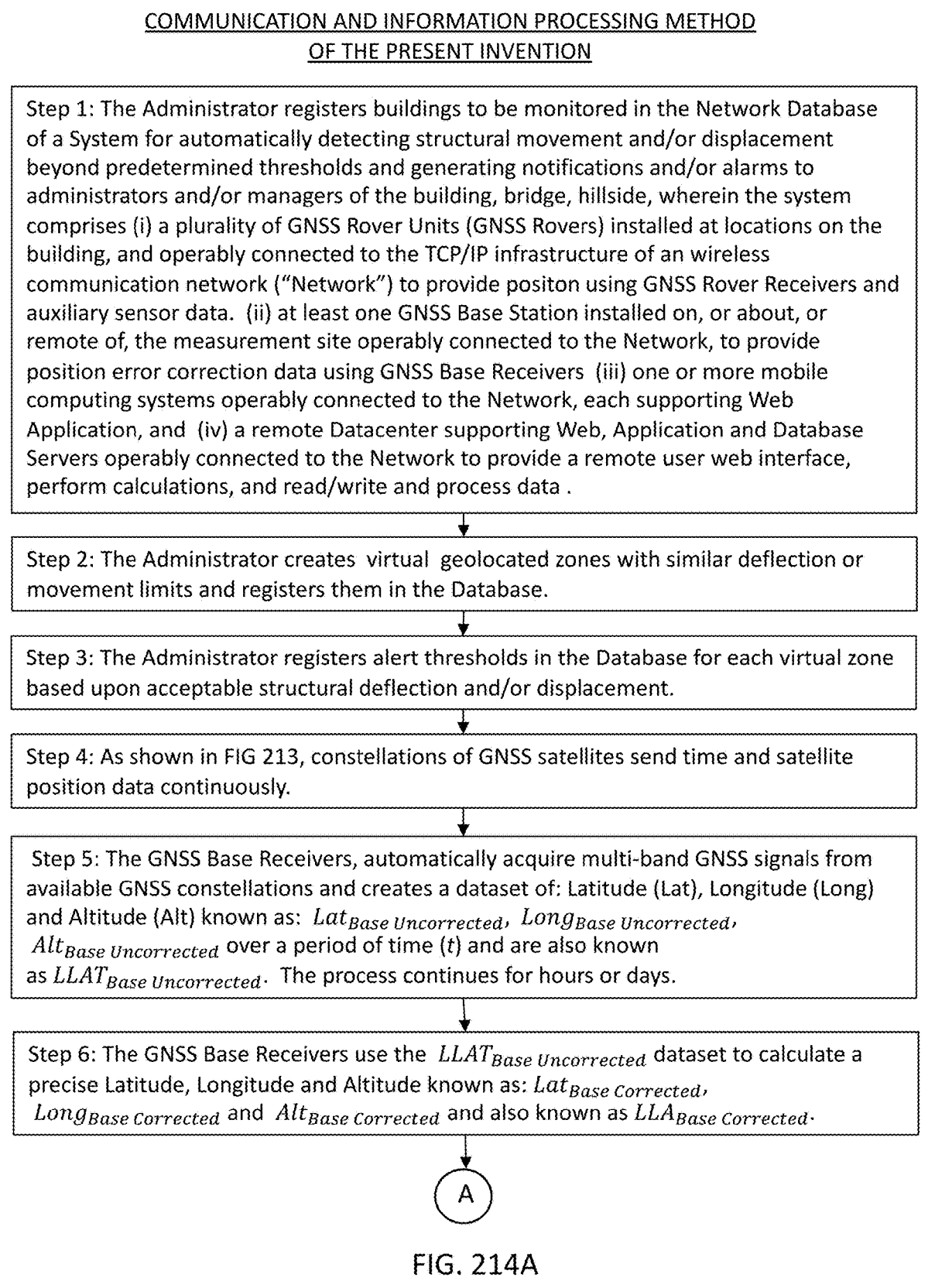

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, bridge, hillside, wherein the system comprises (i) a plurality of GNSS Rover Units (GNSS Rovers) installed at locations on the building, and operably connected to the TCP/IP infrastructure of an wireless communication network ("Network") to provide positon using GNSS Rover Receivers and auxiliary sensor data. (ii) at least one GNSS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 213, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 214B:
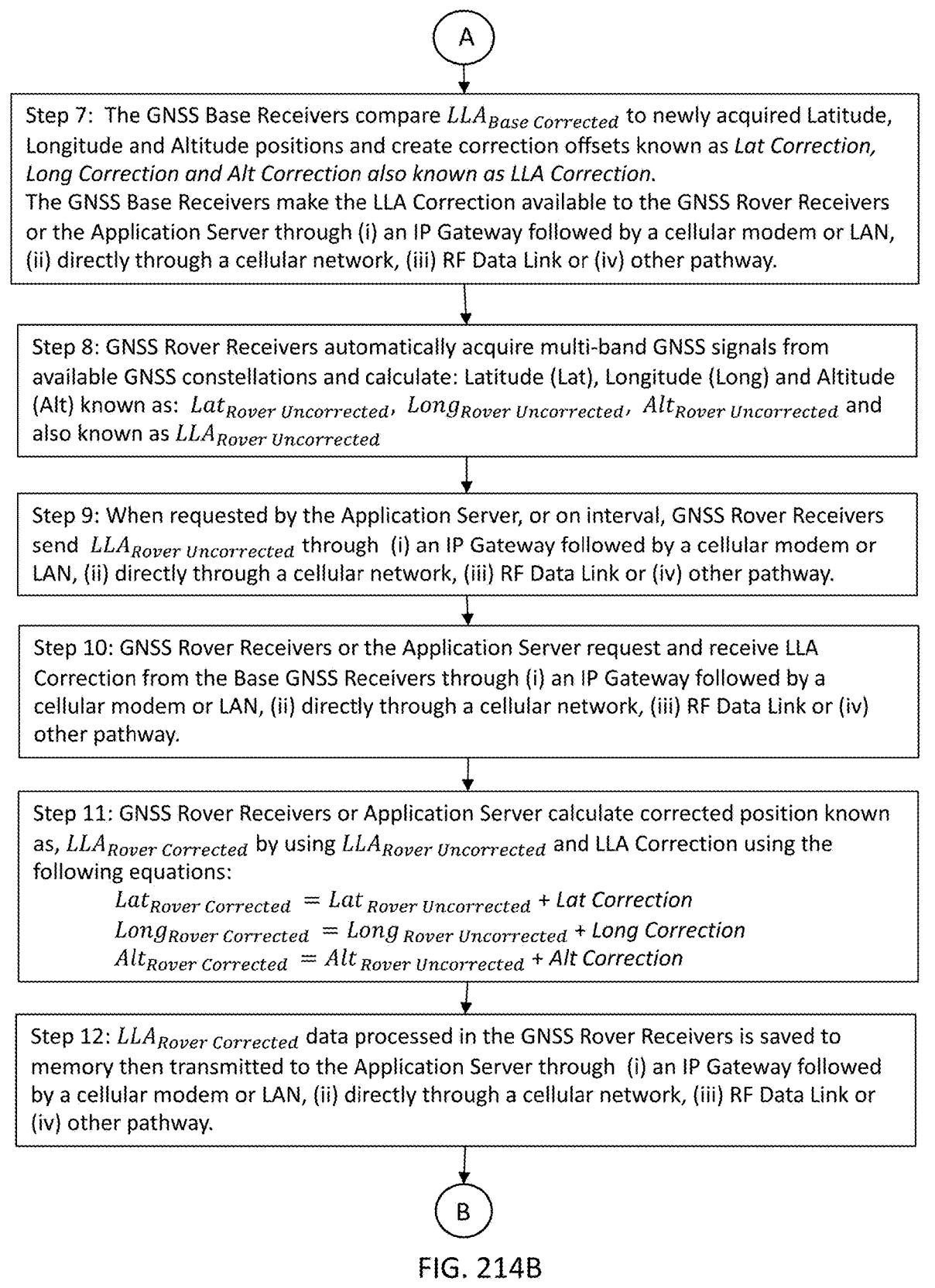

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: When requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

Step 10: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 11: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 12: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

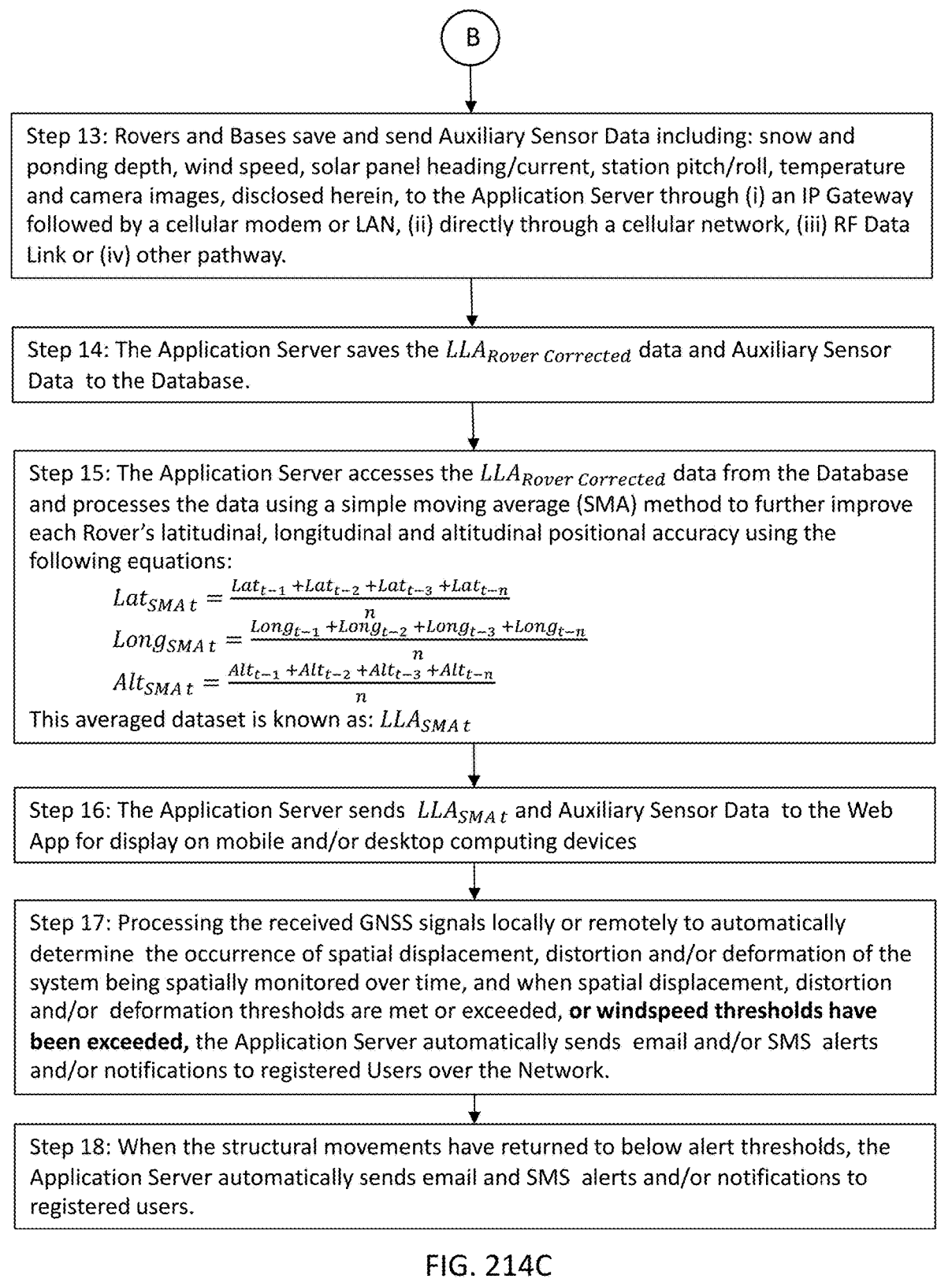

Step 13: Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

Step 14: The Application Server saves the $LLA_{Rover\ Corrected}$ data and Auxiliary Sensor Data to the Database.

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 16: The Application Server sends $LLA_{SMA\,t}$ and Auxiliary Sensor Data to the Web App for display on mobile and/or desktop computing devices Step 17: Processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the Network.

Step 18: When the structural movements have returned to below alert thresholds, the Application Server automatically sends email and SMS alerts and/or notifications to registered users.

FIG. 214C

MONITORING STRUCTURAL DISPLACEMENT RESPONSE USING SYSTEM OF PRESENT INVENTION OPERATING IN FOUNDATION SETTLING AND STRUCTURAL FAILURE MONITORING AND ALERT MODE

Figure 222A:
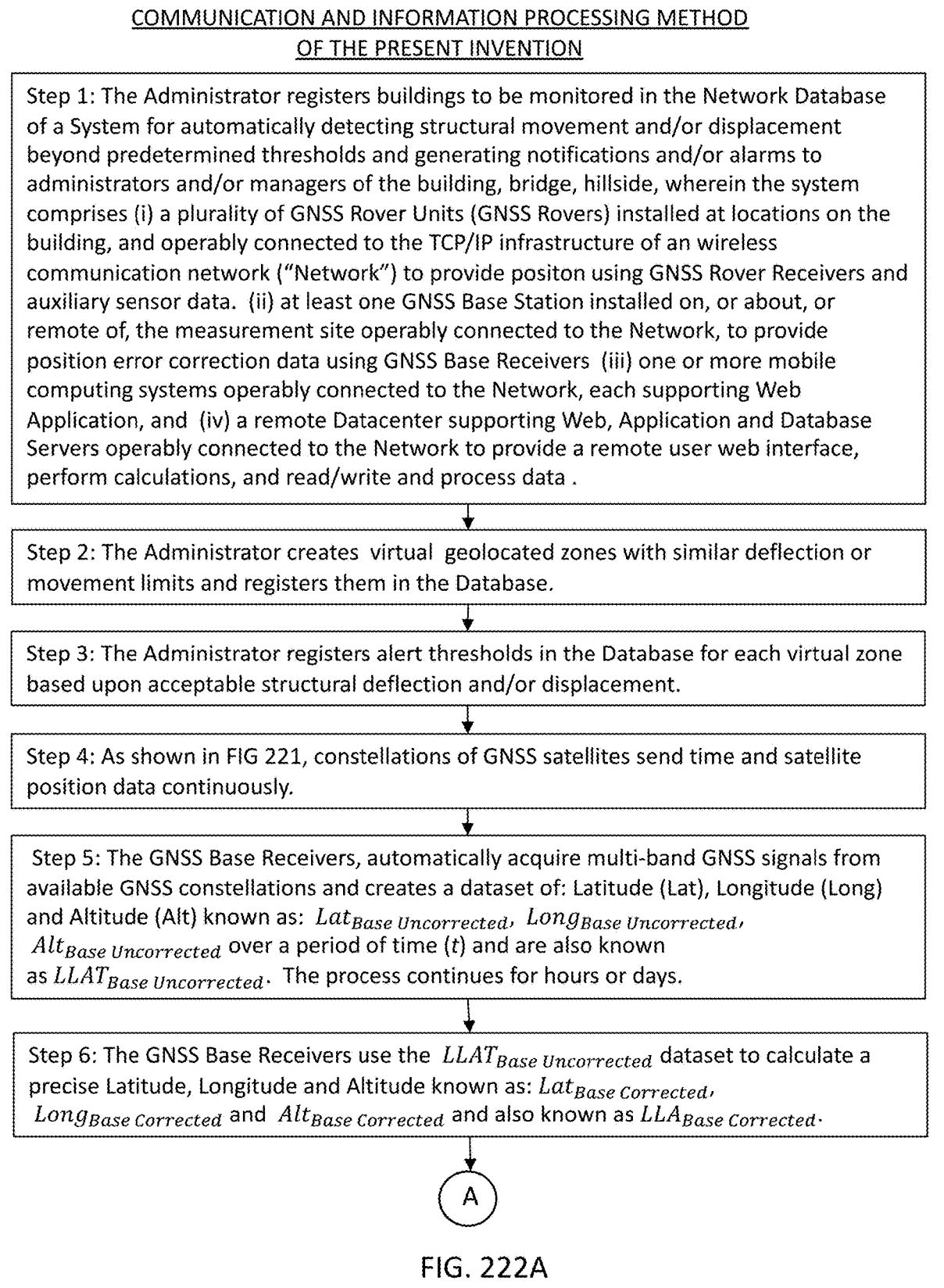

COMMUNICATION AND INFORMATION PROCESSING METHOD OF THE PRESENT INVENTION

Step 1: The Administrator registers buildings to be monitored in the Network Database of a System for automatically detecting structural movement and/or displacement beyond predetermined thresholds and generating notifications and/or alarms to administrators and/or managers of the building, bridge, hillside, wherein the system comprises (i) a plurality of GNSS Rover Units (GNSS Rovers) installed at locations on the building, and operably connected to the TCP/IP infrastructure of an wireless communication network ("Network") to provide positon using GNSS Rover Receivers and auxiliary sensor data. (ii) at least one GNSS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 221, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 222B:
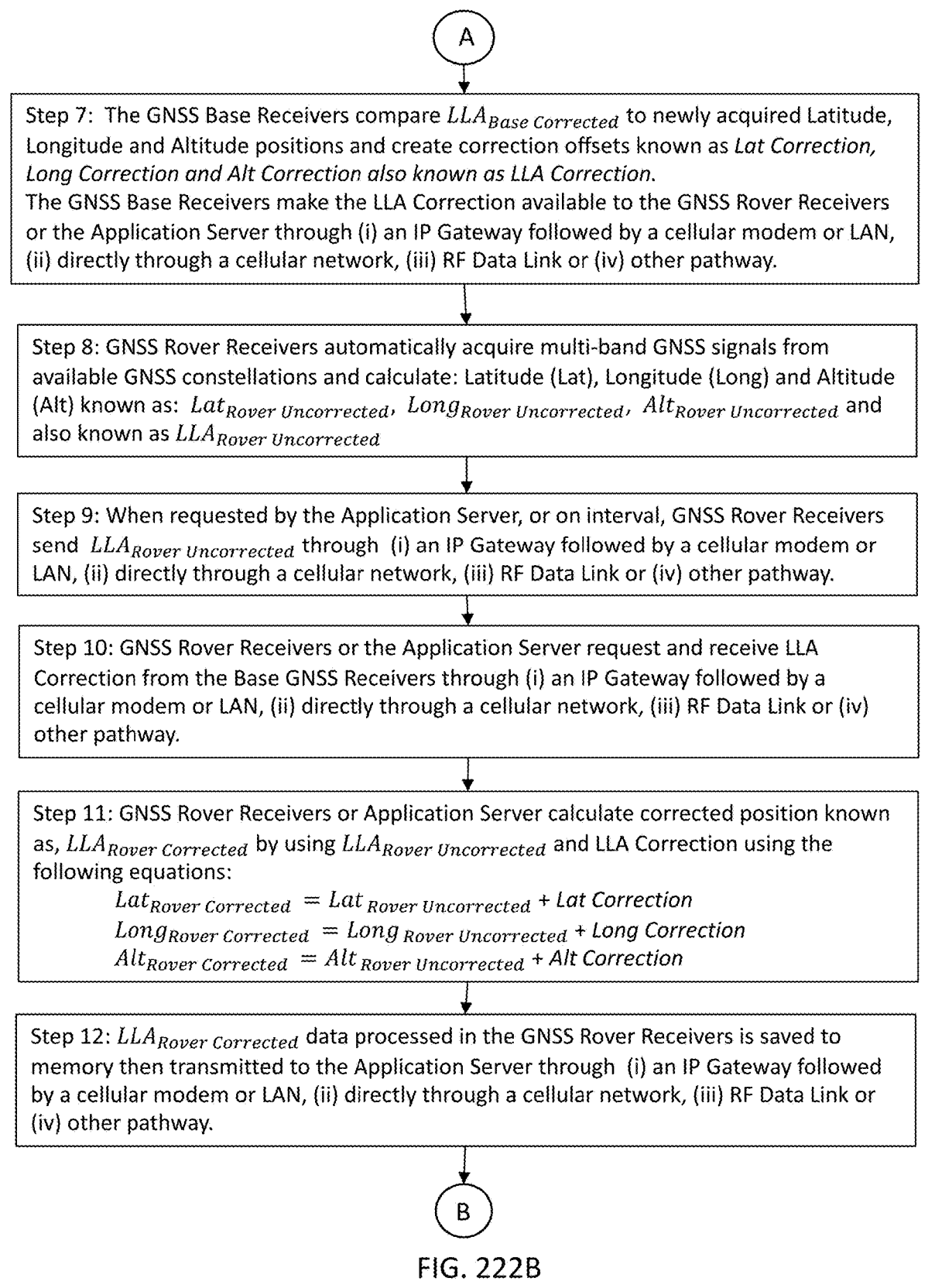

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: When requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

Step 10: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 11: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 12: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

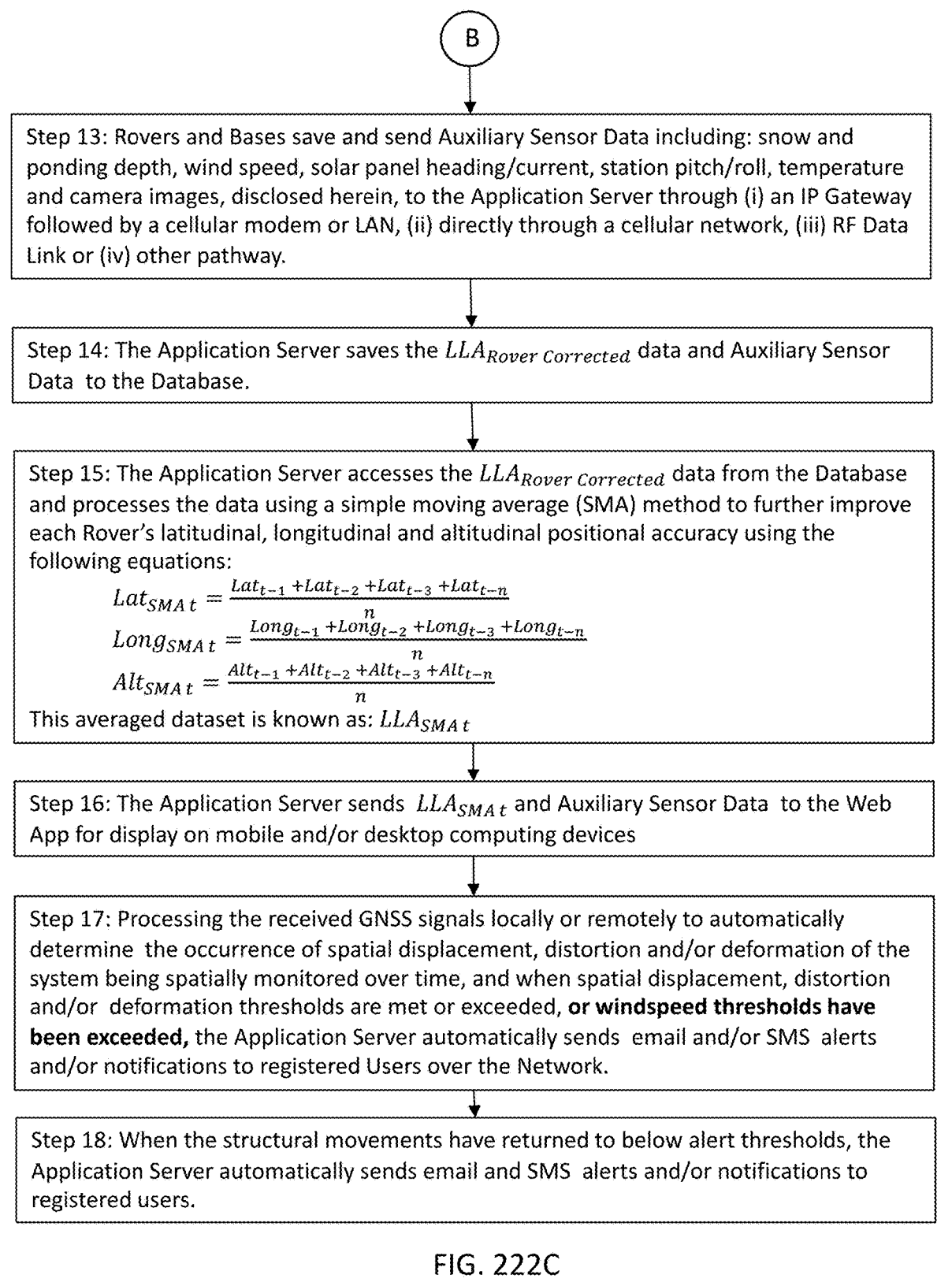

Step 13: Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

Step 14: The Application Server saves the $LLA_{Rover\ Corrected}$ data and Auxiliary Sensor Data to the Database.

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 16: The Application Server sends $LLA_{SMA\,t}$ and Auxiliary Sensor Data to the Web App for display on mobile and/or desktop computing devices Step 17: Processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the Network.

Step 18: When the structural movements have returned to below alert thresholds, the Application Server automatically sends email and SMS alerts and/or notifications to registered users.

FIG. 222C

MONITORING SEISMIC ACTIVITY AND STRUCTURE DISPLACEMENT RESPONSE USING SYSTEM OF PRESENT INVENTION OPERATING IN EARLY WARNING SEISMIC MONITORING MODE

Figure 229A:
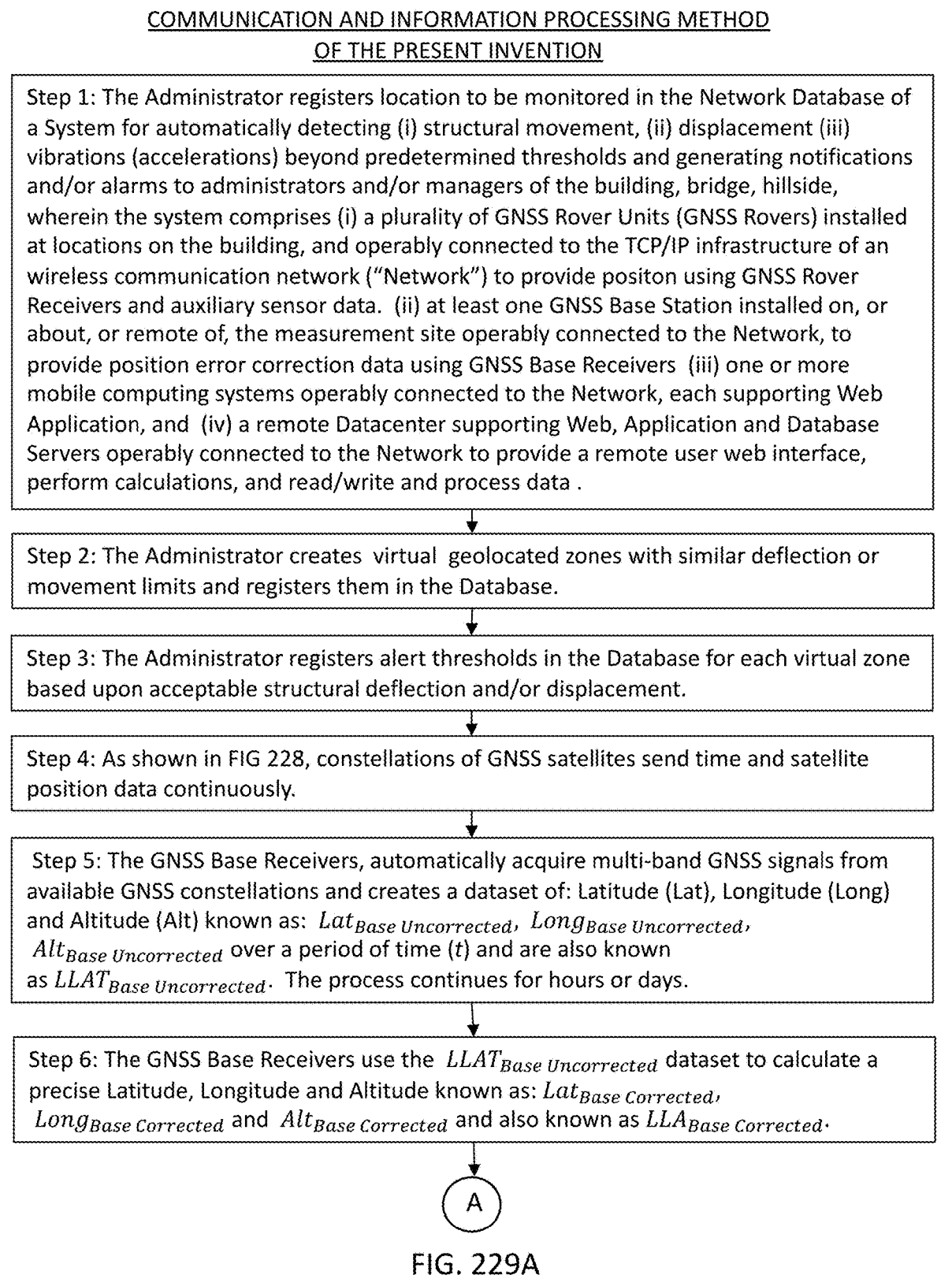

COMMUNICATION AND INFORMATION PROCESSING METHOD OF THE PRESENT INVENTION

Step 1: The Administrator registers location to be monitored in the Network Database of a System for automatically detecting (i) structural movement, (ii) displacement (iii) vibrations (accelerations) beyond predetermined thresholds and generating notifications and/or alarms to administrators and/or managers of the building, bridge, hillside, wherein the system comprises (i) a plurality of GNSS Rover Units (GNSS Rovers) installed at locations on the building, and operably connected to the TCP/IP infrastructure of an wireless communication network ("Network") to provide positon using GNSS Rover Receivers and auxiliary sensor data. (ii) at least one GNSS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 228, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 229B:
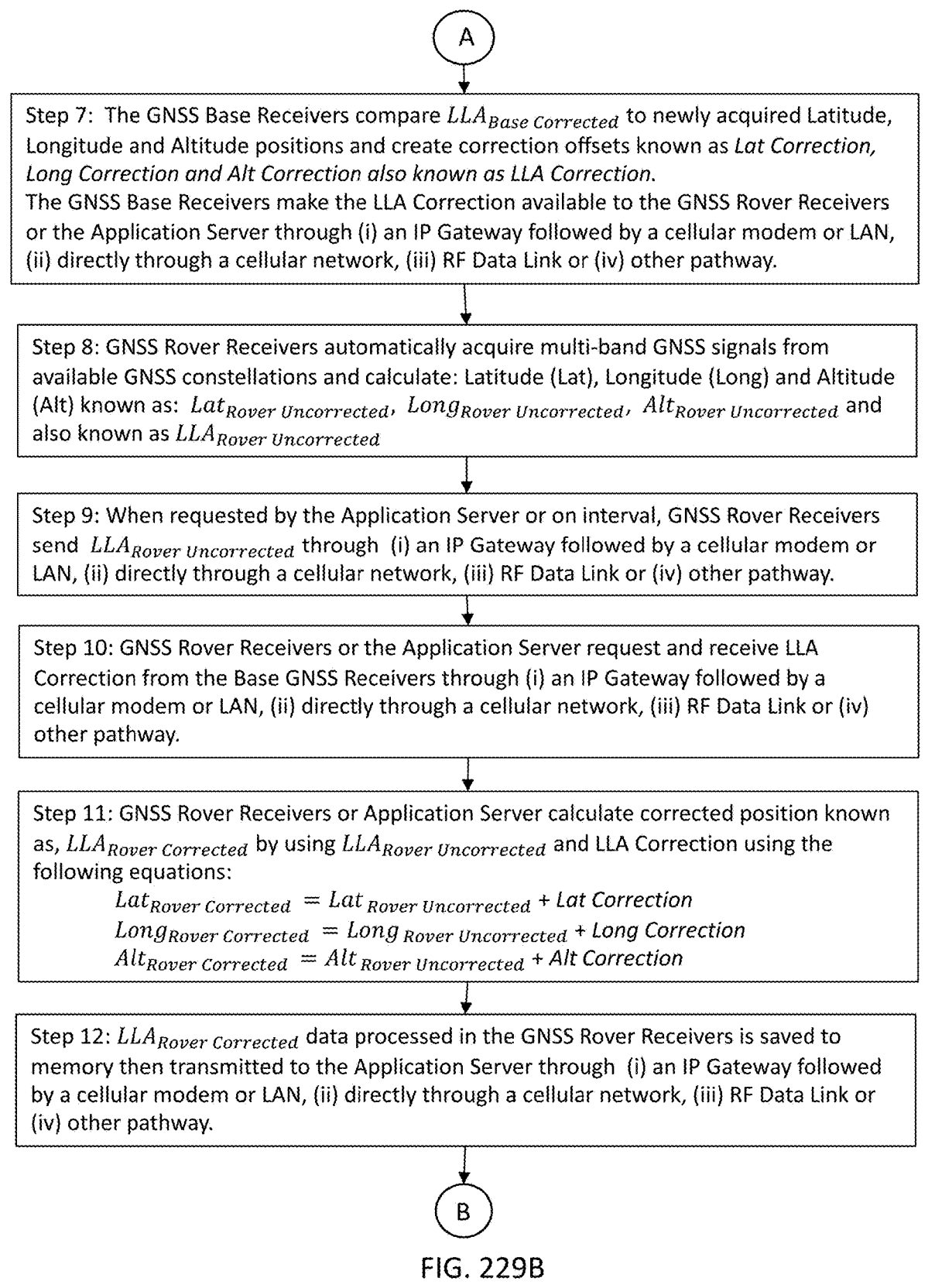

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: When requested by the Application Server or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

Step 10: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 11: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 12: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

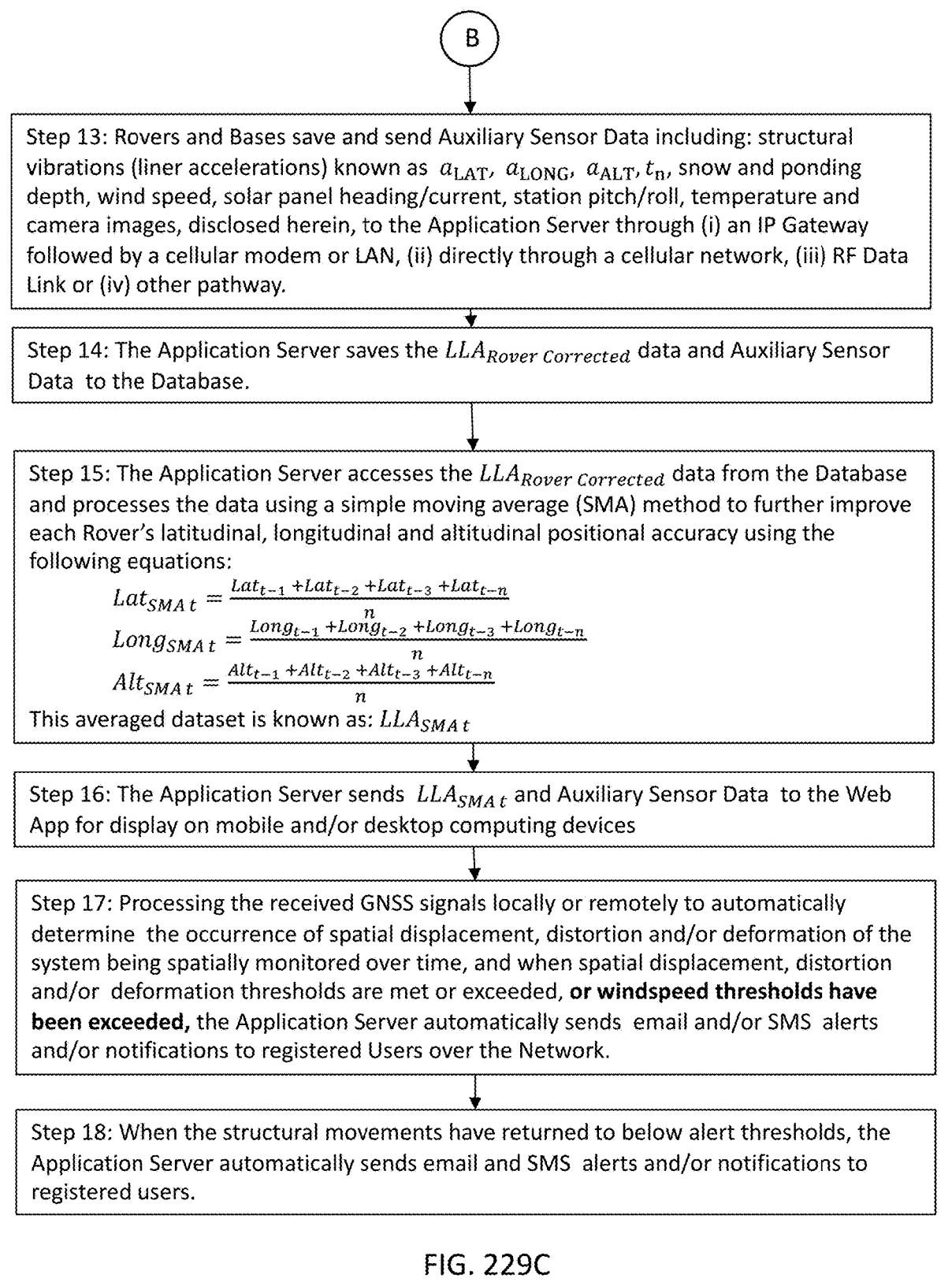

Step 13: Rovers and Bases save and send Auxiliary Sensor Data including: structural vibrations (liner accelerations) known as $a_{\text{LAT}}$, $a_{\text{LONG}}$, $a_{\text{ALT}}$, $t_{\text{n}}$, snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

Step 14: The Application Server saves the $LLA_{Rover\ Corrected}$ data and Auxiliary Sensor Data to the Database.

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 16: The Application Server sends $LLA_{SMA\,t}$ and Auxiliary Sensor Data to the Web App for display on mobile and/or desktop computing devices Step 17: Processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the Network.

Step 18: When the structural movements have returned to below alert thresholds, the Application Server automatically sends email and SMS alerts and/or notifications to registered users.

FIG. 229C

MONITORING STRUCTURAL DISPLACEMENT RESPONSE USING SYSTEM OF PRESENT INVENTION OPERATING IN BRIDGE DISPLACEMENT AND VIBRATION MONITORING AND ALERT MODE

Figure 240A:
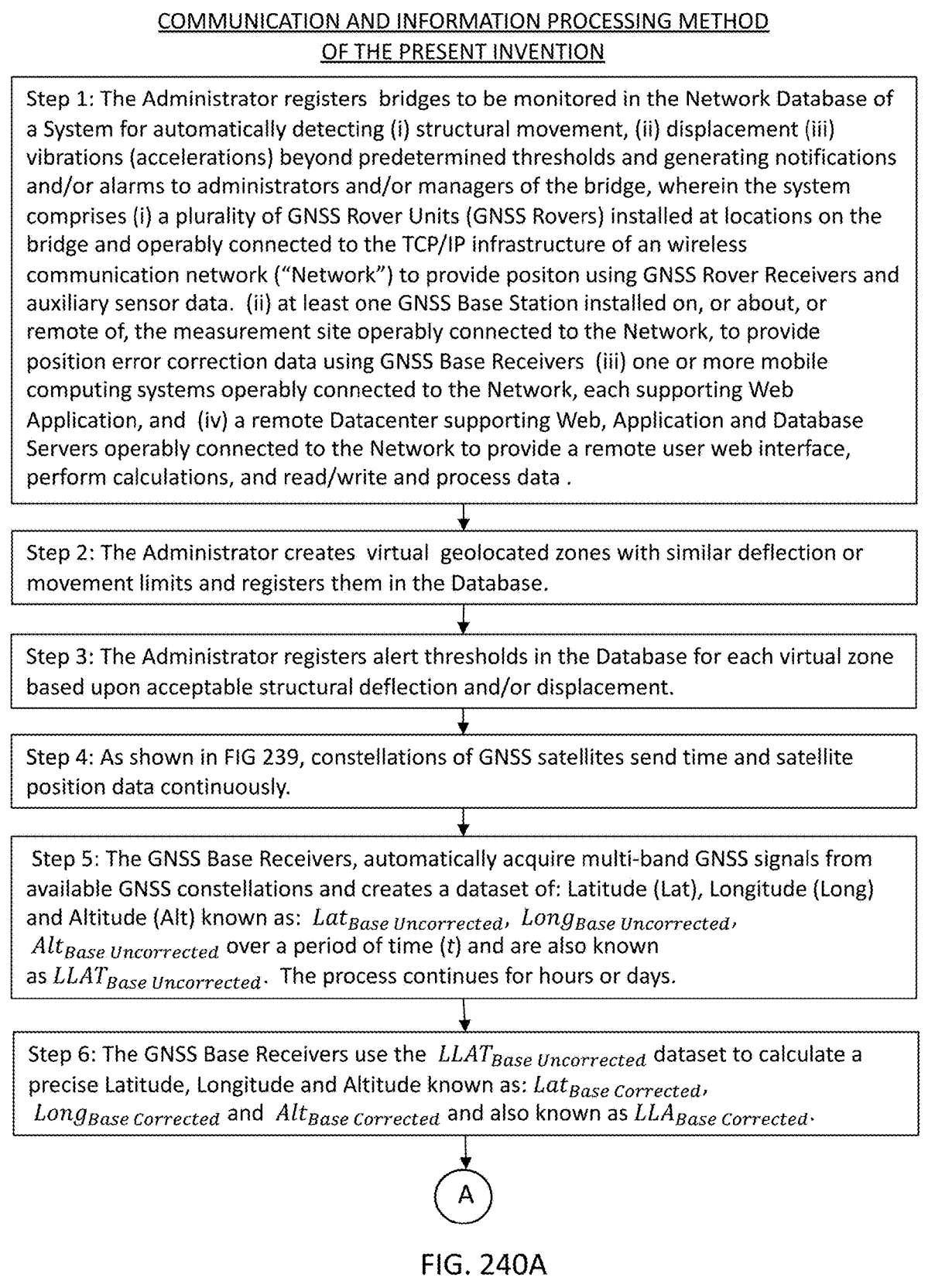

COMMUNICATION AND INFORMATION PROCESSING METHOD OF THE PRESENT INVENTION

Step 1: The Administrator registers bridges to be monitored in the Network Database of a System for automatically detecting (i) structural movement, (ii) displacement (iii) vibrations (accelerations) beyond predetermined thresholds and generating notifications and/or alarms to administrators and/or managers of the bridge, wherein the system comprises (i) a plurality of GNSS Rover Units (GNSS Rovers) installed at locations on the bridge and operably connected to the TCP/IP infrastructure of an wireless communication network ("Network") to provide positon using GNSS Rover Receivers and auxiliary sensor data. (ii) at least one GNSS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data .

↓

Step 2: The Administrator creates virtual geolocated zones with similar deflection or movement limits and registers them in the Database.

↓

Step 3: The Administrator registers alert thresholds in the Database for each virtual zone based upon acceptable structural deflection and/or displacement.

↓

Step 4: As shown in FIG 239, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 240B:
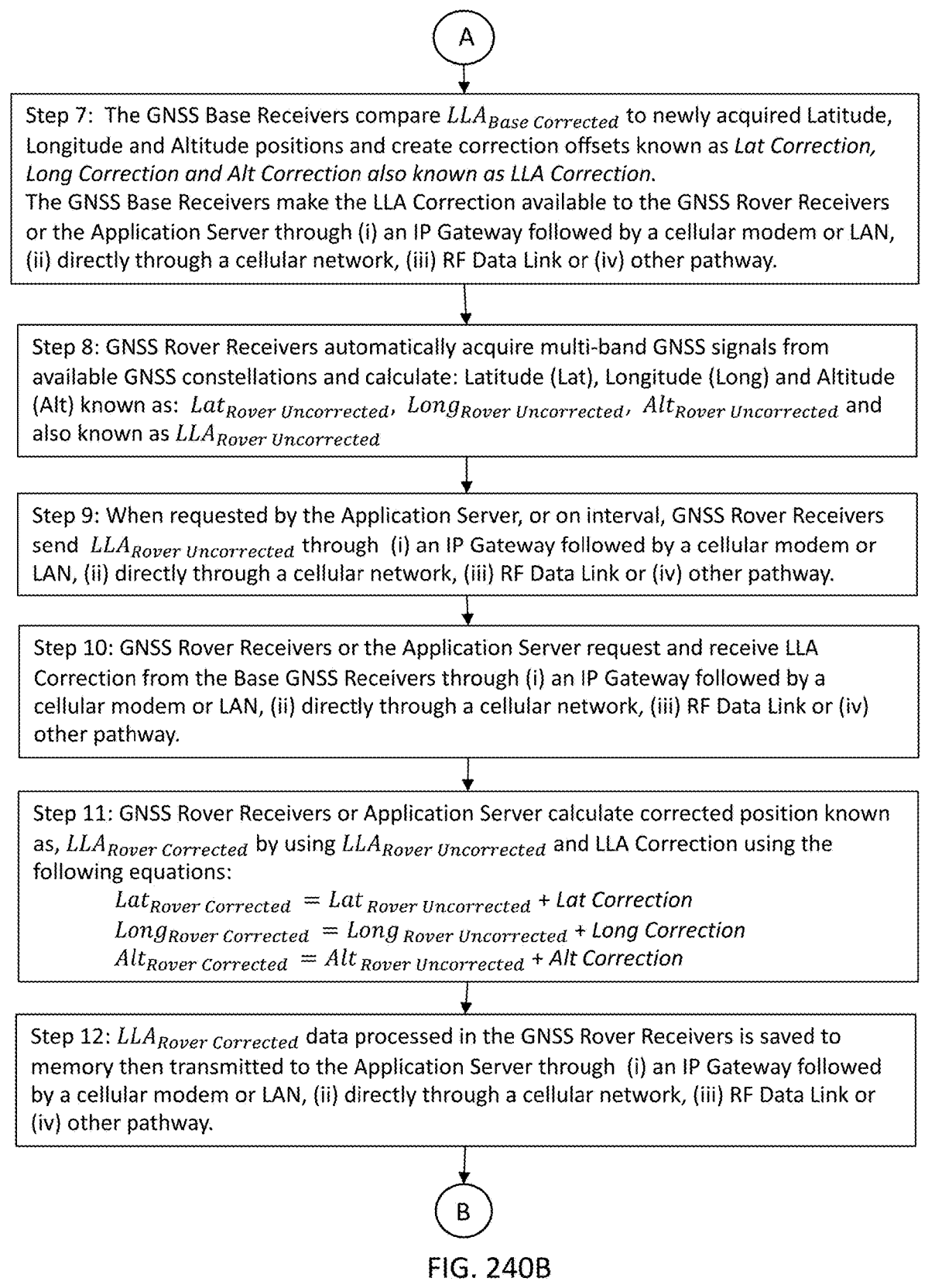

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: When requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

Step 10: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 11: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 12: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

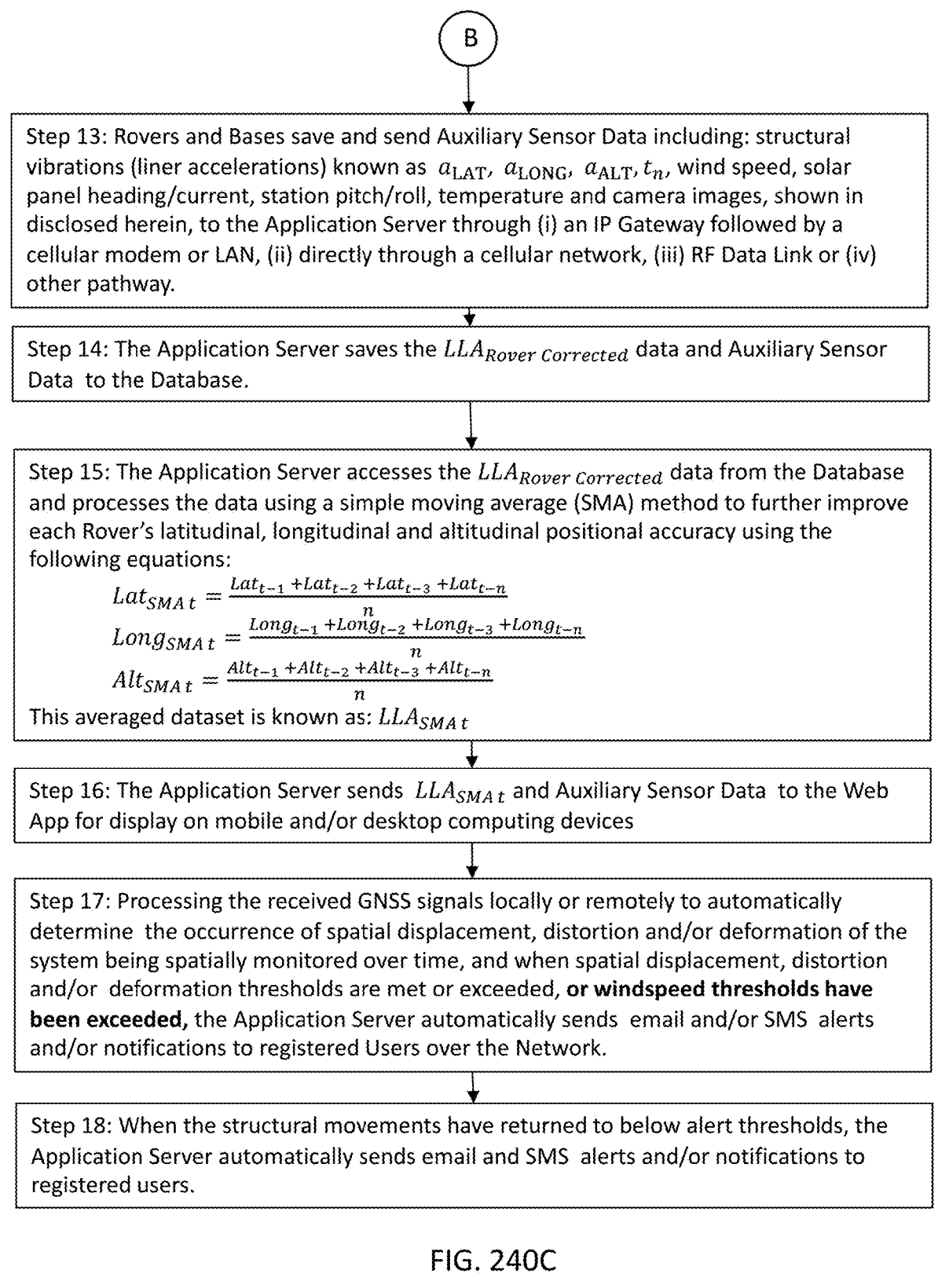

Step 13: Rovers and Bases save and send Auxiliary Sensor Data including: structural vibrations (liner accelerations) known as $a_{\text{LAT}}$, $a_{\text{LONG}}$, $a_{\text{ALT}}$, $t_n$, wind speed, solar panel heading/current, station pitch/roll, temperature and camera images, shown in disclosed herein, to the Application Server through (i) an IP Gateway followed by a cellular modem or LAN, (ii) directly through a cellular network, (iii) RF Data Link or (iv) other pathway.

Step 14: The Application Server saves the $LLA_{Rover\ Corrected}$ data and Auxiliary Sensor Data to the Database.

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 16: The Application Server sends $LLA_{SMA\,t}$ and Auxiliary Sensor Data to the Web App for display on mobile and/or desktop computing devices Step 17: Processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the Network.

Step 18: When the structural movements have returned to below alert thresholds, the Application Server automatically sends email and SMS alerts and/or notifications to registered users.

FIG. 240C

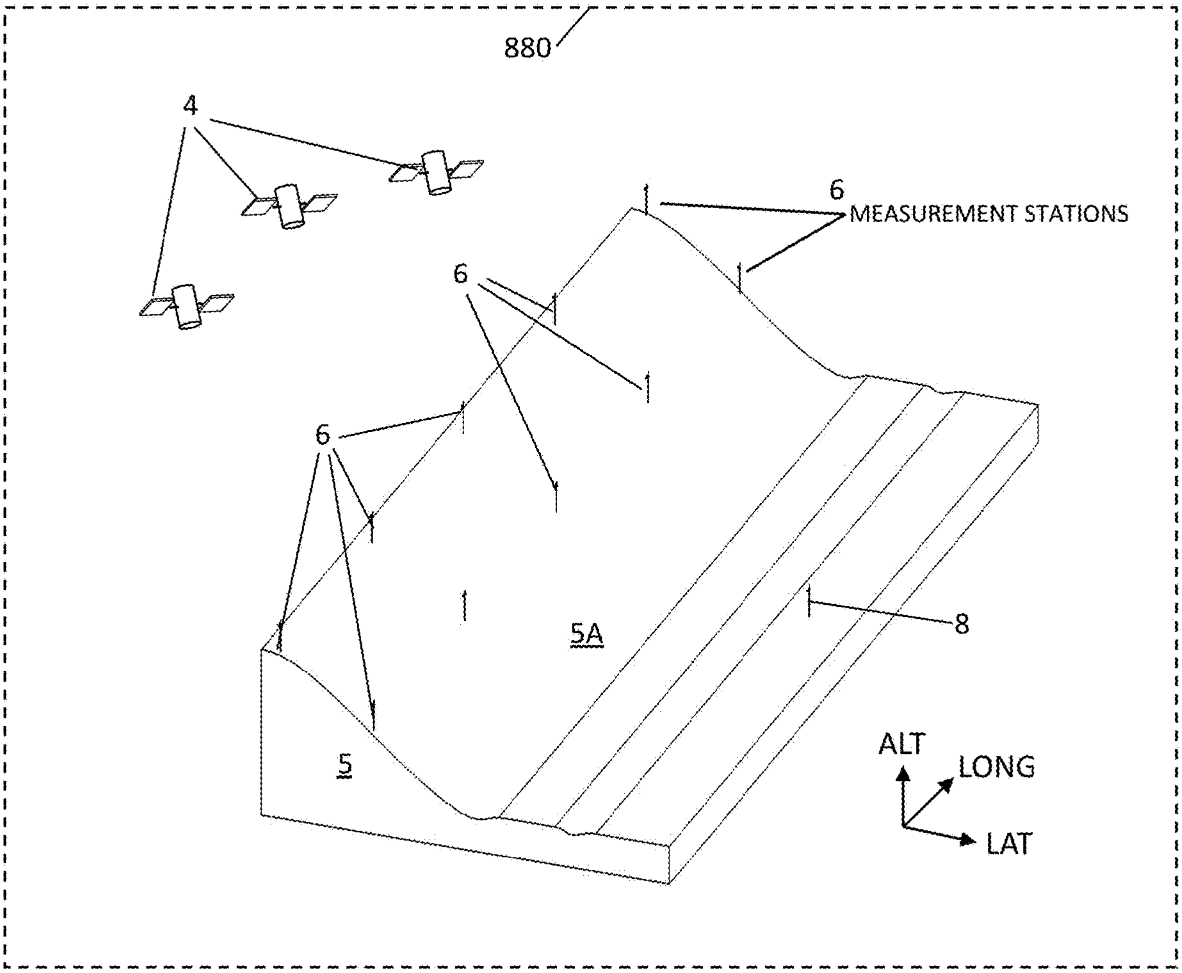
FIG. 246A1
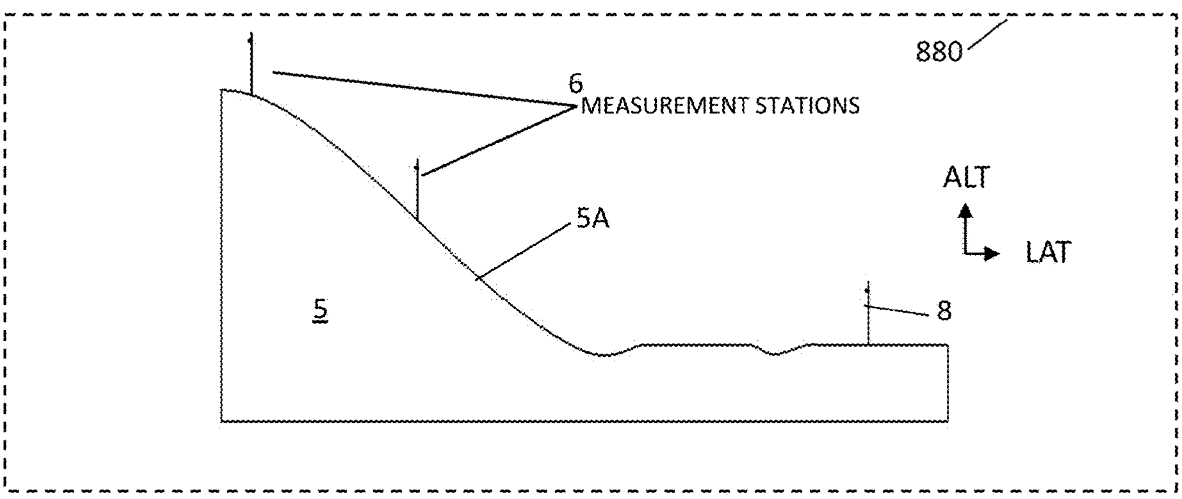
FIG. 246A2

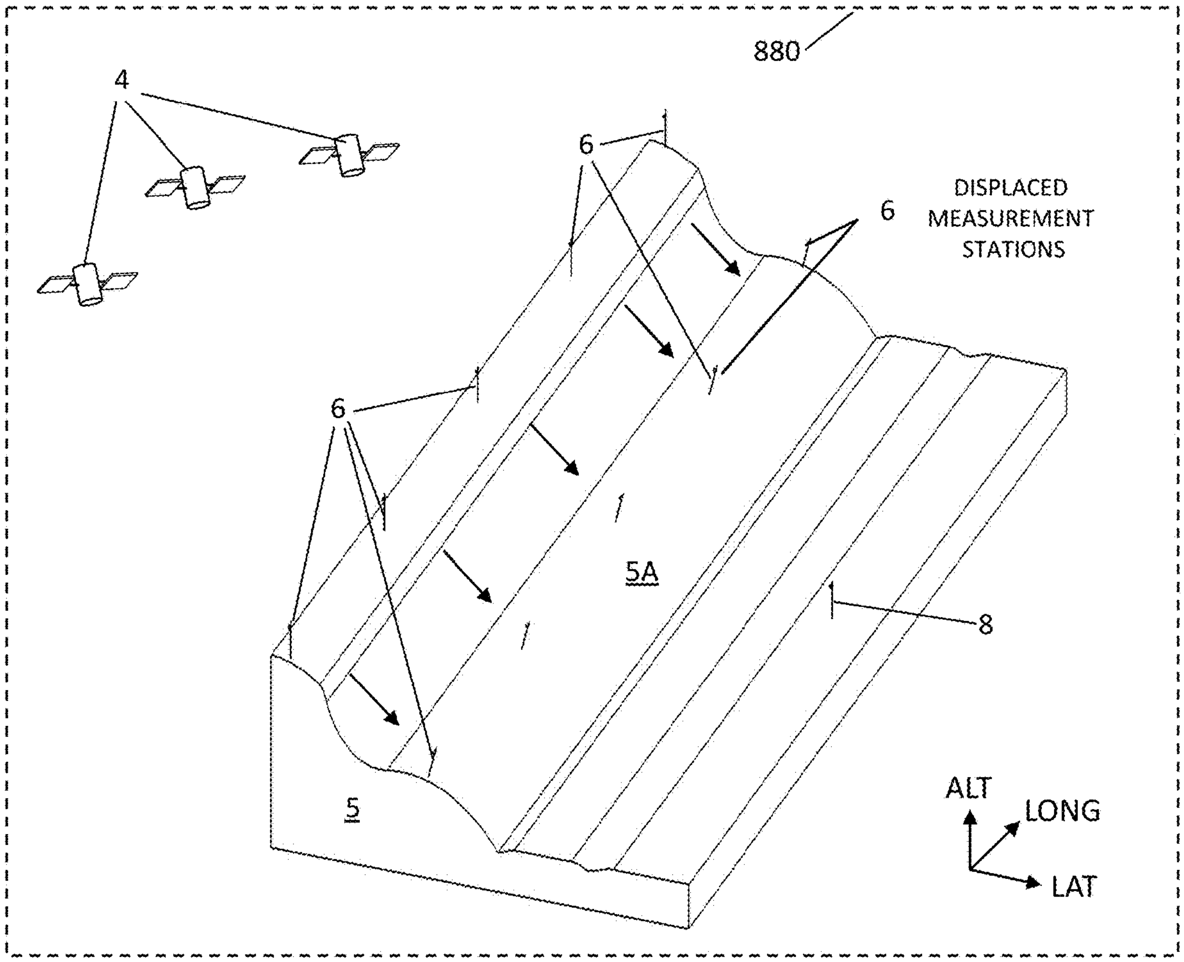
FIG. 246B1
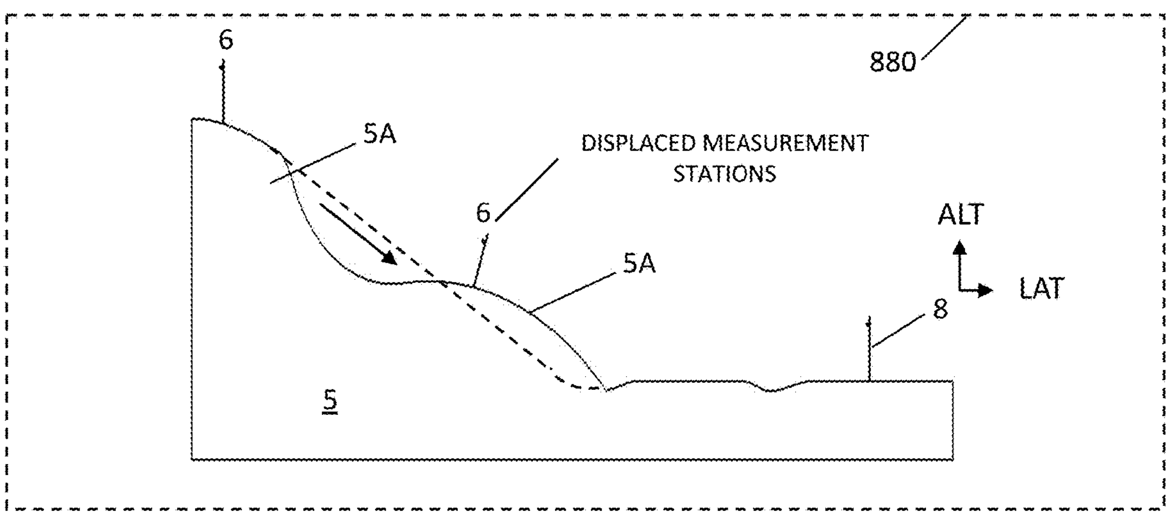
FIG. 246B2

MONITORING STRUCTURAL DISPLACEMENT RESPONSE USING SYSTEM OF PRESENT INVENTION OPERATING IN SOIL DISPLACEMENT AND VIBRATION MONITORING AND ALERT MODE

Figure 253A:
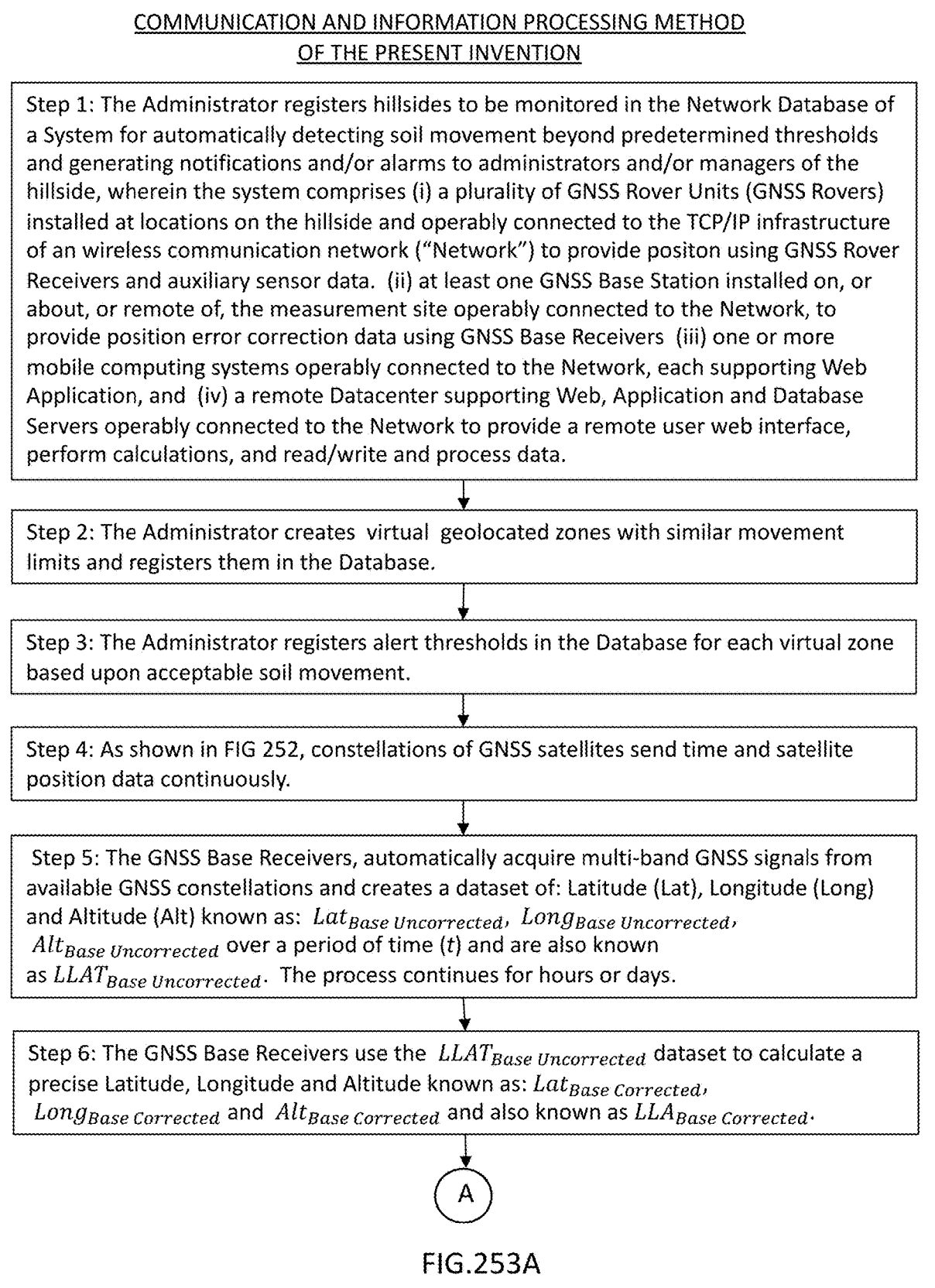

COMMUNICATION AND INFORMATION PROCESSING METHOD OF THE PRESENT INVENTION

Step 1: The Administrator registers hillsides to be monitored in the Network Database of a System for automatically detecting soil movement beyond predetermined thresholds and generating notifications and/or alarms to administrators and/or managers of the hillside, wherein the system comprises (i) a plurality of GNSS Rover Units (GNSS Rovers) installed at locations on the hillside and operably connected to the TCP/IP infrastructure of an wireless communication network ("Network") to provide positon using GNSS Rover Receivers and auxiliary sensor data. (ii) at least one GNSS Base Station installed on, or about, or remote of, the measurement site operably connected to the Network, to provide position error correction data using GNSS Base Receivers (iii) one or more mobile computing systems operably connected to the Network, each supporting Web Application, and (iv) a remote Datacenter supporting Web, Application and Database Servers operably connected to the Network to provide a remote user web interface, perform calculations, and read/write and process data.

↓

Step 2: The Administrator creates virtual geolocated zones with similar movement limits and registers them in the Database.

↓

Step 3: The Administrator registers alert thresholds in the Database for each virtual zone based upon acceptable soil movement.

↓

Step 4: As shown in FIG 252, constellations of GNSS satellites send time and satellite position data continuously.

↓

Step 5: The GNSS Base Receivers, automatically acquire multi-band GNSS signals from available GNSS constellations and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time ($t$) and are also known as $LLAT_{Base\ Uncorrected}$. The process continues for hours or days.

↓

Step 6: The GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

Figure 253B:
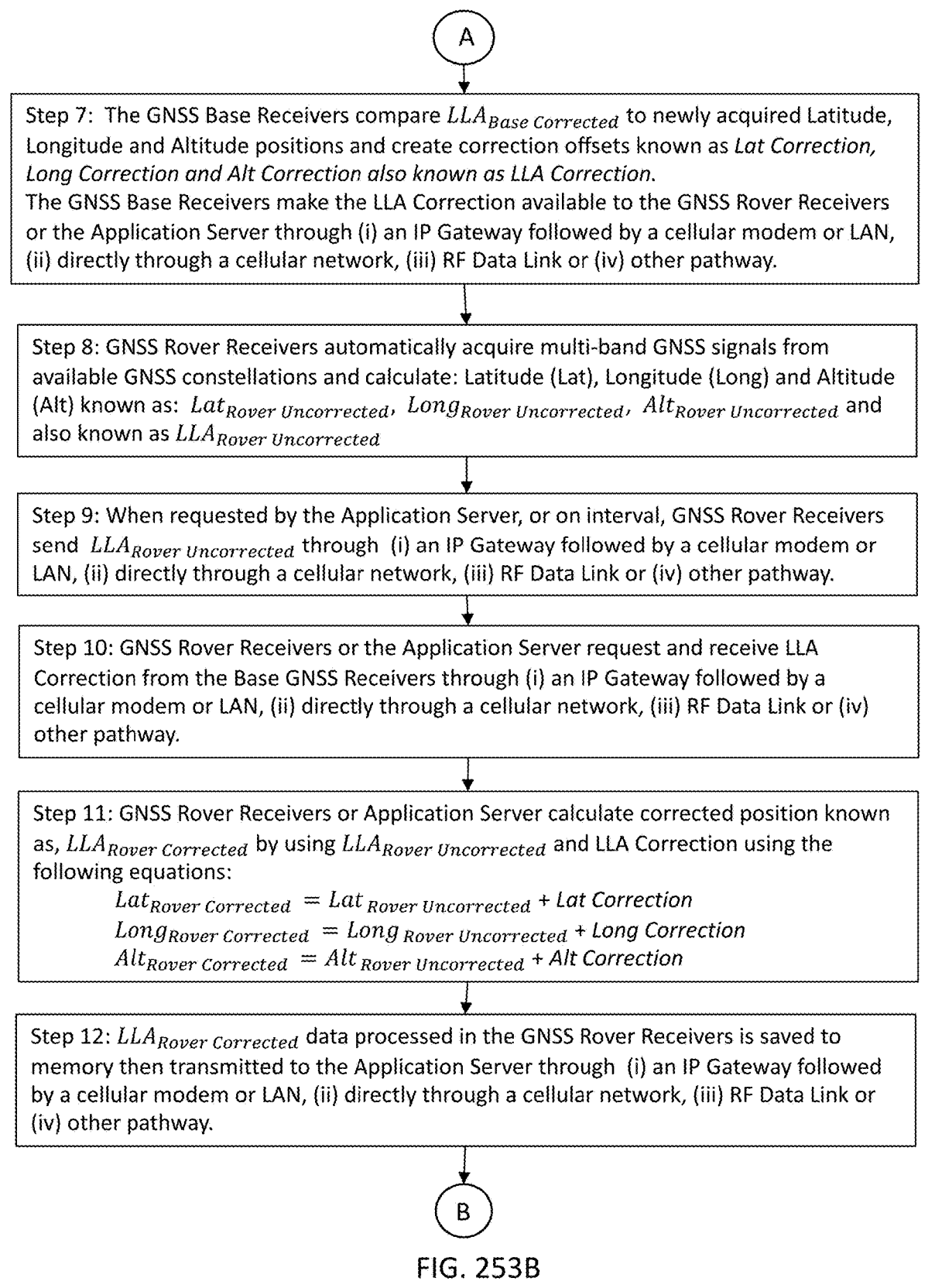

Step 7: The GNSS Base Receivers compare $LLA_{Base\ Corrected}$ to newly acquired Latitude, Longitude and Altitude positions and create correction offsets known as *Lat Correction, Long Correction and Alt Correction also known as LLA Correction.*
The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

Step 8: GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$ Step 9: When requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

Step 10: GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

Step 11: GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + Lat\ Correction$$
$$Long_{Rover\ Corrected} = Long_{Rover\ Uncorrected} + Long\ Correction$$
$$Alt_{Rover\ Corrected} = Alt_{Rover\ Uncorrected} + Alt\ Correction$$

Step 12: $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

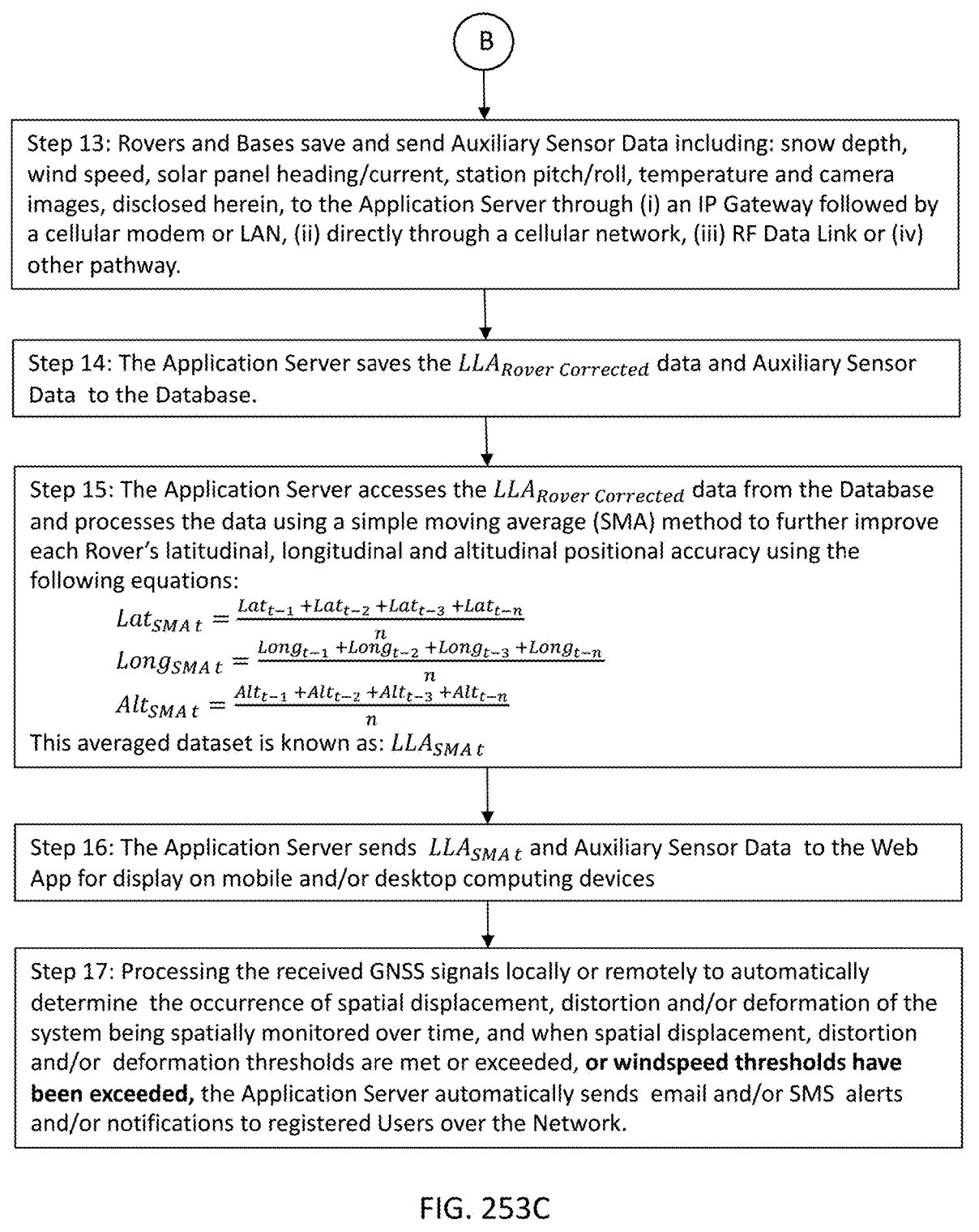

Step 13: Rovers and Bases save and send Auxiliary Sensor Data including: snow depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

Step 14: The Application Server saves the $LLA_{Rover\ Corrected}$ data and Auxiliary Sensor Data to the Database.

Step 15: The Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMA\,t} = \frac{Lat_{t-1} + Lat_{t-2} + Lat_{t-3} + Lat_{t-n}}{n}$$

$$Long_{SMA\,t} = \frac{Long_{t-1} + Long_{t-2} + Long_{t-3} + Long_{t-n}}{n}$$

$$Alt_{SMA\,t} = \frac{Alt_{t-1} + Alt_{t-2} + Alt_{t-3} + Alt_{t-n}}{n}$$

This averaged dataset is known as: $LLA_{SMA\,t}$

Step 16: The Application Server sends $LLA_{SMA\,t}$ and Auxiliary Sensor Data to the Web App for display on mobile and/or desktop computing devices Step 17: Processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the Network.

FIG. 253C

METHODS OF AND SYSTEMS, NETWORKS AND DEVICES FOR REMOTELY DETECTING AND MONITORING THE DISPLACEMENT, DEFLECTION AND/OR DISTORTION OF STATIONARY AND MOBILE SYSTEMS USING GNSS-BASED TECHNOLOGIES

BACKGROUND OF INVENTION

Field of Invention

The present invention relates to new and improved methods of and apparatus for detecting and measuring movement, deflection, displacement and/or distortion of stationary and mobile systems alike using remote sensing technologies.

Brief Description of the State of Knowledge in the Art

There is a great need in the art to remotely monitor both stationary and mobile structures alike in terms of how they respond to the generation of internal and external forces, and more particularly, how such structures respond, over the lapse of time and across space, in terms of detectable structural displacement, deformation and/or distortion of the structures. In general, these stationary and mobile structures include, but are not limited to, office buildings, factories, homes, civil structures such as bridges, roads and tunnels, as well as earth formations such as hillsides and valleys, as well as mobile systems and vehicles such as aircrafts, ocean vessels, ground vehicles and the like.

Currently, a variety of available technologies are being used to monitor buildings for structural displacement, including for example: (i) strain-gauges embedded within the structure and/or skin of buildings, structures and vehicles; (ii) laser beams installed close to building beams to monitor deflection in response to gravitational loading, and other sources of stress and strain on the buildings and/or vehicles; (iii) fiber-optic cables mounted within or along the structural beams and/or members of buildings and civil structures to monitor the deflection and/or distortion of such structures in response to internally and/or externally generated forces, as the case may be; (iv) other methods of direct deflection detection installed within the structure of the building; and (v) rooftop-based snow load measuring devices as disclosed on U.S. patent application Publication Ser. No. 15/794,263 by 2KR Systems, LLC, incorporated herein by reference.

Also, global navigation satellite systems (GNSS) have advanced significantly to provide reliable ways to track and monitor the movement of mobile phones, automobiles, aircraft, rockets, people, animals, and almost any object on Earth, by receiving and processing multiple GNSS signals from earth-orbiting GNSS satellites to resolve the longitudinal and latitude (LONG/LAT) location of the object being tracked. Currently, real-time kinematic (RTK) techniques have been developed to help improve spatial resolution of GPS tracking down to a few centimeters.

At the same time, significant efforts by technology leaders, such as Septentrio N.V, of Leuven, Belgium, with its Mosaic-H dual band GNSS module, are being made to improve the spatial resolution of GPS systems embedded in mobile smartphones and other mobile devices including drones, using both ordinary and improved RF antenna structures, enabling centimeter-level accuracy when provided with real-time kinematic (RTK) support.

Clearly, there have been many technologically advanced systems designed to respond to climate change driven forces impacting buildings, homes and vehicles alike for proactive monitoring and detection of dangerous risks creating conditions in buildings, mobile vehicles, and hybrid earth-based systems of diverse types.

While gains and advances are being made across many different remote sensing and monitoring technologies, there is still a great need in the art for new and improved methods of and apparatus for remotely monitoring the spatial displacement, distortion and/or deformation of stationary and mobile systems, having diverse structures, in response to internally and/or externally generated forces.

OBJECTS AND SUMMARY OF PRESENT INVENTION

Accordingly, a primary object of the present invention is to provide new and improved methods of and apparatus for remotely monitoring the spatial displacement, distortion and/or deformation of both stationary and mobile systems, having diverse structures, in response to internally and/or externally generated forces.

Another object of the present invention is to provide such new and improved methods of remotely monitoring the spatial displacement, distortion and/or deformation of both stationary and mobile systems, having diverse structures, in response to internally and/or externally generated forces, using new and improved GNSS signal processing methods that enable automated detection of displacement, distortion and/or deformation exceeding predetermined thresholds.

Another object of the present invention is to provide a GNSS network configured for remote monitoring of the spatial displacement, distortion and/or deformation of a stationary and/or mobile system being tracked by the GNSS network, comprising a cloud-based TCP/IP network architecture supporting (i) a plurality of GNSS satellites transmitting GNSS signals towards the earth and objects below, (ii) a plurality of GNSS rovers of the present invention mounted on the rooftop surfaces of buildings for receiving and processing transmitted GNSS signals during monitoring using time averaging seismic data extraction processing, (iii) an internet gateway providing the GNSS rovers access to the Internet communication infrastructure, (iv) one or more GNSS base stations to support RTK correction of the GNSS signals, (v) one or more client computing systems for transmitting instructions and receiving alerts and notifications and supporting diverse administration, operation and management functions on the system network, (vi) a cell tower for supporting cellular data communications across the system network, and (vii) a data center supporting web servers, application servers, database and datastore servers, and SMS/text and email servers.

Another object of the present invention is to provide a new and improved a GNSS system network supported by a constellation of GNSS satellites orbiting around the Earth, and deployed for precise remote monitoring of the spatial displacement, distortion and/or deformation of stationary and/or mobile systems, using methods involving the (i) embodying of multiple GNSS rovers within the boundary of the stationary and/or mobile system being monitored by the GNSS system network, (ii) receiving GNSS signals transmitted from GNSS satellites orbiting the Earth, and (iii) determining the geo-location (GPS coordinates) and timestamp of each GNSS rover while the stationary and/or mobile system is being monitored for spatial displacement, distortion and/or deformation, using GNSS-based rover data processing methods practiced aboard the system, or remotely within the application and database servers of the data center of the GNSS system network.

Another object of the present invention is to provide a new and improved method of implementing a GNSS system network enabling high-resolution monitoring of spatial displacement, distortion and/or deformation of a stationary and/or mobile system using a spatial measurement engine accordance with the principles of the present invention, wherein the spatial measurement engine comprises (i) GNSS receivers embedded within the boundary of a stationary and/or mobile system to be monitored, (ii) the GNSS receivers receiving GNSS signals transmitted from GNSS satellites orbiting the Earth, and (iii) a rover data processing module aboard the system for monitoring of spatial displacement, distortion and/or deformation of a stationary and/or mobile system, using a preprocessing module, a bank of data samplers controlled by data sample controllers, a time averaging module controlled by a time averaging controller, a data buffer memory for buffering data from the time averaging module, and an I/O Interface module for receiving module configuration data to configure the mode of the multi-mode data processing module, time-averaging control data for controlling the time-averaging controller, and sample-rate control data for controlling the data sample controller, and a spatial derivative processing module connected to the I/O interface module.

Another object of the present invention is to provide a new and improved method of implementing a GNSS system network enabling high-resolution monitoring of spatial displacement, distortion and/or deformation of a stationary and/or mobile system using a spatial measurement engine accordance with the principles of the present invention, wherein the spatial measurement engine comprises (i) GNSS receivers embedded within the boundary of a stationary and/or mobile system to be monitored, (ii) the GNSS receivers receiving GNSS signals transmitted from GNSS satellites orbiting the Earth, and (iii) a rover data processing module aboard the application and database servers of a data center, for monitoring of spatial displacement, distortion and/or deformation of a stationary and/or mobile system, using a preprocessing module, a bank of data samplers controlled by data sample controllers, a time averaging module controlled by a time averaging controller, a data buffer memory for buffering data from the time averaging module, and an I/O Interface module for receiving module configuration data to configure the mode of the multi-mode data processing module, time averaging control data for controlling the time averaging controller, and sample rate control data for controlling the data sample controller, and a spatial derivative processing module connected to the I/O interface module.

Another object of the present invention is to provide a new and improved GNSS system network that can be deployed and supported by (i) a plurality of GNSS constellations including the GPS (USA) satellite system, the GLONASS (Russia) satellite system, GALILEO (EU) satellite system, the BEIDOU (China) satellite system, and the QZSS (Japan) satellite system, (ii) GNSS rovers having GNSS receivers with L band antennas mounted on the building site and employing onboard time-averaging data extraction processing principles, and (iii) data centers supporting the functions of the present invention.

Another object of the present invention is to provide a new and improved GNSS system network that can be deployed and supported by (i) a plurality of GNSS constellations including the GPS (USA) satellite system, the GLONASS (Russia) satellite system, GALILEO (EU) satellite system, the BEIDOU (China) satellite system, and the QZSS (Japan) satellite system, (ii) GNSS rovers having GNSS receivers with L band antennas mounted on the building site, (iii) data centers supporting remote time-averaging data extraction processing principles according to the present invention illustrated.

Another object of the present invention is to provide a new and improved method of remotely monitoring the spatial displacement, distortion and/or deformation of the stationary and/or mobile systems, involving the processing of GNSS signals received locally at a point on the system surface, automatically determining the occurrence of spatial displacement, distortion and/or deformation of the system being spatially monitored over time, and if and when structural movement thresholds are met or exceeded by the system being monitored, automatically sending email and/or SMS alerts and/or notifications to registered users over the GNSS system network.

Another object of the present invention is to provide a new and improved GNSS-based system network comprising (i) a plurality of GNSS satellites transmitting GNSS signals towards the earth and objects below, (ii) a cloud-based TCP/IP network architecture, (iii) a plurality of GNSS rovers mounted on the rooftop surfaces of buildings having an internet gateway and building LAN, for receiving and processing transmitted GNSS signals during monitoring using time averaging seismic data extraction processing, (iv) an internet gateway providing the GNSS rovers access to the Internet communication infrastructure, (v) one or more GNSS base stations to support RTK correction of the GNSS signals, (vi) one or more client computing systems for transmitting instructions and receiving alerts and notifications and supporting diverse administration, operation and management functions on the system network, (vii) a cell tower for supporting cellular data communications across the system network, and (viii) a data center supporting web servers, application servers, database and datastore servers, and SMS/text and email servers.

Another object of the present invention is to provide a new and improved GNSS system network supporting pole-mounted GNSS rovers mounted near roof drains and scuppers and equipped with GNSS sensors for spatial monitoring a building system structure, and also pressure sensors configured for sensing and measuring the pooling of water on its rooftop surface which can cause great structural damage if roof drains or scuppers are obstructed and prevented from draining the flow of water.

Another object of the present invention is to provide a new and improved GNSS system network supporting surface-mounted GNSS rovers mounted near roof drains and scuppers, for spatial monitoring a building system and also sensing and monitoring the pooling of water on its rooftop surface which can obstruct drains, prevent water flow and drainage and cause great property damage.

Another object of the present invention is to provide a new and improved GNSS system network supporting surface-mounted GNSS rovers mounted near roof drains and scuppers, and supporting an integrated high-density digital camera system with still and video capture modes, and the detection of motion and changes of images captured by the high-density digital camera system operating in the video capture mode.

Another object of the present invention is to provide a new and improved GNSS rover unit for use in a GNSS system network, and mounting on a building rooftop surface using either pole-mounted or surface-mounted mechanisms, wherein the GNSS rover unit comprises (i) radio signal subsystems supporting (a) internet data flow using a cellular transceiver (XCVR) with antenna and an internet gateway transceiver (XCVR), (b) RTK position correction data flow using base to rover radio signal transceivers, and (c) GNSS signal reception using multiband GNSS transceivers, (ii) a programmed microprocessor and supporting memory architecture for supporting all control and operating functions, provided with a user I/O interface, battery power module, solar PV panel and charge controller, and (iii) an array of ancillary sensors including, but not limited to, snow pressure sensors, snow depth sensor, wind-speed sensor, digital cameras, roof-surface liquid pressures sensor, atmospheric pressure sensors, drain freeze sensors, temperature and humidity sensors, 3-axis accelerometers, and electronic compass instrument, configured and arranged for receiving corrected GNSS signals and determining the position of the GNSS rover relative to a global reference system, and differential displacement of the GNSS rover over time as determined by the spatial measurement engine of the present invention.

Another object of the present invention is to provide a new and improved GNSS rover unit for use in a GNSS system network, employing variable time-averaging based displacement data extraction processing methods, wherein at least 1 CM spatial displacement resolution is enabled when using a 1 second RTK-corrected data sampling rate and 1 hour of time-averaging based displacement data extraction processing.

Another object of the present invention is to provide a new and improved GNSS rover unit for use in a GNSS system network, employing variable time-averaging based displacement data extraction processing methods, wherein at least 1 CM spatial displacement resolution is enabled when using a 5 minute RTK-corrected data sampling rate and 1 hour of time-averaging based displacement data extraction processing.

Another object of the present invention is to provide a new and improved GNSS rover unit for use in a GNSS system network, employing variable time-averaging based displacement data extraction processing methods, wherein at least 1 CM spatial displacement resolution is enabled when using a 15 minute RTK-corrected data sampling rate and 3 hours of time-averaging based displacement data extraction processing.

Another object of the present invention is to provide a new and improved GNSS system network supporting pole-mounted GNSS rovers having ponding sensors mounted near roof drains and scuppers, and specially adapted for monitoring the pooling of water on the rooftop surface which can cause great structural damage if and when the roof drains or scuppers should happened to become obstructed and water flow and drainage prevented.

Another object of the present invention is to provide a new and improved GNSS system network supporting a pole mounted GNSS rover unit with integrated Pond-Depth Sensor employed in the GNSS system network installed near a rooftop drain cover.

Another object of the present invention is to provide a new and improved GNSS system network supporting a pole-mounted GNSS rover unit with integrated Pond-Depth Sensor, and snow pressure and windspeed sensors as well for deployment in the GNSS system network installation.

Another object of the present invention is to provide a new and improved GNSS system network supporting a surface-mounted GNSS rover with an integrated pond-depth sensor, mounted near roof drains and scuppers, also adapted for automated monitoring and measuring the pooling of water on the rooftop surface and communication over the wireless GNSS system network, shown comprising a base stand portion weight for stable support on a rooftop surface for sensing the pooling of water of the rooftop surface, and an upper controller portion containing electronics and radio communication equipment, supported above the stand portion by a hollow pole or otherwise tubular structure.

Another object of the present invention is to provide a new and improved GNSS system network supporting a surface-mounted GNSS rover with an integrated pond-depth sensor, mounted near roof drains and scuppers, also adapted for automated monitoring and measuring the pooling of water on the rooftop surface and communication over the wireless GNSS system network, shown comprising a base stand portion weight for stable support on a rooftop surface for sensing the pooling of water of the rooftop surface, and an upper controller portion containing electronics and radio communication equipment, supported above the stand portion by a hollow pole or otherwise tubular structure.

Another object of the present invention is to provide a new and improved GNSS system network supporting a pond-depth sensing GNSS rover unit provided with a first portable weighted base component adapted to sense the development of a water pond on a rooftop surface.

Another object of the present invention is to provide a new and improved GNSS system network supporting a pond-depth sensing GNSS rover unit provided with a second portable weighted base component adapted to sense the development of a water pond on a rooftop surface.

Another object of the present invention is to provide a new and improved GNSS system network supporting a pond-depth sensing GNSS rover unit provided with a portable weighted base component adapted to sense the development of a water pond on a rooftop surface.

Another object of the present invention is to provide a new and improved GNSS system network supporting a pond-depth sensing GNSS rover unit provided with a permanently-mounted roof mount (i.e. base component) design enabling the sensing of water pond developing on a rooftop surface.

Another object of the present invention is to provide a new and improved GNSS system network supporting a pond-depth sensing GNSS rover unit provided with an external pond-depth sensor.

Another object of the present invention is to provide a new and improved GNSS rover system for deployed on a GNSS system network, comprising within a GNSS rover controller housing the following components, namely: (i) radio signal subsystems supporting (a) internet data flow using a cellular transceiver (XCVR) with antenna and an internet gateway transceiver (XCVR), (b) RTK position correction data flow using base to rover radio signal transceivers, and (c) GNSS signal reception using multiband GNSS transceivers, (ii) a programmed microprocessor and supporting a memory architecture for supporting the functions of the system, and also provided with a user I/O interface, battery power module, solar PV panel and charge controller, and (iii) an array of ancillary sensors including, but not limited to, snow pressure sensors, snow depth sensors, wind-speed sensors, digital cameras, roof-surface liquid pressures sensors, atmospheric pressure sensors, drain freeze sensors, temperature and humidity sensors, 3-axis accelerometers, electronic compass instruments, configured and arranged for receiving corrected GNSS signals and determining the position of the GNSS rover relative to a global reference system, and local or remote signal processing to determine spatial displacement, distortion and/or deformation of the system being monitored by the spatial measurement engine of the present invention schematically depicted in FIG. 26, and further including external sensors including a snow pressure sensor and a drain freeze sensor.

Another object of the present invention is to provide a new and improved pond-depth sensing instrument system for integration within a GNSS rover system, and measuring the depth of ponding on a rooftop or like surface using a first method of pressure measurement (M1) employing (i) a first "local" absolute pressure sensor (reference) for measuring the atmospheric pressure as a pressure reference using a first strain gauge sensor mounted on a first sensing membrane within pressure test measurement chamber and producing an output voltage ($V_{atm}$), and (ii) a second absolute pressure sensor for measuring the pressure of the liquid and the atmosphere using as second strain gauge (i.e. solid-state) sensor mounted on a second sensing membrane within pressure test measurement chamber and producing an output voltage ($V_{atm}$), and (iii) a signal processor for computing the difference between these pressure measurements to provide the pressure of the liquid and then scaling this measure with a conversion factor k1 to compute the depth of liquid (i.e. pond-depth) in the instrument test region, where $P_{Liquid}=P_{ATM+Liquid}-P_{ATM}$, and height of liquid depth $H=P_{Liquid}/P_{water}$.

Another object of the present invention is to provide a new and improved pond-depth sensing instrument system for integration within a GNSS rover system, and measuring the depth of water ponding on a rooftop or like surface using a first method of pressure measurement (M1) employing (i) a first "remote" pressure reference (e.g. NOAA, NMS, etc.) or other remote sensing station, for measuring the atmospheric reference, and (ii) a second absolute pressure sensor for sensing and measuring the pressure of the liquid and the atmosphere using as second strain gauge sensor mounted on a sensing membrane within pressure test measurement chamber and producing an output voltage ($V_{atm}$), and (iii) a signal processor for computing the difference between these pressure measurements to provide the pressure of the liquid and then scaling this measure with a conversion factor k1 to compute the depth of liquid (i.e. pond-depth) in the instrument test region, where $P_{Liquid}=P_{ATM+Liquid}-P_{ATM}$, and height of liquid depth $H=P_{Liquid}/P_{water}$.

Another object of the present invention is to provide a new and improved pond-depth sensing instrument system for integration within the GNSS rover system, and measuring the depth of ponding on a rooftop or like surface using a second method of pressure measurement (M2) employing a differential pressure sensor for measuring the atmospheric reference using a strain gauge sensor mounted on a sensing membrane within pressure test measurement chamber and producing an output voltage ($V_{Liquid}$), and a signal processor for scaling the measured liquid pressure with a conversion factor k2 to compute the depth of liquid (i.e. pond-depth) in the instrument test region, where $P_{Liquid}=(V_{Liquid})*k2$, and height of liquid depth $H=P_{Liquid}/P_{water}$;

Another object of the present invention is to provide a new and improved GNSS rover system with an integrated in-pole pond-depth sensing instrument comprising a GNSS controller portion having a base housing, a PC board with antenna element, an upper housing with antenna cover, and a hollow support pole mounted to the base housing supporting the PC board and its onboard absolute pressure sensors.

Another object of the present invention is to provide a new and improved GNSS rover system comprising a base housing plate supporting a PC board with antenna element, an upper housing with antenna cover, and a hollow support pole connected to the base housing support plate providing fluid/air communication between the absolute pressure sensor and the bottom of the hollow support pole.

Another object of the present invention is to provide a new and improved GNSS rover system with an integrated in-pole pond-depth sensing instrument comprising a GNSS controller portion having a base housing with support plate, a PC board with antenna element mounted in the support plate and solid-state pressure sensors, an upper housing with antenna cover, and a hollow support pole having a pressure sensing tube mounted therealong and connected to a sensing port in the base plate and a funnel at the bottom end of the support tube for sensing the depth of ponding of water on a rooftop surface, above which the bottom end of the support tube is supported via a support base structure.

Another object of the present invention is to provide a new and improved GNSS rover system comprising a base housing mounting plate, a PC board with antenna element supported within the mounting plate and solid-state pressure sensors, and a hollow support pole for connection to the sensing port formed in the base housing mounting plate.

Another object of the present invention is to provide a new and improved GNSS rover system with an integrated in-pole pond-depth sensing instrument comprising a GNSS controller portion having a base housing, a PC board with an antenna element and solid-state pressure sensors, an upper housing with an antenna cover, and a hollow support pole having a pressure sensing tube mounted therealong and connected to a fixed pressure measurement chamber at the bottom end of the support tube, for the purpose of sensing the depth of ponding of water on a rooftop surface, above which the bottom end of the support tube is supported via a support base structure.

Another object of the present invention is to provide a new and improved GNSS rover system with an integrated in-pole pond-depth sensing instrument comprising a GNSS controller portion having a base housing, a PC board with an antenna element and solid-state pressure sensors, an upper housing with an antenna cover, and a hollow support pole having a cable mounted therealong and extending outside the support tube and terminating in two absolute pressuring sensors mounted at the cable end, for the purpose of sensing the depth of ponding of water near a drain on a rooftop surface.

Another object of the present invention is to provide a new and improved GNSS rover system provided with an integrated in-pole pond-depth sensing instrument comprising a GNSS controller portion having a base housing, a PC board with an antenna element and solid-state pressure sensors, an upper housing with an antenna cover, and a hollow support pole having a cable mounted therealong and extending to the bottom of the support tube and terminating in a pair of absolute pressuring sensors mounted at the cable end, for sensing the depth of ponding of water on a rooftop surface near the bottom of the support tube orthogonal to the support base typically located near a rooftop rain drain.

Another object of the present invention is to provide a new and improved method of measuring absolute roof surface pressure and atmospheric pressure by absolute pressure sensors employed in a pond-depth sensing instrument system, wherein the pond-depth is measured and calculated (in inches) by the pond-depth sensing instrument system over the passage of time, including the occurrence of a rain event, steady or variable atmospheric pressure, and with or without rooftop drain clogging.

Another object of the present invention is to provide a new and improved GNSS rover system provided with an integrated in-pole pond-depth sensing instrument comprising a GNSS controller portion having a base housing, a PC board with an antenna element and solid-state pressure sensors, an upper housing with an antenna cover, and a hollow support pole mounted to the base housing.

Another object of the present invention is to provide a new and improved GNSS rover system provided with an integrated in-pole pond-depth sensing instrument comprising a GNSS controller portion having a base housing, a PC board with an antenna element and solid-state pressure sensors, upper housing with an antenna cover, and a hollow support pole connected to a support base structure for sensing the pond-depth of water pooling on the rooftop surface of a building.

Another object of the present invention is to provide a new and improved GNSS rover system provided with an integrated in-pole pond-depth sensing instrument comprising a GNSS controller portion having a base housing, a PC board with an antenna element and solid-state pressure sensors, an upper housing with an antenna cover, and a hollow support pole connected to a support base structure for sensing the pond-depth of water pooling on the rooftop surface of a building.

Another object of the present invention is to provide a new and improved GNSS rover system provided with an integrated in-pole pond-depth sensing instrument comprising a GNSS controller portion having a base housing, a PC board with antenna element and solid-state pressure sensors, an upper housing with antenna cover, and a hollow support pole connected to a weighted block-like support base structure for sensing pond-depth of water pooling at the bottom surface of the base structure.

Another object of the present invention is to provide a new and improved building structure having a roof surface upon which the GNSS system network is deployed and operating, wherein each GNSS rover system is realized as a surface-mounted rover device and employs an integrated pond-depth sensing instrument using absolute pressure sensors mounted nearby a roof drain to automatically and continuously or periodically monitor the rooftop drain region for possible pooling of rainwater.

Another object of the present invention is to provide a new and improved GNSS surface-mounted rover device shown mounted in the vicinity of a rooftop drain and capable of monitoring and measuring the pond-depth of rainwater collected in the monitoring range of the rover device.

Another object of the present invention is to provide a new and improved GNSS surface-mounted rover system deployed using an externally generated atmospheric pressure measurement (e.g. transmitted from NOAA) and received by the surface-mounted GNSS rover system and used with a locally sensed absolute pressure for measuring the pond surface pressure level, for use in pond-depth measurement calculations.

Another object of the present invention is to provide a new and improved surface-mounted GNSS rover device employing a pond-depth sensing instrument subsystem using an external atmospheric pressure obtained from a remote source such as NOAA.

Another object of the present invention is to provide a new and improved surface-mounted GNSS rover device comprising a base housing portion, a PC board equipped with an integrated color video/still-frame camera system on chip (SOC), a solar modules, an RTK antenna, an optically-transparent cover housing portion, a waterproof sealing ring, a set of fastening screws, and an atmospheric air pressure sensing tube.

Another object of the present invention is to provide a new and improved GNSS surface-mounted rover system employing an integrated pond-depth sensing instrument system using a pair of local absolute pressure sensors for measuring local atmospheric and pond surface pressure levels for use in pond-depth measurement calculations.

Another object of the present invention is to provide a new and improved surface-mounted GNSS rover system deployed on a GNSS system network and containing, within a GNSS rover controller housing, the following components: (i) radio signal subsystems supporting (a) internet data flow using a cellular transceiver (XCVR) with antenna and an internet gateway transceiver (XCVR), (b) RTK position correction data flow using base to rover radio signal transceivers, and (c) GNSS signal reception using multiband GNSS transceivers, (ii) a programmed microprocessor and supporting memory architecture, provided with a user I/O interface, battery power module, solar PV panel and charge controller, and (iii) an array of ancillary sensors including, but not limited to, snow pressure sensors, snow depth sensors, wind-speed sensors, digital cameras, roof-surface liquid pressures sensors, atmospheric pressure sensors, drain freeze sensors, temperature and humidity sensors, 3-axis accelerometers, electronic compass instrument, configured and arranged for receiving corrected GNSS signals and determining the position of the GNSS rover relative to a global reference system, and differential displacement of the GNSS rover over time as determined by the spatial measurement engine and further including external sensors including a snow pressure sensor and a drain freeze sensor.

Another object of the present invention is to provide a new and improved pond-depth sensing instrument system for measuring pond-depth (in inches) using the absolute atmospheric pressure and the absolute roof surface pressure measured by a pair of absolute pressure sensors employed in the pond-depth sensing instrument system, over the passage of time including the occurrence of a rain event, steady and variable atmospheric pressure and with and without draining.

Another object of the present invention is to provide a new and improved GNSS base station comprising a GNSS controller portion having a base housing, a PC board with an antenna element, an upper housing with an antenna cover, and a hollow support pole mounted to a base housing.

Another object of the present invention is to provide a new and improved GNSS system network for monitoring deflection and/or displacement of a building rooftop, wherein a GNSS base station is shown mounted external to the building on a stationary region of the building, in capable of movement or deflection, while a plurality of GNSS rover units are mounted on the rooftop for detecting displacement and/or deflection.

Another object of the present invention is to provide a new and improved GNSS base station system for deployment on a GNSS system network, and comprising (i) a GNSS base controller housing equipped with radio signal subsystems supporting (a) internet data flow using a cellular transceiver (XCVR) with antenna and an internet gateway transceiver (XCVR), (b) RTK position correction data flow using base to rover radio signal transceivers, and (c) GNSS signal reception using multiband GNSS transceivers, (ii) a programmed microprocessor and supporting memory architecture, provided with a user I/O interface, battery power module, solar PV panel and charge controller, and (iii) an array of ancillary sensors including, but not limited to, snow pressure sensors, snow depth sensor, wind-speed sensor, digital cameras, roof-surface liquid pressure sensor, atmospheric pressure sensor, drain freeze sensor, temperature and humidity sensors, 3-axis accelerometers, and electronic compass instrument, configured and arranged for computing corrected GNSS signals and determining the position of the GNSS base station relative to a global reference system, and determining differential displacement of the GNSS rover over time as determined by the spatial measurement engine and further including external sensors including a snow pressure sensor and a drain freeze sensor.

Another object of the present invention is to provide a new and improved GNSS system network, wherein a set of GNSS rover units are deployed on the building rooftop, with one GNSS base unit being assigned as an active primary base unit communicating with other active GNSS rover units, and wherein one active GNSS rover unit is assigned as a GNSS rover and an inactive secondary GNSS base (backup) unit.

Another object of the present invention is to provide a new and improved GNSS system network, wherein the set of GNSS rover units are deployed on the building rooftop, and wherein the first GNSS base unit has been disabled, and the backup GNSS rover unit has been assigned as an active secondary GNSS base unit, communicating with the active GNSS rover units.

Another object of the present invention is to provide a new and improved method of communication and information processing carried out by an active GNSS base station, generating and transmitting LAT, LONG and ALT Correction offsets to a plurality of GNSS rovers units mounted on a building structure being remotely monitored.

Another object of the present invention is to provide a new and improved mobile client system for deployment on the system network, comprising: a processor(s); a memory interface; memory for storing operating system instructions, an electronic messaging instructions, communication instructions, GUI instructions, sensor processing instructions, phone instructions, web browsing instructions, media processing instructions, GPS/navigation instructions, camera instructions, other software instructions, and GUI adjustment instructions; peripherals interface; touch-screen controller; other input controller(s); touch screen displays; other input/control devices; i/o subsystem; other sensor(s); motion sensors; light sensors; proximity sensors; camera subsystem; wireless communication subsystem(s); and an audio subsystem.

Another object of the present invention is to provide a new and improved method of communication and information processing supported on a GNSS system platform, wherein the method comprises the steps of (i) processing GNSS signals received locally at a point on or behind the surface of the stationary and/or mobile system, and (ii) automatically determining the occurrence of spatial displacement, distortion and/or deformation of the system being spatially monitored over time, and (iii) when spatial displacement, distortion and/or deformation thresholds are met or exceeded, automatically sending email and/or SMS alerts and/or notifications to registered Users over the GNSS system network.

Another object of the present invention is to provide a new and improved GNSS-based system network deploying a plurality of GNSS rover stations and an onsite base station on a building being monitored by the GNSS system network, wherein the GNSS system network comprises (i) a cloud-based TCP/IP network architecture with a plurality of GNSS satellites transmitting GNSS signals towards the earth and objects below, (ii) a plurality of GNSS rovers mounted on the rooftop surface of building for receiving and processing transmitted GNSS signals during monitoring using time averaging data extraction and spatial derivative processing techniques performed locally or remotely, (iii) one or more GNSS base stations to support RTK correction of the GNSS signals, (iv) one or more client computing systems for transmitting instructions and receiving alerts and notifications and supporting diverse administration, operation and management functions on the GNSS system network, (v) a cell tower for supporting cellular data communications across the GNSS system network, and (vi) a data center supporting web servers, application servers, database and datastore servers and SMS/text and email servers for communicating with mobile computing systems used in monitoring the deployed GNSS rover stations.

Another object of the present invention is to provide a new and improved GNSS system network deployed for purposes of monitoring the building rooftop, while using RTK correction data supplied by the onsite GNSS base station and RTK correction processing within each deployed GNSS rover station for high-spatial resolution accuracy.

Another object of the present invention is to provide a new and improved GNSS system network deployed for purposes of monitoring the building rooftop, wherein an onsite GNSS base station is mounted on the exterior of the building in a highly stationary manner.

Another object of the present invention is to provide a new and improved method of communication and information processing supported on a GNSS system platform, comprising the steps of (i) processing GNSS signals received locally at a point on or behind the surface of the stationary and/or mobile system, and (ii) automatically determining the occurrence of spatial displacement, distortion and/or deformation of the system being spatially monitored over time, and (iii) when spatial displacement, distortion and/or deformation thresholds are met or exceeded, automatically sending alerts and/or notifications to registered users over the GNSS system network.

Another object of the present invention is to provide a new and improved GNSS-based object monitoring system network employing GNSS rover stations and an onsite base station using cellular-based internet access for carrying out RTK correction of object positioning being tracked by the system network, wherein the GNSS system network comprises (i) a cloud-based TCP/IP network architecture with a plurality of GNSS satellites transmitting GNSS signals towards the earth and objects below, (ii) a plurality of GNSS rovers mounted on the rooftop surface of building for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the GNSS system network, (v) a cell tower for supporting cellular data communications across the system network, and (vi) a data center supporting web servers, application servers, database and datastore servers, and SMS/text and email servers for communicating with mobile computing systems used in monitoring the deployed GNSS rover stations.

Another object of the present invention is to provide a new and improved method of monitoring a stationary and/or mobile system by processing GNSS signals received locally at a point on or behind the surface of the stationary and/or mobile system to automatically determine the occurrence of spatial displacement, distortion and/or deformation of the building system being spatially monitored over time, and when spatial displacement, distortion and/or deformation thresholds are met or exceeded, automatically sending alerts and/or notifications to registered users upon detecting such conditions.

Another object of the present invention is to provide a new and improved GNSS-based system network comprising: (i) a cloud-based TCP/IP network architecture with a plurality of GNSS satellites transmitting GNSS signals towards the earth and objects below, (ii) a plurality of GNSS rovers mounted on the rooftop surface of building for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the GNSS system network, (v) a cell tower for supporting cellular data communications across the system network, and (vi) a data center supporting web servers, application servers, database and datastore servers, and SMS/text and email servers for communicating with mobile computing systems used in monitoring the deployed GNSS rover stations.

Another object of the present invention is to provide a new and improved GNSS system network of installed and deployed for real-time building roof beam and surface displacement and deflection monitoring in response to loads created by snow, rain ponding, and/or seismic activity, wherein GNSS rovers are mounted on the rooftop surface and continuously operating reference station (CORS) base stations are mounted on and/or around the building, and wherein RTK correction takes place within the roof-mounted rover devices.

Another object of the present invention is to provide a new and improved GNSS-based object tracking network comprising of rover stations using cellular-based internet access and continuously operating reference stations (CORS) base(s) for carrying out RTK position correction at the server/web app of object positioning being tracked by the GNSS system network, comprising: (i) a cloud-based TCP/IP network architecture with a plurality of GNSS satellites transmitting GNSS signals towards the earth and objects below, (ii) a plurality of GNSS rovers mounted on the rooftop surface of building for receiving and processing transmitted GNSS signals during monitoring using time averaging displacement/deflection data extraction processing, (iii) one or more CORS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (vi) a data center supporting web servers, application servers, database and datastore servers, and SMS/text and email servers for communicating with mobile computing systems used in monitoring the deployed GNSS rovers.

Another object of the present invention is to provide a new and improved building with a relatively flat roof surface, on which a GNSS system network installed and deployed for real-time roof beam and surface displacement and deflection monitoring in response to loads created by snow, rain ponding, and/or seismic activity, wherein rovers and base stations are mounted on the rooftop surface for monitoring rooftop deflection by collecting and processing GNSS signals transmitted from the GNSS satellite constellations.

Another object of the present invention is to provide a new and improved a building having a rooftop, upon which GNSS rovers are mounted for monitoring rooftop deflection by collecting and processing GNSS signals transmitted from the GNSS satellite constellations orbiting the Earth, wherein during snow loading on the roof surface, the phase center location (PCL) of each antenna of the GNSS rover is displaced and detected by time-averaging of GNSS signals processed over the GNSS system network.

Another object of the present invention is to provide a new and improved GNSS system network installed and configured for monitoring snow and/or rain load driven structural deflection and displacement of buildings, comprising (i) a cloud-based TCP/IP network architecture with a plurality of GNSS satellites transmitting GNSS signals towards the earth and objects below, (ii) a plurality of GNSS rovers mounted on the rooftop surface of building for receiving and processing transmitted GNSS signals during monitoring using time averaging displacement data extraction processing, (iii) one or more GNSS base stations to support RTK correction of the GNSS signals, (iv) one or more client computing systems for transmitting instructions and receiving alerts and notifications and supporting diverse administration, operation and management functions on the GNSS system network, (v) a cell tower for supporting cellular data communications across the system network, and (vi) a data center supporting web servers, application servers, database and datastore servers, and SMS/text and email servers for communicating with mobile computing systems used in monitoring the deployed GNSS rovers.

Another object of the present invention is to provide a new and improved GNSS rover unit for deployment on a GNSS system network, and comprising a cellular XCVR with an antenna, an Internet gateway XCVR with an antenna, a base to rover radio with an antenna, a multiband GNSS RCVR with antennas, a micro-processor with a memory architecture and a user I/O, a battery, a solar (PV) panel, a charge controller, a wind speed sensor, a compass, a 3 axis accelerometer, a snow pressure sensors, camera(s), temp & humidity sensors, a roof surface liquid pressure sensor, an atmospheric pressure sensor, a drain freeze sensor, a snow depth sensor, auxiliary sensors, and a compass.

Another object of the present invention is to provide a new and improved method of real-time monitoring of structural displacement response using a GNSS system network operating in its snow load monitoring and alert mode, with automated generation of structural deflection alerts.

Another object of the present invention is to provide a new and improved method of communication and information processing supported by a GNSS system platform deployed to a building rooftop for monitoring snow load driven structural deflection and displacement, comprising the steps of (i) processing GNSS signals received locally at a point on or behind the surface of the stationary and/or mobile system, and (ii) automatically determining the occurrence of spatial displacement, distortion and/or deformation of the system being spatially monitored over time, and (iii) when spatial displacement, distortion and/or deformation thresholds are met or exceeded, and automatically sending email and/or SMS alerts and/or notifications to registered users over the GNSS system network.

Another object of the present invention is to provide a new and improved method of communication and information processing supported by a GNSS system platform deployed to a building rooftop for monitoring ponding and water load driven structural deflection and displacement, comprising the steps of (i) processing GNSS signals received locally at a point on or behind the surface of the stationary and/or mobile system, (ii) automatically determining the occurrence of spatial displacement, distortion and/or deformation of the system being spatially monitored over time, and (iii) when spatial displacement, distortion and/or deformation thresholds are met or exceeded, and/or pond-depth thresholds are met or exceeded, automatically sending email and/or SMS alerts and/or notifications to registered users over the GNSS system network.

Another object of the present invention is to provide a new and improved GNSS system network installed and deployed for real-time wind-driven roof structural damage monitoring in response to loads created by winds on rooftops, wherein rovers and base stations are mounted on the rooftop surface for monitoring rooftop deflection by collecting and processing GNSS signals transmitted from the GNSS satellite constellations.

Another object of the present invention is to provide a new and improved GNSS system network installed and deployed for real-time roof membrane (i.e. surface) displacement and deflection monitoring in response to wind-driven loads created by winds on rooftops, wherein rovers and base stations are mounted on the rooftop surface for monitoring rooftop deflection by collecting and processing GNSS signals transmitted from the GNSS satellite constellations, wherein there is shown some serious wind-driven damage caused to the rooftop surface.

Another object of the present invention is to provide a new and improved GNSS system network installed and configured for monitoring wind-driven roof membrane displacement on buildings, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement data extraction processing, (iii) one or more GNSS base stations to support RTK correction of the GNSS signals, (iv) one or more client computing systems for transmitting instructions and receiving alerts and notifications and supporting diverse administration, operation and management functions on the system network, and (v) a cell tower for supporting cellular data communications across the system network, and (vi) a data center supporting web servers, application servers, database and datastore servers, and SMS/text and email servers for communicating with mobile computing systems used in monitoring the deployed GNSS rovers.

Another object of the present invention is to provide a new and improved GNSS rover unit for deployment in a GNSS system network comprising: a cellular XCVR with antenna, an Internet gateway XCVR with antenna, a base to rover radio with antenna, a multiband GNSS RCVR with antennas, a micro-processor with a memory architecture and a user I/O, a battery, a solar (PV) panel, a charge controller, a wind speed sensor, a compass, a 3-axis accelerometer, a snow pressure sensor, camera(s), temp & humidity sensors, a roof surface liquid pressure sensor, an atmospheric pressure sensor, a drain freeze sensor, a snow depth sensor, auxiliary sensors, and a compass instrument.

Another object of the present invention is to provide a new and improved method of real-time monitoring of roof membrane displacement using a GNSS system network operating in its roof membrane monitoring and alert mode, with and automated generation of displaced (rover) station alerts, rooftop windspeed, windspeed alerts and regional windspeed.

Another object of the present invention is to provide a new and improved method of communication and information processing supported by a GNSS system platform deployed for monitoring wind-driven roof membrane displacement, involving (i) the processing GNSS signals received locally at a point on or behind the surface of the stationary and/or mobile system, (ii) automatically determining the occurrence of spatial displacement, distortion and/or deformation of the system being spatially monitored over time, and (iii) when spatial displacement, distortion and/or deformation thresholds are met or exceeded, or windspeed thresholds have been exceeded, automatically sending email and/or SMS alerts and/or notifications to registered users over the system network.

Another object of the present invention is to provide a new and improved GNSS system network installed and deployed for real-time foundation settling monitoring in response to whatever forces may act upon a building foundation, wherein rovers and base stations are mounted on the rooftop surface for monitoring rooftop displacement (due to foundation settling) by collecting and processing GNSS signals transmitted from the GNSS satellite constellations.

Another object of the present invention is to provide a new and improved GNSS system network installed and deployed for real-time structural failure monitoring in response to whatever forces may act upon a building, wherein rovers and base stations are mounted on the rooftop surface for monitoring structural failure in the building by collecting and processing GNSS signals transmitted from the GNSS satellite constellations.

Another object of the present invention is to provide a new and improved GNSS system network installed and configured for monitoring structural failure in buildings, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the GNSS system network, (v) a cell tower for supporting cellular data communications across the system network, and (vi) a data center supporting web servers, application servers, database and datastore servers, and SMS/text and email servers.

Another object of the present invention is to provide a new and improved GNSS rover unit deployed on the GNSS system network, comprising: a cellular XCVR with antenna, an Internet gateway XCVR with an antenna, a base to rover radio with an antenna, a multiband GNSS RCVR with a antennas, a micro-processor with a memory architecture and a user I/O, a battery, a solar (PV) panel, a charge controller, a wind speed sensor, a compass, a 3-axis accelerometer, a snow pressure sensor, camera(s), temp & humidity sensors, a roof surface liquid pressure sensor, an atmospheric pressure sensor, a drain freeze sensor, a snow depth sensor, auxiliary sensors, and a compass.

Another object of the present invention is to provide a new and improved method of monitoring structural displacement response using a GNSS system network operating in a foundation settling and structural failure monitoring and alert mode, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded, or windspeed thresholds have been exceeded, automatically sending alerts and/or notifications to registered users over the system network.

Another object of the present invention is to provide a new and improved building with a relatively flat roof surface, on which a GNSS system network is installed and deployed for real-time seismic activity monitoring in response to seismic activity in the vicinity of the building, wherein GNSS rovers are mounted on the rooftop surface for monitoring rooftop deflection by collecting and processing GNSS signals transmitted from the GNSS satellite constellations.

Another object of the present invention is to provide a new and improved GNSS system network installed and configured for monitoring seismic activity around a building and its response to a fault in the earth and/or shock waves generated within the earth during an earth quake, wherein said GNSS system network comprises (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging seismic data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, (v) a data center supporting web servers, application servers, database and datastore servers, and SMS/text and email servers for communicating with mobile computing systems used in monitoring the deployed GNSS rovers, and (vi) a USGS seismic detection server and data center for providing real-time seismic information to be used with the system network.

Another object of the present invention is to provide a new and improved GNSS rover unit for deployment on a GNSS system network, and comprising a cellular XCVR with antenna, an Internet gateway XCVR with antenna, a base to rover radio with antenna, a multiband GNSS RCVR with antennas, a micro-processor with a memory architecture and a user I/O, a battery, a solar (PV) panel, a charge controller, a wind speed sensor, a compass, a 3-axis accelerometer, a snow pressure sensor, camera(s), temp & humidity sensors, a roof surface liquid pressure sensor, an atmospheric pressure sensor, a drain freeze sensor, a snow depth sensor, auxiliary sensors, and a compass.

Another object of the present invention is to provide a new and improved method of monitoring of structural displacement of a building in response using a GNSS system network operating in its rain ponding monitoring and alert mode, employing time-averaged displacement data extraction processing, and automated generation of structural displacement alerts, remote USGS accelerometer data and USGS earthquake alerts.

Another object of the present invention is to provide a new and improved method for monitoring seismic activity and seismic-driven structural displacement response of a building or civil structure using a GNSS system network operating in an early warning seismic monitoring and alert mode, and employing (i) the processing of GNSS signals received locally at a point on or behind the surface of the stationary and/or mobile system, (ii) automatically determining the occurrence of spatial displacement, distortion and/or deformation of the system being spatially monitored over time, and when spatial displacement, distortion and/or deformation thresholds are met or exceeded and vibration (linear accelerations) thresholds are met or exceeded, and (iii) automatically sending email and/or SMS alerts and/or notifications to registered users over the GNSS system network.

Another object of the present invention is to provide a new and improved GNSS system network installed and deployed for real-time bridge monitoring in response to seismic and other activity in the vicinity of the bridge, wherein GNSS rovers are mounted on the bridge surface for collecting and processing GNSS signals transmitted from the GNSS satellite constellations, for monitoring any deflection and/or displacement the bridge structure may experience over time due to seismic or other activity.

Another object of the present invention is to provide a new and improved GNSS system network installed and configured for monitoring vertical and lateral bridge span displacement in response to roadway loading and/or shock waves generated within the earth during an earth quake, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging seismic data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, (vi) a data center supporting web servers, application servers, database and datastore servers, and SMS/text and email servers for communicating with mobile computing systems used in monitoring the deployed GNSS rovers, and (vii) a USGS seismic detection server and data center for providing real-time seismic information to be used with the system network.

Another object of the present invention is to provide a new and improved GNSS rover unit deployed on a GNSS system network, and comprising: a cellular XCVR with antenna, an Internet gateway XCVR with antenna, a base to rover radio with antenna, a multiband GNSS RCVR with antennas, a micro-processor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, and a compass.

Another object of the present invention is to provide a new and improved method of monitoring bridge displacement and vibrational response using a GNSS system network operating in a displacement and vibrational-response monitoring and alert mode, employing (i) the processing of GNSS signals received locally at a point on or behind the surface of the stationary and/or mobile system, (ii) automatically determining the occurrence of spatial displacement, distortion and/or deformation of the system being spatially monitored over time, and when spatial displacement, distortion and/or deformation thresholds are met or exceeded and vibration (linear accelerations) thresholds are met or exceeded, and (iii) automatically sending email and/or SMS alerts and/or notifications to registered Users over the GNSS system network.

Another object of the present invention is to provide a new and improved GNSS system network installed in a region of the earth's surface and deployed for real-time monitoring of soil movement in response to seismic activity, and rainfall, wherein at least one or more base station is mounted in the vicinity of a region of earth to be monitored by the GNSS system network of the present invention, and a plurality of rovers are mounted in the ground surface over the spatial extent of the regions as illustrated for purposes of monitoring the region of earth by collecting and processing GNSS signals transmitted from the GNSS satellite constellations, wherein the GNSS base unit provides RTK corrected GNSS signals.

Another object of the present invention is to provide a new and improved GNSS rover secured in the ground surface by way of a stake-like base component, enabling the secure mounting of the GNSS rover unit in the earth surface so that GNSS signal reception and position monitoring of the phase center location of its antenna, during monitoring operations performed by a GNSS system network.

Another object of the present invention is to provide a new and improved GNSS rover secured in the ground surface by way of the screw-like base component, enabling the secure mounting of the rover unit in the earth surface so that GNSS signal reception and corresponding "antenna phase center" displacement monitoring is supported during the remote monitoring operations performed by a GNSS system network.

Another object of the present invention is to provide a new and improved GNSS system network installed and configured for monitoring soil and earth movement in response to shock waves generated within the earth during an earth quake and/or heavy rainfall, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time-averaging displacement data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, (vi) a data center supporting web servers, application servers, database and datastore servers, and SMS/text and email servers, and (vii) a USGS seismic detection server and data center for providing real-time seismic information to be used with the GNSS system network.

Another object of the present invention is to provide a new and improved GNSS rover unit deployed on a GNSS system network, and comprising a cellular XCVR with antenna, an Internet gateway XCVR with antenna, a base to rover radio with antenna, a multiband GNSS RCVR with antennas, a micro-processor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, and a compass.

Another object of the present invention is to provide a new and improved method of real-time monitoring of structural displacement response using a GNSS system network operating in its rain ponding monitoring and alert mode, employing time-averaged displacement data extraction processing, and automated generation of seismic vibration, displacement notifications and/or alerts.

Another object of the present invention is to provide a new and improved GNSS system network installed in a region of the earth's surface and deployed for real-time monitoring of the movement of a (gas or liquid transport) pipeline after settling in response to seismic activity and/or rainfall, wherein at least one or more GNSS base station is mounted in the vicinity of a region of earth to be monitored by the GNSS system network, and a plurality of rovers are mounted on the pipeline for purposes of monitoring the region of the pipeline by collecting and processing GNSS signals transmitted from the GNSS satellite constellations.

Another object of the present invention is to provide a new and improved GNSS system network installed and configured for monitoring pipeline movement in response to shock waves generated within the earth during an earth quake and/or heavy rainfall, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time-averaging displacement data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the GNSS system network, (vi) a data center supporting web servers, application servers, database and datastore servers, and SMS/text and email servers, and (vii) a USGS seismic detection server and data center for providing real-time seismic information to be used with the GNSS system network.

Another object of the present invention is to provide a new and improved GNSS rover unit deployed on a GNSS system network, and comprising a cellular XCVR with antenna, an Internet gateway XCVR with antenna, a base to rover radio with antenna, a multiband GNSS RCVR with antennas, a micro-processor with a memory architecture and a user I/O, a battery, a solar (PV) panel, a charge controller, a wind speed sensor, a compass, a 3 axis accelerometer, a snow pressure sensor, camera(s), temp & humidity sensors, an atmospheric pressure sensor, a snow depth sensor, auxiliary sensors, and a compass.

Another object of the present invention is to provide a new and improved GNSS system network installed in the hull of a ship and deployed for real-time monitoring of distortion or deformation of the ship's hull in response to loading and/or environmental forces (e.g. iceberg), wherein a plurality of rovers are mounted on the ship's hull as illustrated for purposes of monitoring the ship's hull by collecting and processing GNSS signals transmitted from the GNSS satellite constellations, and automatically determining spatial deformation and/or deflection with respect to its locally embedded coordinate reference system.

Another object of the present invention is to provide a new and improved GNSS system network installed in the ship's hull deployed for real-time monitoring of the ship's hull in response to internal and/or external loading, wherein a plurality of GNSS rovers are mounted in the ship's hull for purposes of monitoring the ship's hull by collecting and processing GNSS signals transmitted from the GNSS satellite constellations, and a controller and radio transceiver for transmitting GNSS signals to local or remote signal processors to automatically determine spatial deformation.

Another object of the present invention is to provide a new and improved GNSS system network installed in the aircraft's fuselage and deployed for real-time monitoring of distortion or deformation of the aircraft in response to loading and/or environmental force, wherein a plurality of rovers are mounted on the aircraft for purposes of monitoring the region of the aircraft by collecting and processing GNSS signals transmitted from the GNSS satellite constellations, and automatically determining spatial deformation and/or deflection with respect to its locally embedded coordinate reference system.

Another object of the present invention is to provide a new and improved GNSS system network installed in the aircraft and deployed for real-time monitoring of the aircraft in response to internal and/or external loading, wherein a plurality of rovers are mounted on the aircraft as illustrated for purposes of monitoring the aircraft by collecting and processing GNSS signals transmitted from the GNSS satellite constellations, and a controller and radio transceiver for transmitting GNSS signals to local or remote signal processors to automatically determine spatial deformation.

Another object of the present invention is to provide a new and improved GNSS system network installed in the railcar and deployed for real-time monitoring of distortion or deformation of the railcar in response to loading and/or environmental forces, wherein a plurality of rovers are mounted on the pipeline as illustrated for purposes of monitoring the region of the railcar by collecting and processing GNSS signals transmitted from the GNSS satellite constellations, to automatically determine spatial deformation and/or deflection with respect to its locally embedded coordinate reference system.

Another object of the present invention is to provide a new and improved GNSS system network installed in the railcar and deployed for real-time monitoring of the railcar in response to internal and/or external loading, wherein a plurality of rovers are mounted in the railcar as illustrated for purposes of monitoring the railcar by collecting and processing GNSS signals transmitted from the GNSS satellite constellations, and a controller and radio transceiver for transmitting GNSS signals to local or remote signal processors to automatically determine spatial deformation.

Another object of the present invention is to provide a new and improved GNSS system network installed in the tractor and trailer and deployed for real-time monitoring of distortion or deformation of the tractor and trailer in response to loading and/or environmental forces, wherein a plurality of rovers are mounted on the tractor trailer as illustrated for purposes of monitoring the same by collecting and processing GNSS signals transmitted from the GNSS satellite constellations, to automatically determine spatial deformation and/or deflection with respect to its locally embedded coordinate reference system.

Another object of the present invention is to provide a new and improved GNSS system network in the ship's hull and deployed for real-time monitoring of the tractor trailer in response to internal and/or external loading, wherein a plurality of rovers are mounted in the tractor trailer as illustrated for purposes of monitoring the tractor trailer by collecting and processing GNSS signals transmitted from the GNSS satellite constellations and a controller and radio transceiver for transmitting GNSS signals to local or remote signal processors to automatically determine spatial deformation.

Another object of the present invention is to provide a new and improved GNSS system network comprising a plurality of GNSS pond-depth sensing rovers with an integrated pond-depth sensor, mounted near roof drains and scuppers, also adapted for automated sensing, monitoring and measuring the depth of water pooling on the rooftop surface and communication of measured pond-depth to mobile and stationary users over the wireless GNSS system network.

These and other objects will become more apparent hereinafter in view of the Detailed Description and pending Claims to Invention.

BRIEF DESCRIPTION OF THE DRAWINGS

In order to more fully understand the Objects, the following Detailed Description of the illustrative embodiments should be read in conjunction with the accompanying Drawings, wherein:

FIGS. 8A, 8B and 8C, taken together, provide a flow chart describing the primary steps of the communication and information processing method supported on the generalized embodiment of the system platform of the present invention, involving the processing of received GNSS signals locally or remotely to automatically determine the occurrence of spatial displacement, distortion and/or deformation of the system being spatially monitored over time if and when structural movement thresholds are met or exceeded by the system being monitored, the Application Server automatically sends email and/or SMS alerts and/or notifications to registered users over the GNSS system network;

Figure 23:
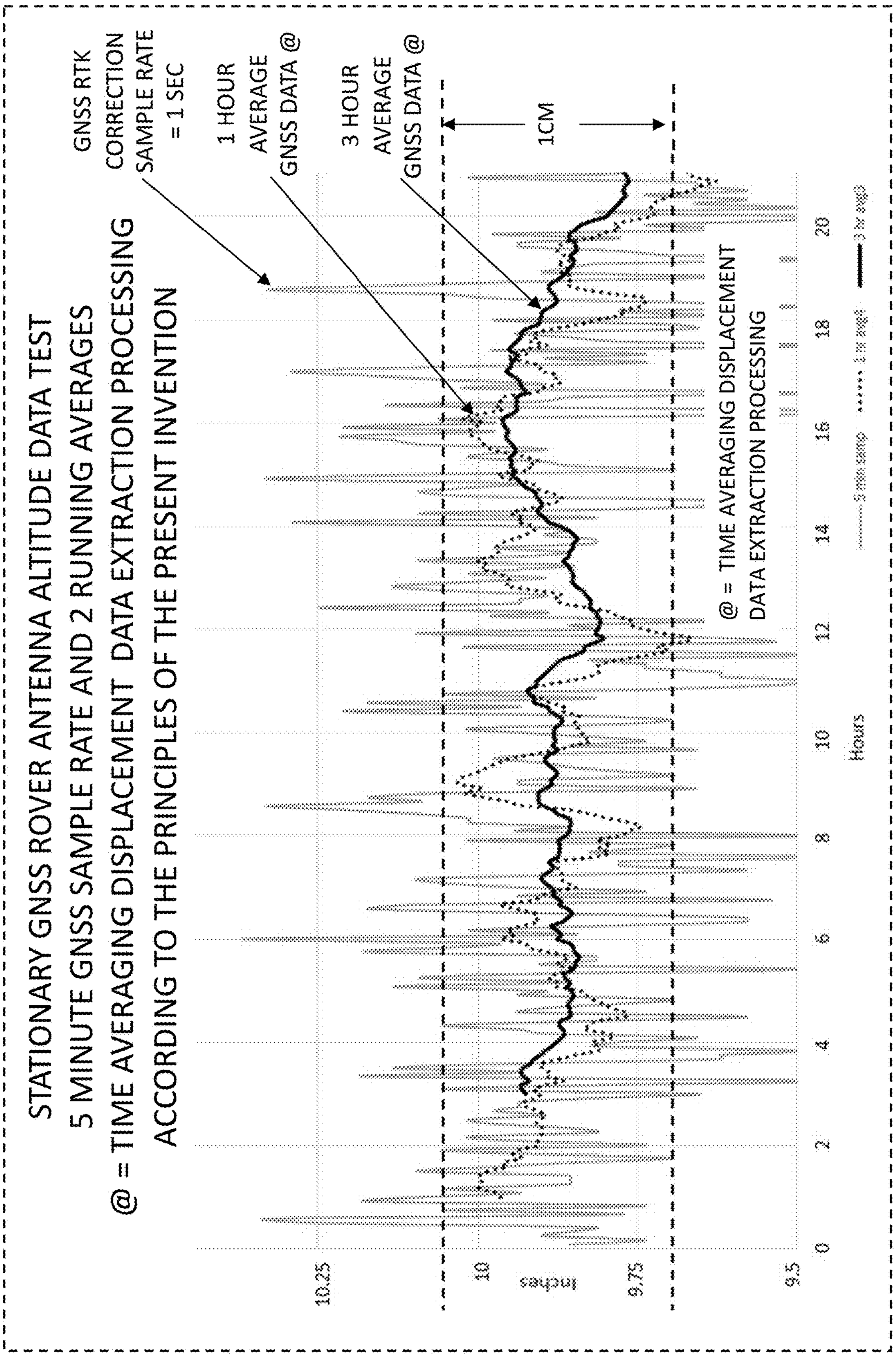
Figure 24:
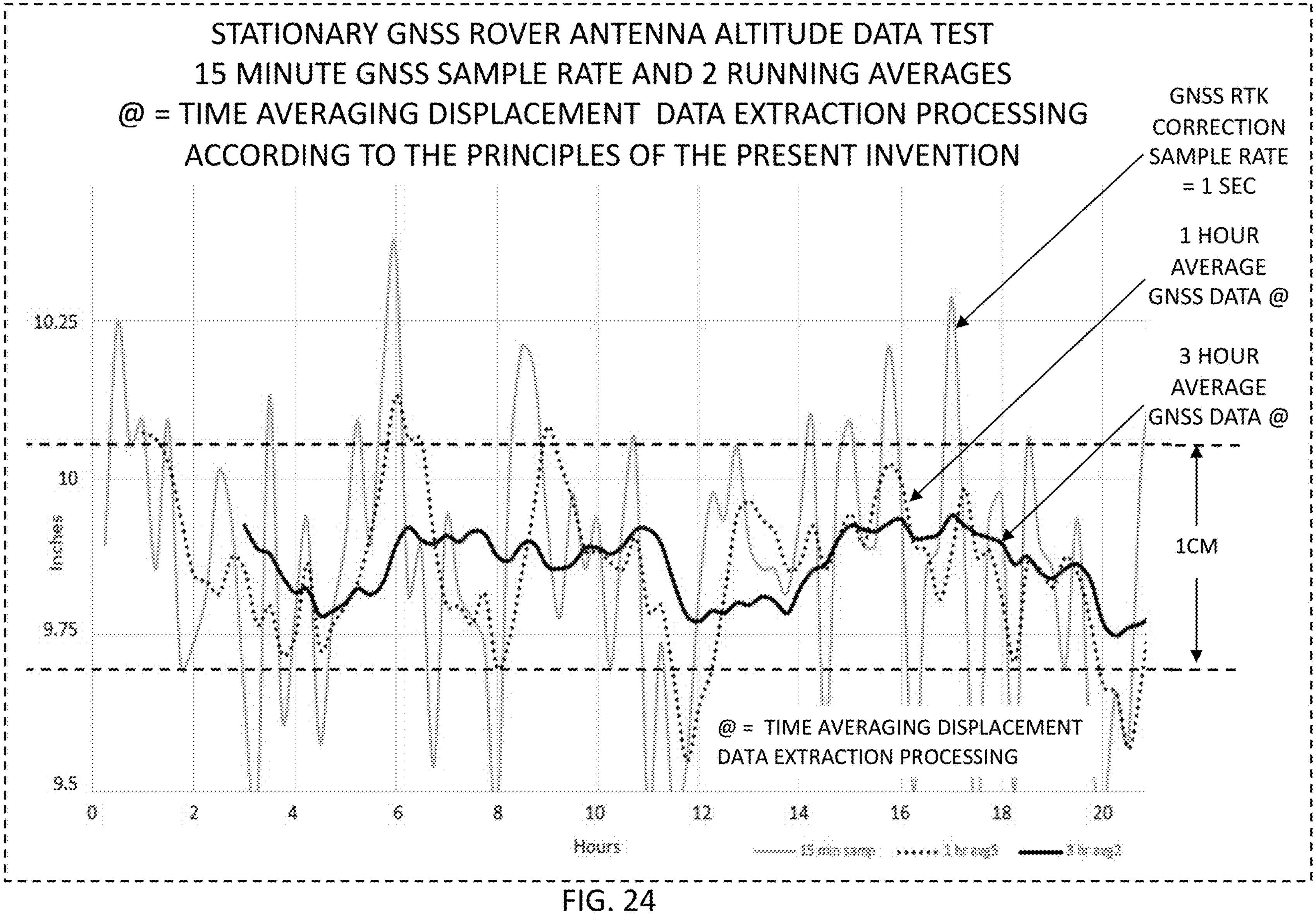
Figure 25:
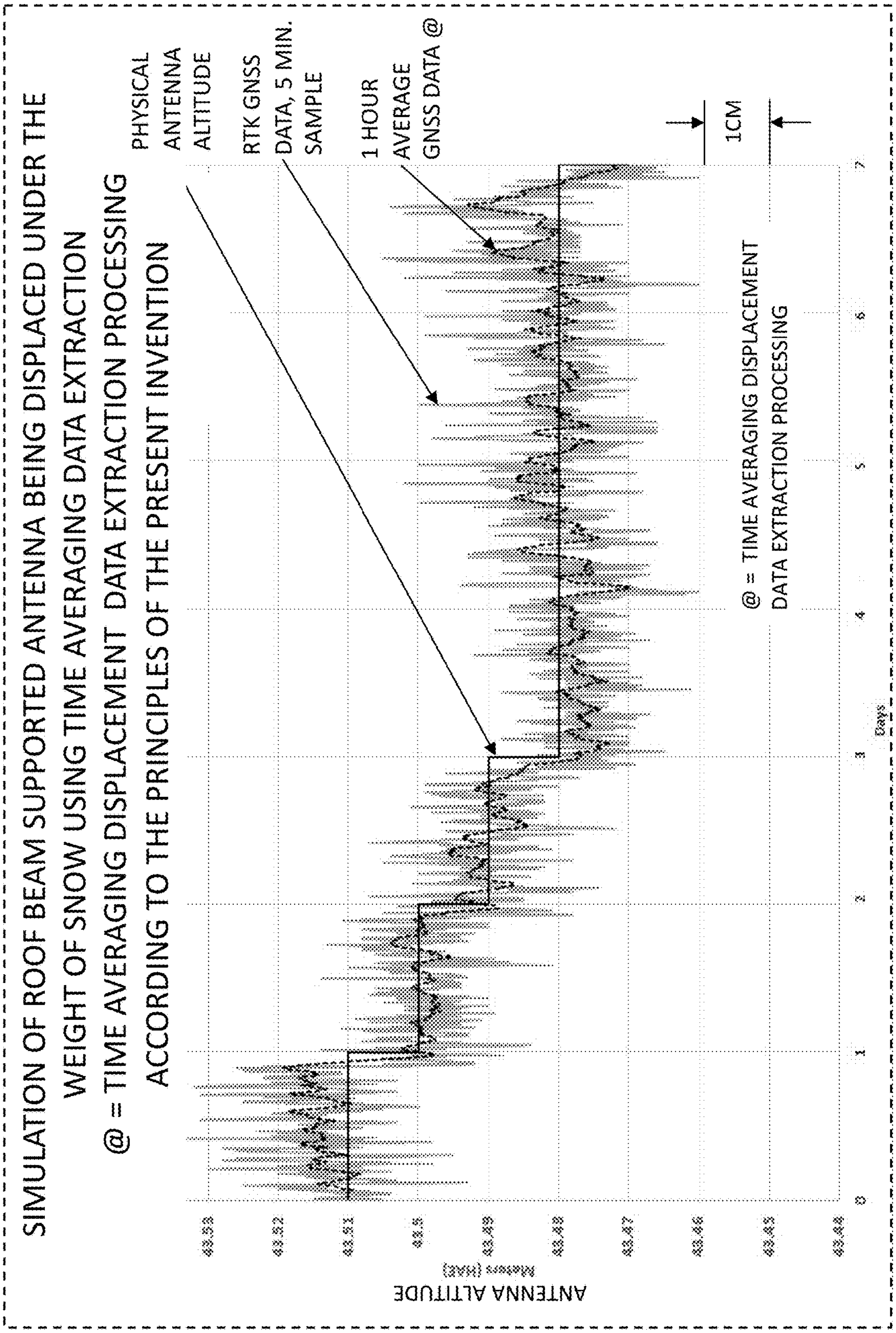
Figure 26:
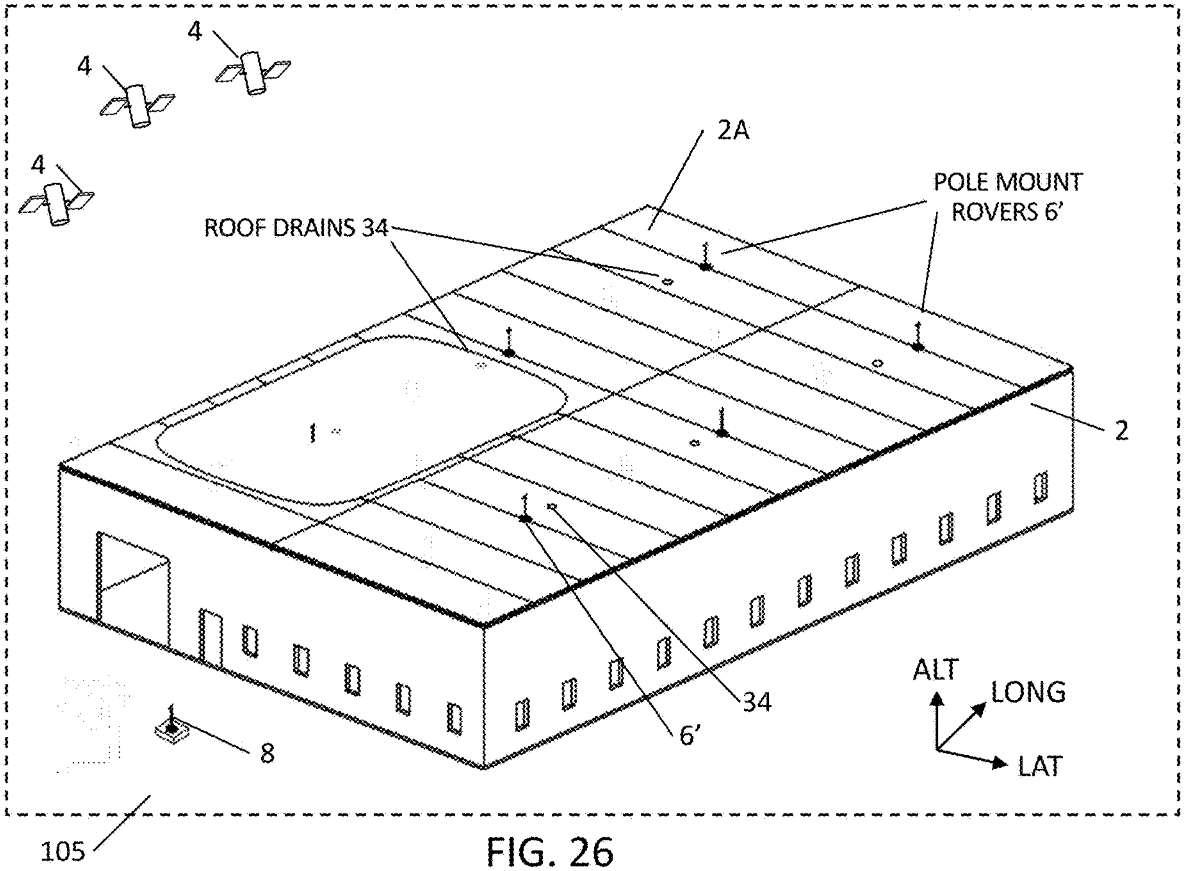
Figure 27:
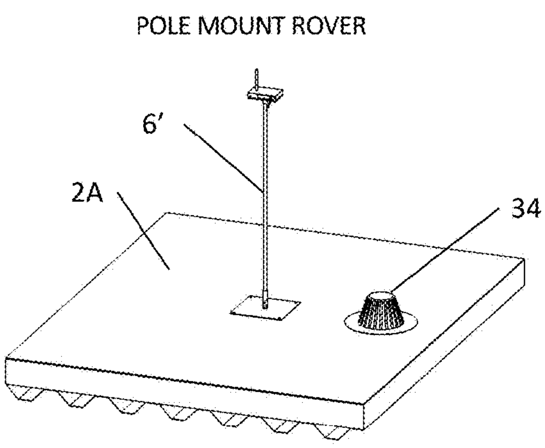
Figure 28:
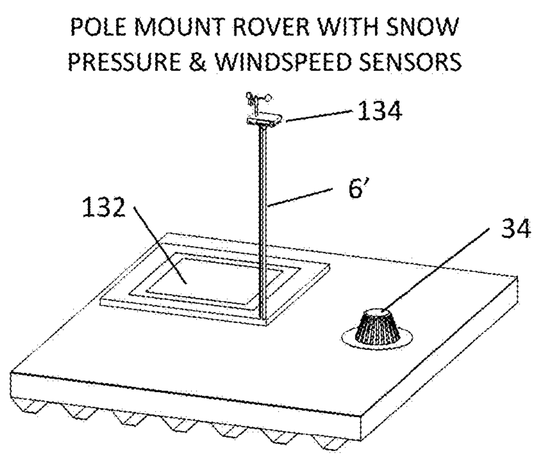
Figure 29A:
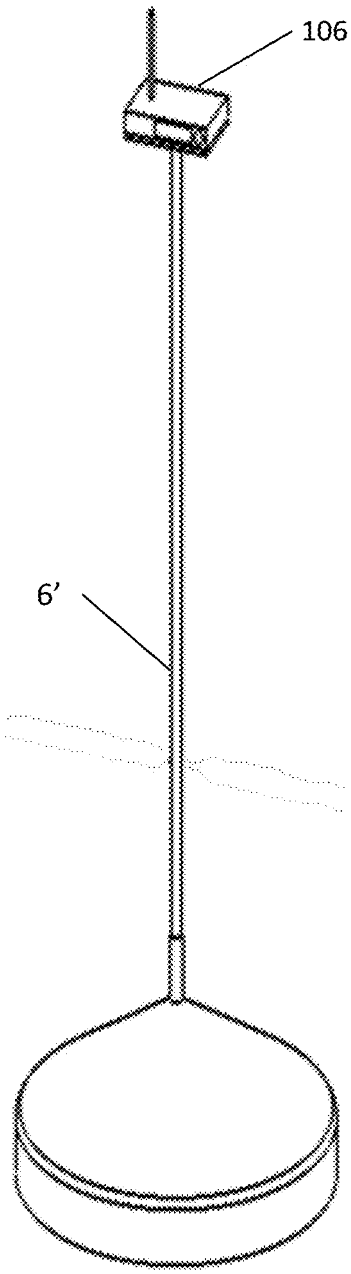
Figure 29B:
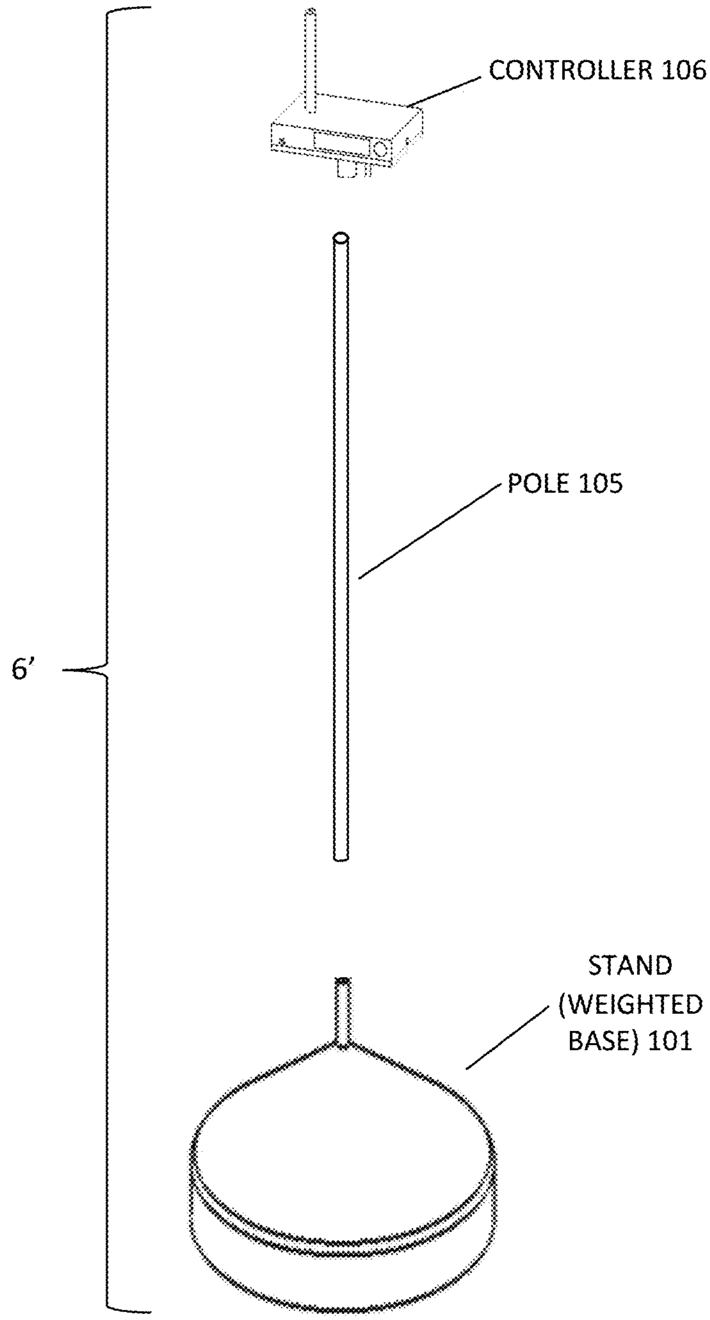
Figure 30A:
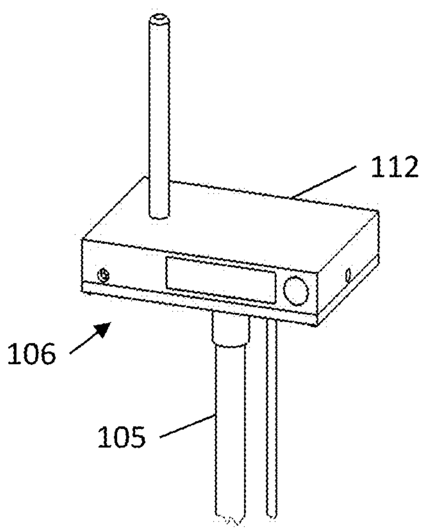
Figure 31:
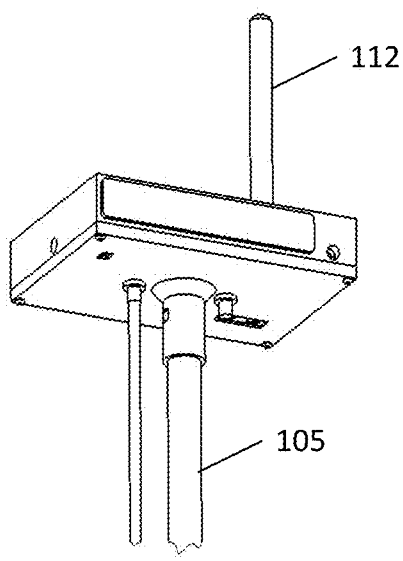
Figure 30B:
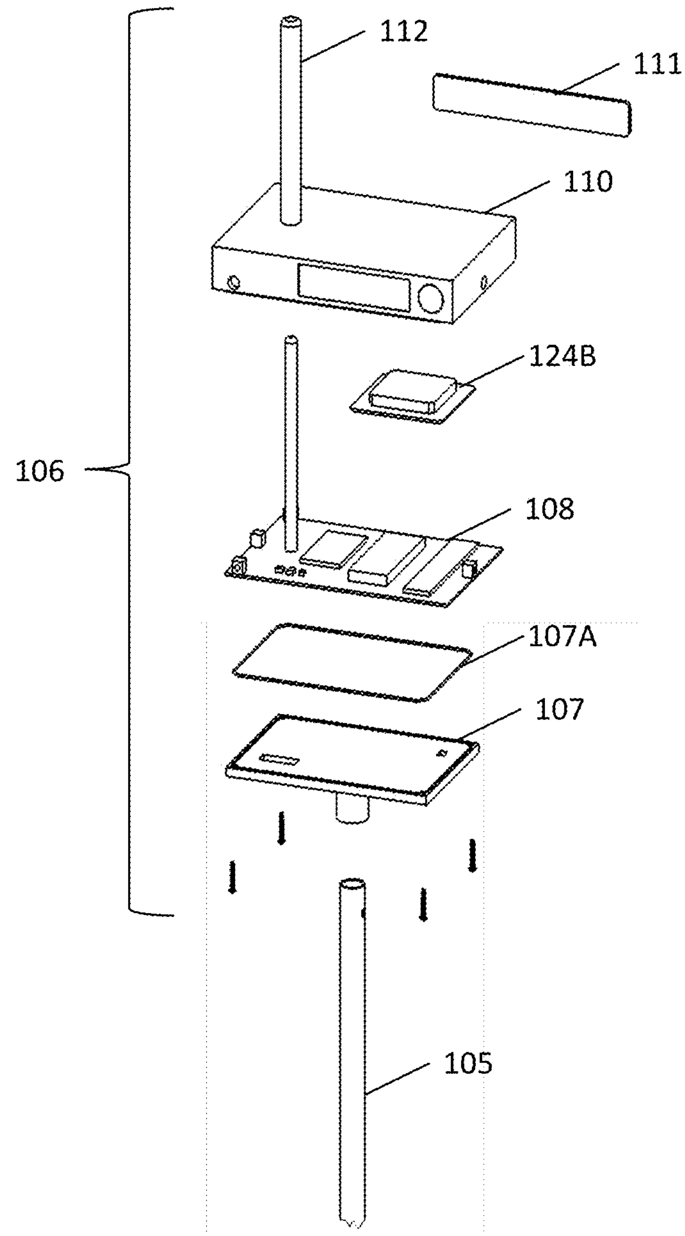
Figure 32:
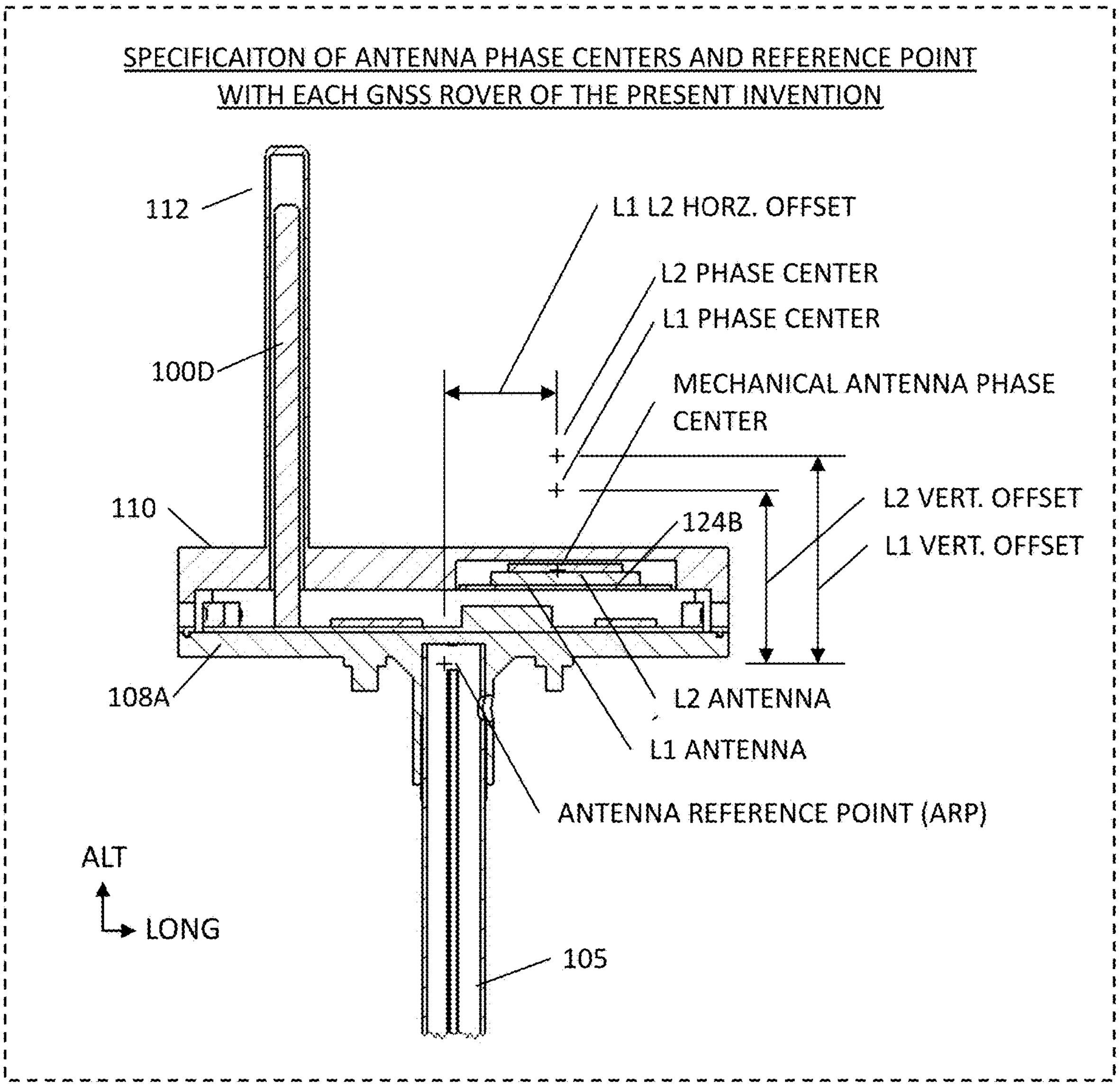
Figure 33:
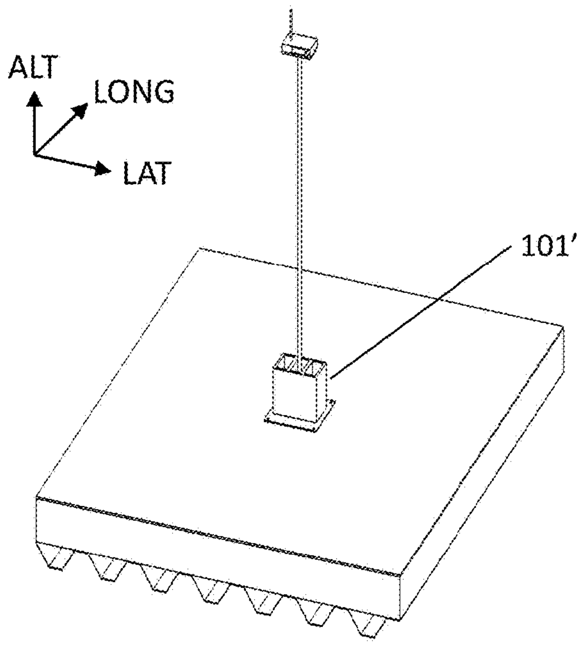
Figure 35:
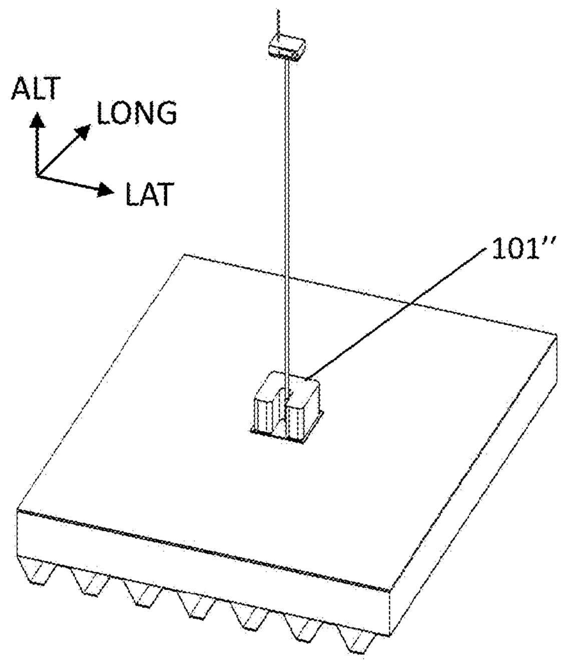
Figure 34:
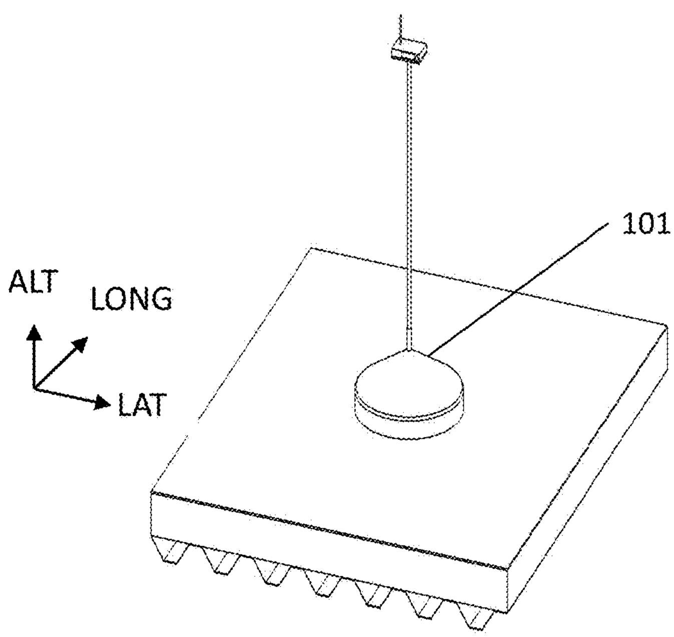
Figure 36:
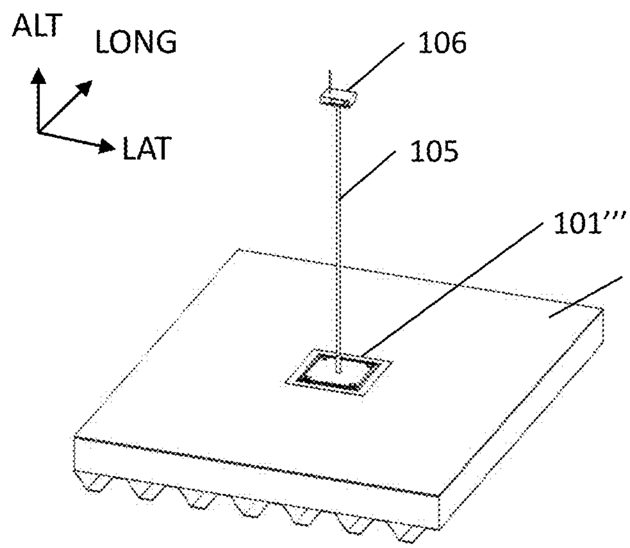
Figure 37:
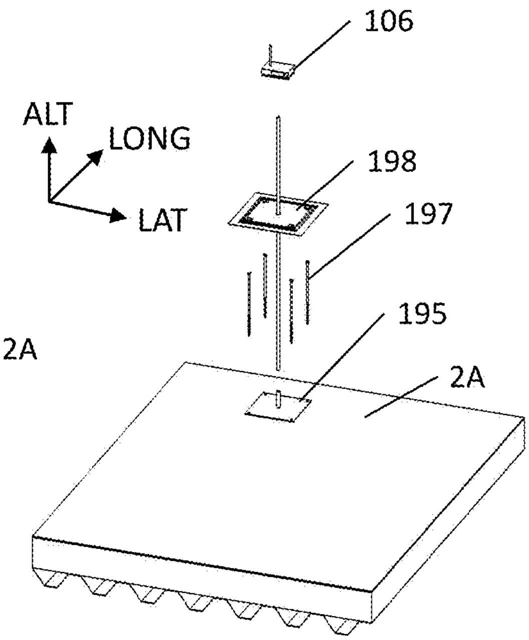
Figure 38:
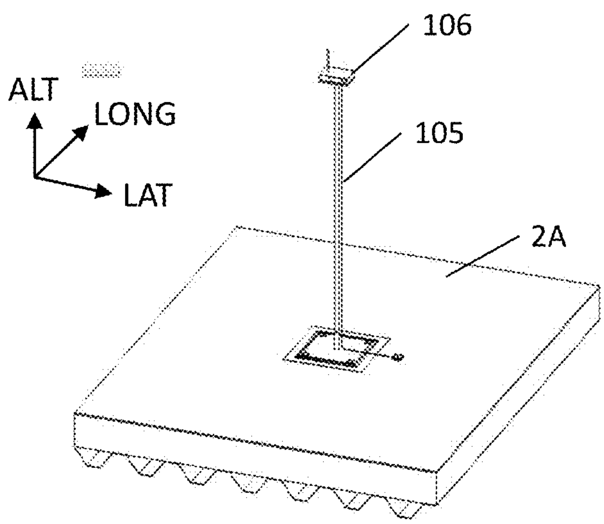
Figure 39:
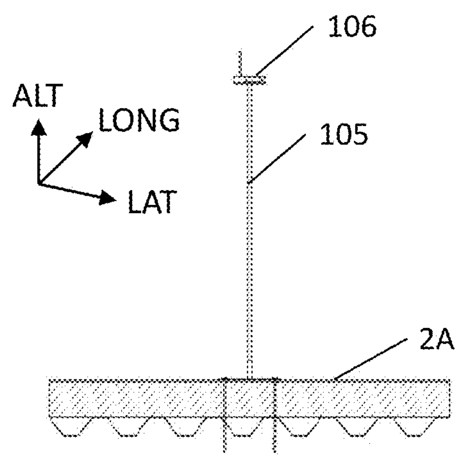
Figure 40:
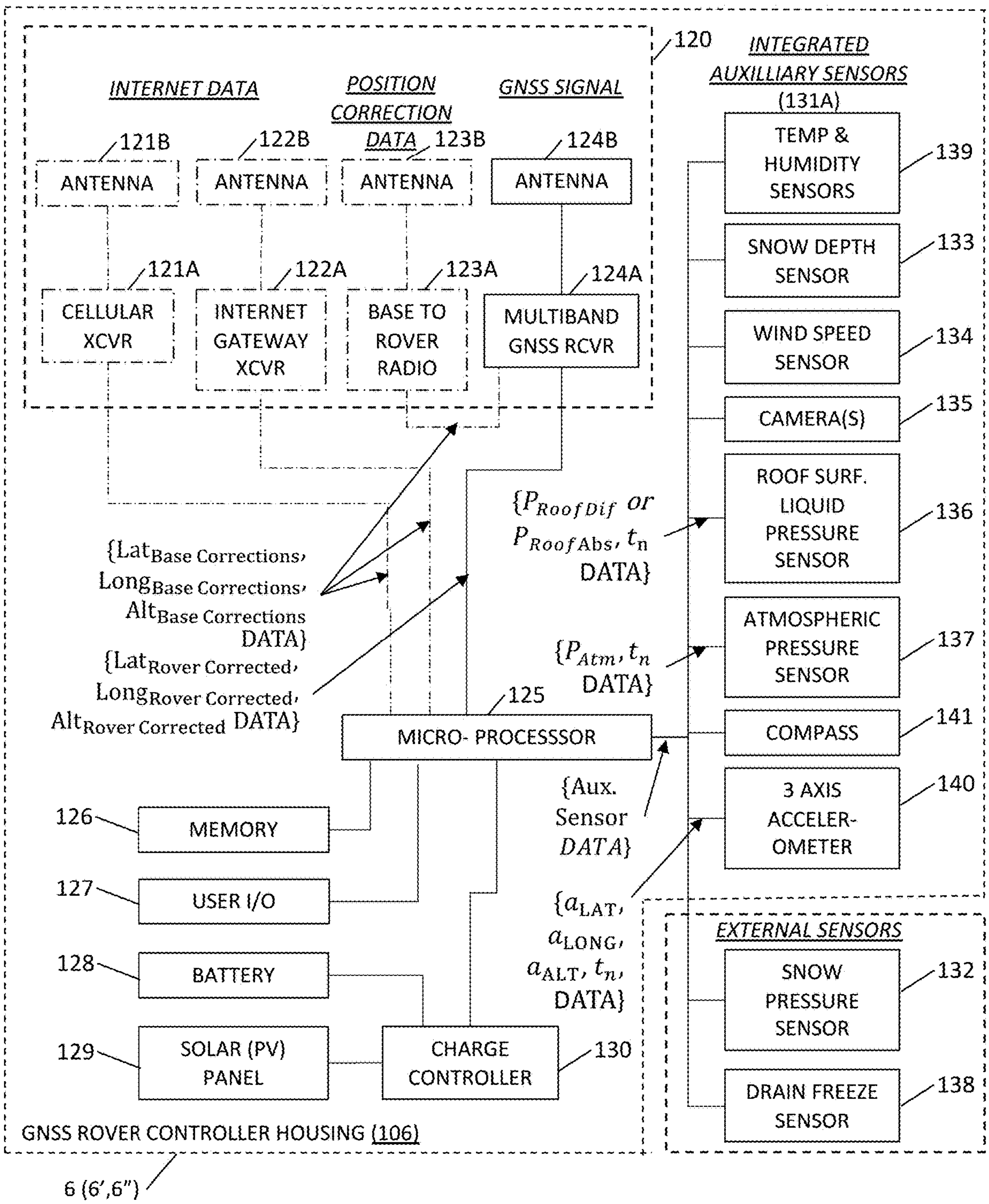
Figure 42A:
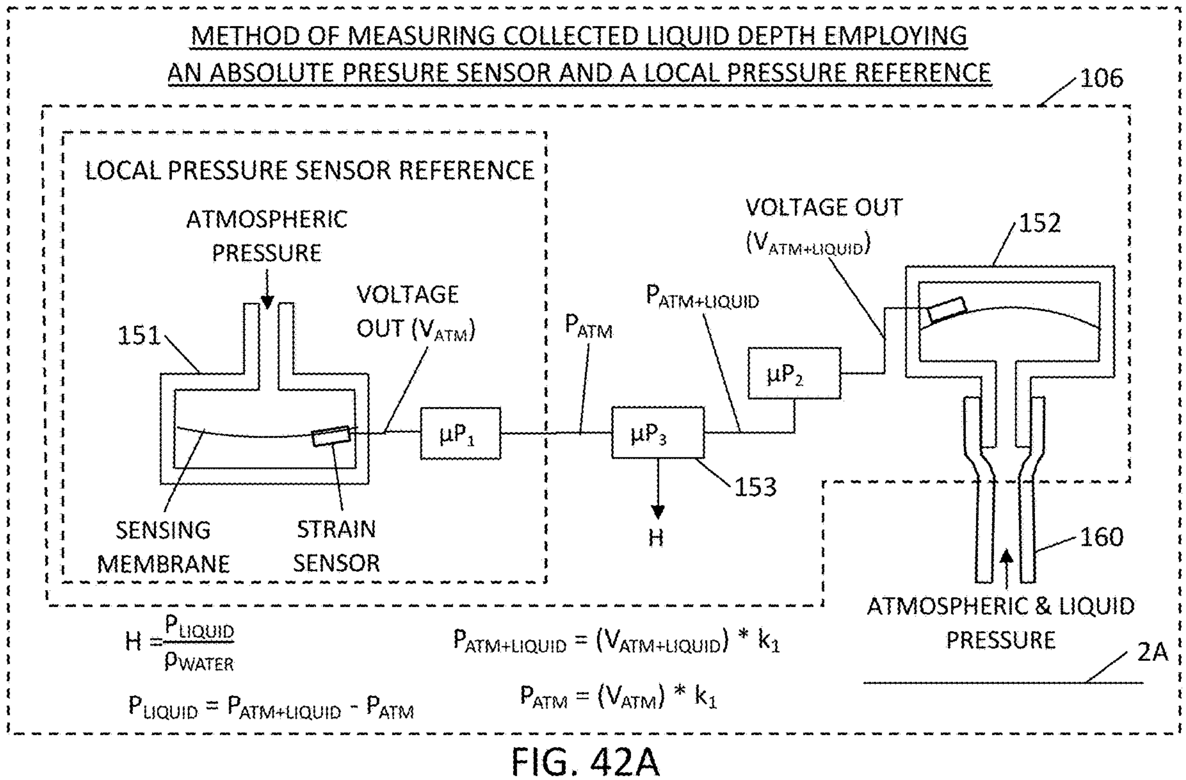
Figure 42B:
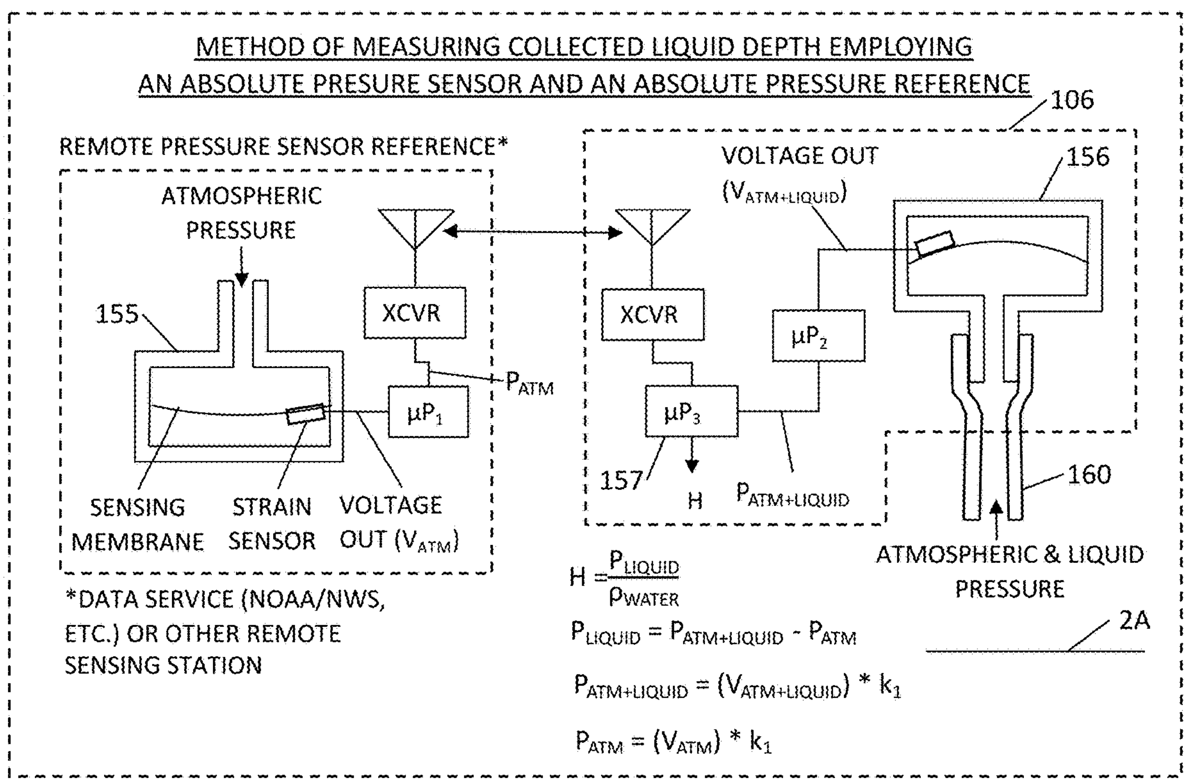
Figure 43:
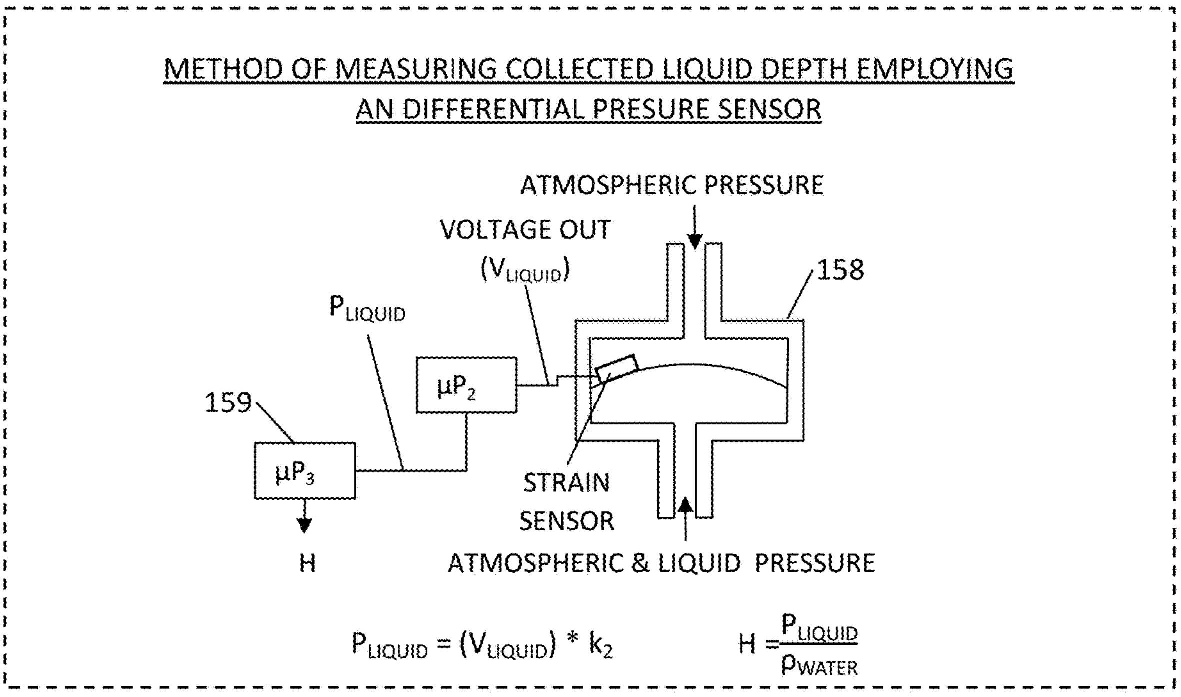
Figure 44A:
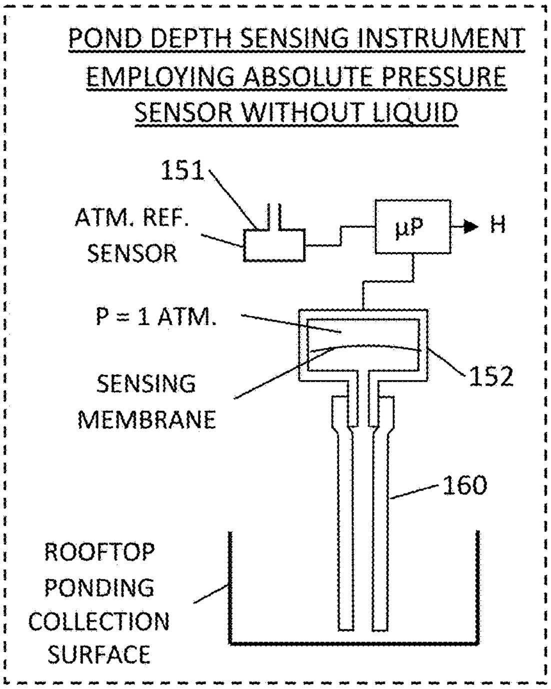
Figure 44B:
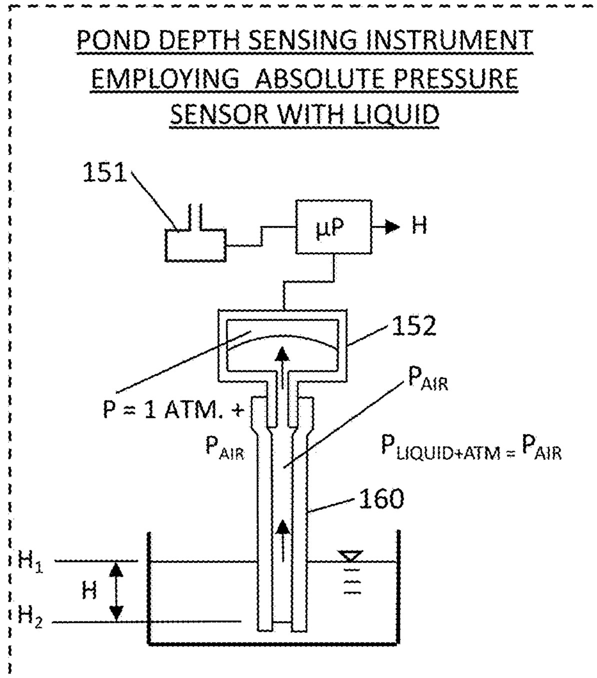
Figure 45A:
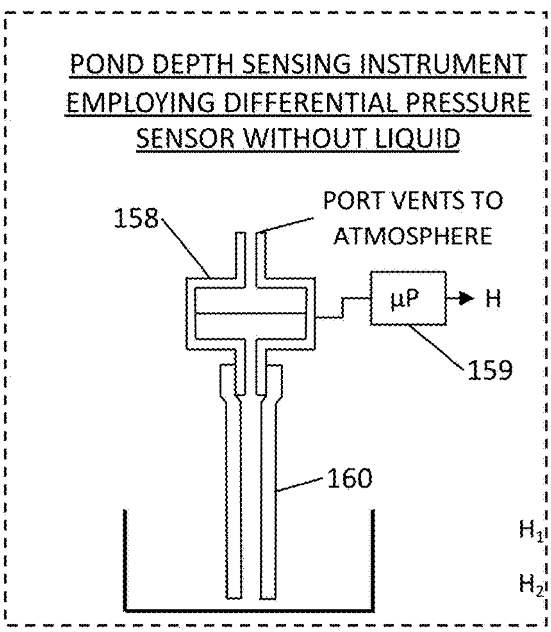
Figure 45B:
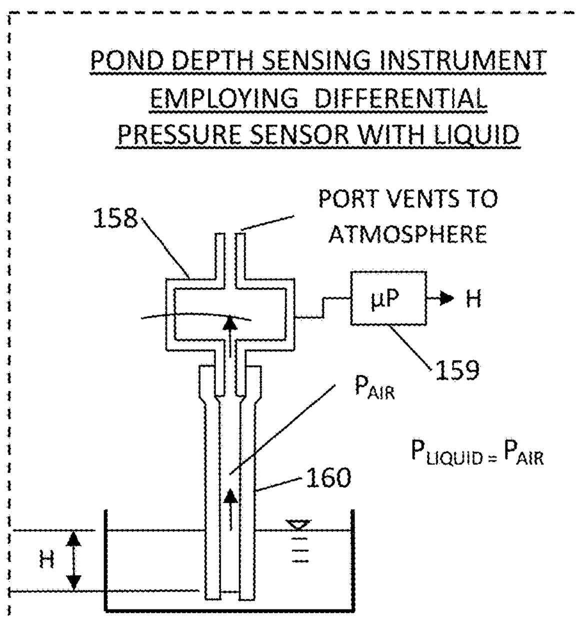
Figure 46:
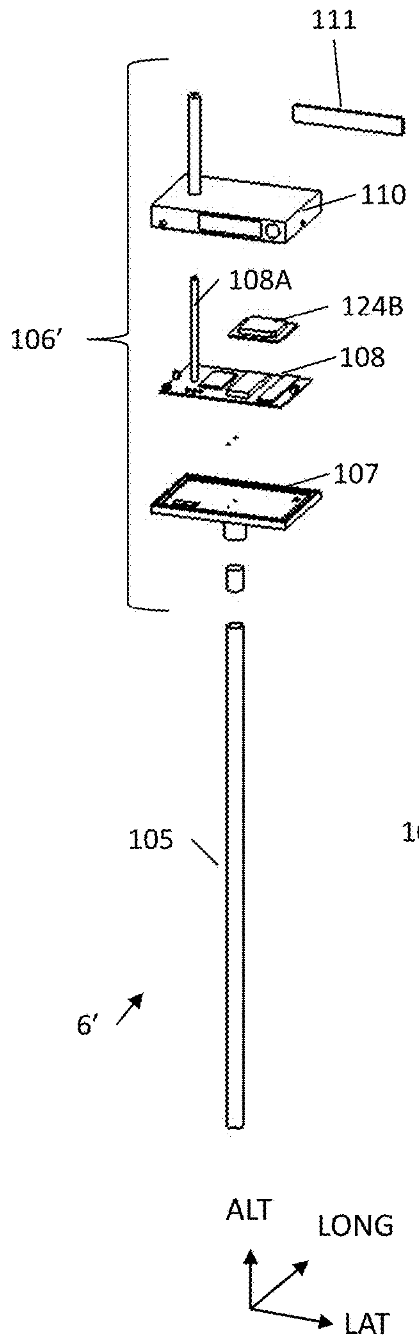
Figure 47:
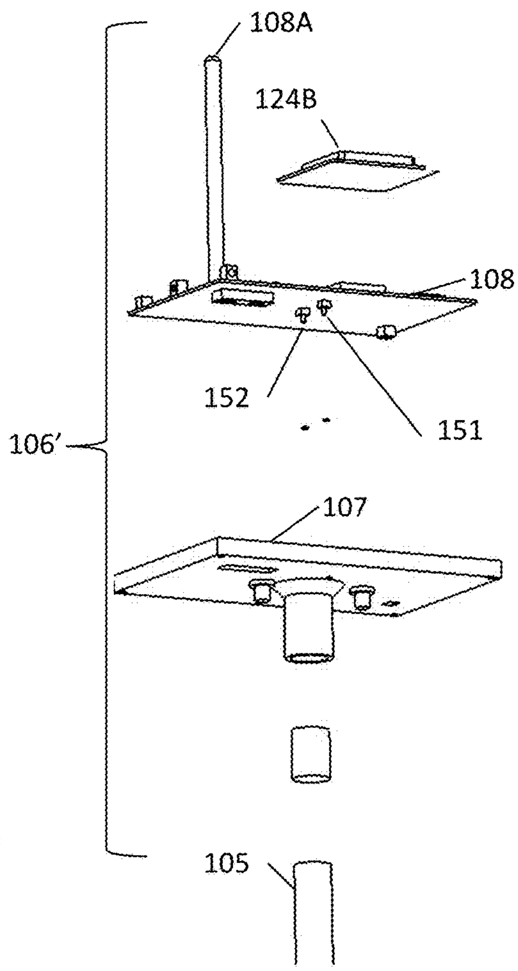
Figure 48:
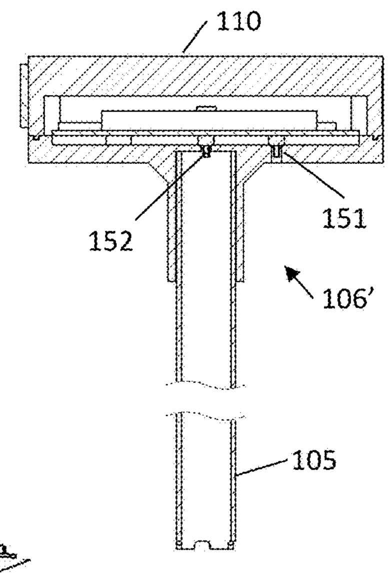
Figure 49A:
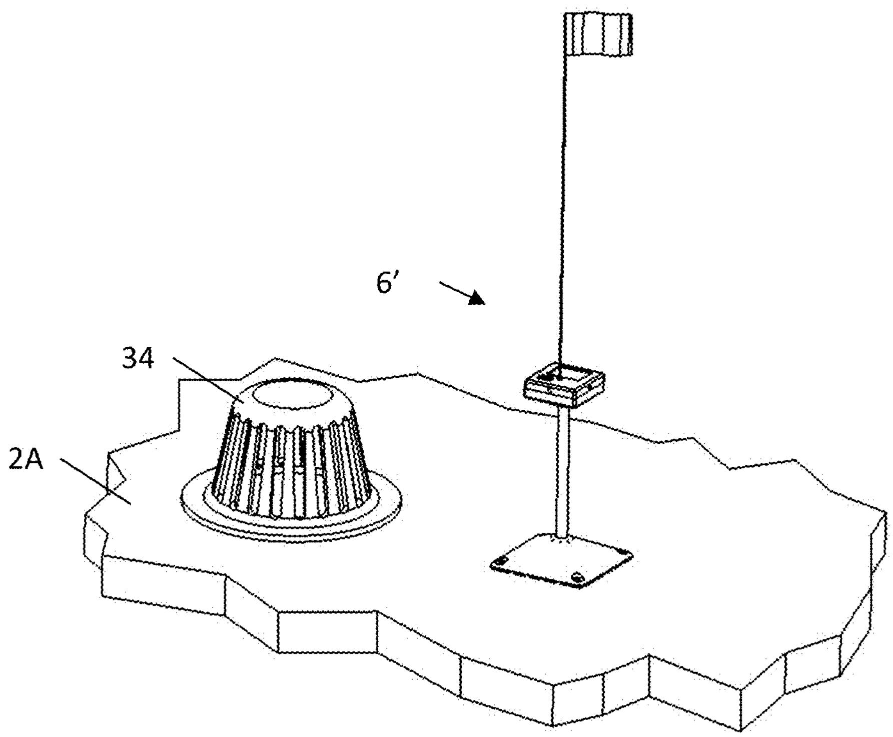
Figure 49B:
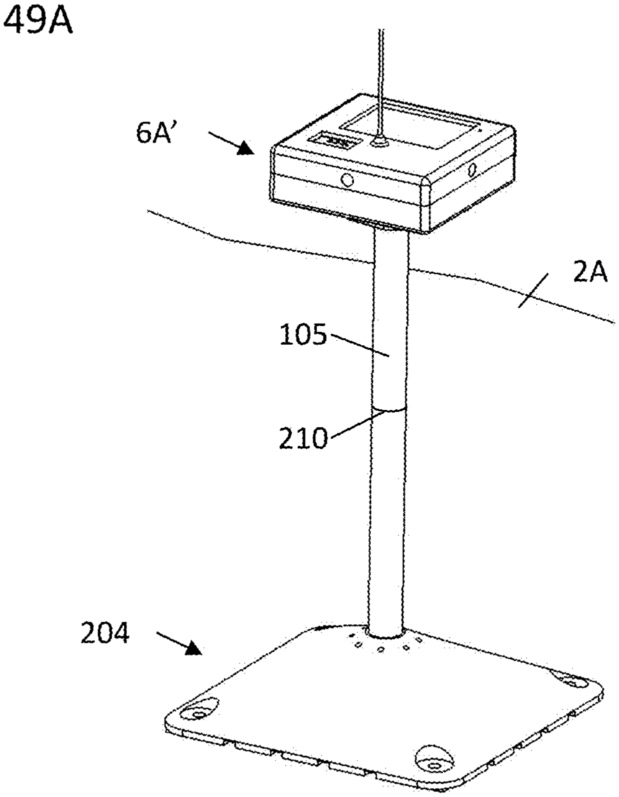
Figure 50B:
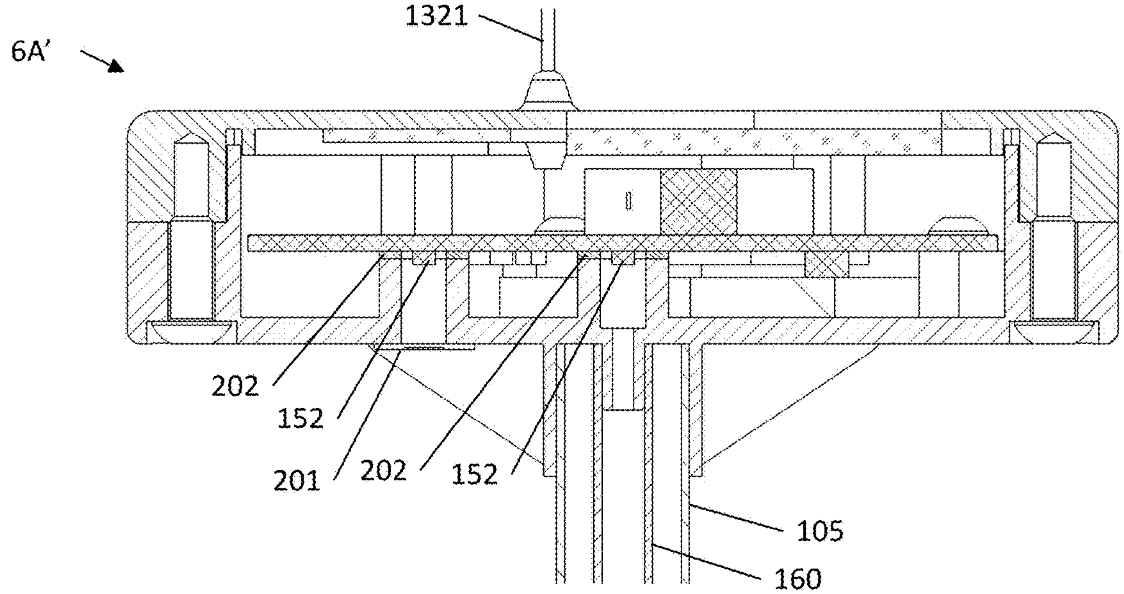
Figure 50A:
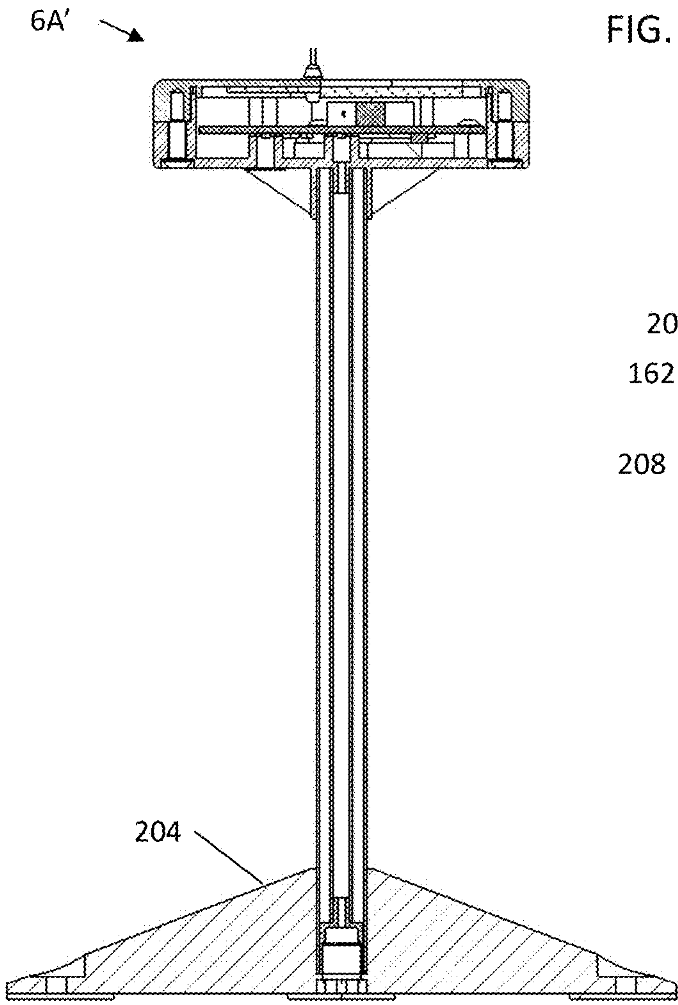
Figure 50C:
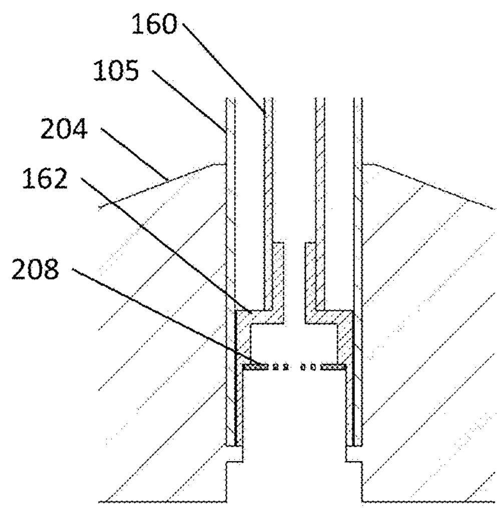
Figure 50D:
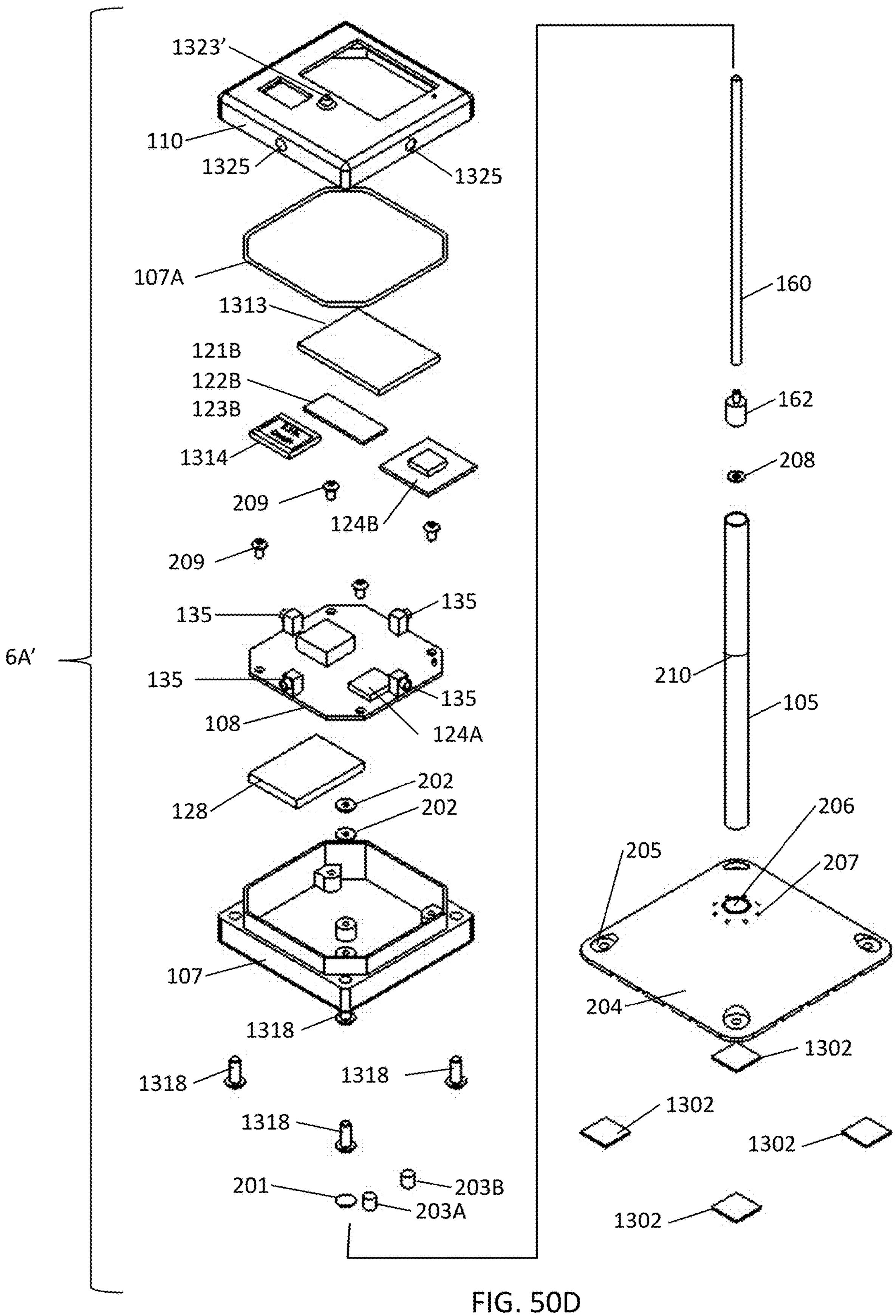
Figure 51A:
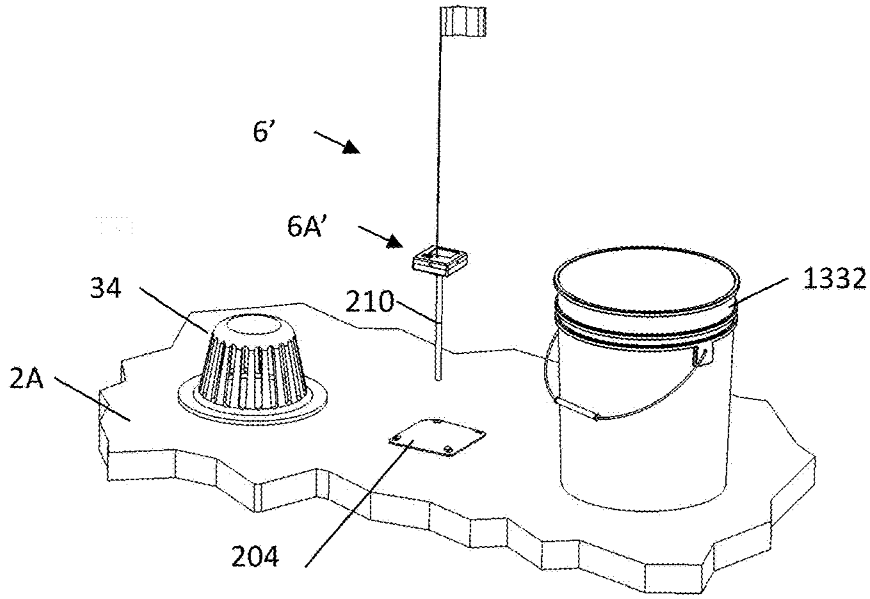
Figure 51B:
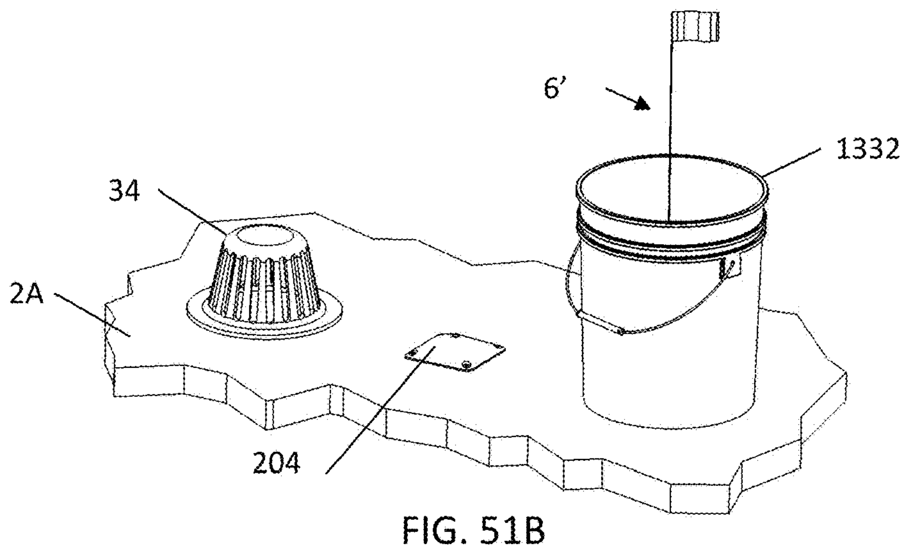

plotted against time, to illustrate the operation of the method of time-averaging based displacement data extraction processing carried out according to the principles of the present invention (@) enabling at least 1 CM spatial displacement resolution using this method at a 5 minute RTK-corrected data sampling rate and 1 hour time-averaging based displacement data extraction processing;

FIG. 23 is a graphical data characteristic representation for a stationary GNSS rover antenna altitude data test conducted when operating the GNSS rover at a 5 minute GNSS RTK-corrected sampling rate and 2 running time-based averages (i.e. 1 hour average and 3 hour average) plotted against time, to illustrate the operation of the method of time-averaging based displacement data extraction processing carried out according to the principles of the present invention (@) enabling at least 1 CM spatial displacement resolution using this method at a 5 minute s RTK-corrected data sampling rate and 1 hour time-averaging based displacement data extraction processing;

FIG. 24 is a graphical data characteristic representation for a stationary GNSS rover antenna altitude data test conducted when operating the GNSS rover at a 15 minute GNSS RTK-corrected sampling rate and 2 running time-based averages (i.e. 1 hour average and 3 hour average) plotted against time, to illustrate the operation of the method of time-averaging based displacement data extraction processing carried out according to the principles of the present invention (@) enabling at least 1 CM spatial displacement resolution using this method at a 5 minute s RTK-corrected data sampling rate and 1 hour time-averaging based displacement data extraction processing;

FIG. 25 is a graphical representation of a computer simulation of a GNSS Rover Antenna supported on a building roof beam undergoing displacement and deflection under the weight of a snow load, conducted using a 5 minute GNSS RTK-corrected sampling rate and 1 hour running time-based data averaging process, plotted against time to illustrate the operation of the method of time-averaging based displacement data extraction processing carried out according to the principles of the present invention (@) enabling at least 1 CM spatial displacement resolution using this method;

FIG. 26 shows a building system being monitored by the GNSS system network of the present invention depicted in FIGS. 1 through 8, supporting pole-mounted GNSS rovers having ponding sensors shown in FIGS. 27 and 28, respectively, mounted near roof drains, specially adapted for monitoring the pooling of water on the rooftop surface which can cause great structural damage if and when the roof drains or scuppers should happened to become obstructed and prevent water flow and drainage;

FIG. 27 show a close up view of a pole mounted GNSS rover unit with integrated Pond-Depth Sensor employed in the GNSS system network installation illustrated in FIG. 26, shown installed near a rooftop drain cover;

FIG. 28 shows a close up view of a pole-mounted GNSS rover unit with integrated Pond-Depth Sensor, and snow pressure and windspeed sensors as well for deployment in the GNSS system network installation illustrated in FIG. 26;

FIG. 29A shows a perspective view of a pole-mounted GNSS rover with an integrated pond-depth sensor, as shown in FIGS. 26 and 27 mounted near roof drains, also adapted for automated monitoring the pooling of water on the rooftop surface and communication over the wireless GNSS system network, shown comprising a base stand portion weight for stable support on a rooftop surface for sensing the pooling of water of the rooftop surface, and an upper controller portion containing electronics and radio communication equipment, supported above the stand portion by a hollow pole or otherwise tubular structure;

FIG. 29B shows an exploded view of the pole-mounted GNSS rover of FIG. 29A with an integrated pond-depth sensor, as shown in FIGS. 26 and 27 mounted near roof drains, also adapted for automated monitoring the pooling of water on the rooftop surface and communication over the wireless GNSS system network, shown comprising a base stand portion weight for stable support on a rooftop surface for sensing the pooling of water of the rooftop surface, and an upper controller portion containing electronics and radio communication equipment, supported above the stand portion by a hollow pole or otherwise tubular structure;

FIG. 30A shows a close up first perspective view showing the upper surfaces of the controller portion of the pond-depth sensing GNSS rover unit deployed in FIGS. 29A and 29B, and revealing its compact water-proof housing, support pole, and antennas;

FIG. 30B shows an exploded perspective view showing the pond-depth sensing GNSS rover unit deployed in FIGS. 29A and 29B, and revealing its internal printed circuit (PC) board, support plate, compact water-proof housing, support pole, and antennas;

FIG. 31 shows a close up second perspective view showing the under surfaces of the controller portion of the pond-depth sensing GNSS rover unit deployed in FIGS. 29A and 29B, and revealing its compact water-proof housing, support pole, and antennas;

FIG. 32 is a cross-sectional view of the controller portion of the GNSS rover unit of the FIGS. 29A, 29B, 30A, 30B and 31, showing the precise location of (i) the Antenna Reference Point (ARP) embedded within the PC board, (ii) the Mechanical Antenna Phase Center, and L1, L2 Phase Centers, and L1 and L2 Vertical and Horizontal Offsets, within the physical controller portion of the GNSS rover unit;

FIG. 33 shows the pond-depth sensing GNSS rover unit in FIGS. 30A through 32 provided with a first portable weighted base component adapted to sense the development of a water pond on a rooftop surface;

FIG. 34 shows the pond-depth sensing GNSS rover unit in FIGS. 30A through 32 provided with a second portable weighted base component adapted to sense the development of a water pond on a rooftop surface;

FIG. 35 shows the pond-depth sensing GNSS rover unit in FIGS. 30A through 32 provided with a third portable weighted base component adapted to sense the development of a water pond on a rooftop surface, as shown in FIGS. 30A, 30B and 31;

FIG. 36 shows a pond-depth sensing GNSS rover unit of the present invention provided with shows the pond-depth sensing GNSS rover unit in FIGS. 30A through 32 provided with a permanently-mounted roof mount (i.e. base component) design enabling the sensing of water pond developing on a rooftop surface;

FIG. 37 shows the pond-depth sensing GNSS rover unit of FIG. 36, with its base component being permanently-mounted on a building roof surface with mounting screws, rubber membrane and adhesive;

FIG. 38 shows the pond-depth sensing GNSS rover unit of FIG. 36 provided with an external pond-depth sensor;

FIG. 39 shows a cross-sectional view of the pond-depth sensing GNSS rover unit of the present invention of FIGS. 36 through 38 permanently-mounted to the roof surface by its roof mount (component) design enabling the sensing of a water pond developing on a rooftop surface;

FIG. 40 shows a block system diagram for the GNSS rover system deployed on the GNSS system network of the present invention depicted in FIG. 26, shown comprising within the GNSS rover controller housing the following components, namely: (i) radio signal subsystems supporting (a) internet data flow using a cellular transceiver (XCVR) with antenna and an internet gateway transceiver (XCVR), (b) RTK position correction data flow using base to rover radio signal transceivers, and (c) GNSS signal reception using multiband GNSS transceivers, (ii) a programmed microprocessor and supporting a memory architecture for supporting the functions of the system, and also provided with a user I/O interface, battery power module, solar PV panel and charge controller, and (iii) an array of ancillary sensors including, but not limited to, snow pressure sensors, snow depth sensor, wind-speed sensor, digital cameras, roof-surface liquid pressures sensor, atmospheric pressure sensor, drain freeze sensor, temperature and humidity sensors, 3-axis accelerometers, electronic compass instrument, configured and arranged for receiving corrected GNSS signals and determining the position of the GNSS rover relative to a global reference system, and local or remote signal processing to determine spatial displacement, distortion and/or deformation of the system being monitored by the spatial measurement engine of the present invention schematically depicted in FIG. 26, and further including external sensors including a snow pressure sensor and a drain freeze sensor;

FIG. 41 shows a flow chart describing the primary steps of a GNSS rover communication and information processing method supported within the GNSS rover system shown in FIGS. 29A through 40;

FIG. 42A shows a schematic representation of a pond-depth sensing instrument system of the present invention for integration within a GNSS rover system of the present invention, and measuring the depth of ponding on a rooftop or like surface using a first method of pressure measurement (M1) employing a first "local" absolute pressure sensor (reference) for measuring the atmospheric reference using a first strain gauge sensor mounted on a first sensing membrane within pressure test measurement chamber and producing an output voltage ($V_{atm}$) and a second absolute pressure sensor for measuring the pressure of the liquid and the atmosphere using as second strain gauge sensor mounted on a second sensing membrane within pressure test measurement chamber and producing an output voltage ($V_{atm}$), and a signal processor for computing the difference between these pressure measurements to provide the pressure of the liquid and then scaling this measure with a conversion factor k1 to compute the depth of liquid (i.e. pond-depth) in the instrument test region, where $P_{Liquid}=P_{ATM+Liquid}-P_{ATM}$, and height of liquid depth $H=P_{Liquid}/p_{water}$;

FIG. 42B shows a schematic representation of a pond-depth sensing instrument system of the present invention for integration within a GNSS rover system of the present invention, and measuring the depth of ponding on a rooftop or like surface using a first method of pressure measurement (M1) employing a first "remote" pressure reference (e.g. NOAA, NMS, etc.) or other remote sensing station, for measuring the atmospheric reference, and a second absolute pressure sensor for measuring the pressure of the liquid and the atmosphere using as second strain gauge sensor mounted on a sensing membrane within pressure test measurement chamber and producing an output voltage ($V_{atm}$), and a signal processor for computing the difference between these pressure measurements to provide the pressure of the liquid and then scaling this measure with a conversion factor k1 to compute the depth of liquid (i.e. pond-depth) in the instrument test region, where $P_{Liquid}=P_{ATM+Liquid}$ $P_{ATM}$, and height of liquid depth $H=P_{Liquid}/p_{water}$;

FIG. 43 shows a schematic representation of a pond-depth sensing instrument system of the present invention for integration within the GNSS rover system of the present invention, and measuring the depth of ponding on a rooftop or like surface using a second method of pressure measurement (M2) employing a differential pressure sensor for measuring the atmospheric reference using a strain gauge sensor mounted on a sensing membrane within pressure test measurement chamber and producing an output voltage ($V_{Liquid}$), and a signal processor for scaling the measured liquid pressure with a conversion factor k2 to compute the depth of liquid (i.e. pond-depth) in the instrument test region, where $P_{Liquid}=(V_{Liquid})*k2$, and height of liquid depth $H=P_{Liquid}/p_{water}$;

FIG. 44A shows a schematic representation of the rooftop pond-depth sensing instrument system shown in FIG. 42, employing an absolute pressure sensor and Method M1, and shown operating without liquid in its pond-depth sensing chamber, and producing zero pond-depth value H=0;

FIG. 44B shows a schematic representation of the rooftop pond-depth sensing instrument system of FIG. 42, employing an absolute pressure sensor and Method M1, and shown operating with liquid in its pond-depth sensing chamber, and producing a non-zero pond-depth value H;

FIG. 45A shows a schematic representation of the rooftop pond-depth sensing instrument system of FIG. 43, employing a differential pressure sensor and Method M2, and shown operating without liquid in its pond-depth sensing chamber, and producing zero pond-depth value H;

FIG. 45B shows a schematic representation of the rooftop pond-depth sensing instrument system employing a differential pressure sensor and Method M2, and shown operating with liquid in its pond-depth sensing chamber, and producing a non-zero pond-depth value H;

FIG. 46 shows an exploded view of a GNSS rover system with an integrated in-pole pond-depth sensing instrument as shown in FIG. 42, using method M1, comprising a GNSS controller portion having a base housing, the PC board with antenna element, upper housing with antenna cover, and a hollow support pole mounted to the base housing supporting the PC board and its onboard absolute pressure sensors;

FIG. 47 shows a close-up exploded view of the GNSS rover system shown in FIG. 46, showing the base housing, the PC board with antenna element for mounting on the base housing plate, an upper housing with antenna cover, and the hollow support pole connecting to the bottom of the base housing support plate;

FIG. 48 shows an elevated cross-sectional side view of the GNSS rover system depicted in FIGS. 46 and 47, and showing the base housing plate supporting the PC board with antenna element, the upper housing with antenna cover, and the hollow support pole connected to the base housing support plate providing fluid/air communication between the absolute pressure sensor and the bottom of the hollow support pole;

FIG. 49A shows a view of a GNSS rover system with an integrated in-pole pond-depth sensing instrument as shown in FIG. 42, using method M1, comprising a GNSS controller portion having a base housing with support plate, the PC board with antenna element mounted in the support plate, an upper housing with antenna cover, and a hollow support pole having a pressure sensing tube mounted therealong and connected to a sensing port in the base plate and a funnel at the bottom end of the support tube for sensing the depth of ponding of water on a rooftop surface, above which the bottom end of the support tube is supported via a support base structure on roof deck next to a roof deck drain;

FIG. 49B shows a closeup view of a GNSS rover system of FIG. 49A provided with an integrated in-pole pond-depth sensing instrument as shown in FIG. 42, using method M1, and comprising a GNSS controller portion having a base housing with support plate, the PC board with antenna element mounted in the support plate, an upper housing with antenna cover, and a hollow support pole having a pressure sensing tube mounted therealong and connected to a sensing port in the base plate and a funnel at the bottom end of the support tube for sensing the depth of ponding of water on a rooftop surface, above which the bottom end of the support tube is removed from the support base structure on a roof deck;

FIG. 50A shows an elevated cross-sectional side view of the GNSS rover system depicted in FIGS. 49A and 49B, comprising a controller housing, a hollow support pole, a pressure sensing tube mounted therealong and connected to a sensing port in the base plate and a funnel at the bottom end of the support tube for sensing the depth of water ponding on a rooftop surface, above which the bottom end of the support tube is inserted in the support base structure;

FIG. 50B shows a close-up cross-sectional side view of the GNSS rover system depicted in FIG. 50A, comprising a controller housing, hollow a support pole, a pressure sensing tube mounted therealong and connected to a sensing port in the base plate, a PC board, an absolute pressure sensor for use in measuring local atmospheric pressure, and a pressure port vent;

FIG. 50C shows an elevated cross-sectional side view of the GNSS rover system depicted in FIGS. 50A and 50B, comprising the hollow support pole, the funnel at the bottom end of the support tube for sensing the depth of ponding of water on a rooftop surface, the filter screen cover the input port of the funnel, and the bottom end of the support tube that is inserted in the support base structure;

FIG. 50D shows an exploded view of the GNSS rover system shown in FIGS. 49A, 49B, 50A, 50B and 50C showing its upper and lower housing portions, its PC board supported therebetween, its antennas, its battery power storage module, its photovoltaic (PV) panel, the funnel, and the hollow support tube inserted into the base support structure;

FIG. 51A shows a perspective view of the GNSS rover system shown in FIGS. 49A through 50D showing its upper unit and support tube removed from the support base structure that is fastened to the roof surface, alongside of which is a roof drain and a bucket of water to be used for testing;

FIG. 51B shows a perspective view of the GNSS rover system shown in FIGS. 49A through 50D, showing the upper unit and support tube removed from the support base structure and placed in the bucket of water to be used for testing, a roof drain and support base structure on the roof deck.

Figure 9:
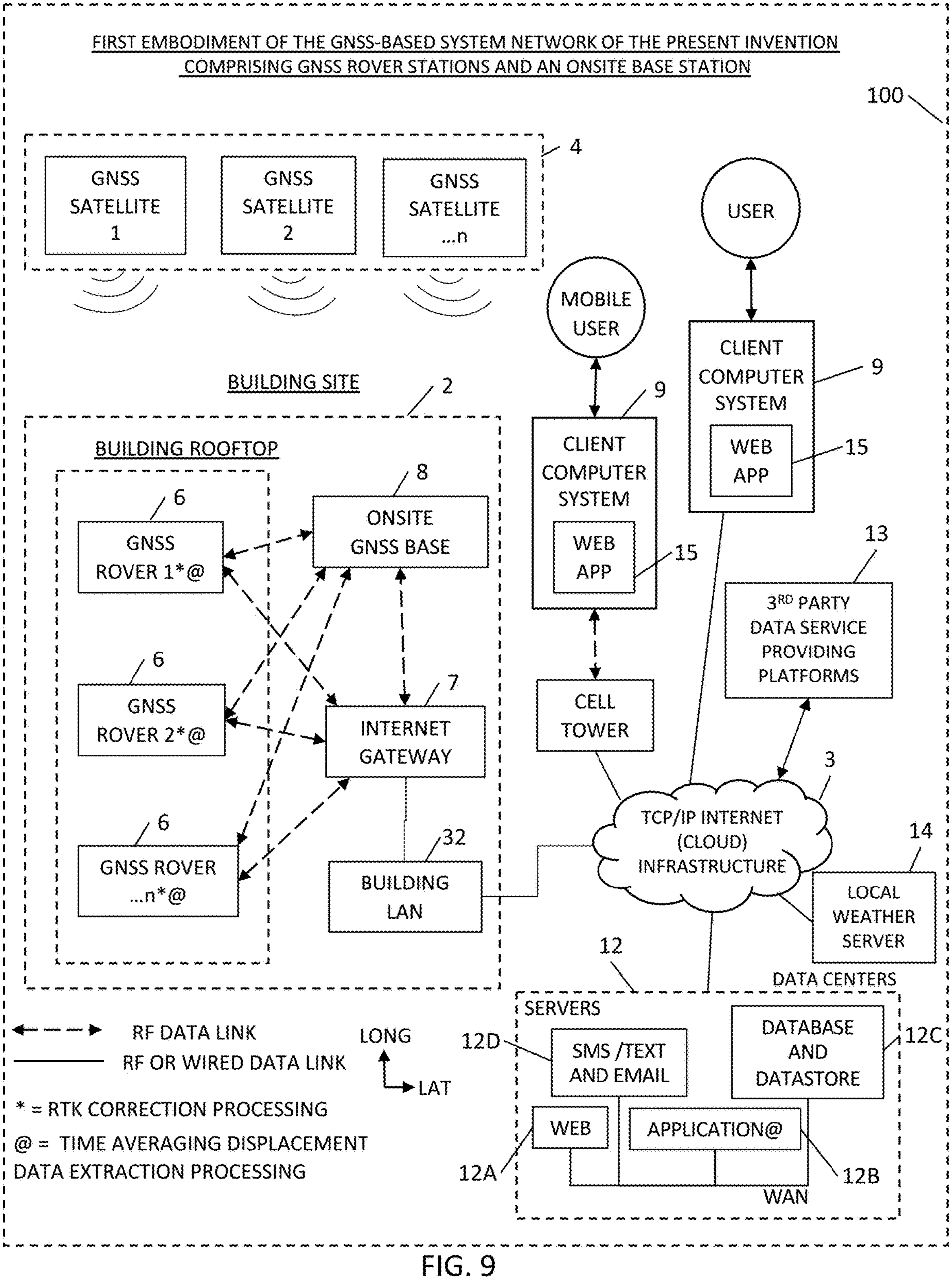
FIG. 9 shows a system schematic block diagram of the first embodiment of the GNSS-based system network of the present invention comprising GNSS rover stations and onsite GNSS base station using internet gateway and LAN-based internet access for carrying out RTK position correction over a cloud-based TCP/IP network architecture supporting (i) a plurality of GNSS satellites transmitting GNSS signals towards the earth and objects below, (ii) a plurality of GNSS rovers of the present invention mounted on the rooftop surfaces of buildings having an internet gateway and building LAN, for receiving and processing transmitted GNSS signals during monitoring using time averaging seismic data extraction processing, (iii) an internet gateway providing the GNSS rovers access to the Internet communication infrastructure, (iv) one or more GNSS base stations to support RTK correction of the GNSS signals, (v) one or more client computing systems for transmitting instructions and receiving alerts and notifications and supporting diverse administration, operation and management functions on the system network, (vi) a cell tower for supporting cellular data communications across the system network, and (vii) a data center supporting web servers, application servers, database and datastore servers, and SMS/text and email servers, (viii) a local weather station.
Figure 51C:
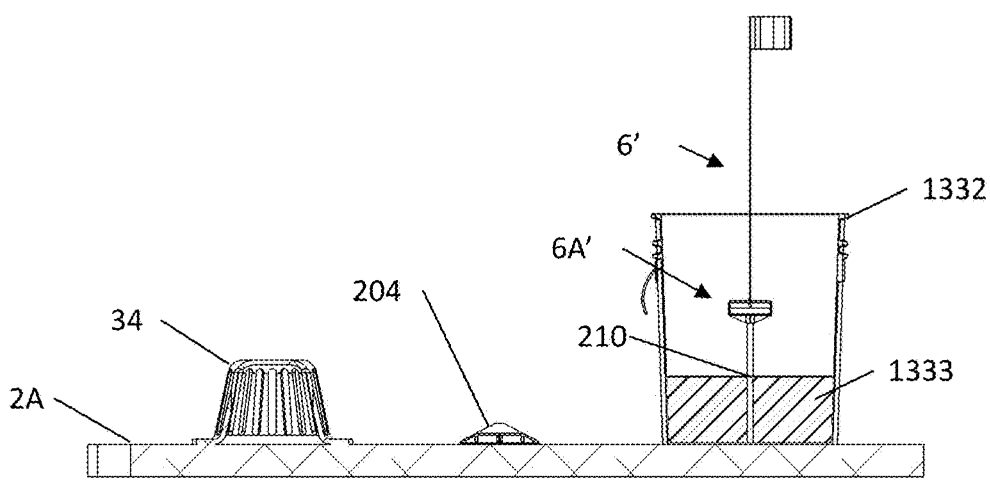
Figure 52:
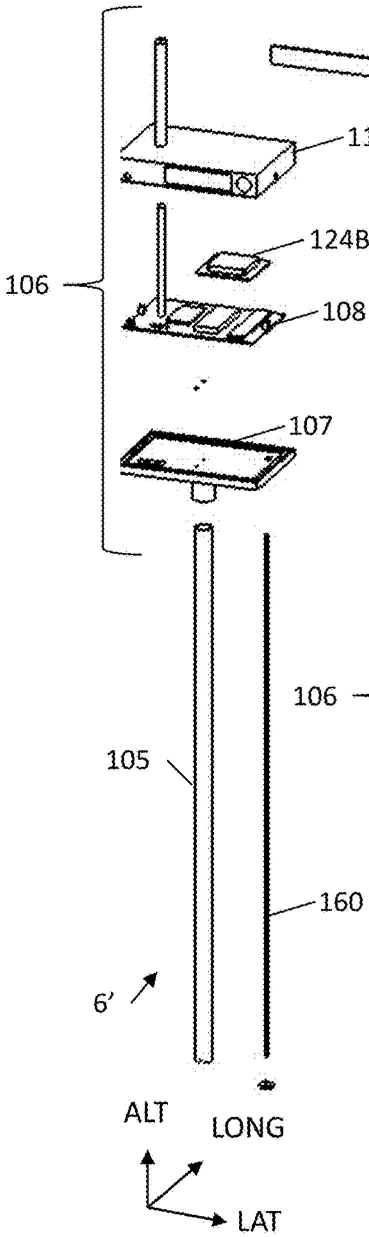
Figure 53:
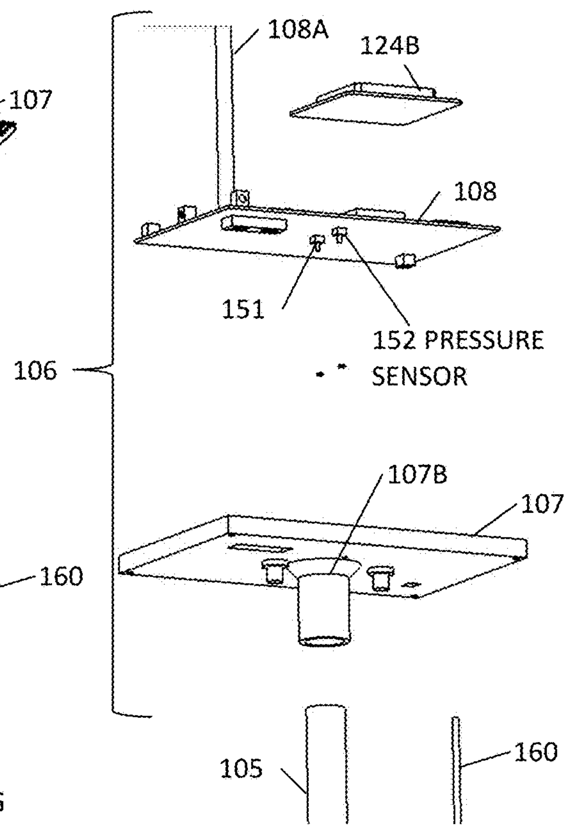
Figure 54:
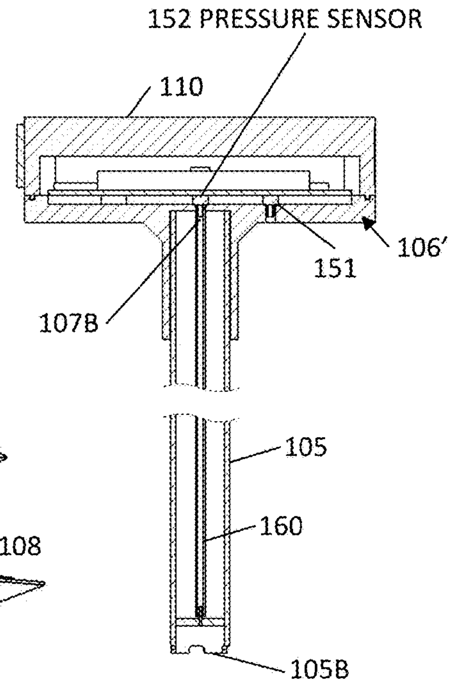
Figure 55:
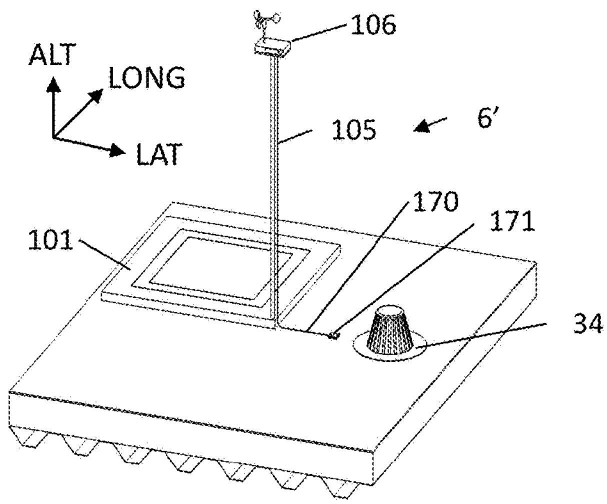
Figure 56:
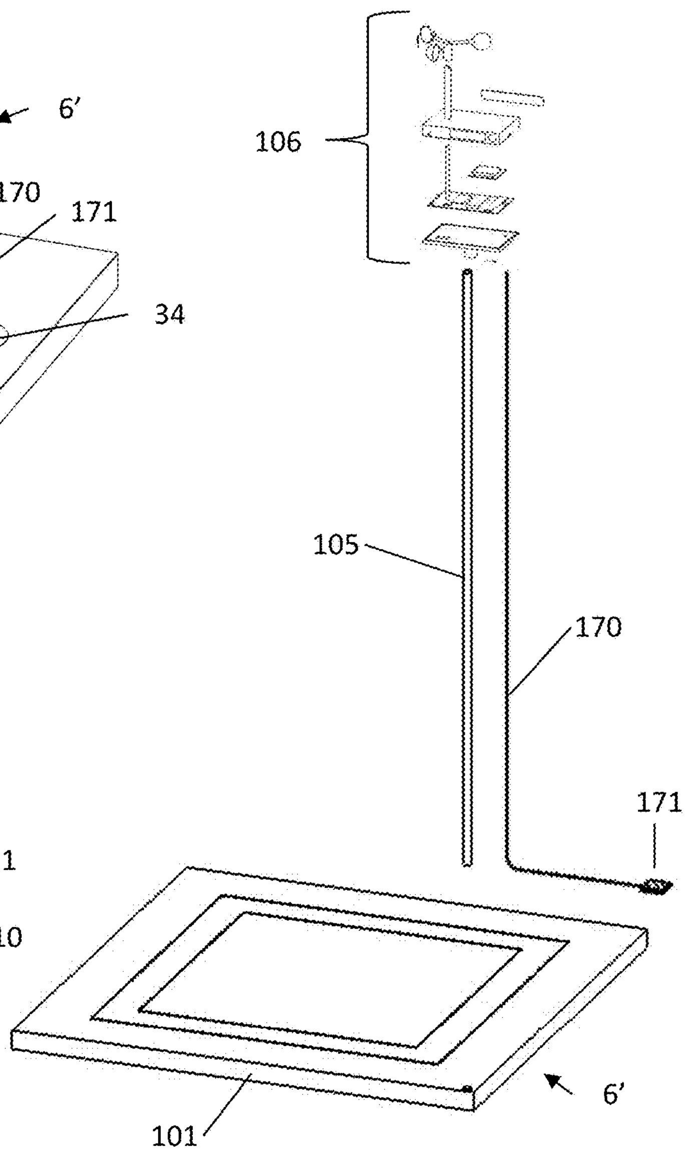
Figure 57:
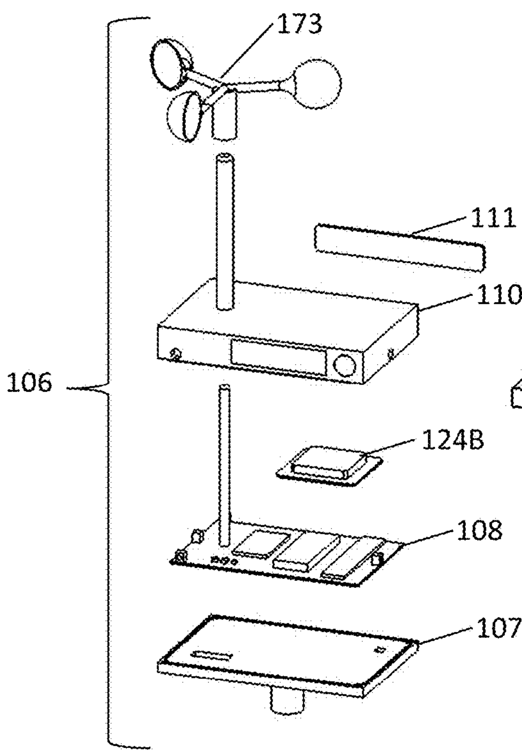
Figure 58:
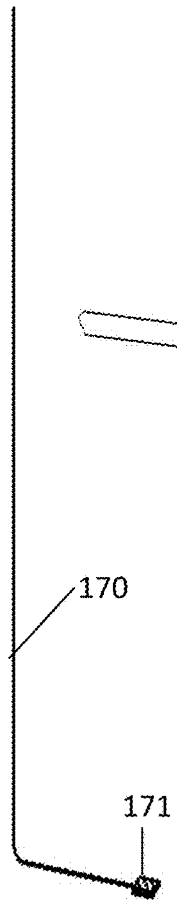
Figure 59:
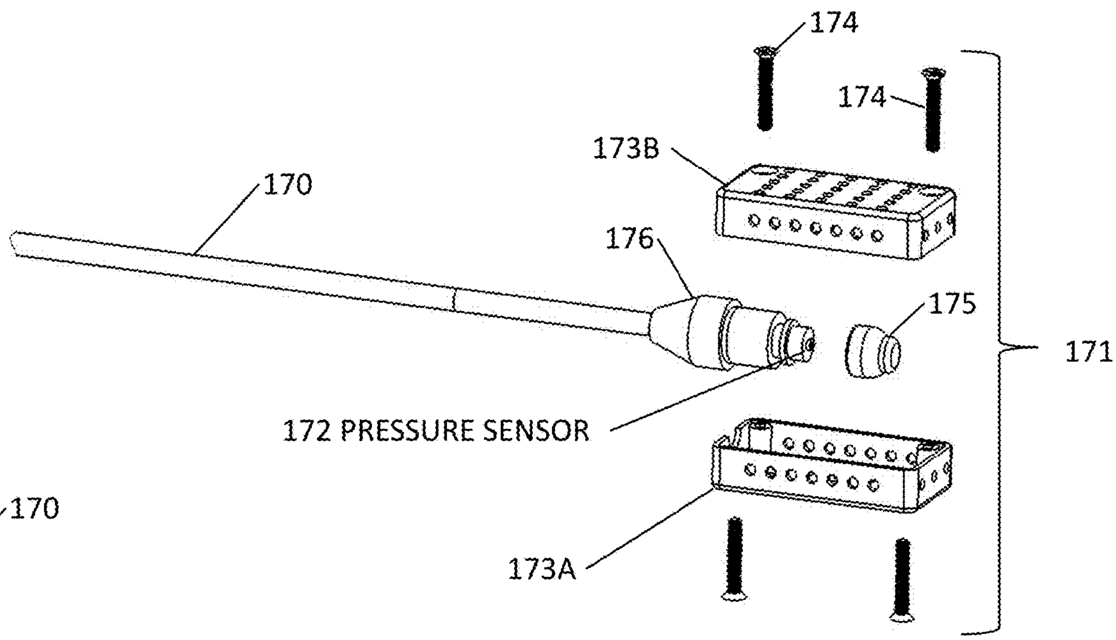
Figure 60:
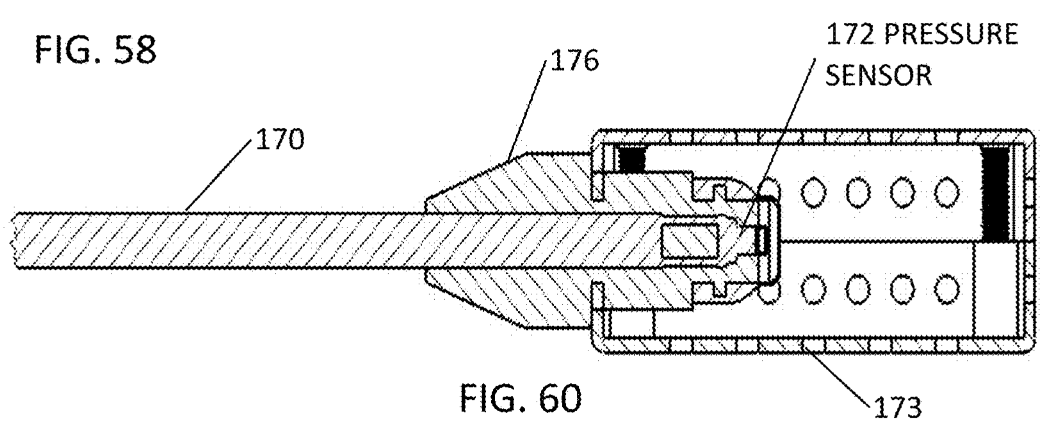
Figure 61:
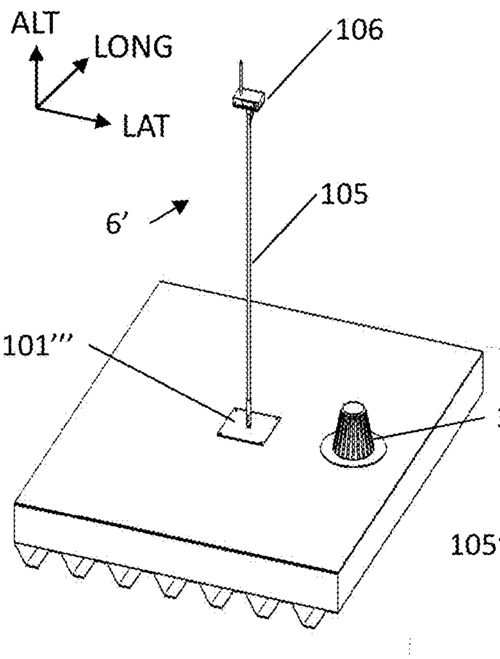
Figure 63:
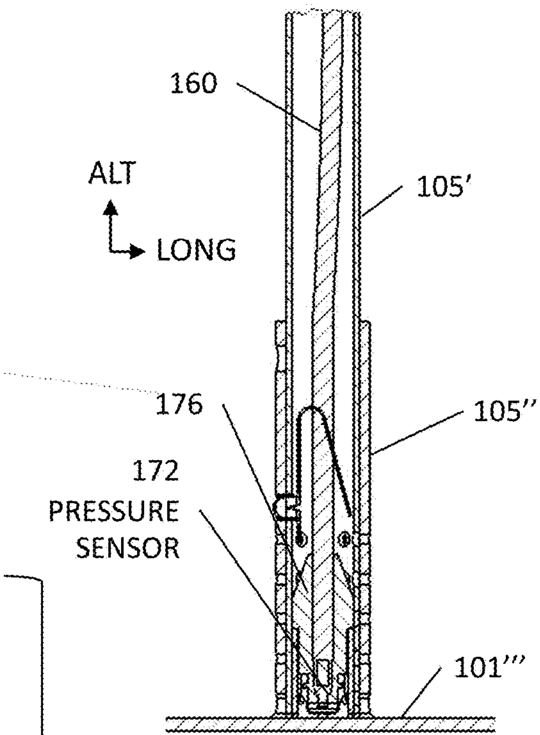
Figure 62:
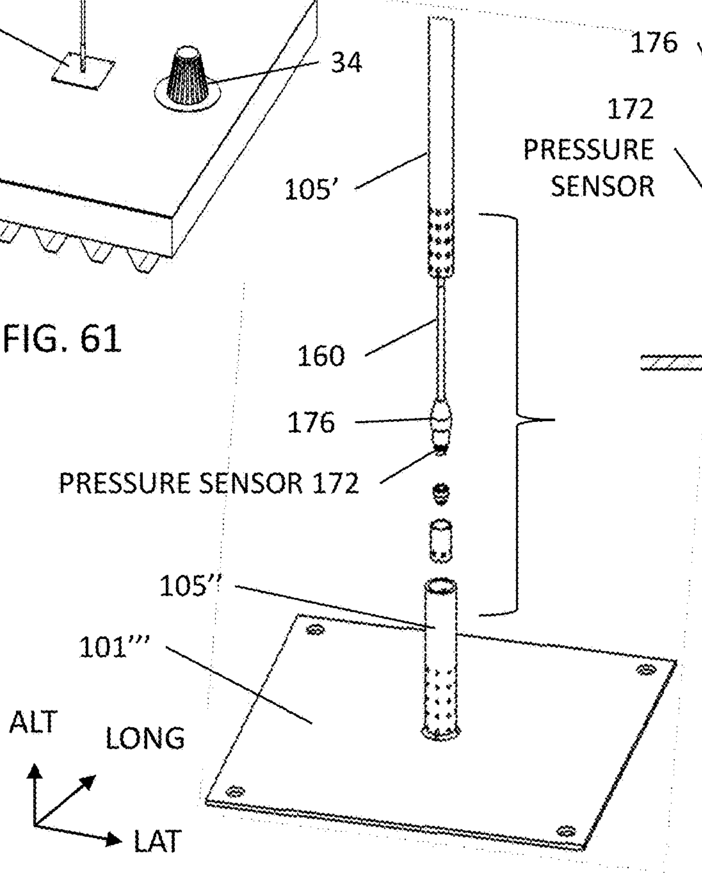
Figure 65:
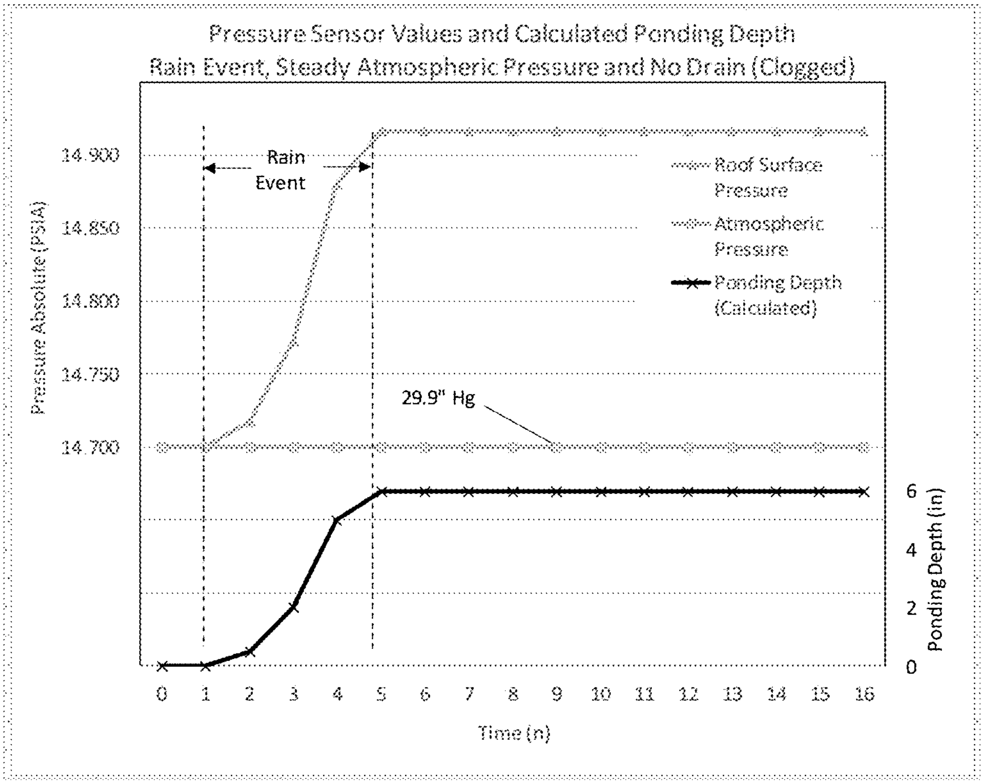
Figure 66:
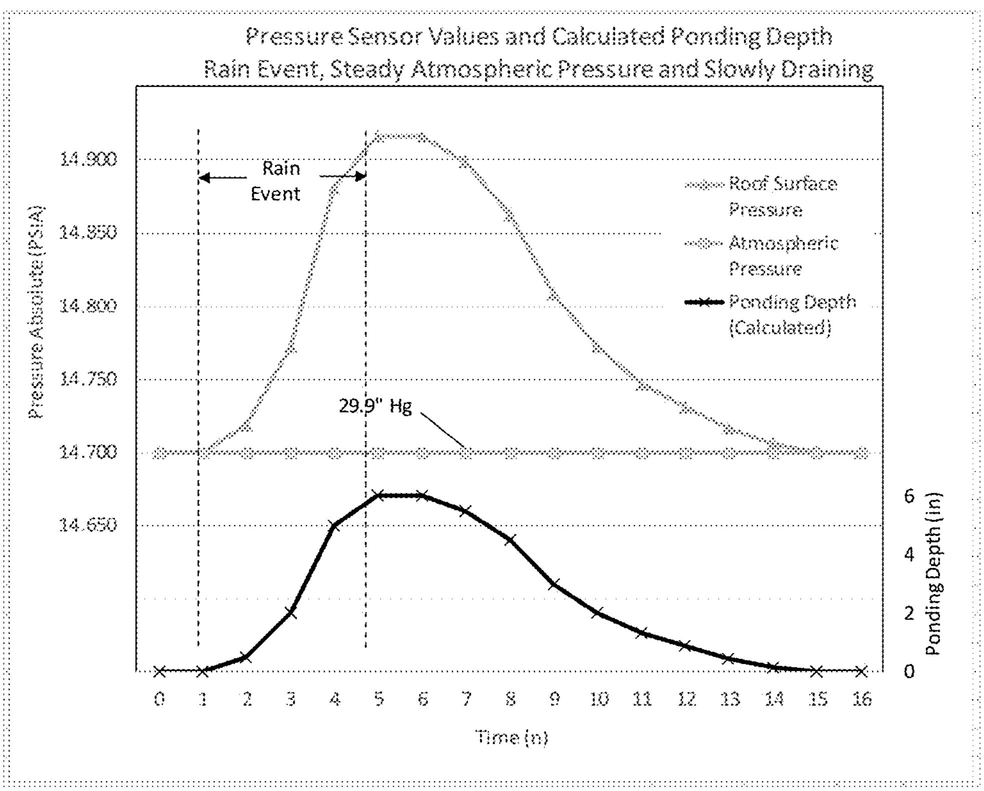
Figure 67:
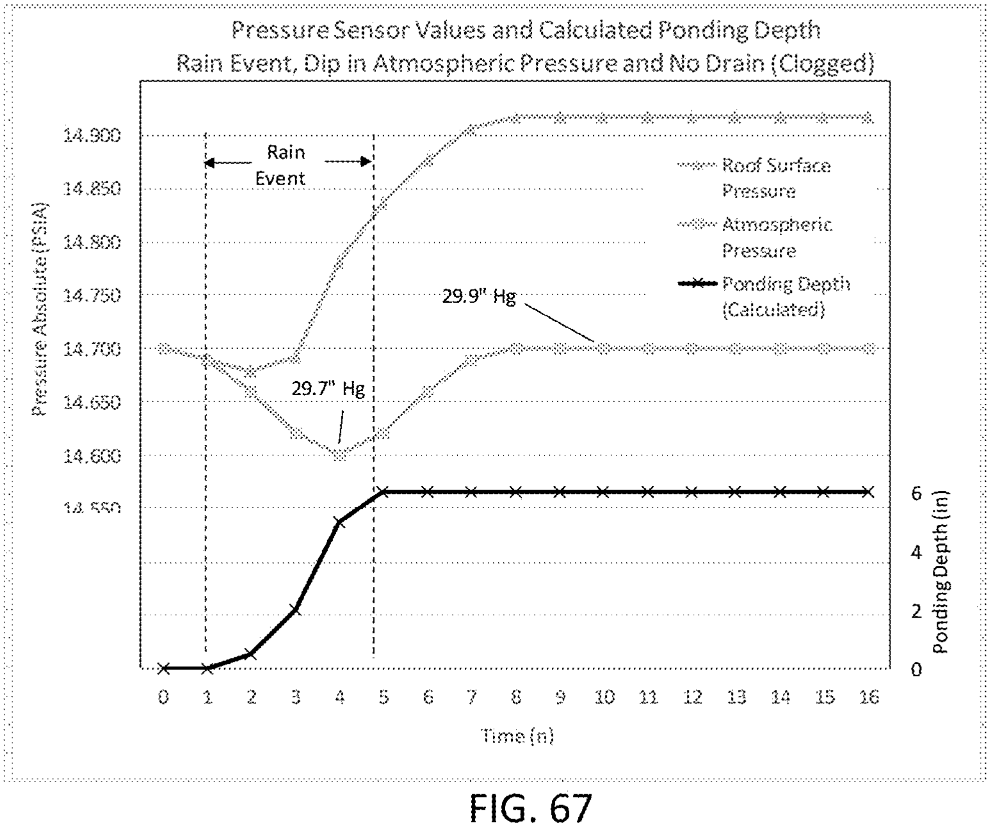
Figure 68:
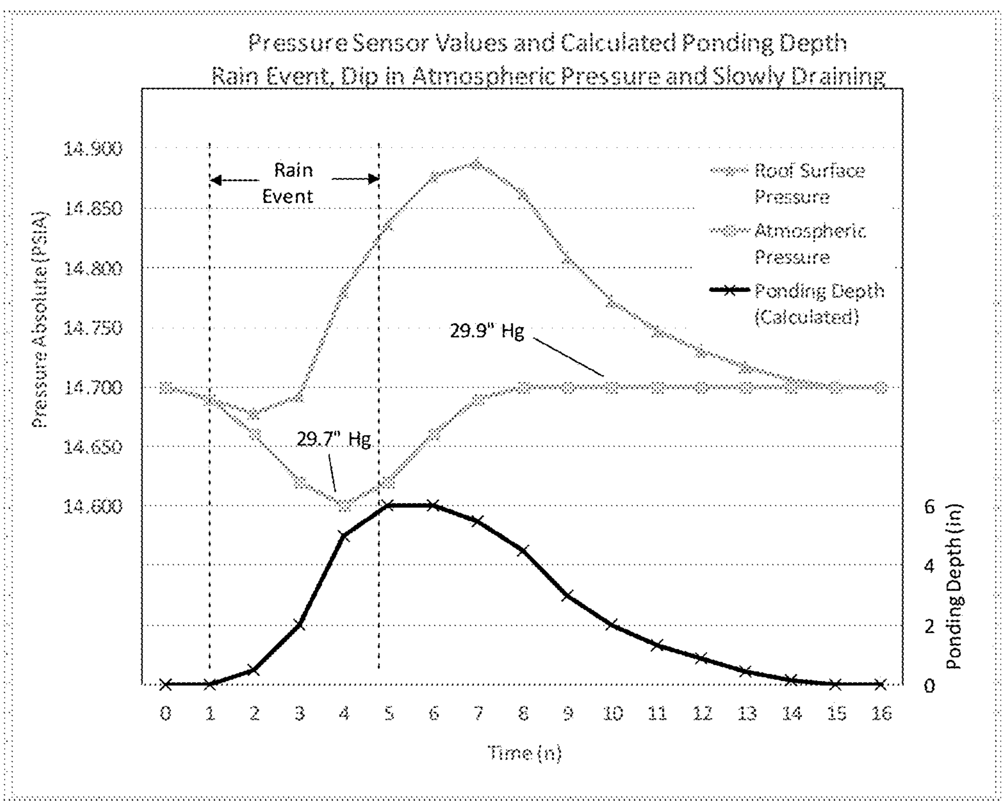
Figure 69:
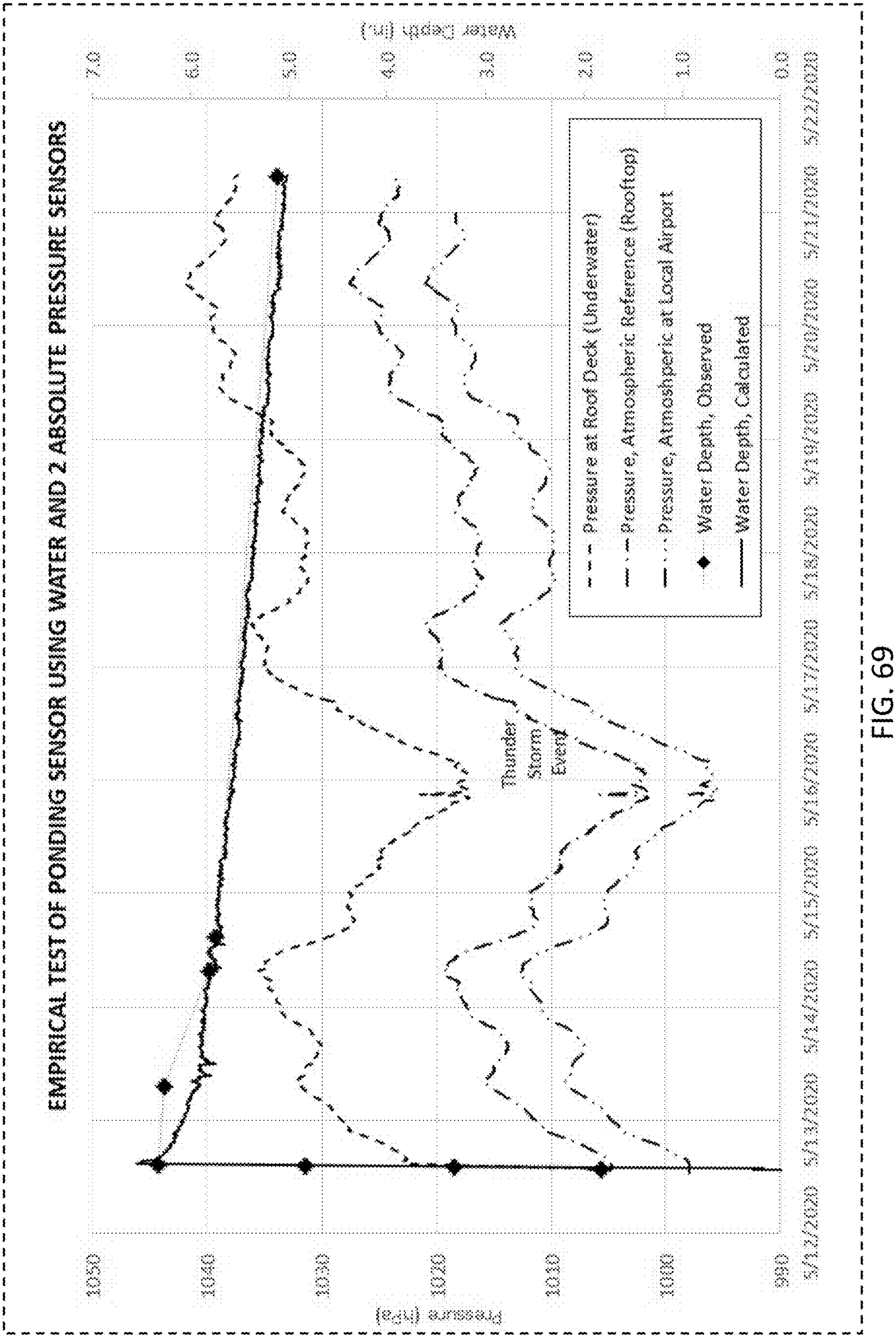
Figure 70:
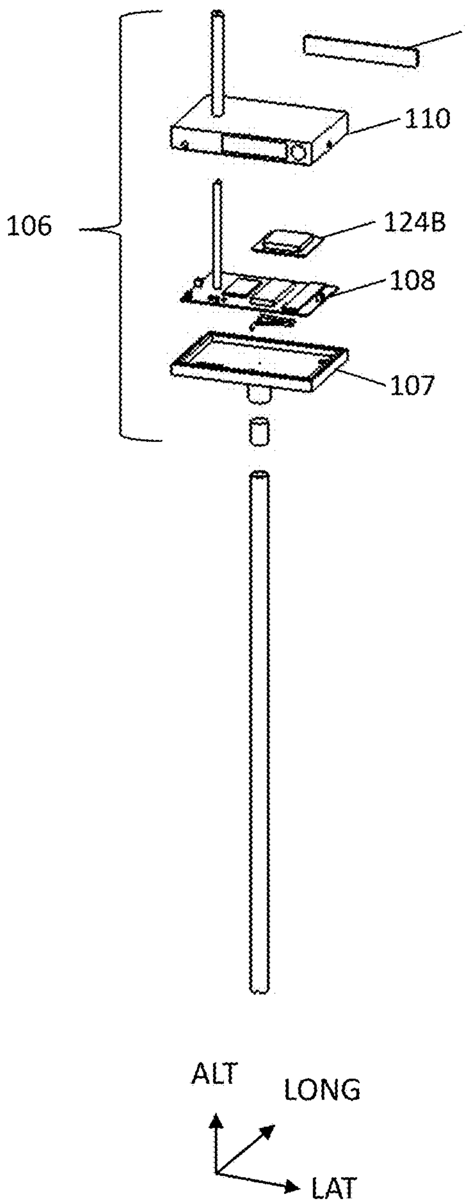
Figure 71:
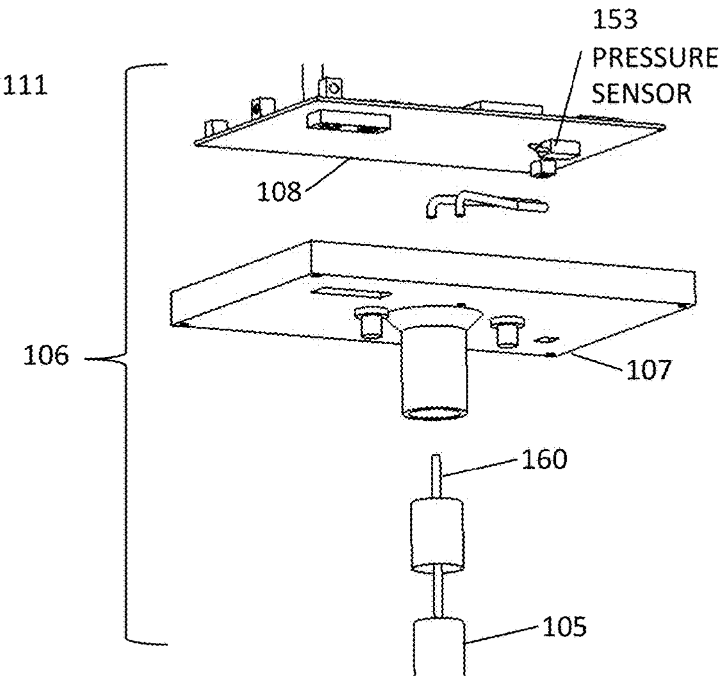
Figure 72:
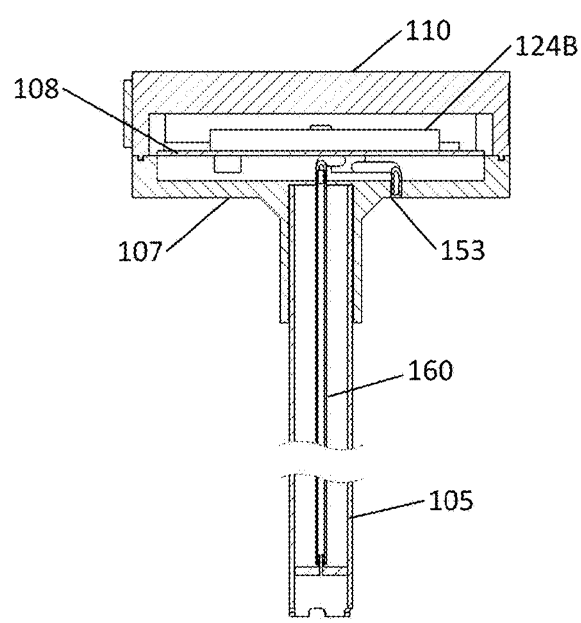
Figure 73:
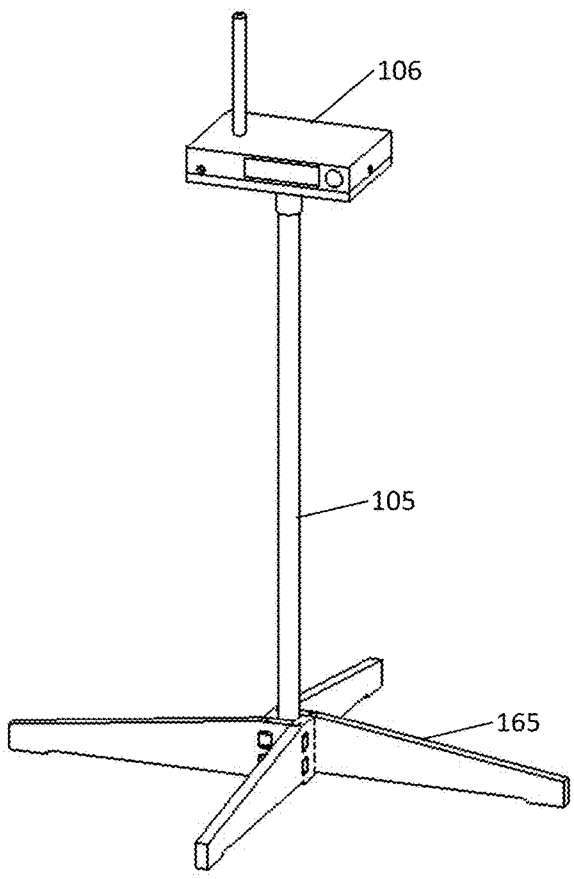
Figure 74:
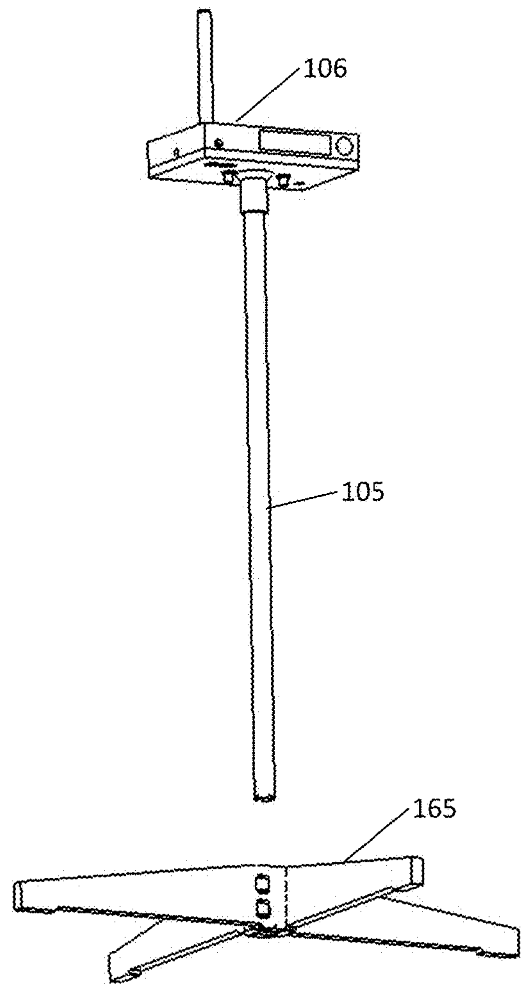
Figure 75A:
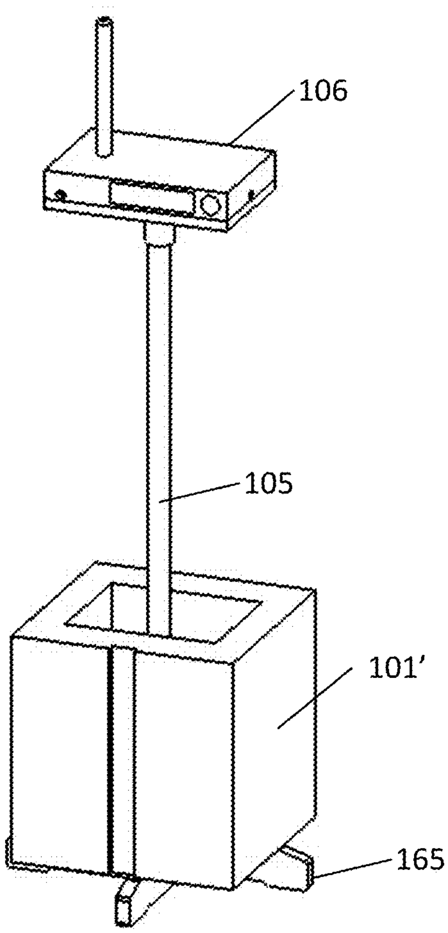
Figure 75B:
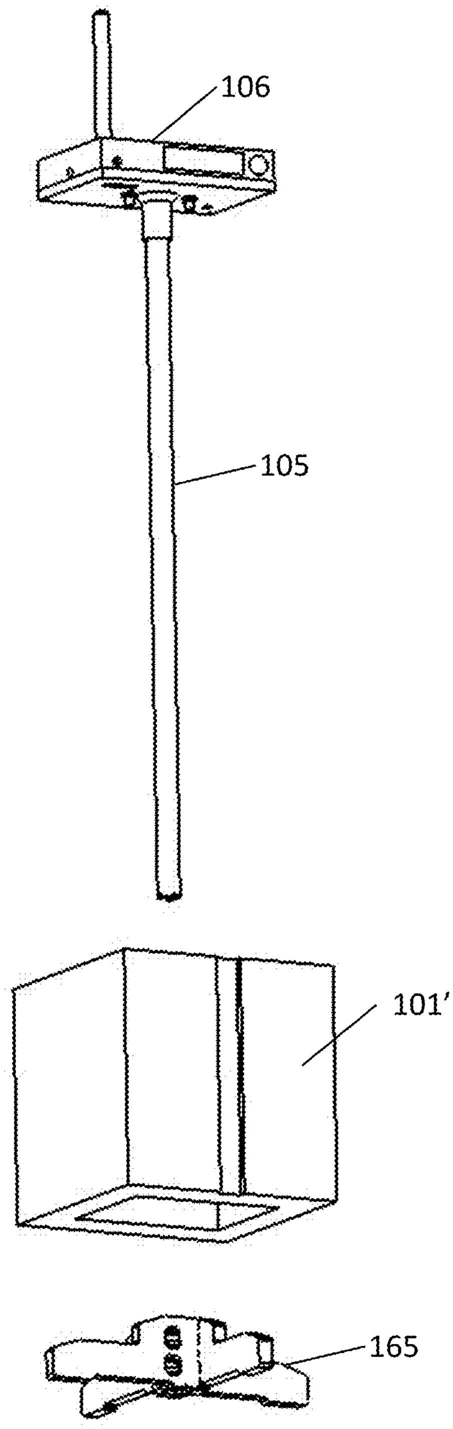
Figure 76A:
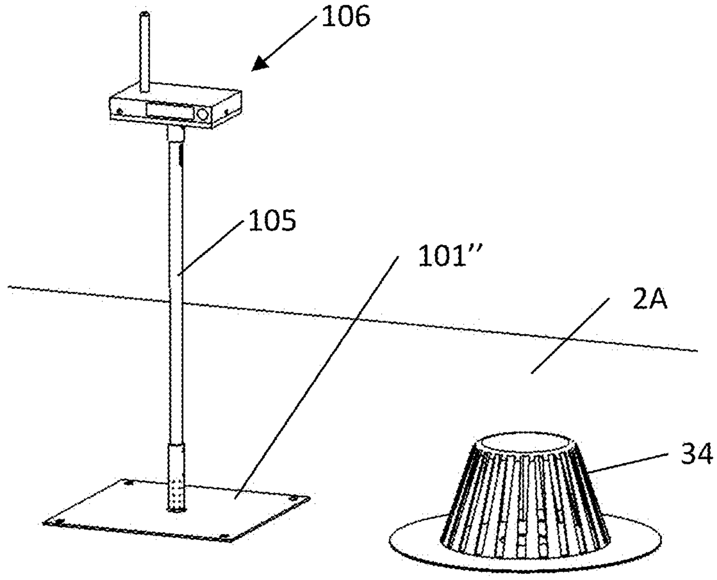
Figure 76B:
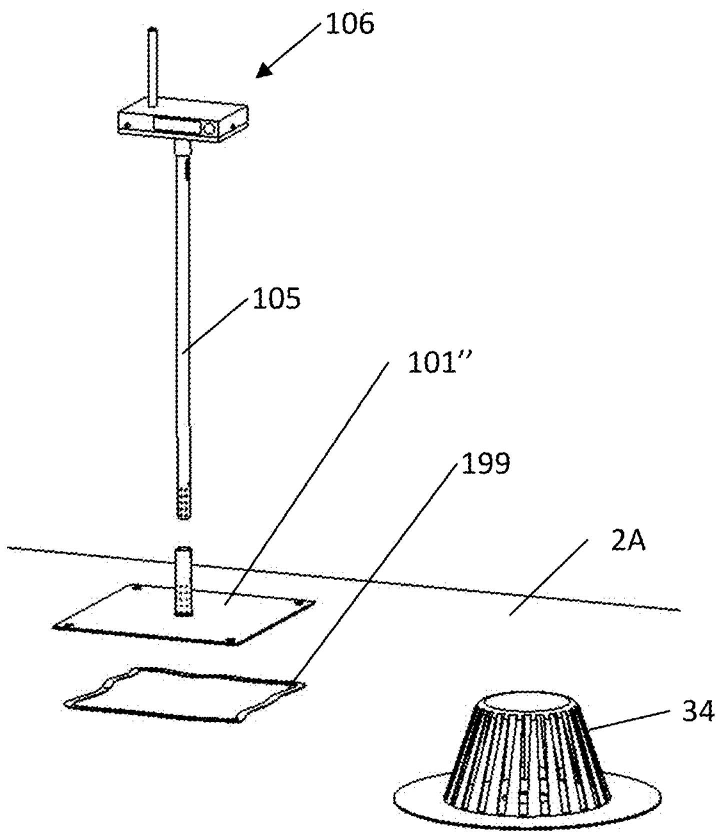

FIG. 51C shows a side cross-sectional view of the GNSS rover system of the present invention illustrated in FIGS. 49A through 50D, showing the upper unit and support tube removed from the support base structure and placed in the bucket of water during testing, located alongside a roof drain and the support base structure on the roof deck;

FIG. 52 shows an exploded view of an alternative embodiment of the GNSS rover system of the present invention provided with an integrated in-pole pond-depth sensing instrument as shown in FIG. 42, using the method M1, and comprising a GNSS controller portion having a base housing, the PC board with antenna element and a pressure sensor, an upper housing with antenna cover, and a hollow support pole having a pressure sensing tube mounted therealong and connected to a fixed pressure measurement chamber at the bottom end of the support tube for sensing the depth of ponding of water on a rooftop surface, above which the bottom end of the support tube is supported via a support base structure;

FIG. 53 shows a close-up exploded view of the GNSS rover system shown in FIG. 52, showing the base housing, the PC board with antenna element, upper housing with antenna cover, and the hollow support pole;

FIG. 54 shows an elevated cross-sectional side view of the GNSS rover system depicted in FIGS. 52 and 53, and showing the base portion, the PC board with antenna element, the upper housing with antenna cover, and the broken and cut-away hollow support pole;

FIG. 55 shows an exploded view of another embodiment of the GNSS rover system of the present invention provided with an integrated in-pole pond-depth sensing instrument as shown in FIG. 42, using the method M1, and comprising a GNSS controller portion having a base housing, the PC board with antenna element, an upper housing with antenna cover, and a hollow support pole having a cable mounted therealong and extending outside the support tube and terminating in two absolute pressuring sensors mounted at the cable end, for sensing the depth of ponding of water near a drain on a rooftop surface;

FIG. 56 shows an exploded view of the GNSS rover system of FIG. 55, showing its controller portion, its absolute pressure sensors at end of cable passed through the hollow support tube;

FIG. 57 is an exploded view of the controller portion of the GNSS rover system in FIG. 55 showing its controller top housing portion and controller base housing portion, with a PC board mounted therebetween, and a windspeed measuring instrument mounted on the top of the housing and connected to the PC board;

FIG. 58 shows a perspective view of the absolute pressure sensor mounted at the end of a cable passed through the support tube of the GNSS rover integrated pond-depth sensing instrument;

FIG. 59 is an exploded view of the cable end portion of the pond-depth sensing instrument subsystem shown in FIG. 58, for integration into the GNSS rover system;

FIG. 60 is a cross-sectional view of the cable end shown in FIG. 59, showing the absolute pressure sensor mounted in a pressure sensing cage protecting the pressure sensor;

FIG. 61 shows a perspective view of another embodiment of the GNSS rover system of the present invention provided with an integrated in-pole pond-depth sensing instrument as shown in FIG. 42, using the method M1, comprising a GNSS controller portion having a base housing, a PC board with antenna element, an upper housing with antenna cover, and a hollow support pole having a cable mounted therealong and extending to the bottom of the support tube and terminating in a pair of absolute pressuring sensors mounted at the cable end, for sensing the depth of ponding of water on a rooftop surface near the bottom of the support tube, shown in FIG. 63, as being orthogonal to the support base typically located near a rooftop rain drain;

FIG. 62 is an exploded view of the bottom pole section of the GNSS rover system shown in FIG. 61, showing one of its pressure sensors mounted to the end of a cable mounted at the bottom end of the hollow support tube, immediately above the bottom of the base support plate where water is allowed to pool on a roof-top surface;

FIG. 63 is a cross-section view of the bottom portion of the hollow support tube employed in the GNSS rover system shown in FIG. 61;

FIG. 64 shows a method of communication and information processing used by the GNSS rover system of the present invention when measuring pond-depth on a planar surface using two independent absolute pressure sensors arranged according to the first method M1;

FIG. 65 is a graphical representation plotting the absolute roof surface pressure and atmospheric pressure measured by both absolute pressure sensors employed in the pond-depth sensing instrument system of FIGS. 42A and 42B (supporting Method M1), and the pond-depth measured and calculated (in inches) by the pond-depth sensing instrument system over the passage of time, including the occurrence of a rain event, steady atmospheric pressure, and no drain clogging;

FIG. 66 is a graphical representation plotting the absolute roof surface pressure and atmospheric pressure measured by both absolute pressure sensors employed in the pond-depth sensing instrument system of FIGS. 42 and 42B, and the pond-depth measured and calculated by the instrument system over the passage of time, including the occurrence of a rain event, steady atmospheric pressure and slow draining;

FIG. 67 is a graphical representation plotting the absolute roof surface pressure and atmospheric pressure measured by both absolute pressure sensors employed in the pond-depth sensing instrument system of FIGS. 42A and 42B, and the pond-depth measured and calculated (in inches) by the instrument system over the passage of time including the occurrence of a rain event, a dip in atmospheric pressure and slow draining;

FIG. 68 is a graphical representation plotting the absolute roof surface pressure and atmospheric pressure (PSIA) measured by both absolute pressure sensors employed in the pond-depth sensing instrument system of FIGS. 42A and 42B, and the pond-depth measured and calculated (in inches) by the instrument system over the passage of time including the occurrence of a rain event, a dip in atmospheric pressure and slow draining;

FIG. 69 is a graphical data representation characterizing an empirical test of the pond-depth sensing instrument system according to the design shown in FIGS. 42A and 42B, showing (i) pressure measurements at the building roof deck surface and at atmospheric reference measured by two absolute pressure sensors, and (ii) water-depth/pond-depth observed and water/pond depth calculated, plotted against moments or points in time;

FIG. 70 shows an exploded view of a GNSS rover system of the present invention provided with an integrated in-pole pond-depth sensing instrument as shown in FIG. 43 using method M2, and comprising a GNSS controller portion having a base housing, the PC board with antenna element, upper housing with antenna cover, and a hollow support pole mounted to the base housing;

FIG. 71 shows a close-up exploded view of the GNSS rover system shown in FIG. 70, showing the base housing and support plate, the PC board with antenna element, the upper housing with antenna cover, and the hollow support pole;

FIG. 72 shows an elevated cross-sectional side view of the GNSS rover system depicted in FIGS. 70 and 71, and showing the base housing and support plate, the PC board with antenna element, the upper housing with antenna cover, and the hollow support pole;

FIG. 73 shows a perspective view of the GNSS rover system provided with an integrated in-pole pond-depth sensing instrument as shown in FIG. 42 using method M1, or as shown in FIG. 43 using method M2, comprising a GNSS controller portion having a base housing, the PC board with antenna element, upper housing with antenna cover, and a hollow support pole connected to a support base structure for sensing pond-depth;

FIG. 74 shows an exploded perspective view of the GNSS rover system shown in FIG. 73 with an integrated in-pole pond-depth sensing instrument as shown in FIG. 42 using method M1, or as shown in FIG. 43 using method M2, comprising a GNSS controller portion having a base housing, the PC board with antenna element, upper housing with antenna cover, and a hollow support pole connected to a support base structure for sensing pond-depth;

FIG. 75A shows a perspective view of the GNSS rover system provided with an integrated in-pole pond-depth sensing instrument as shown in FIG. 42 using method M1, or as shown in FIG. 43 using method M2, comprising a GNSS controller portion having a base housing, the PC board with antenna element, upper housing with antenna cover, and a hollow support pole connected to a weighted block-like support base structure for sensing pond-depth at the bottom surface of the base structure;

FIG. 75B shows an exploded perspective view of the GNSS rover system shown in FIG. 75A provided with an integrated in-pole pond-depth sensing instrument as shown in FIG. 42 using method M1, or as shown in FIG. 43 using method M2, comprising a GNSS controller portion having a base housing, the PC board with antenna element, upper housing with antenna cover, and a hollow support pole connected to a support base structure for sensing pond-depth at the bottom surface of the base structure;

FIG. 76A shows a perspective view of the GNSS rover system provided with an integrated in-pole pond-depth sensing instrument as shown in FIG. 42 using method M1, or as shown in FIG. 43 using method M2, comprising a GNSS controller portion having a base housing, the PC board with antenna element, upper housing with antenna cover, and a hollow support pole connected to a plate-like support base structure bonded to the roof for sensing pond-depth at the bottom surface of the base structure;

FIG. 76B shows an exploded perspective view of the GNSS rover system shown in FIG. 76A provided with an integrated in-pole pond-depth sensing instrument as shown in FIG. 42 using method M1, or as shown in FIG. 9

Figure 1:
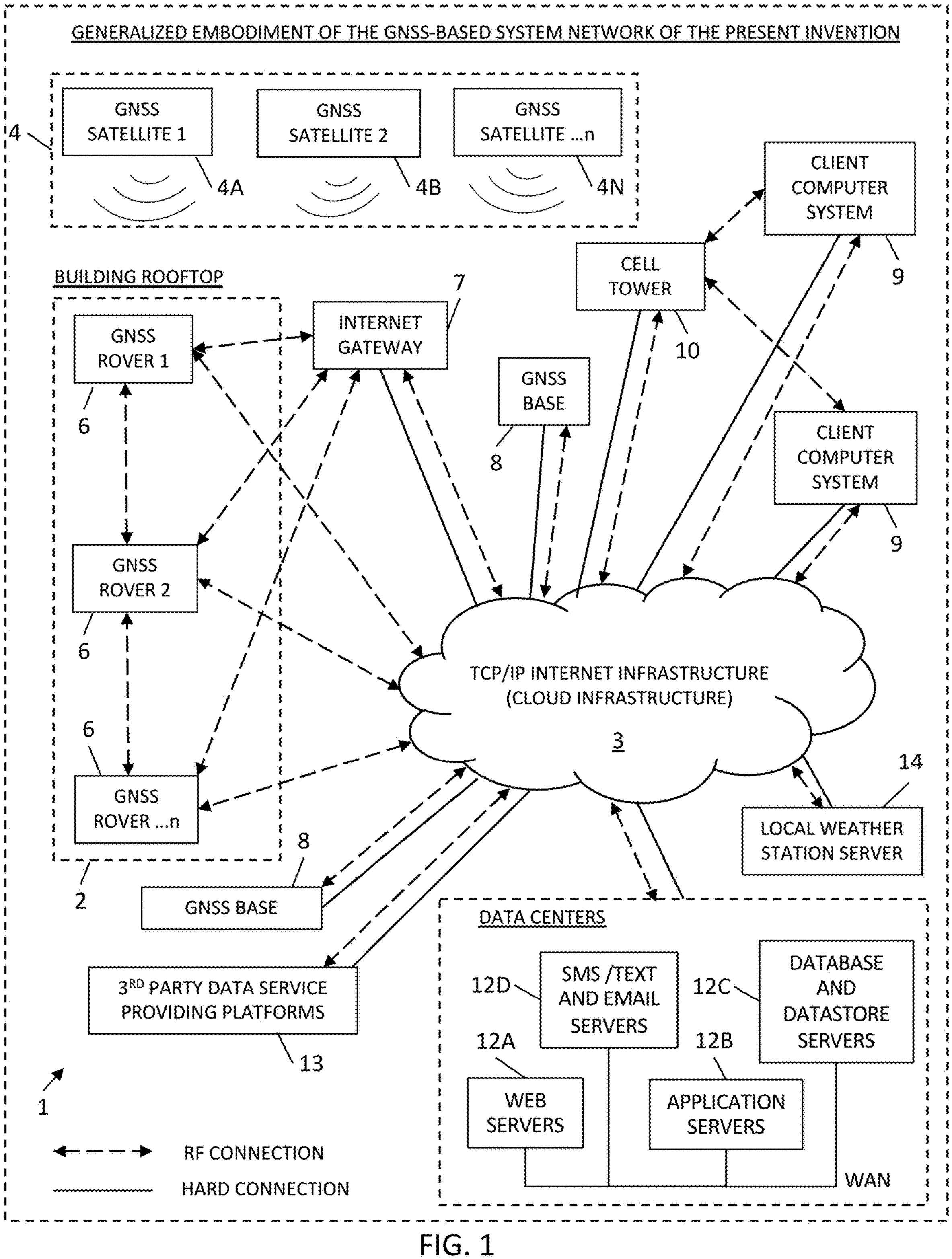
FIG. 1 is a schematic representation of a GNSS network of the present invention in the form of a generic system block diagram, configured for remote monitoring of the displacement, distortion and/or deformation of a stationary and/or mobile system being tracked by the GNSS network, shown comprising a cloud-based TCP/IP network architecture supporting (i) a plurality of GNSS satellites transmitting GNSS signals towards the earth and objects below, (ii) a plurality of GNSS rovers of the present invention mounted on the rooftop surfaces of buildings for receiving and processing transmitted GNSS signals during monitoring using time averaging seismic data extraction processing, (iii) an internet gateway providing the GNSS rovers access to the Internet communication infrastructure, (iv) one or more GNSS base stations to support RTK correction of the GNSS signals, (v) one or more client computing systems for transmitting instructions and receiving alerts and notifications and supporting diverse administration, operation and management functions on the system network, (vi) a cell tower for supporting cellular data communications across the system network, and (vii) a data center supporting web servers, application servers, database and datastore servers, and SMS/text and email servers.
Figure 11:
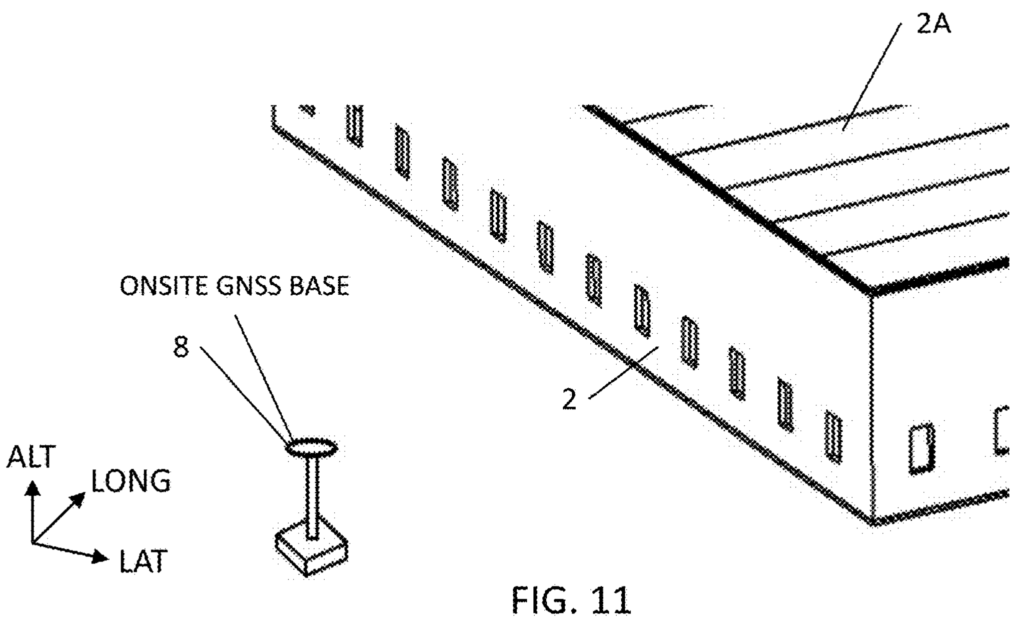
FIG. 11 shows the building system being spatially monitored by the GNSS system network of FIG. 9, with the onsite RTK-correcting GNSS base unit mounted on the premises thereof.
Figure 77:
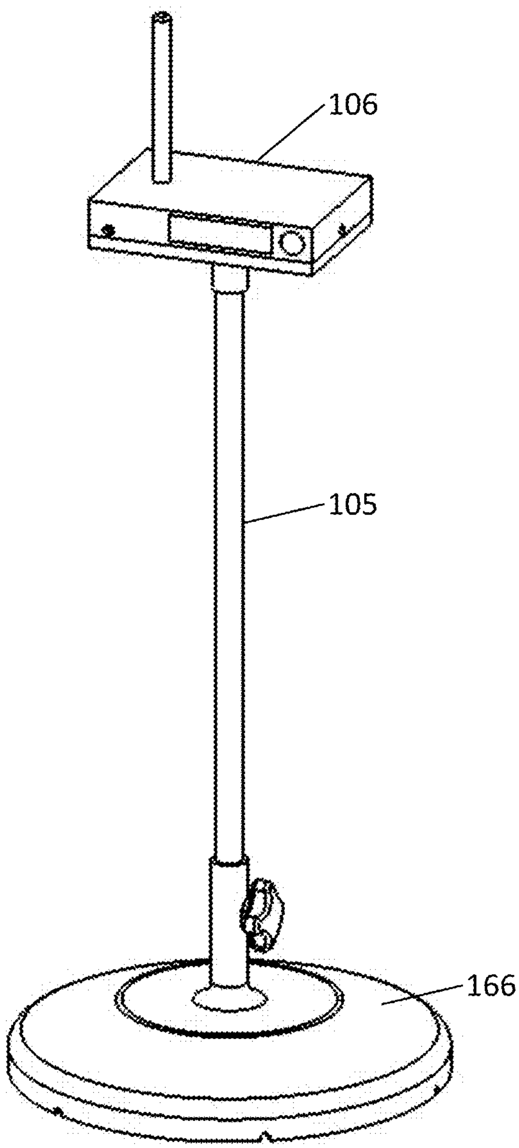
Figure 78:
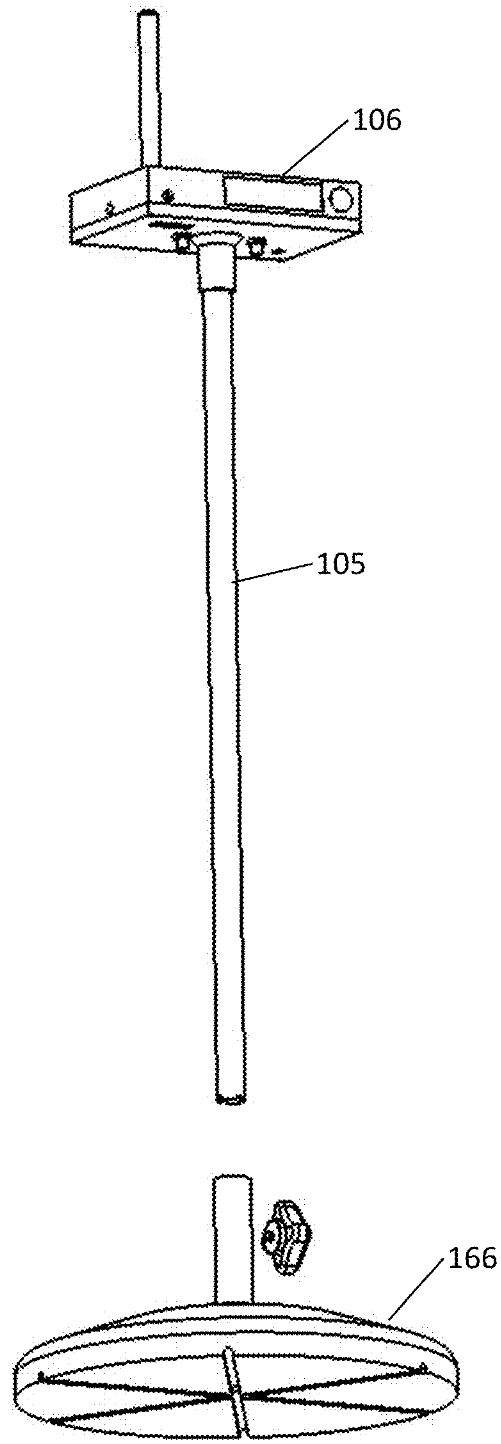
Figure 80:
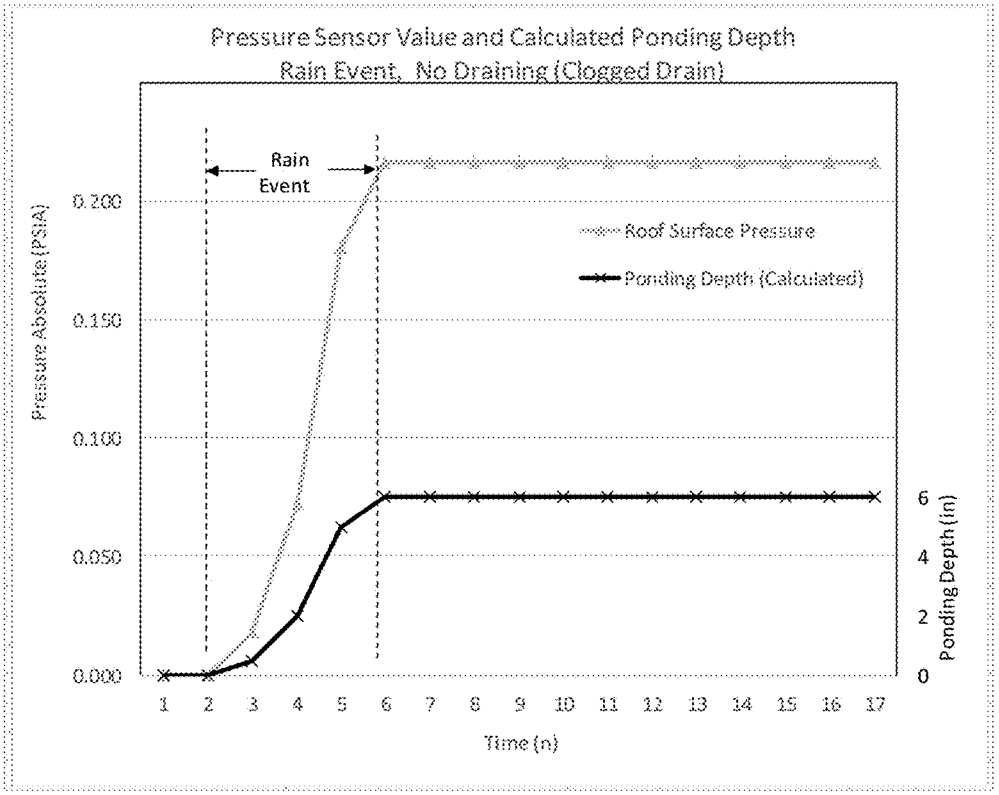
Figure 81:
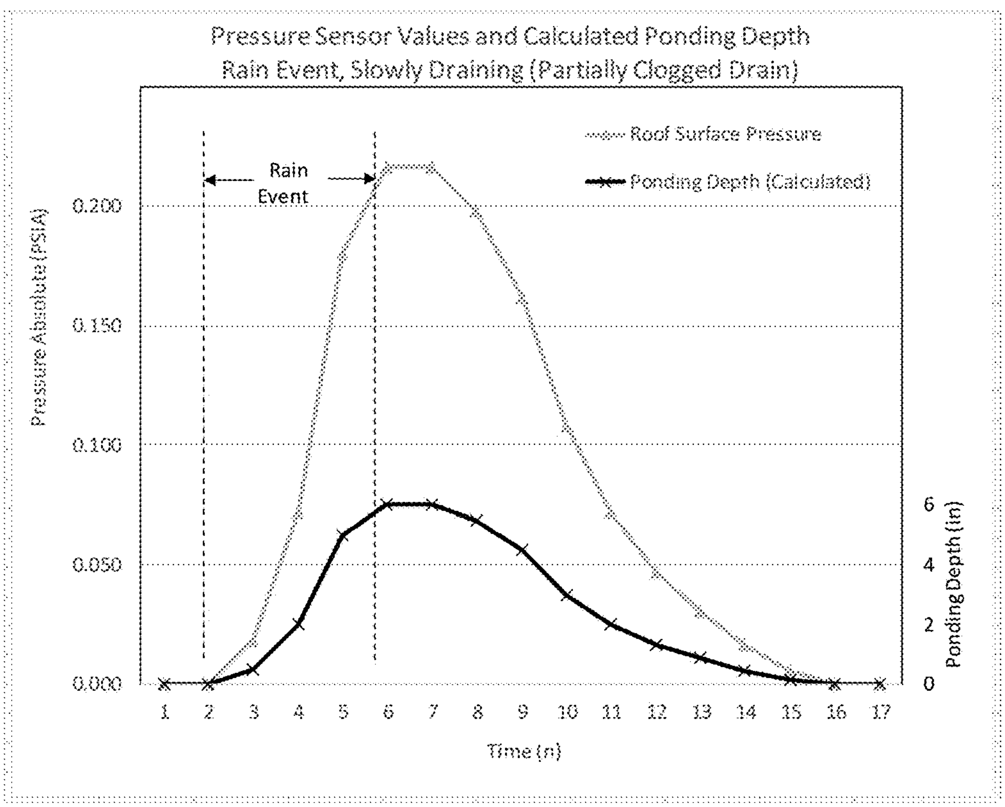
Figure 82:
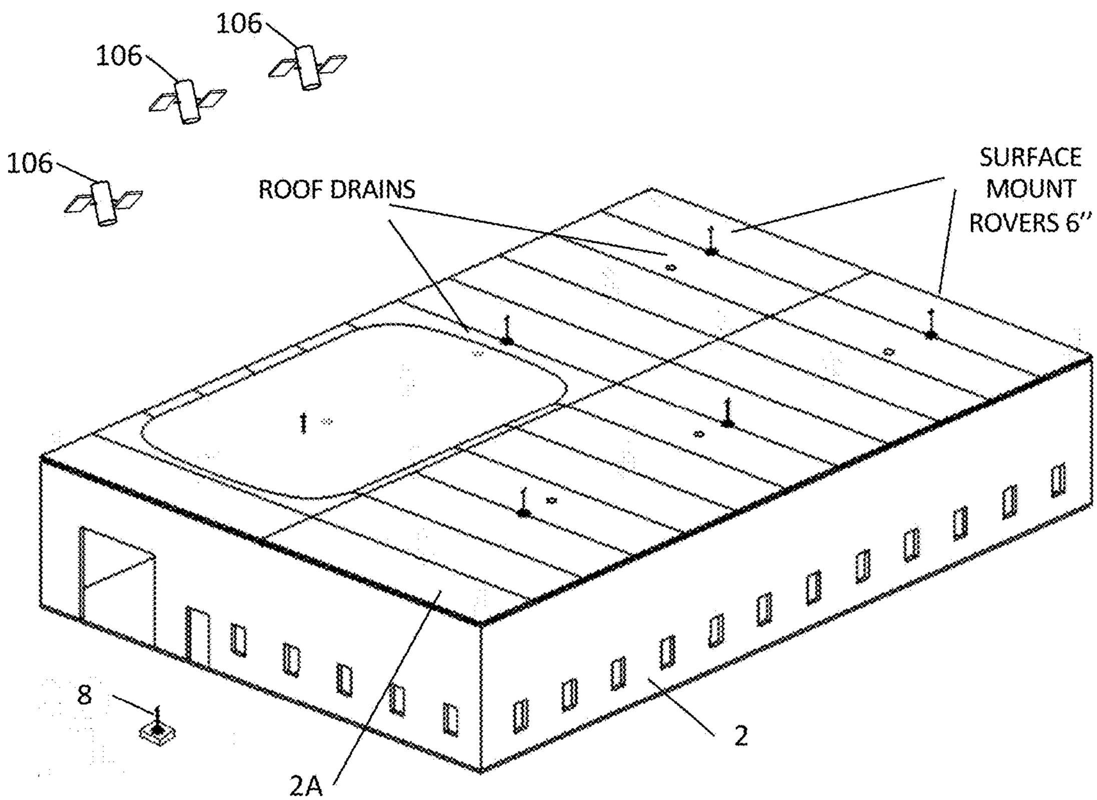
Figure 83:
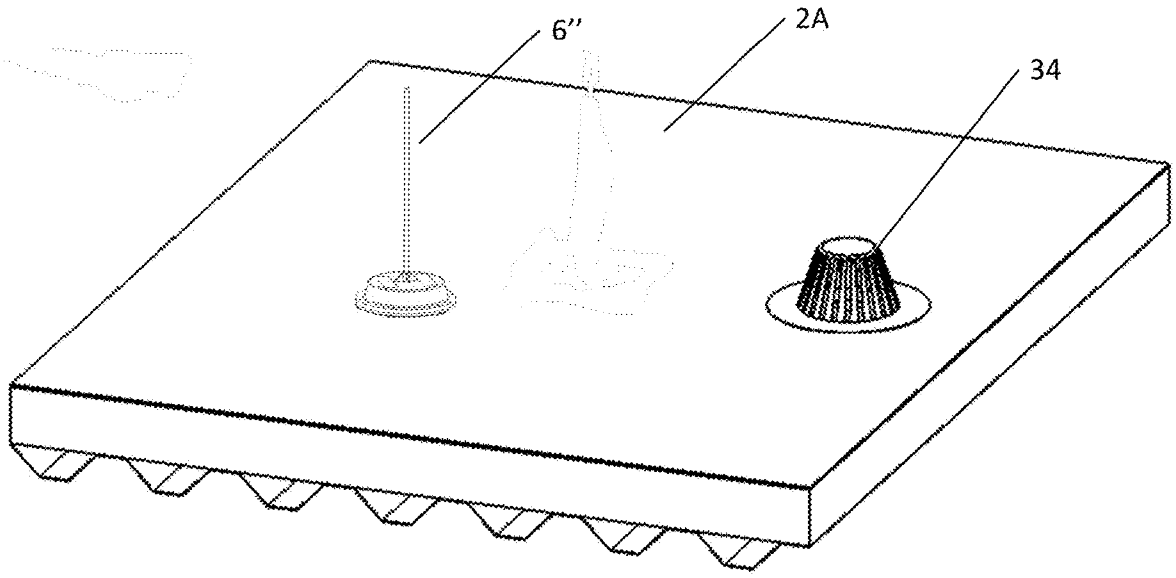
Figure 84:
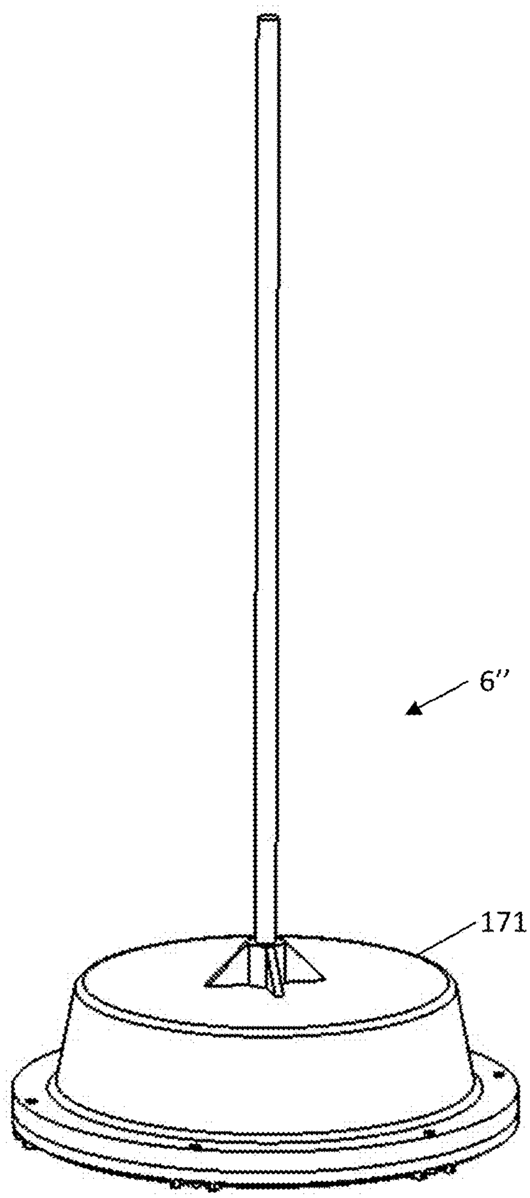
Figure 85:
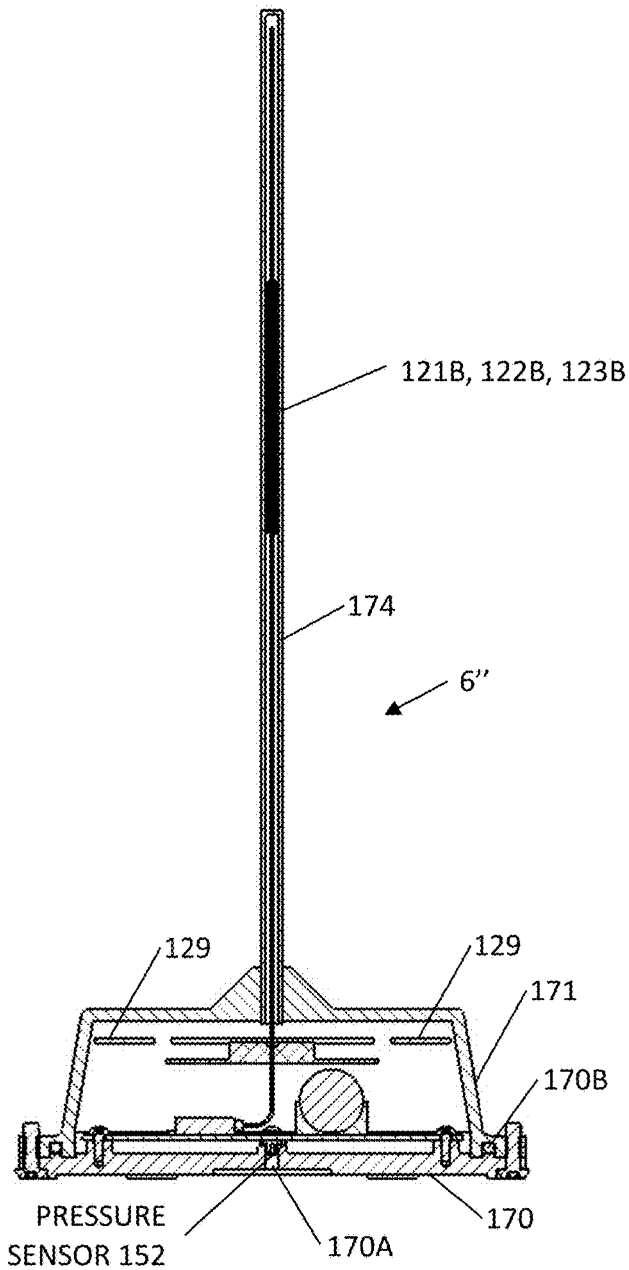
Figure 86:
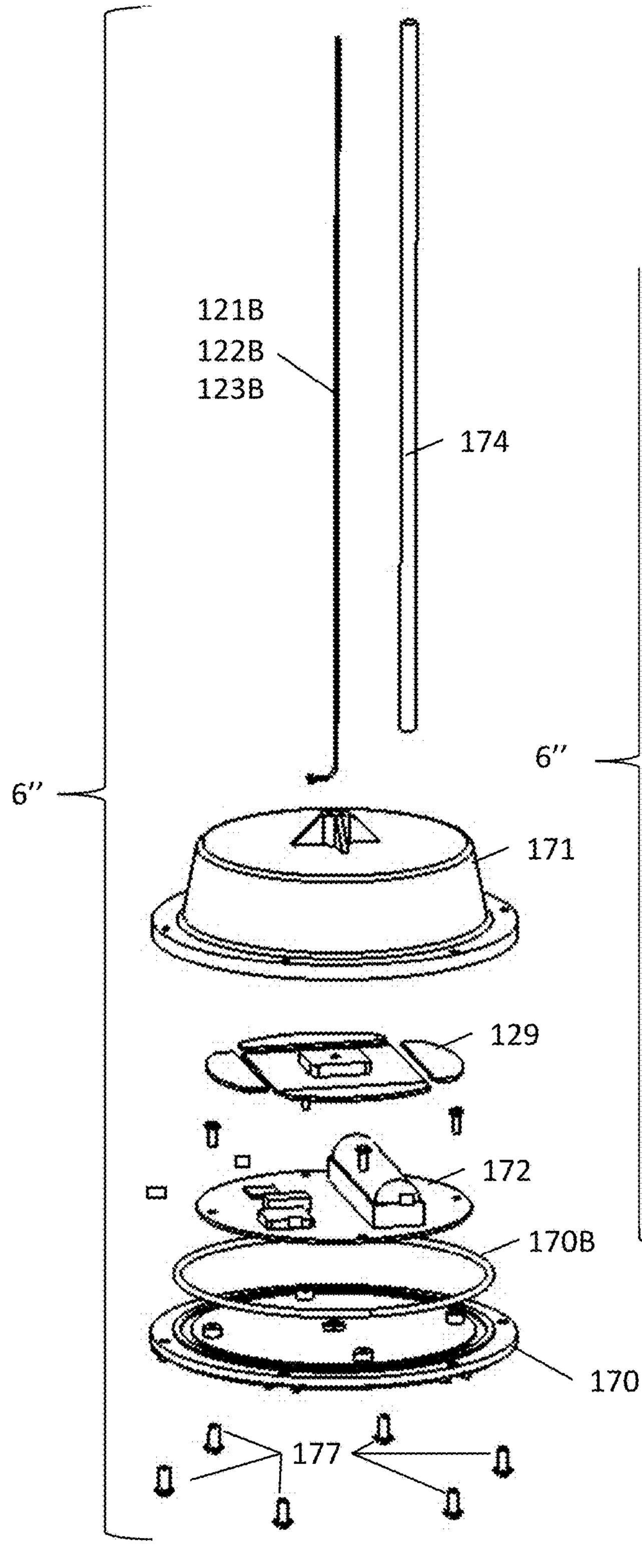
Figure 87:
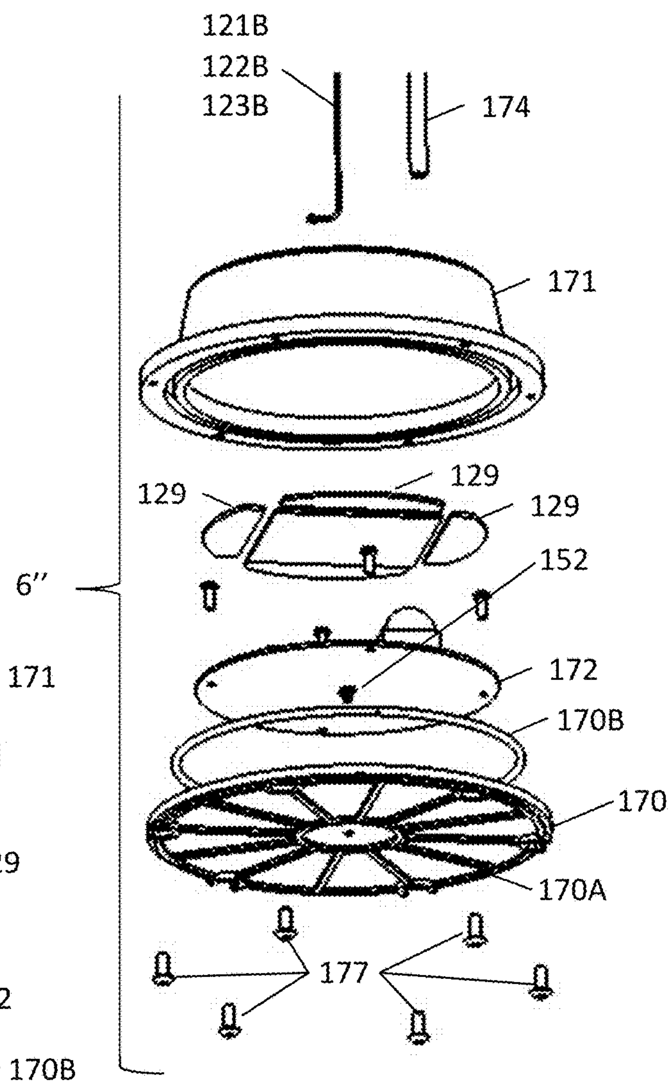
Figure 88:
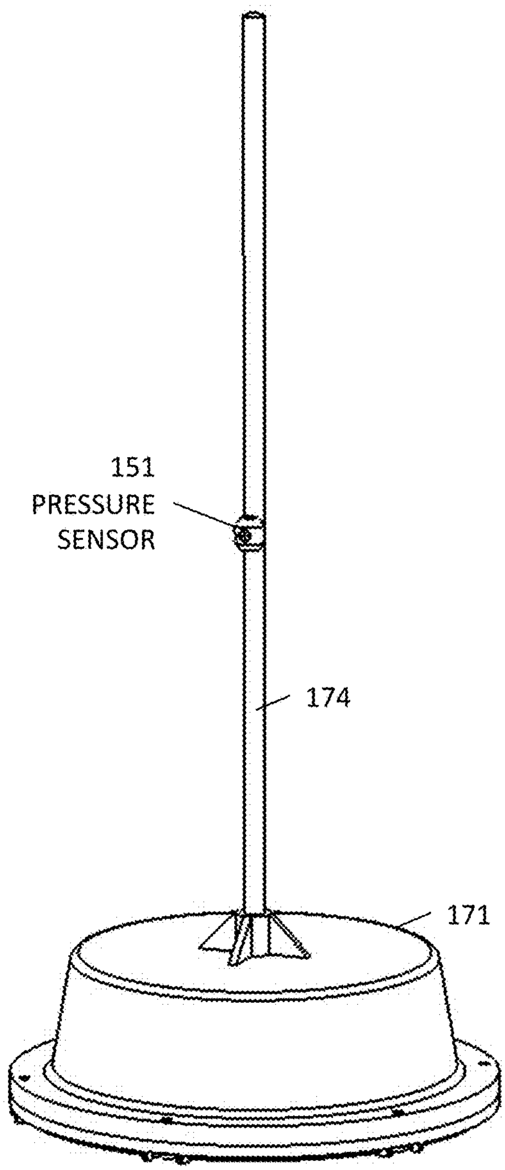
Figure 89:
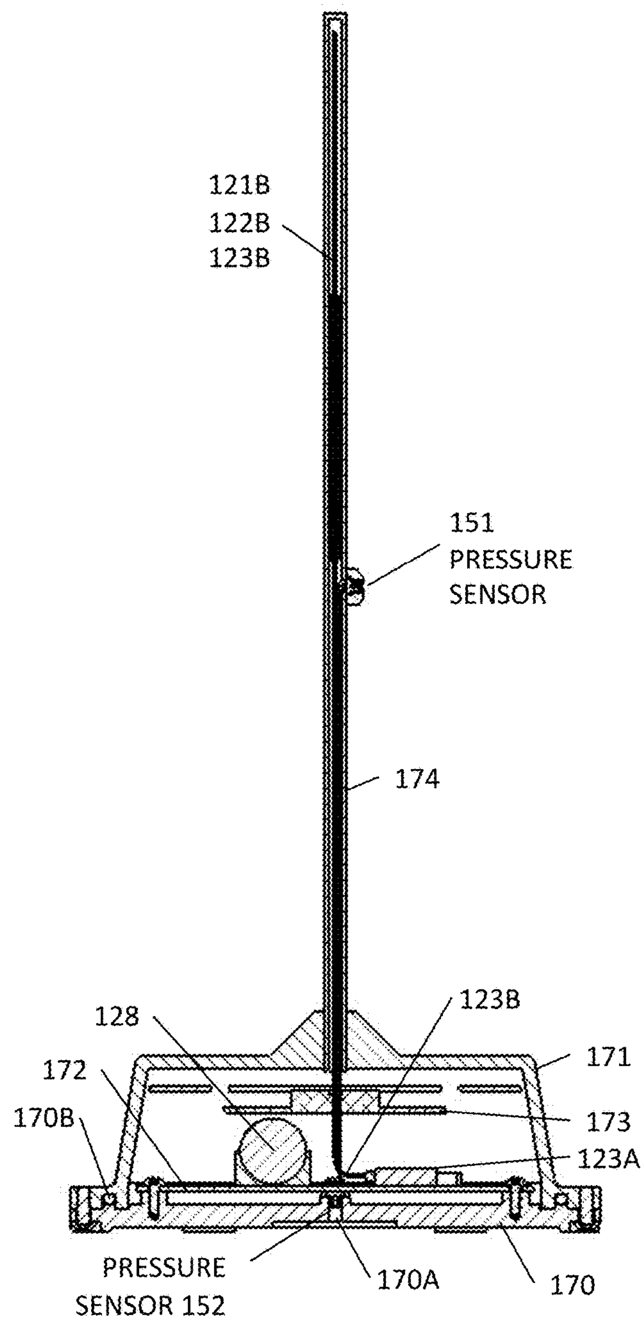
Figure 90A:
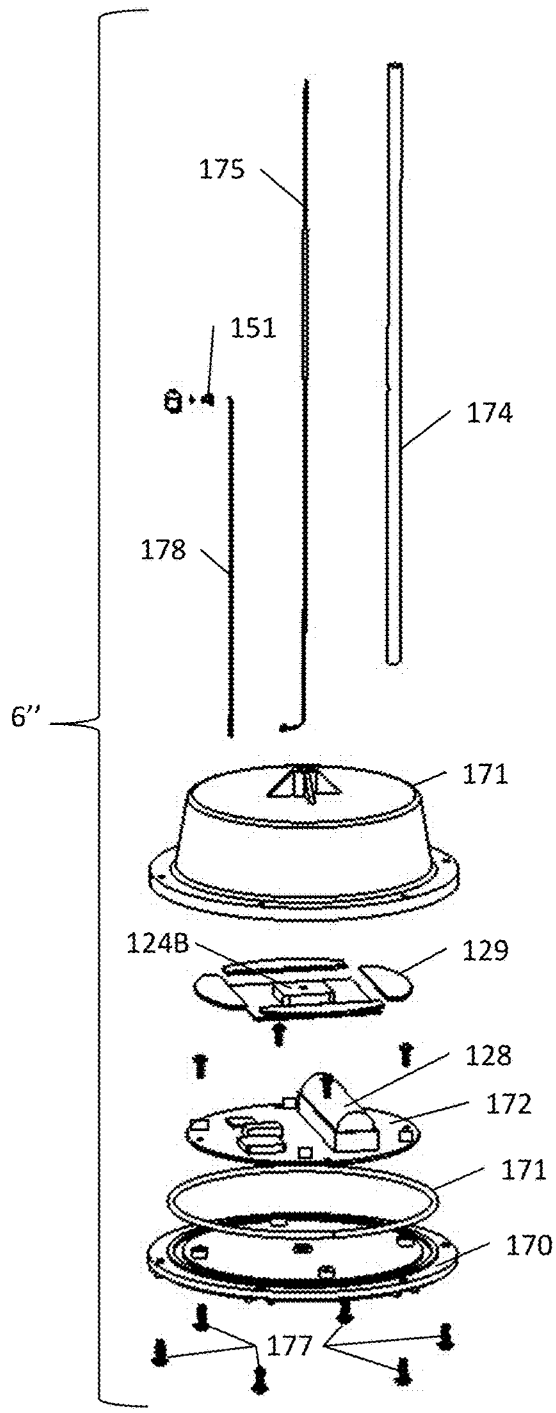
Figure 90B:
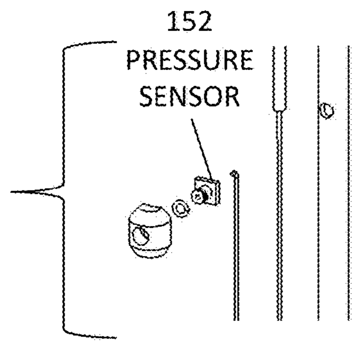
Figure 90C:
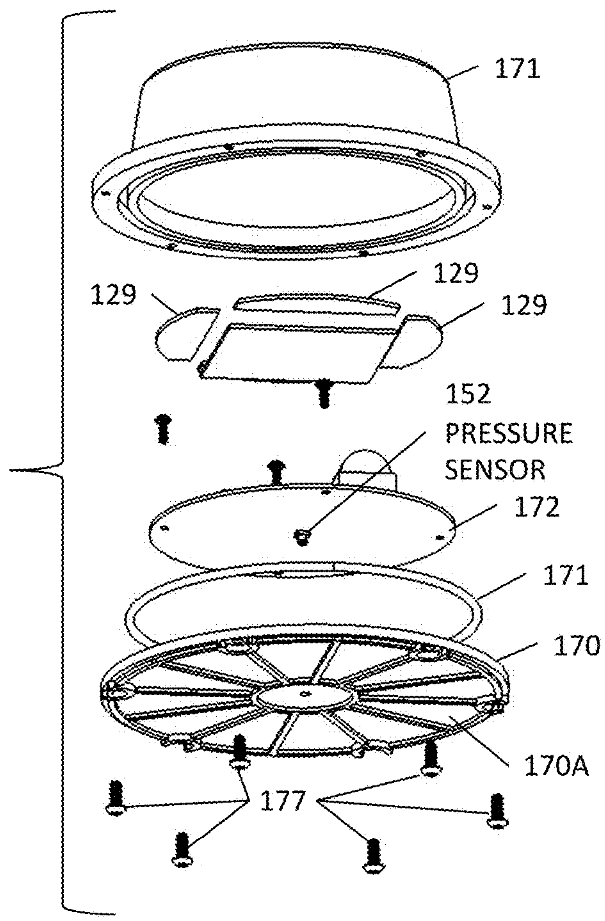
Figure 91:
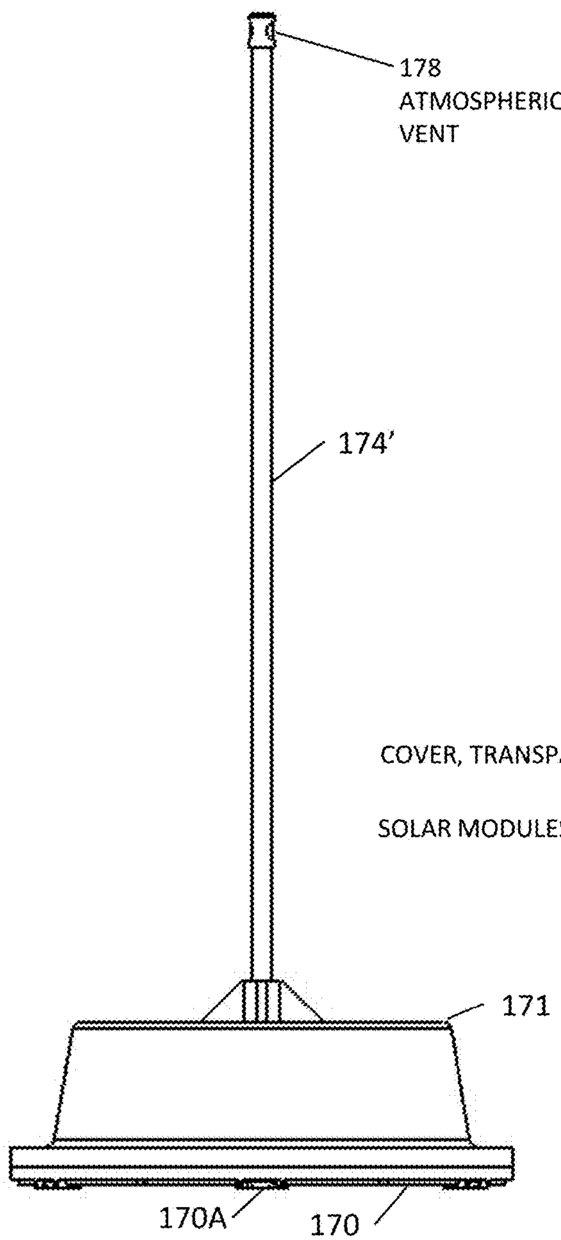
Figure 92:
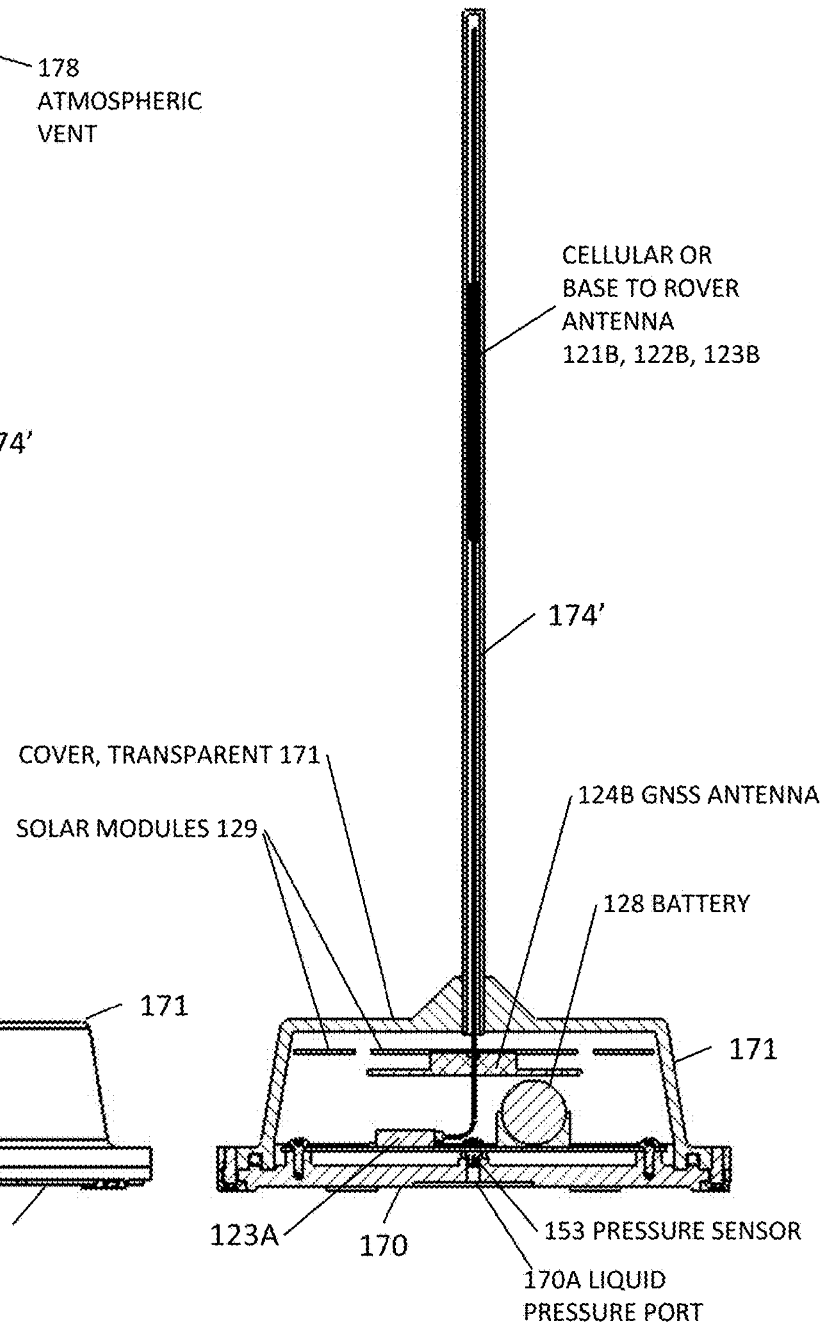
Figure 93A:
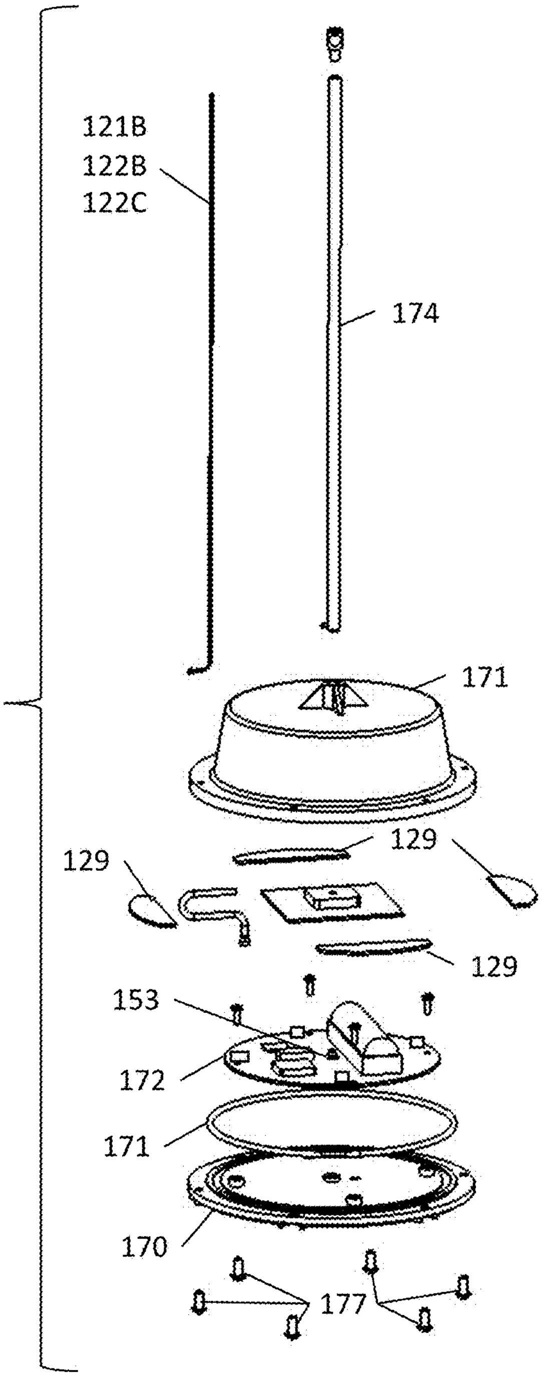
Figure 93B:
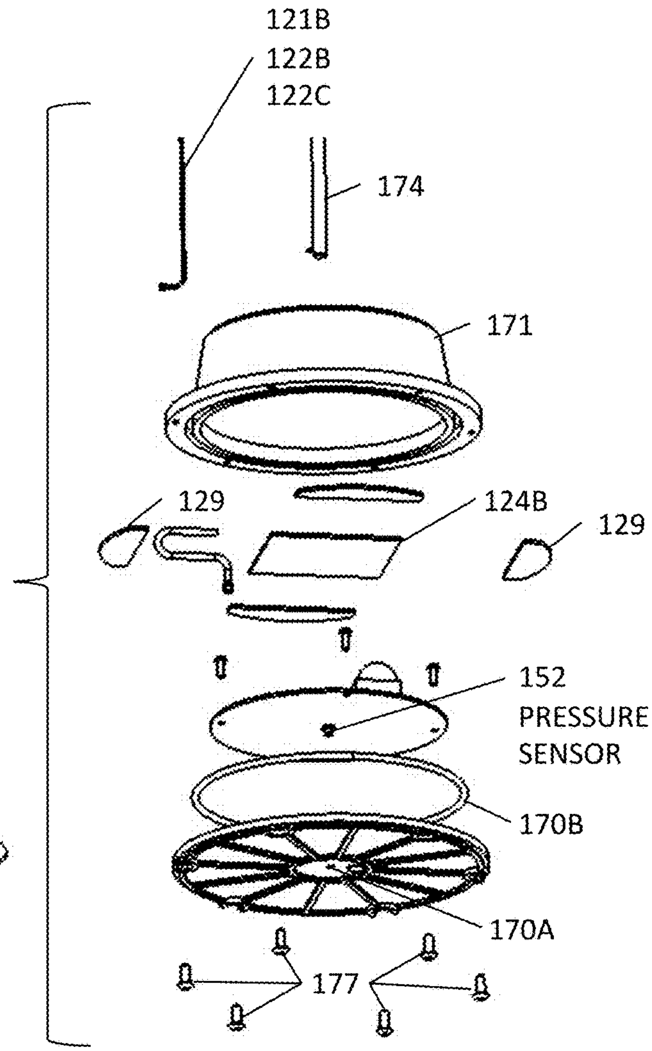
Figure 94A:
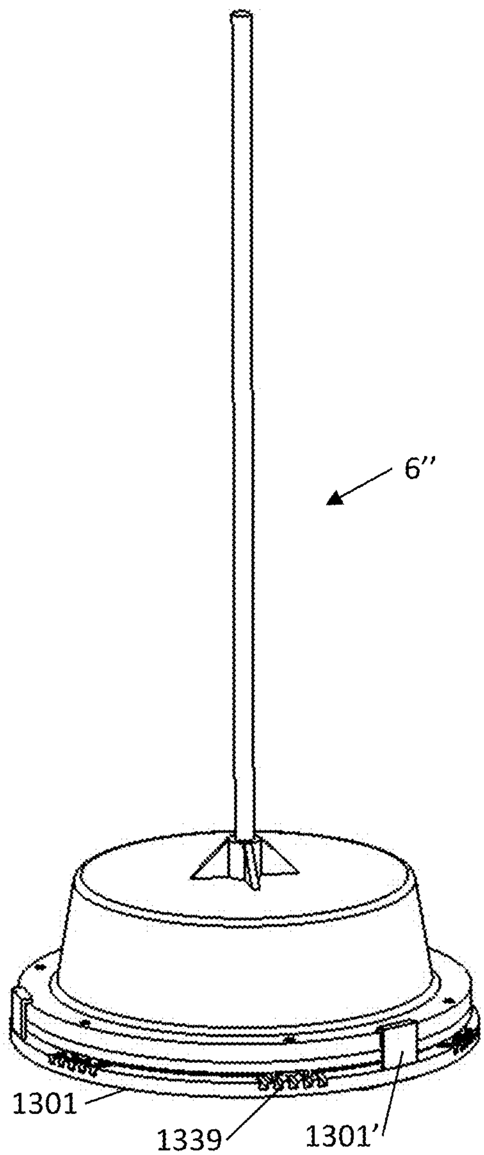
Figure 94B:
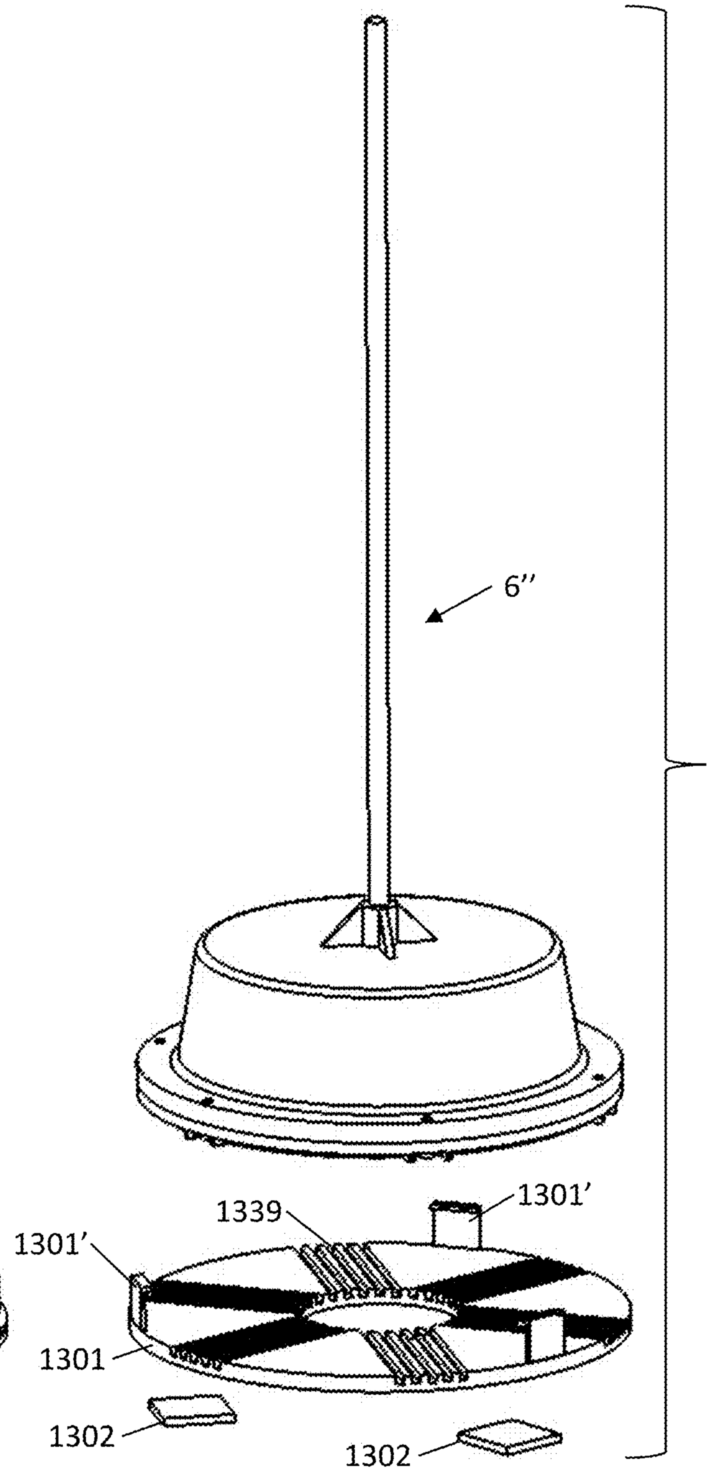
Figure 95:
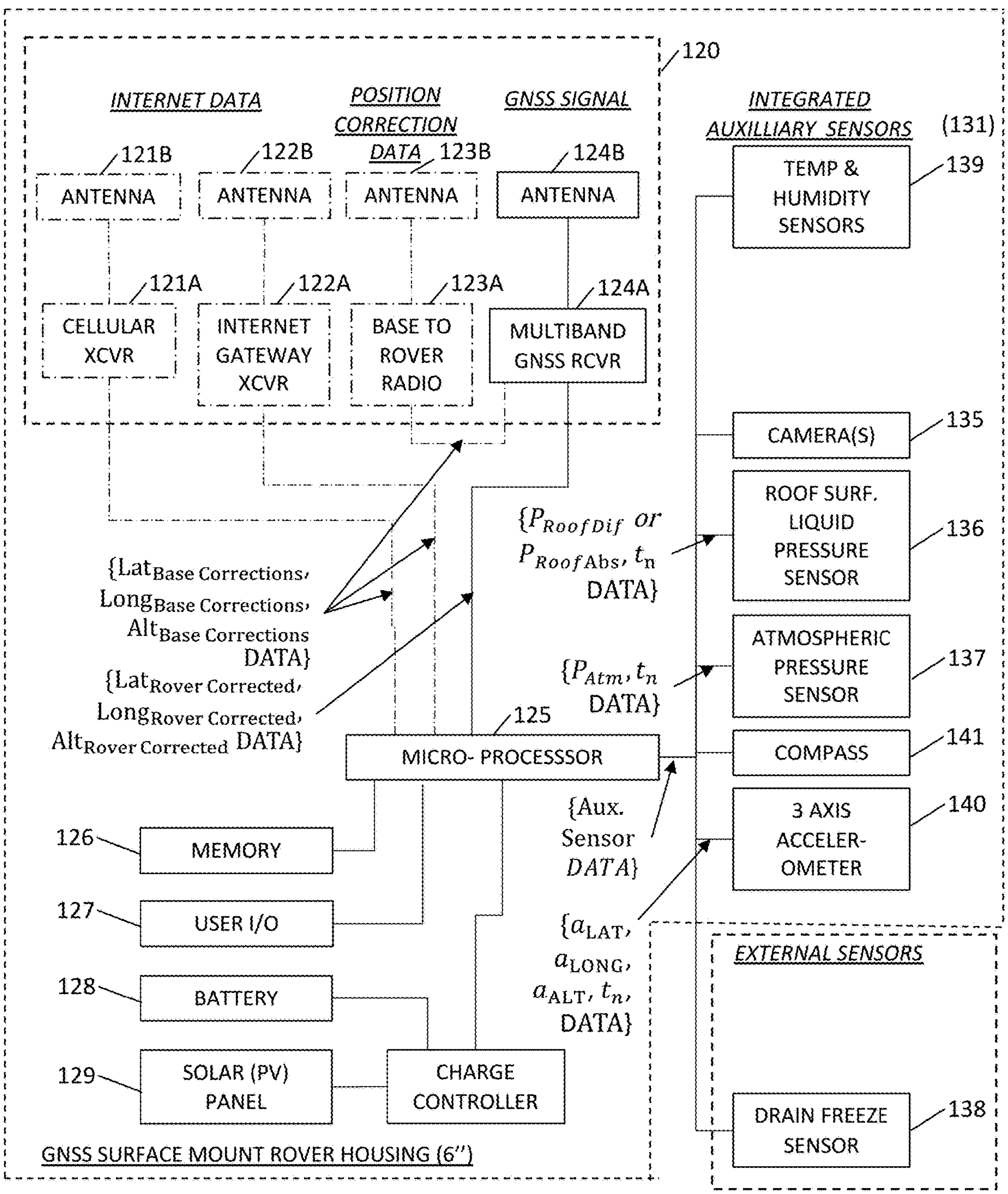
Figure 97:
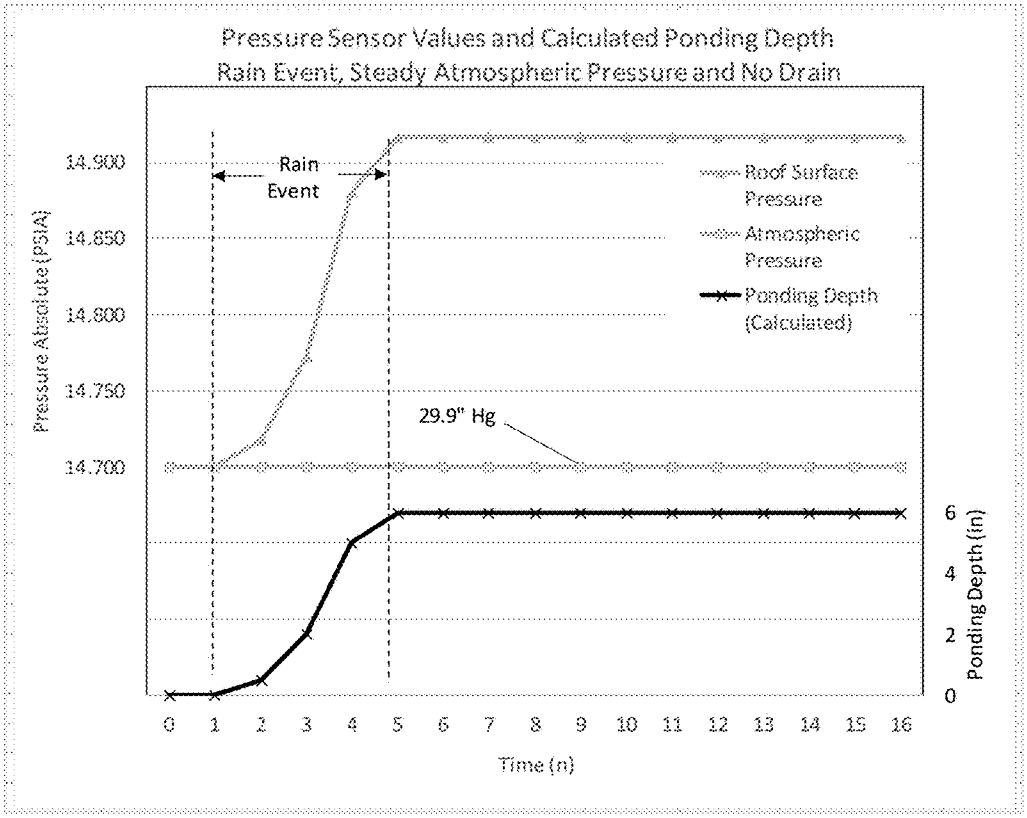
Figure 98:
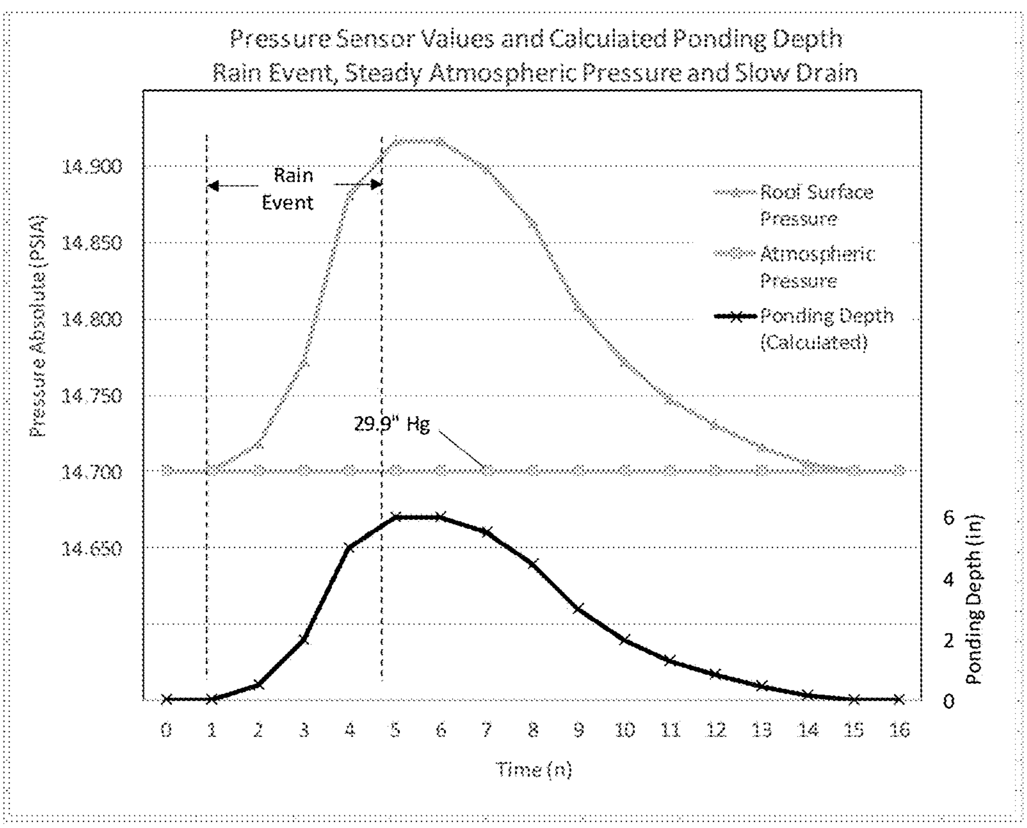
Figure 99:
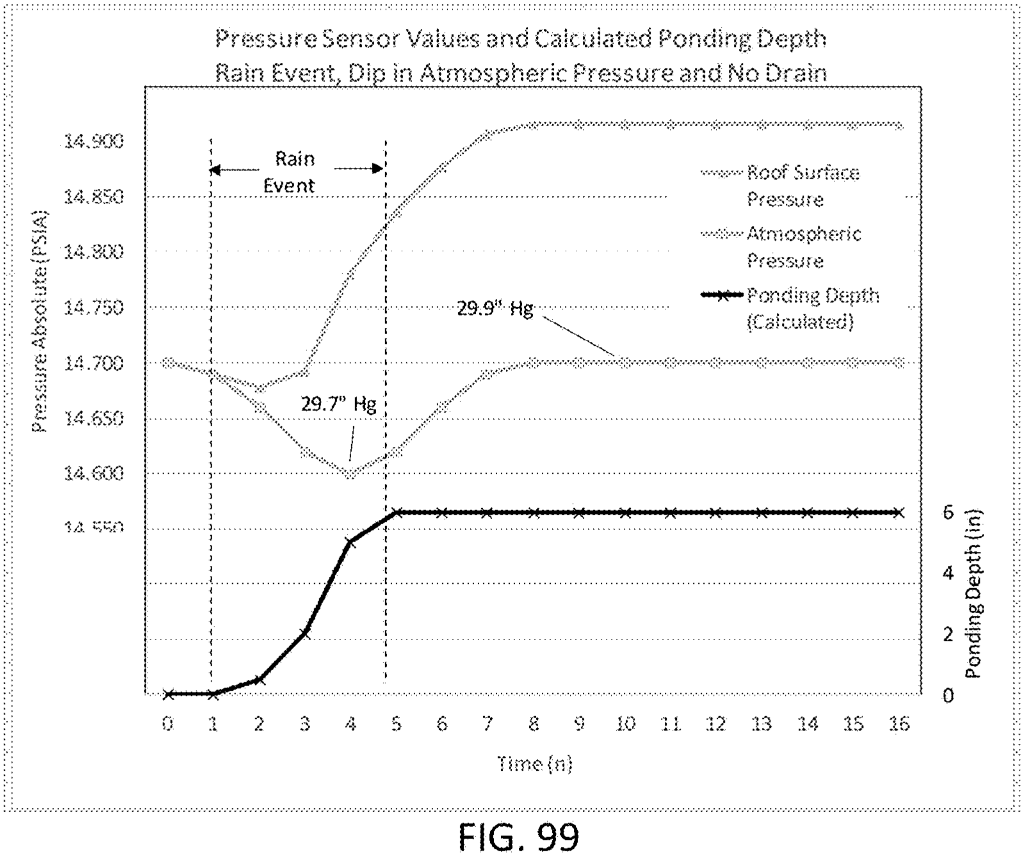
Figure 100:
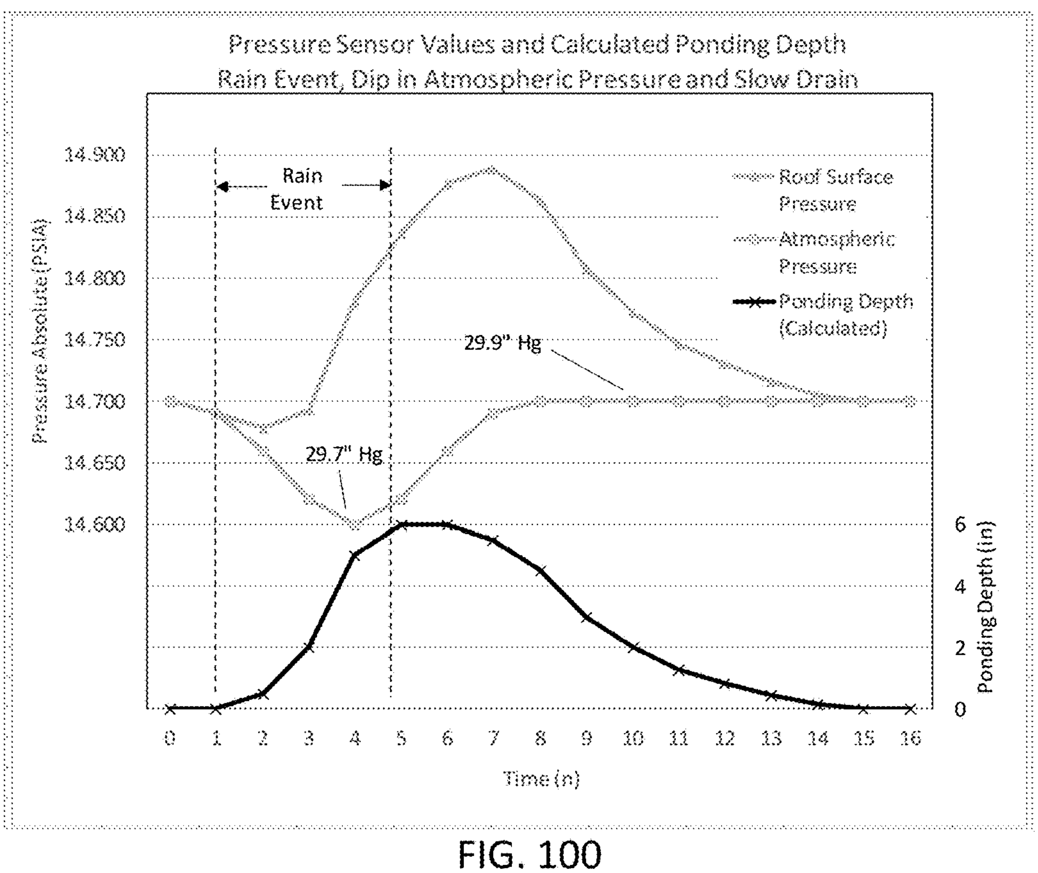
Figure 103A:
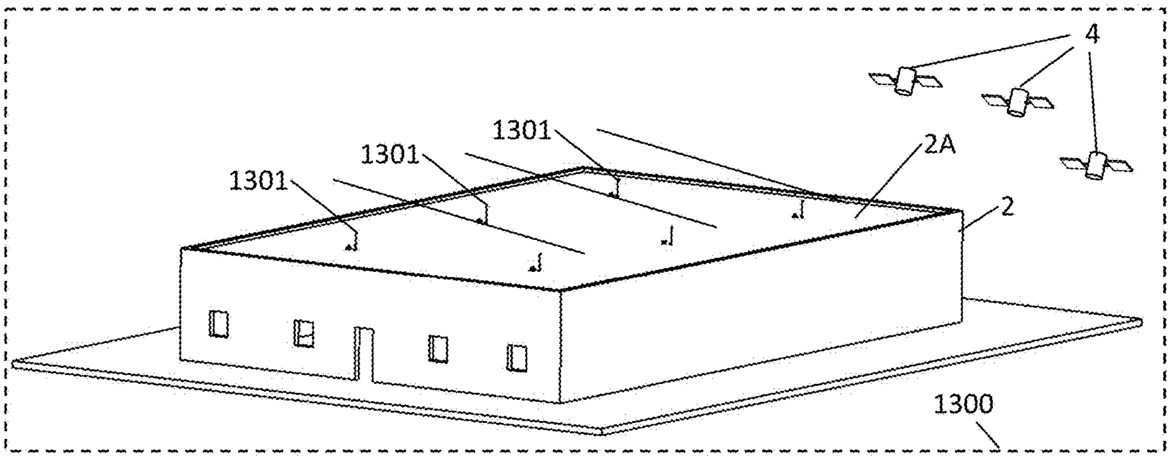
Figure 103B:
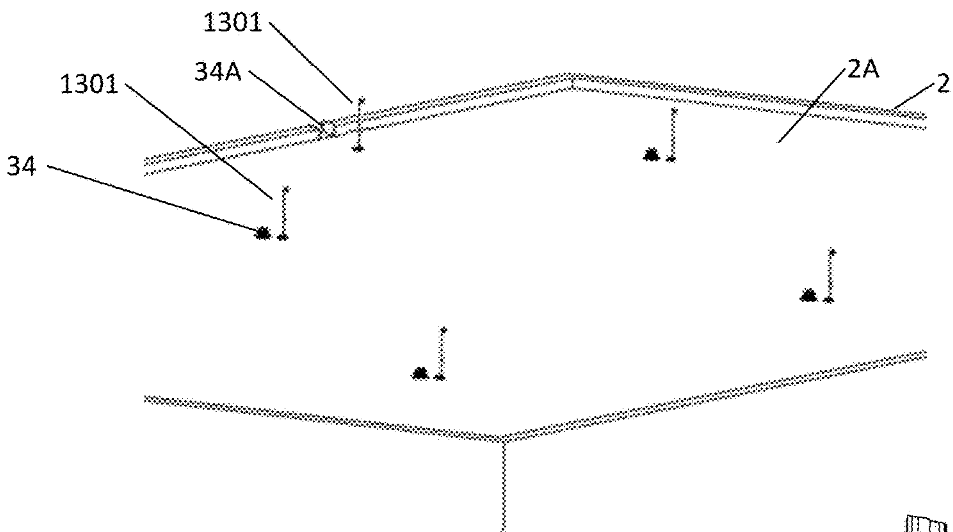
Figure 103C:
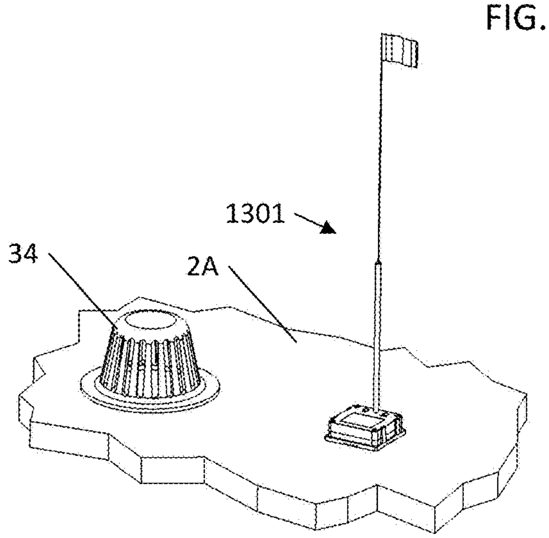
Figure 103D:
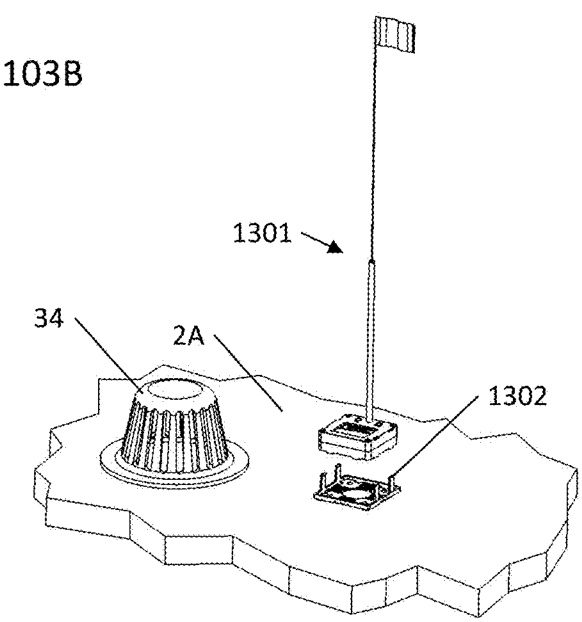
Figure 104A:
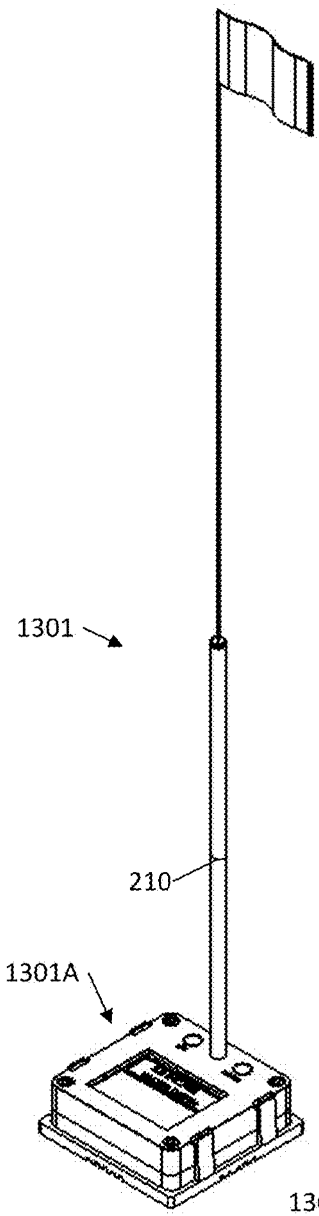
Figure 104B:
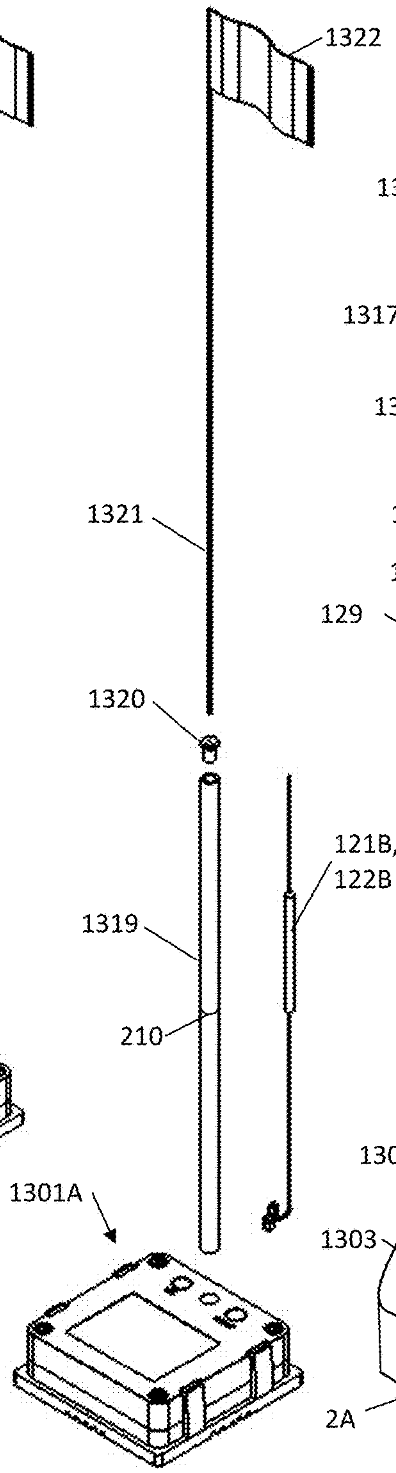
Figure 104C:
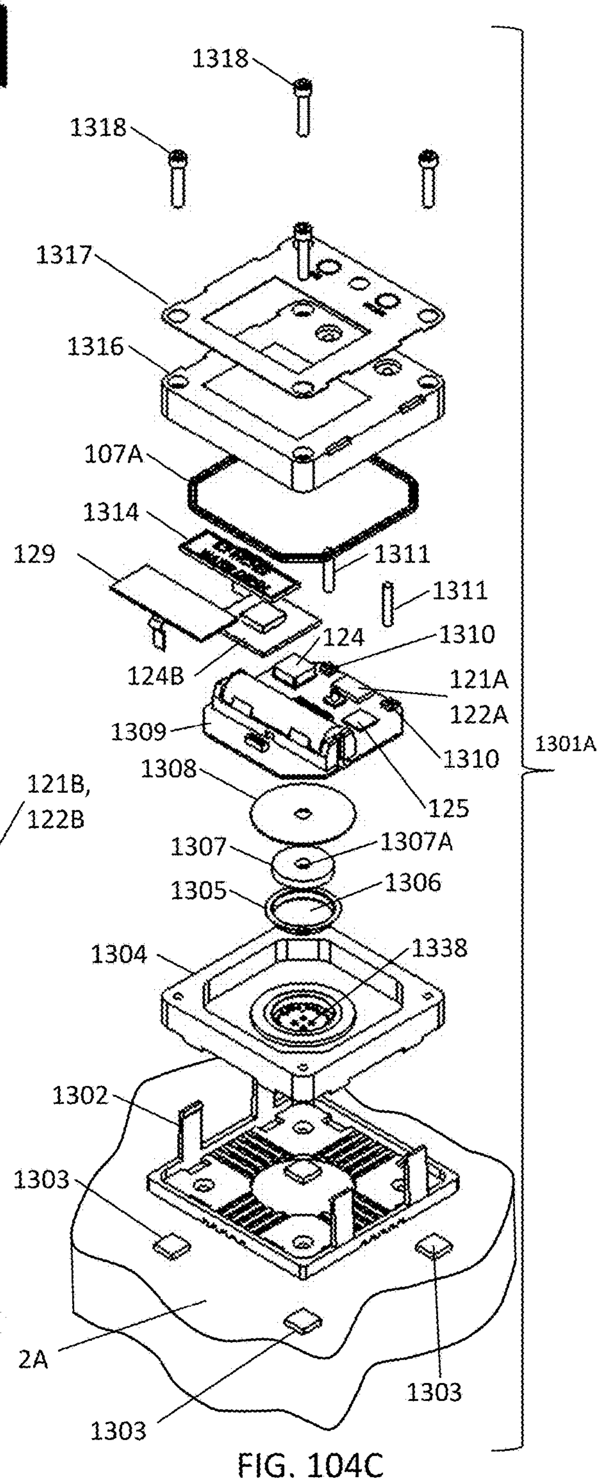
Figure 104D:
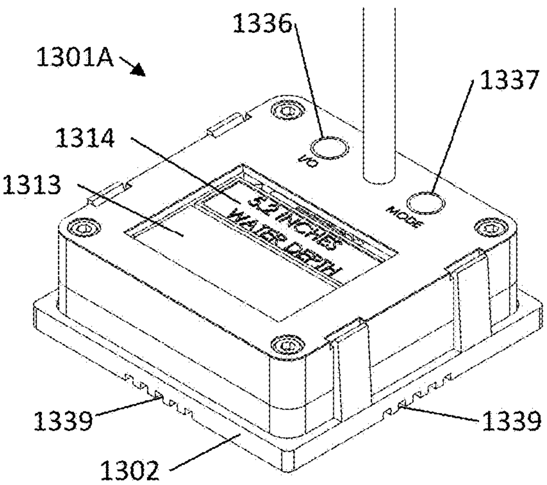
Figure 104E:
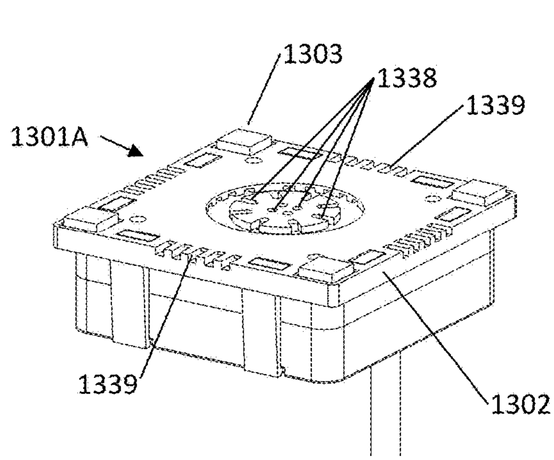
Figure 104F:
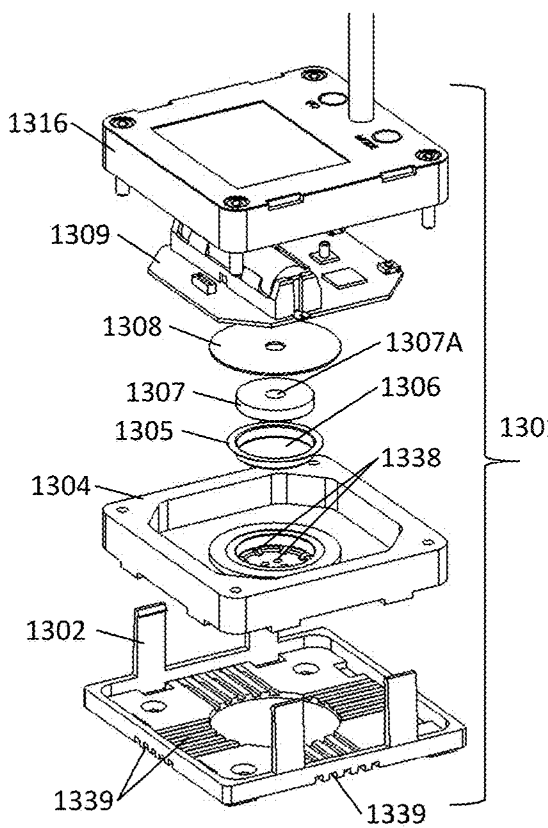
Figure 104G:
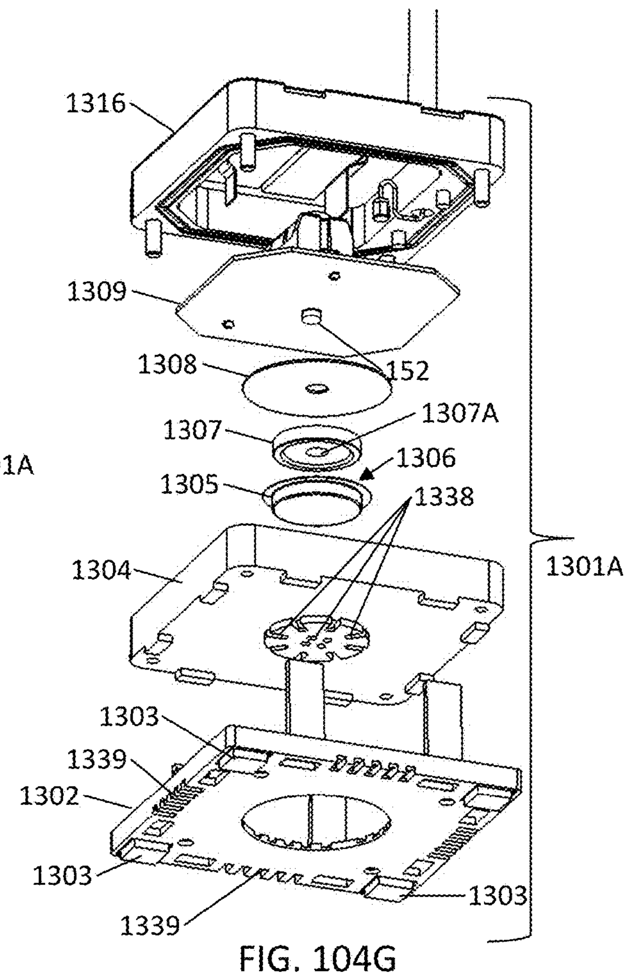
Figure 104I:
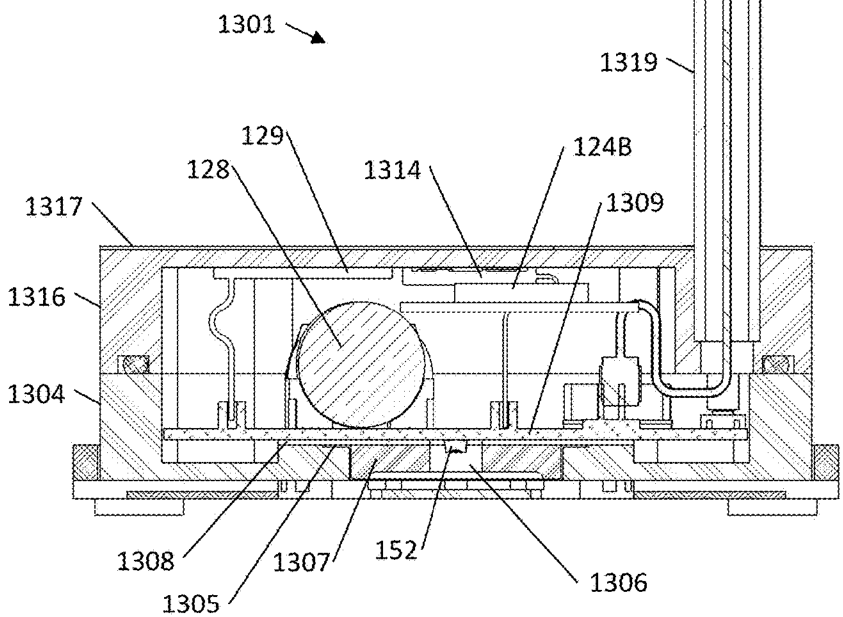
Figure 104H:
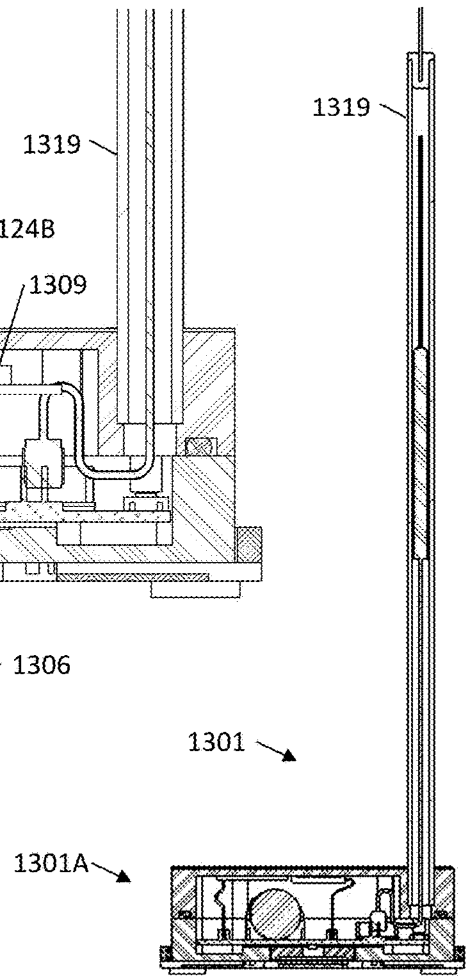
Figure 104J:
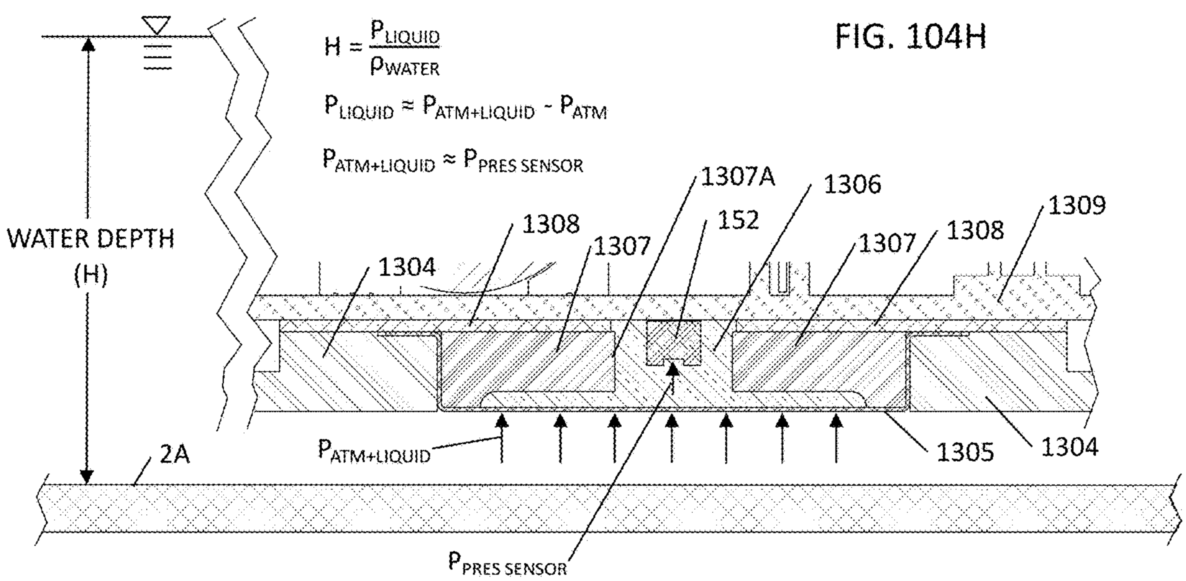
Figure 105A:
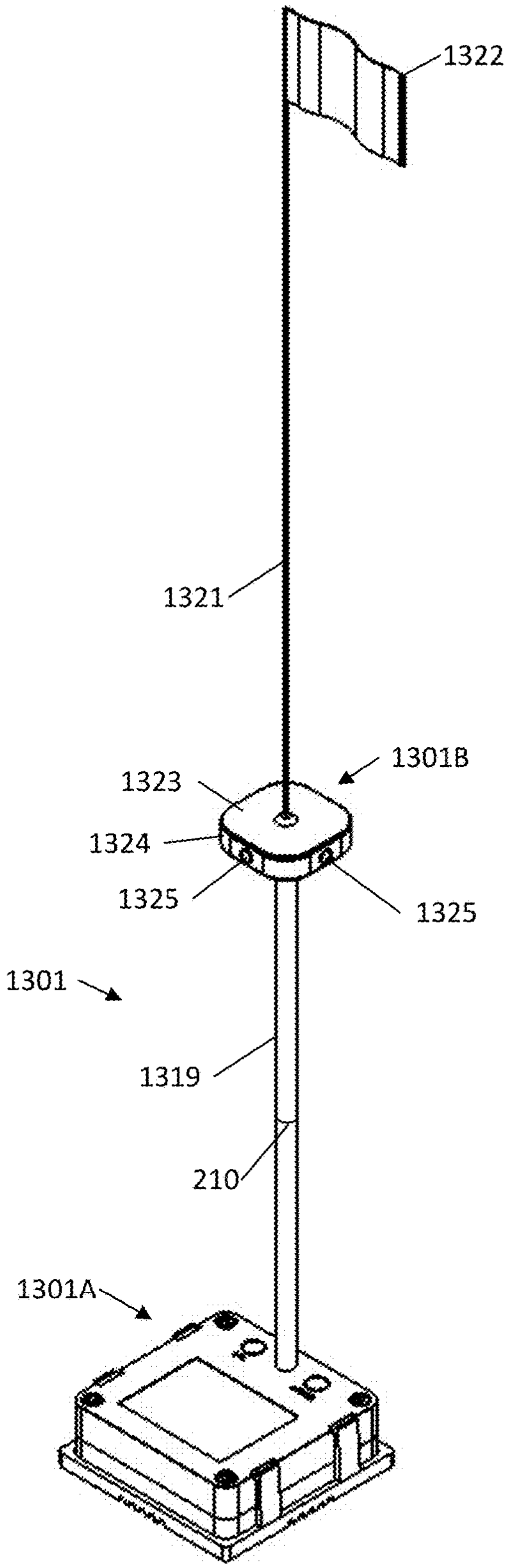
Figure 105C:
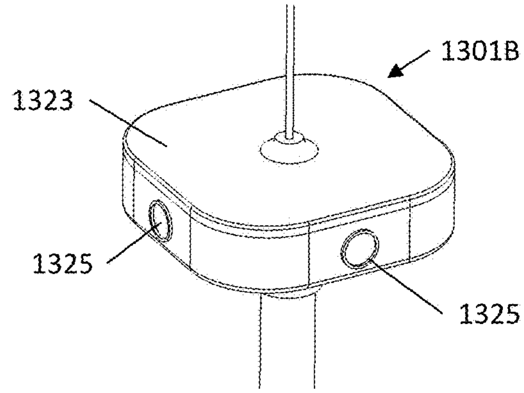
Figure 105B:
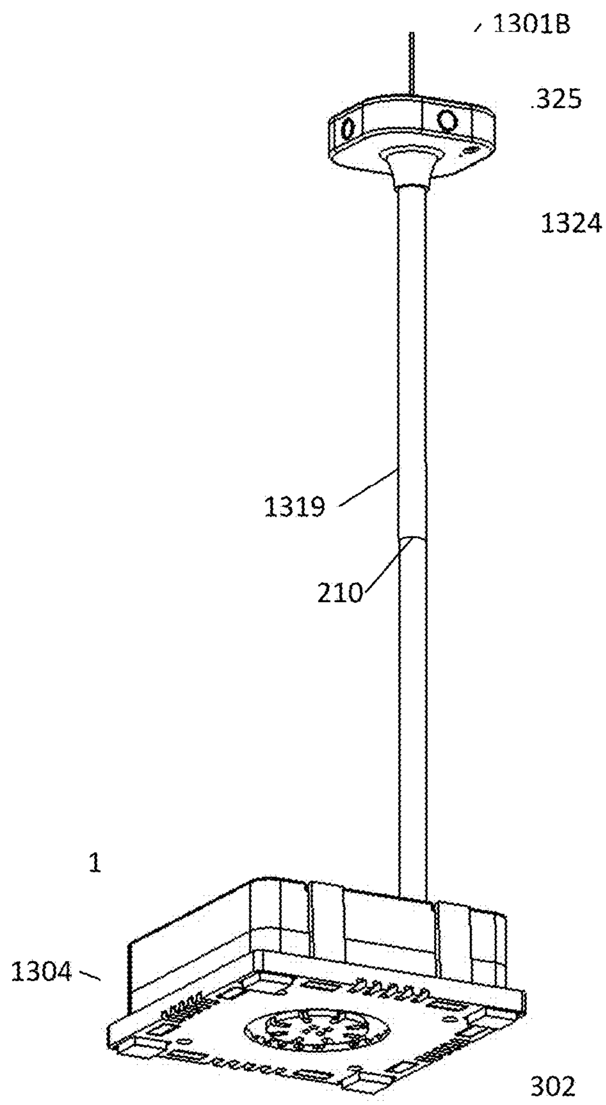
Figure 105D:
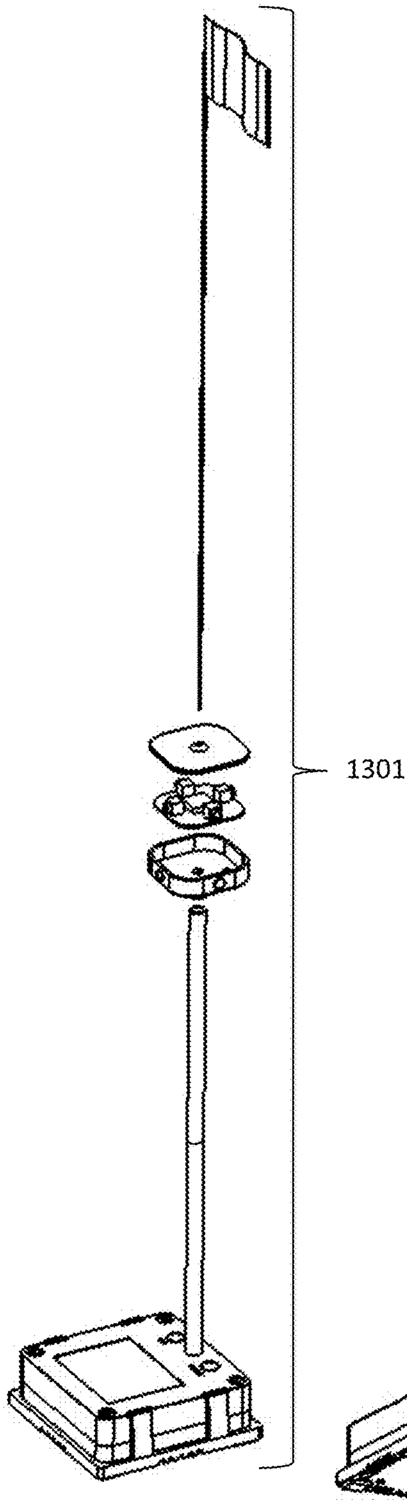
Figure 105E:
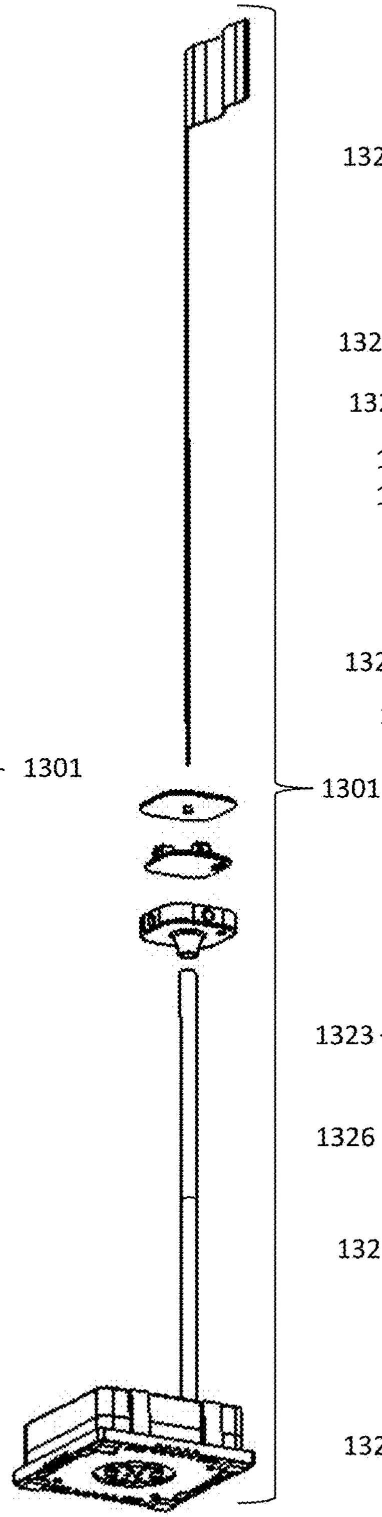
Figure 105F:
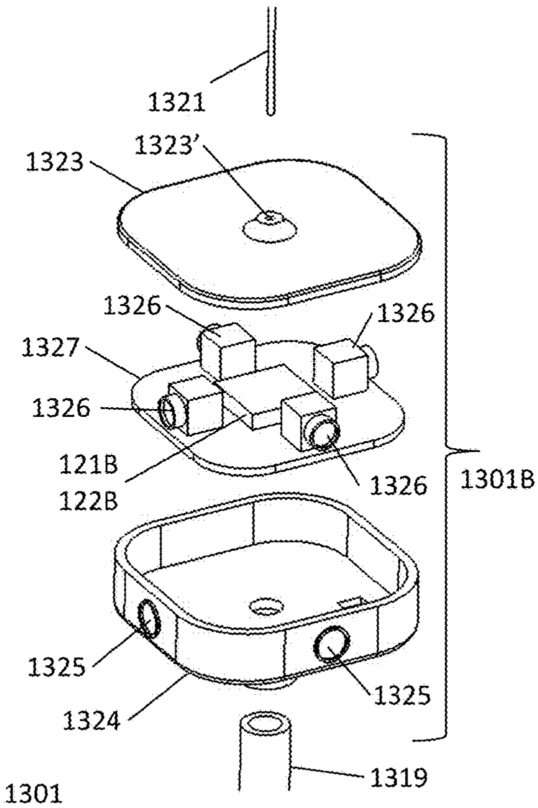
Figure 105G:
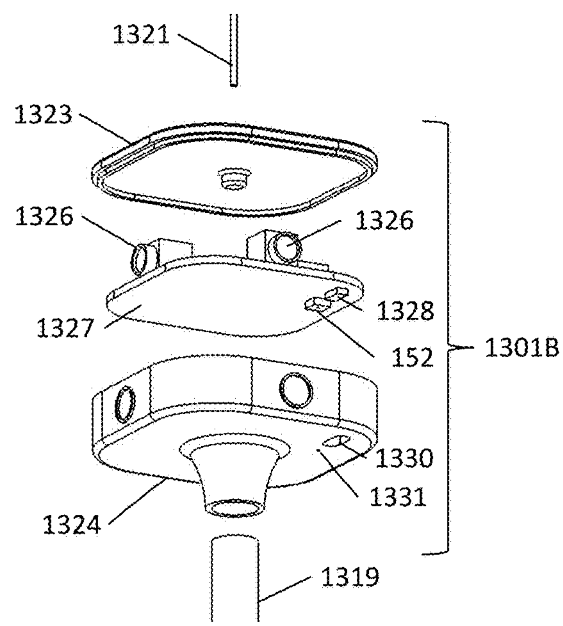
Figure 106A:
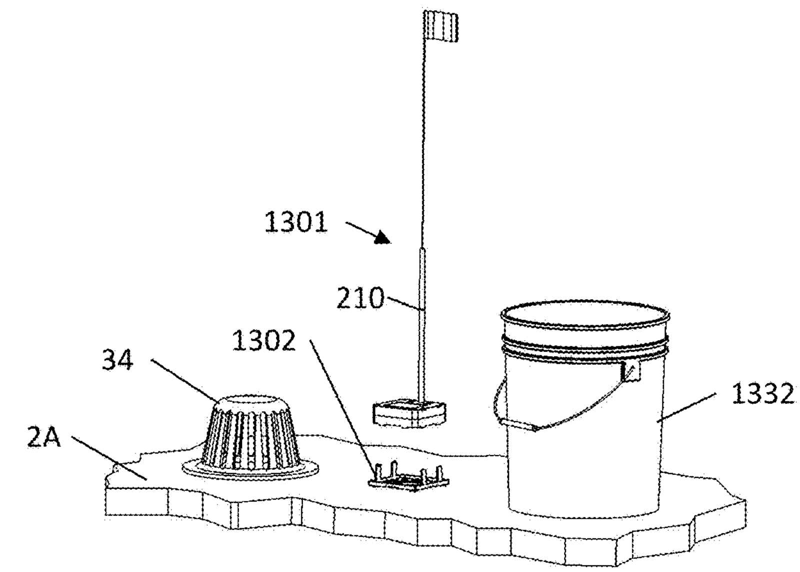
Figure 106B:
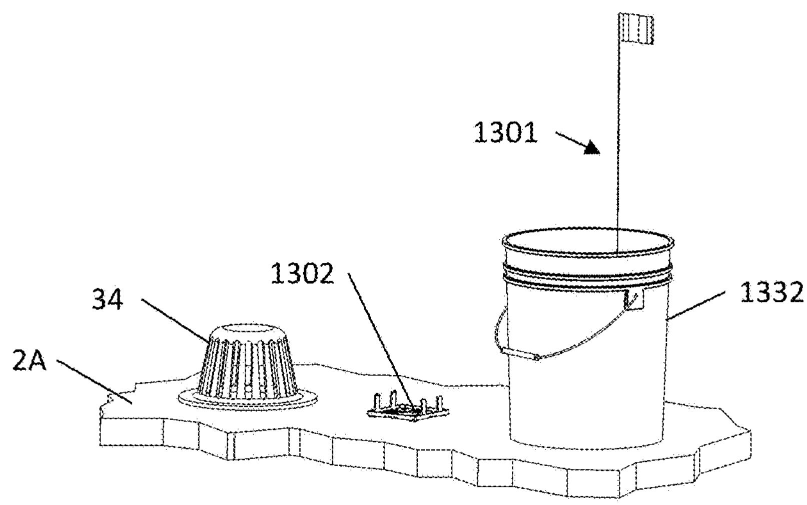
Figure 106C:
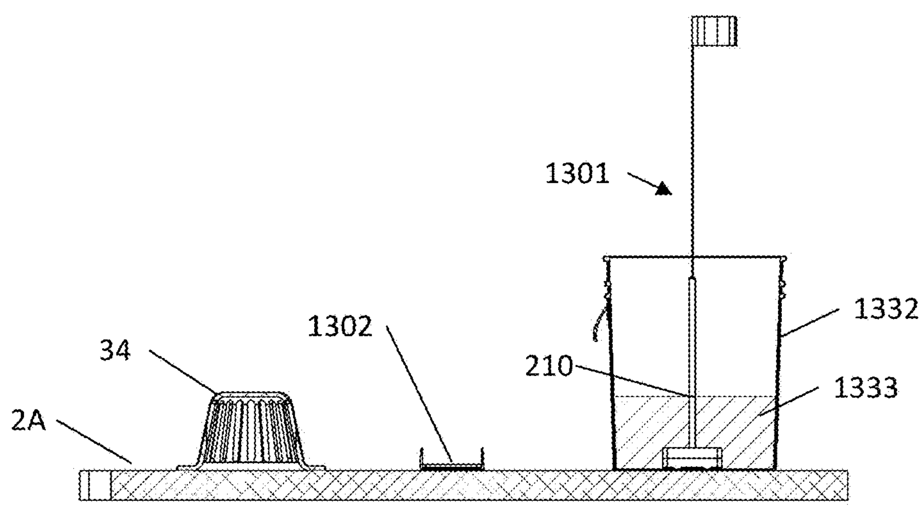
Figure 106E:
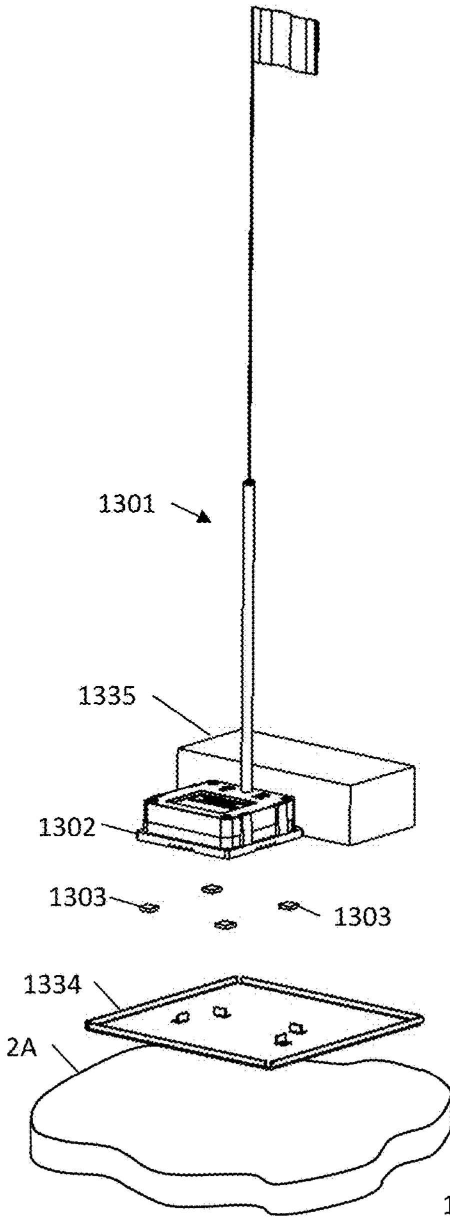
Figure 106D:
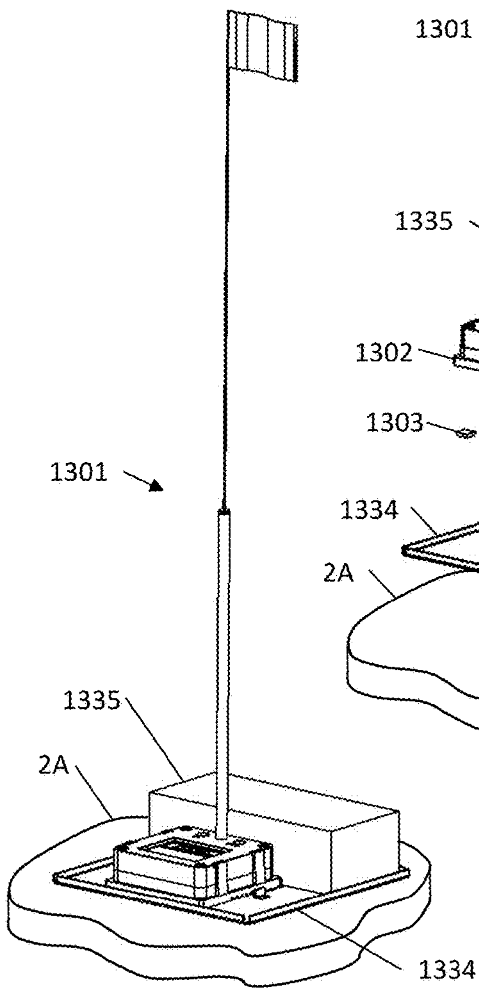
Figure 106F:
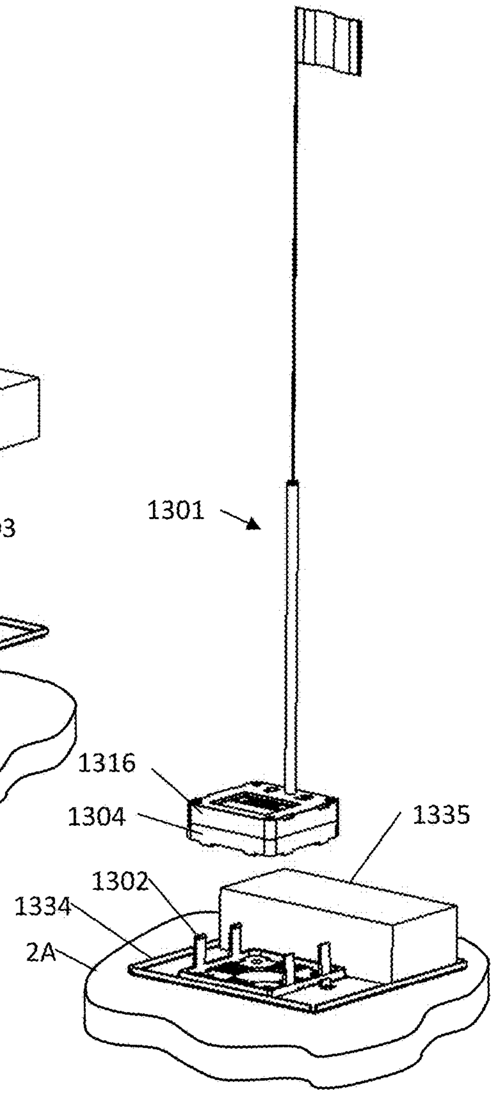
Figure 107:
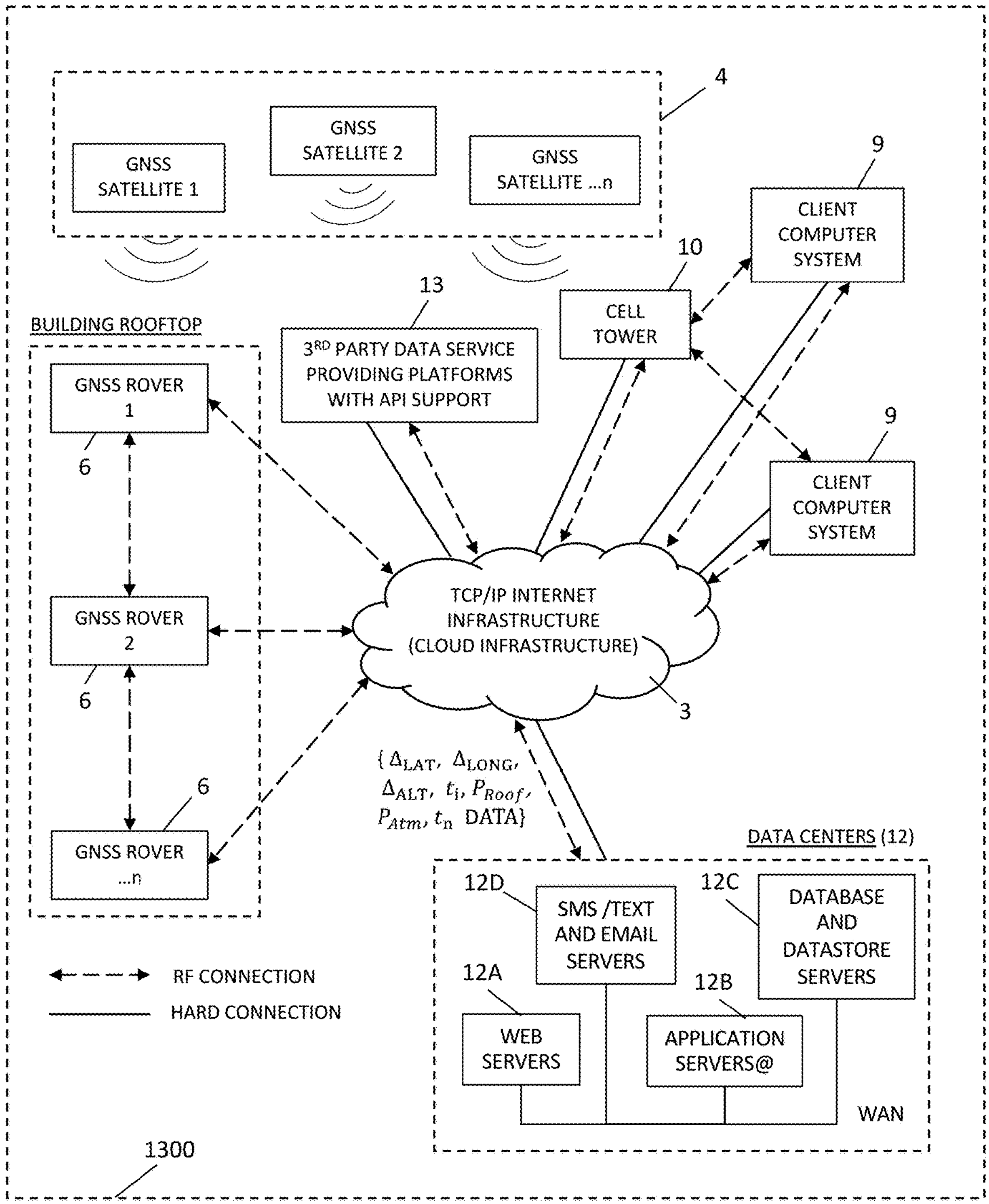
Figure 108B:
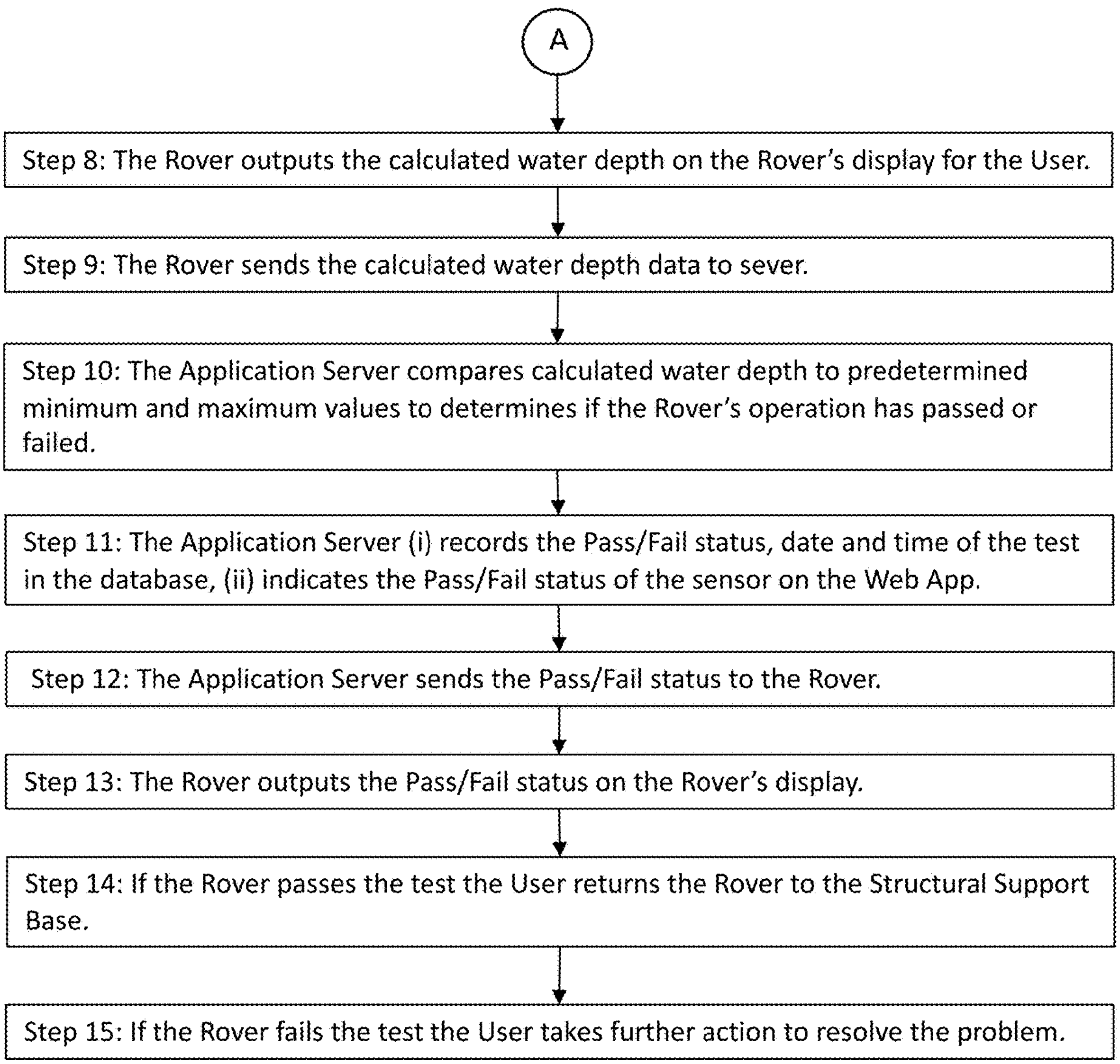
Figure 109A:
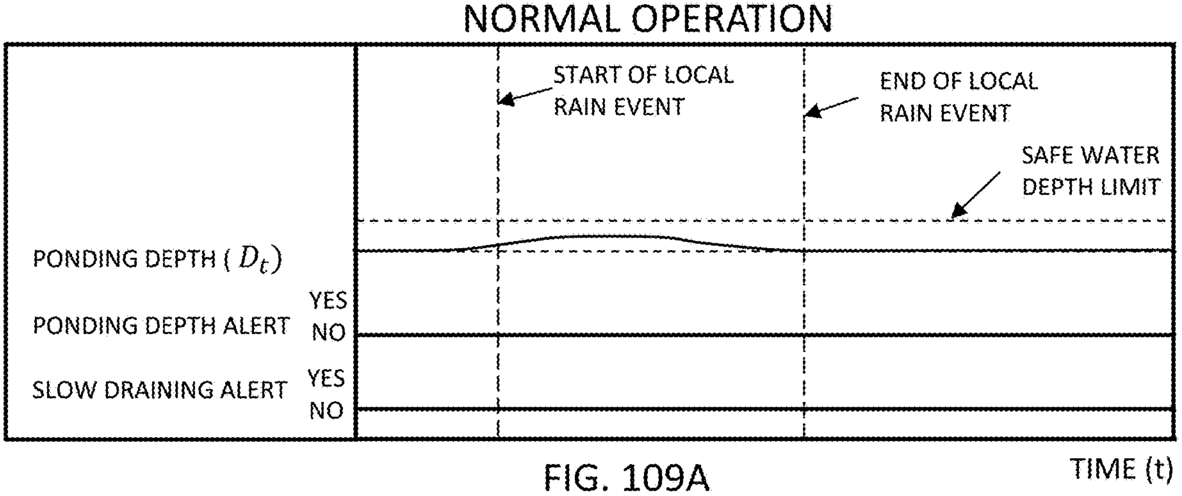
Figure 109B:
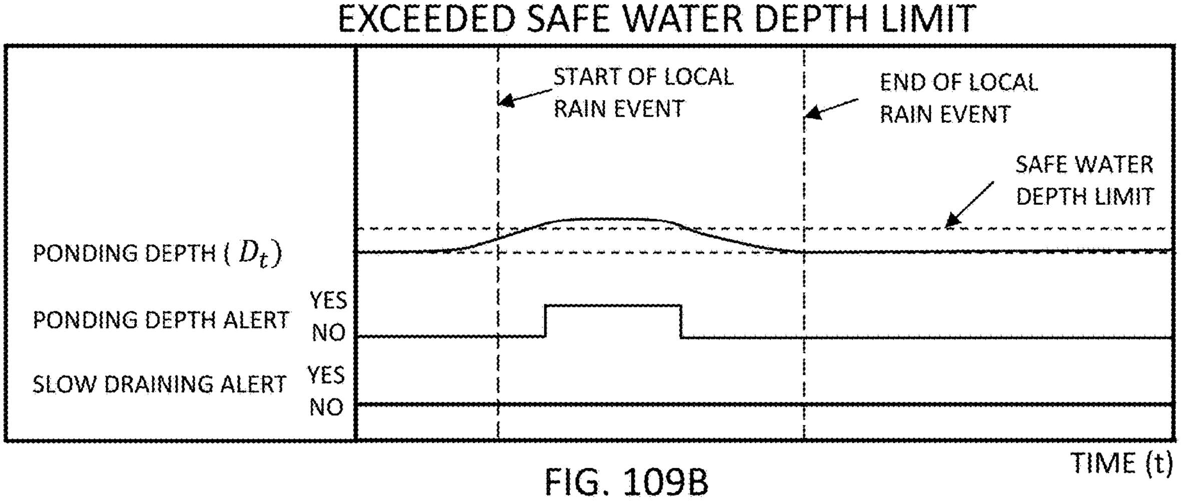
Figure 109C:
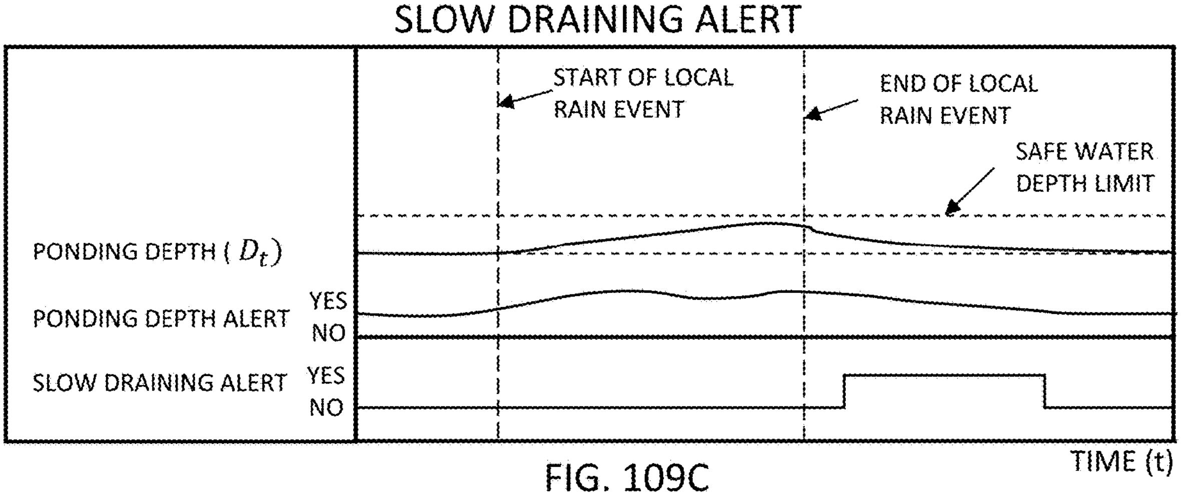
Figure 110A:
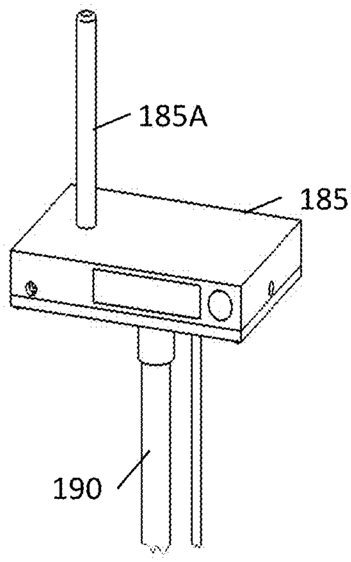
Figure 110B:
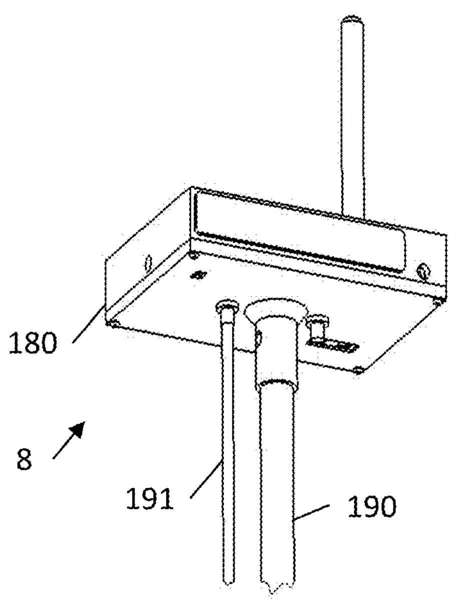
Figure 110C:
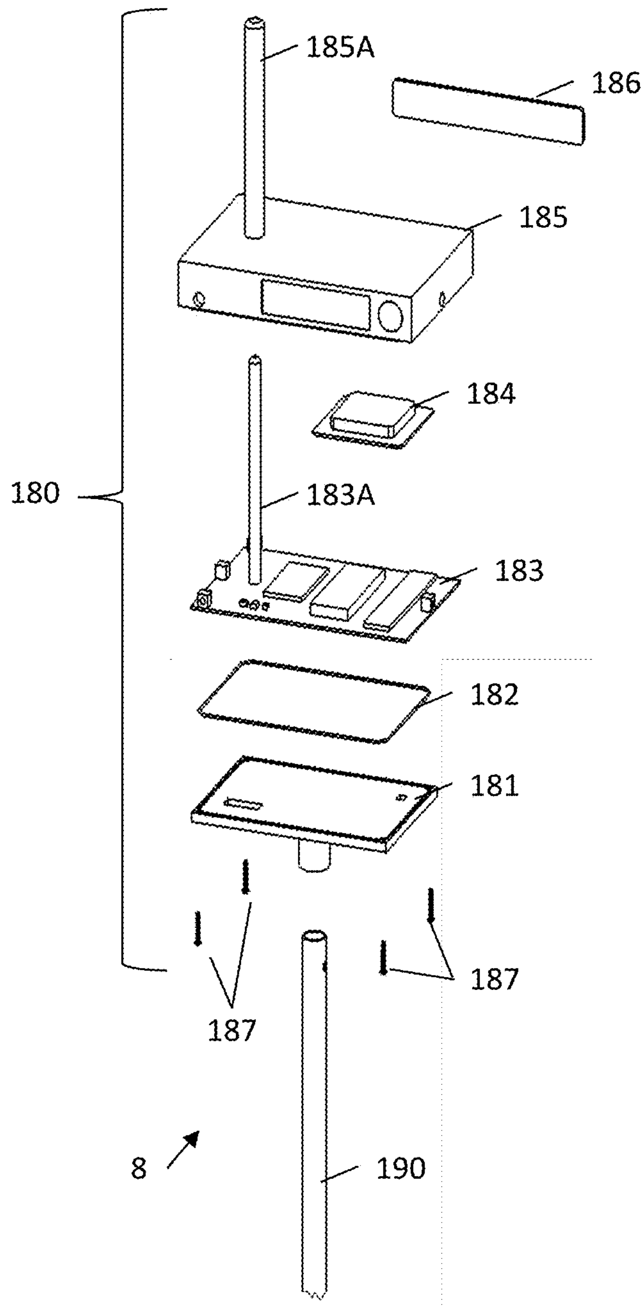
Figure 111A:
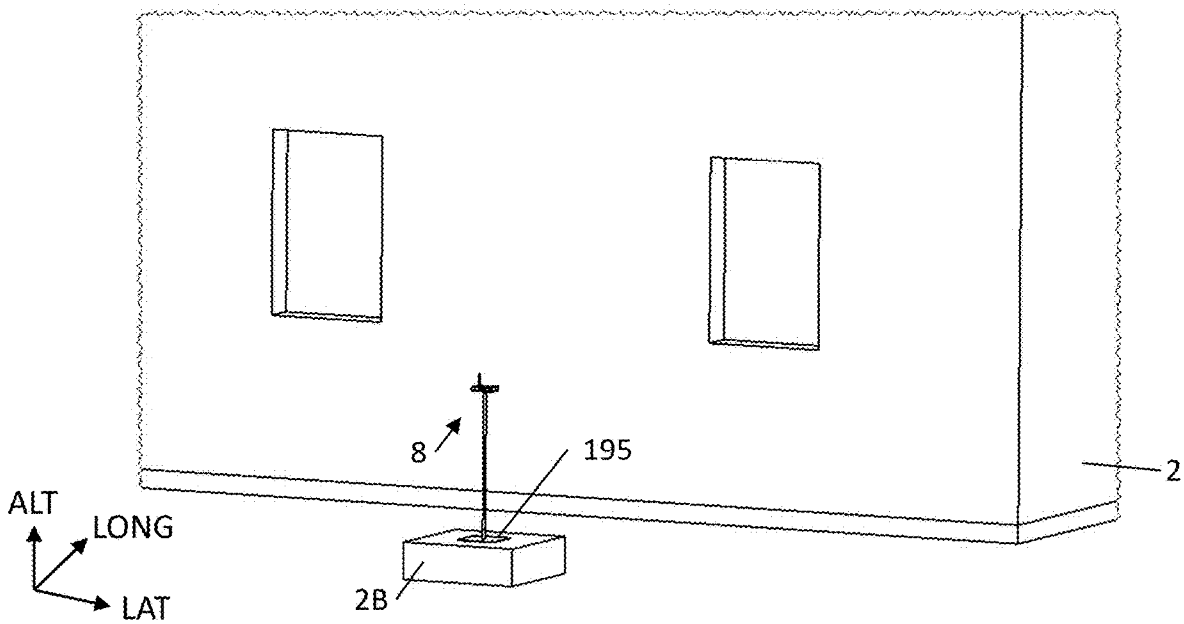
Figure 111B:
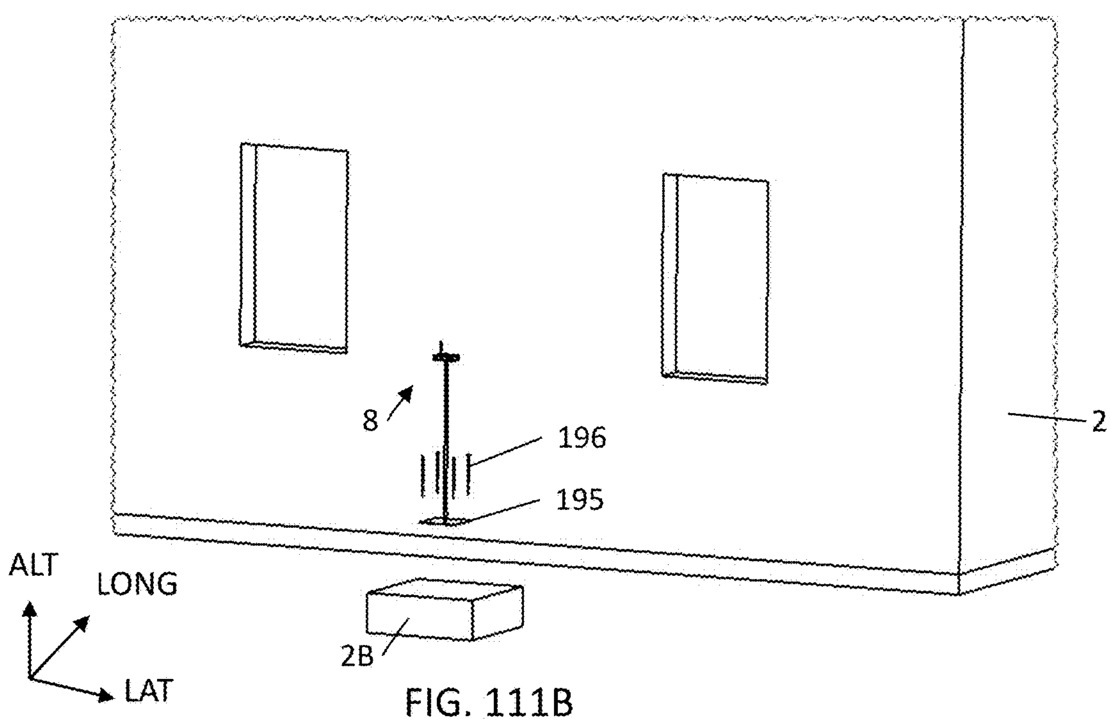
Figure 111C:
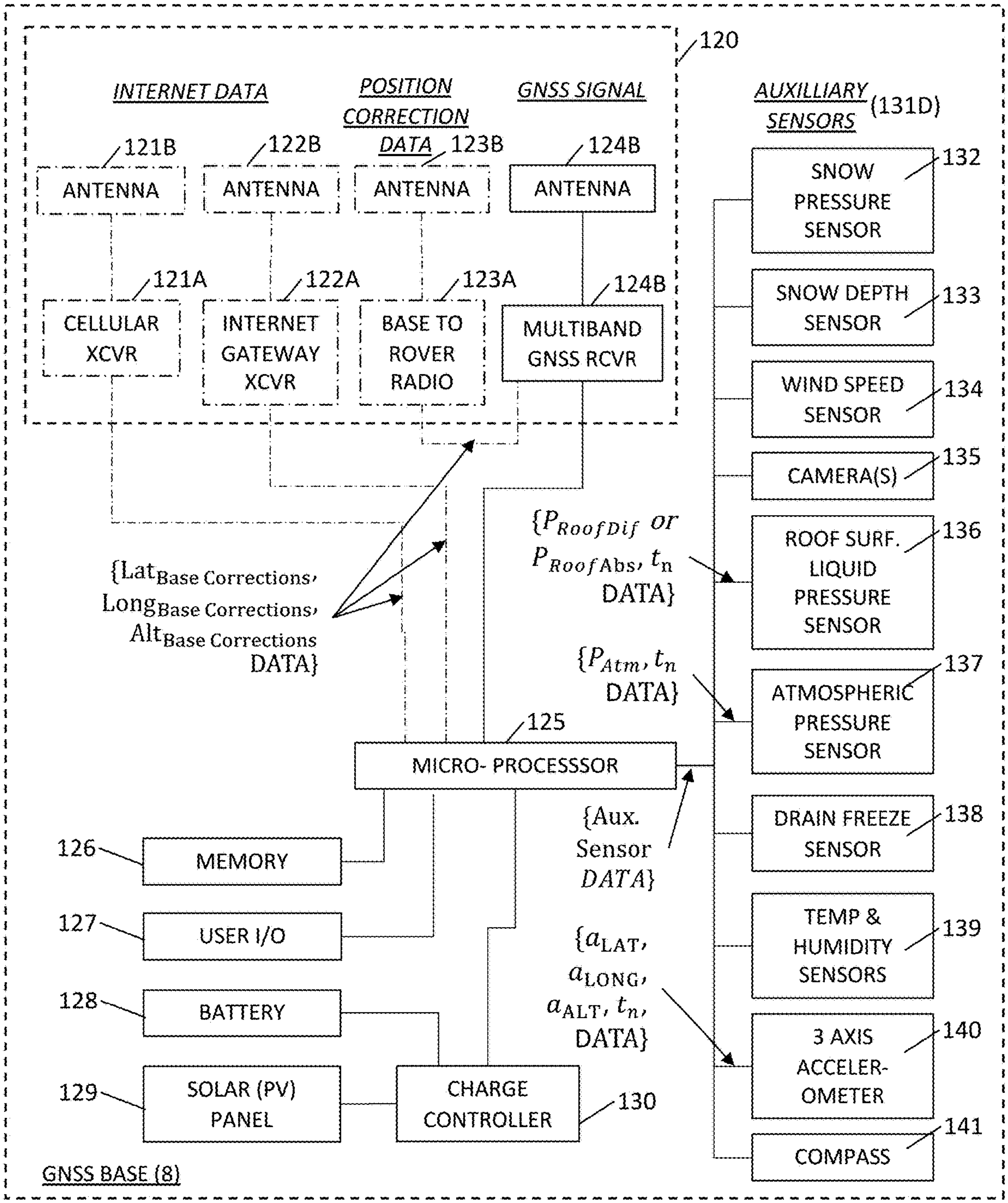
Figure 112A:
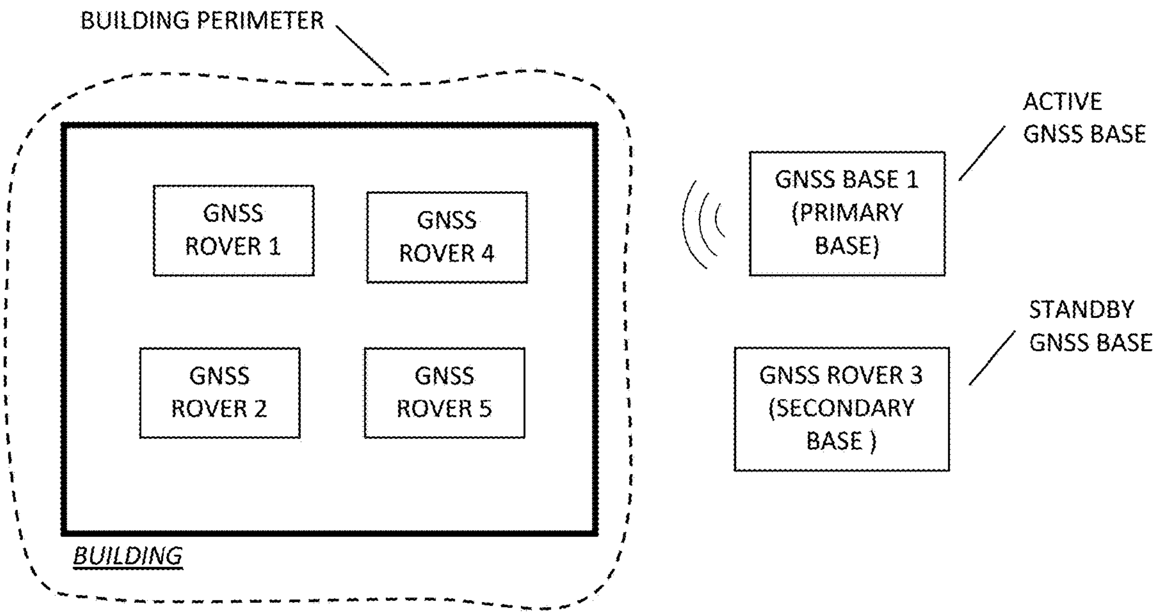
Figure 112B:
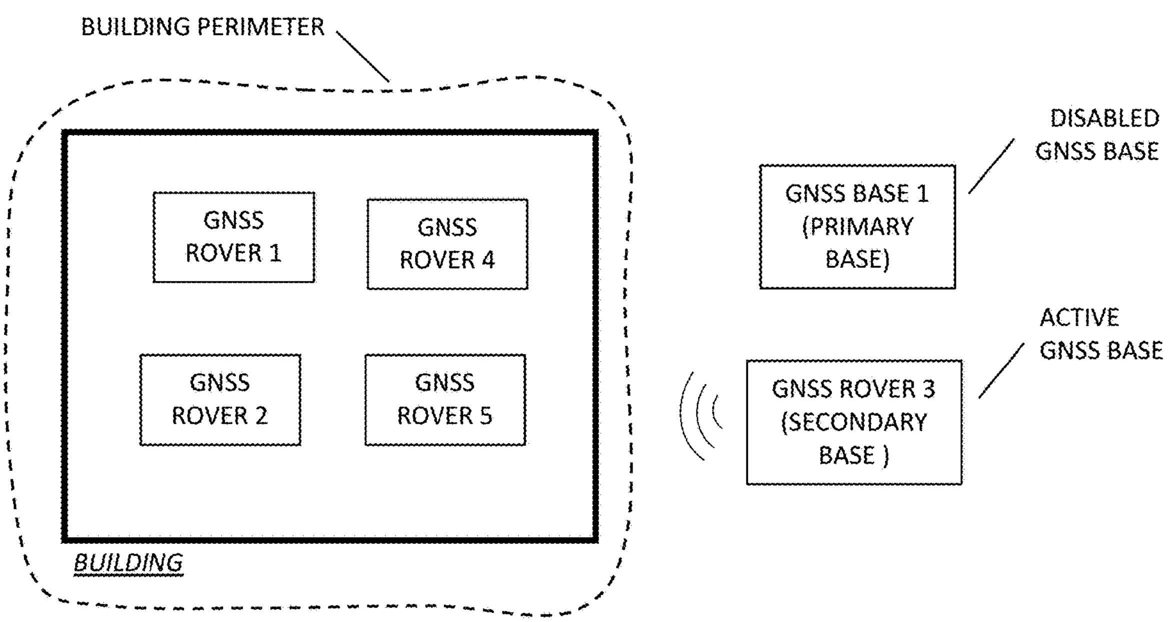
Figure 114:
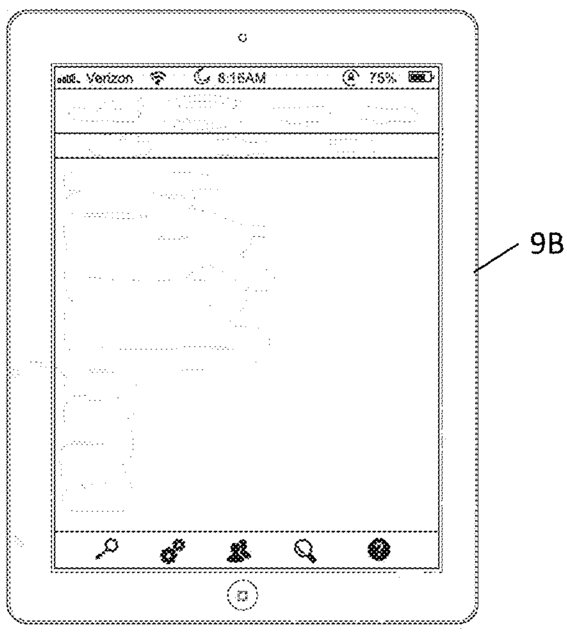
Figure 115:
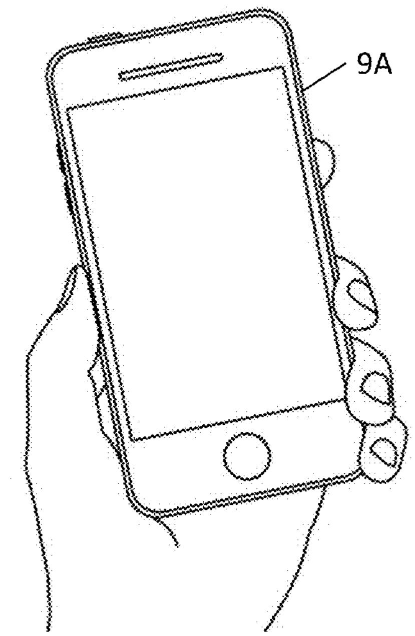
Figure 116:
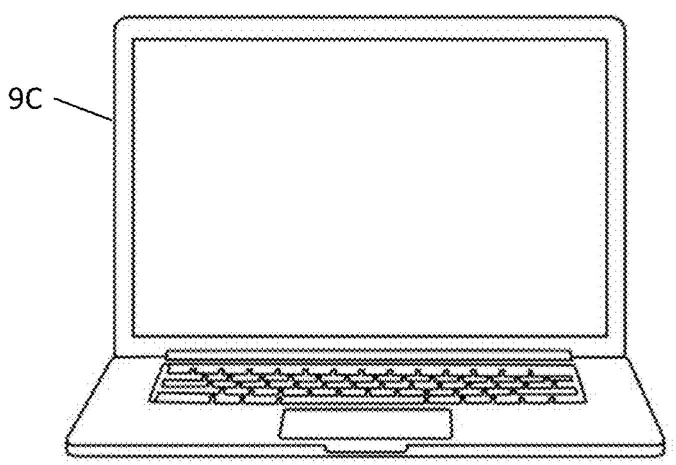
Figure 117:
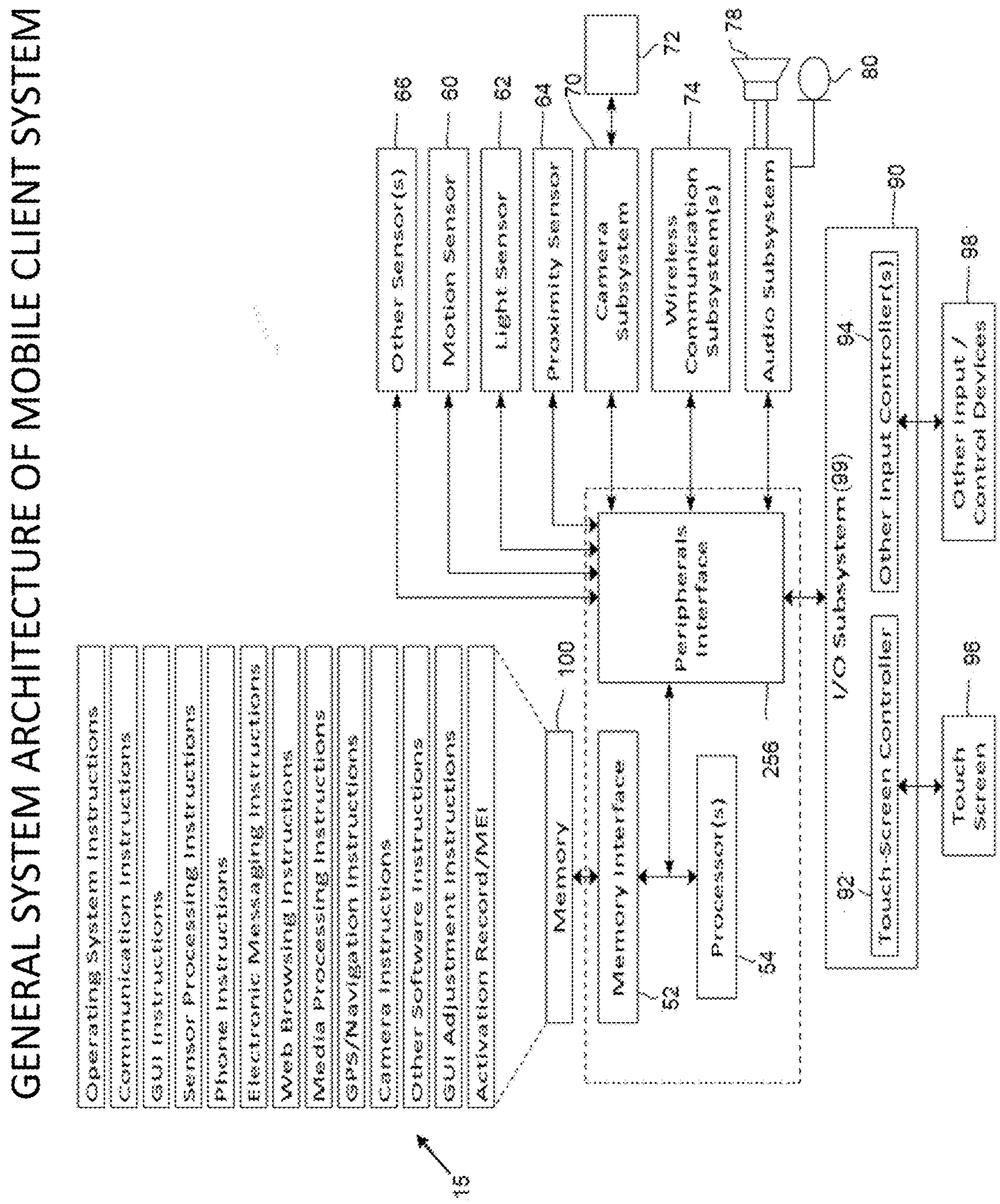
Figure 119:
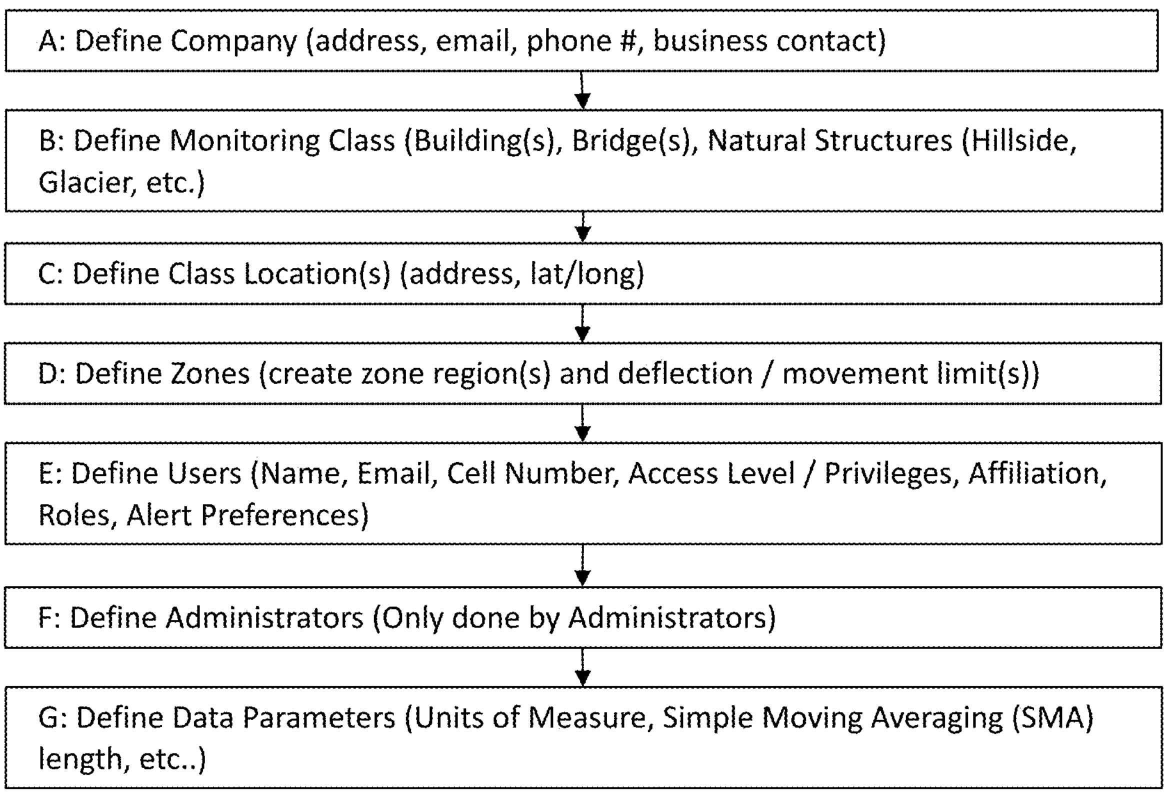
Figure 120:
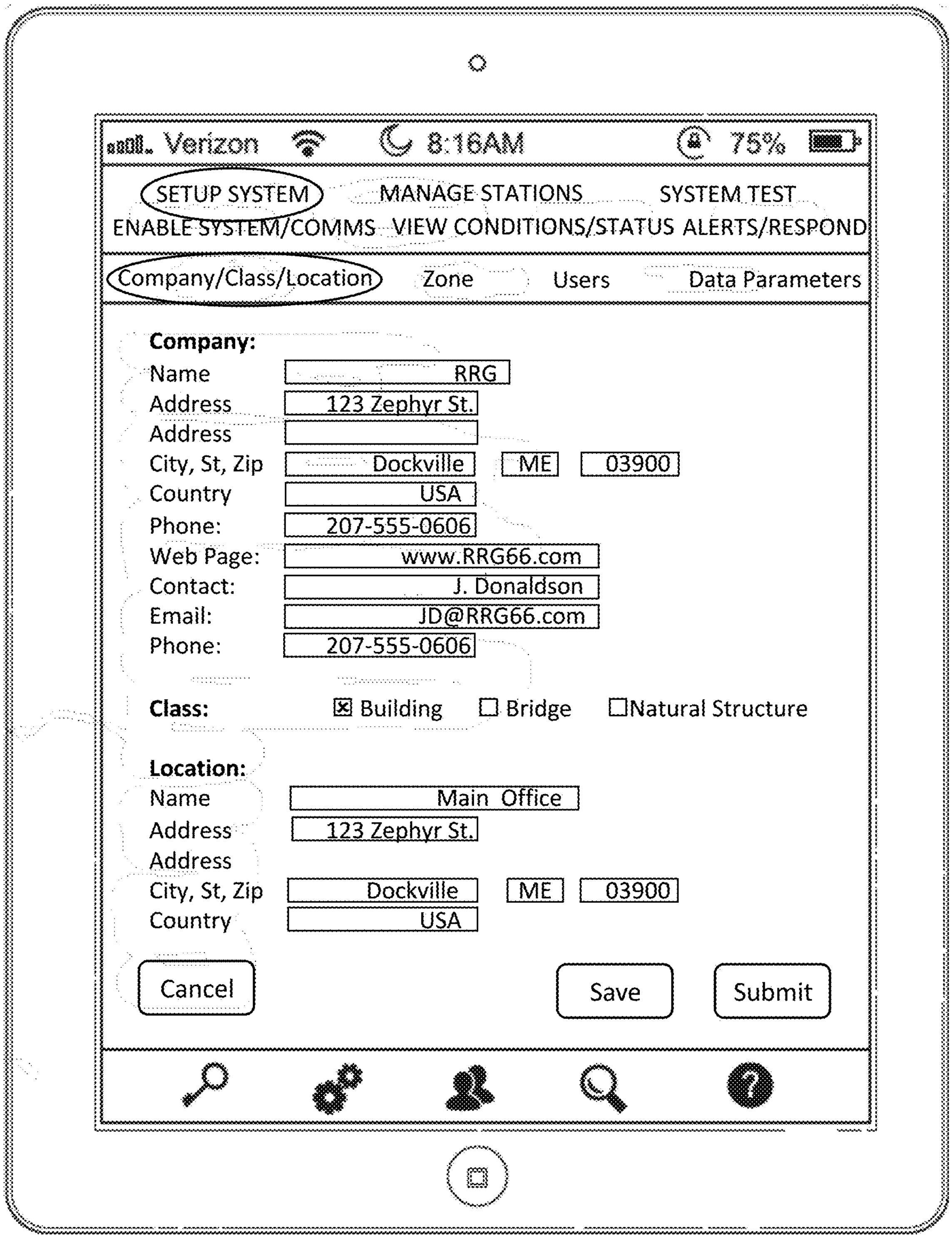
Figure 121:
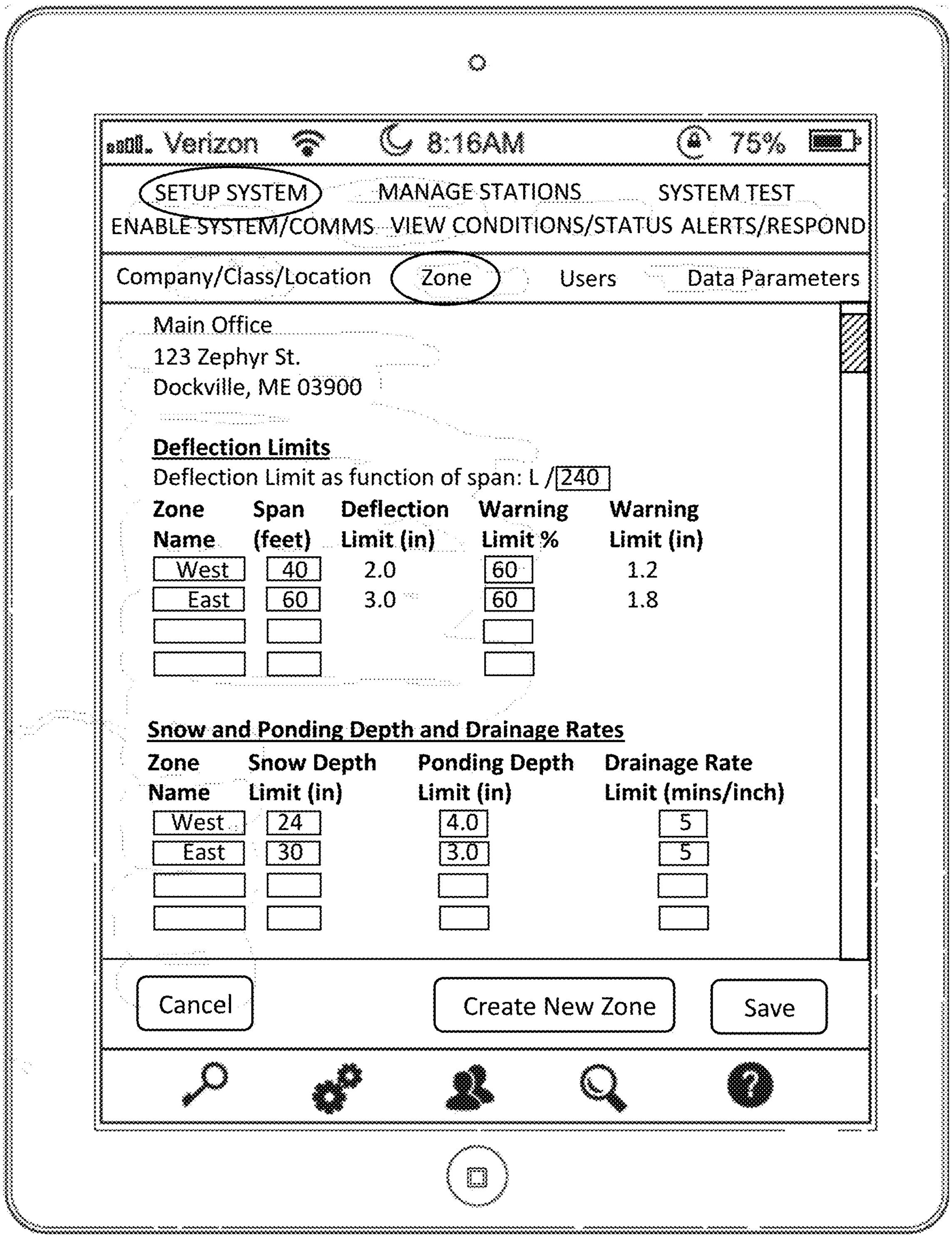
Figure 122:
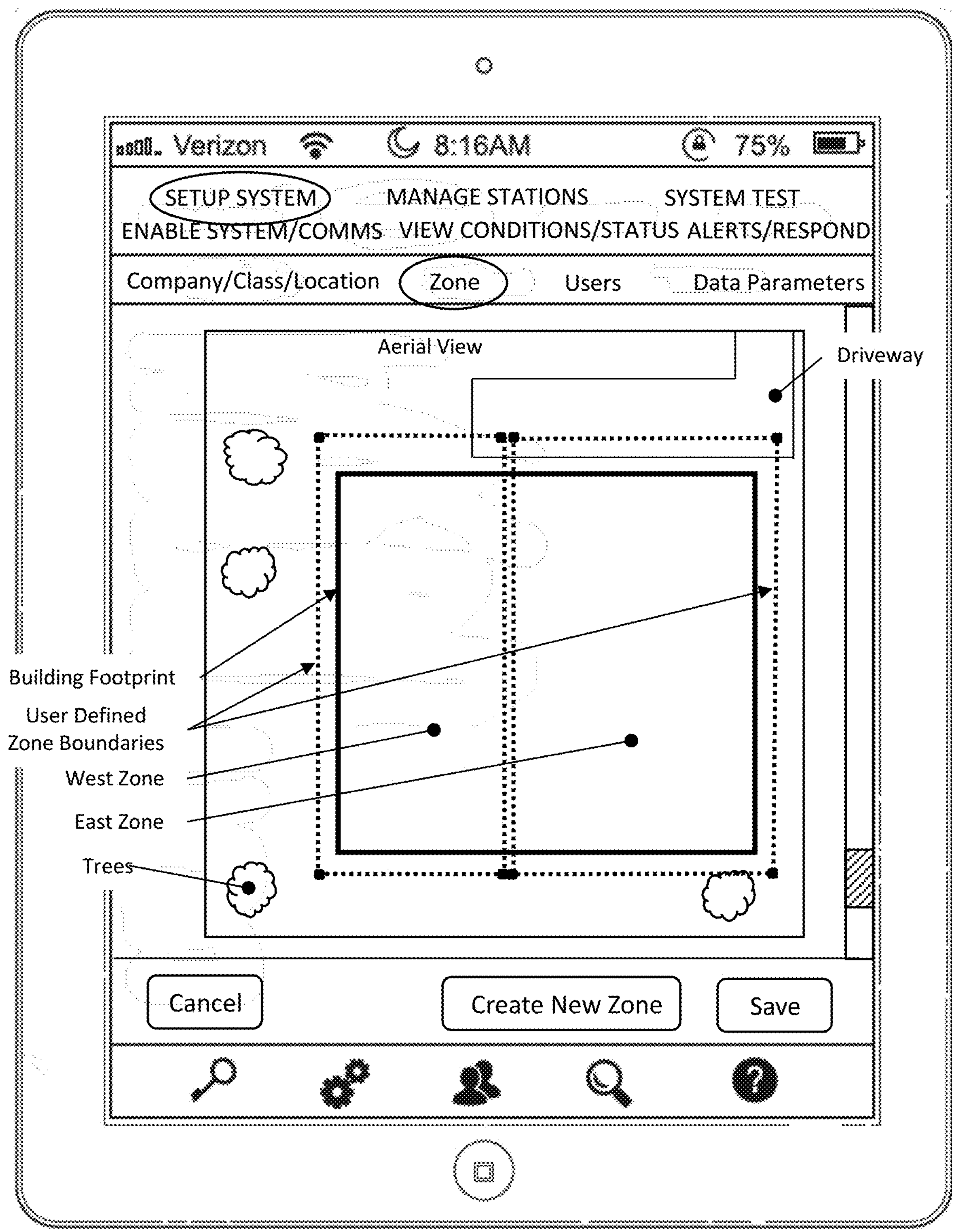
Figure 123:
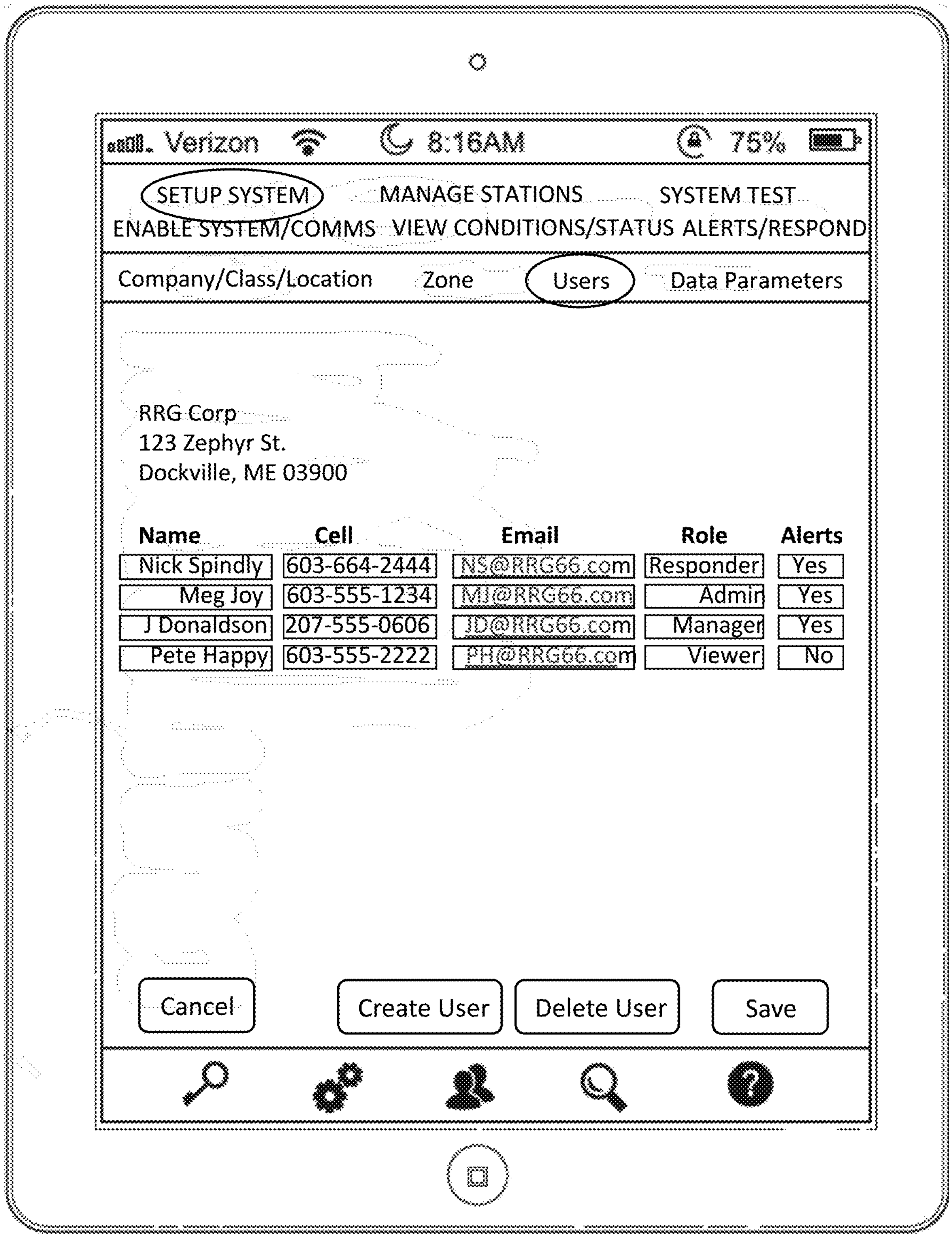
Figure 124:
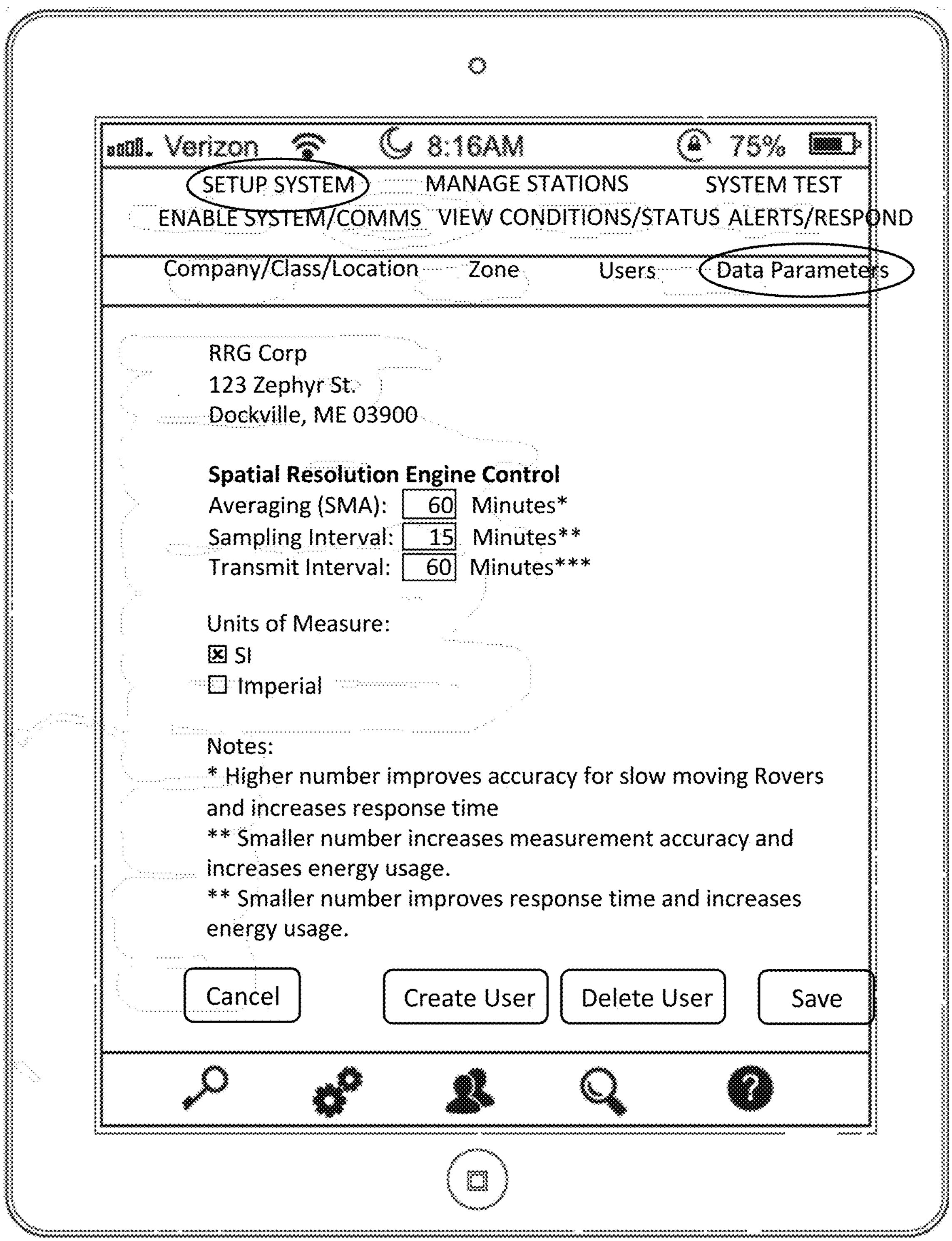
Figure 125:
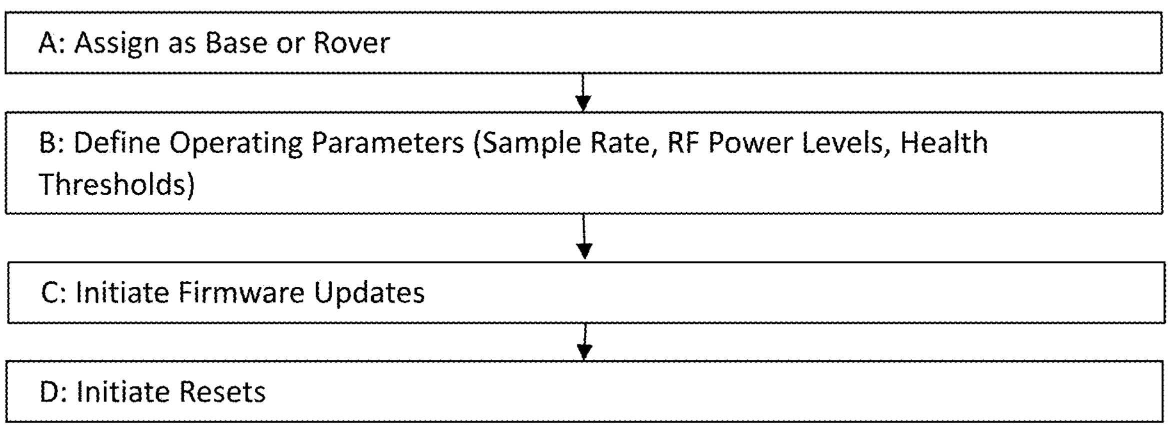
Figure 126:
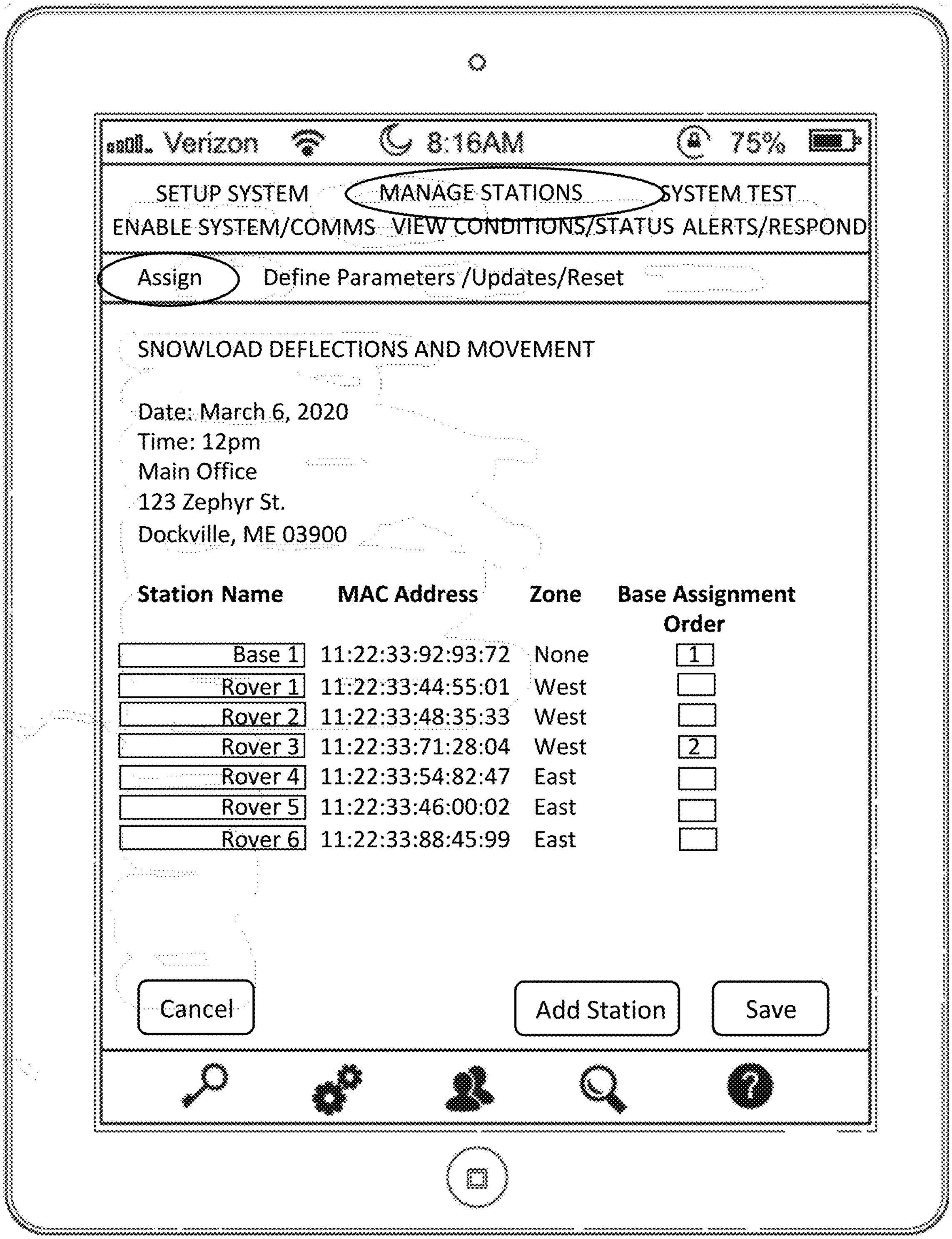
Figure 127:
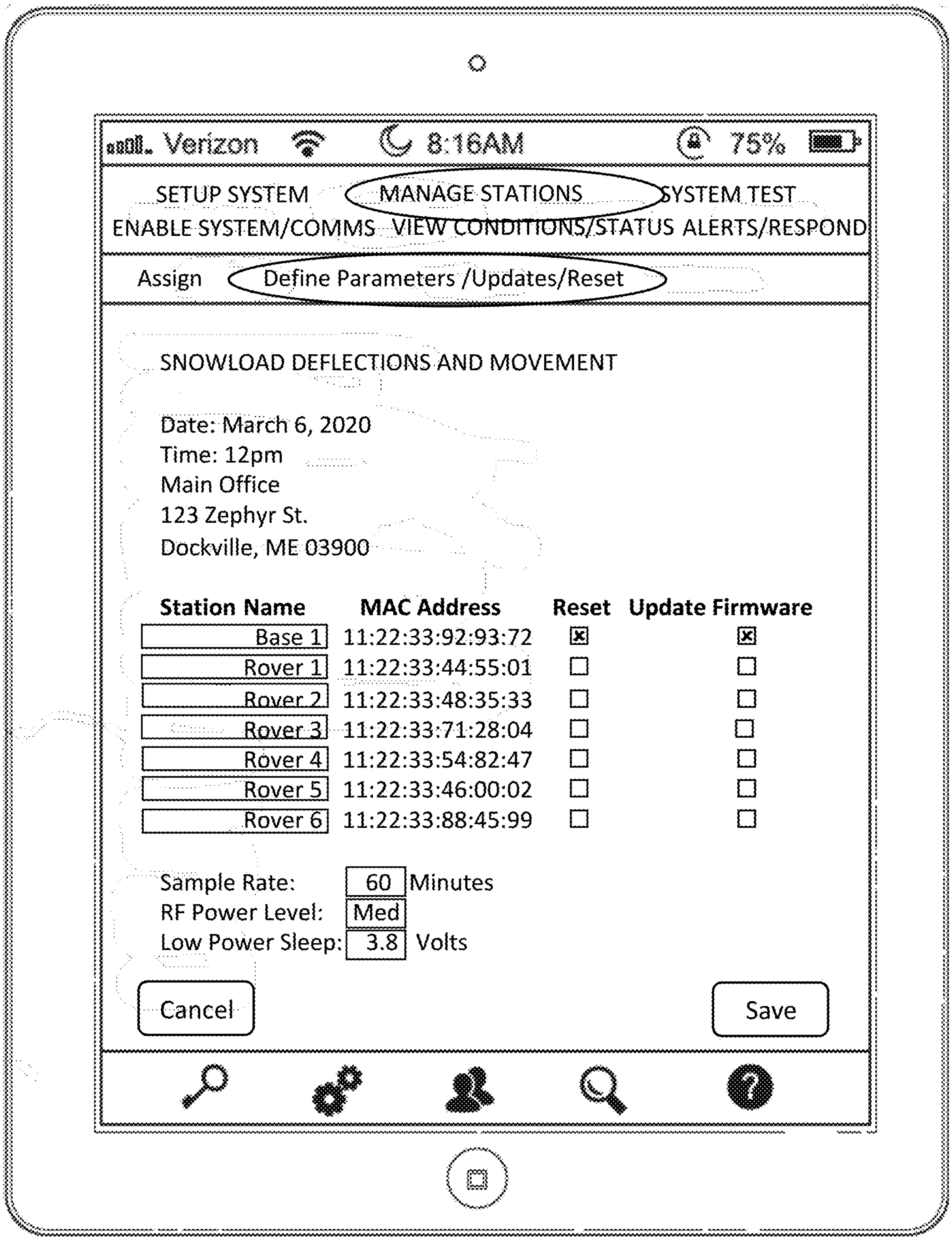
Figure 128:
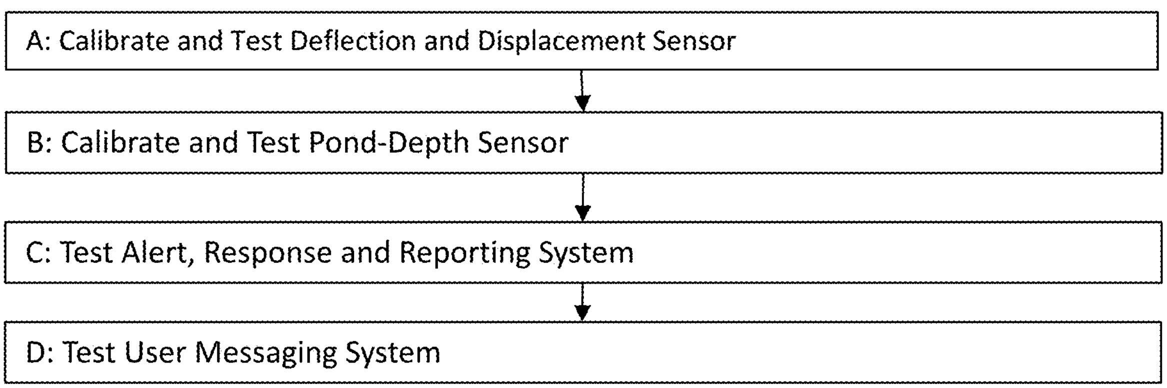
Figure 129:
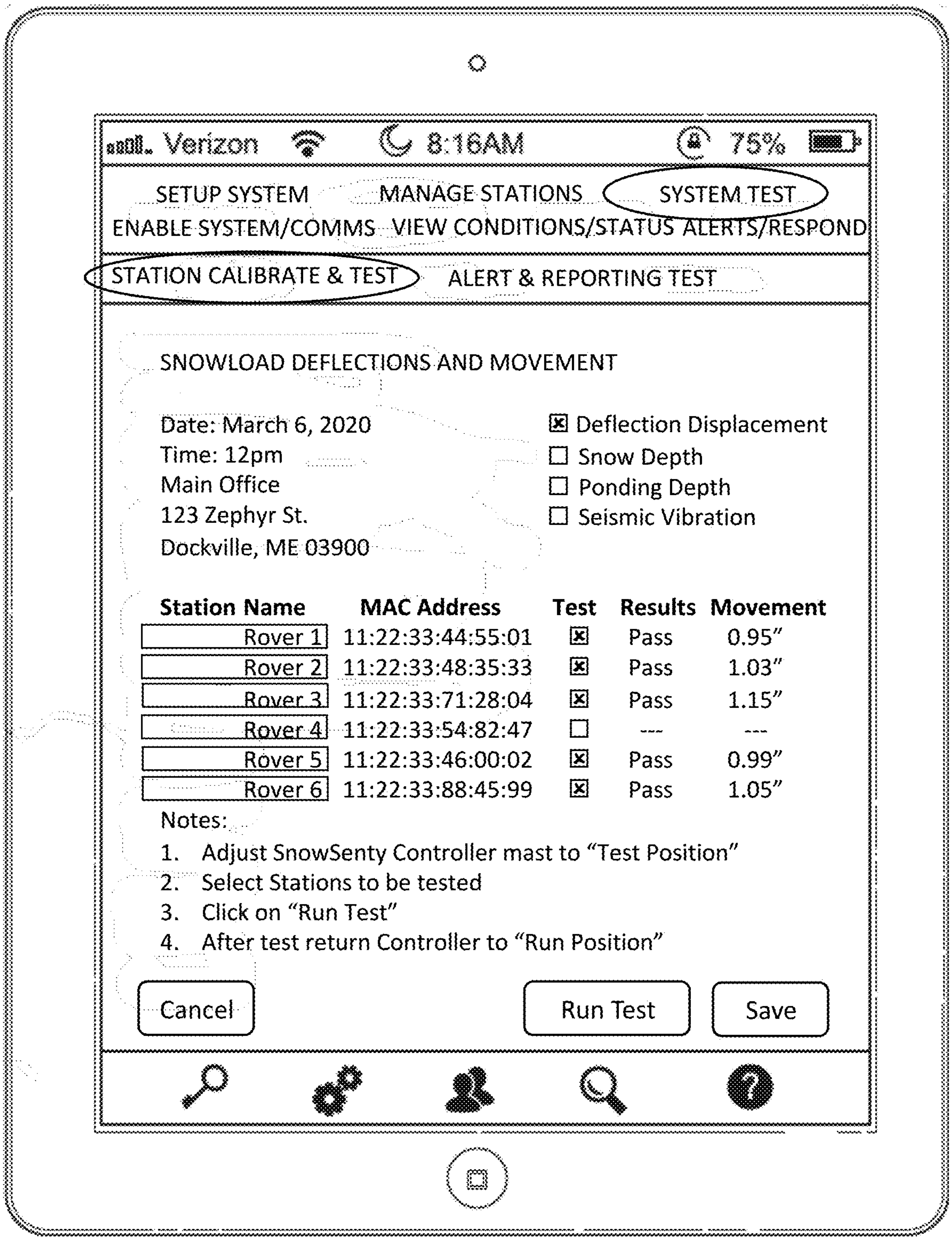
Figure 130:
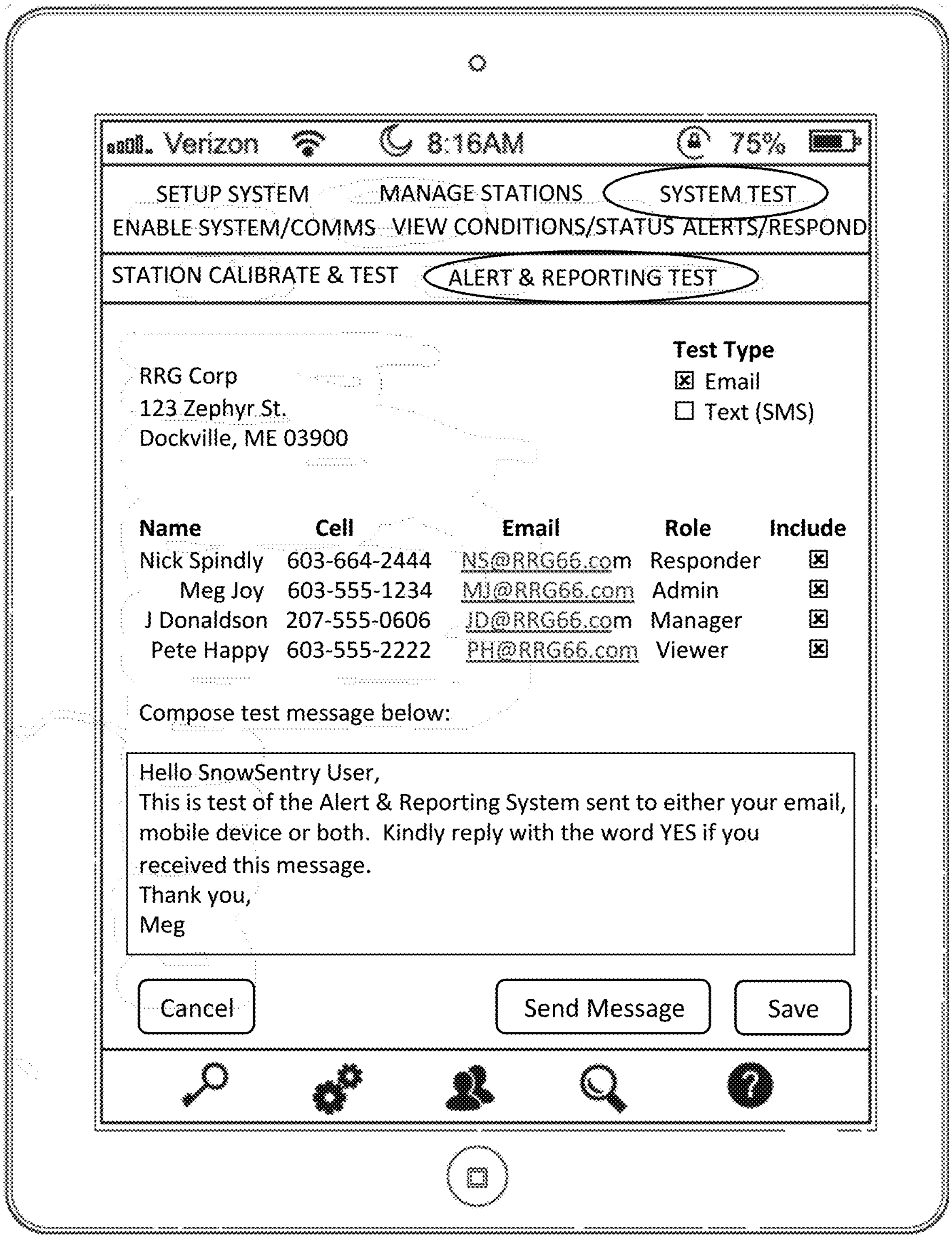
Figure 131:
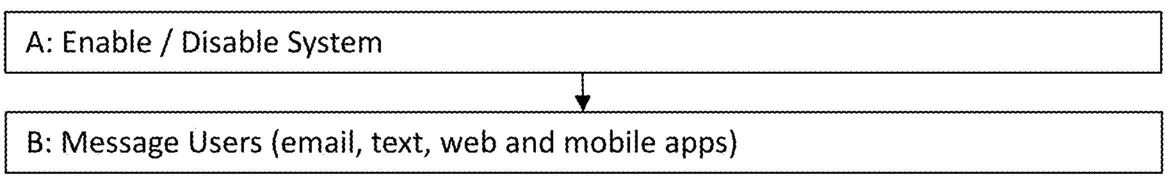

3 using method M2, comprising a GNSS controller portion having a base housing, the PC board with antenna element, upper housing with antenna cover, and a hollow support pole connected to a plate-like support base structure and adhesive to bond the base structure to the roof for sensing pond-depth at the bottom surface of the base structure;

FIG. 77 shows a perspective view of the GNSS rover system provided with an integrated in-pole pond-depth sensing instrument as shown in FIG. 42 using method M1, or as shown in FIG. 43 using method M2, comprising a GNSS controller portion having a base housing, the PC board with antenna element, upper housing with antenna cover, and a hollow support pole connected to a support base structure for sensing pond-depth;

FIG. 78 shows an exploded perspective view of the GNSS rover system shown in FIG. 77 with an integrated in-pole pond-depth sensing instrument as shown in FIG. 42 using method M1, or as shown in FIG. 43 using method M2, comprising a GNSS controller portion having a base housing, the PC board with antenna element, upper housing with antenna cover, and a hollow support pole connected to a support base structure for sensing pond-depth;

FIG. 79 shows a flow chart describing the steps of a communication and information processing method subset used during pond-depth measurement when using differential pressure sensor and method M2;

FIG. 80 is a graphical representation plotting the roof surface pressured measured by the differential pressure sensor employed in the pond-depth sensing instrument system of FIG. 43, and the pond-depth measured and calculated (in inches) by the instrument system over the passage of time, including the occurrence of a rain event and no drain clogging;

FIG. 81 is a graphical representation plotting the roof surface pressure measured by the differential pressure sensor employed in the pond-depth sensing instrument system of FIG. 43, and the pond-depth measured and calculated by the instrument system over the passage of time, including the occurrence of a rain event, and slow draining;

FIG. 82 is a perspective view of a building structure having a roof surface upon which the GNSS system network of the present invention is deployed and operating, wherein each GNSS rover system is realized as a surface-mounted rover device and employs an integrated pond-depth sensing instrument using absolute pressure sensors as shown in FIGS. 42A and/or 42B, and typically mounted nearby a roof drain to automatically and continuously or periodically monitor the rooftop drain region for possible pooling of rainwater;

FIG. 83 is a perspective view of one GNSS surface-mounted rover device shown in deployed in FIG. 82, mounted in the vicinity of a rooftop drain and capable of monitoring and measuring the pond-depth of rainwater collected in the monitoring range of the surface-mounted rover device;

FIG. 84 shows an elevated perspective view of the GNSS surface-mounted rover system shown deployed in FIGS. 82 and 83, using an externally generated atmospheric pressure measurement (e.g. transmitted from NOAA) and received by the surface-mounted GNSS rover system and a local absolute pressure sensor for measuring the pond surface pressure level for use in computing pond-depth measurements;

FIG. 85 is a cross-sectional view of the surface-mounted GNSS rover device of FIG. 84, employing a pond-depth sensing instrument subsystem as shown in FIG. 42A, using an external atmospheric pressure sensor from a remote source such as NOAA servers;

FIG. 86 shows a first exploded view of the surface-mounted GNSS rover device of FIG. 84, showing its base housing portion, its PC board equipped with an integrated color video/still-frame camera system on chip (SOC), a set of solar modules, an RTK antenna, an optically-transparent cover housing portion, a waterproof sealing ring, a set of fastening screws, and an atmospheric air pressure sensing tube;

FIG. 87 shows a second close-up exploded view of the surface-mounted GNSS rover device of FIG. 84, showing its base housing portion, its PC board with integrated color video/still-frame camera system on chip (SOC), its solar modules, its RTK antenna, its optically-transparent cover housing portion, its waterproof sealing ring, a set of fastening screws, and an atmospheric air pressure sensing tube;

FIG. 88 shows an elevated perspective view of the GNSS surface-mounted rover system shown deployed in FIGS. 82 and 83, employing an integrated pond-depth sensing instrument system as shown in FIG. 42B using a pair of local absolute pressure sensors for measuring local atmospheric and pond surface pressure levels for use in pond-depth calculations;

FIG. 89 is a cross-sectional view of the surface-mounted GNSS rover device of FIG. 88, employing a pond-depth sensing instrument subsystem as shown in FIG. 42B;

FIG. 90A shows a first exploded view of the surface-mounted GNSS rover device of FIG. 84, showing its base housing portion, its PC board with integrated color video/still-frame camera system on chip (SOC), its solar modules, its RTK antenna, its optically-transparent cover housing portion, its waterproof sealing ring, an set of fastening screws, and an atmospheric air pressure sensing tube;

FIG. 90B is an exploded view of an absolute pressure sensor for use in measuring local atmospheric pressure in the pond-depth sensing instrument of the present invention employed in the GNSS surface-mounted rover system shown in FIGS. 88 and 89;

FIG. 90C shows a second close-up exploded view of the surface-mounted GNSS rover device of FIGS. 88 and 89, showing its base housing portion, its PC board with integrated color video/still-frame camera system on chip (SOC), its solar modules, its RTK antenna, its optically-transparent cover housing portion, its waterproof sealing ring, a set of fastening screws, and an atmospheric air pressure sensing tube;

FIG. 91 shows an elevated view of the GNSS surface-mounted rover system shown deployed in FIGS. 82 and 83, employing an integrated pond-depth sensing instrument system as shown in FIG. 43 using a single differential pressure sensor;

FIG. 92 is a cross-sectional view of the surface-mounted GNSS rover device of FIG. 91, employing a pond-depth sensing instrument subsystem as shown in FIG. 43;

FIG. 93A shows a first exploded view of the surface-mounted GNSS rover device of FIG. 93, showing its base housing portion, its PC board with integrated color video/still-frame camera system on chip (SOC), its solar modules, its RTK antenna, its optically-transparent cover housing portion, its waterproof sealing ring, a set of fastening screws, and an atmospheric air pressure sensing tube;

FIG. 93B shows a second close-up exploded view of the surface-mounted GNSS rover device of FIG. 91, showing its base housing portion, its PC board with integrated color video/still-frame camera system on chip (SOC), its solar modules, its RTK antenna, its optically-transparent cover housing portion, its waterproof sealing ring, a set of fastening screws, and an atmospheric air pressure sensing tube;

FIG. 94A shows an elevated perspective view of the GNSS surface-mounted rover system shown fastened to a surface-mounted holding cradle 1301;

FIG. 94B shows an exploded perspective view of the GNSS surface-mounted rover system shown removed from a surface-mounted holding cradle 1301. The cradle is secured to a surface using adhesive strips 1302, adhesive or fasteners;

FIG. 95 shows a system block diagram for the surface-mounted GNSS rover system deployed on the GNSS system network of the present invention depicted in FIGS. 82 through 96, shown containing within the GNSS rover controller housing, the following components: (i) radio signal subsystems supporting (a) internet data flow using a cellular transceiver (XCVR) with antenna and an internet gateway transceiver (XCVR), (b) RTK position correction data flow using base to rover radio signal transceivers, and (c) GNSS signal reception using multiband GNSS transceivers, (ii) a programmed microprocessor and supporting memory architecture, provided with a user I/O interface, a battery power module, solar PV panel and charge controller, and (iii) an array of ancillary sensors including, but not limited to, snow pressure sensors, snow depth sensor, wind-speed sensors, digital cameras, roof-surface liquid pressures sensors, atmospheric pressure sensors, drain freeze sensor, temperature and humidity sensors, 3-axis accelerometers, electronic compass instrument, configured and arranged for receiving corrected GNSS signals and determining the position of the GNSS rover relative to a global reference system, and differential displacement of the GNSS rover over time as determined by the spatial measurement engine of the present invention schematically depicted in FIG. 26, and further including external sensors including a snow pressure sensor and a drain freeze sensor;

FIG. 96 shows a flow chart describing the steps of communication and information processing method when making pond-depth measurements using the method M1 illustrated in FIGS. 42A and/or 42B using two absolute pressure sensors;

FIG. 97 shows a graphical representation plotting the absolute atmospheric pressure and the roof surface pressure measured by a pair of absolute pressure sensors employed in the pond-depth sensing instrument system of FIG. 95 and operated according to FIG. 96, and the pond-depth measured and calculated (in inches) by the instrument system over the passage of time, including the occurrence of a rain event, steady atmospheric pressure and no draining;

FIG. 98 shows a graphical representation plotting the absolute atmospheric pressure and the roof surface pressure measured by a pair of absolute pressure sensors employed in the pond-depth sensing instrument system of FIG. 95 and operated according to FIG. 96, and the pond-depth measured and calculated (in inches) by the instrument system over the passage of time, including the occurrence of a rain event, steady atmospheric and slow drain;

FIG. 99 shows a graphical representation plotting the absolute atmospheric pressure and the roof surface pressure measured by a pair of absolute pressure sensors employed in the pond-depth sensing instrument system of FIG. 95 and operated according to FIG. 96, and the pond-depth measured and calculated (in inches) by the instrument system over the passage of time, including the occurrence of a rain event, dip in atmospheric pressure and no draining;

FIG. 100 shows a graphical representation plotting the absolute atmospheric pressure and the roof surface pressure measured by a pair of absolute pressure sensors employed in the pond-depth sensing instrument system of FIG. 95 and operated according to FIG. 96, and the pond-depth measured and calculated (in inches) by the instrument system over the passage of time, including the occurrence of a rain event, dip in atmospheric pressure and slow draining;

FIG. 101 shows a flow chart describing the steps of a method for pond-depth measurement according to Method 2 illustrated in FIG. 43 using a single differential pressure sensor;

FIG. 102 shows a flow chart describing the steps of a rover communication and information processing method used in the system network of FIG. 82;

FIGS. 103A and 103B shows perspective views of a building structure having a roof surface, upon which the GNSS system network of the present invention is deployed and operating, wherein each GNSS rover system is realized as a surface-mounted rover device and employs an integrated pond-depth sensing instrument using absolute pressure sensors as shown in FIGS. 42A and/or 42B, and typically mounted nearby a roof drain or scupper to automatically and continuously or periodically monitor the rooftop drain or scupper region for possible pooling of rainwater;

FIG. 103C is a perspective view of one GNSS surface-mounted rover device shown deployed in FIGS. 103A and 103B, mounted in the vicinity of a rooftop drain or scupper and capable of monitoring and measuring the pond-depth of rainwater collected in the monitoring range of the surface-mounted rover device;

FIG. 103D is a perspective view of one GNSS surface-mounted rover device shown in FIG. 103C removed from its mounting cradle in the vicinity of a rooftop drain or scupper and capable of monitoring and measuring the pond-depth of rainwater collected in the monitoring range of the surface-mounted rover device;

FIG. 104A shows a perspective view of a GNSS rover system provided with an integrated in housing pond-depth sensing instrument as shown in FIG. 42, using the method M1, comprising a GNSS controller portion having a waterproof lower housing, a PC board, an antenna element, an antenna cover and marker flag;

FIG. 104B is an exploded view of the GNSS rover system shown in FIG. 104A provided with an integrated in housing pond-depth sensing instrument, its antenna tube, a dipole antenna and marker flag;

FIG. 104C is an exploded lower view of the GNSS rover system shown in FIG. 104A provided with an integrated in housing pond-depth sensing instrument, its circuit board, a solar panel, a user display, a pressure membrane, an upper and lower housing and rooftop connection base;

FIG. 104D is a perspective lower view of the GNSS rover system shown in FIG. 104A provided with an integrated in housing pond-depth sensing instrument, its power and menu selection buttons, a solar panel and user display;

FIG. 104E is a perspective lower bottom view of the GNSS rover system shown in FIG. 104A provided with an integrated in housing pond-depth sensing instrument, its connection base and groves and other passages allowing the free flow movement of liquid;

FIG. 104F is an exploded lower view of the GNSS rover system shown in FIG. 104A provided with an integrated in housing pond-depth sensing instrument, its circuit board, a pressure membrane, upper and lower housing and rooftop connection base;

FIG. 104G is an exploded lower bottom view of the GNSS rover system shown in FIGS. 104A through 104F provided with an integrated in housing pond-depth sensing instrument, its circuit board, pressure membrane, an upper and lower housing and rooftop connection base;

FIGS. 104H, 104I and 104J show cross sectional views of the GNSS rover system shown in FIG. 104A provided with an integrated in housing pond-depth sensing instrument;

FIG. 105A shows a perspective view of a GNSS rover system provided with an integrated in housing pond-depth sensing instrument as shown in FIG. 42, using the method M1, comprising a GNSS controller portion having a waterproof lower housing, a PC board supporting solid-state pressure sensors, an antenna element, an antenna cover, an upper camera housing mounted on top of the antenna tube and a marker flag;

FIG. 105B shows a lower bottom perspective view of a GNSS rover system provided with an integrated in housing pond-depth sensing instrument as shown in FIG. 42, using the method M1, comprising a GNSS controller portion having a waterproof lower housing, a PC board supporting solid-state pressure sensors, an antenna element, an antenna cover, and an upper camera housing mounted on top of the antenna tube;

FIG. 105C shows a perspective view of the upper camera housing mounted on top of the antenna tube and camera view ports;

FIG. 105D shows an exploded perspective view of the GNSS rover system with an upper camera housing mounted on top of the antenna tube and marker flag;

FIG. 105E shows an exploded perspective view of the GNSS rover system with an upper camera housing mounted on top of the antenna tube and marker flag;

FIG. 105F shows a close up exploded perspective view of the upper camera housing mounted on top of the antenna tube and camera view ports;

FIG. 105G shows a close up exploded bottom perspective view of the upper camera housing mounted on top of the antenna tube and camera view ports;

FIG. 106A shows a perspective view of the GNSS rover system provided with an integrated in housing pond-depth sensing instrument as shown in FIG. 42, using the method M1, comprising a GNSS controller portion having a waterproof lower housing, a PC board supporting solid-state pressure sensors, an antenna element, an antenna cover and marker flag being lifted from the roof surface connection base next to bucket of water to be used for testing system performance and operation;

FIG. 106B shows a perspective view of the GNSS rover system placed in the bucket for testing;

FIG. 106C shows a cross section view of the GNSS rover system placed in a bucket with water for testing;

FIG. 106D is a perspective view of one GNSS surface-mounted rover device shown deployed in FIGS. 105A and 105B, mounted to its support base that is mounted to base plate held to the roof using an object such as a brick when it is not possible to directly affix the support base to the roof deck;

FIG. 106E is an exploded perspective view of one GNSS surface-mounted rover device shown deployed in FIGS. 105A and 105B, a support base, a base plate brick and roof deck;

FIG. 106F is an exploded perspective view of one GNSS surface-mounted rover device shown deployed in FIGS. 105A and 105B, has been removed from the support base for testing or replacement;

FIG. 107 shows a system block diagram of the GNSS-based system network of the present invention deploying a plurality of rover stations on a building being monitored by the GNSS system network depicted in FIGS. 105A through 106F, wherein the GNSS system network comprises (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring, sampling water pressure to determine ponding depth and sampling air pressure locally or remotely for making corrections due to changes to atmospheric pressure, (iii) one or more client computing systems for transmitting instructions and receiving alerts and notifications and supporting diverse administration, operation and management functions on the system network, (iv) a cell tower for supporting cellular data communications across the system network, and (v) a data center supporting web servers, application servers, database and datastore servers, and SMS/text and email servers;

FIGS. 108A and 108B show a flow chart describing the steps of a method for testing accurate operation of the pond-depth measurement Rover. according to Methods 1 and 2 illustrated in FIG. 43, FIGS. 42A and 42B;

FIG. 109A shows a graphical representation of the pond-depth measured and calculated (in inches) in the pond-depth sensing instrument system of FIG. 109B and operated according to FIG. 109D by the instrument system over the passage of time, including the occurrence of a rain event, values below the safe water depth limit, inactive ponding depth alert status and inactive slow draining alert status;

FIG. 109B shows a graphical representation of the pond-depth measured and calculated (in inches) in the pond-depth sensing instrument system of FIG. 109B and operated according to FIG. 109D by the instrument system over the passage of time, including the occurrence of a rain event, values above the safe water depth limit, active ponding depth alert status and inactive slow draining alert;

FIG. 109C shows a graphical representation of the pond-depth measured and calculated (in inches) in the pond-depth sensing instrument system of FIG. 109B and operated according to FIG. 109D by the instrument system over the passage of time, including the occurrence of a rain event, values below the safe water depth limit, inactive ponding depth alert status and active slow draining alert;

FIG. 110A shows a first perspective view of a GNSS base station deployed in FIGS. 1 and 8, shown comprising a GNSS controller portion having a base housing, the PC board with antenna element, upper housing with antenna cover, and a hollow support pole mounted to a base housing;

FIG. 110B shows a second perspective view of the GNSS base station shown in FIGS. 1 and 8, showing the base housing, the PC board with antenna element, an upper housing with antenna cover, and the hollow support pole mounted to a base housing;

FIG. 110C shows an exploded view of a GNSS base station shown in FIGS. 105 and 106, comprising a GNSS base controller portion having a base housing, the PC board with antenna element and GNSS module, upper housing with antenna cover, and a hollow support structure;

FIG. 111A shows a building structure in which the GNSS system network of the present invention is deployed for monitoring deflection and/or displacement, wherein the GNSS base station is shown mounted external to the building on a stationary region of the building, in capable of movement or deflection;

FIG. 111B shows a building structure in which the GNSS system network of the present invention is deployed for monitoring deflection and/or displacement, wherein the GNSS base station is shown mounted external to the building on a stationary region of the building, using a set of deep threaded mounting bolts driven into the stationary region, to prevent movement or deflection;

FIG. 111C shows a system block diagram for the GNSS base station system deployed on the GNSS system network of the present invention depicted in FIG. 82 shown comprising, within the GNSS base controller housing, (i) radio signal subsystems supporting (a) Internet data flow using a cellular transceiver (XCVR) with antenna and an Internet gateway transceiver (XCVR), (b) RTK position correction data flow using base to rover radio signal transceivers, and (c) GNSS signal reception using multiband GNSS transceivers, (ii) a programmed microprocessor and supporting memory architecture, provided with a user I/O interface, battery power module, solar PV panel and charge controller, and (iii) an array of ancillary sensors including, but not limited to, snow pressure sensors, snow depth sensor, windspeed sensor, digital cameras, roof-surface liquid pressure sensor, atmospheric pressure sensor, drain freeze sensor, temperature and humidity sensors, 3-axis accelerometers, and electronic compass instrument, configured and arranged for computing corrected GNSS signals and determining the position of the GNSS base station relative to a global reference system, and determining differential displacement of the GNSS rover over time as determined by the spatial measurement engine of the present invention schematically depicted in FIG. 26, and further including external sensors including a snow pressure sensor and a drain freeze sensor;

FIG. 112A shows a schematic representation of the GNSS system network of the present invention, wherein a set of GNSS rover units are deployed on the building rooftop, with one GNSS base unit being assigned as active primary base unit communicating with the other GNSS rover units, and wherein one GNSS rover unit is assigned as a GNSS rover and a secondary inactive GNSS base (backup) unit in accordance with the principles of the present invention;

FIG. 112B shows a schematic representation of the GNSS system network of the present invention illustrated in FIG. 11, wherein the set of GNSS rover units are deployed on the building rooftop, and wherein the first GNSS base unit has been disabled, and the backup GNSS rover unit has been assigned as an active secondary GNSS base unit, communicating with the GNSS rover units, in accordance with the principles of the present invention;

FIG. 113 shows a flow chart describing the primary steps of the method of base communication and information processing carried out by an active GNSS base station according to the principles of the present invention, generating and transmitting LAT, LONG and ALT Correction offsets to the GNSS rovers units mounted on the building;

FIG. 114 shows a tablet-type client computer system deployed on each GNSS system network of the present invention, comprising a touch-screen GUI screen;

FIG. 115 shows a mobile phone type client computer system deployed on each GNSS system network of the present invention, comprising a touch-screen GUI screen;

FIG. 116 shows a laptop-type client computer system deployed on each GNSS system network of the present invention, comprising a keyboard interface and GUI display screen;

FIG. 117 shows a schematic representation of the general system architecture of a mobile client system deployed on the system network of the present invention, comprising: a Processor(s); a Memory Interface; Memory for storing Operating System Instructions, Electronic Messaging Instructions, Communication Instructions, GUI Instructions, Sensor Processing Instructions, Phone Instructions, Web Browsing Instructions, Media Processing Instructions, GPS/Navigation Instructions, Camera Instructions, Other Software Instructions, and GUI Adjustment Instructions; Peripherals Interface; Touch-Screen Controller; Other Input Controller(s); Touch Screen; Other Input/Control Devices; I/O Subsystem; Other Sensor(s); Motion Sensor; Light Sensor; Proximity Sensor; Camera Subsystem; Wireless Communication Subsystem(s); and Audio Subsystem;

FIG. 118 shows a table listing the Specification of Services for Specific User Groups enabled on the System Network of the present invention, comprising: services available to administrators, managers, responders, and viewers, selected from the group of services consisting of (i) setup system, (ii) manage stations, (iii) initiate system test, (iv) enable system, (v) initiate communications, (vi) view station status and monitor data for: ponding, rooftop and ground-based imaging, deflection and displacement measurements, snow pressure, wind speed, temperature and structural vibrations, (vii) receive alerts and notifications, respond and report, (viii) define administrator;

FIG. 119 is a flow chart describing the primary steps involving in a preferred method of setting up the system network of the present invention in any given deployment environment, comprising the steps of: graphical icons and objects supporting various end-user functions including, for example, setup system, managing stations, testing system, enabling systems/communications, viewing conditions/status, setting alerts/responses, and managing company/class/location, data parameters and zones;

FIG. 120 shows a graphical user interface (GUI) used during the method of system set-up for Company/Class/Location, as depicted in FIG. 119, and illustrating various graphical icons and objects supporting various end-user function including, for example, set up system, managing stations, testing system, enabling systems/communications, viewing conditions/status, setting alerts/responses, and managing company/class/location, data parameters and zones;

FIG. 121 shows a graphical user interface (GUI) used during the method of system set-up for Zones, as depicted in FIG. 119, and illustrating various graphical icons and objects supporting various end-user function including, for example, set up system, managing stations, testing system, enabling systems/communications, viewing conditions/status, setting alerts/responses, and managing company/class/location, data parameters and zones;

FIG. 122 shows a graphical user interface (GUI) used during the method of system setup for Zones as depicted in FIG. 121, and illustrating various graphical icons and objects supporting various end-user function including, for example, setup system, managing stations, testing system, enabling systems/communications, viewing conditions/status, setting alerts/responses, and managing company/class/location, data parameters and zones;

FIG. 123 shows a graphical user interface (GUI) used during the method of system set-up for Users, as depicted in FIG. 119, and illustrating various graphical icons and objects supporting various end-user function including, for example, setup system, managing stations, testing system, enabling systems/communications, viewing conditions/status, setting alerts/responses, and managing company/class/location, data parameters and zones;

FIG. 124 shows a graphical user interface (GUI) used during the method of system set-up for Data Parameters as illustrated in FIG. 119, and illustrating various graphical icons and objects supporting various end-user function including, for example, setup system, managing stations, testing system, enabling systems/communications, viewing conditions/status, setting alerts/responses, and managing company/class/location, data parameters and zones;

FIG. 125 is a flow chart describing the method of managing stations deployed on the system network of the present invention, comprising the steps of (a) Assigning a Base or Rover, (b) Defining Operating Parameters (e.g. Sample Rate, RF Power Levels, Health Thresholds), (c) Initiating Firmware Updates, and (d) Initiating Resets;

FIG. 126 shows a graphical user interface (GUI) used during the method of managing stations, involving assignment of stations, as illustrated in FIG. 125, and illustrating various graphical icons and objects supporting various end-user function including, for example, setup system, managing stations, testing system, enabling systems/communications, viewing conditions/status, setting alerts/responses, and managing company/class/location, data parameters and zones;

FIG. 127 shows a graphical user interface (GUI) used during the method of managing stations, involving defining parameters/updates and resets, as illustrated in FIG. 125, and illustrating various graphical icons and objects supporting various end-user function including, for example, setup system, managing stations, testing system, enabling systems/communications, viewing conditions/status, setting alerts/responses, and managing company/class/location, data parameters and zones;

FIG. 128 shows a flow chart describing the steps carried out the method of initiate system testing on the system network of the present invention, comprising the steps of (a) Calibrating and Test Deflection and Displacement Sensor, (b) Calibrating and Test Pond-Depth Sensor, (c) Testing the Alert, Response and Reporting System, and (d) Testing the User Messaging System;

FIG. 129 shows a graphical user interface (GUI) used during the method of set-up for system test involving calibrate and test as illustrated in FIG. 128, and illustrating various graphical icons and objects supporting various end-user function including, for example a graphical user interface (GUI) used during the method of set-up illustrated in FIG. 128, illustrating various graphical icons and objects supporting various end-user function including, for example, setup system, managing stations, testing system, enabling systems/communications, viewing conditions/status, setting alerts/responses, and managing company/class/location, data parameters and zones;

FIG. 130 shows a graphical user interface (GUI) used during the method of system test involving alert and reporting test as illustrated in FIG. 128, and illustrating various graphical icons and objects supporting various end-user function including, for example, setup system, managing stations, testing system, enabling systems/communications, viewing conditions/status, setting alerts/responses, and managing company/class/location, data parameters and zones;

FIG. 131 shows a flow chart describing a method of enabling system and initiating communications on the system network of the present invention, comprising the steps of (a) Enabling/Disabling System, and (b) Messaging Users (email, text, web and mobile apps)

Figure 2:
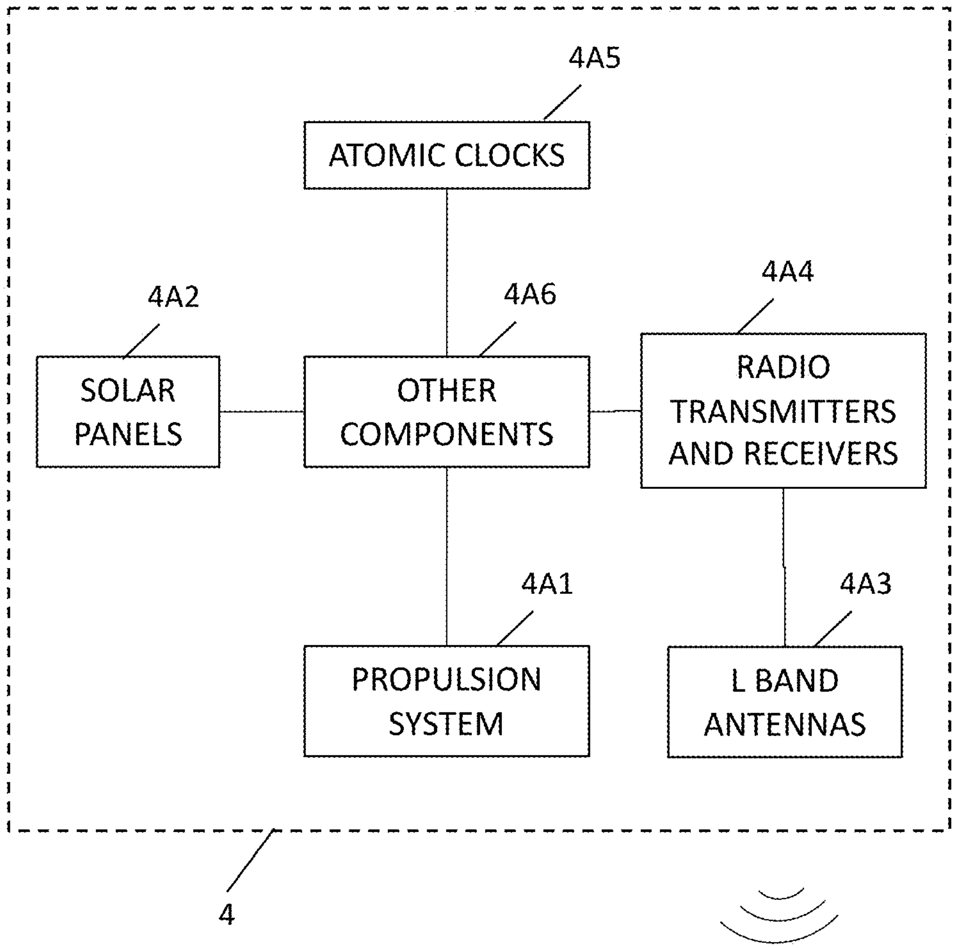
FIG. 2 is a system block diagram for each global navigation satellite system (GNSS) satellite deployed within the GNSS system network of the present invention of FIG. 1, showing each GNSS satellite as comprising a propulsion system, solar panels, L band antennas, radio transmitters and receivers, and atomic clocks.
Figure 3:
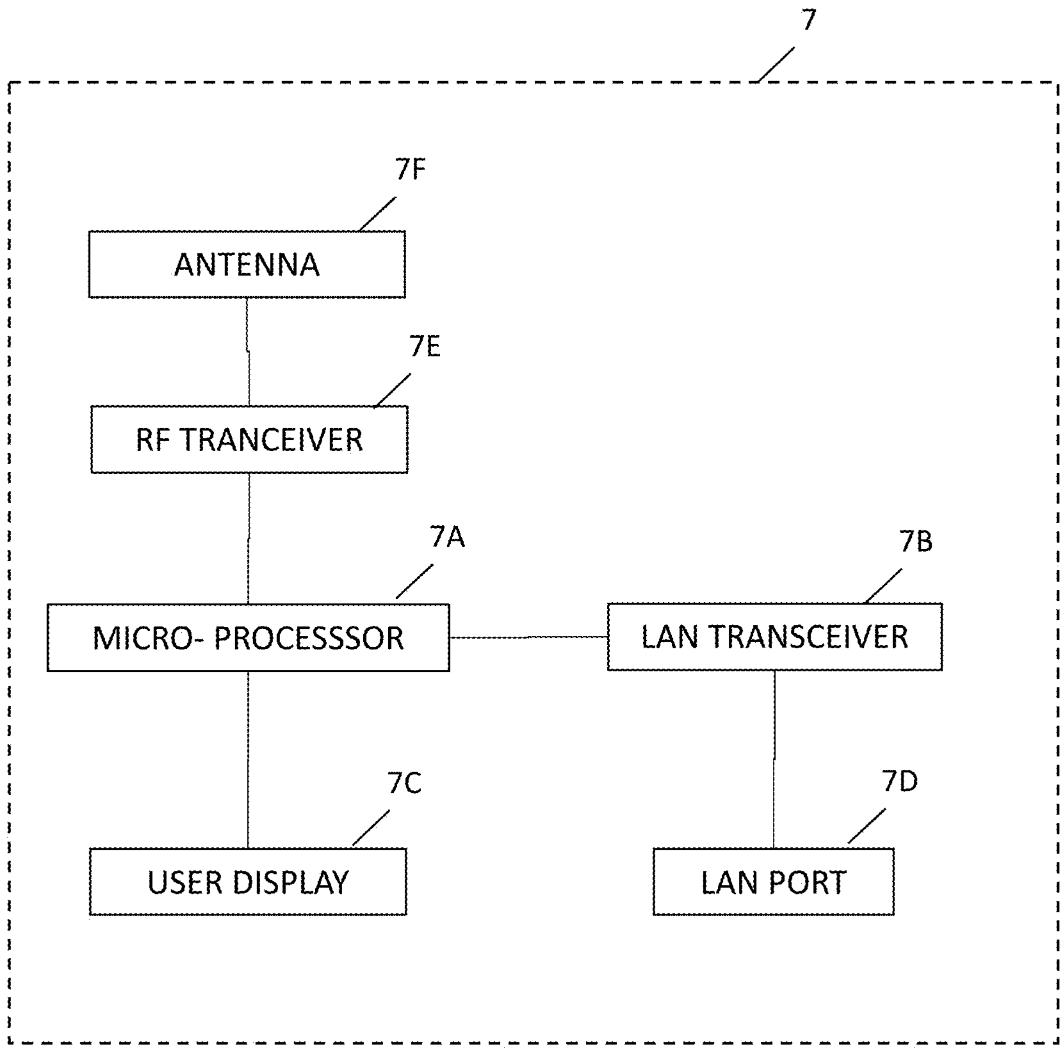
FIG. 3 is a system block diagram for the internet gateway deployed in the GNSS system network of the present invention of FIG. 1, shown comprising a micro-processor with a supporting a memory architecture, a LAN transceiver, a GUI-based user display, a LAN port, an RF transceiver with an antenna, a manager, and a viewer.
Figure 132:
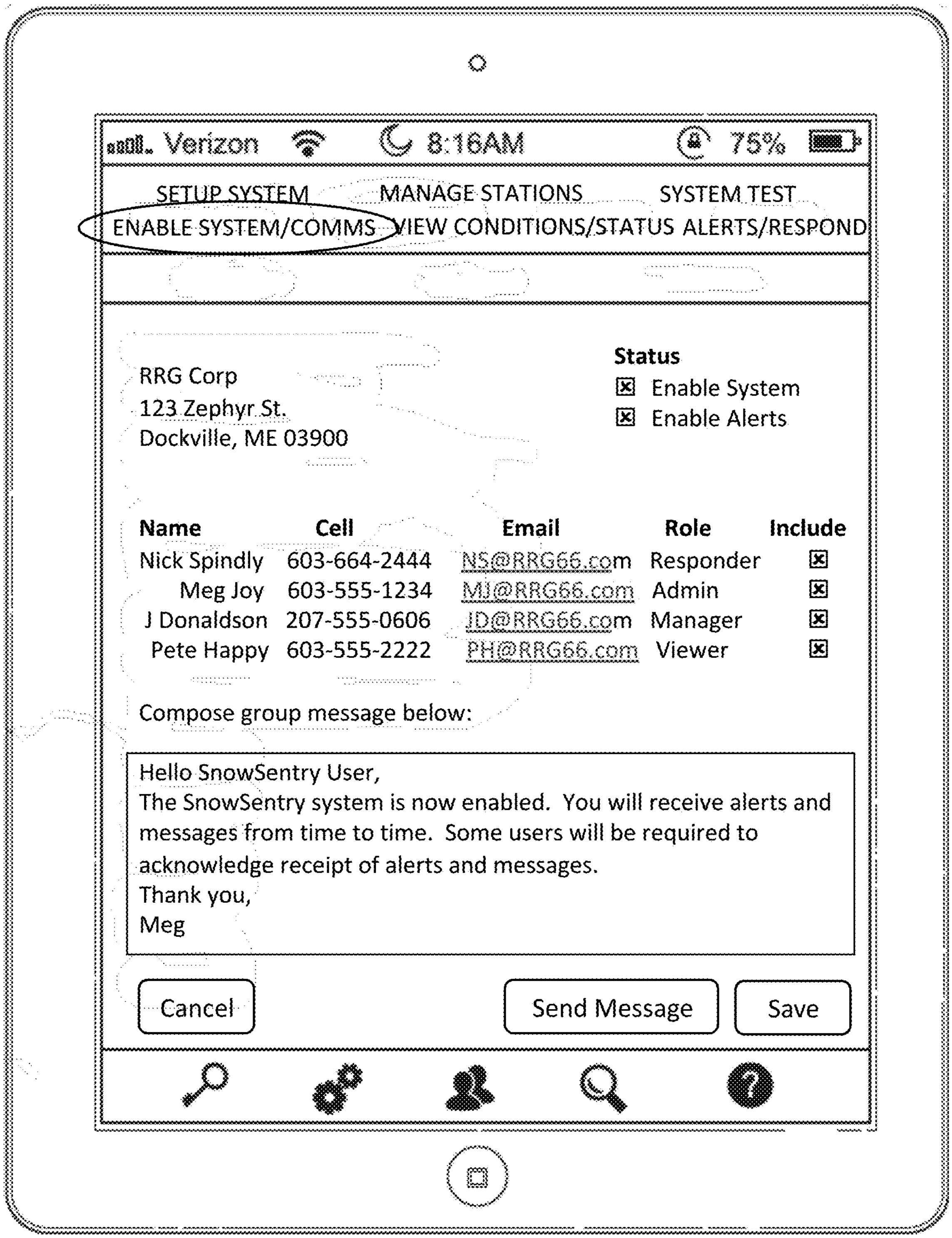
Figure 134:
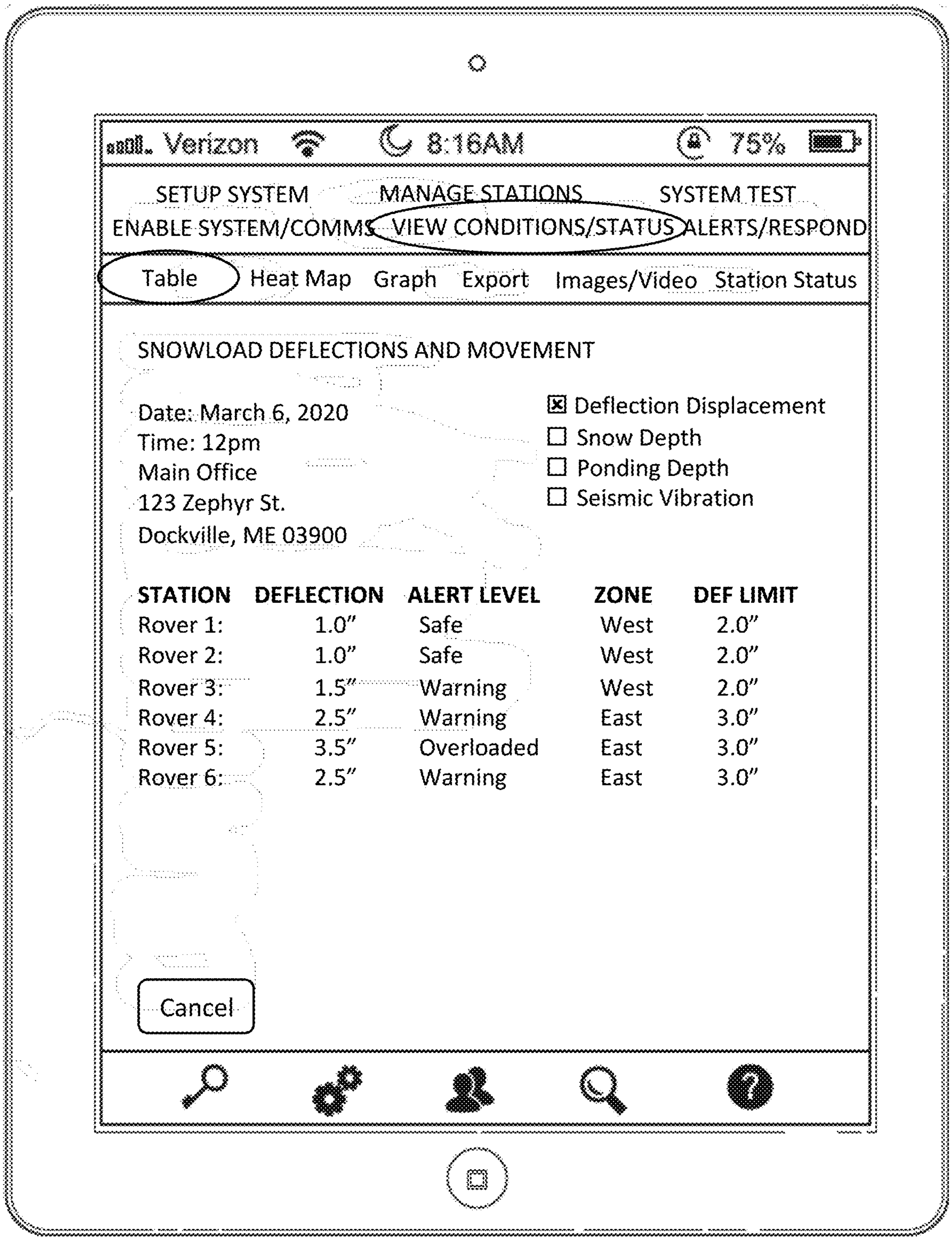
Figure 136:
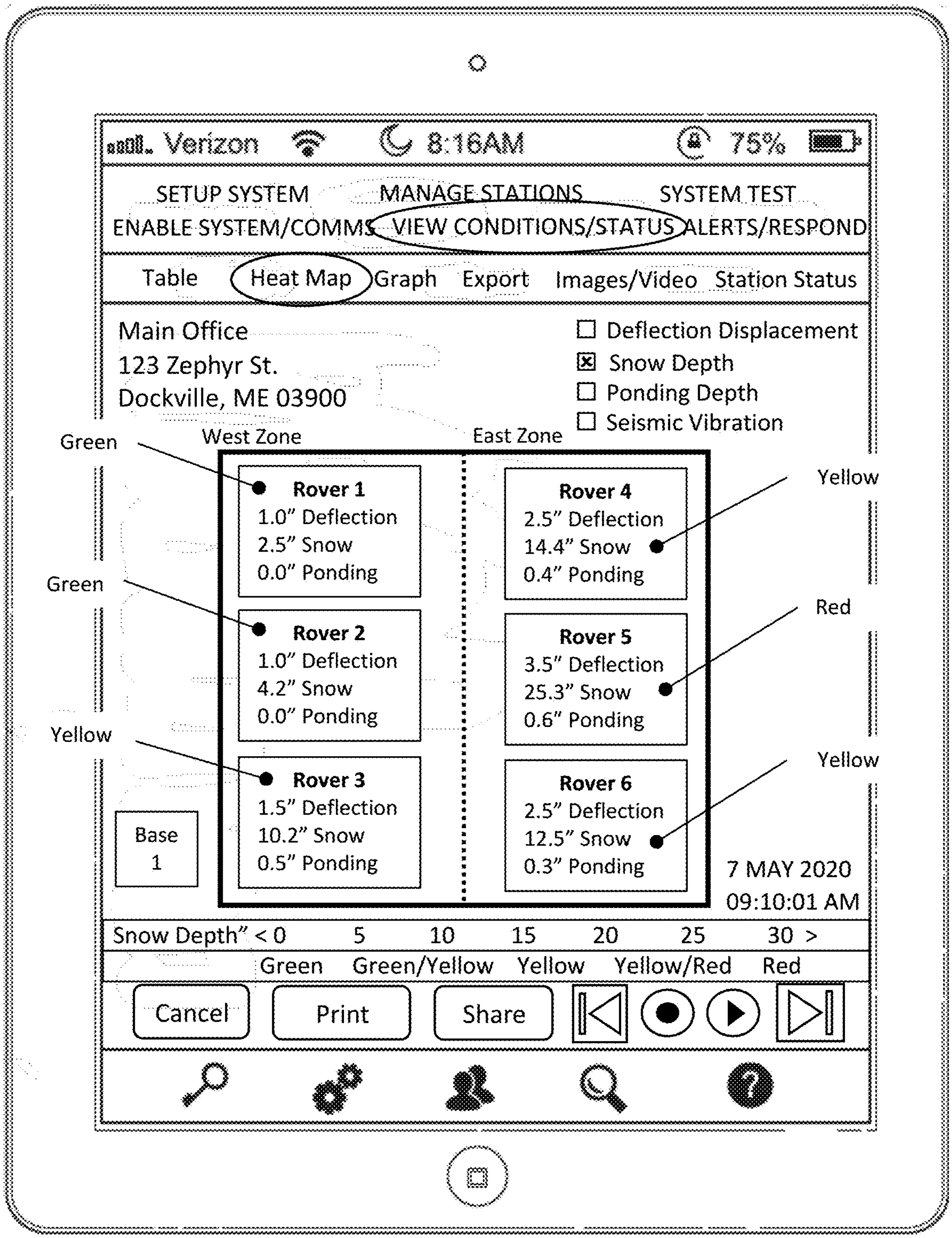
Figure 137:
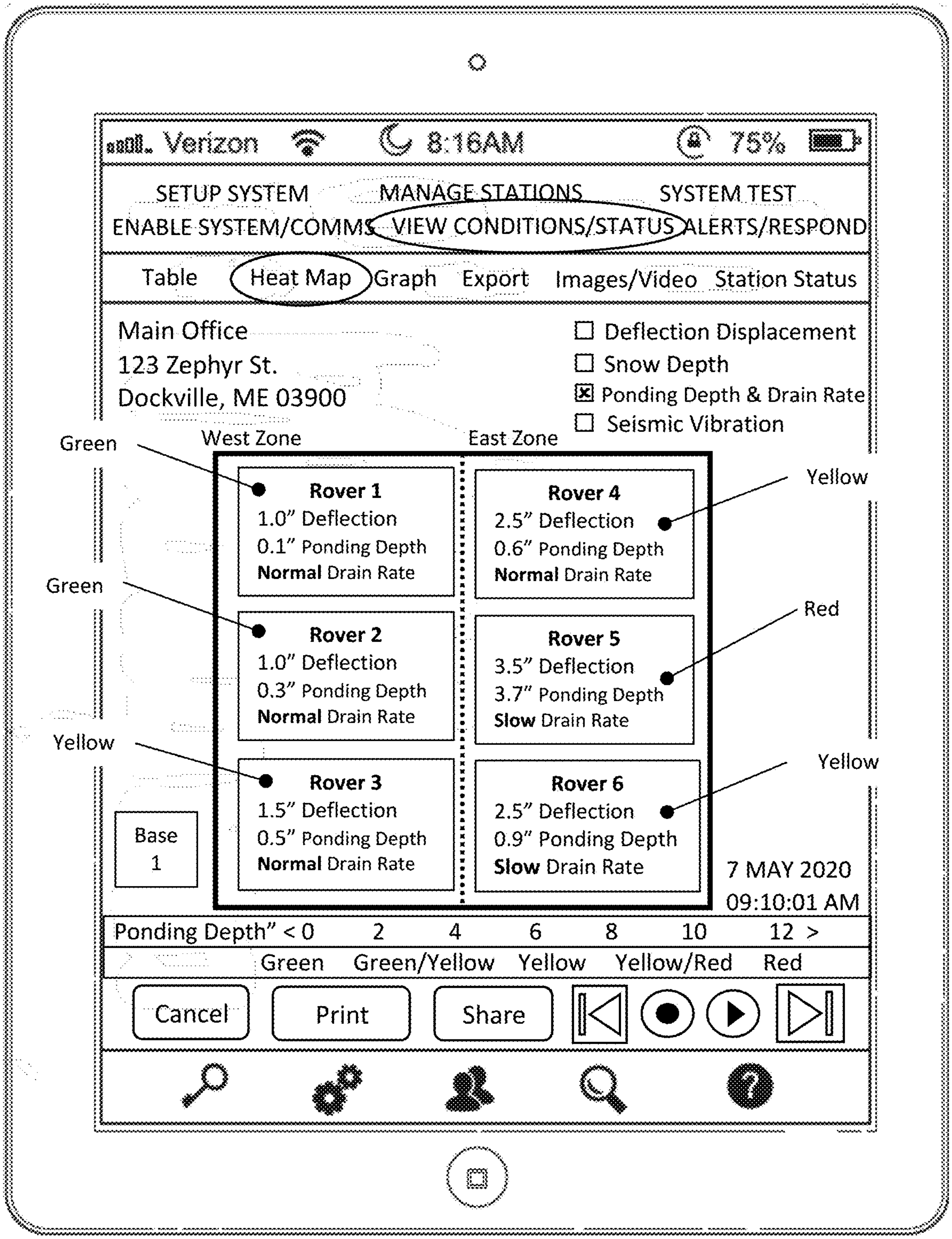
Figure 138:
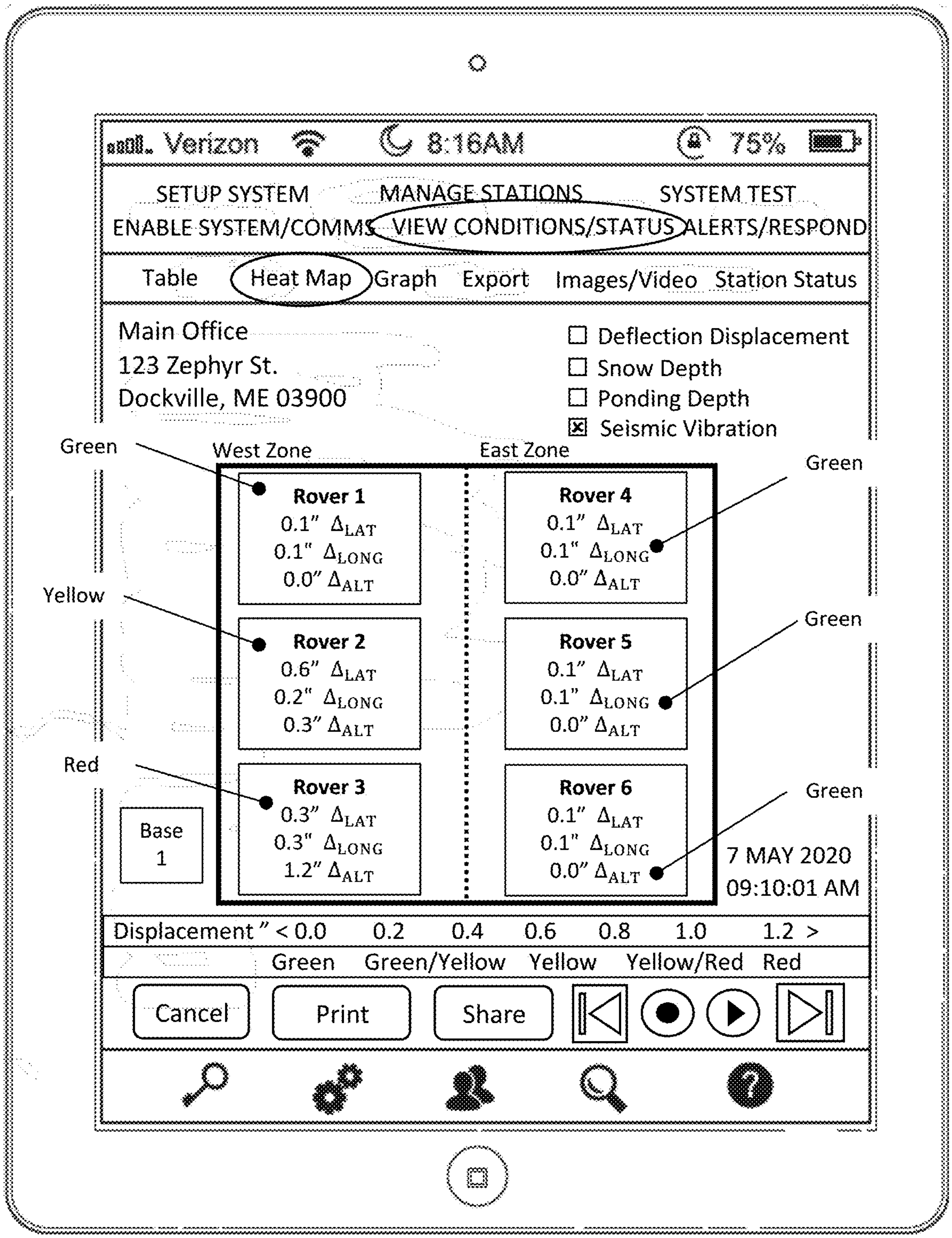
Figure 139:
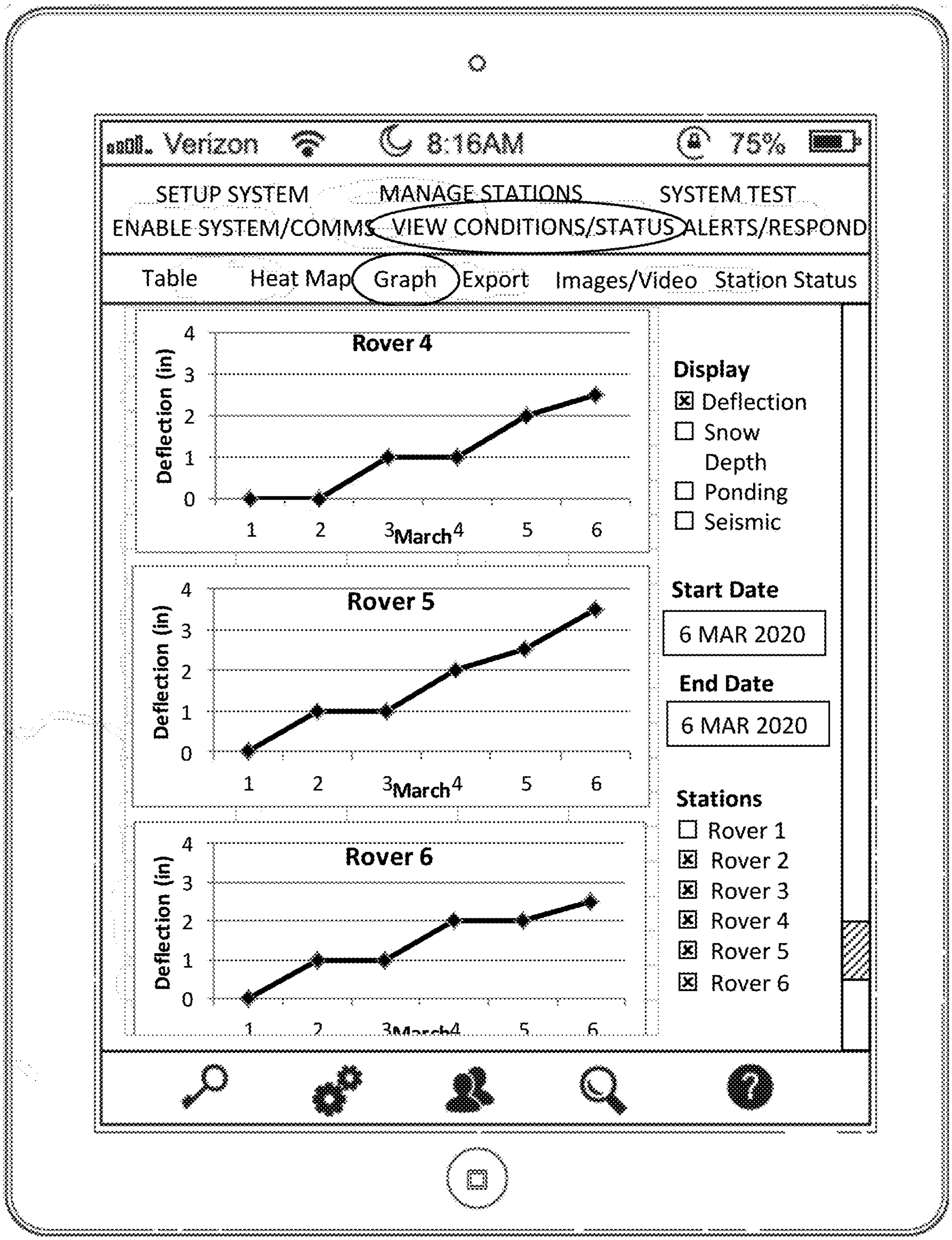
Figure 140:
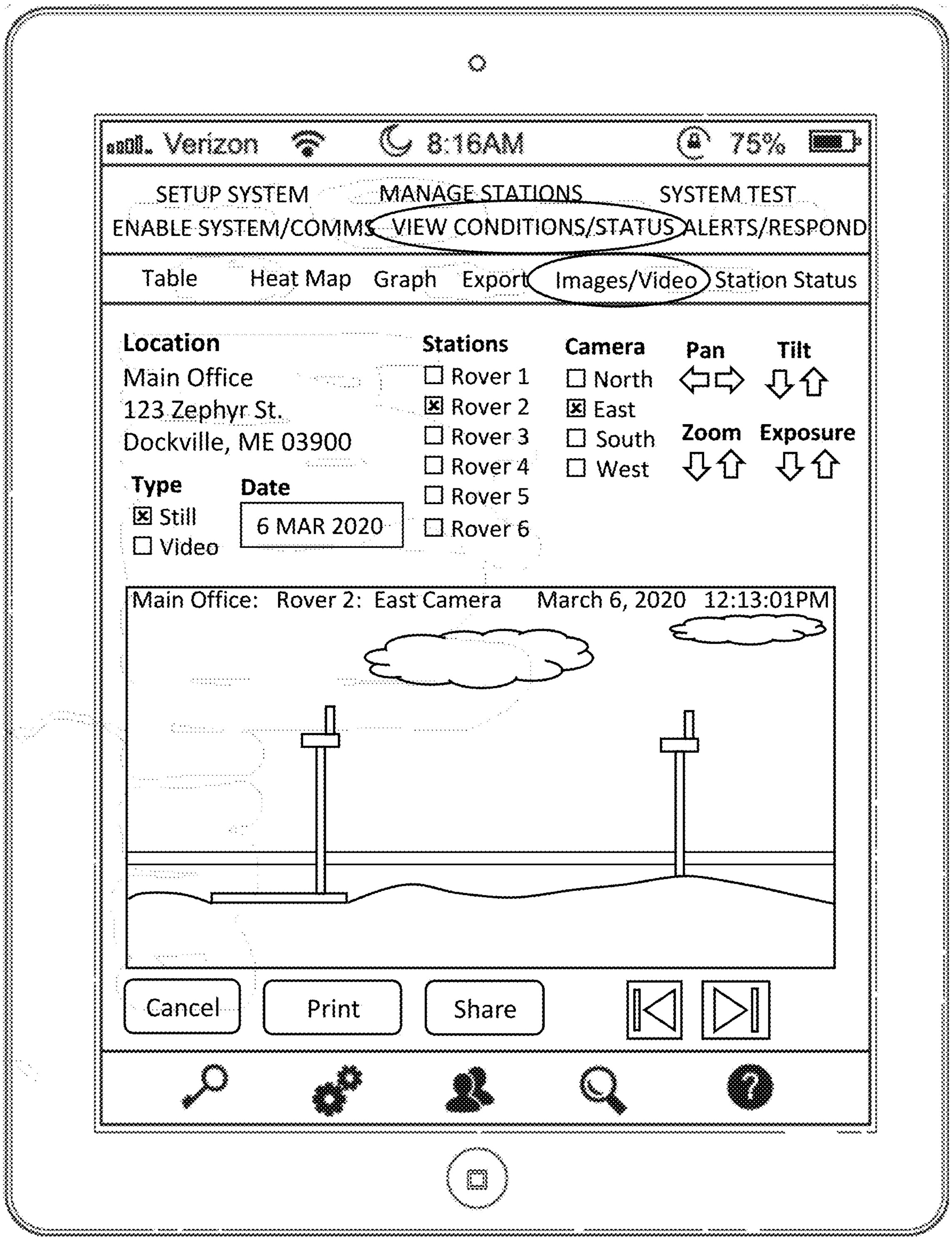
Figure 141:
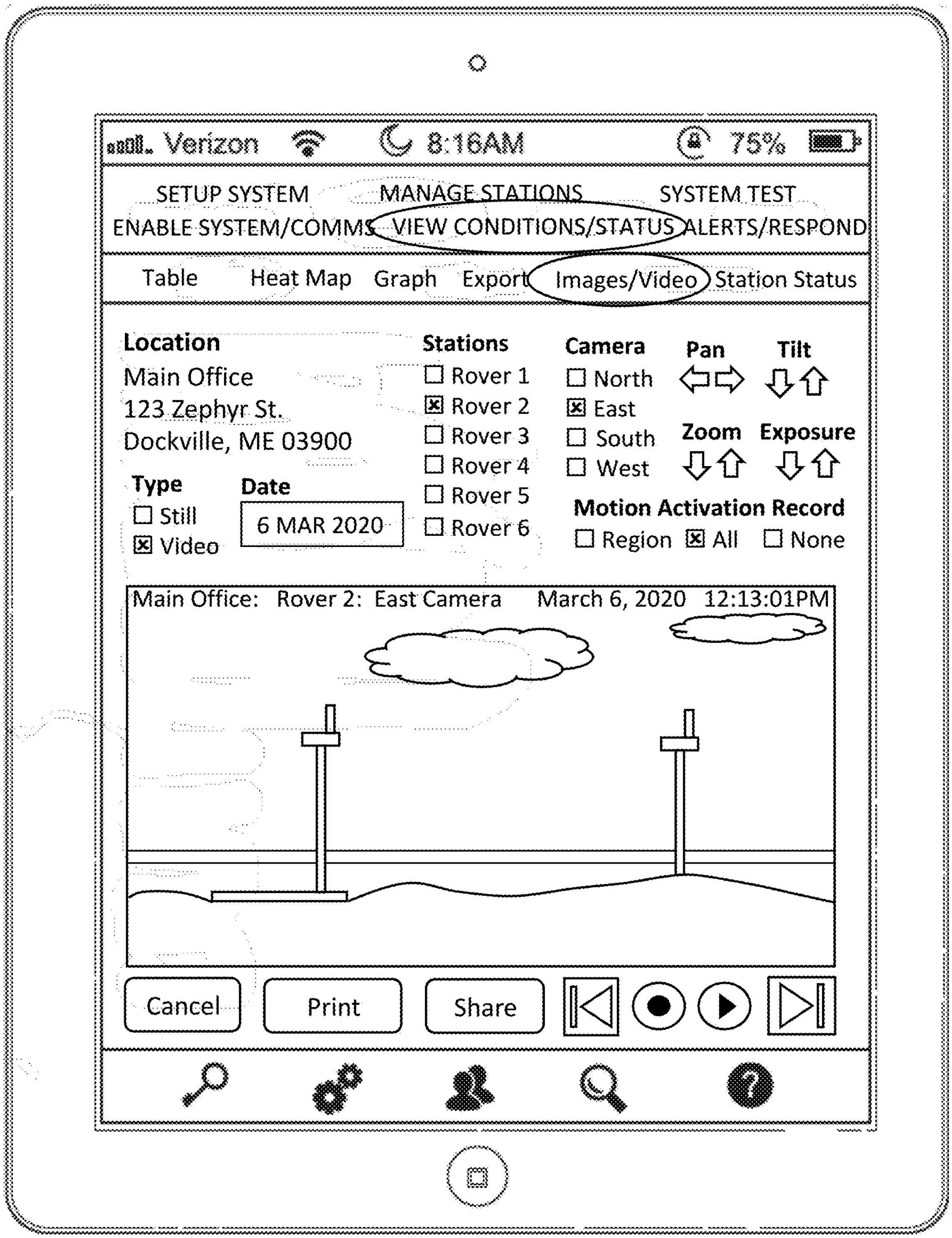
Figure 142:
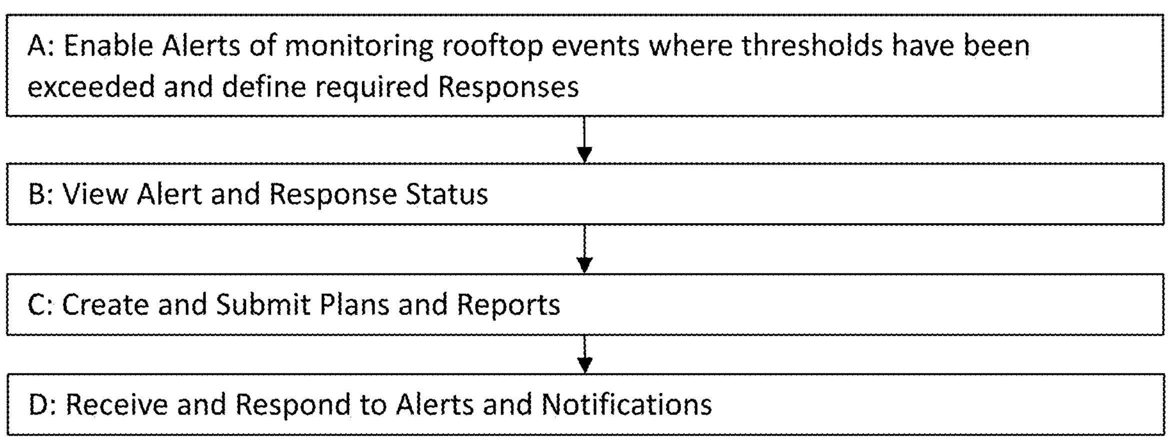
Figure 143:
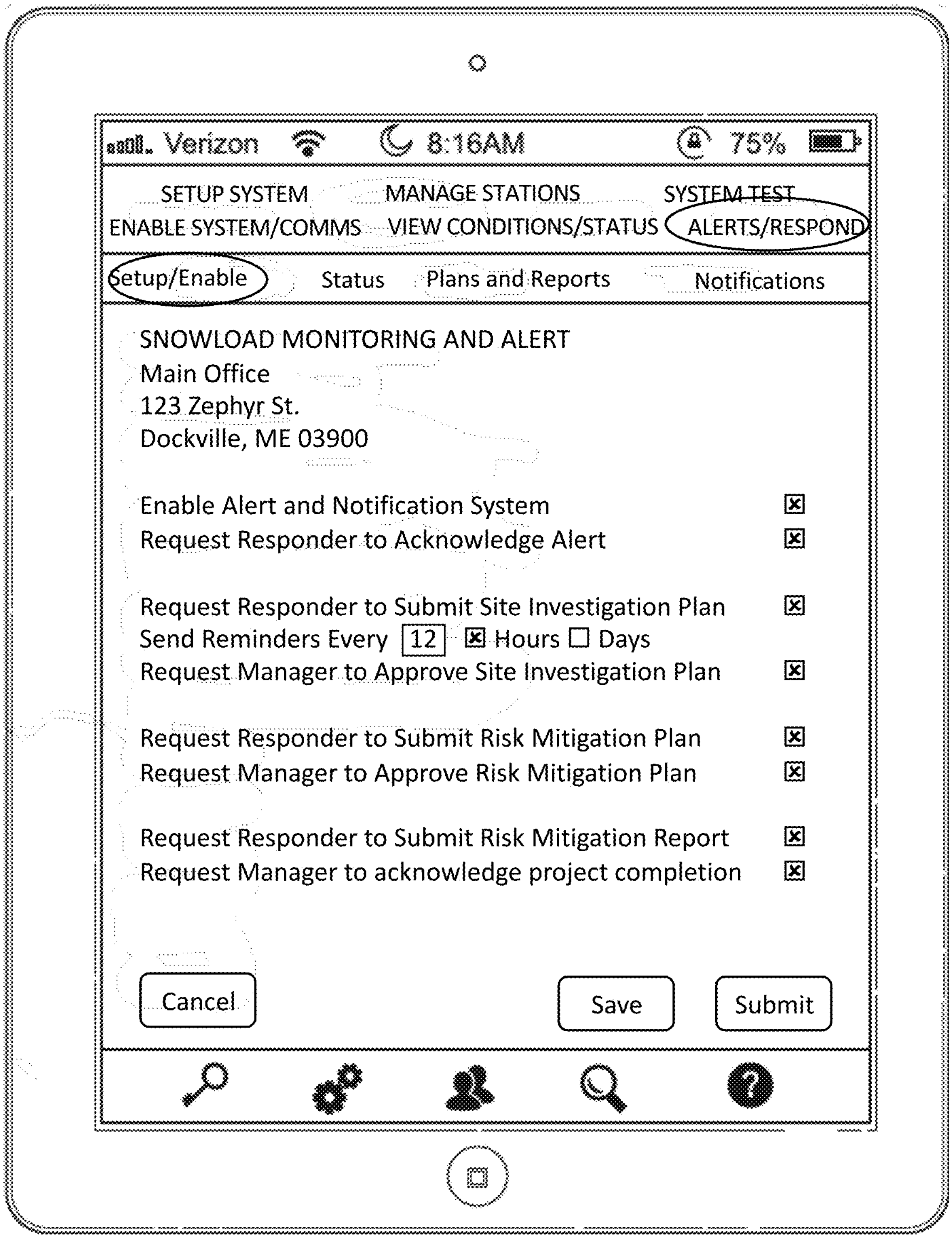
Figure 144:
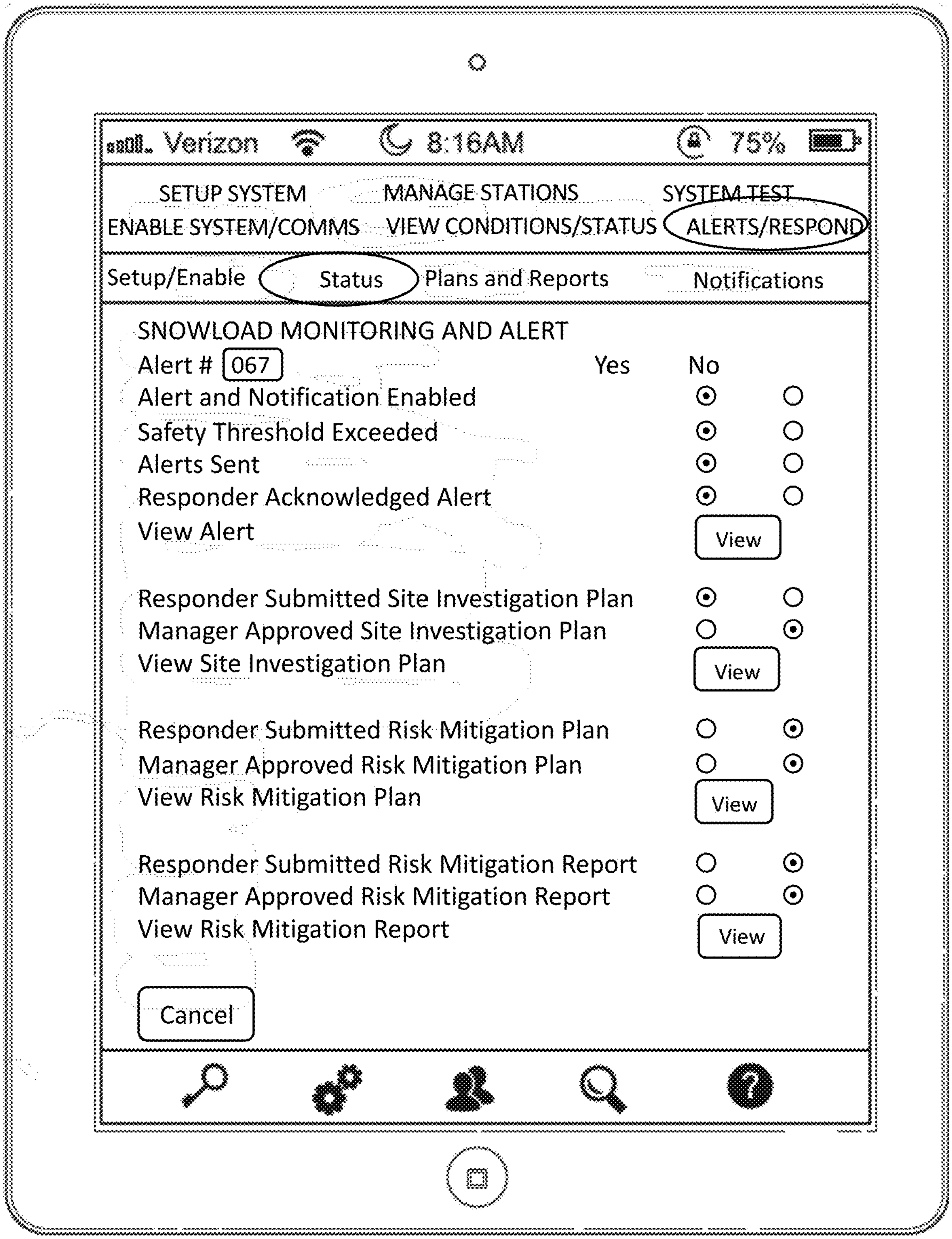
Figure 145:
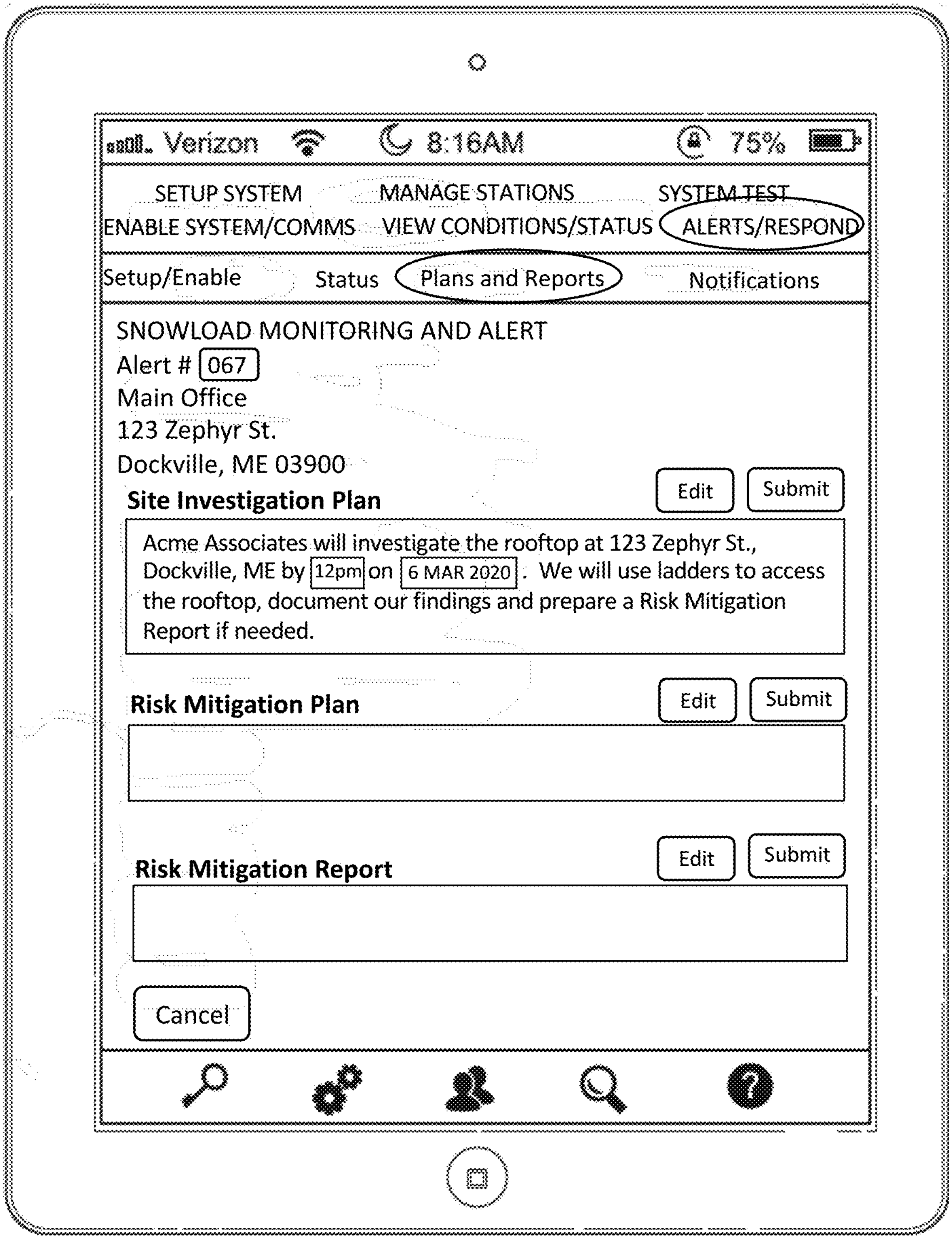
Figure 146:
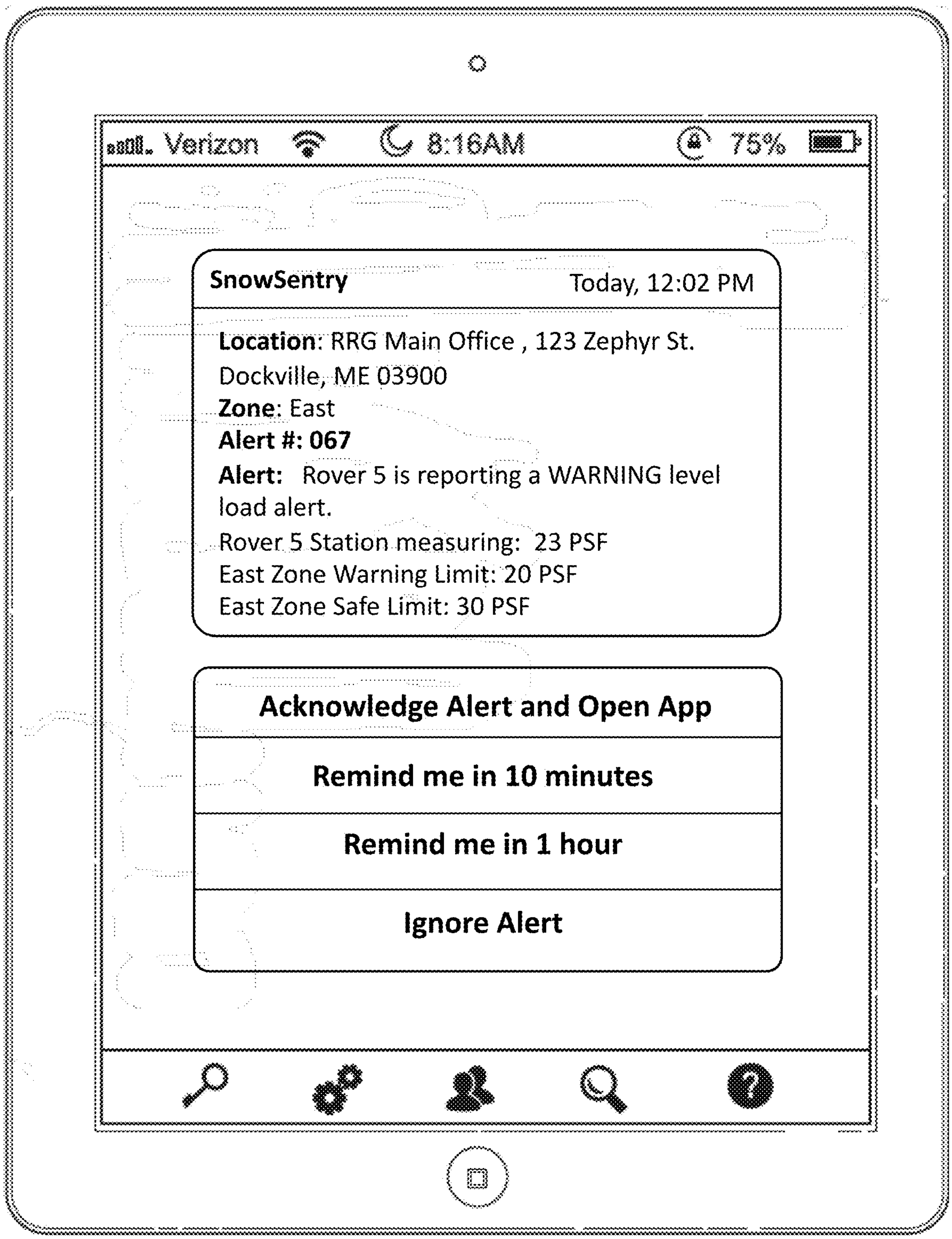
Figure 147:
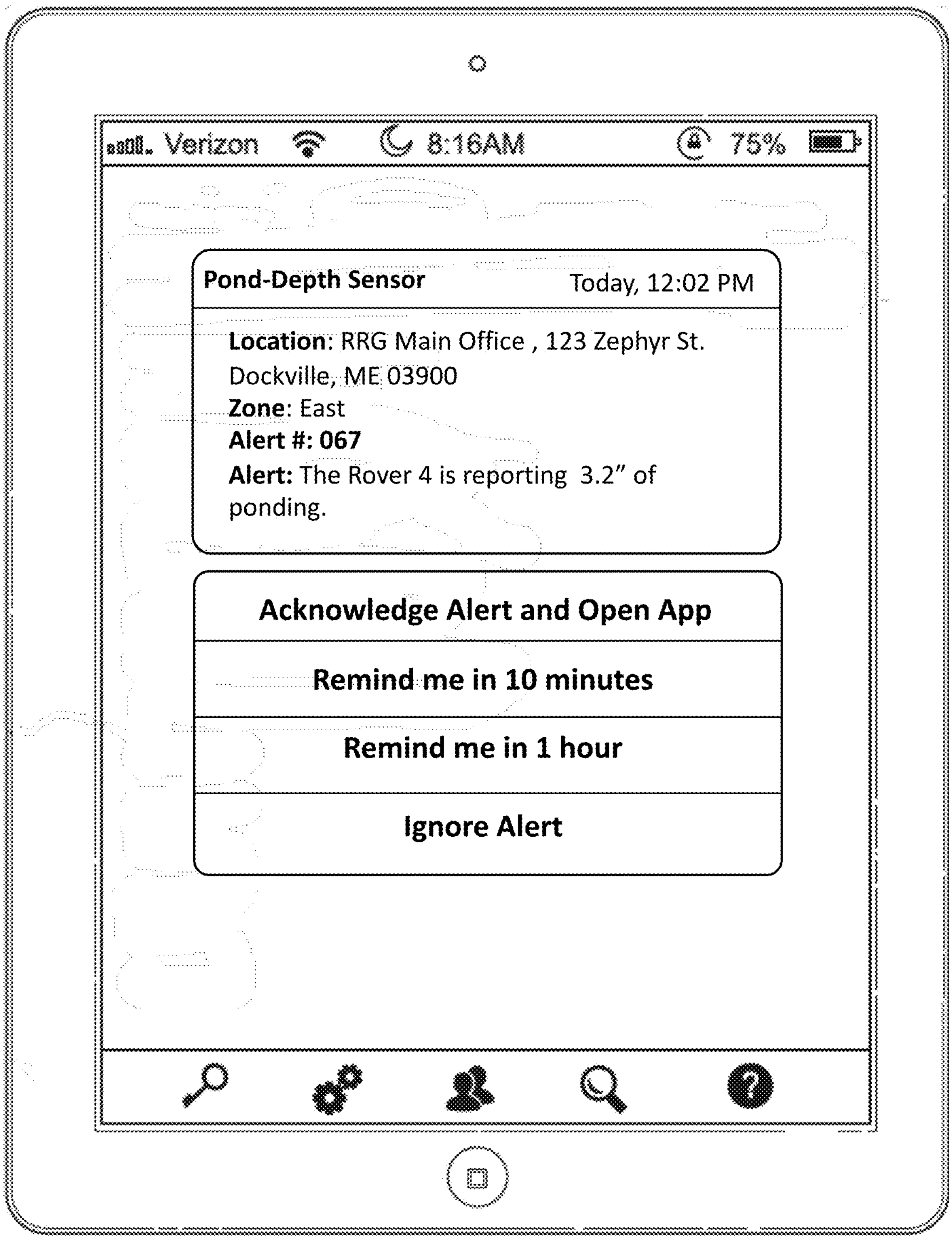
Figure 148:
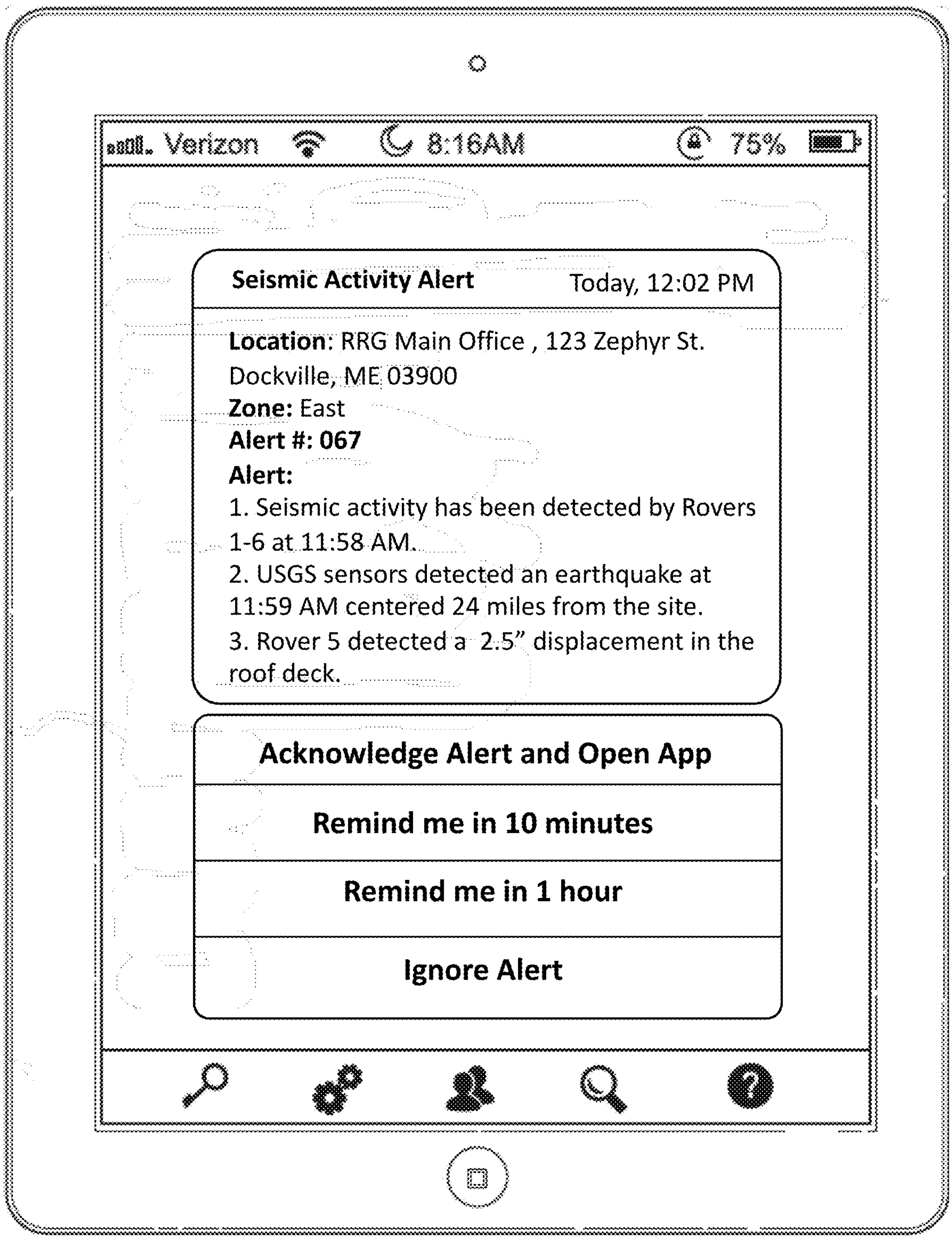
Figure 149:
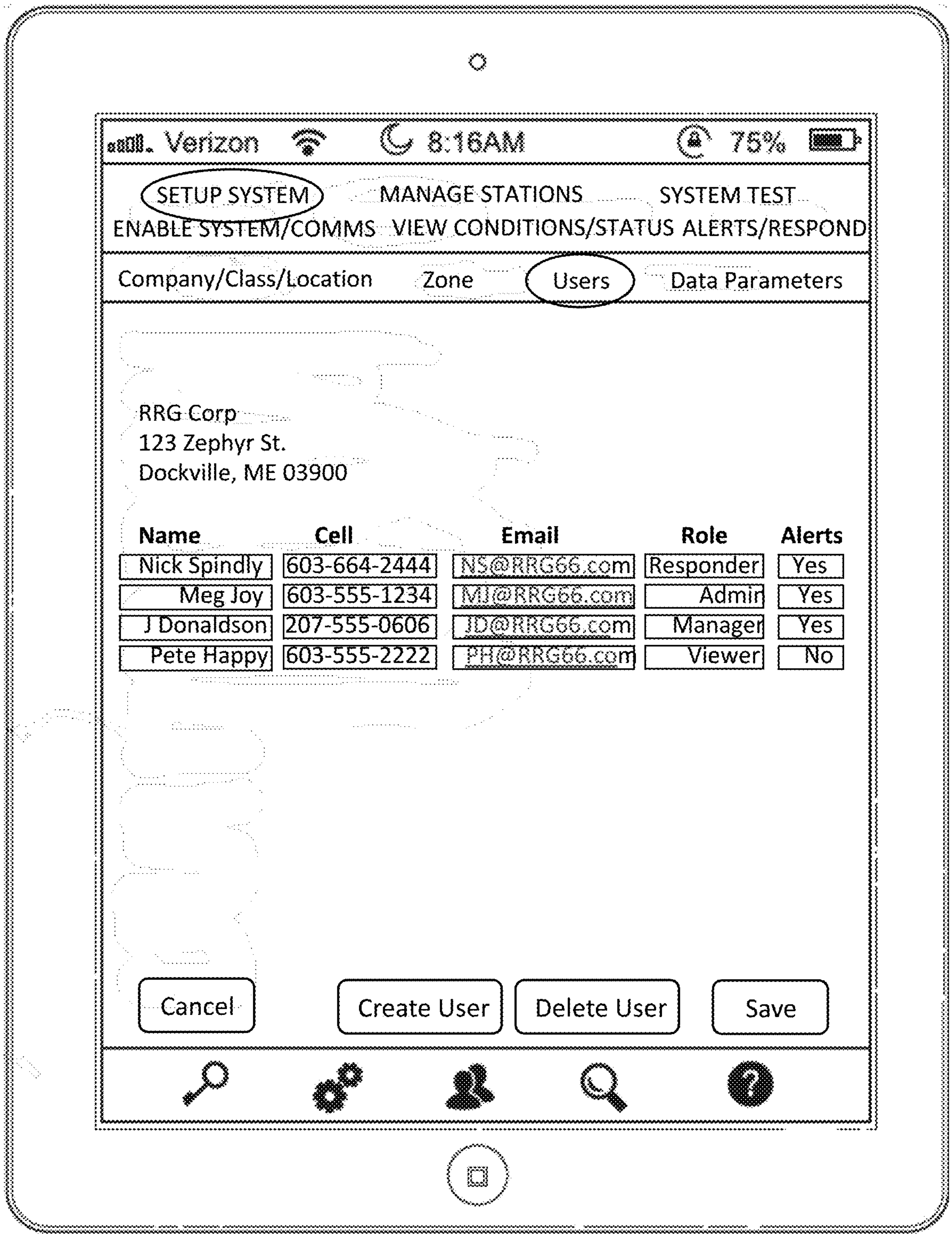
Figure 151:
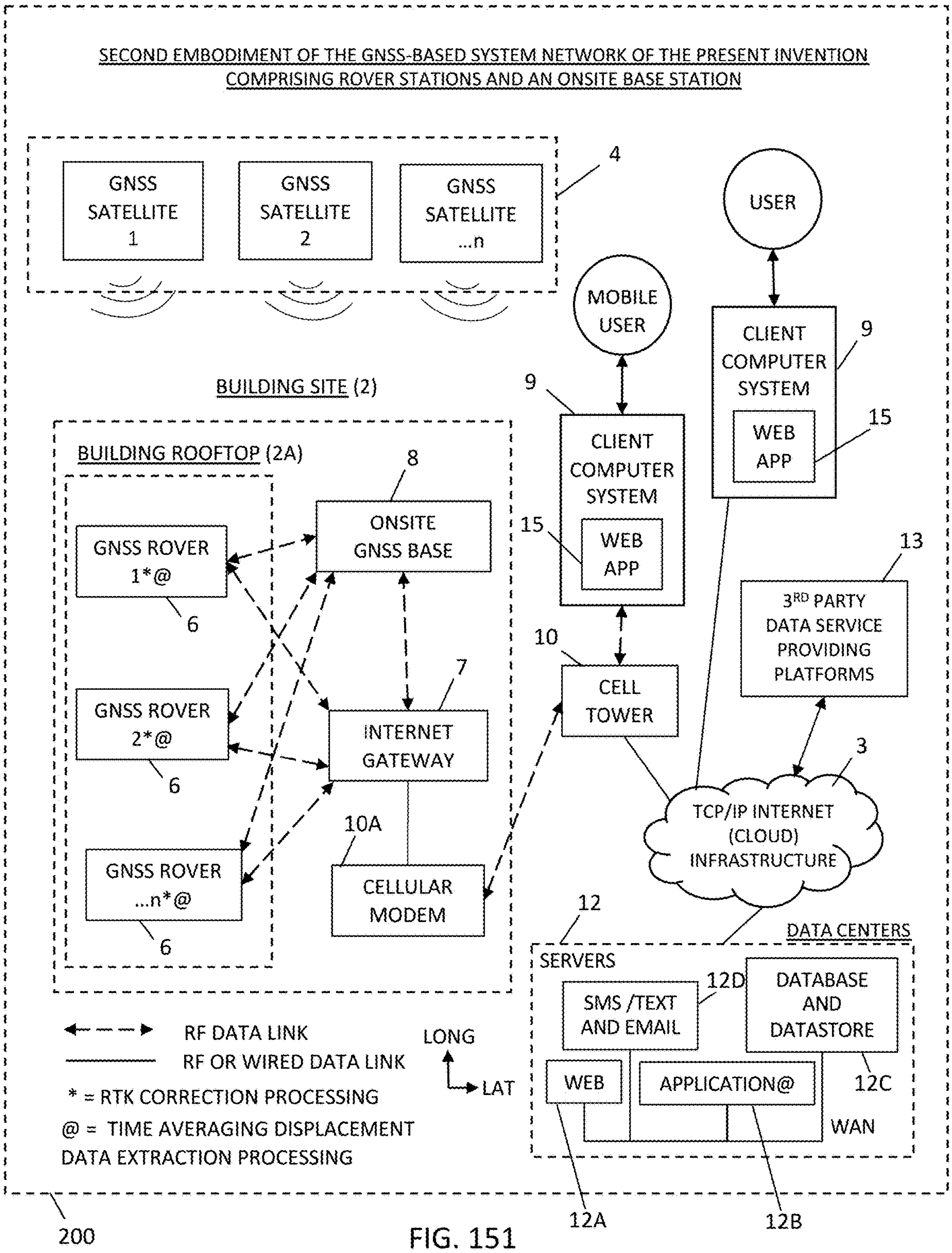
Figure 152:
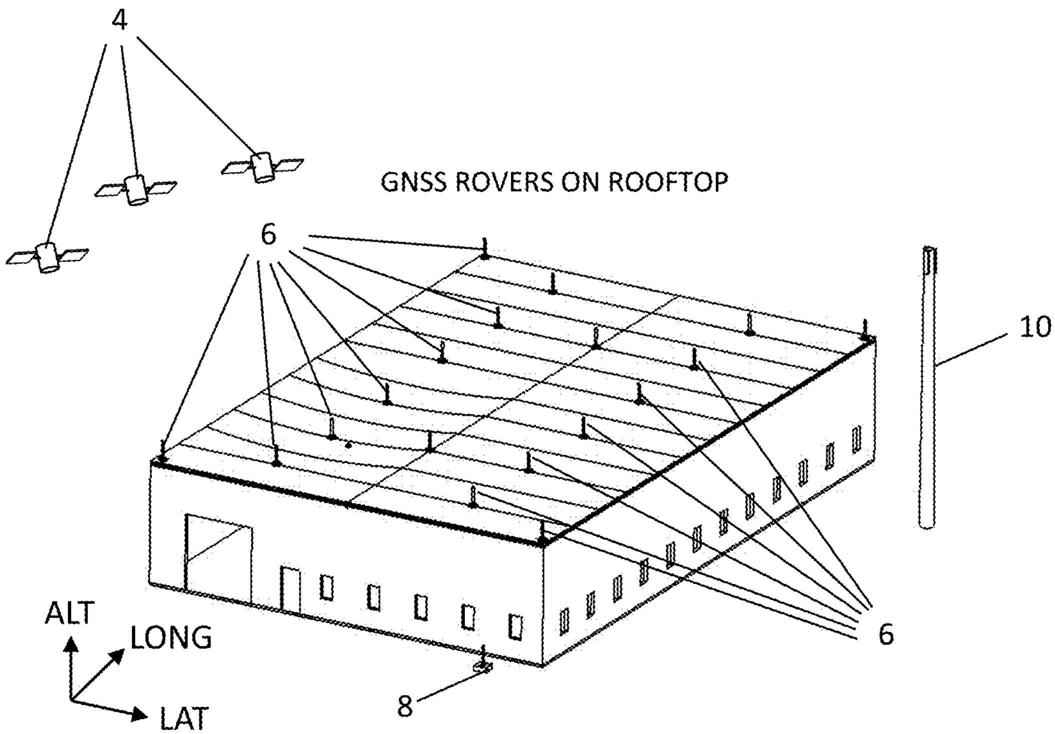
Figure 153:
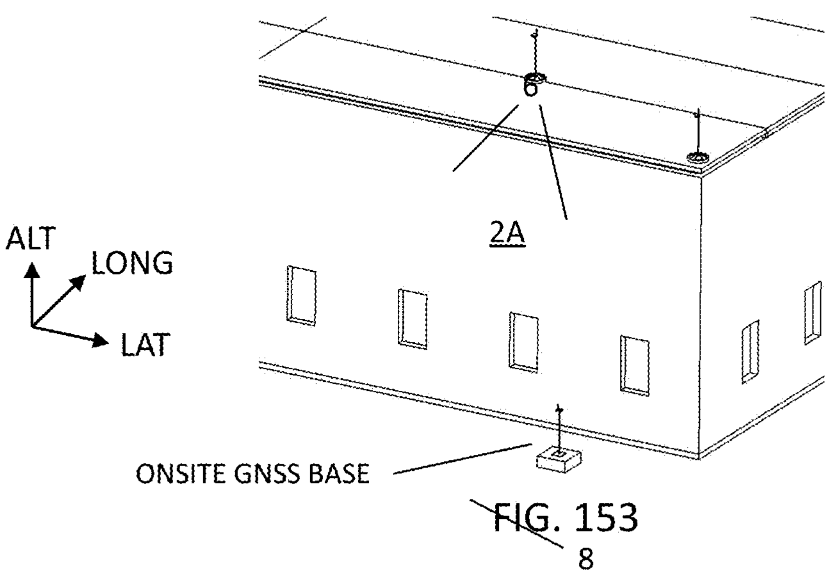
Figure 155:
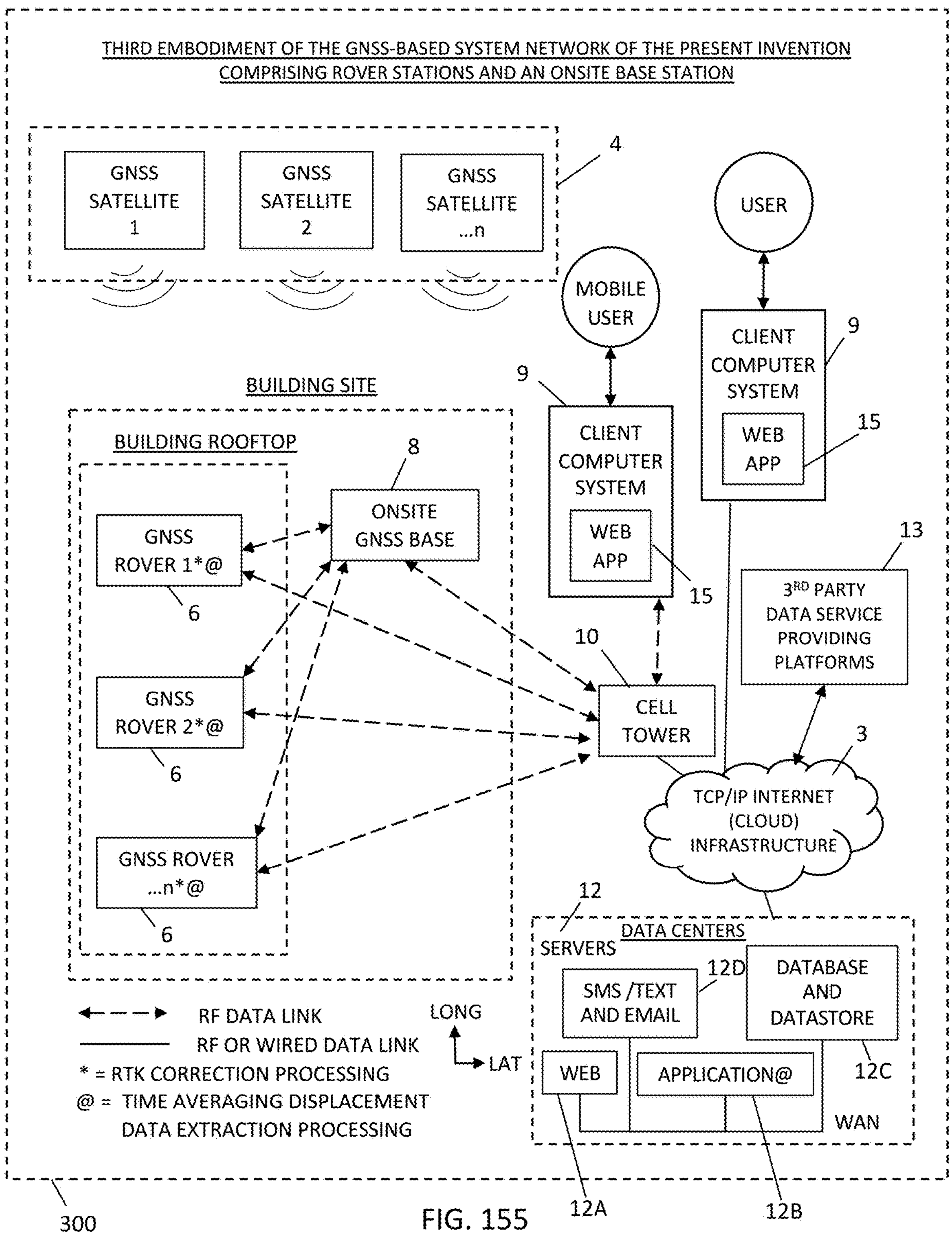
Figure 156:
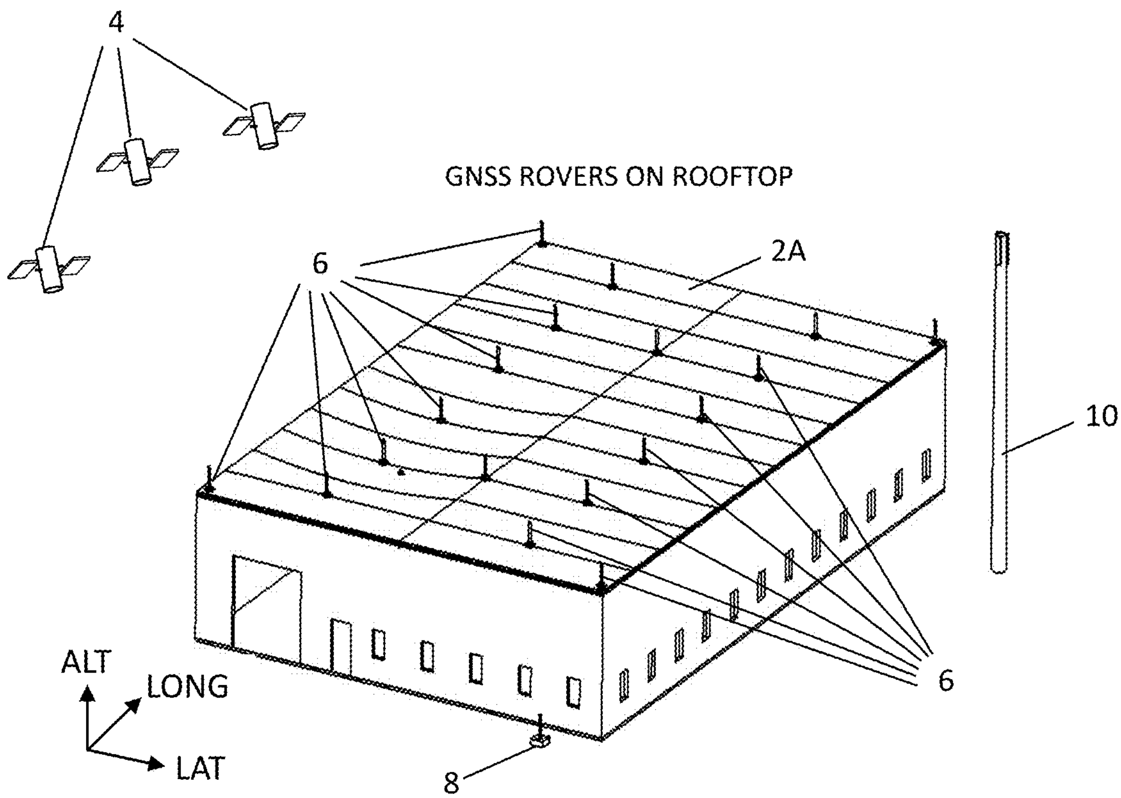
Figure 157:
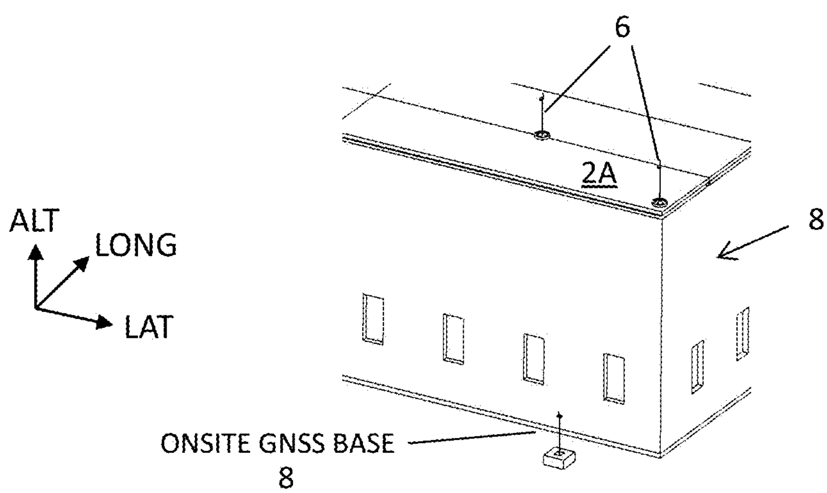
Figure 159:
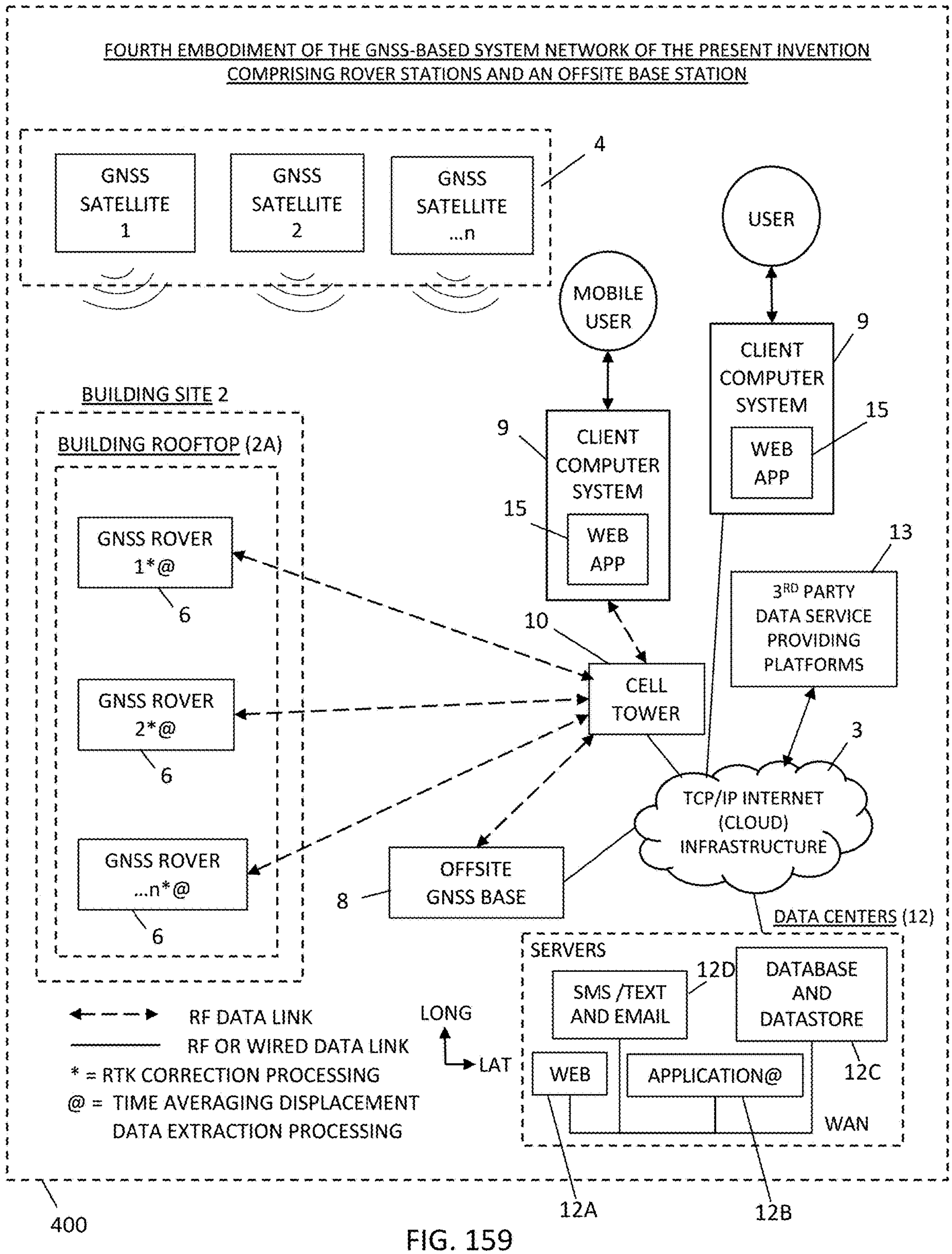
Figure 160:
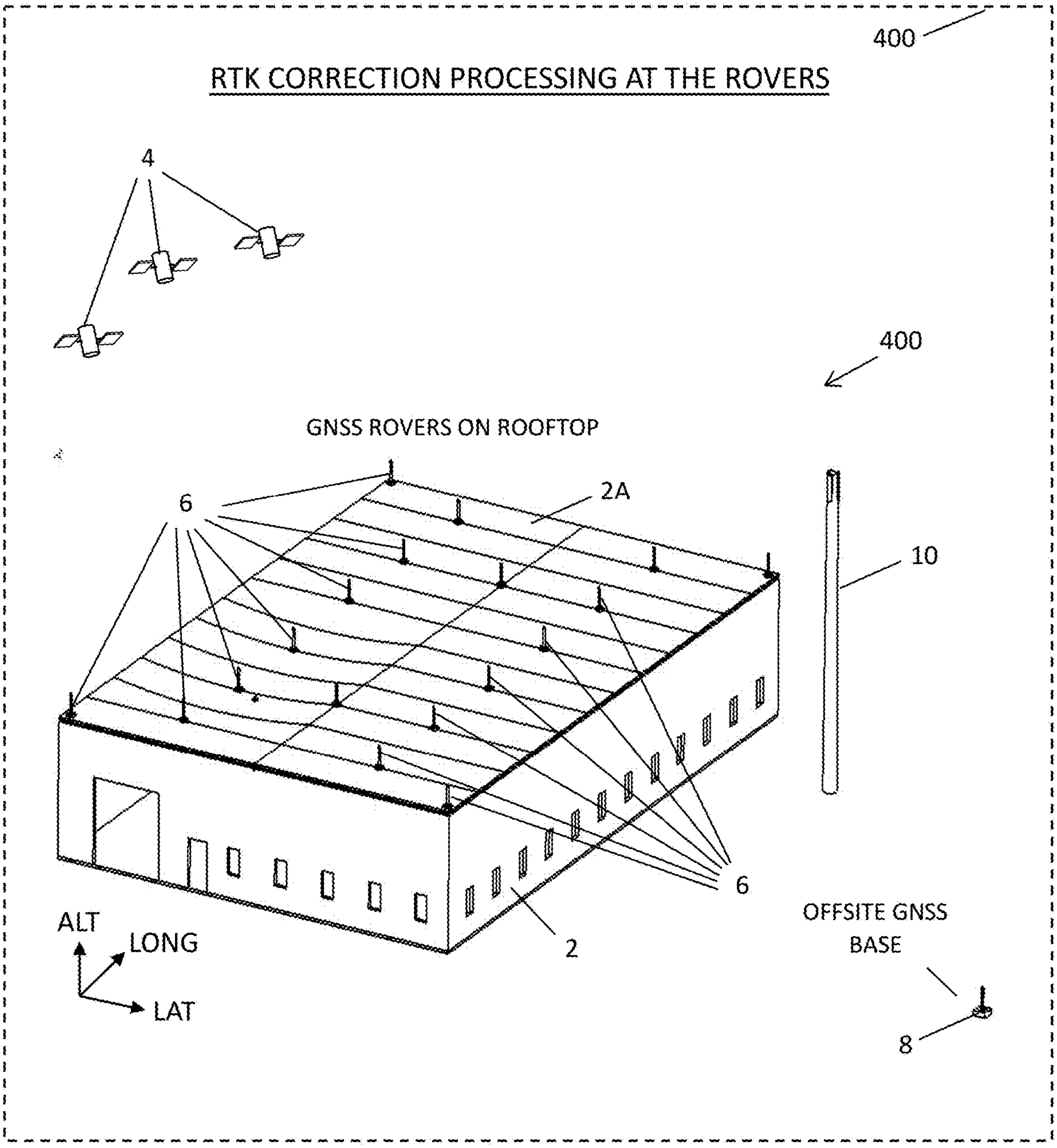
Figure 162:
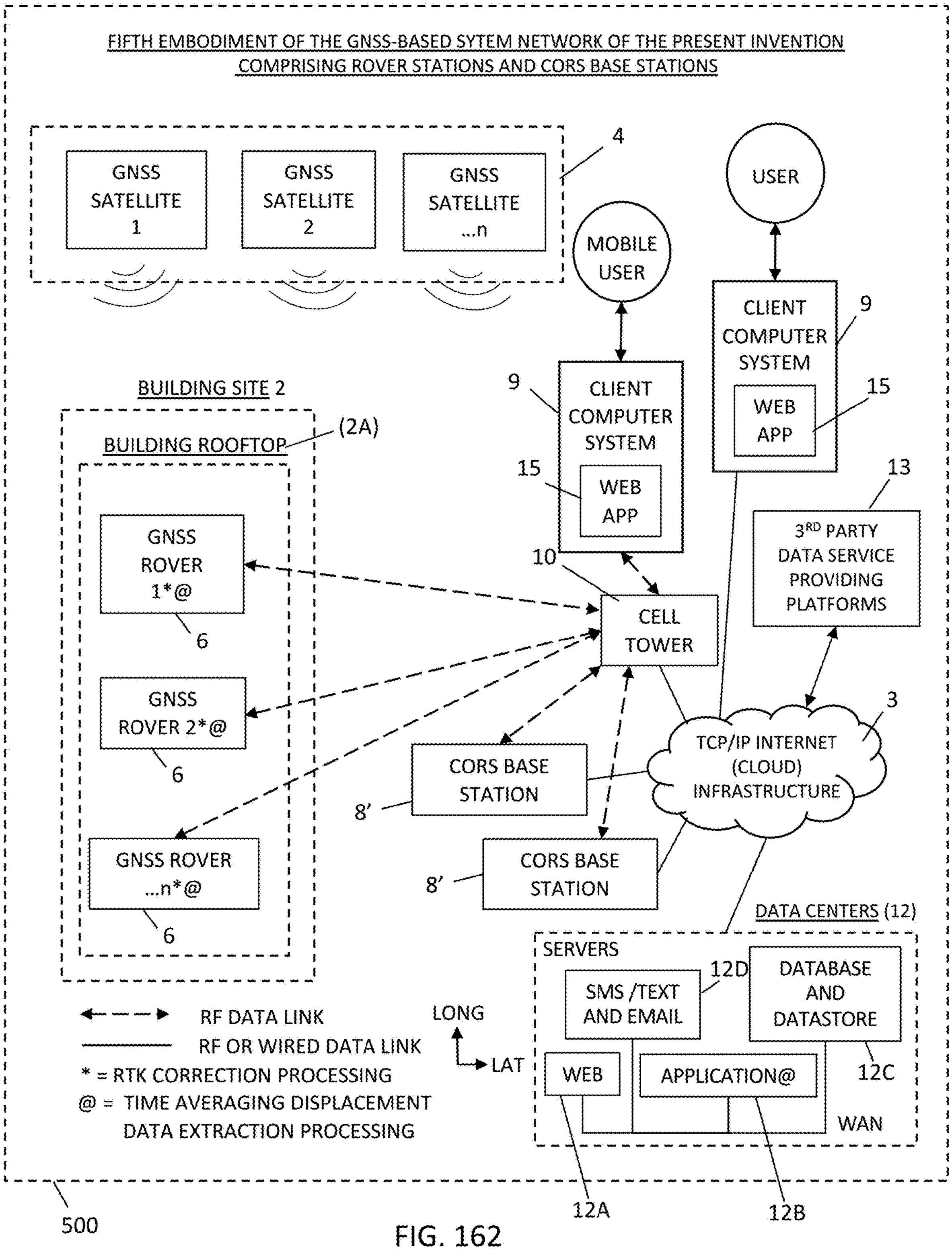
Figure 163:
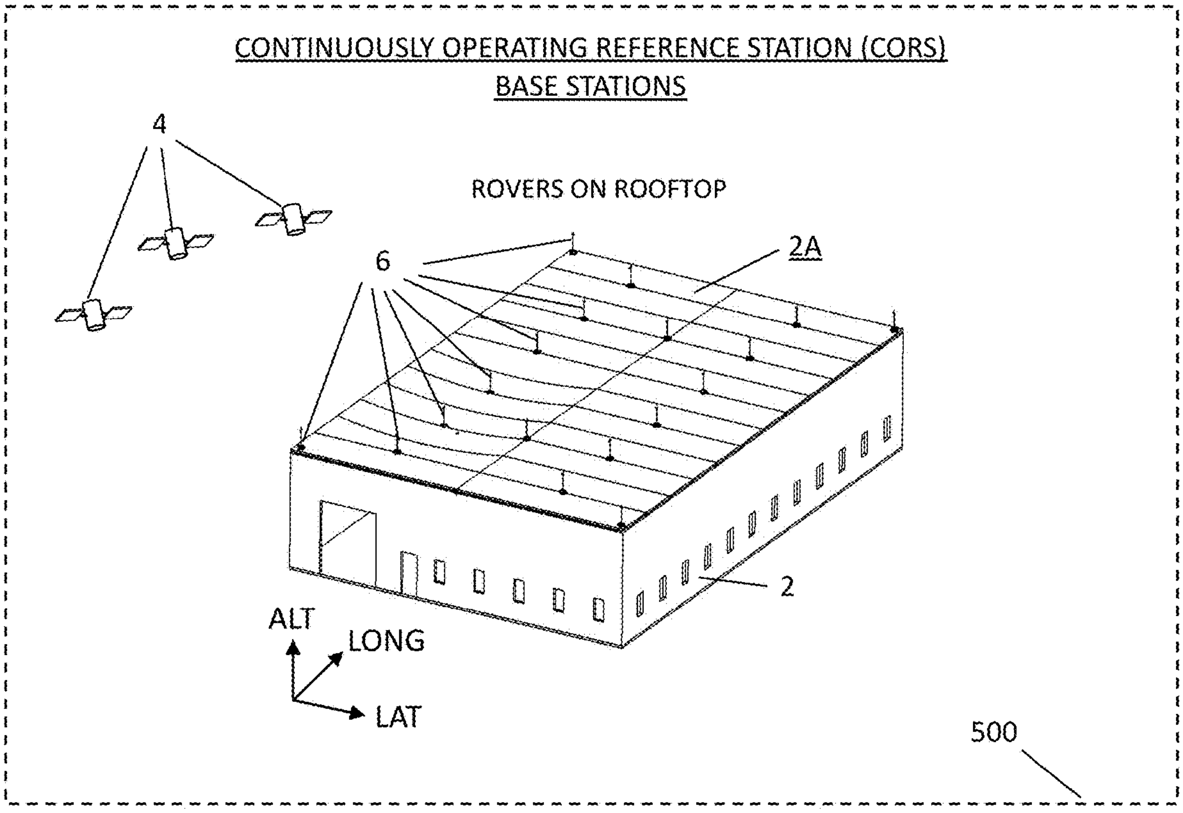
Figure 164:
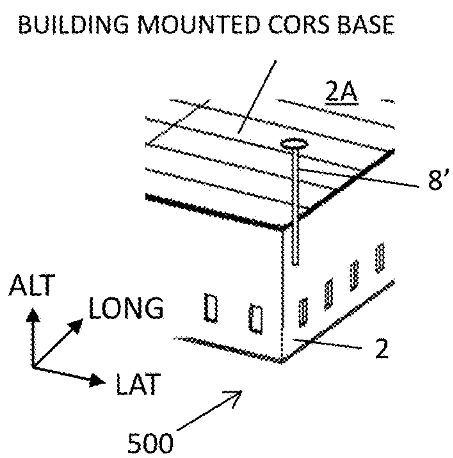
Figure 165:
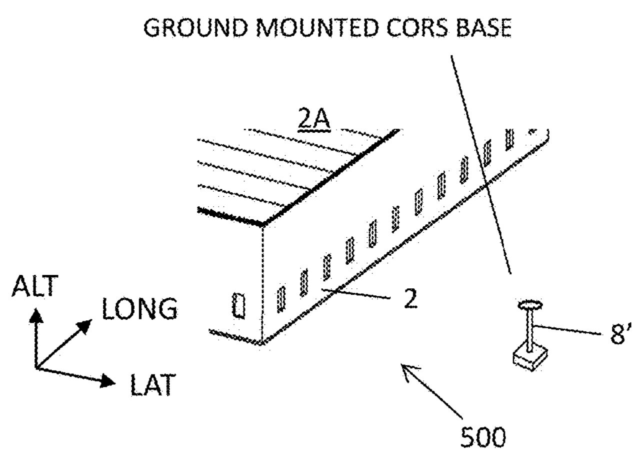
Figure 167:
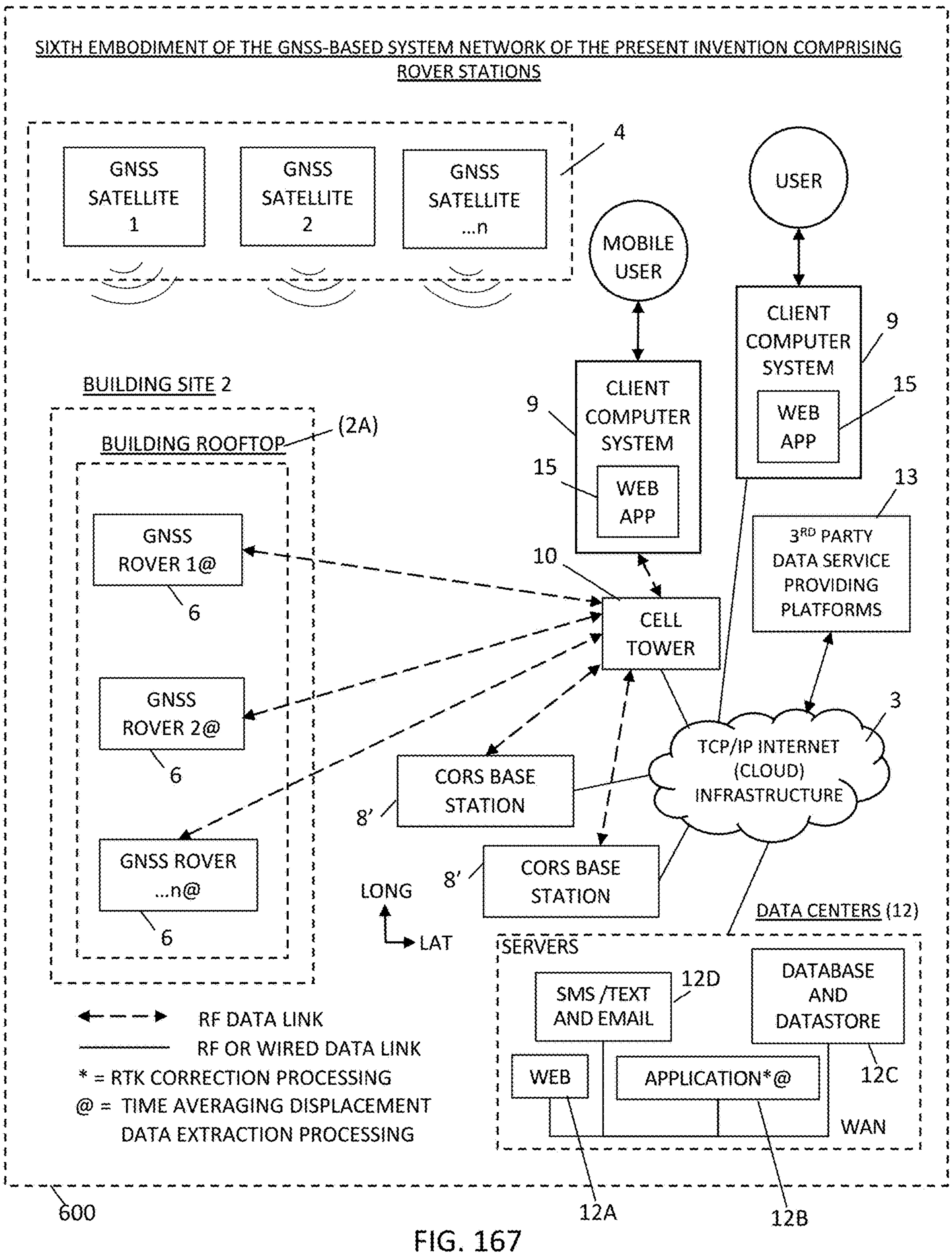
Figure 168:
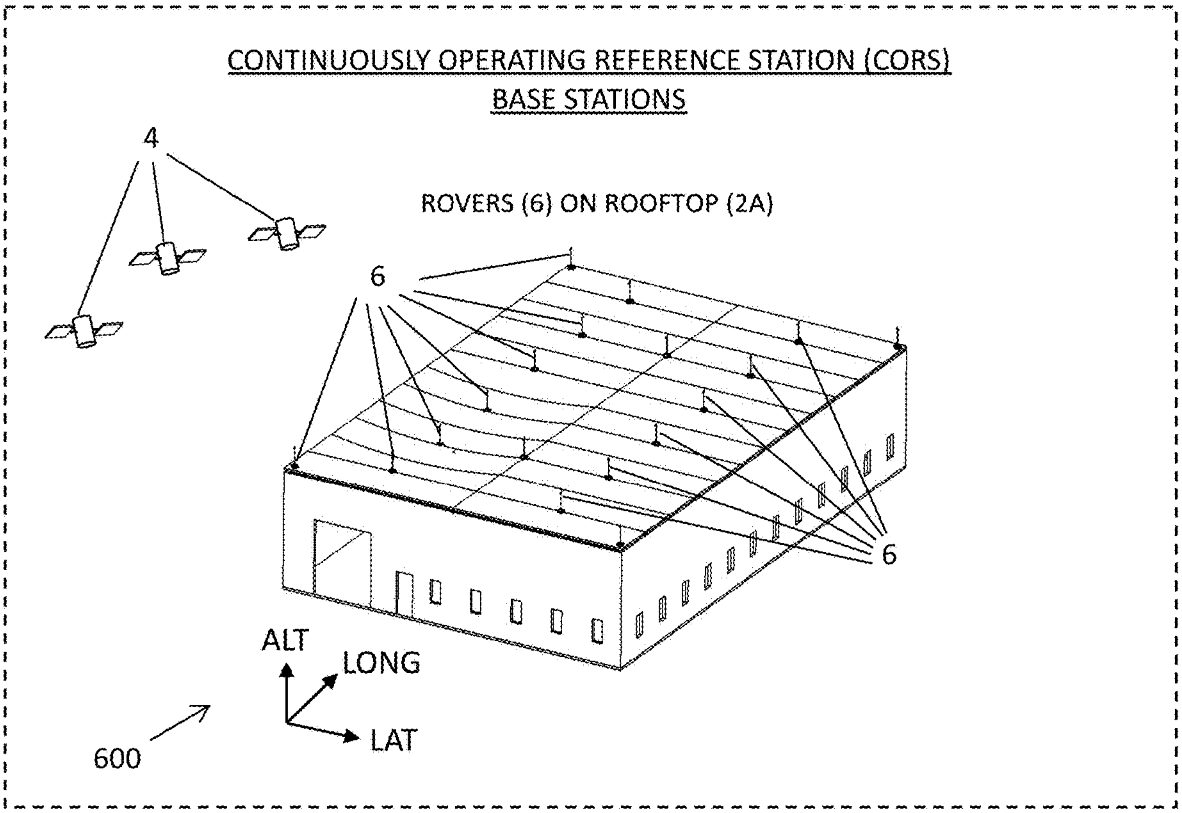
Figure 169:
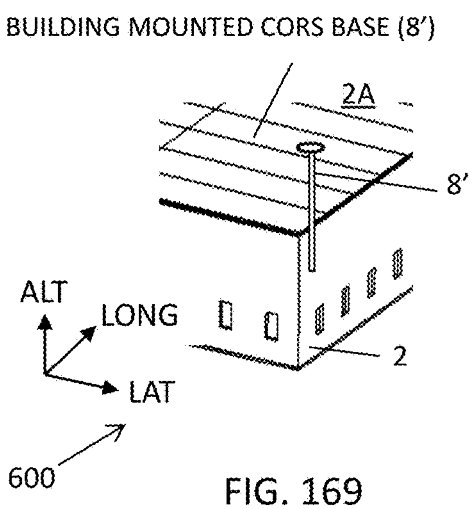
Figure 170:
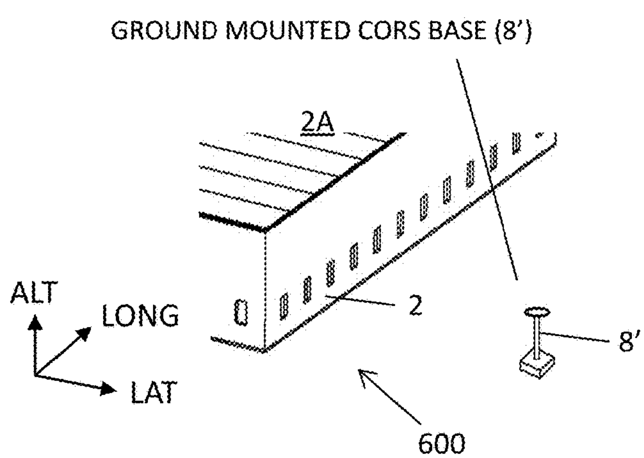
Figure 171B:
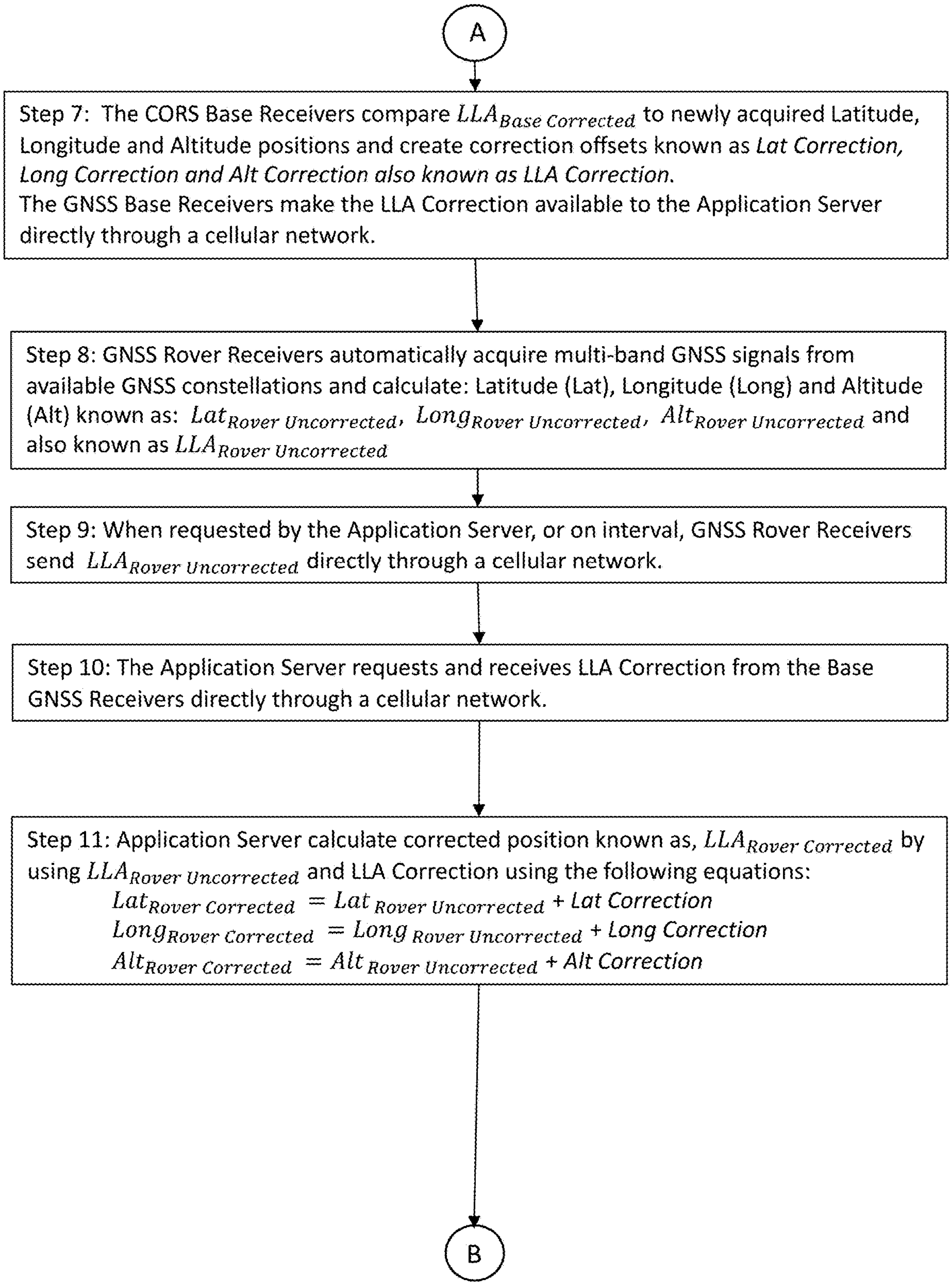
Figure 172:
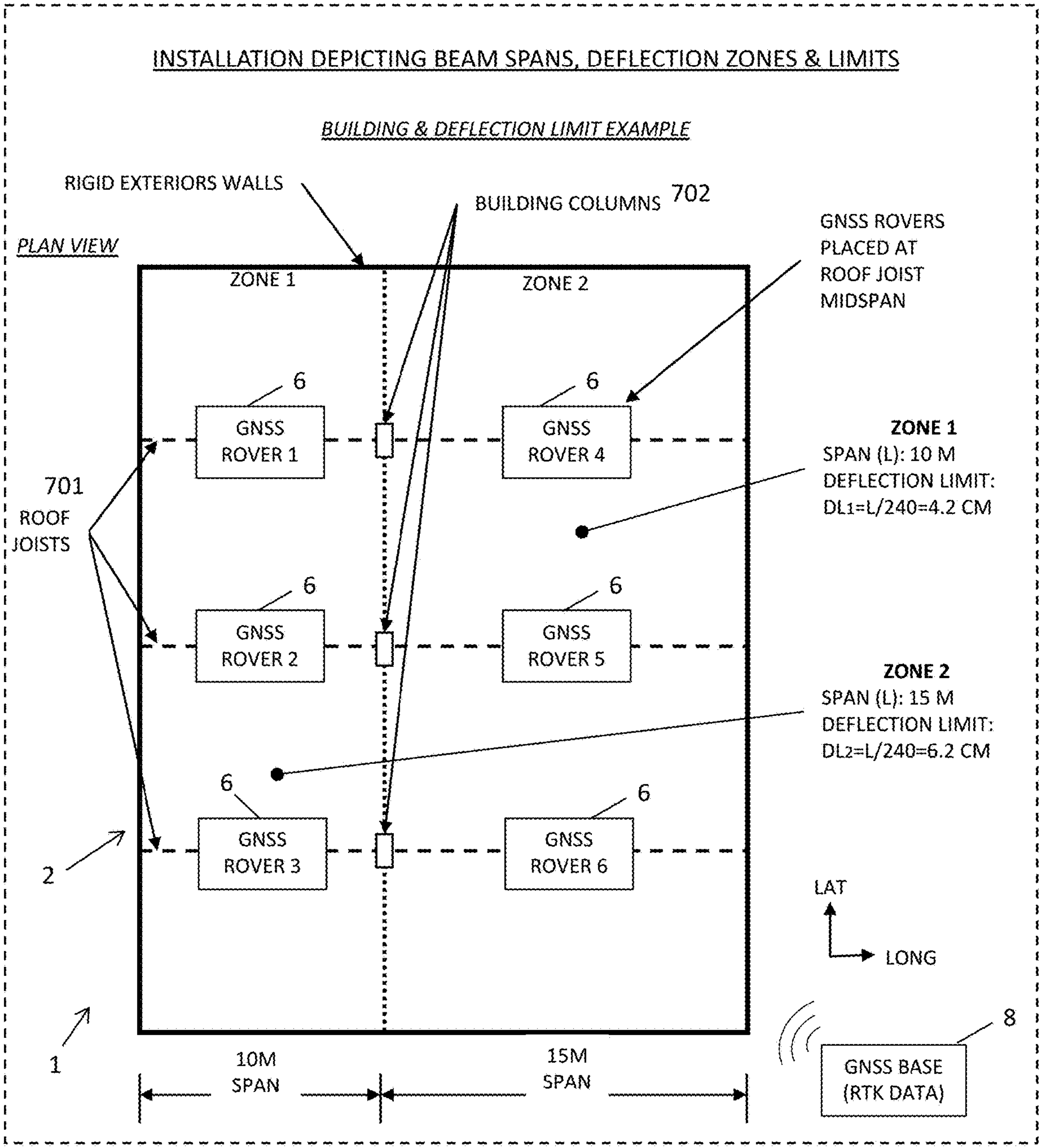
Figure 173:
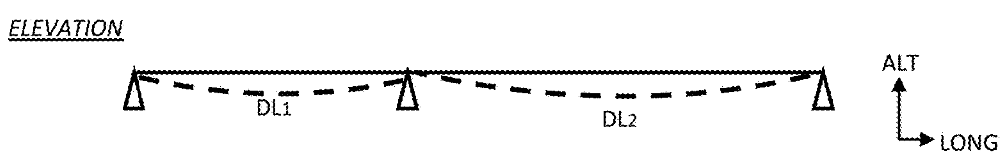
Figure 174:
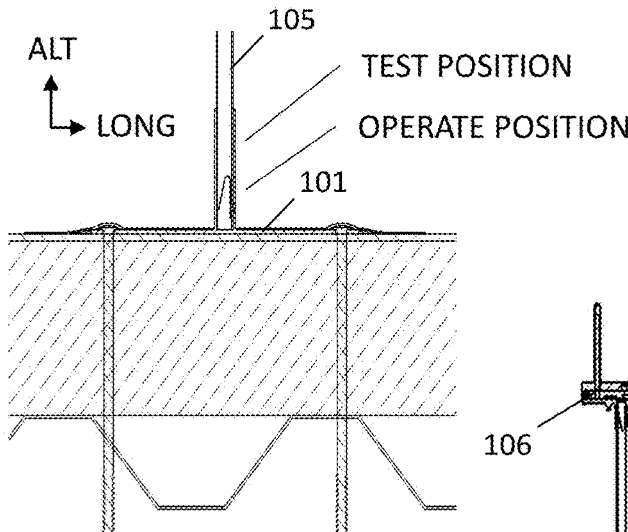
Figure 175:
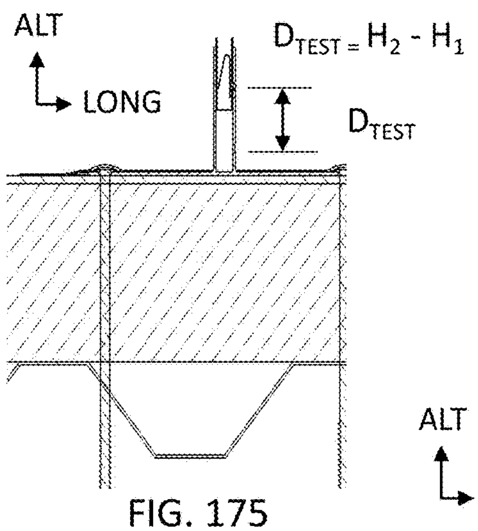
Figure 176:
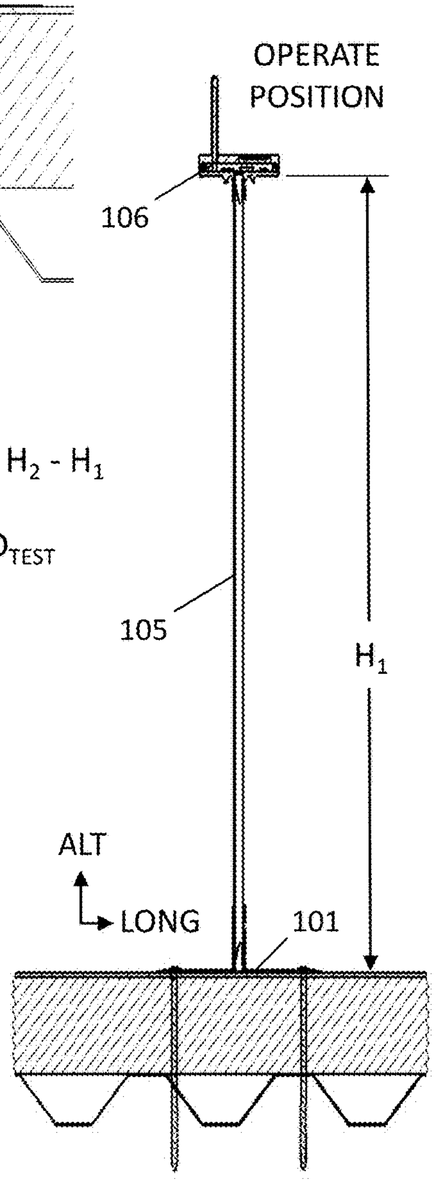
Figure 177:
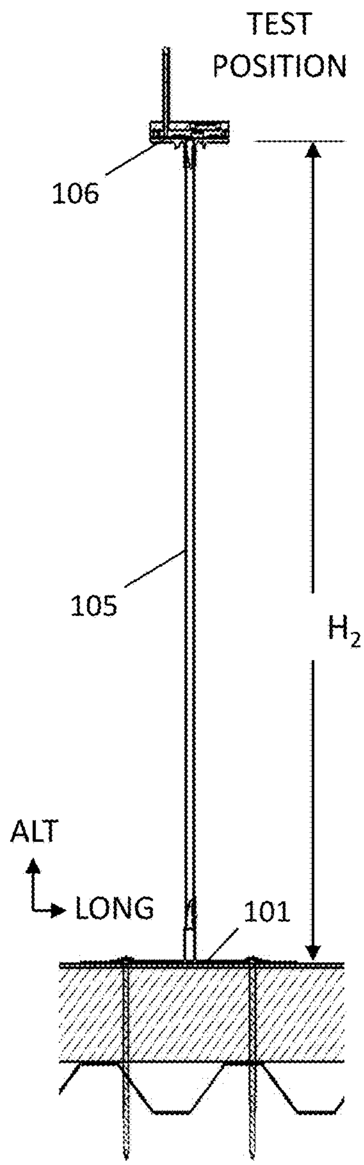
Figure 180:
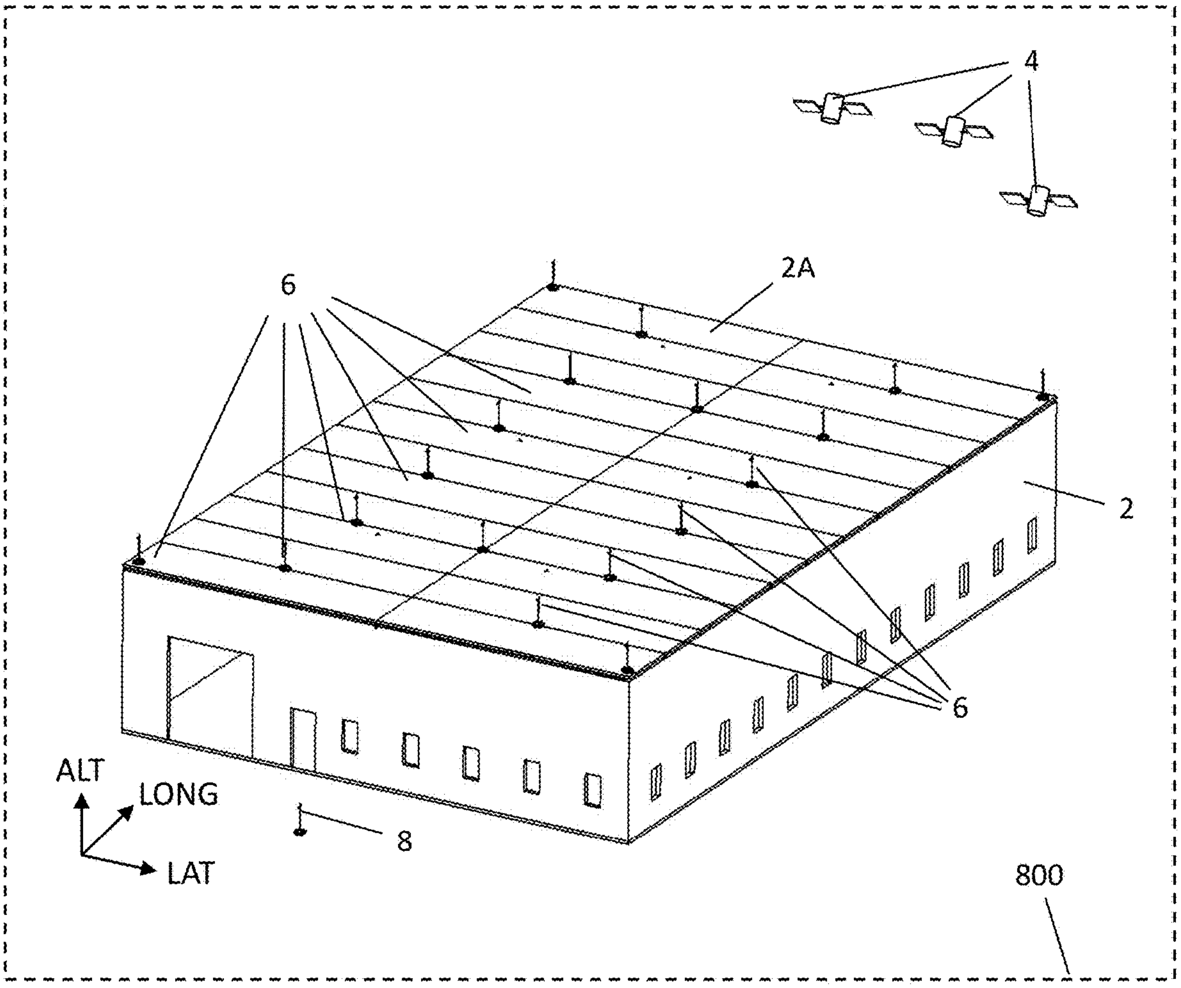
Figure 181A:
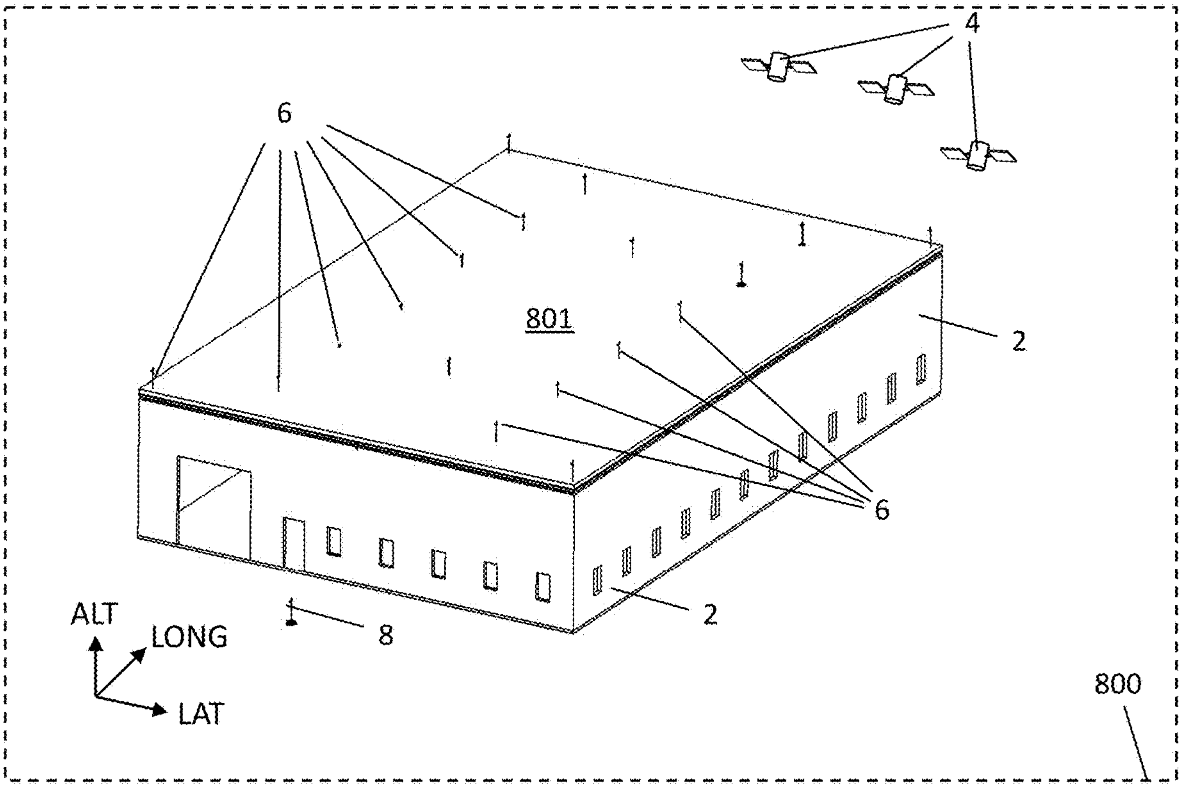
Figure 181B:
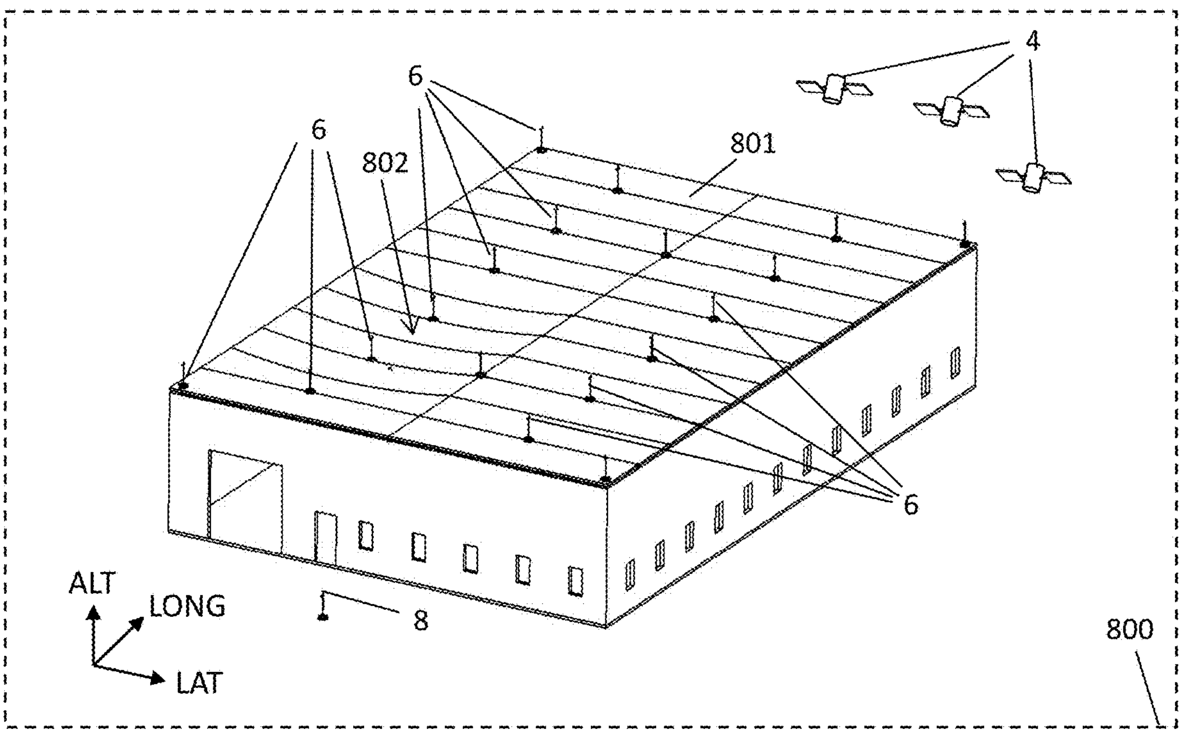
Figure 182:
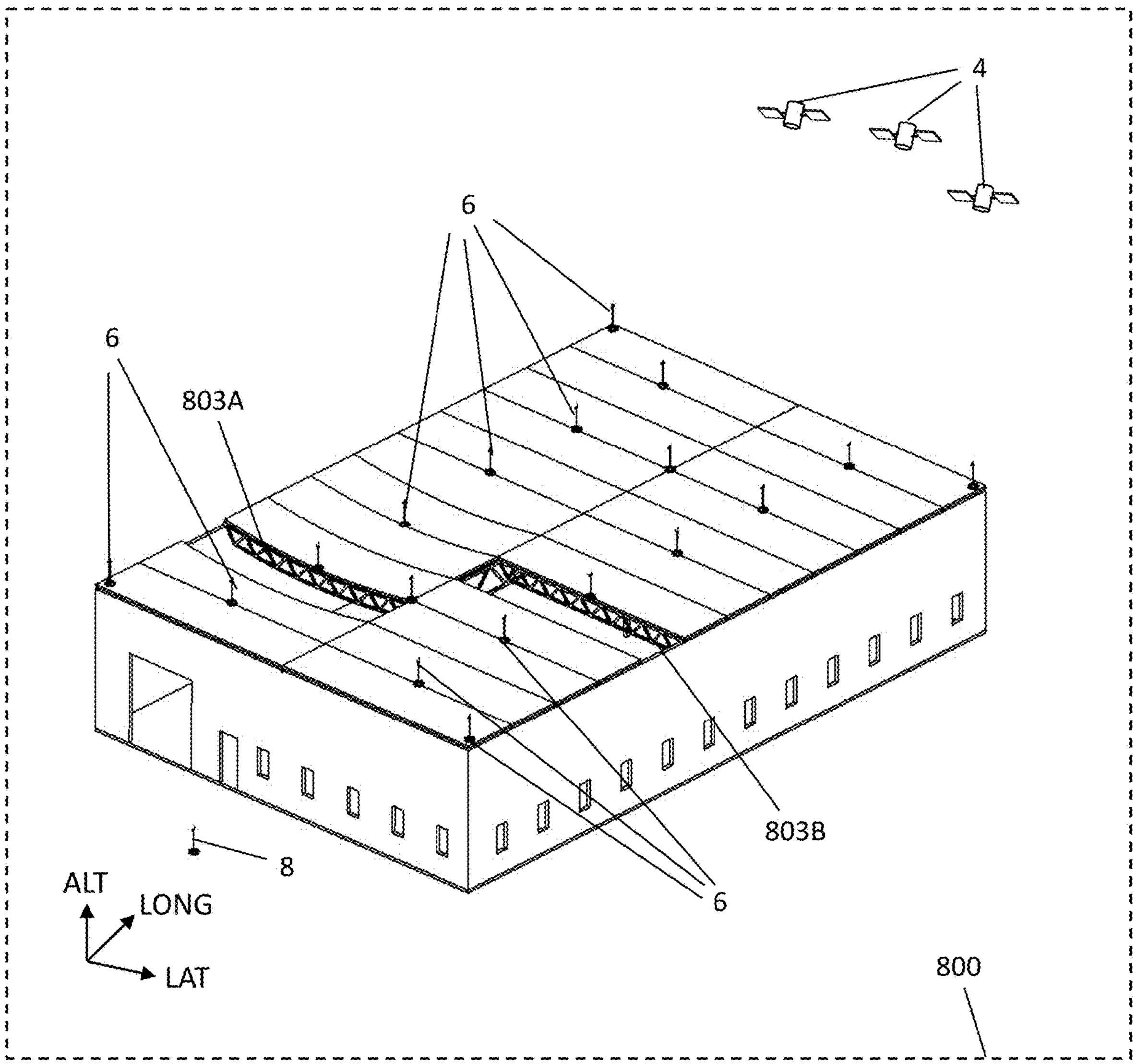
Figure 183:
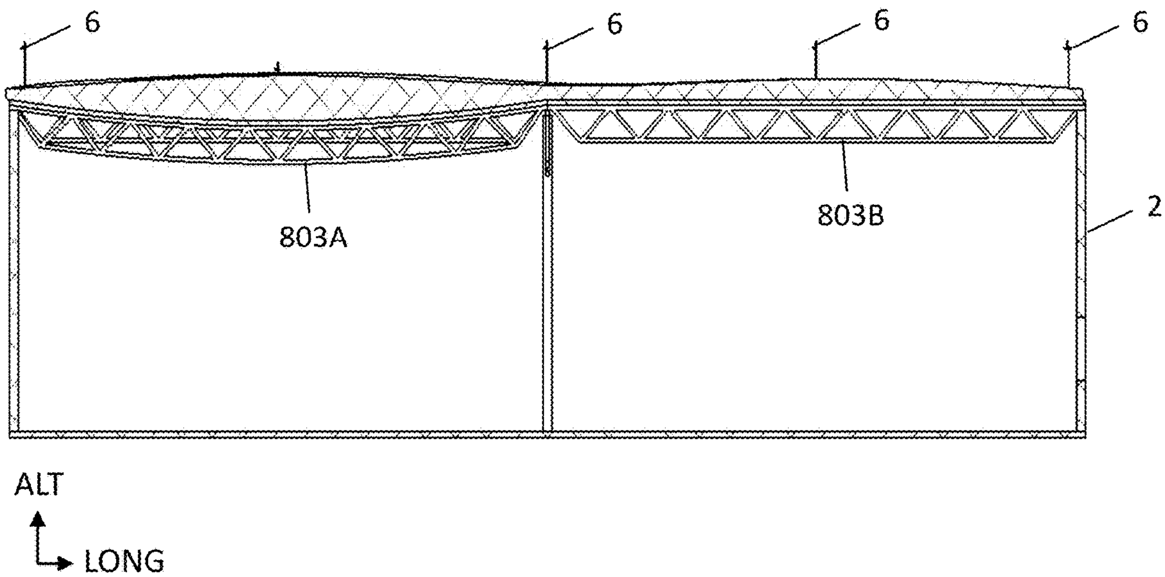
Figure 184:
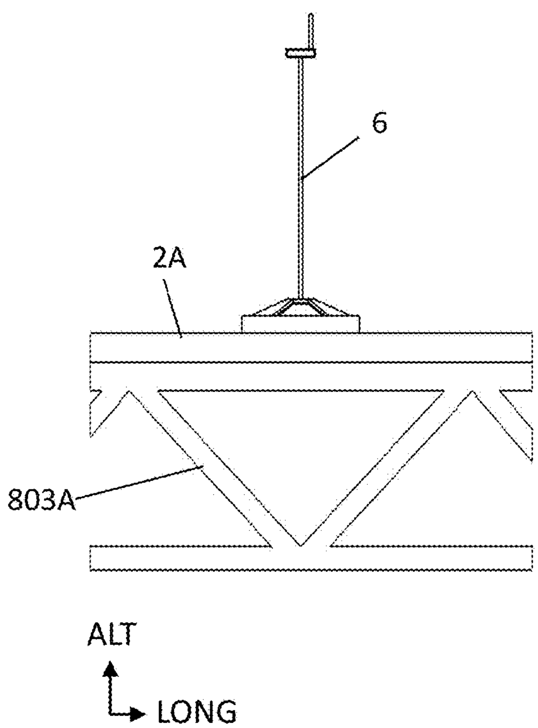
Figure 185:
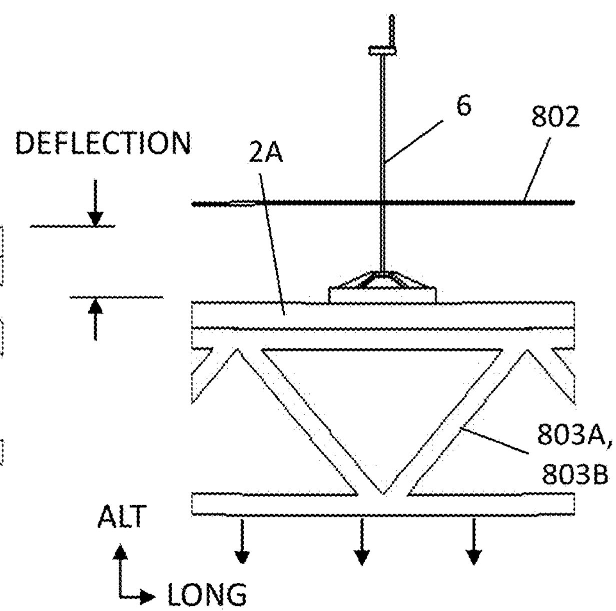
Figure 186:
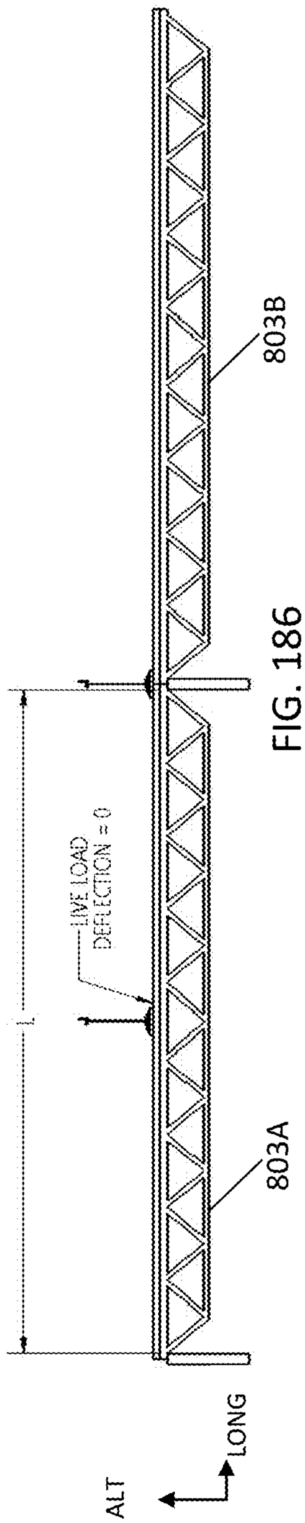
Figure 187:
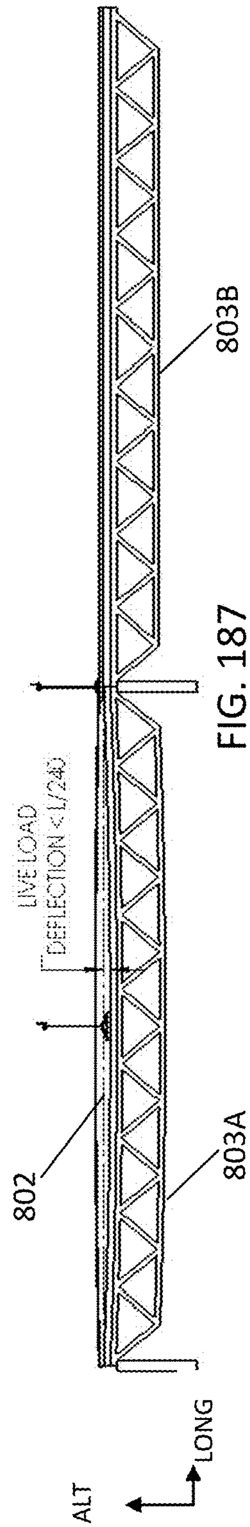
Figure 188:
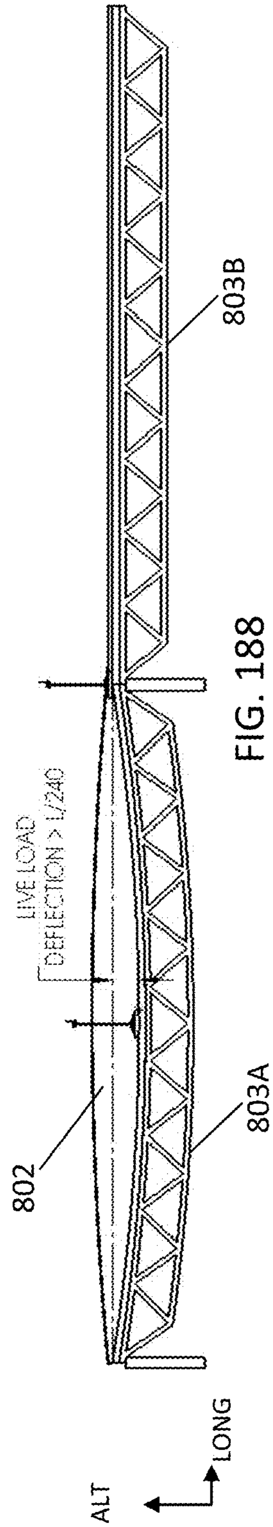
Figure 189:
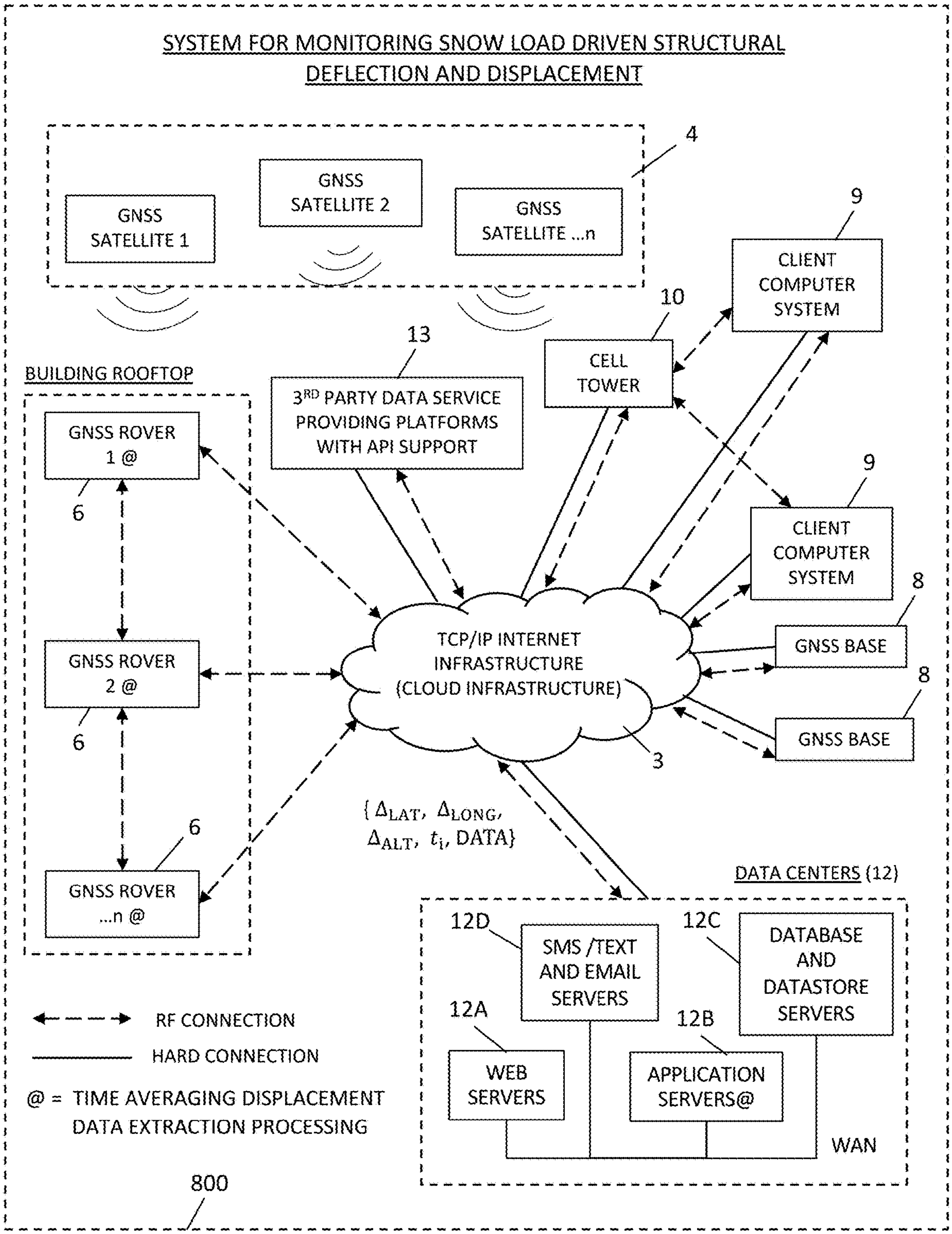
Figure 190:
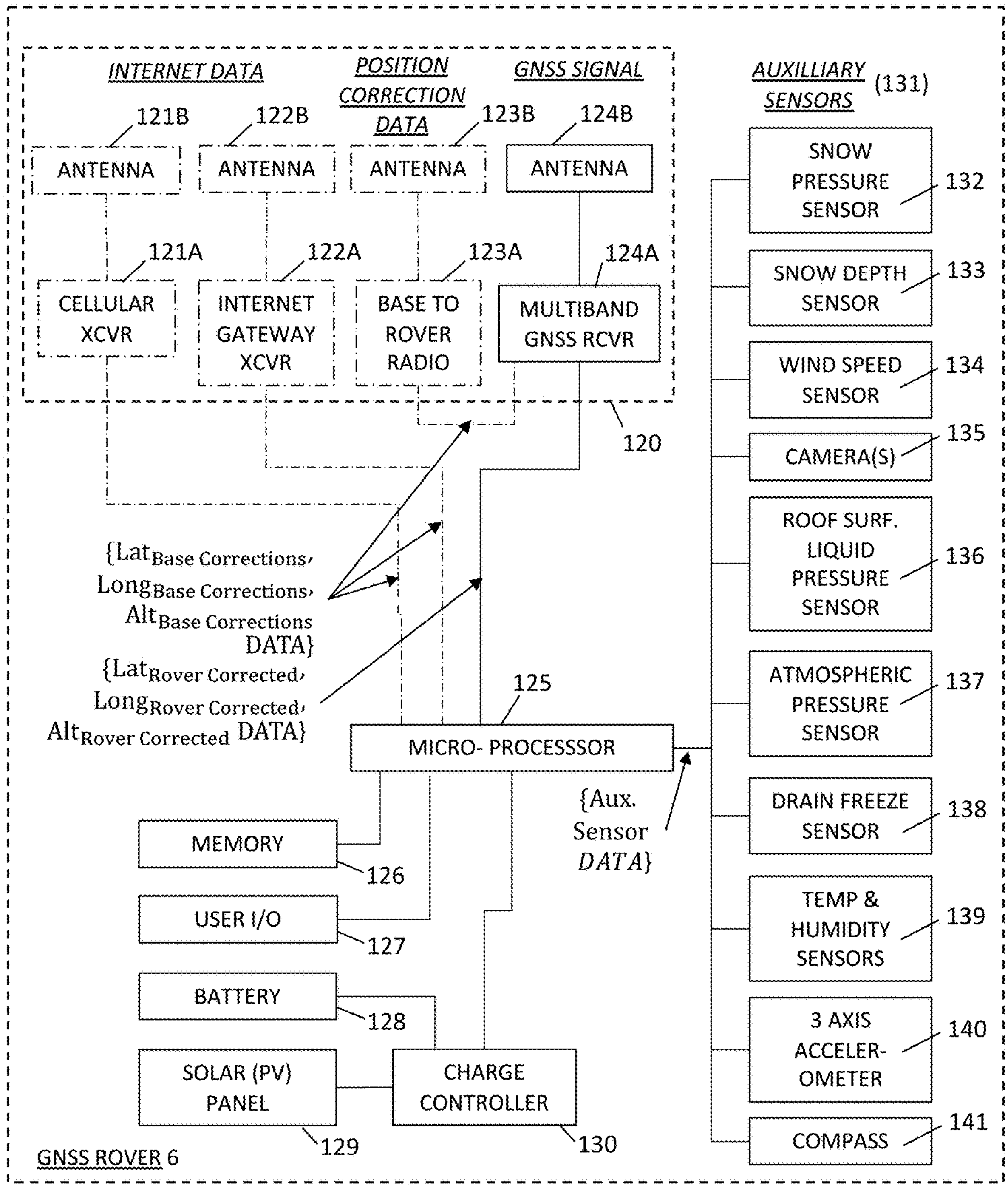
Figure 191:
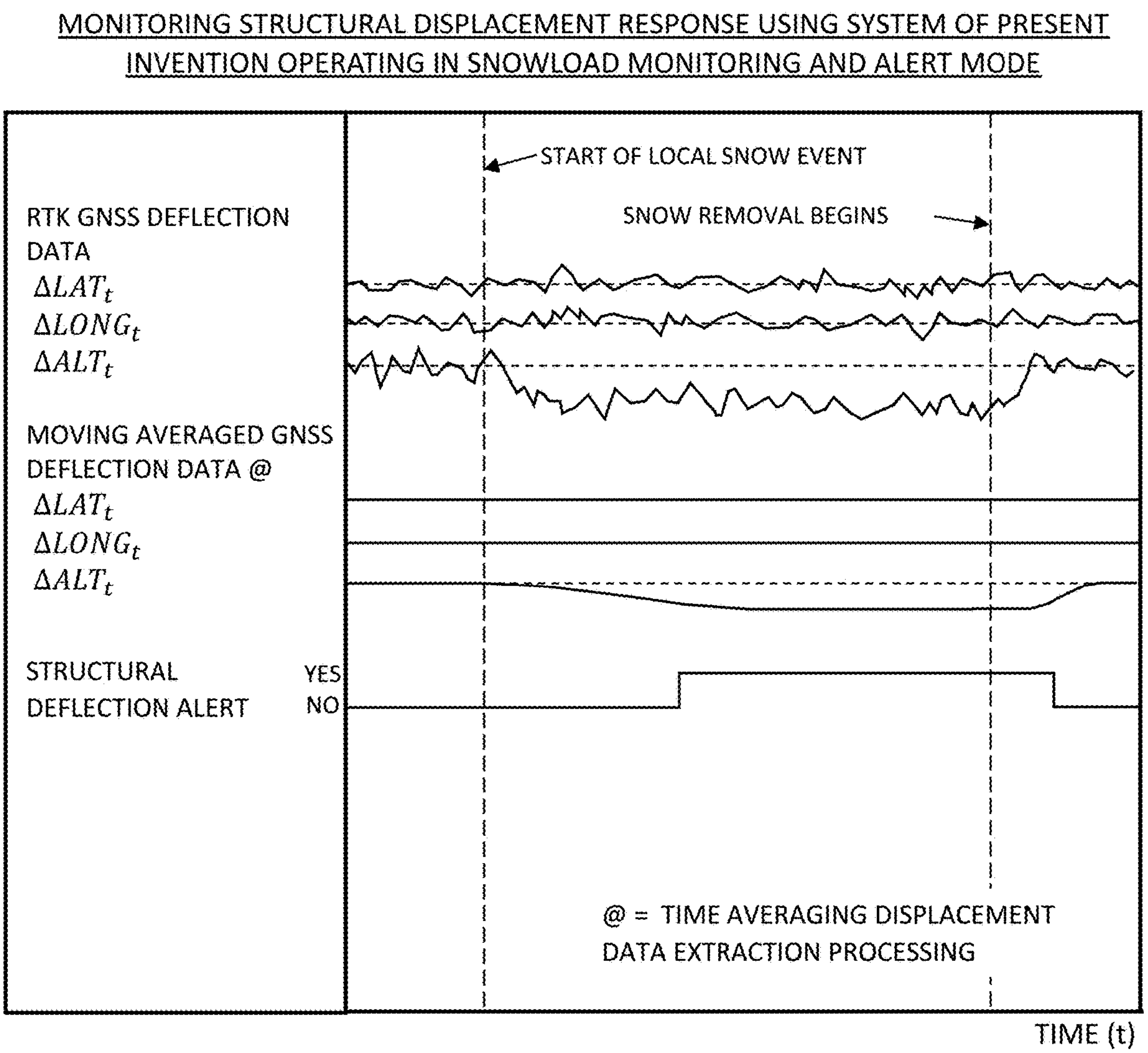
Figure 193:
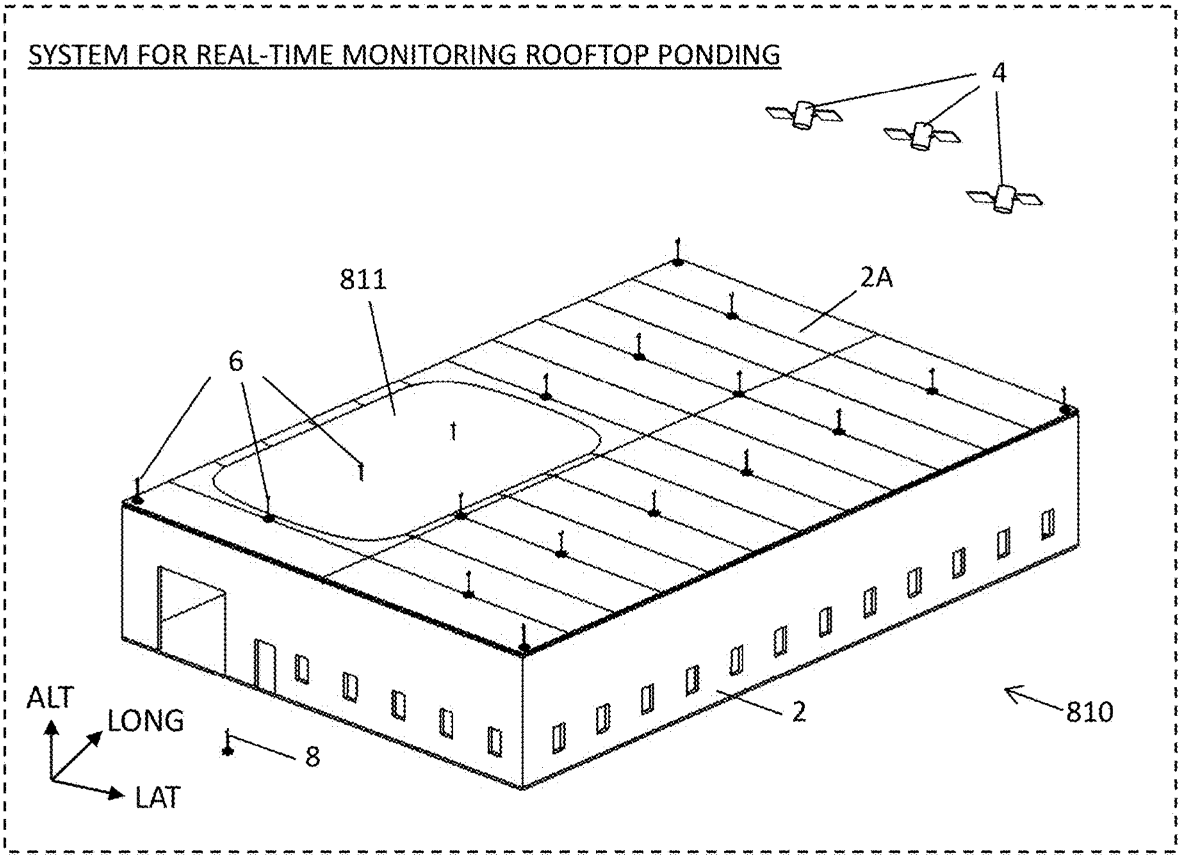
Figure 194:
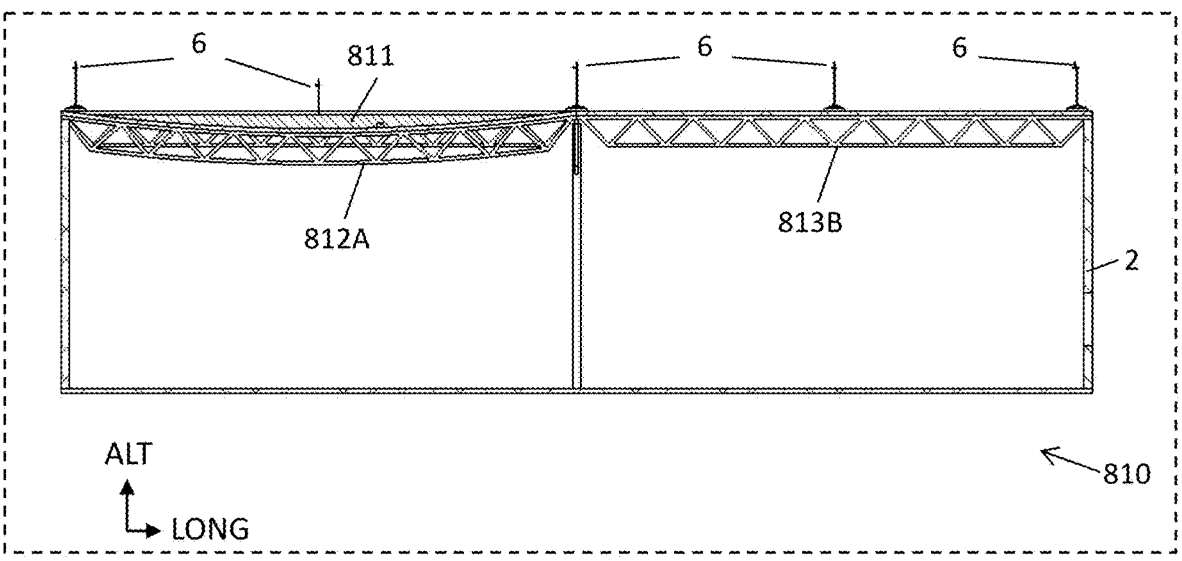
Figure 195A:
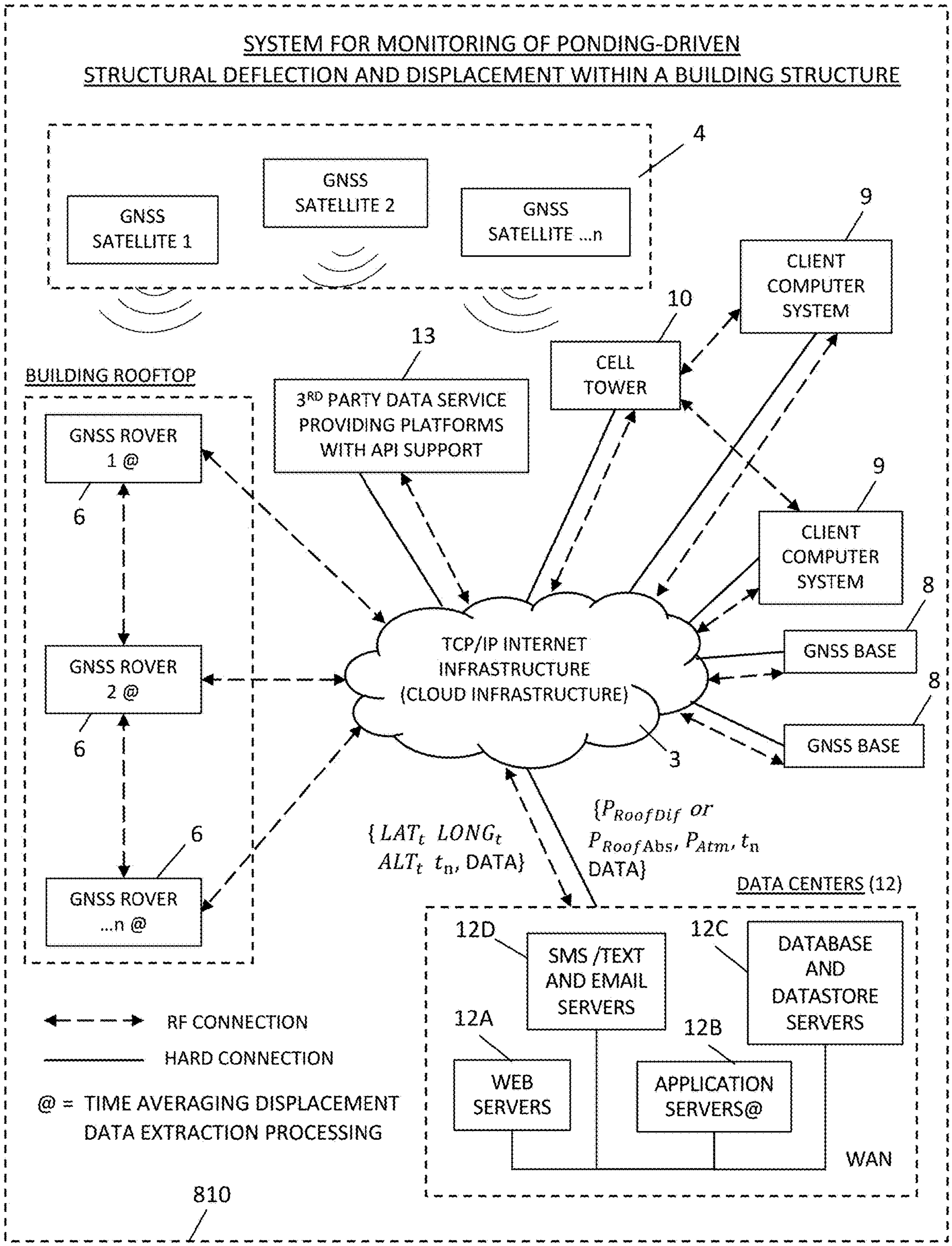
Figure 195B:
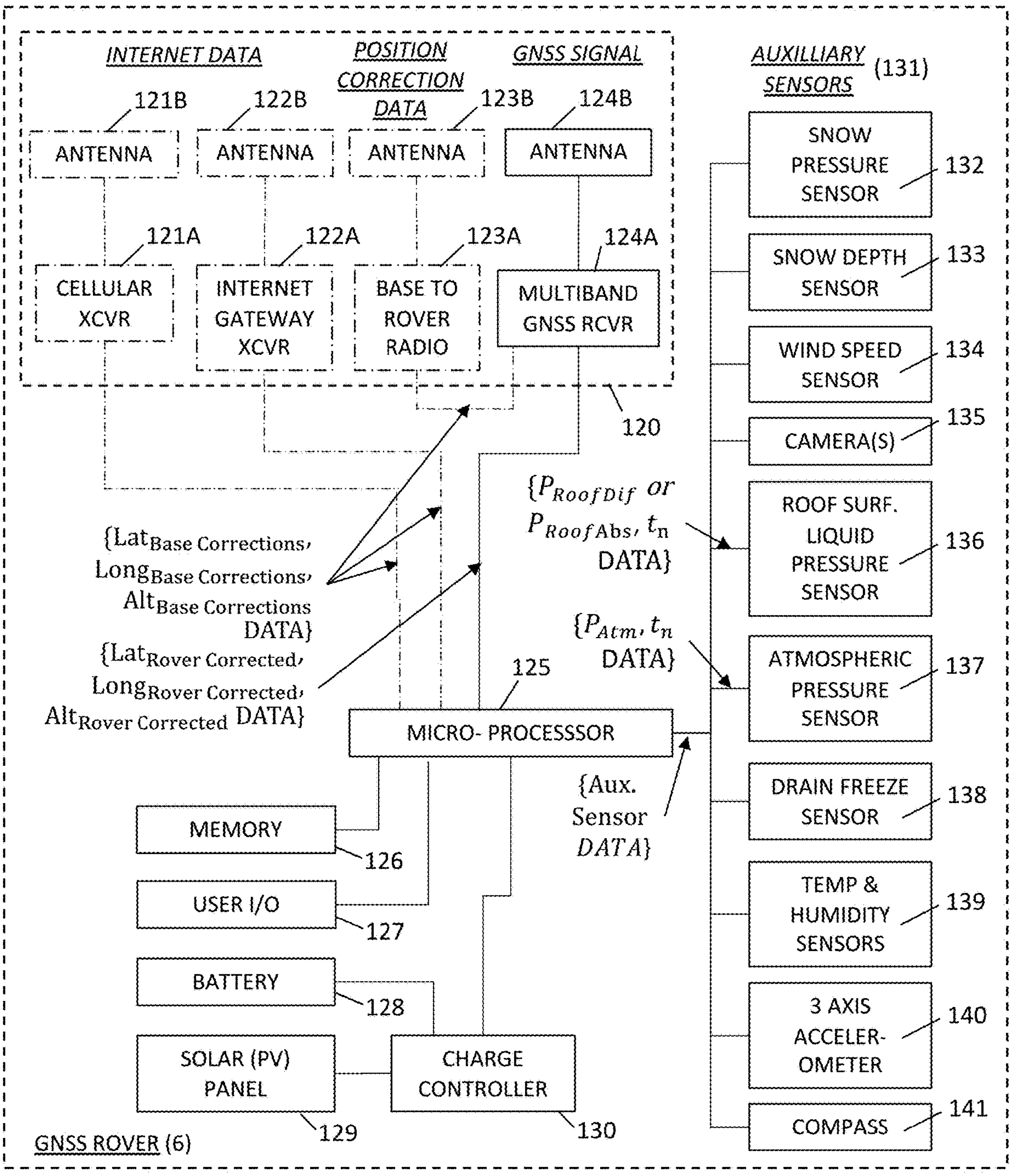
Figure 196:
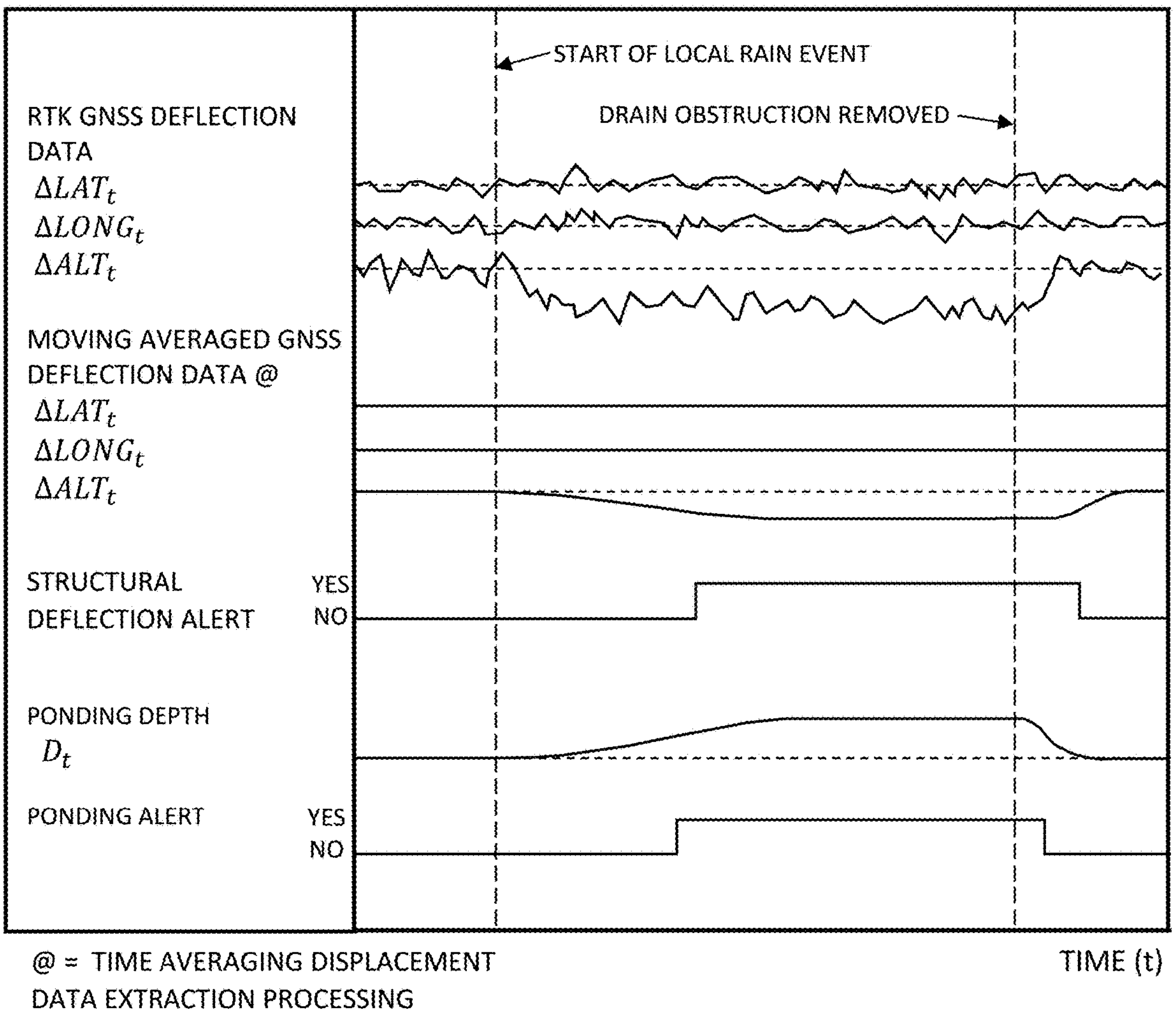
Figure 198C:
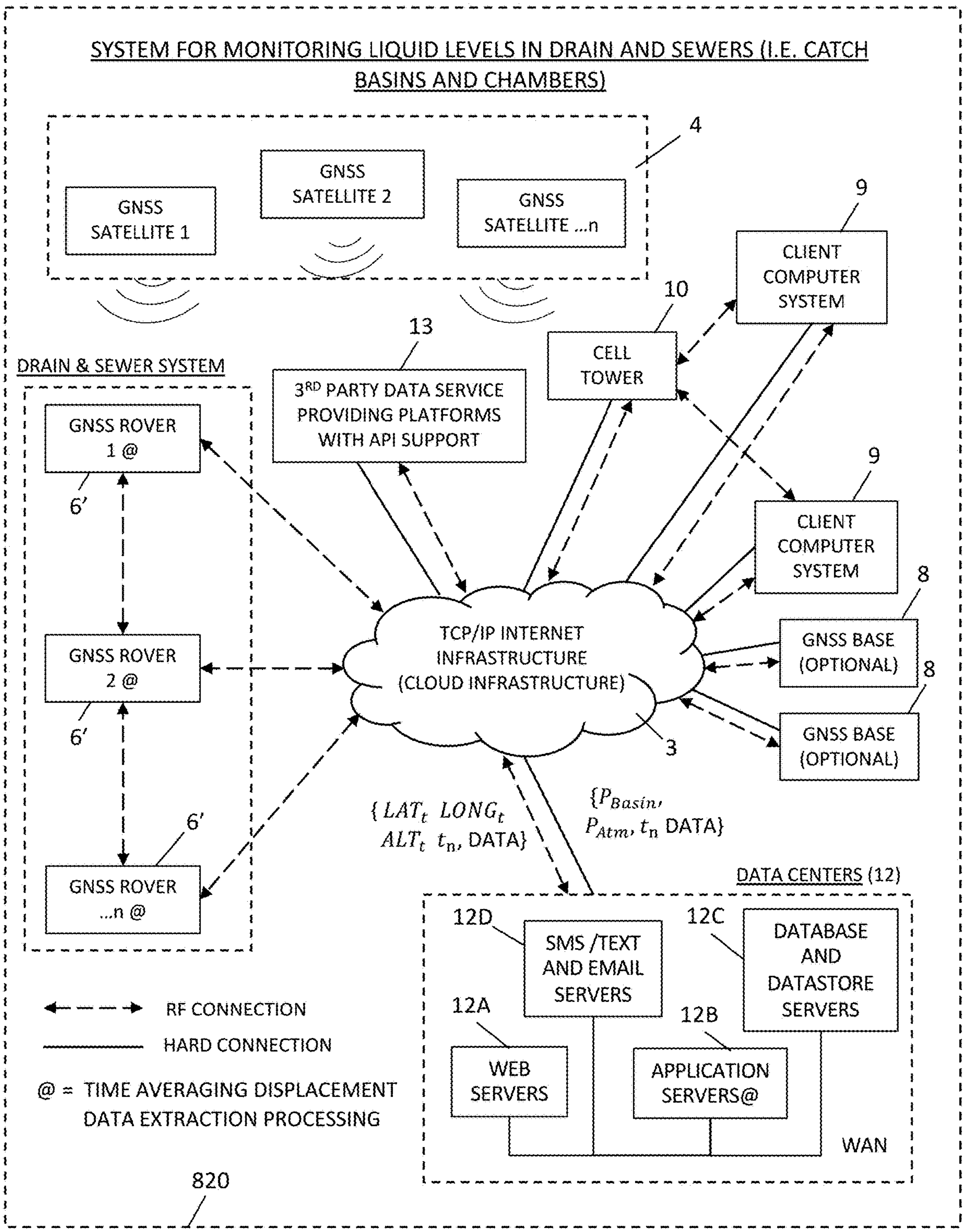
Figure 198D:
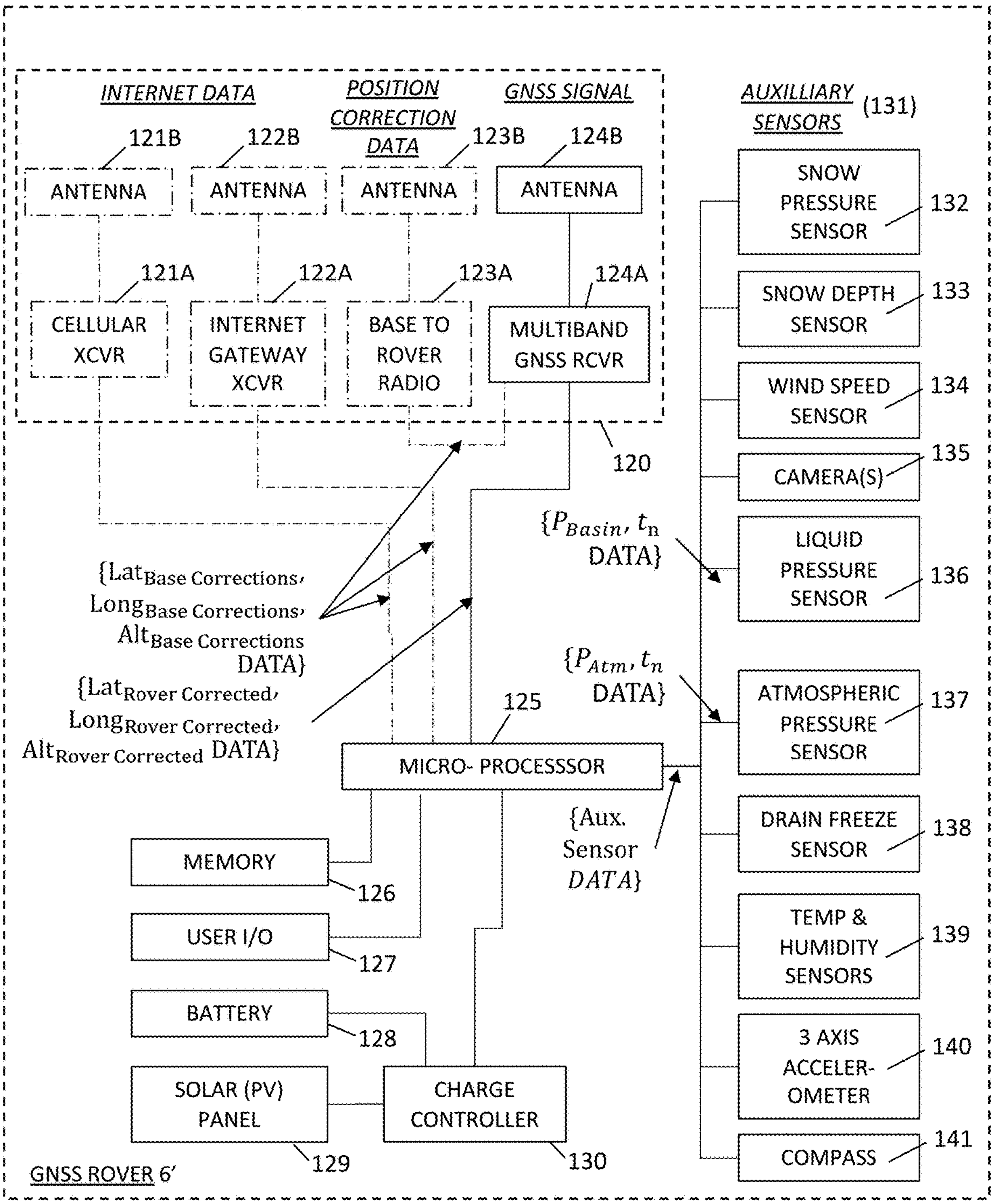
Figure 198E:
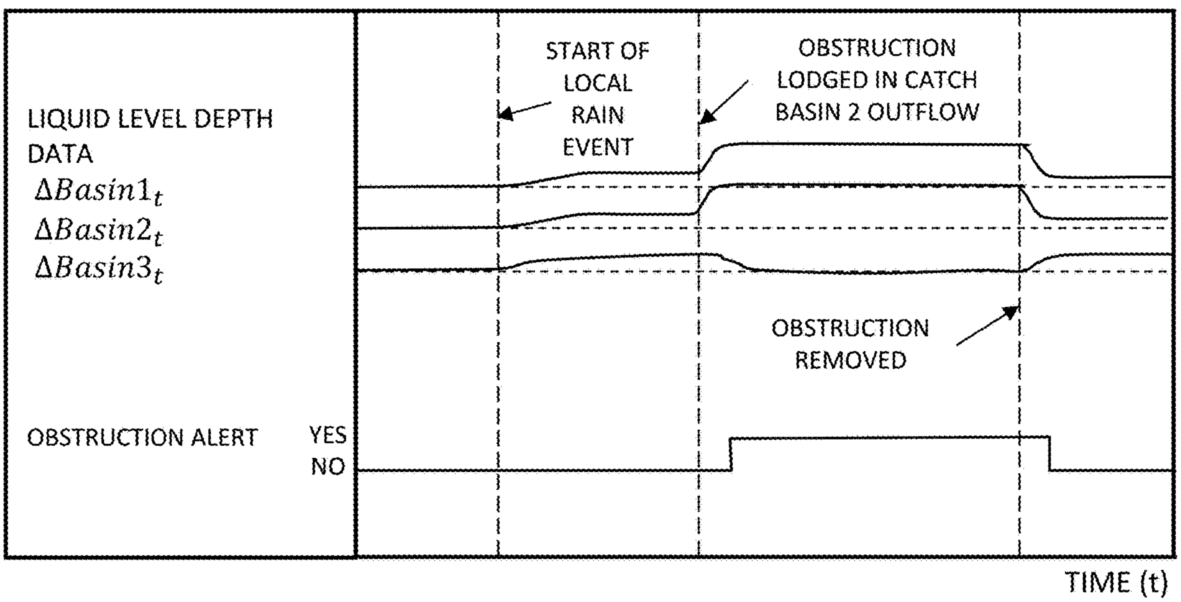
Figure 199:
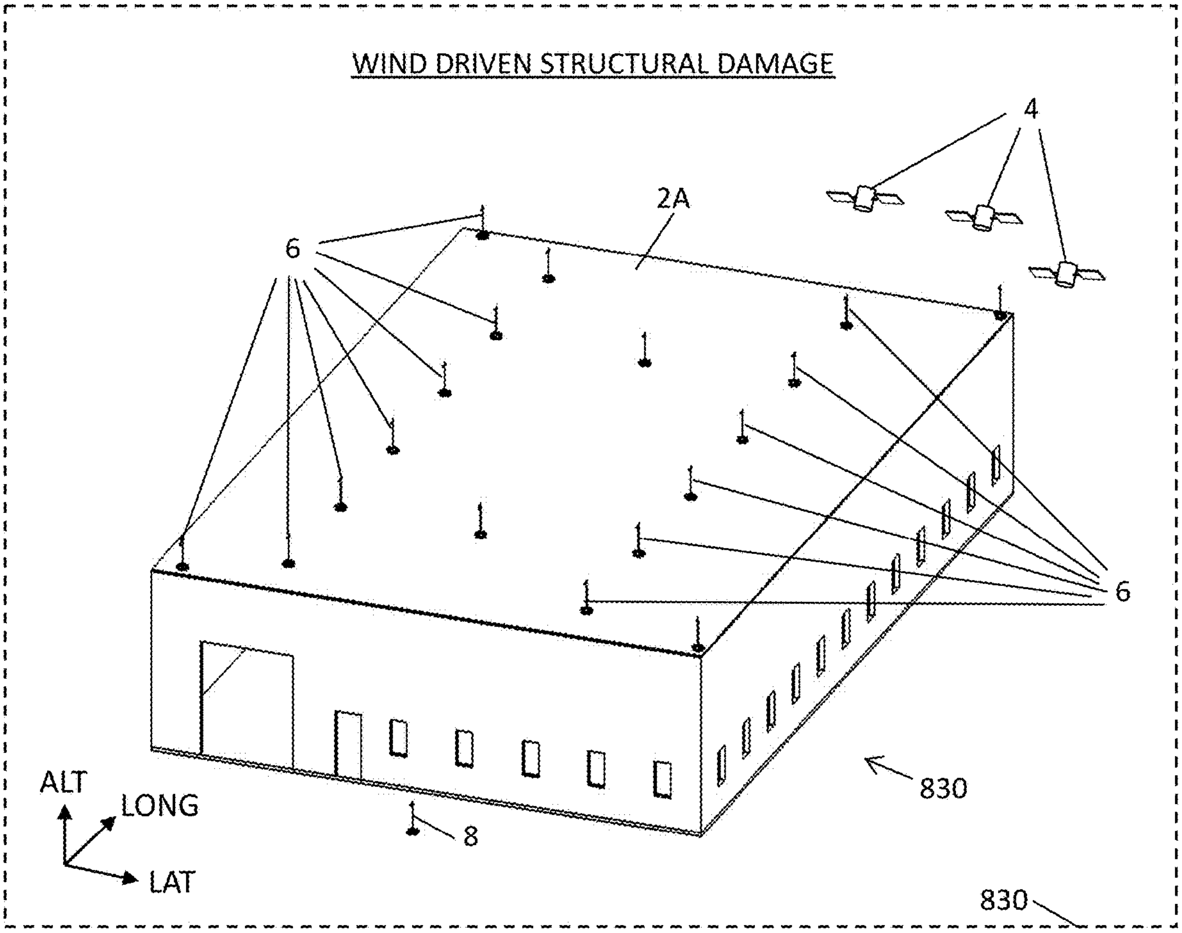
Figure 200:
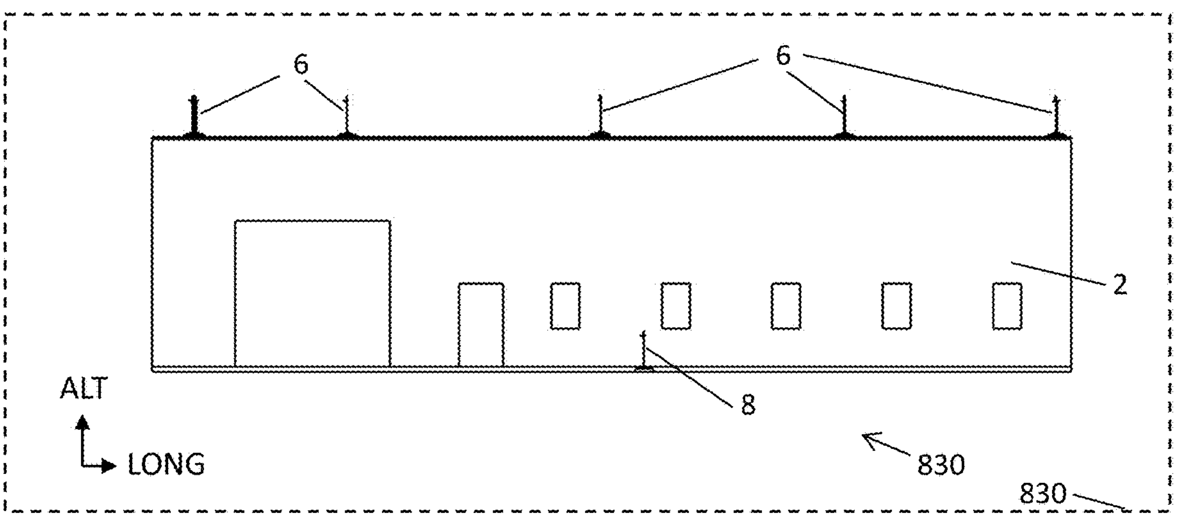
Figure 201:
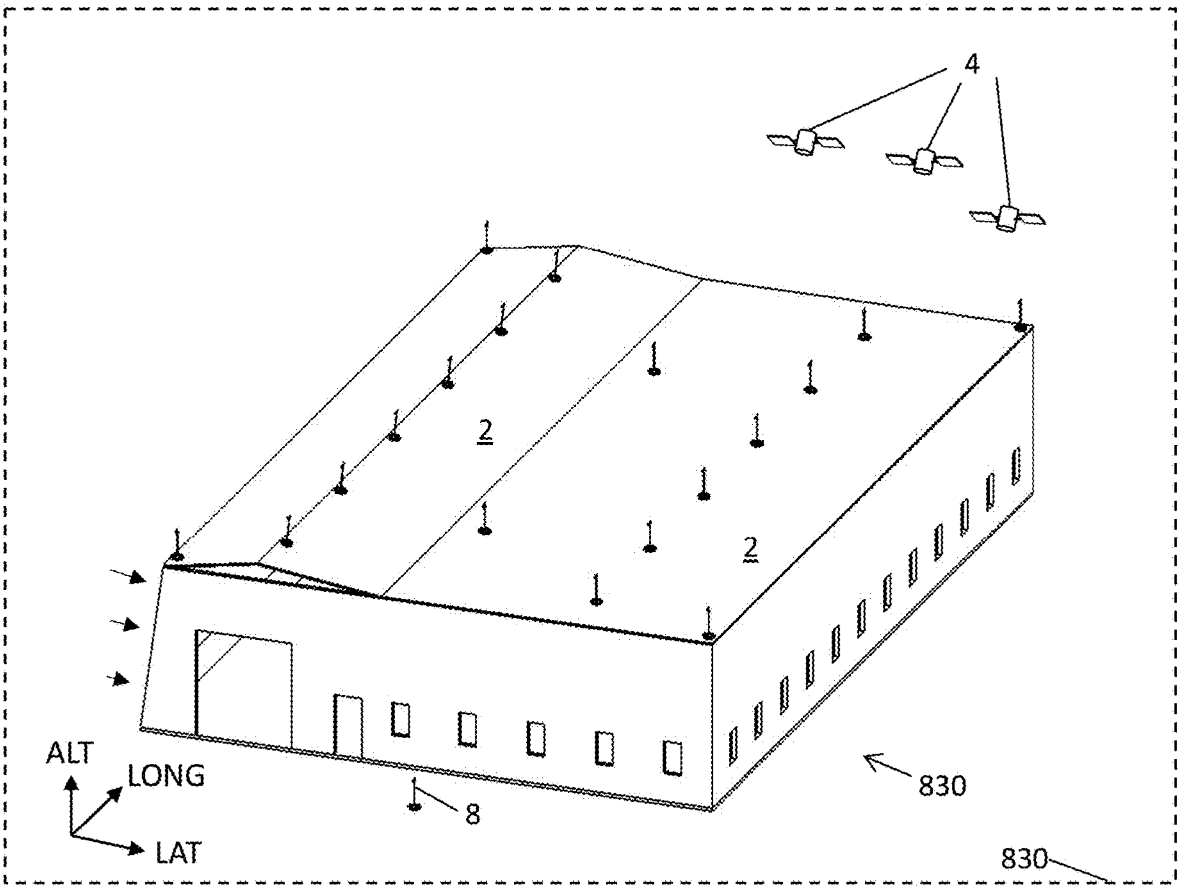
Figure 202:
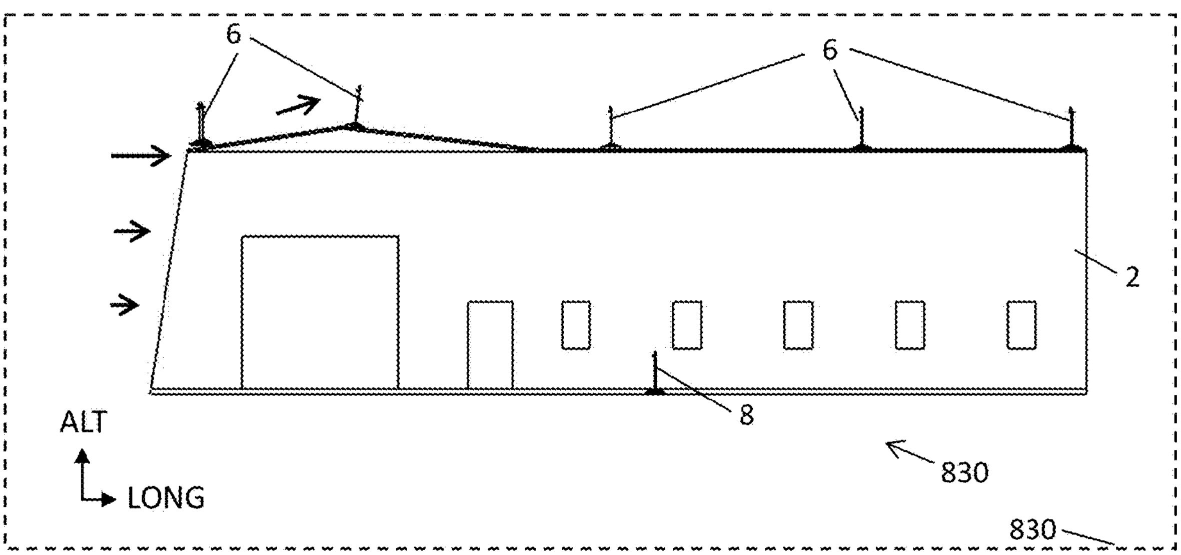
Figure 203:
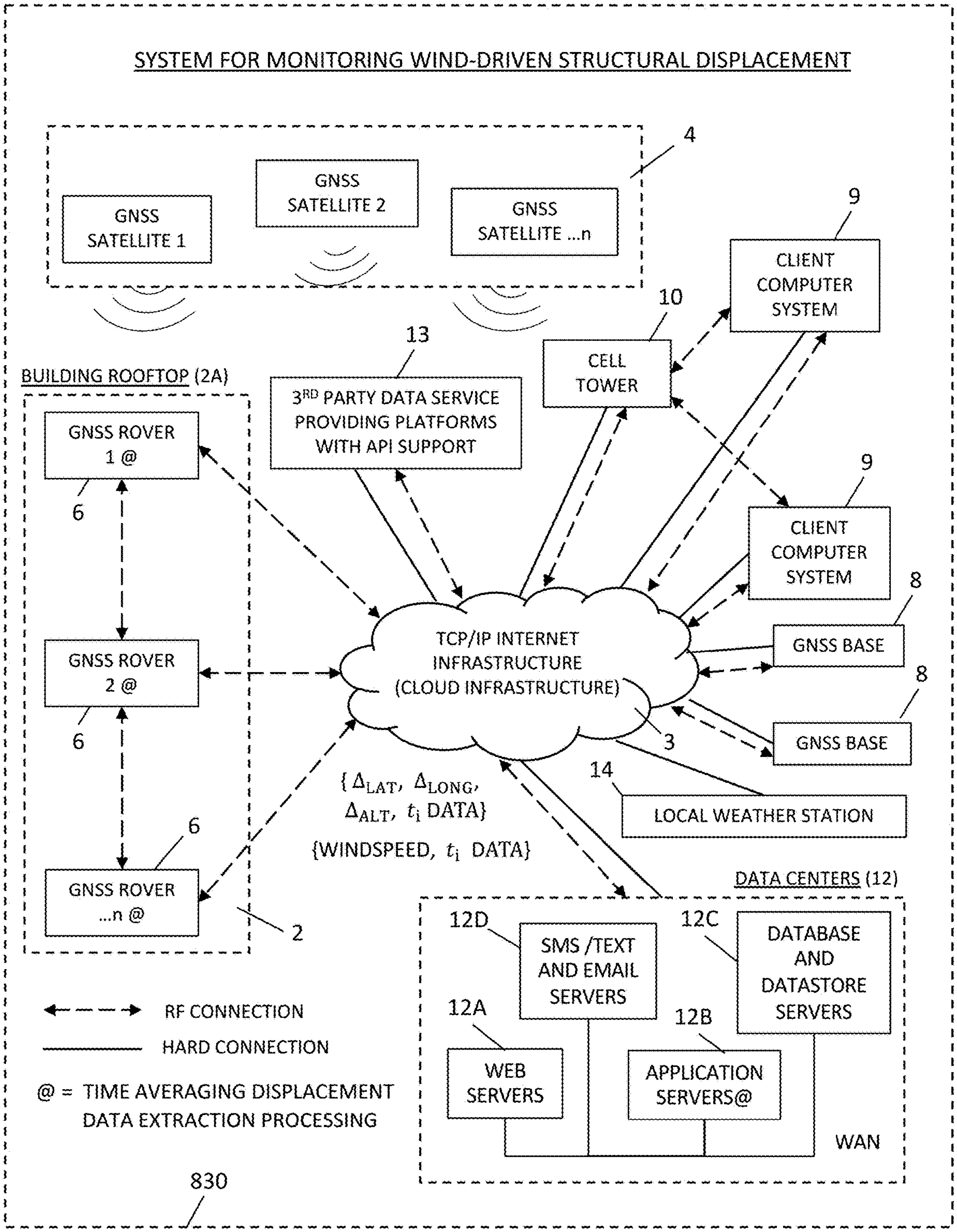
Figure 204:
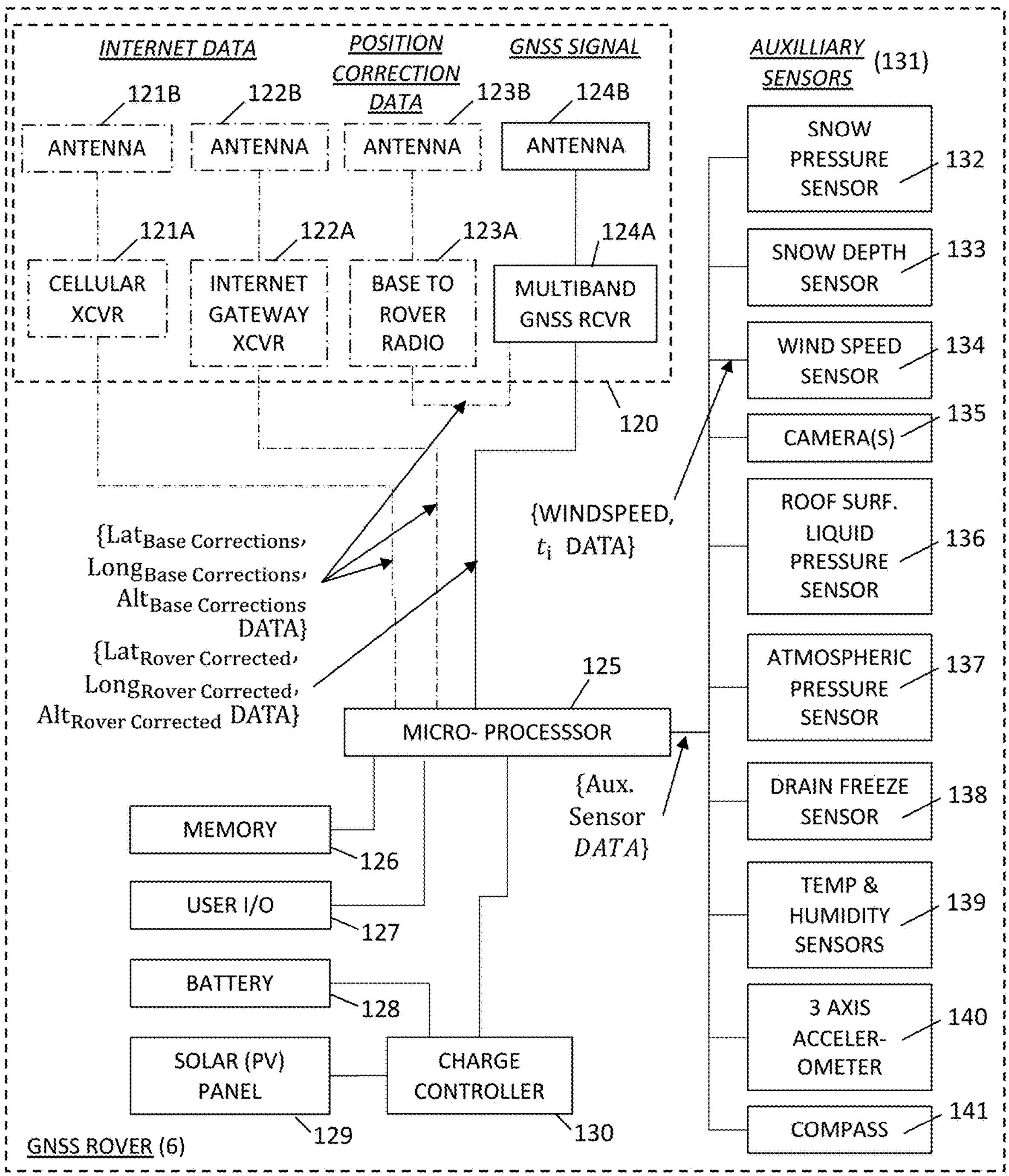
Figure 205:
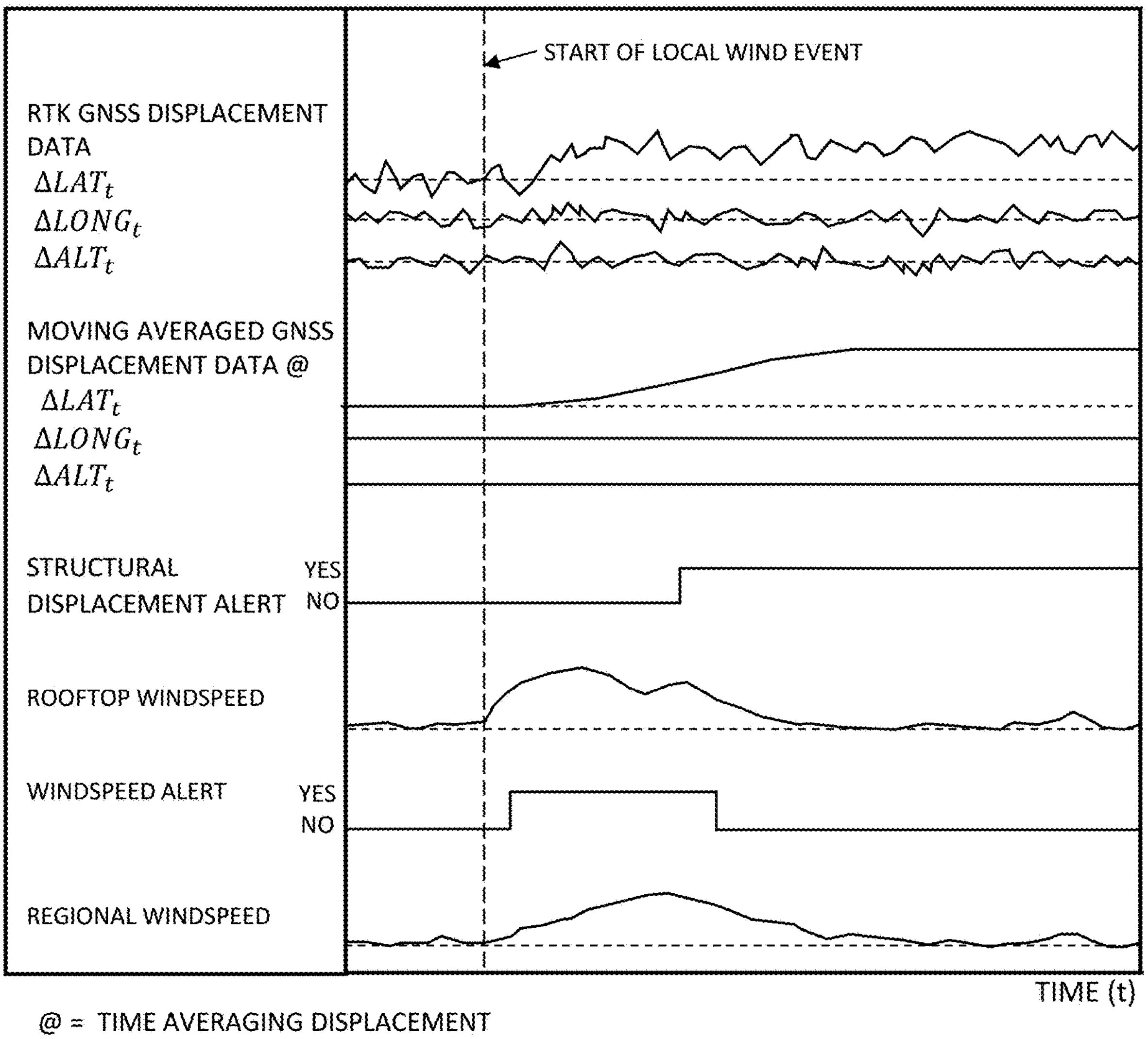
Figure 207:
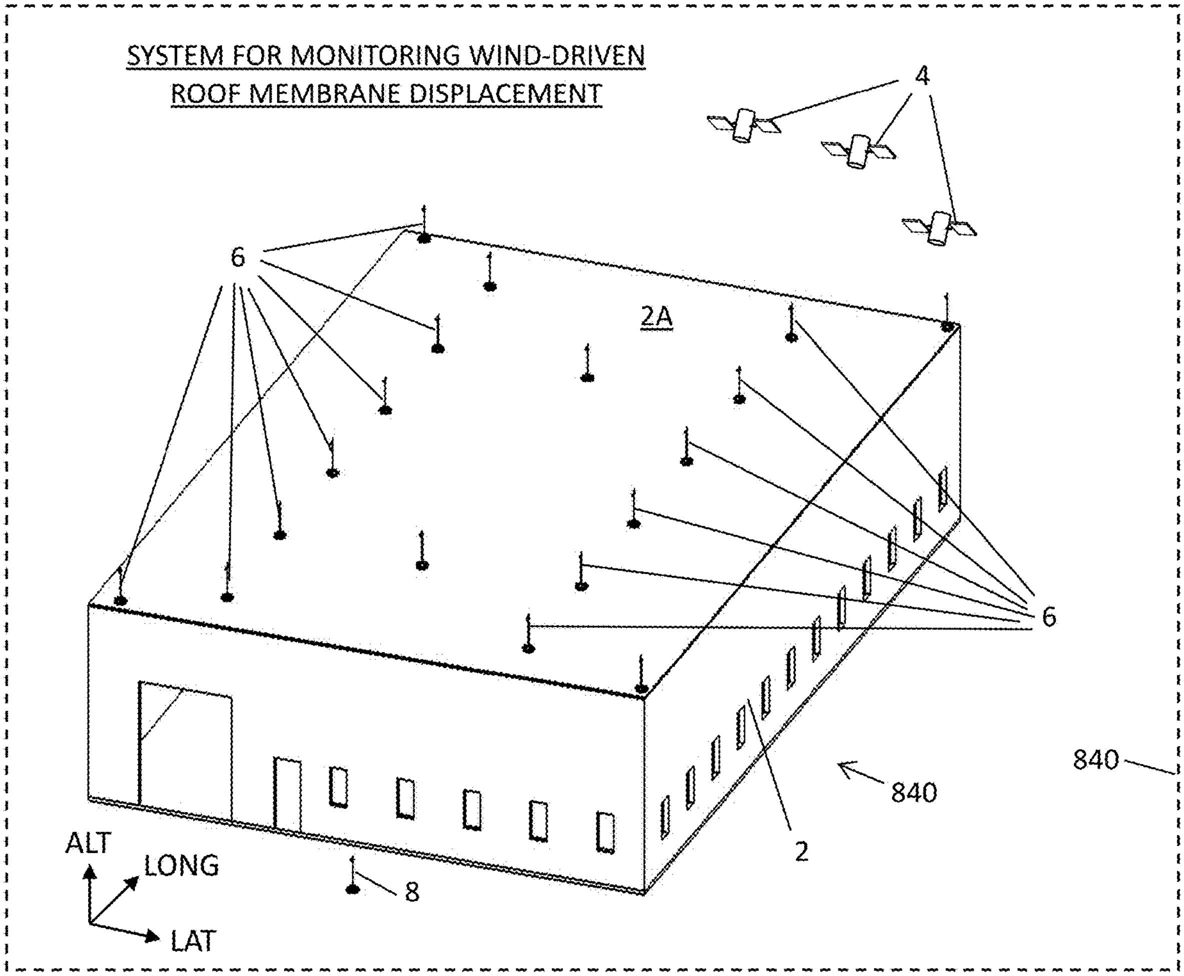
Figure 208:
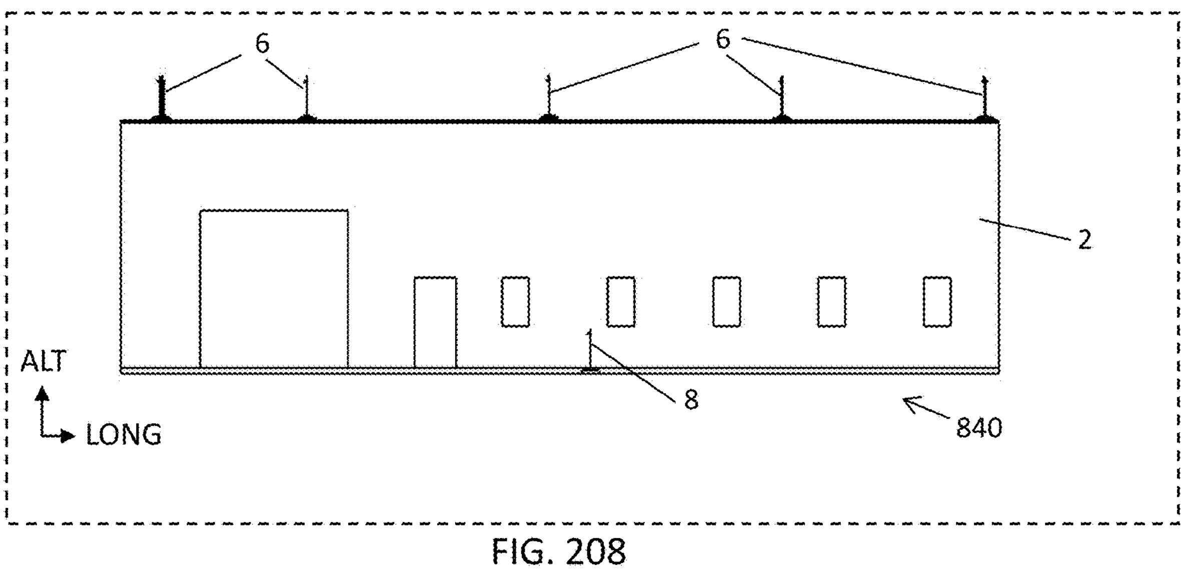
Figure 209:
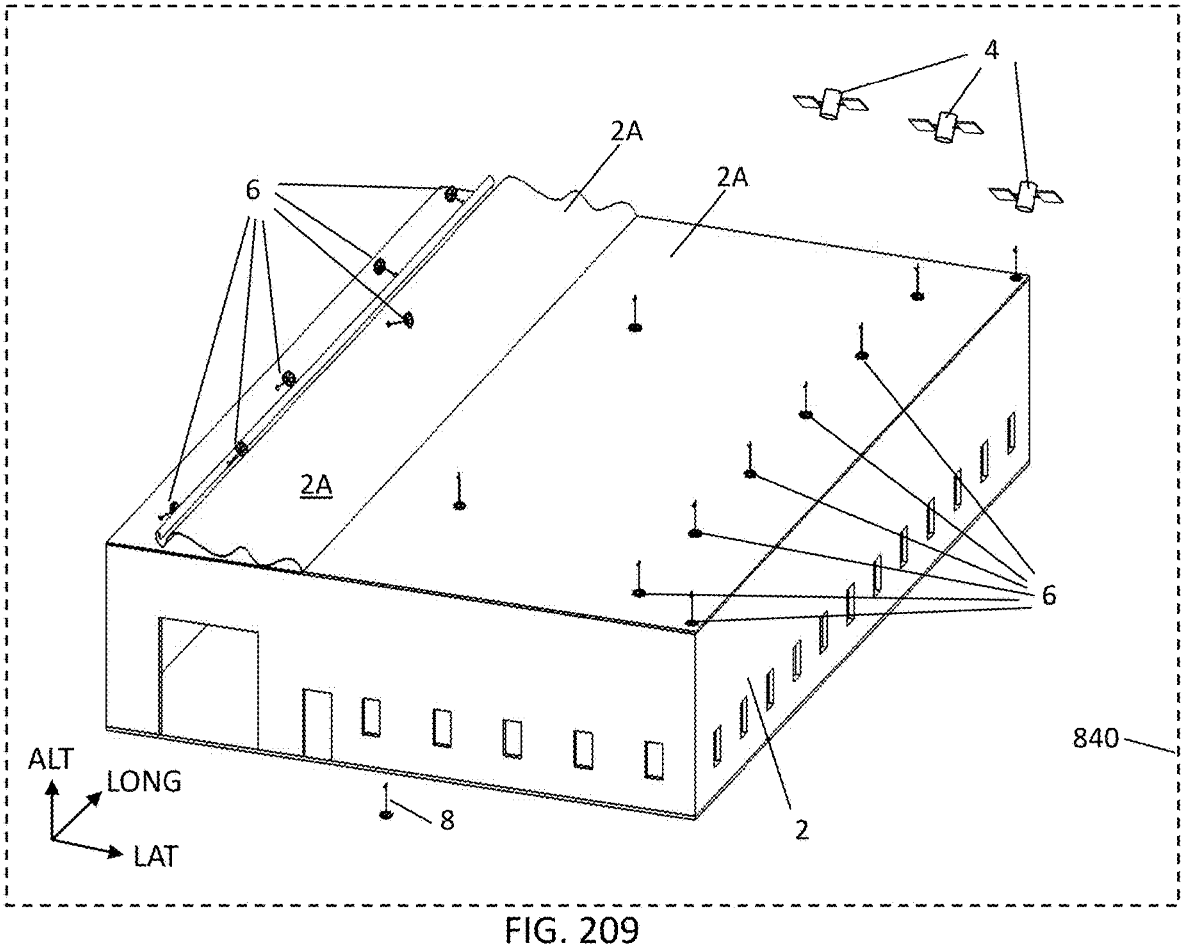
Figure 210:
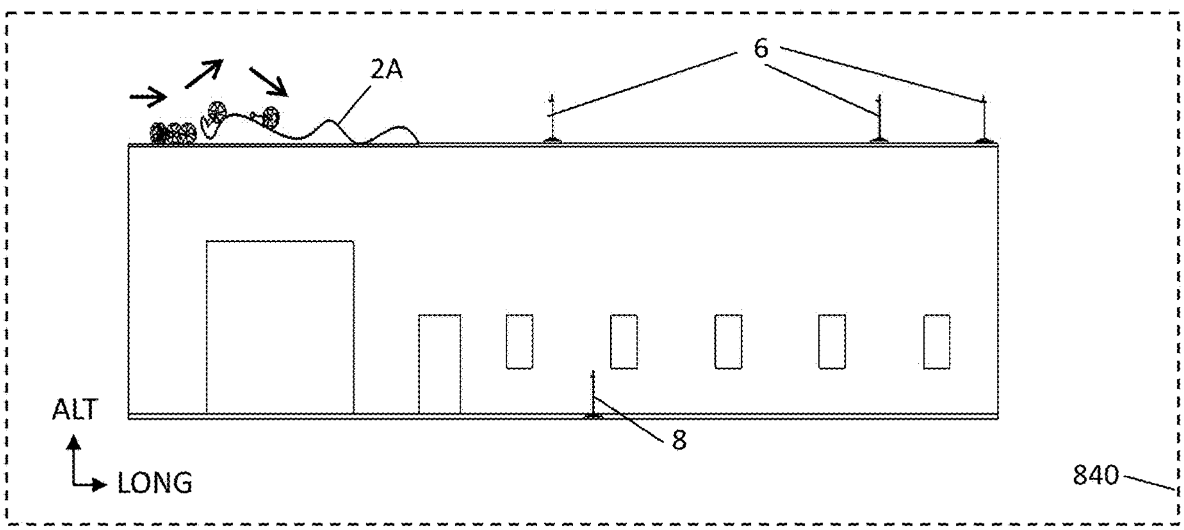
Figure 211:
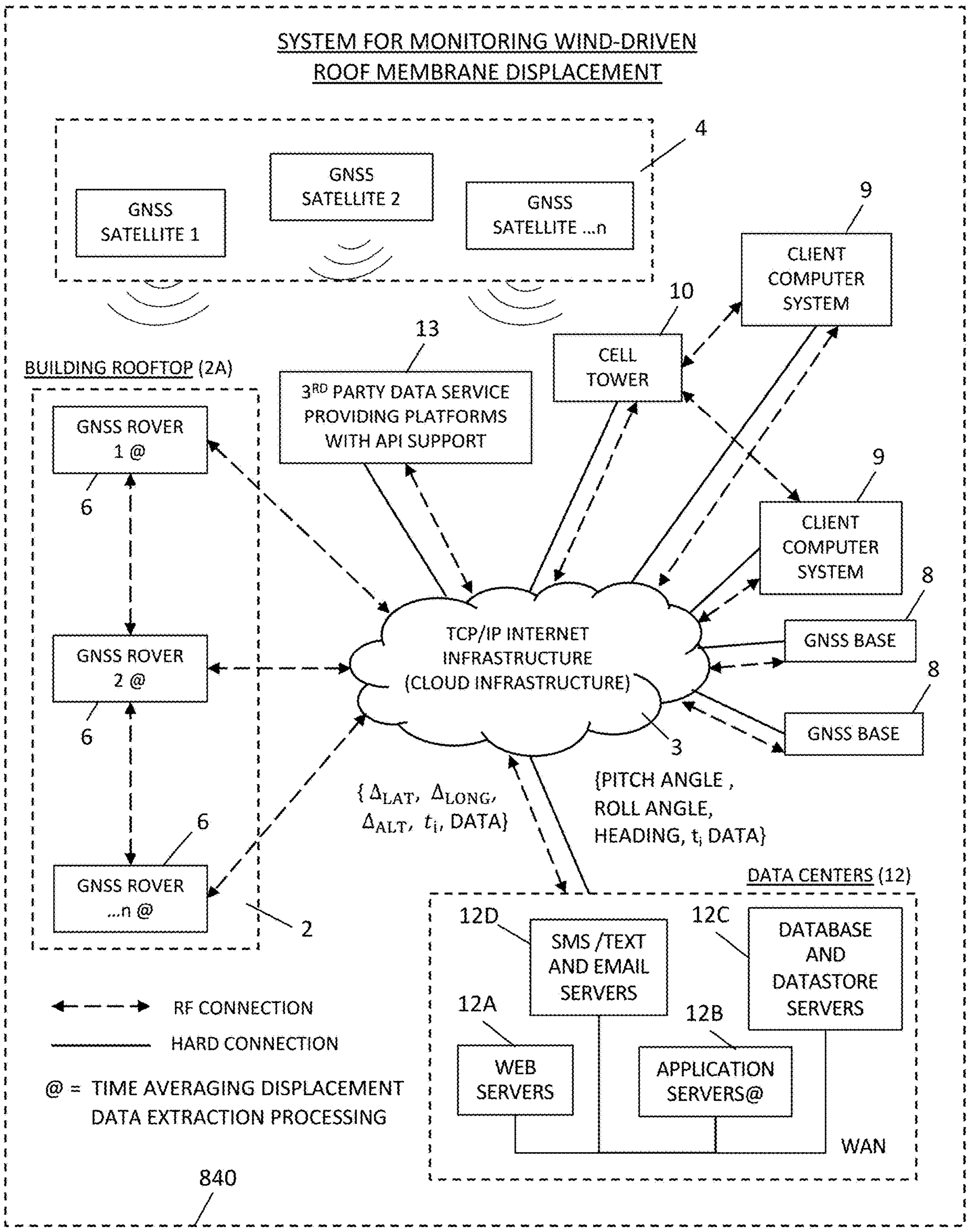
Figure 212:
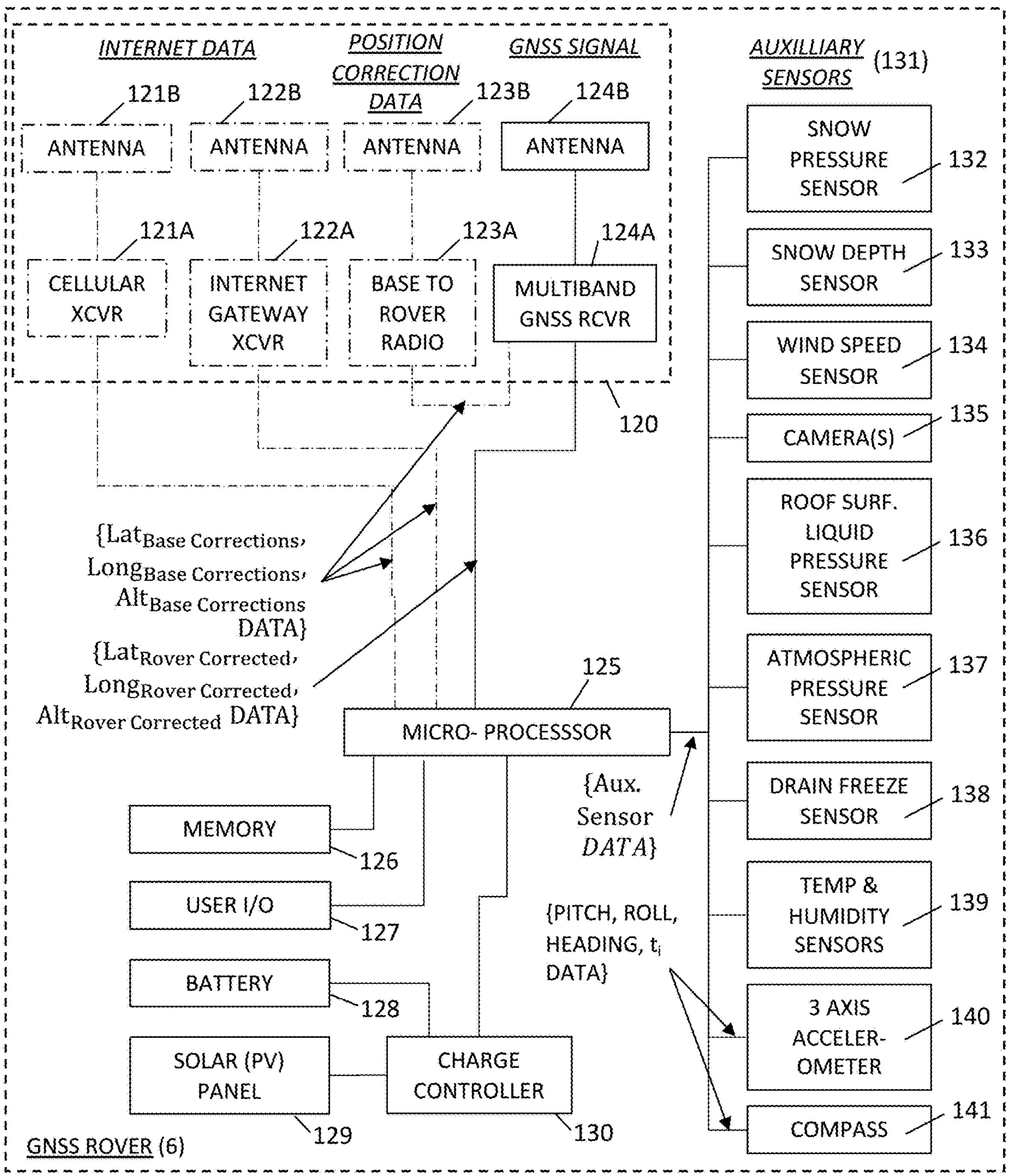
Figure 213:
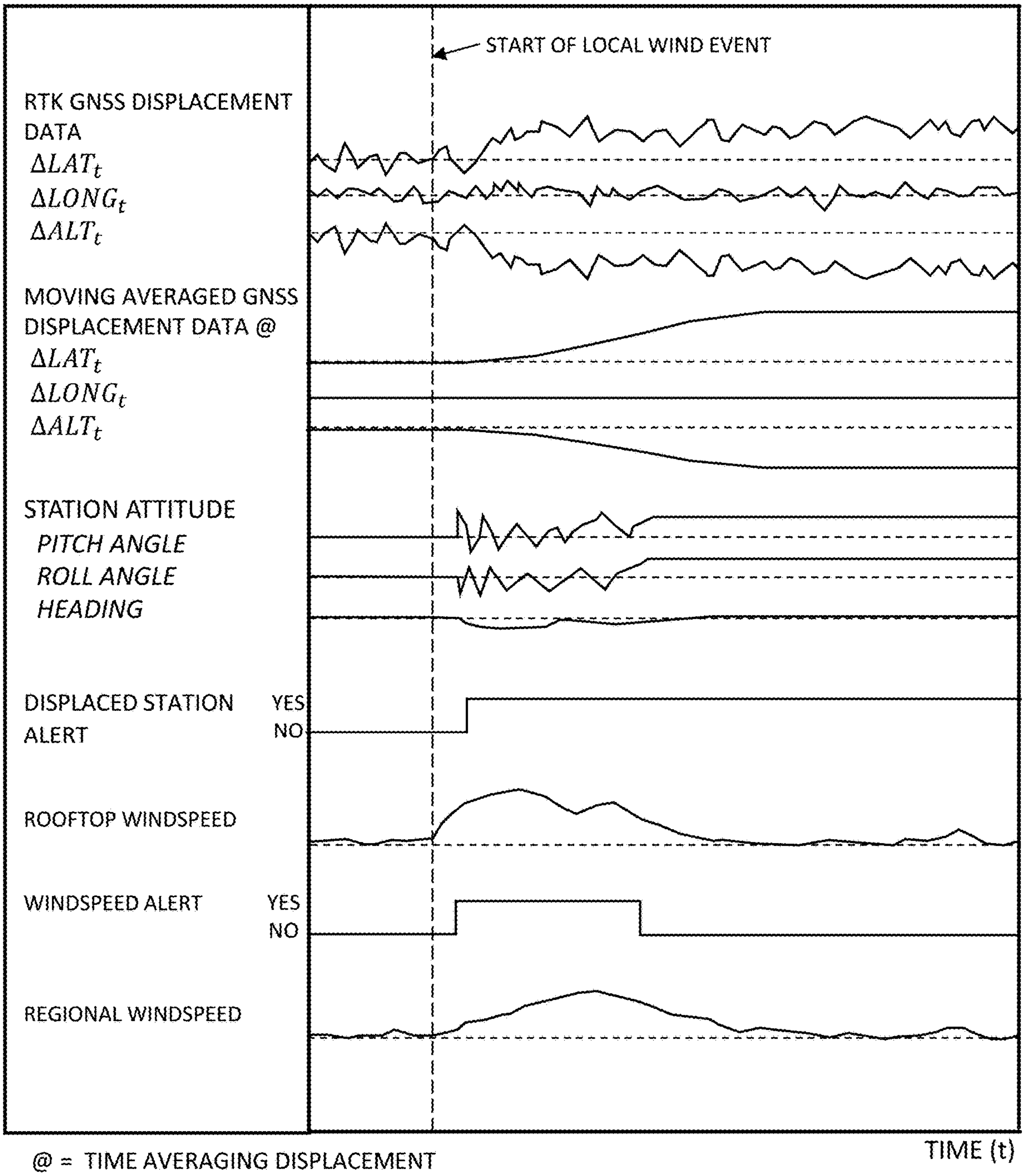
Figure 215:
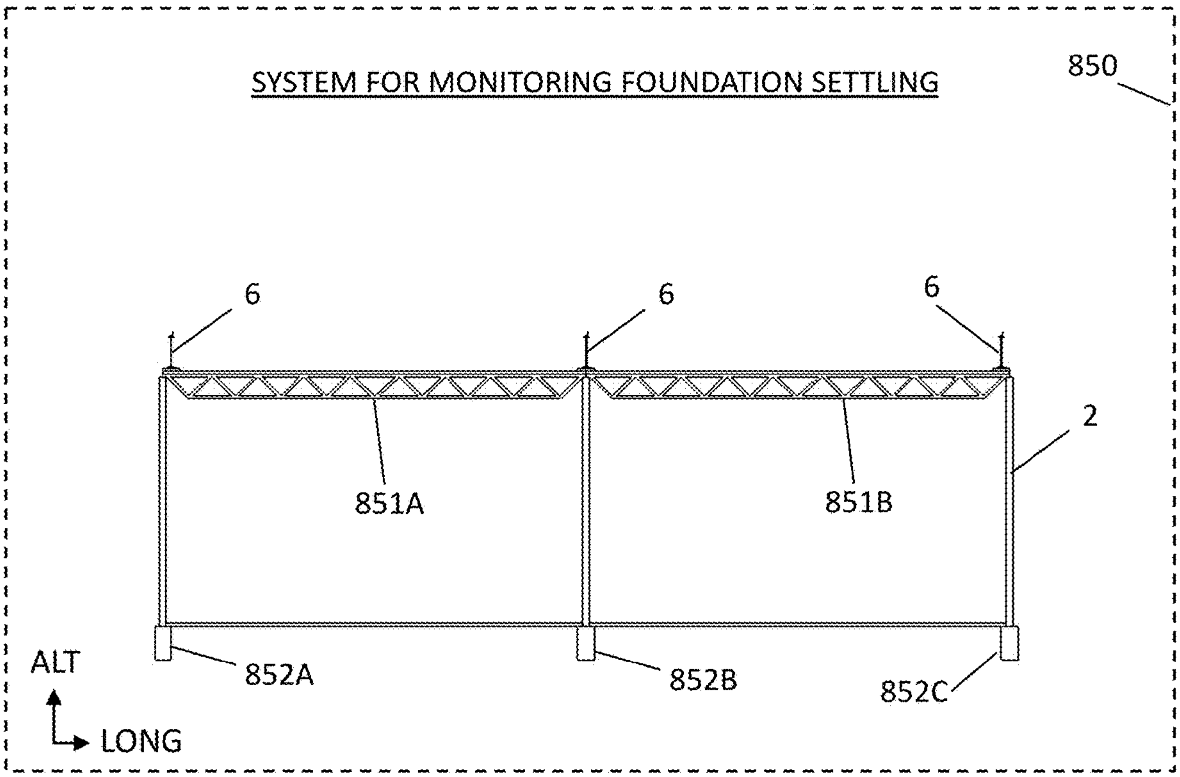
Figure 216:
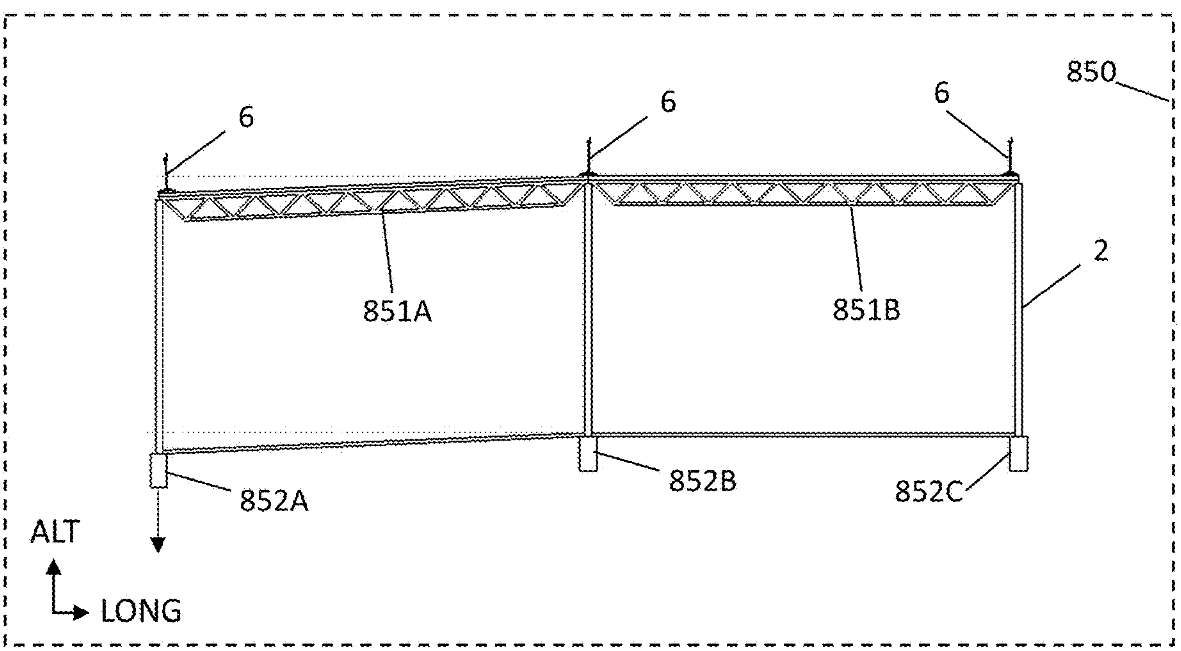
Figure 217:
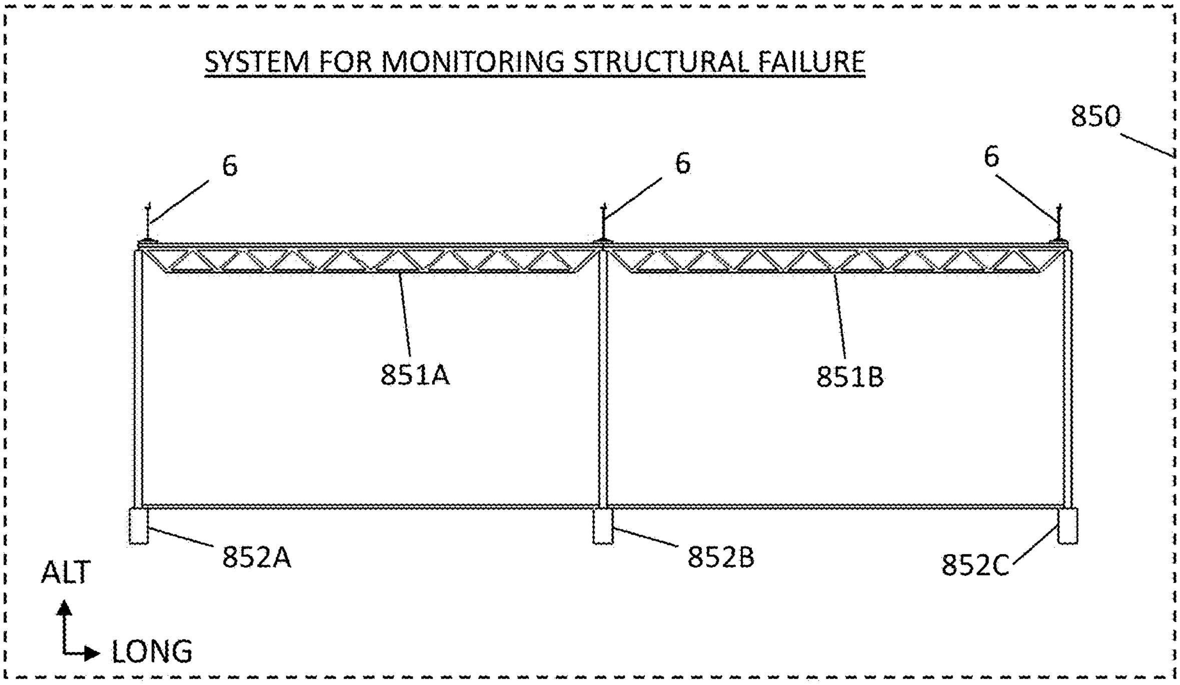
Figure 218:
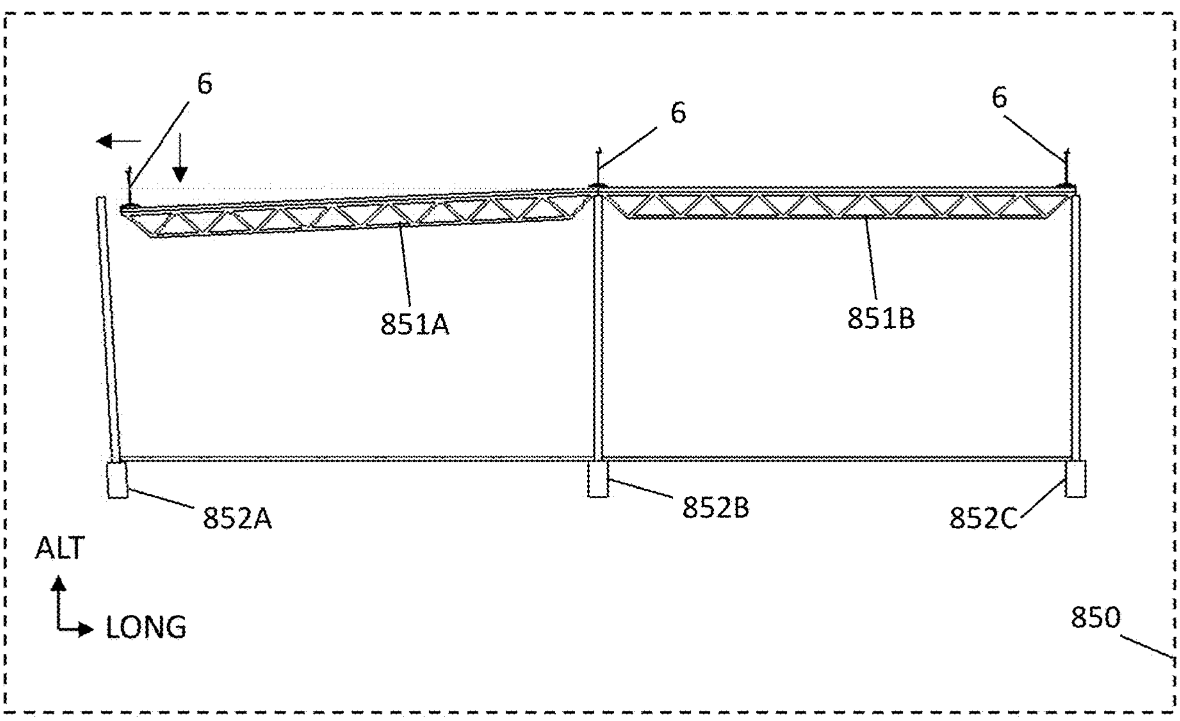
Figure 219:
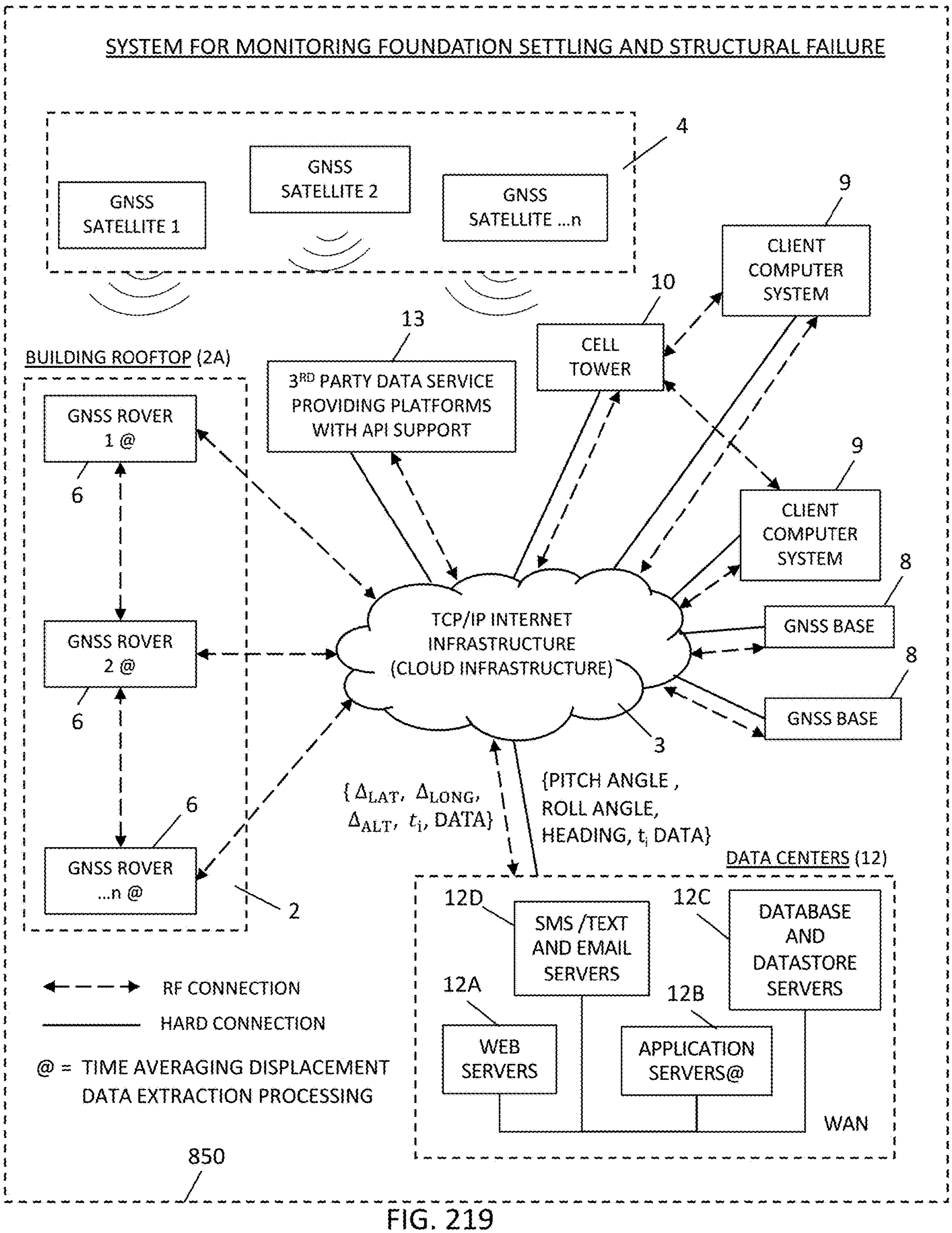
Figure 220:
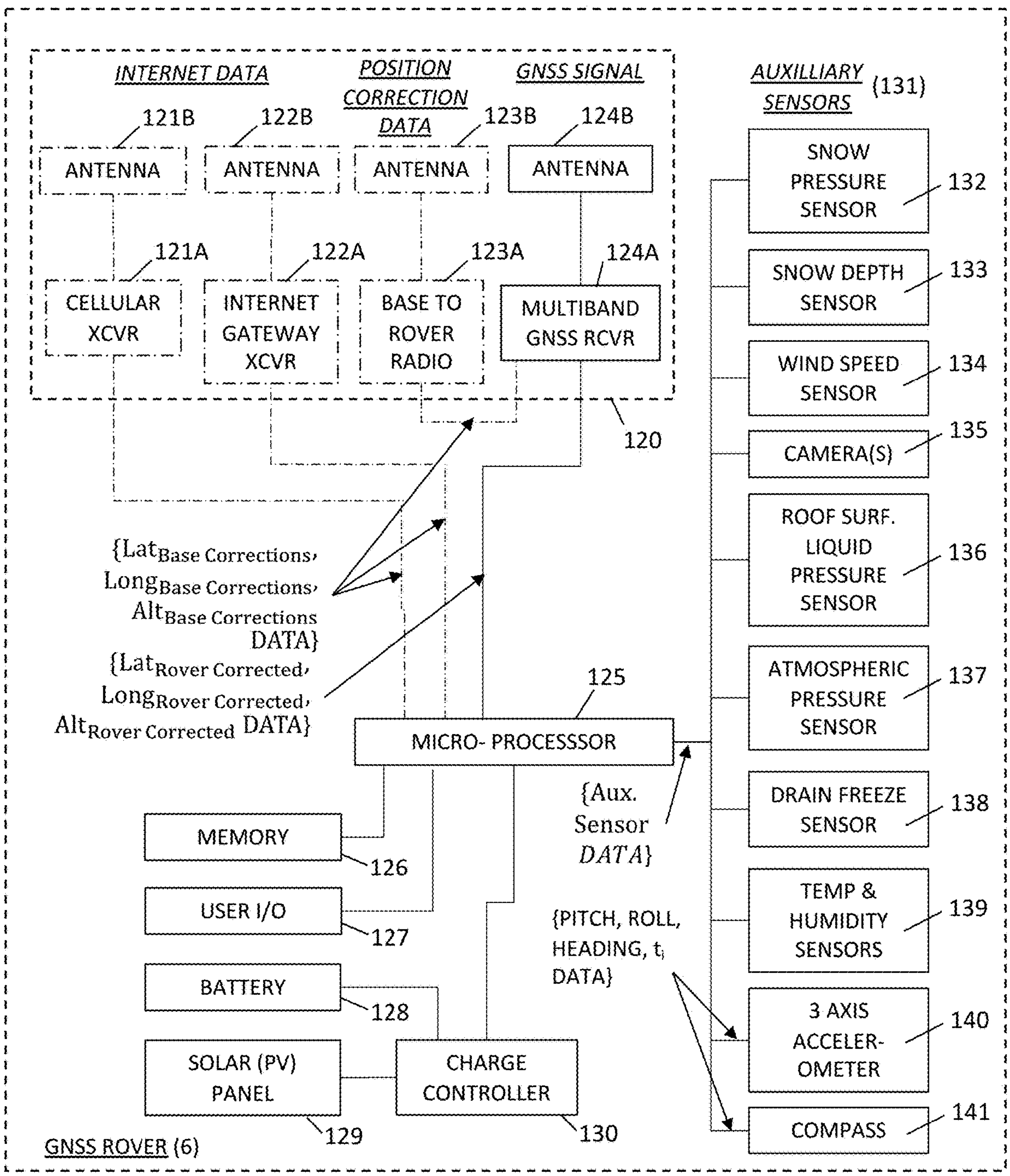
Figure 221:
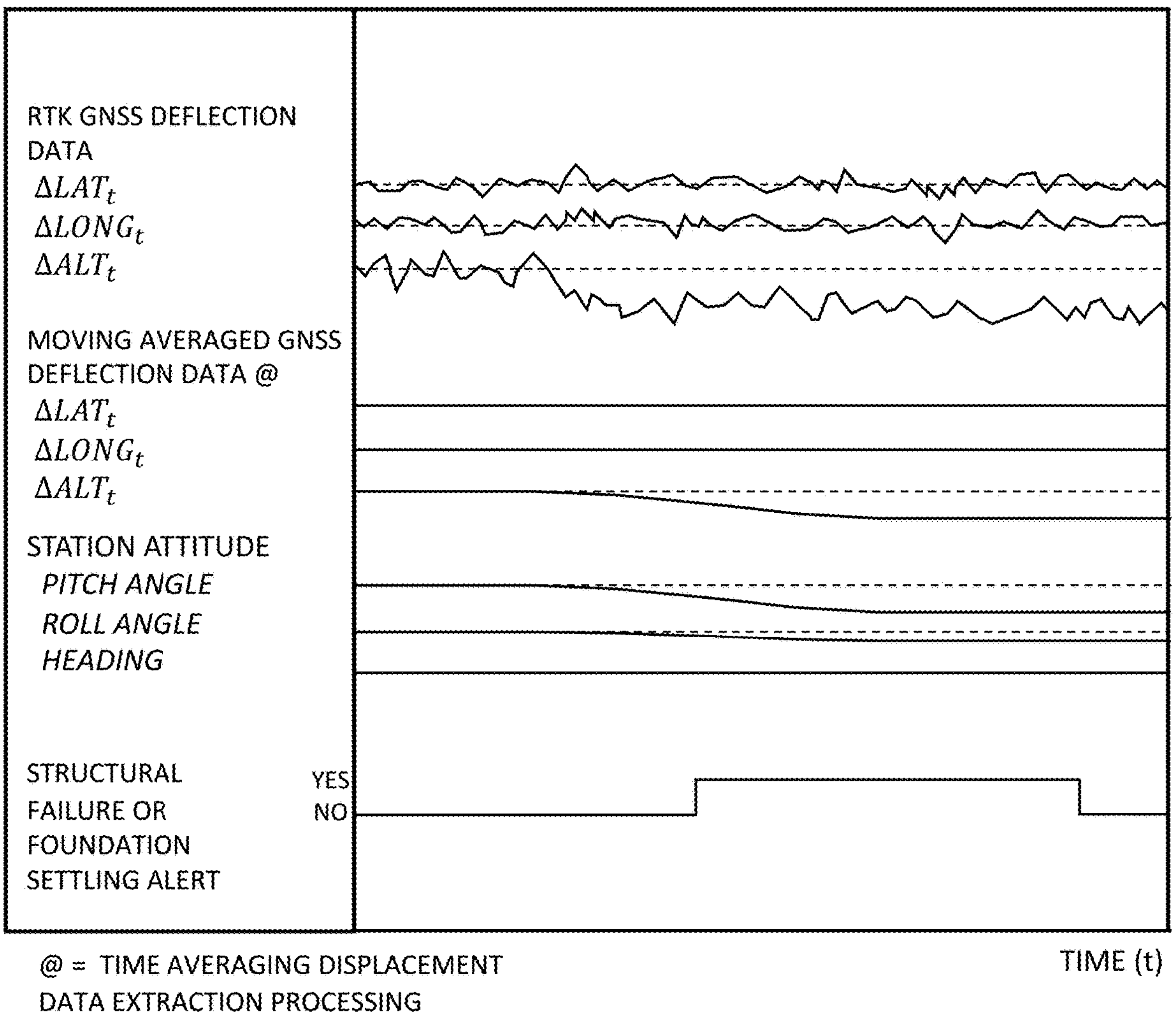
Figure 223:
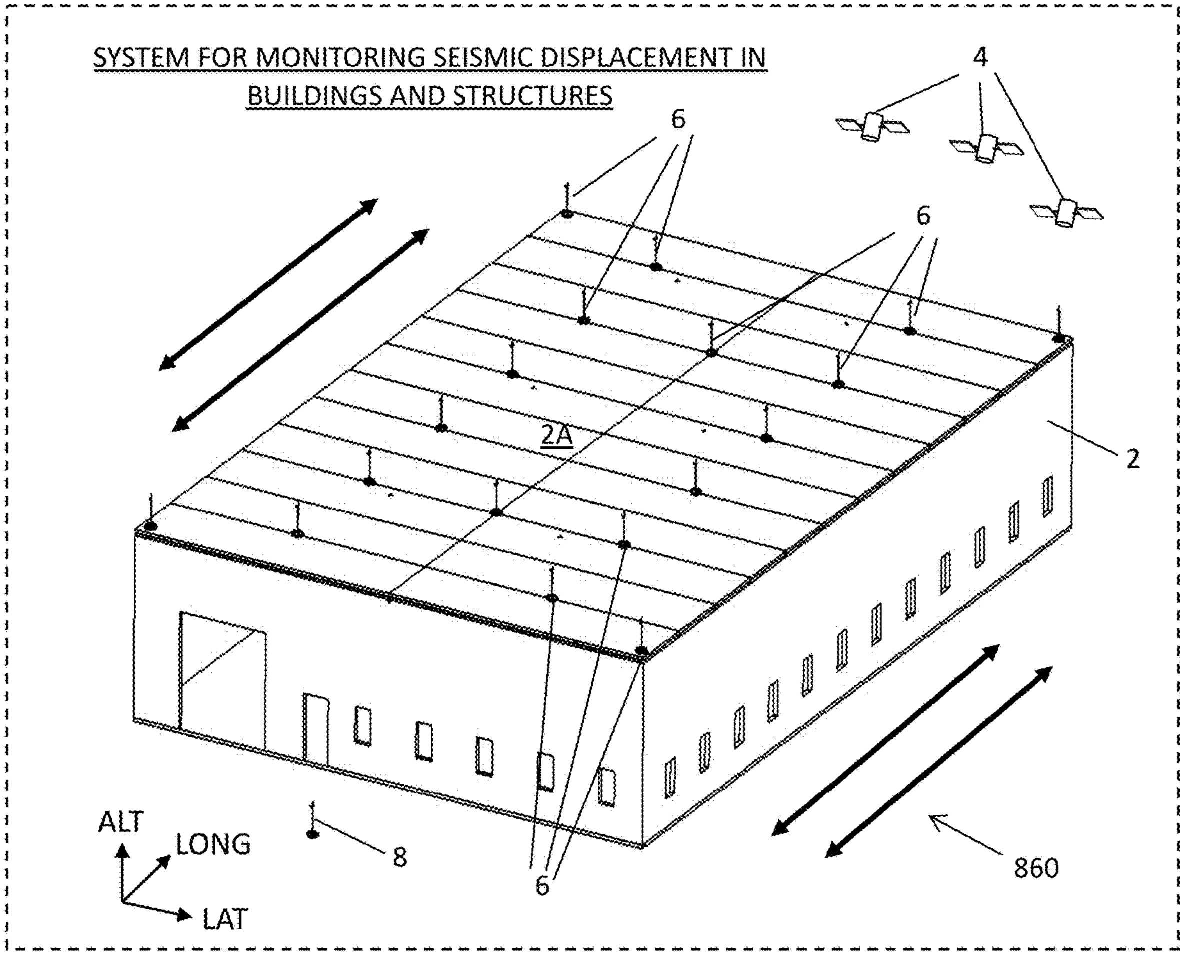
Figure 224:
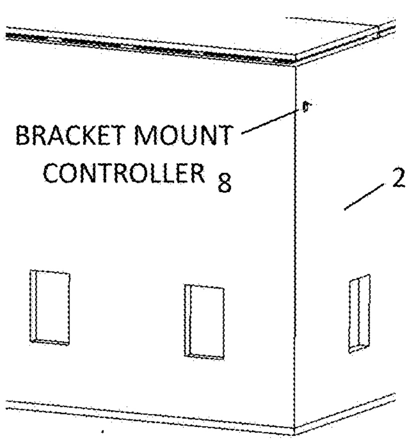
Figure 225:
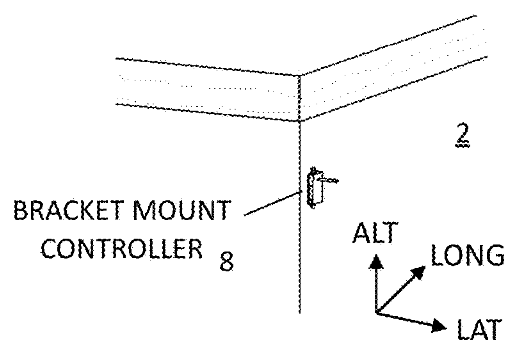
Figure 226:
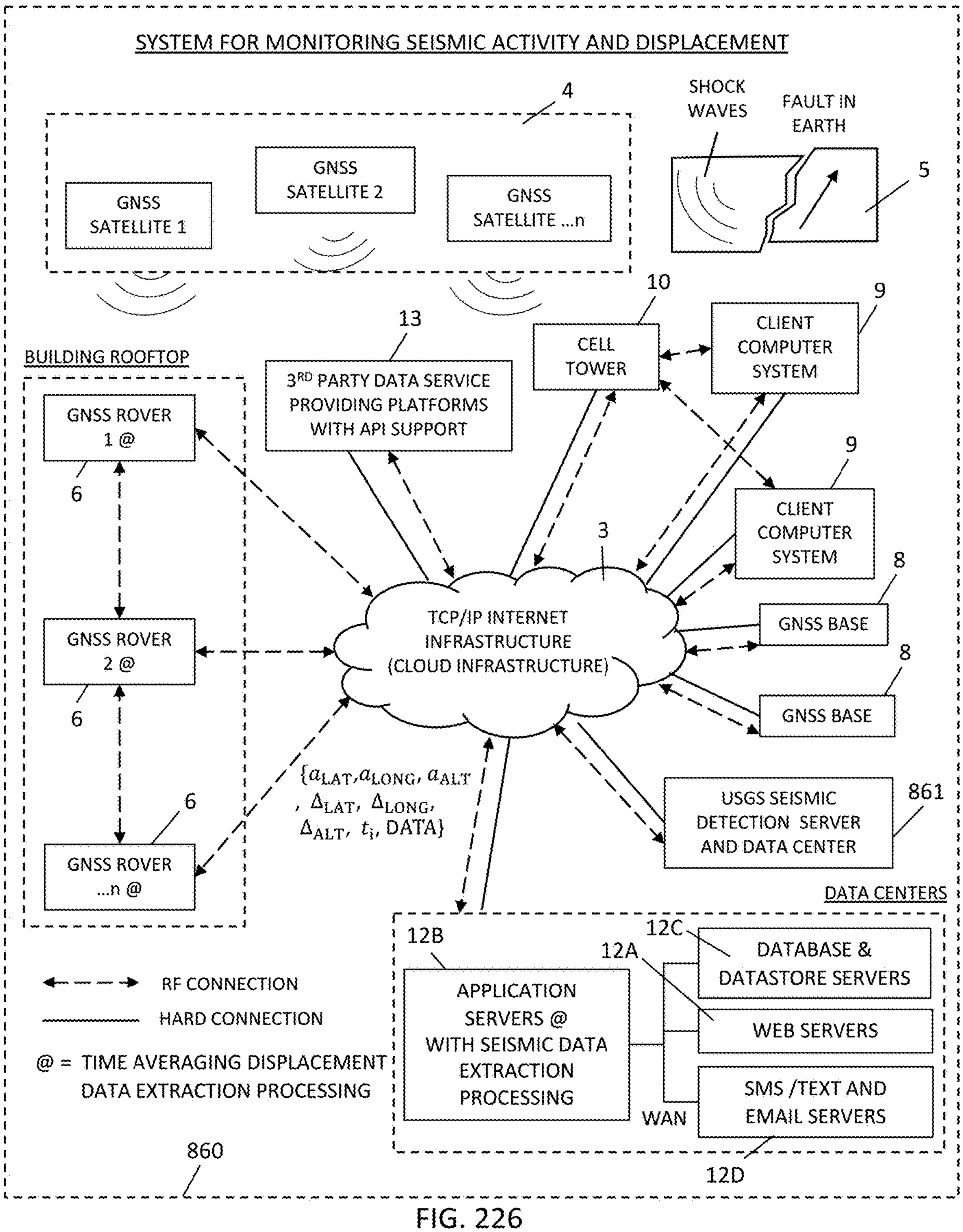
Figure 227:
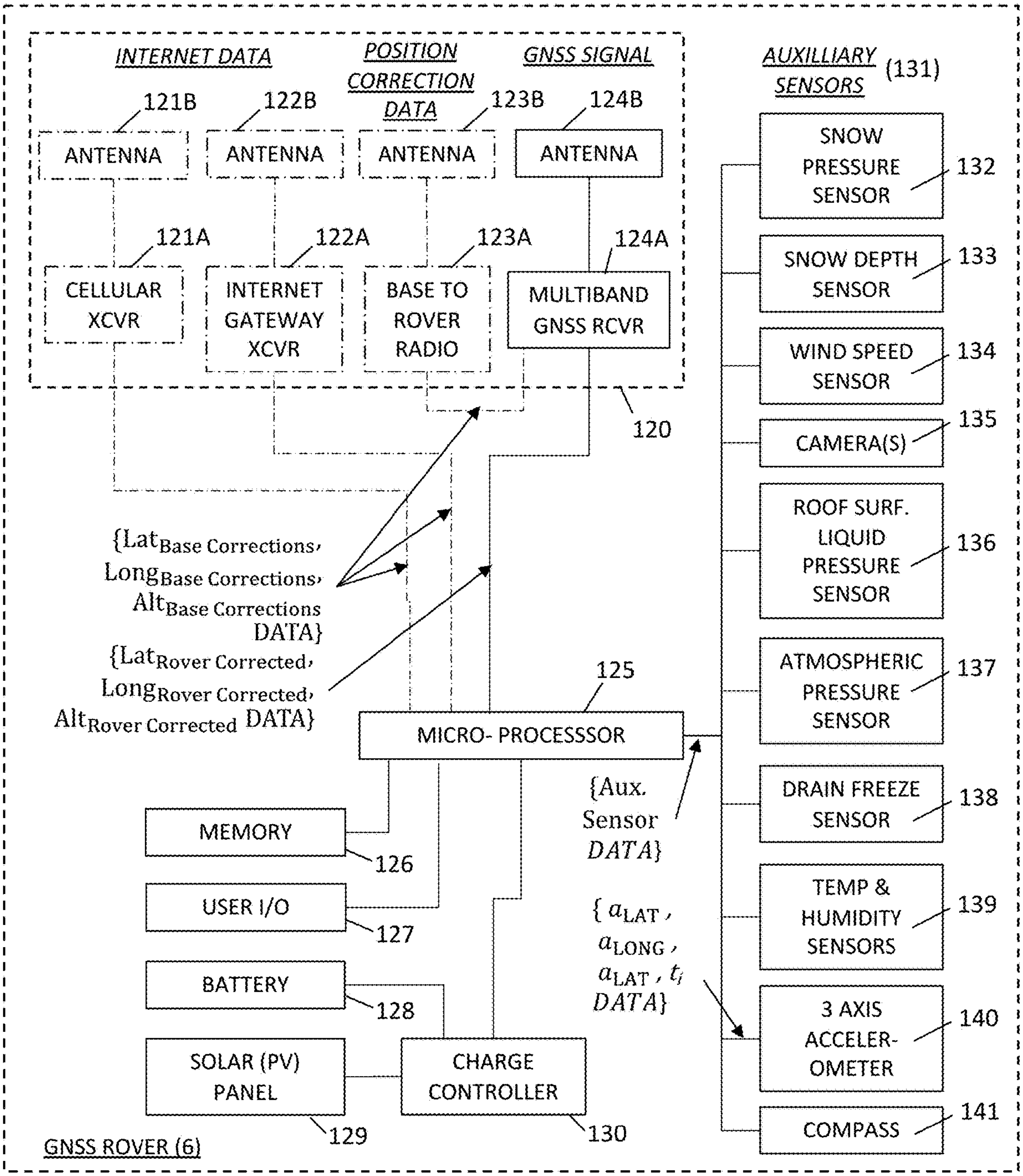
Figure 228:
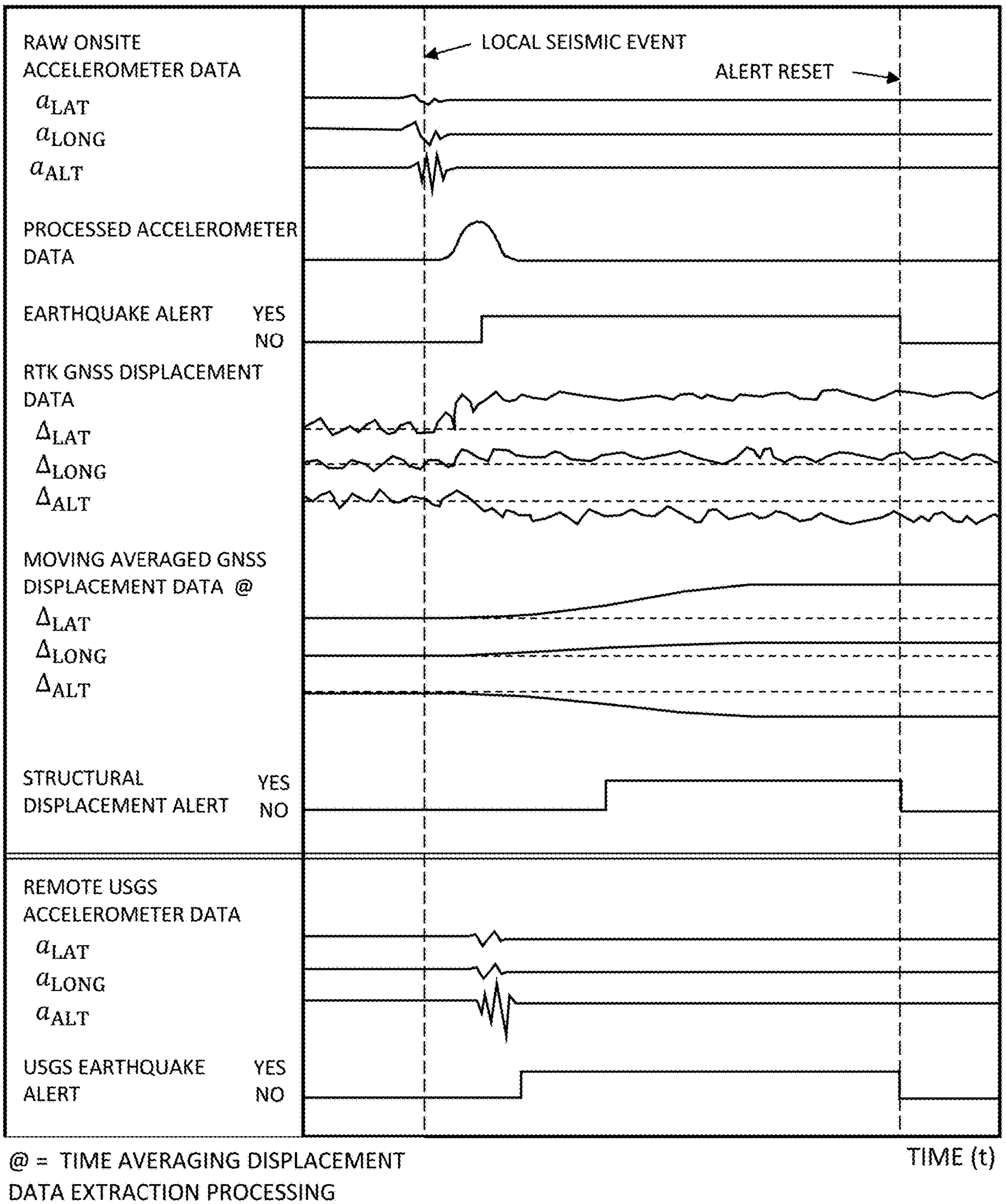
Figure 230:
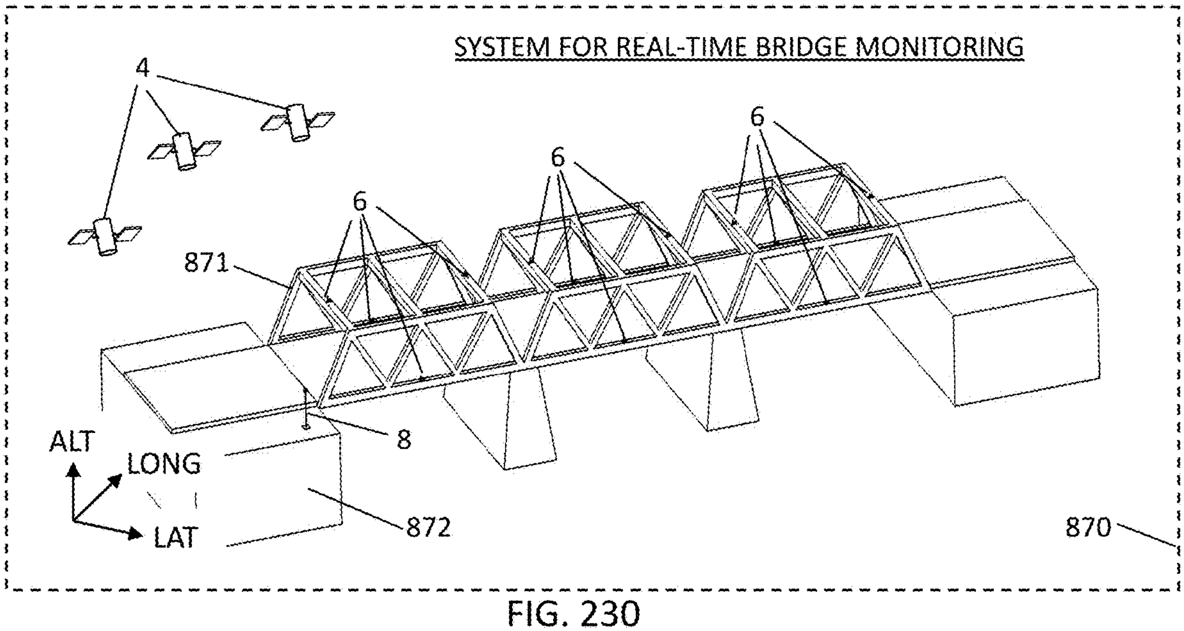
Figure 231:
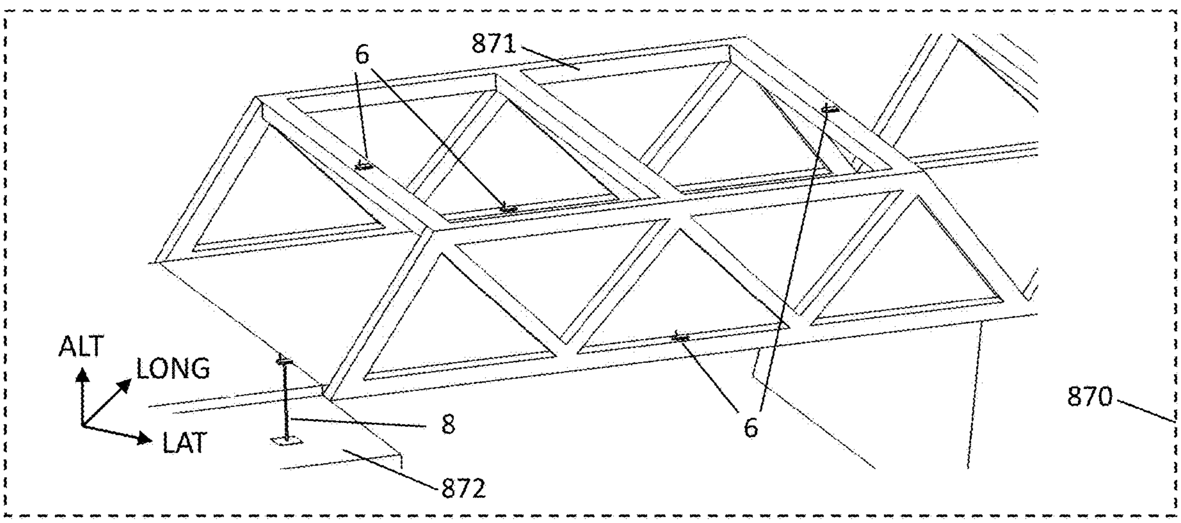
Figure 232:
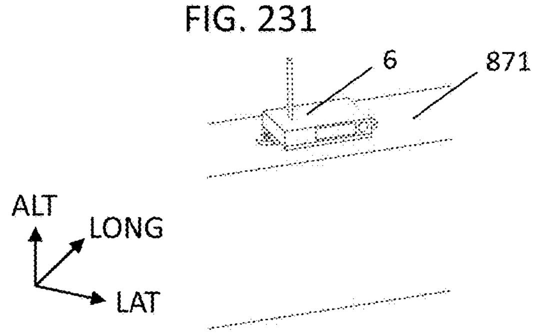
Figure 233:
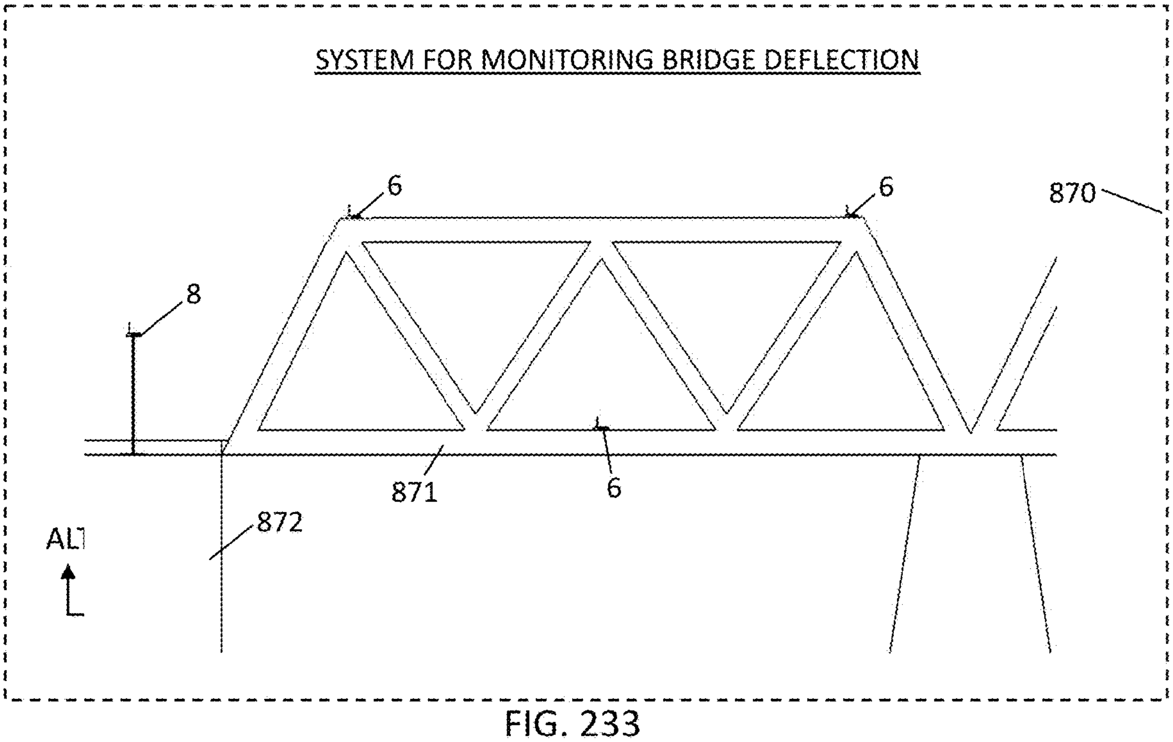
Figure 234:
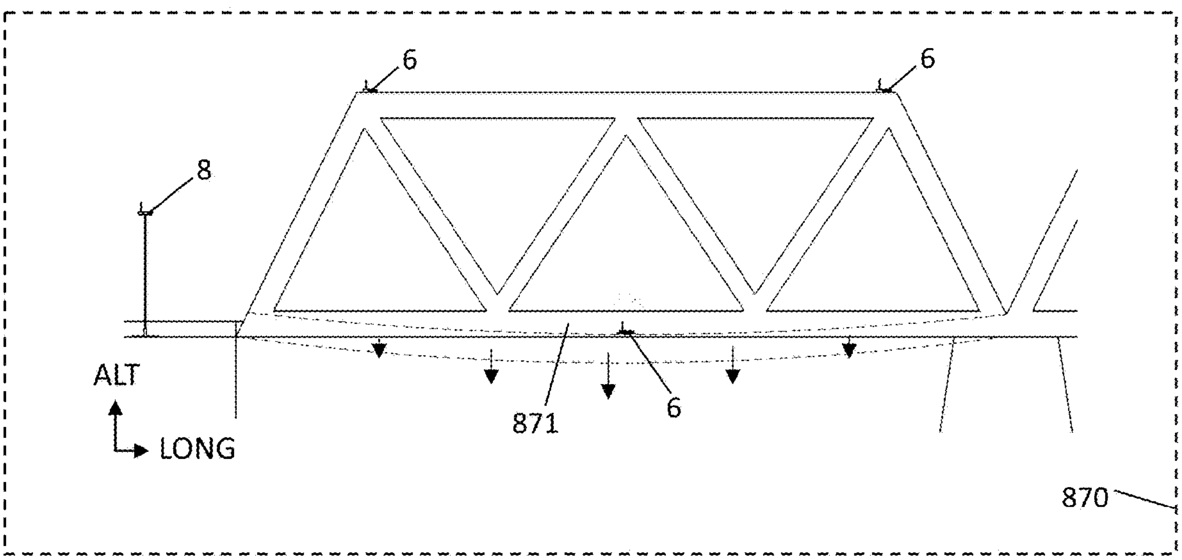
Figure 235:
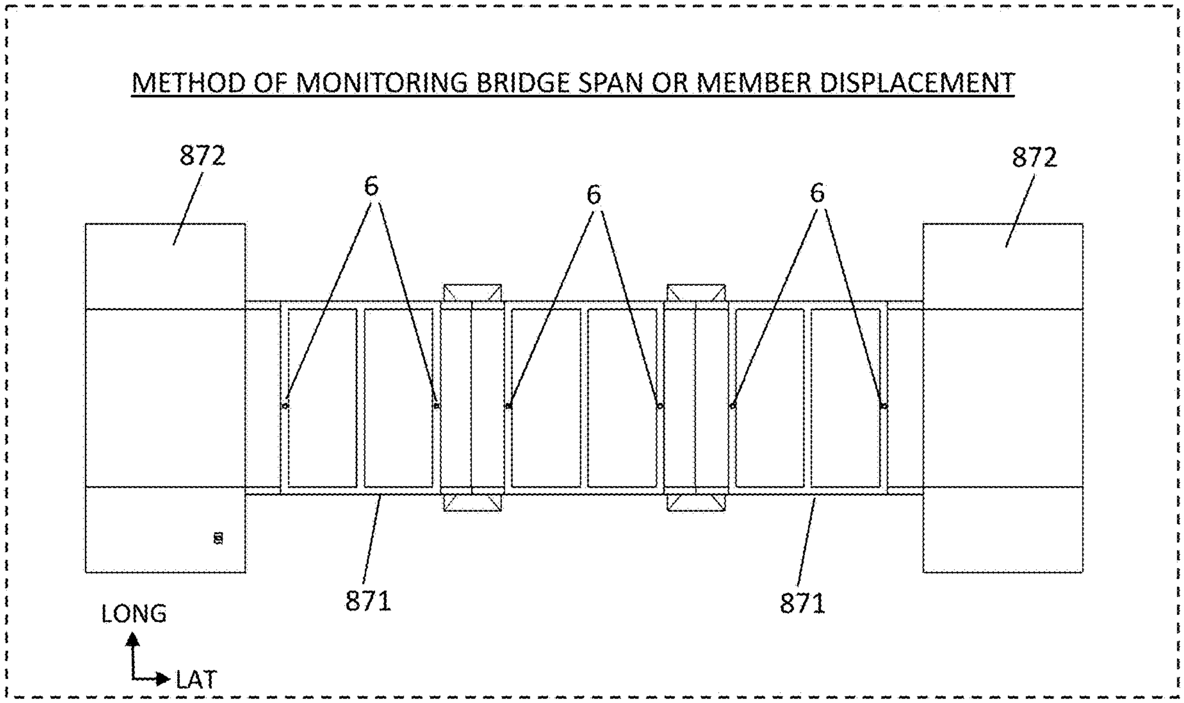
Figure 236:
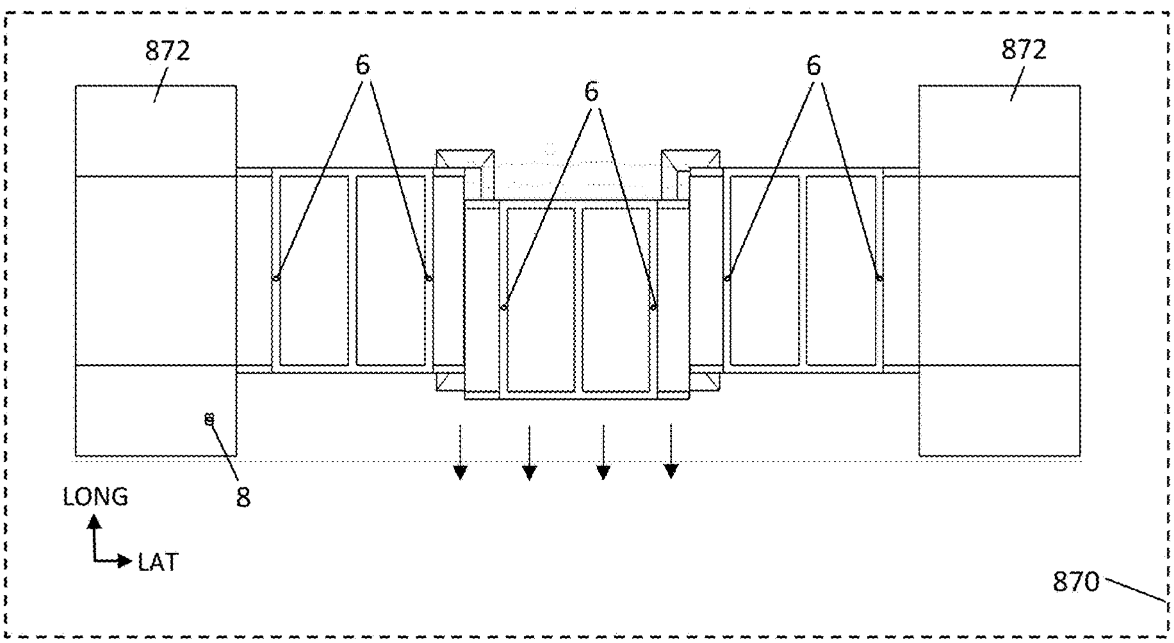
Figure 237:
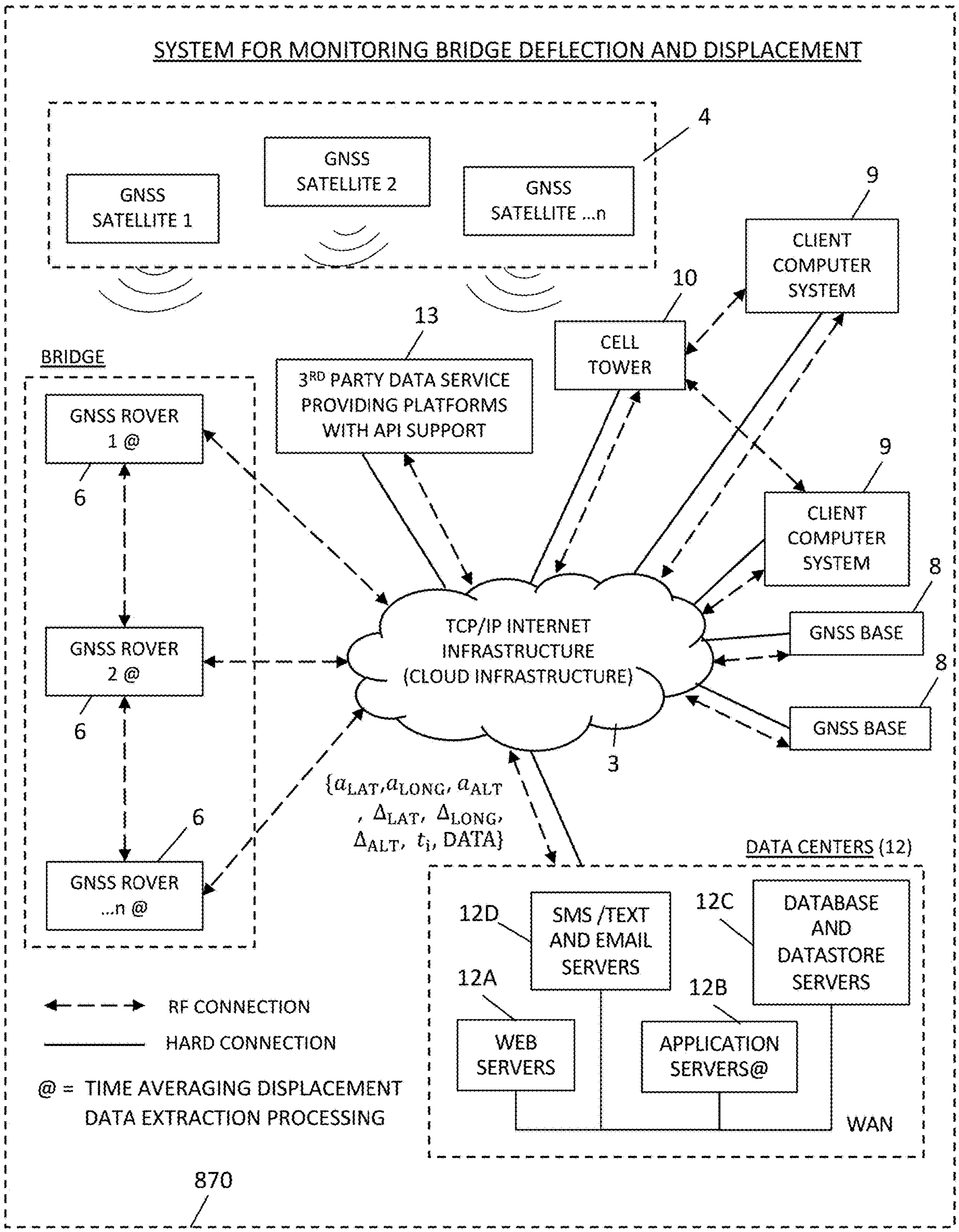
Figure 238:
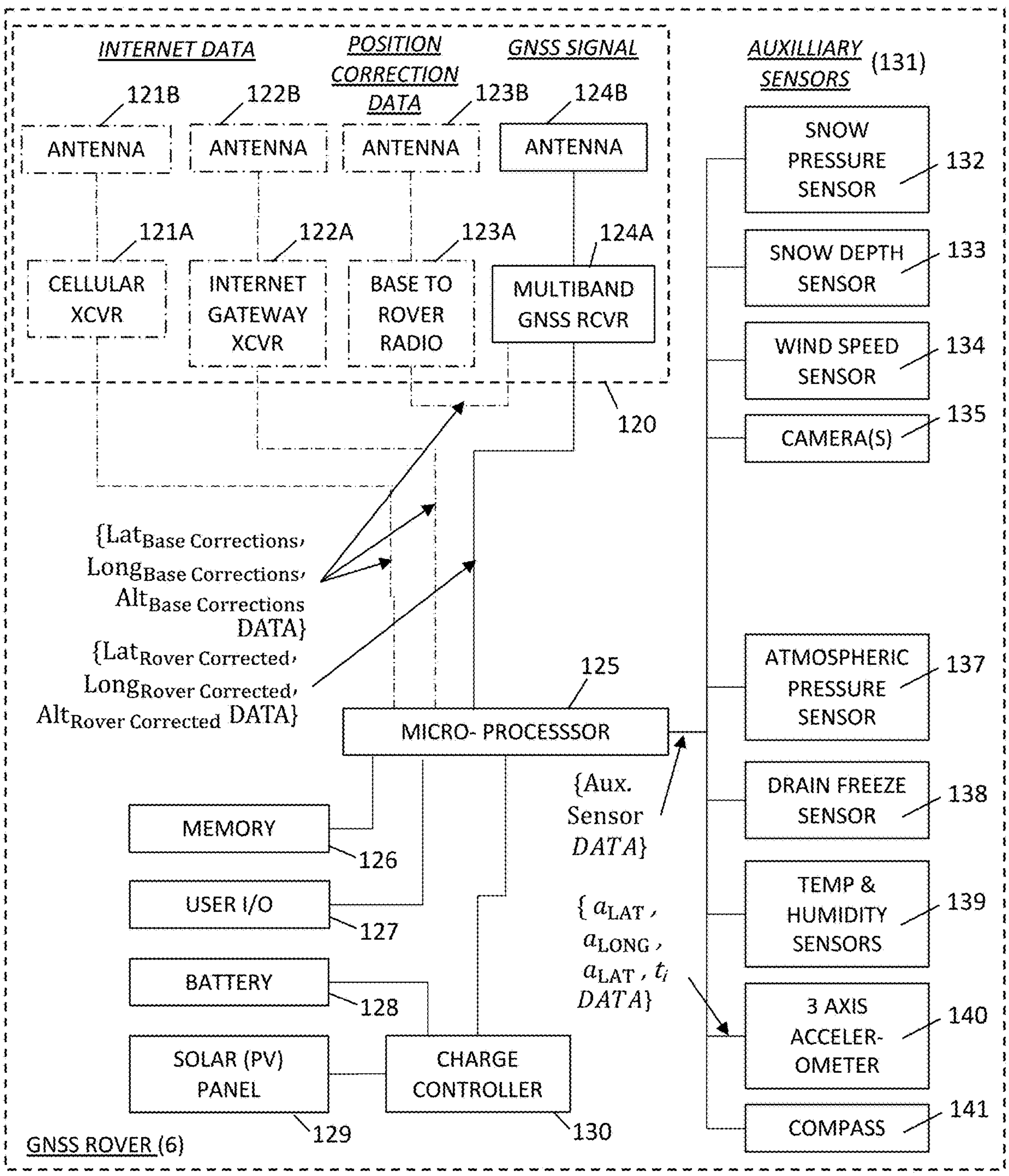
Figure 239:
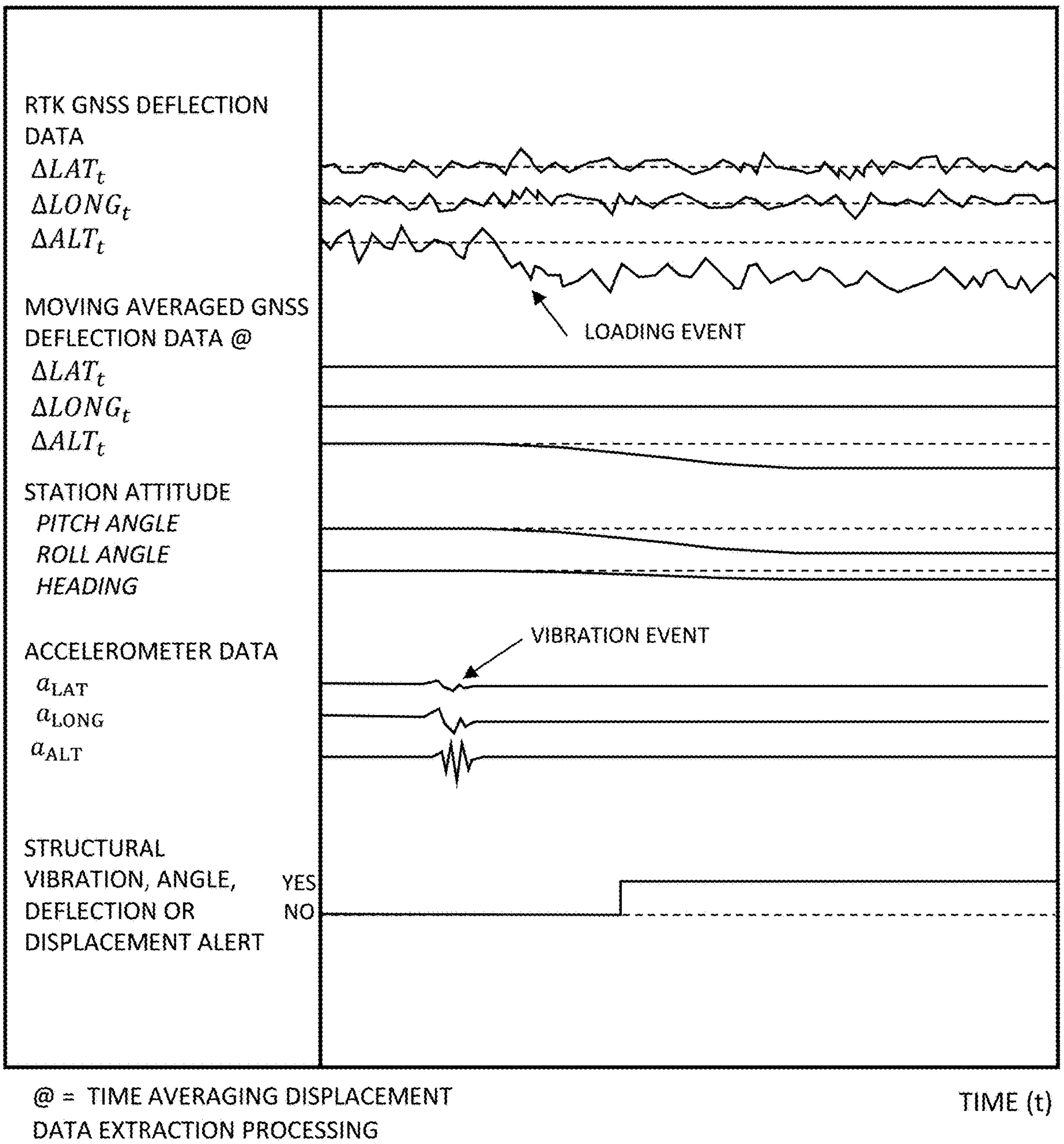
Figure 241:
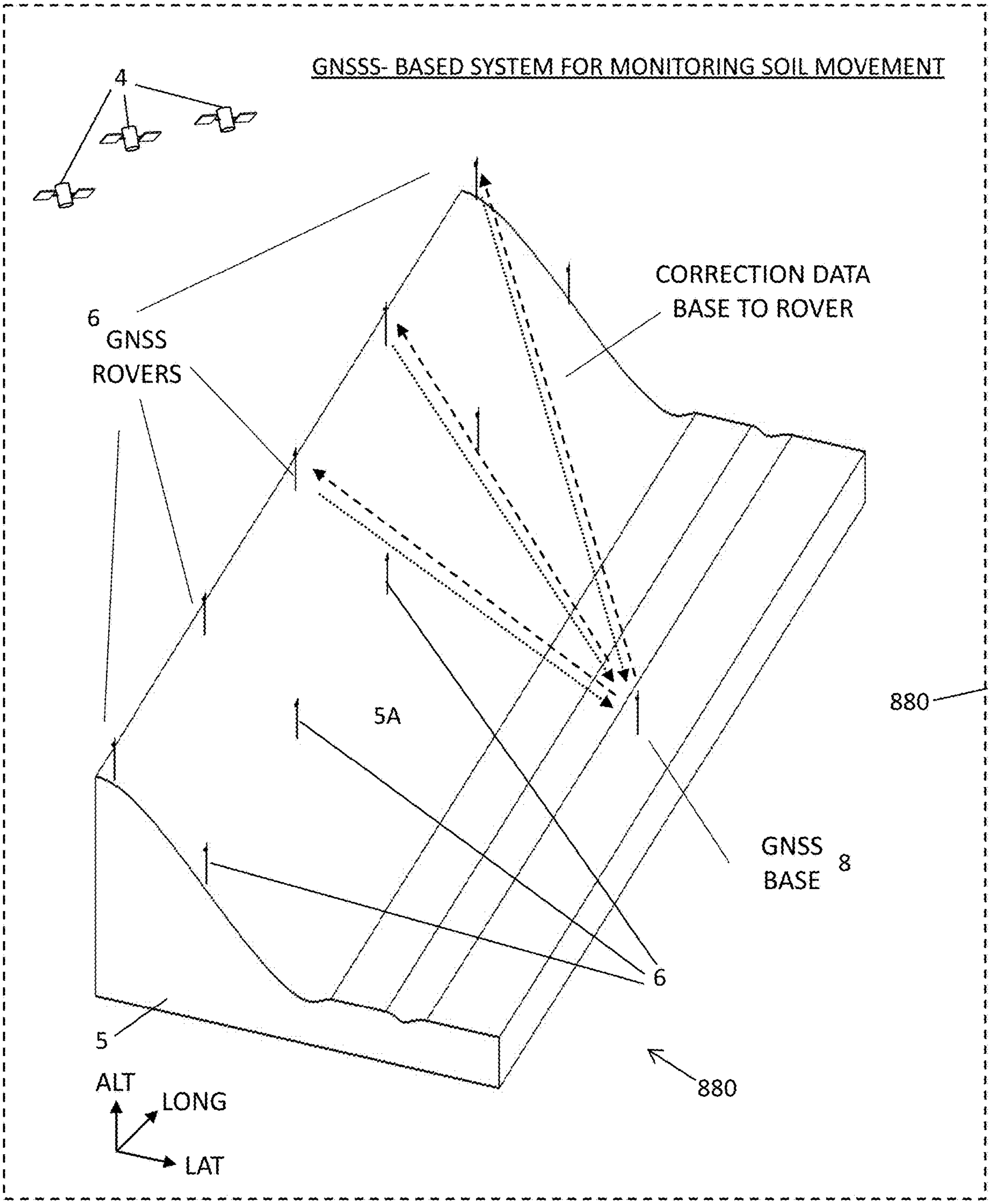
Figure 242:
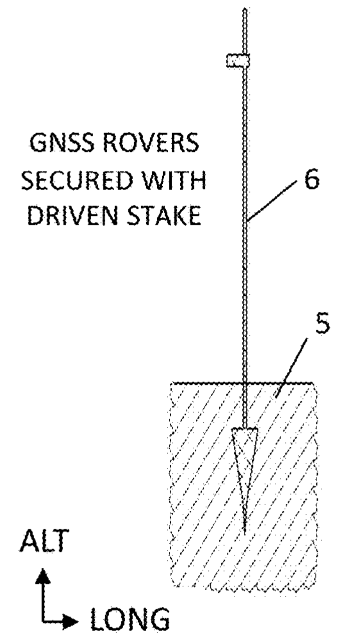
Figure 243:
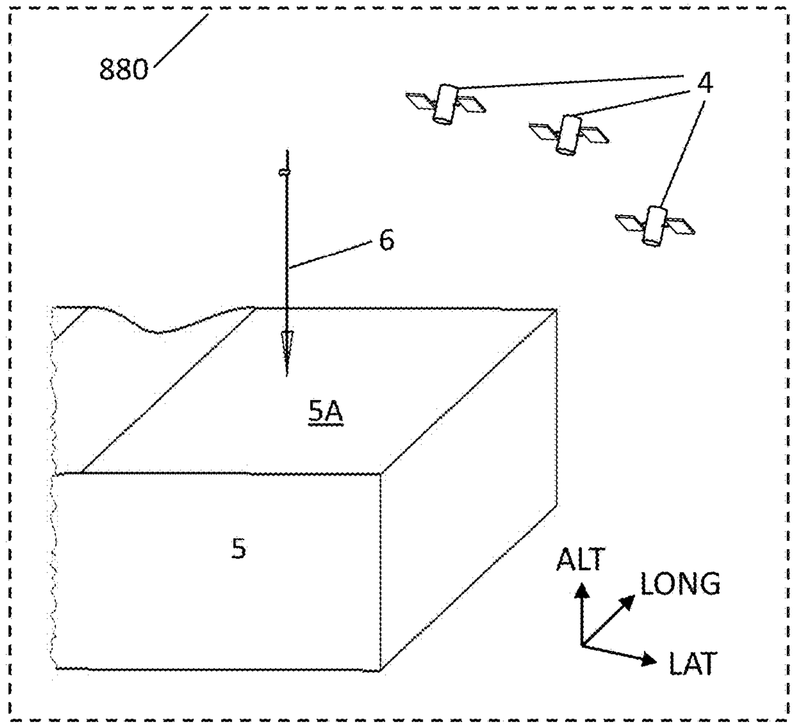
Figure 244:
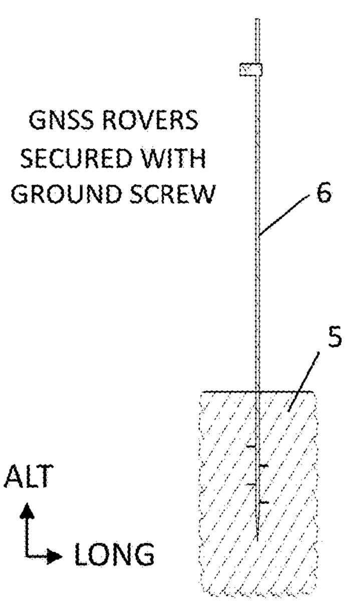
Figure 245:
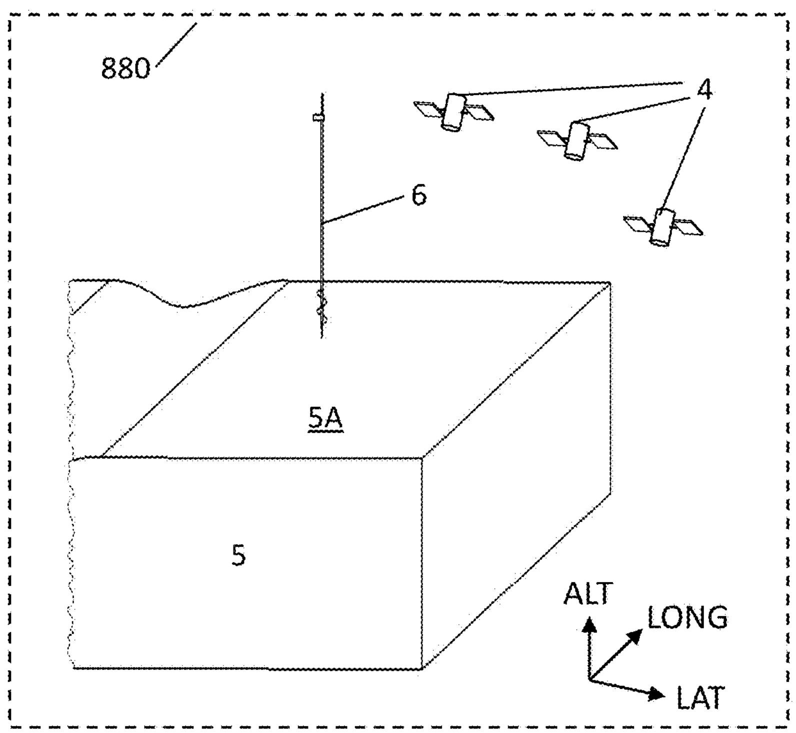
Figure 247A:
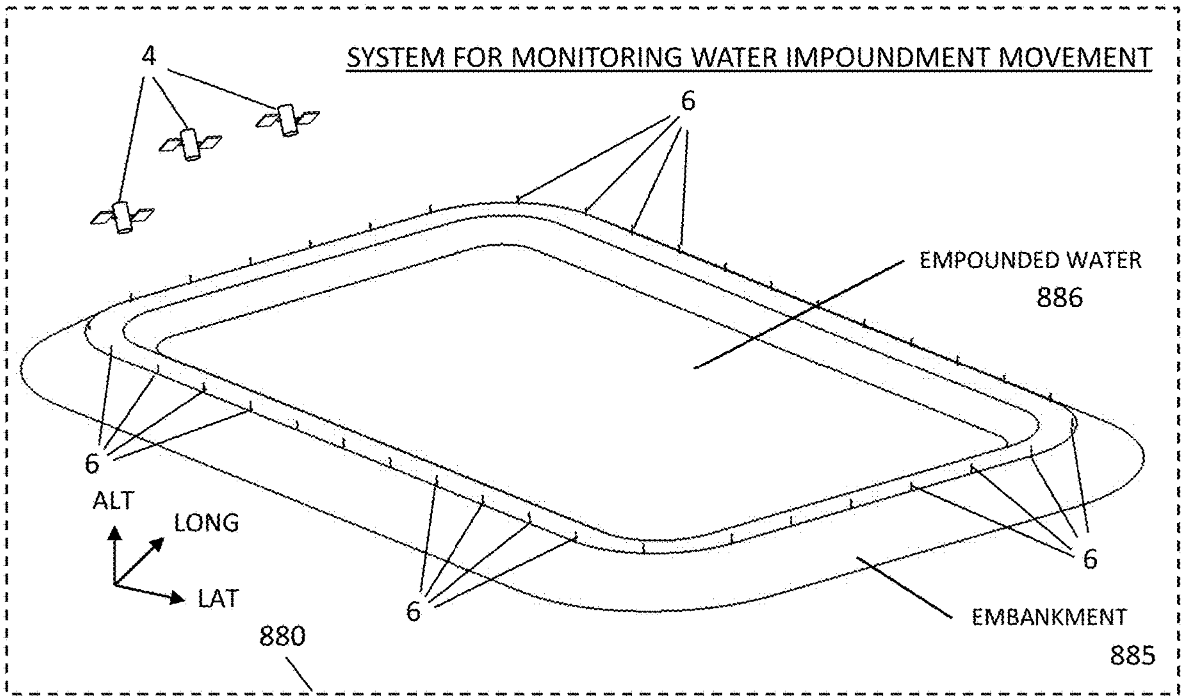
Figure 247B:
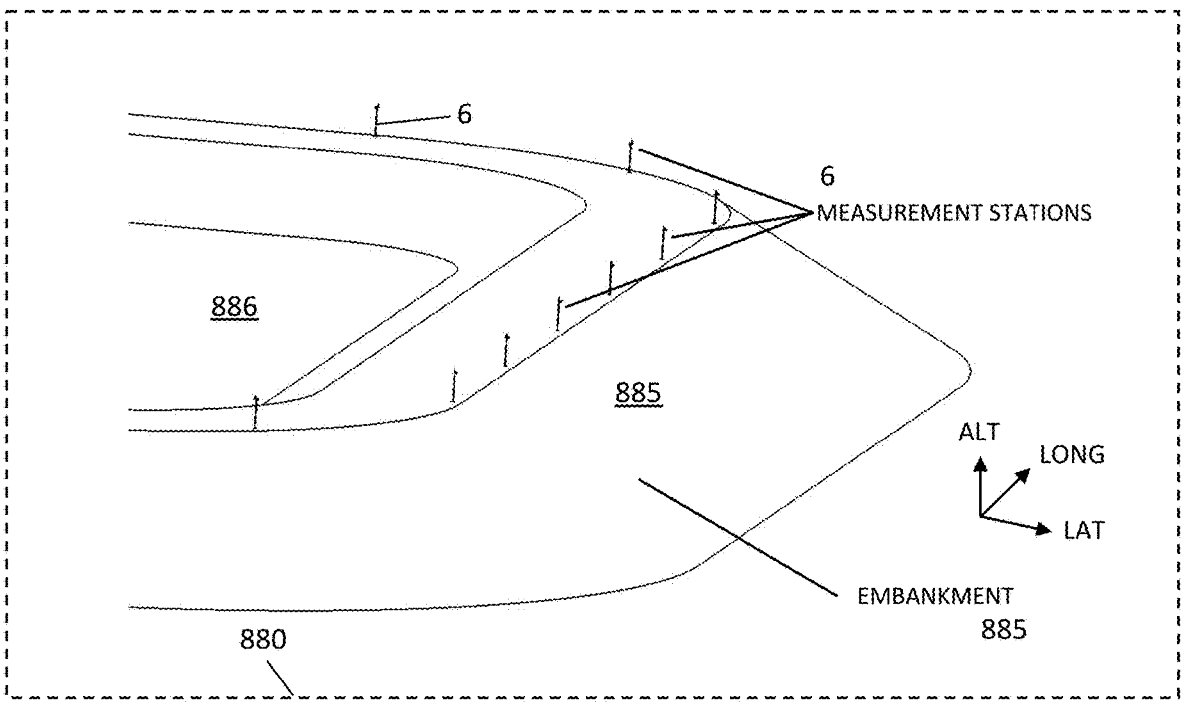
Figure 248A:
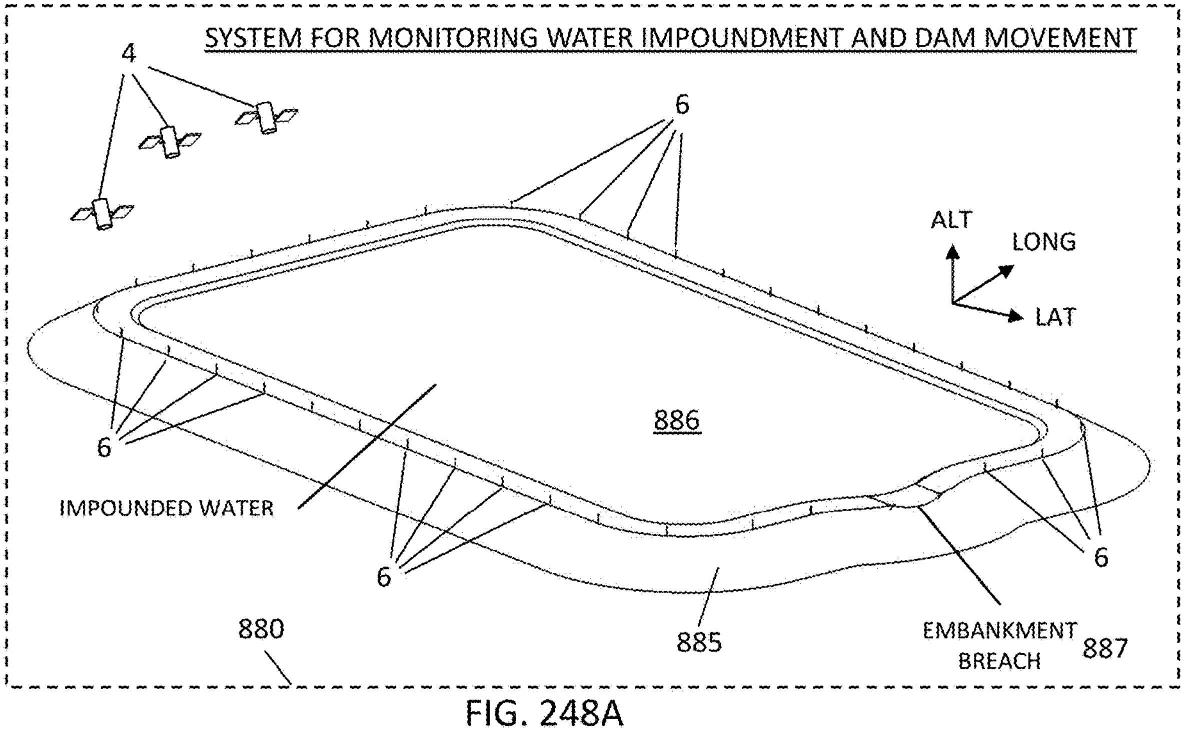
Figure 248B:
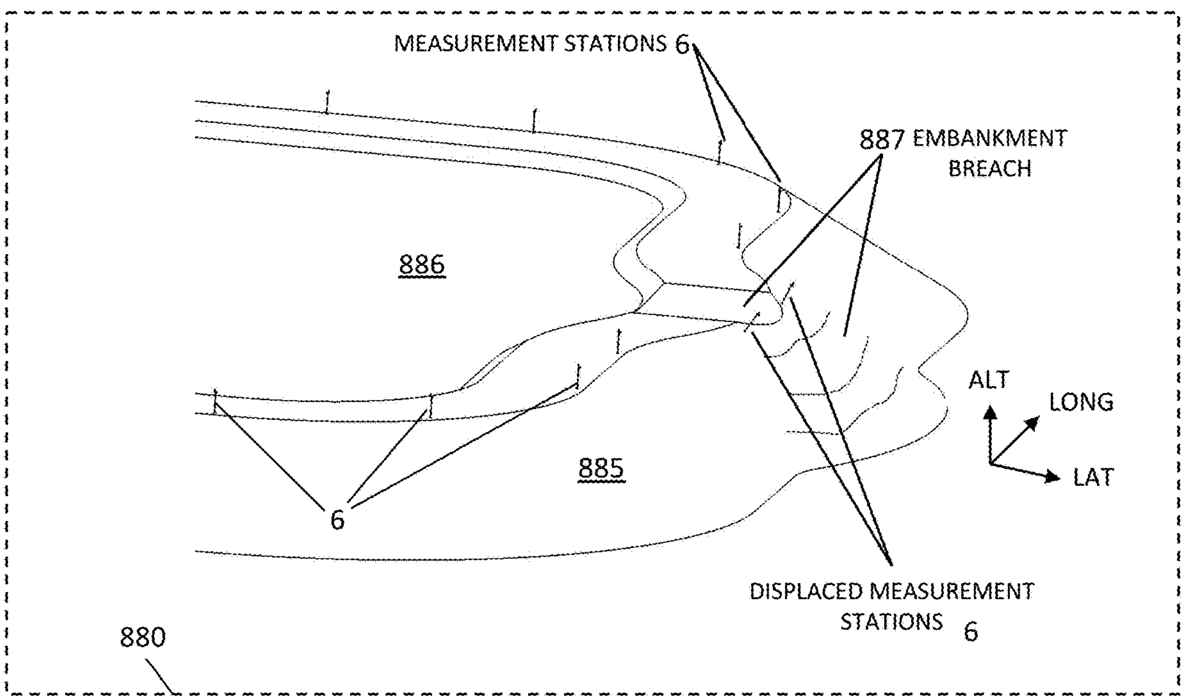
Figure 249A:
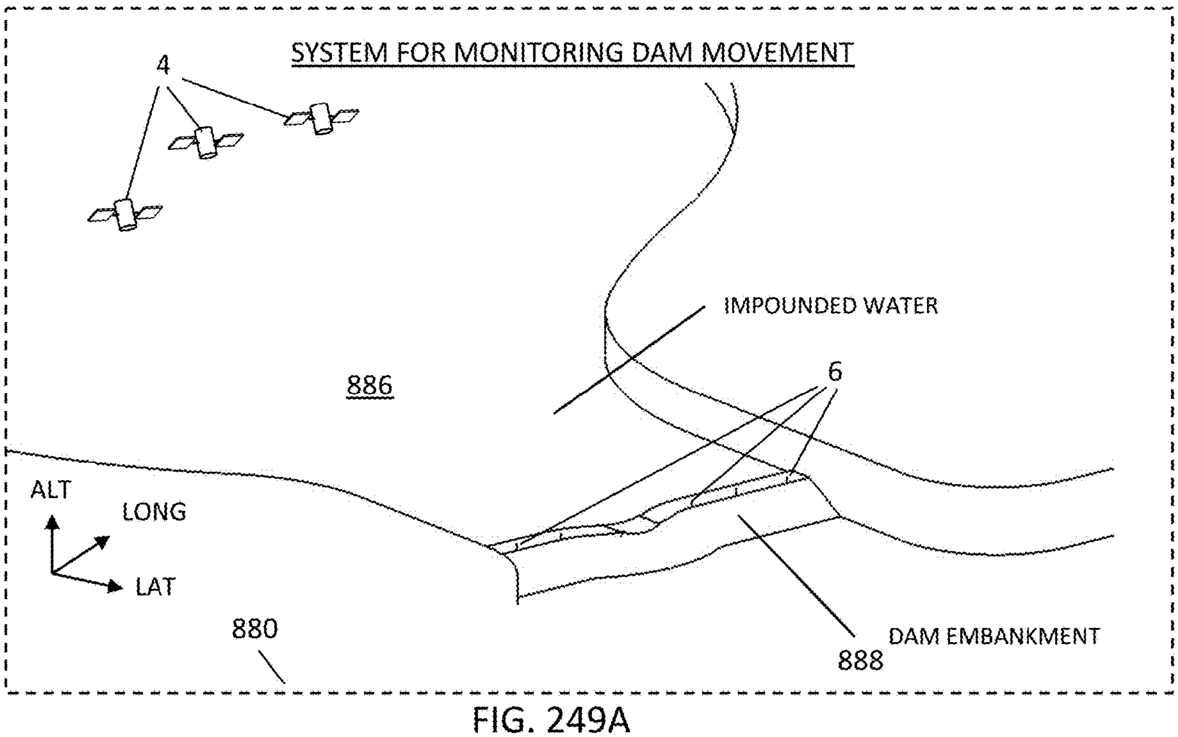
Figure 249B:
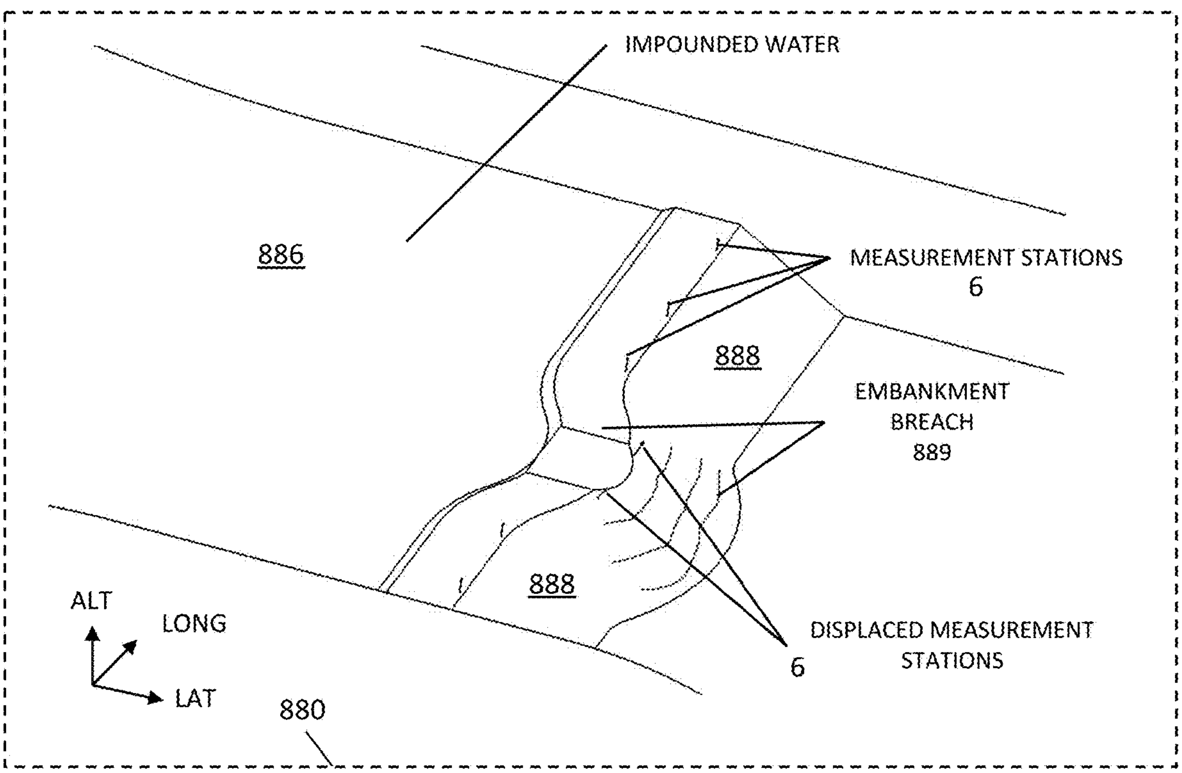
Figure 250:
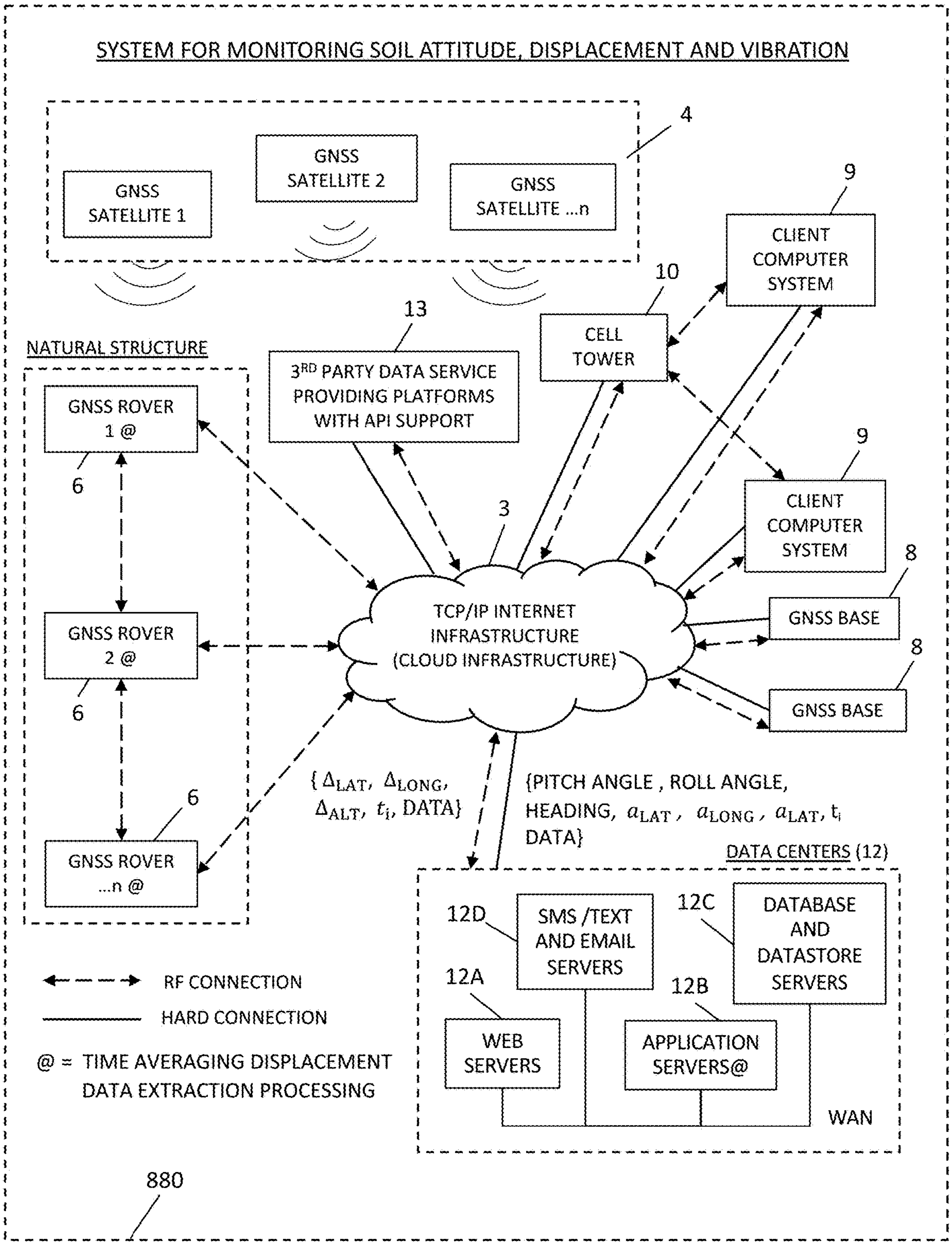
Figure 251:
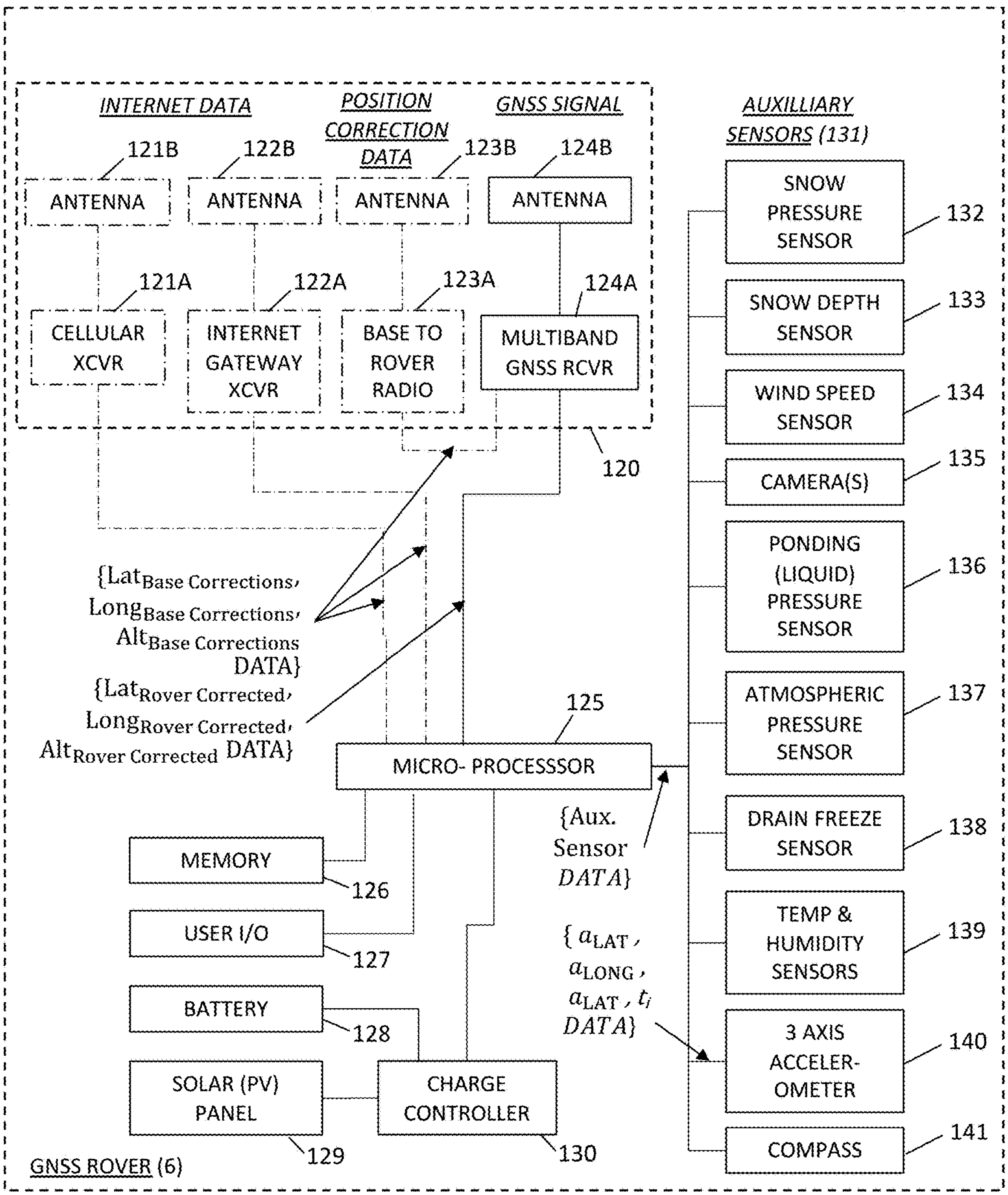
Figure 252:
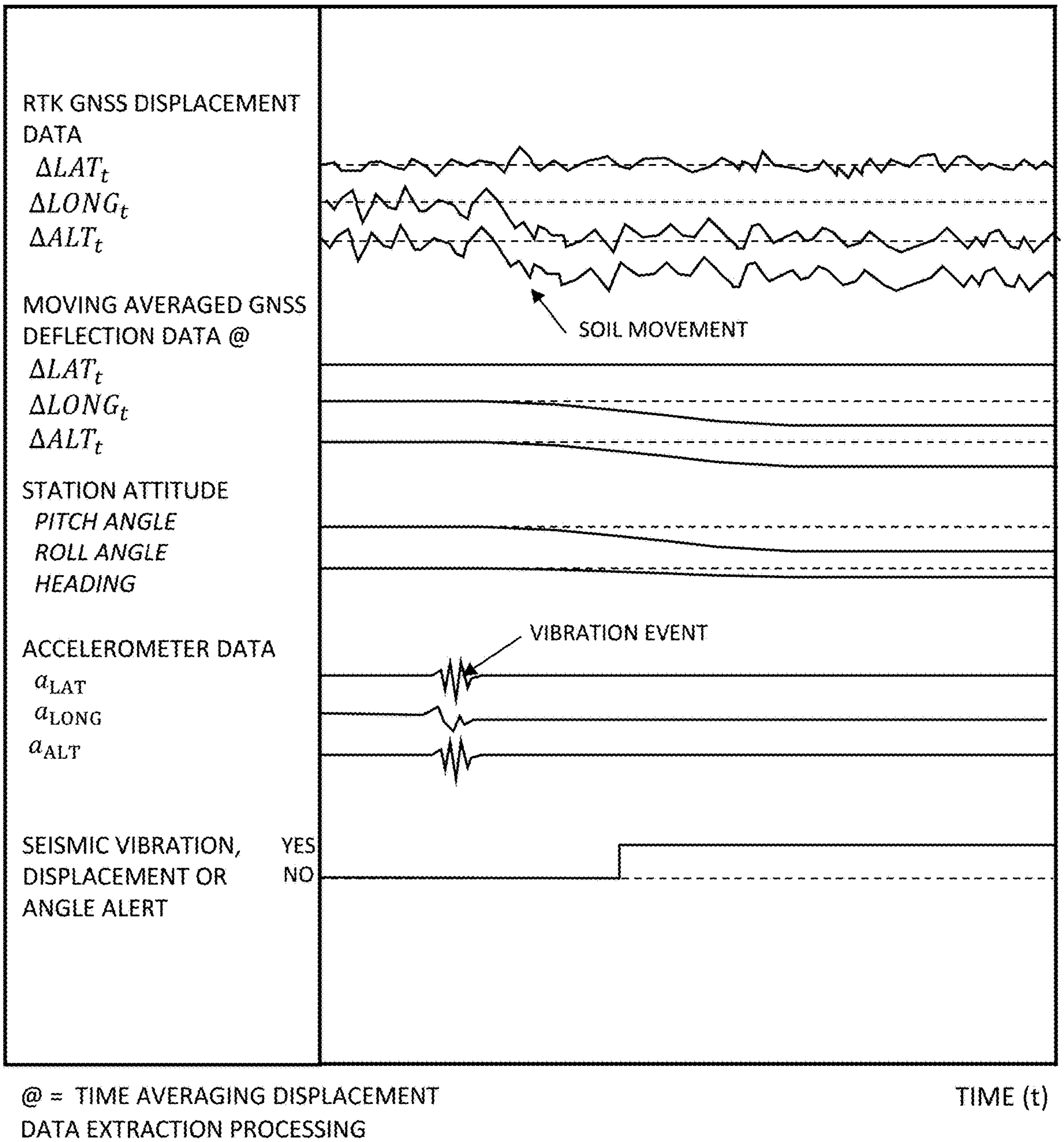
Figure 254:
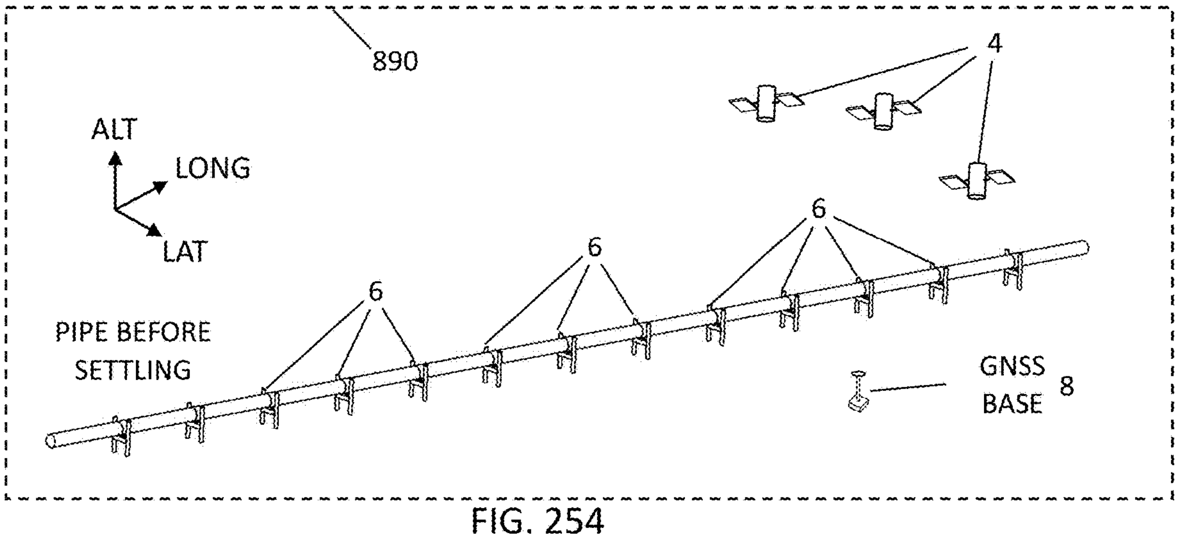
Figure 255:
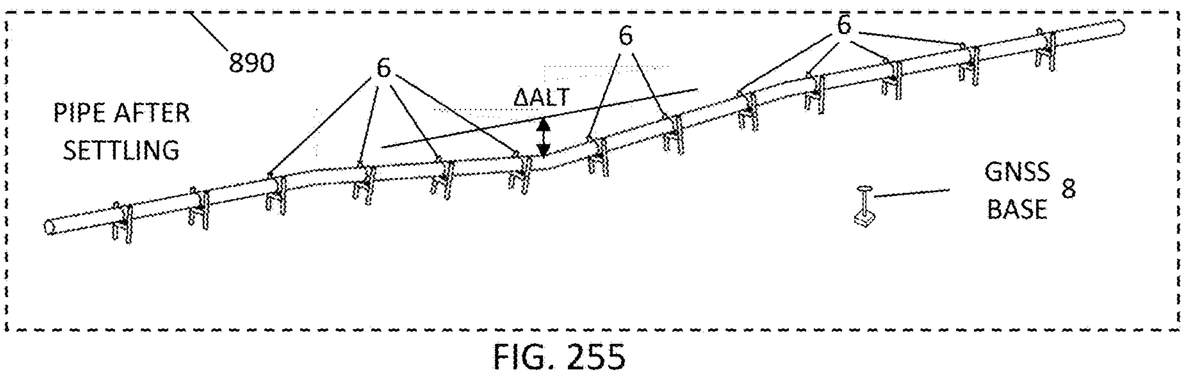
Figure 256:
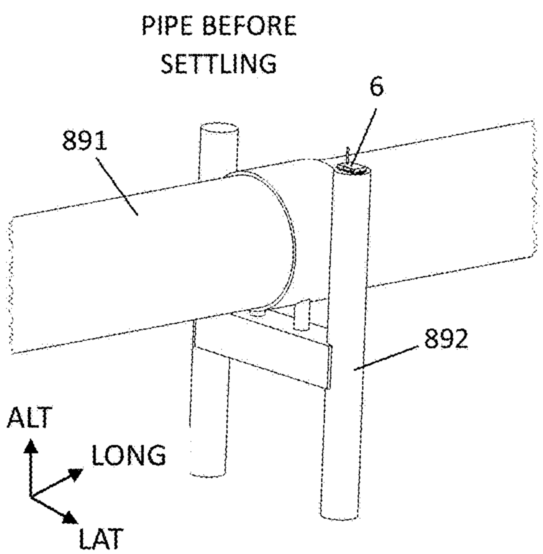
Figure 257:
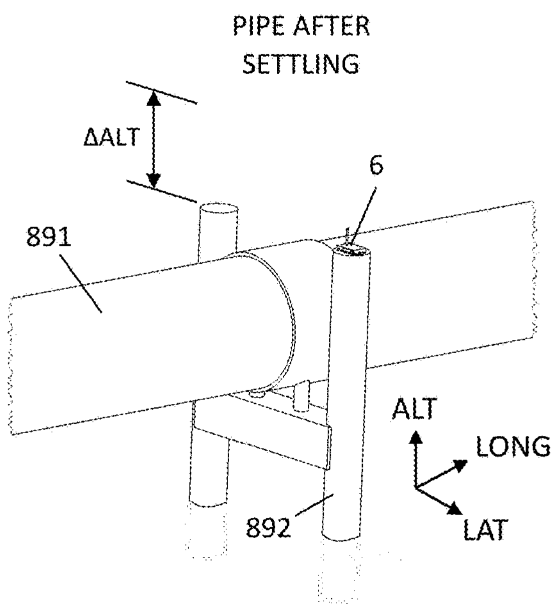
Figure 258:
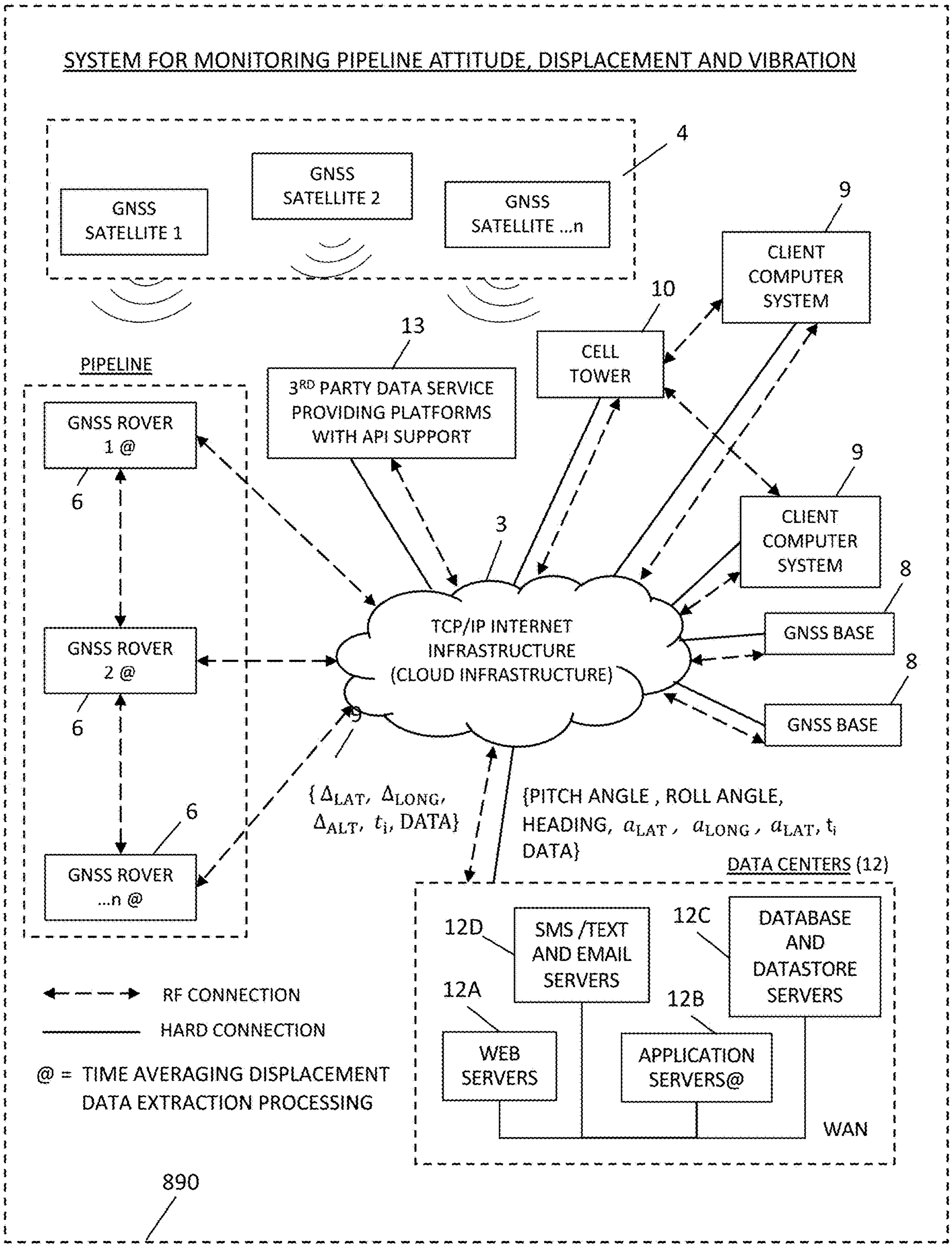
Figure 259:
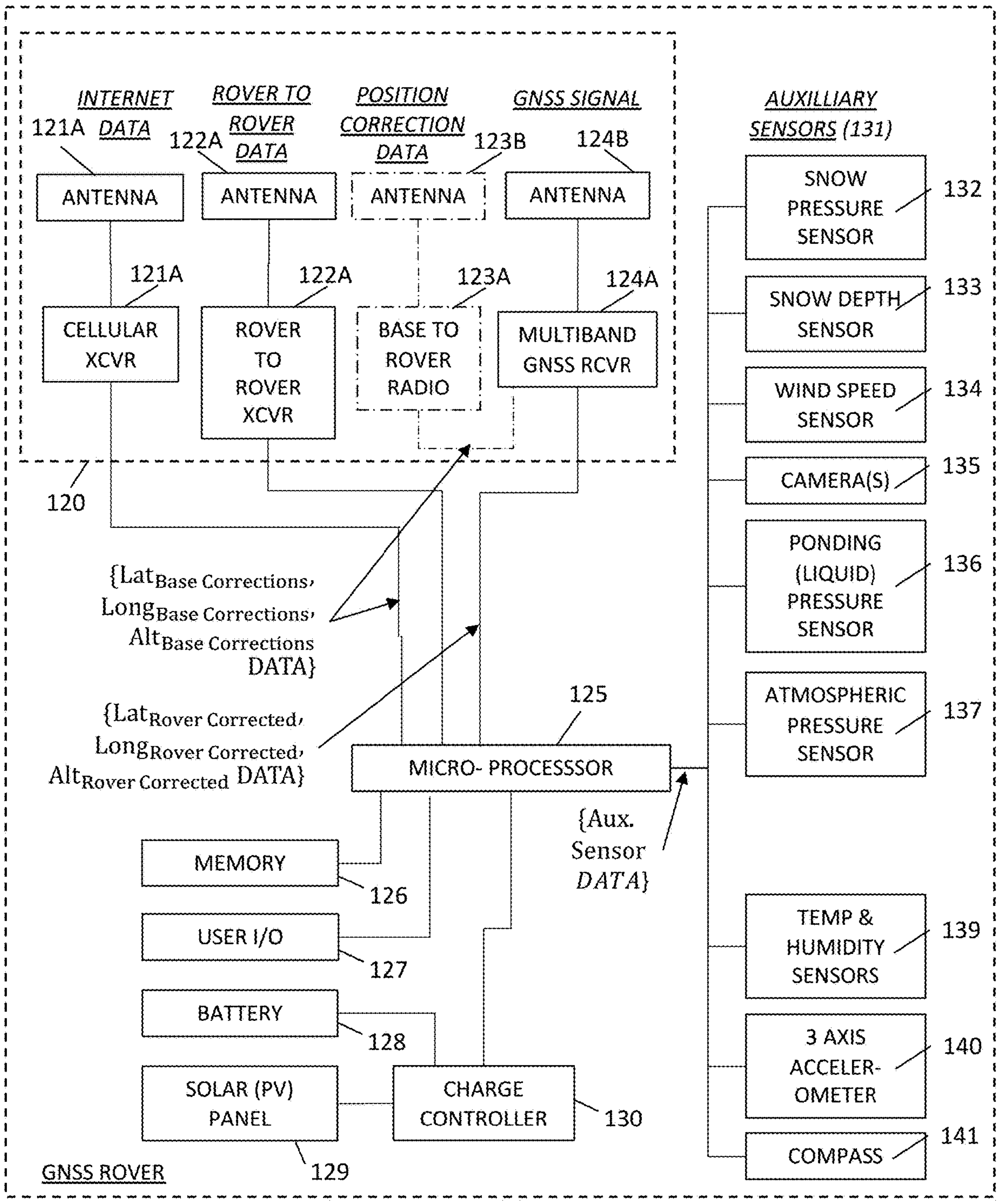
Figure 260:
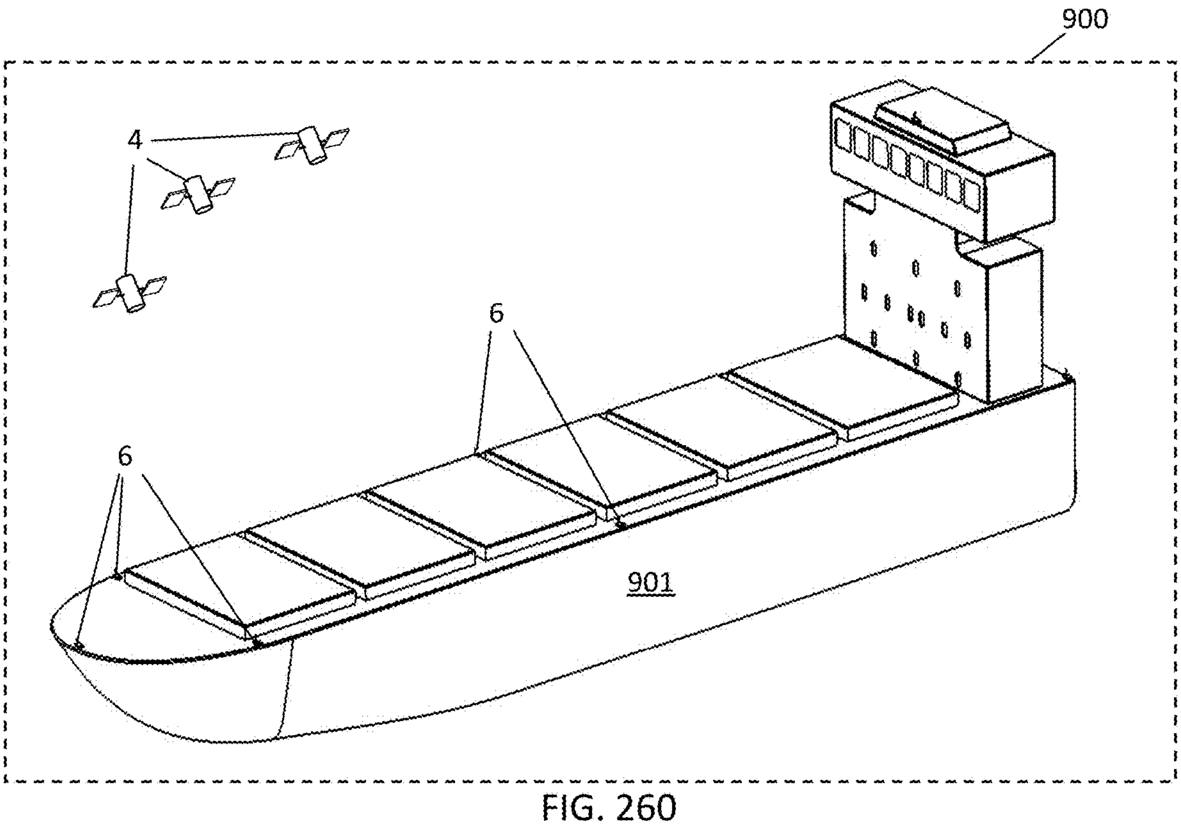
Figure 261:
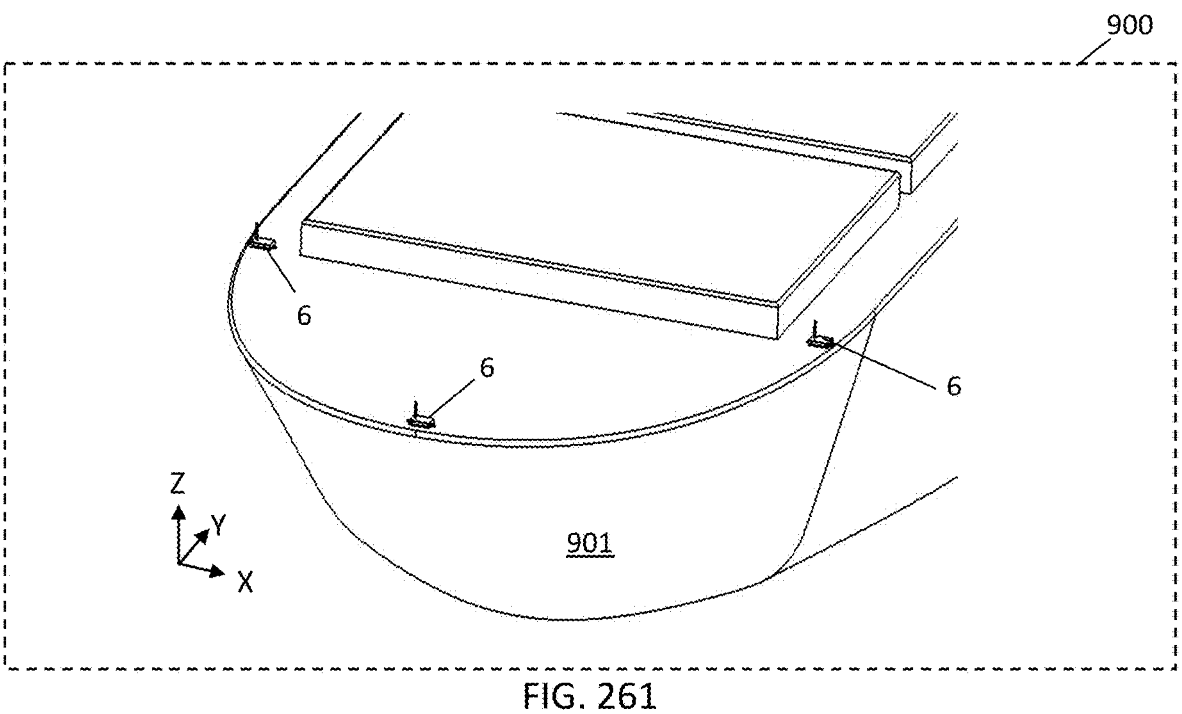
Figure 262:
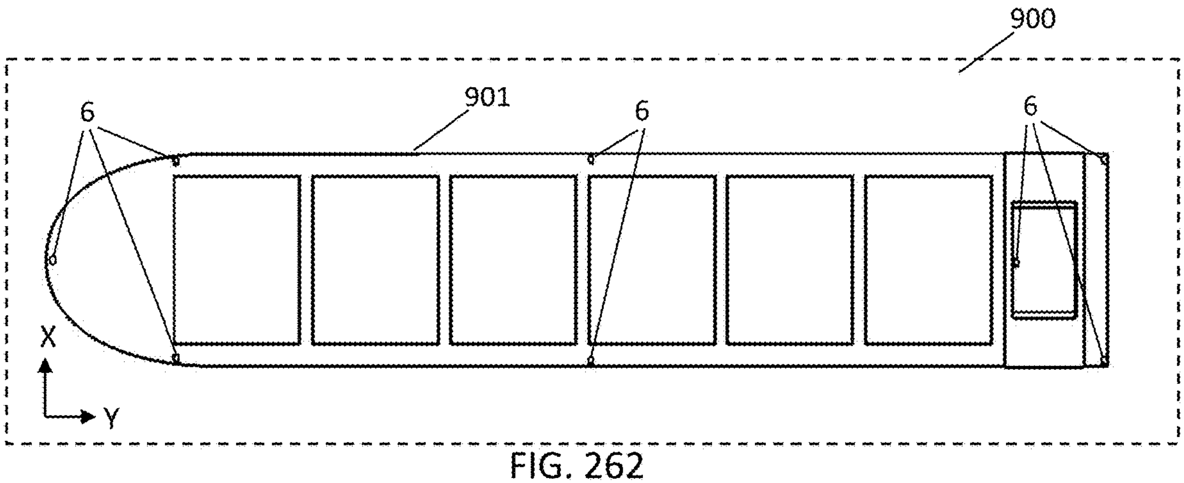
Figure 263:
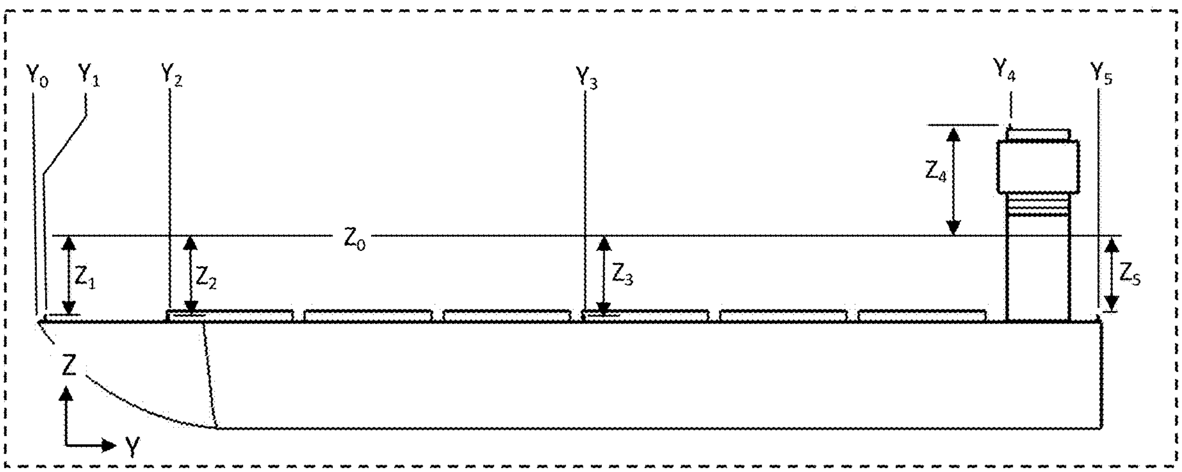

FIG. 132 shows a graphical user interface (GUI) used during the method of enabling systems and communications as illustrated in FIG. 131, illustrating various graphical icons and objects supporting various end-user function including, for example, setup system, managing stations, testing system, enabling systems/communications, viewing conditions/status, setting alerts/responses, and managing company/class/location, data parameters and zones;

FIG. 133 shows a flow chart describing a method of view structural conditions and station status on the system network of the present invention, comprising the steps of (a) Viewing Current Values Table, (b) Viewing Location-wide Heat Map (e.g. Choose parameters to display such as: deflection or displacement (X,Y,Z), snow pressure, snow depth, ponding depth, vibrations, etc. for a building, bridge or natural structure), (c) Viewing Data Graphs (e.g. Choose parameter and time/date range), (d) Viewing Still Images and Video, (e) Viewing Station Status, and (f) Exporting Data;

FIG. 134 shows a graphical user interface (GUI) used during the method of viewing conditions and status using tables, as illustrated using various graphical icons and objects supporting various end-user functions;

FIGS. 135A, 135B1, 135B2 and 135B3 show a series of graphical user interfaces (GUIS) that are used during the method of viewing conditions and status using heat map as illustrated;

FIG. 136 shows a graphical user interface (GUI) used during the method of viewing conditions and status using heat map as illustrated;

FIG. 137 shows a graphical user interface (GUI) used during the method of viewing conditions and status using heat map illustrated;

FIG. 138 shows a graphical user interface (GUI) used during the method of viewing conditions and status using heat map illustrated;

FIG. 139 shows a graphical user interface (GUI) used during the method of viewing conditions and status using a graph illustrated;

FIG. 140 shows a graphical user interface (GUI) used during the method of viewing conditions and status using images/video as illustrated;

FIG. 141 shows a graphical user interface (GUI) used during the method of viewing conditions and status using images/video as illustrated;

FIG. 142 is a flow chart describing the steps of the method of receiving alerts and notifications, responding and reporting on the system network of the present invention, comprising the steps of (a) Enabling Alerts of monitoring rooftop events where thresholds have been exceeded and define required Responses, (b) Viewing Alert and Response Status, (c) Creating and Submit Plans and Reports, and (d) Receiving and Respond to Alerts and Notifications;

FIG. 143 shows a graphical user interface (GUI) used during the method of alerts/response setup/enable as illustrated;

FIG. 144 shows a graphical user interface (GUI) used during the method of alerts/response status as illustrated;

FIG. 145 shows a graphical user interface (GUI) used during the method of alerts/response in plans and reports as illustrated;

FIG. 146 shows a graphical user interface (GUI) used when the system sends out a notification to an end-user that a system alert has been generated and requires a user response to specific rooftop snow loading condition at a particular location on a specific building rooftop;

FIG. 147 shows a graphical user interface (GUI) used when the system sends out a notification to an end-user that a system alert has been generated and requires a user response to specific rooftop ponding condition at a particular location on a specific building rooftop;

FIG. 148 shows a graphical user interface (GUI) used when the system sends out a notification to an end-user that a system alert has been generated and requires a user response to specific seismic activity condition at a particular location;

FIG. 149 shows a graphical user interface (GUI) used during the method of system setup of users illustrating various graphical icons and objects;

FIGS. 150A, 150B and 150C show a flow chart describing a method of communication and information processing supported on the first illustrated embodiment of the system platform of the present invention, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the GNSS system network;

FIG. 151 shows a system block diagram of the second embodiment of the GNSS-based system network of the present invention deploying a plurality of rover stations and an onsite base station on a building being monitored by the GNSS system network, wherein the GNSS system network comprises (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging data extraction and spatial derivative processing techniques performed locally or remotely, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (vi) a data center supporting web servers, application servers, database and datastore servers, and SMS/text and email servers;

FIG. 152 shows a perspective view of a building on which the GNSS system network of FIG. 151 is deployed for purposes of monitoring the building rooftop, while using RTK correction data supplied by the onsite GNSS base station and RTK correction processing within each deployed rover station for high-spatial resolution accuracy;

FIG. 153 shows a perspective view of the building of FIG. 152, wherein the onsite GNSS base station is shown mounted on the exterior of the building in a highly stationary manner;

FIGS. 154A, 154B and 154C, taken together, set forth a flow chart describing the communication and information processing method supported on the second illustrated embodiment of the system platform of the present invention, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the GNSS system network;

FIG. 155 is a system block diagram of the third embodiment of the GNSS-based object tracking system network of the present invention employing rover stations and onsite base station using cellular-based internet access for carrying out RTK correction of object positioning being tracked by the GNSS system network of the present invention, wherein the GNSS system network comprises (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (vi) a data center supporting web servers, application servers, database and datastore servers, and SMS/text and email servers;

FIG. 156 shows a perspective view of a building on which the GNSS system network of FIG. 155 is deployed for purposes of monitoring the building rooftop, while using RTK correction data supplied by the onsite GNSS base station and RTK correction processing within each deployed rover station for high-spatial resolution accuracy;

FIG. 157 shows a perspective view of the building of FIG. 156, wherein the onsite GNSS base station is shown mounted on the exterior of the building in a highly stationary manner;

FIGS. 158A, 158B and 158C, taken together, provide a communication and information processing method supported on the third illustrated embodiment of the system platform of the present invention, involving the processing of GNSS signals received locally at a point on or behind the surface of the stationary and/or mobile system to automatically determine the occurrence of spatial displacement, distortion and/or deformation of the building system being spatially monitored over time, and when spatial displacement, distortion and/o deformation thresholds are met or exceeded, the Application Server automatically sends email and/or SMS alerts and/or notifications to registered Users over the GNSS system network;

FIG. 159 shows a system block diagram of the fourth embodiment of the GNSS-based object tracking network of the present invention deploying rover stations and offsite base station using cellular-based internet access for carrying out RTK position correction of objects being tracked by the GNSS system network of the present invention, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (vi) a data center supporting web servers, application servers, database and datastore servers, and SMS/text and email servers;

FIG. 160 is a perspective view of a building with a relatively flat roof surface, on which the GNSS system network of the present invention is installed and deployed for real-time roof beam and surface displacement and deflection monitoring in response to loads created by snow, rain ponding, and/or seismic activity, wherein RTK position correction processing occurs within the roof-mounted GNSS rover devices;

FIGS. 161A, 161B and 161C, taken together, set forth a communication and information processing method supported on the fourth illustrated embodiment of the system platform of the present invention, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/o deformation thresholds are met or exceeded, the Application Server automatically sends email and/or SMS alerts and/or notifications to registered Users over the GNSS system network;

FIG. 162 shows a system block diagram of the fifth embodiment of the GNSS-based object tracking network of the present invention comprising of rover stations and CORS base stations using internet access for carrying out RTK position correction of objects being tracked by the GNSS system network of the present invention, comprising: (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (vi) a data center supporting web servers, application servers, database and datastore servers, and SMS/text and email servers;

FIG. 163 is a perspective view of a building with a relatively flat roof surface, on which a system network of the present invention is installed and deployed for real-time roof beam and surface displacement and deflection monitoring in response to loads created by snow, rain ponding, and/or seismic activity, wherein rovers are mounted on the rooftop surface and continuously operating reference station (CORS) base stations are mounted on and/or around the building, and wherein RTK correction takes place within the roof-mounted rover devices;

FIG. 164 is a perspective view of the building shown in FIG. 163, showing the continuously operating reference station (CORS) base stations mounted on the building roof surface;

FIG. 165 is a perspective view of the building shown in FIG. 163, showing the continuously operating reference station (CORS) base stations mounted around the building perimeter;

FIGS. 166A, 166B and 166C, taken together, set forth a flow chart set forth a communication and information processing method supported on the fifth illustrated embodiment of the system platform of the present invention, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/o deformation thresholds are met or exceeded, the Application Server automatically sends email and/or SMS alerts and/or notifications to registered Users over the GNSS system network;

FIG. 167 shows a system block diagram of the fourth embodiment of the GNSS-based object tracking network of the present invention comprising of rover stations using cellular-based internet access and continuously operating reference stations (CORS) base(s) for carrying out RTK position correction at the server/web app of object positioning being tracked by the GNSS system network of the present invention, comprising: (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement/deflection data extraction processing, (iii) one or more CORS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (vi) a data center supporting web servers, application servers, database and datastore servers, and SMS/text and email servers;

FIG. 168 is a perspective view of a building with a relatively flat roof surface, on which a system network of the present invention is installed and deployed for real-time roof beam and surface displacement and deflection monitoring in response to loads created by snow, rain ponding, and/or seismic activity, wherein rovers are mounted on the rooftop surface and continuously operating reference station (CORS) base units or stations are mounted on and/or around the building, and wherein RTK position correction takes place within the roof-mounted rover devices;

FIG. 169 is a perspective view of the building shown in FIG. 168, showing the continuously operating reference station (CORS) base stations mounted on the building roof surface;

FIG. 170 is a perspective view of the building shown in FIG. 168, showing the continuously operating reference station (CORS) base stations mounted around the building perimeter;

FIGS. 171A, 171B and 171C, taken together, set forth a flow chart describing the steps of a communication and information processing method supported on the sixth illustrated embodiment of the system platform of the present invention, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/o deformation thresholds are met or exceeded, the Application Server automatically sends email and/or SMS alerts and/or notifications to registered Users over the GNSS system network;

FIG. 172 is a schematic representation of a building on which the system network of the present invention is being installed, configured and deployed in accordance with the principles of the present invention, wherein the schematic graphically depicts the placement of six (6) GNSS rovers over the roof joists and beam spans of the building at roof joist midspan, for the purpose of monitoring deflection zones and limits using the system network and its monitoring methods using the GNSS base to provide RTK position correction data, wherein DL1=10 M span and DL2=15 M span, and ZONE 1 span (L): 10 M Deflection Limit: DL1=L/240=4.2 CM, and ZONE 2 SPAN (L): 15 M Deflection Limit: DL2=L/240=6.2 CM;

FIG. 173 is an elevation view of the building shown and illustrated in FIG. 172;

FIGS. 174 and 175 show cross-sectional views of the pole-mounted GNSS rover arranged in its operational position and deflection test position, respectively, attained by sliding the telescopic pole sections relative to each other and locking the upper pole section into its deflection test position placing the upper pole section at an extended D test height above the roof surface;

FIG. 176 shows the pole-mounted GNSS rover of FIGS. 174 and 175 arranged and configured in its operational position;

FIG. 177 shows the pole-mounted GNSS rover of FIGS. 174 and 175 arranged and configured in its deflection test position, wherein DTEST=H2−H1;

FIGS. 178A and 178B, taken together, set forth a flow chart describing the steps involved in practicing the method of design, installation and operating the system network of the present invention on a particular building structure to be monitored;

FIG. 179 is a flow chart describing the steps carried out when performing the method of receiving alerts and notifications, and responding and reporting high snow load events and the like using the system network of the present invention deployed on one or more buildings and/or structures under management;

FIG. 180 is a perspective view of a building with a relatively flat roof surface, on which a GNSS system network of the present invention is installed and deployed for real-time roof beam and surface displacement and deflection monitoring in response to loads created by snow, rain ponding, and/or seismic activity, wherein rovers and base stations are mounted on the rooftop surface for monitoring rooftop deflection by collecting and processing GPS signals transmitted from the GNSS satellite constellations;

FIG. 181A is a perspective view of a building with a relatively flat roof surface, on which a GNSS system network of the present invention is installed and deployed for real-time roof beam and surface displacement and deflection monitoring in response to loads created by snow, rain ponding, and/or seismic activity, wherein rovers and base stations are mounted on the rooftop surface for monitoring rooftop deflection by collecting and processing GPS signals transmitted from the GNSS satellite constellations, and when there is no loading on the rooftop to be monitored by the system network;

FIG. 181B is a perspective view of a building with a relatively flat roof surface, on which a GNSS system network of the present invention is installed and deployed for real-time roof beam and surface displacement and deflection monitoring in response to loads created by snow, rain ponding, and/or seismic activity, wherein rovers and base stations are mounted on the rooftop surface for monitoring rooftop deflection by collecting and processing GPS signals transmitted from the GNSS satellite constellations, and when there is snow loading on the rooftop to be monitored by the GNSS system network;

FIG. 182 is a partially cut-away perspective view of a building shown in FIGS. 181A and 181B, revealing structural beams (i.e. trusses) supporting the roof surface skin, upon which GNSS rovers and GNSS base stations are mounted on the rooftop surface for monitoring rooftop deflection by collecting and processing GPS signals transmitted from the GNSS satellite constellations;

FIG. 183 is a cross-section view of the building illustrated in FIGS. 181A, 181B and 182, showing the structural roof support trusses, yielding to the snow load imposed on the building roof surface;

FIG. 184 is a close-up expanded view of one of the GPS-tracking rovers with antenna mounted on the roof surface of the building shown in FIGS. 181A, 181B, 182 and 183, without snow loading;

FIG. 185 is a close-up expanded view of one of the GPS-tracking rovers with antenna mounted on the roof surface of the building shown in FIGS. 181A, 181B, 182 and 183, with snow loading causing the roof support truss deflecting downward, causing the "phase center location (PCL)" of each antenna to be displaced and detected by time-averaging of GNSS signals processed over the GNSS system network of the present invention, as illustrated in FIG. 24;

FIG. 186 is a side elevated view of a structural ceiling joist (i.e. roof support truss) employed within the building shown in FIG. 181A through 185, with rovers mounted above the structural joist, and illustrating the deflection limit established by the measure L/240 being monitored in real-time by the GNSS system network of the present invention, when live loading create 0 deflection conditions;

FIG. 187 is a side elevated view of a structural ceiling joist (i.e. roof support truss) employed within the building shown in FIG. 181A through 185, with rovers mounted above the structural joist, and illustrating the deflection limit established by the measure L/240 being monitored in real-time by the GNSS system network of the present invention, when live loading create <L/240 deflection conditions;

FIG. 188 is a side elevated view of a structural ceiling joist (i.e. roof support truss) employed within the building shown in FIG. 181A through 185, with rovers mounted above the structural joist, and illustrating the deflection limit established by the measure L/240 being monitored in real-time by the GNSS system network of the present invention, when live loading create >L/240 deflection conditions;

FIG. 189 is a system block diagram of the GNSS system network of the present invention installed and configured for monitoring snow and/or rain load driven structural deflection and displacement of buildings, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement data extraction processing, (iii) one or more GNSS base stations to support RTK correction of the GNSS signals, (iv) one or more client computing systems for transmitting instructions and receiving alerts and notifications and supporting diverse administration, operation and management functions on the GNSS system network, (v) a cell tower for supporting cellular data communications across the system network, and (vi) a data center supporting web servers, application servers, database and datastore servers, and SMS/text and email servers;

FIG. 190 is a system block type schematic diagram for each GNSS rover unit deployed on the GNSS system network of the present invention as depicted in FIG. 189, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, and a compass;

FIG. 191 shows a chart illustrating the real-time monitoring of structural displacement response using the GNSS system network of present invention operating in its snow load monitoring and alert mode, illustrating, along a common timeline, RTK-corrected GNSS deflection data stream, moving averaged GNSS deflection data streams with time averaging displacement data extraction processing, and automated generation of structural deflection alerts using the method of the present invention;

FIGS. 192A, 192B and 192C, taken together, sets forth a flow chart describing the steps of communication and information processing method supported by the system platform of the present invention applied to rooftop application for monitoring snow load driven structural deflection and displacement, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the GNSS system network;

FIG. 193 is a perspective view of a building with a relatively flat roof surface, on which a GNSS system network of the present invention is installed and deployed for real-time roof beam and surface displacement and deflection monitoring in response to loads created by rain ponding on rooftops, wherein GNSS rovers and GNSS base stations are mounted on the rooftop surface for monitoring rooftop deflection by collecting and processing GPS signals transmitted from the GNSS satellite constellations;

FIG. 194 is a cross-section view of the building illustrated in FIG. 193, showing the structural roof support trusses, yielding to the rain ponding load imposed on the building roof surface;

FIG. 195A is a system block diagram of the GNSS system network of the present invention installed and configured for monitoring rain ponding (load) driven structural deflection and displacement of buildings, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (vi) a data center supporting web servers, application servers, database and datastore servers, and SMS/text and email servers;

FIG. 195B is a system block type schematic diagram for each GNSS rover unit deployed on the GNSS system network of the present invention as depicted in FIG. 195A, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, a compass;

FIG. 196 shows a schematic representation illustrating the real-time monitoring of structural displacement response using the system network of present invention operating in its rain ponding monitoring and alert mode, illustrating, along a common timeline, RTK-corrected GNSS deflection data stream, moving averaged GNSS deflection data streams with time averaging displacement data extraction processing, and automated generation of structural deflection alerts and ponding depth alerts, using the method of the present invention;

FIGS. 197A, 197B and 197C, taken together, show a flow chart describing communication and information processing method supported by the system platform of the present invention applied to rooftop application for monitoring ponding and water load driven structural deflection and displacement;

FIG. 198A1 is a perspective view of a municipal storm water collection and drain system installed in a roadside surface, showing the GNSS system network of the present invention installed and deployed in this particular system, with its GNSS rover units installed in catch basins and around grates to monitor structural deflection, displacement and/or distortion as well as the depth of water in the catch basins;

FIG. 198A2 is a cut-away perspective view of the municipal storm water collection and drain system shown in FIG. 198A1, further illustrating the installation of GNSS rover units below the drain grates within the catch basins connected to the drain pipes deployed in the system, so as to monitor structural deflection, displacement and/or distortion as well as the depth of water in these drain pipes;

FIG. 198A3 is an enlarged view of a catch basin region shown in FIG. 198A2, illustrating the mounting of the GNSS rover controller in the roadside surface above the drain grate, with a pressing sensing tube extending though the catch basin and into the drain pipe so as to monitor the depth of water developing in the drain pipe and catch basis at any particular moment in time, while the GPS coordinates of the GNSS rover with integrated pond-depth sensing is being tracked and recorded on GNSS system network servers back at a data center;

FIG. 198B1 is an enlarged cut-away perspective view of the municipal storm water collection and drain system shown in FIG. 198A2, illustrating unobstructed pathways along the pipe drain shown therein, which the water level sensing instrumentation automatically senses during monitoring by the system network of the present invention;

FIG. 198B2 is an enlarged cut-away perspective view of the municipal storm water collection and drain system shown in FIG. 198A2, illustrating an obstruction existing a catch basin along the drain pathway, causing backed-up fluid in a downstream catch basin, which the water level sensing instrumentation automatically senses during monitoring by the system network of the present invention;

FIG. 198C is a system block diagram of the GNSS system network of the present invention installed and configured for monitoring rain ponding (load) driven structural deflection and displacement of buildings, comprising (i) a cloud-based TCP/IP network architecture with a plurality of GNSS satellites transmitting GNSS signals towards the earth and objects below, (ii) a plurality of GNSS rovers of the present invention mounted in the catch basins of a storm drain system installed along streets, for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (vi) a data center supporting web servers, application servers, database and datastore servers, and SMS/text and email servers;

FIG. 198D is a system block type schematic diagram for each GNSS rover unit deployed on the GNSS system network of the present invention as depicted in FIG. 195, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, a compass;

FIG. 198E shows a schematic representation, in chart form, illustrating the real-time monitoring of structural displacement response using the system network of present invention operating in its rain ponding monitoring and alert mode, illustrating, along a common timeline, RTK-corrected GNSS deflection data stream, moving averaged GNSS deflection data streams with time averaging displacement data extraction processing, and automated generation of structural deflection alerts and ponding depth alerts, using the method of the present invention;

FIGS. 198F1, 198F2 and 198F3, taken together, show the steps carried out in the communication and information processing method supported by the system platform of the present invention applied to rooftop application for monitoring ponding and water load driven structural deflection and displacement, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/o deformation thresholds are met or exceeded, and/or pond-depth thresholds are met or exceeded, the Application Server automatically sends email and/or SMS alerts and/or notifications to registered Users over the GNSS system network;

FIG. 199 is a perspective view of a building with a relatively flat roof surface, on which a system network of the present invention is installed and deployed for real-time wind-driven roof structural damage monitoring in response to loads created by winds on rooftops, wherein rovers and base stations are mounted on the rooftop surface for monitoring rooftop deflection by collecting and processing GPS signals transmitted from the GNSS satellite constellations, and there is no wind-driven structural damage experienced by the building;

FIG. 200 is an elevated side view of the building illustrated in FIG. 199, showing the positioning of rovers on the structural roof support trusses of the building roof surface;

FIG. 201 is a perspective view of a building with a relatively flat roof surface, on which a system network of the present invention is installed and deployed for real-time wind-driven structural roof damage monitoring in response to loads created by winds on rooftops, wherein rovers and base stations are mounted on the rooftop surface for monitoring rooftop deflection by collecting and processing GPS signals transmitted from the GNSS satellite constellations, wherein there is shown some serious wind-driven structural damage caused to the rooftop surface;

FIG. 202 is an elevated side view of the building illustrated in FIG. 201, showing the positioning on the rovers structural roof support trusses, yielding to the rain ponding load imposed on the building roof surface, and the wind-driven rooftop structural surface damaged reflected in FIG. 201;

FIG. 203 is a system block diagram of the system network of the present invention installed and configured for monitoring rain ponding (load) driven structural deflection and displacement of buildings, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (v) a data center supporting web servers, application servers, database and datastore servers, and SMS/text and email servers;

FIG. 204 is a system block type schematic diagram for each GNSS rover unit deployed on the system network of the present invention as depicted in FIG. 203195, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, a compass;

FIG. 205 shows a chart illustrating the real-time monitoring of structural displacement response using the system network of present invention operating in its rain ponding monitoring and alert mode, illustrating, along a common timeline, RTK-corrected GNSS deflection data stream, moving averaged GNSS deflection data streams with time averaging displacement data extraction processing, and automated generation of structural displacement alerts, rooftop windspeed, windspeed alerts and regional windspeed, using the method of the present invention;

FIGS. 206A, 206B and 206C, taken together, show the steps carried out in the communication and information processing method supported by the system platform of the present invention applied to rooftop application for monitoring wind activity and structural displacement response using system of present invention operating in wind monitoring and alert mode, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the GNSS system network;

FIG. 207 is a perspective view of a building with a relatively flat roof surface, on which a GNSS system network of the present invention is installed and deployed for real-time wind-driven roof membrane (i.e. surface) displacement and deflection monitoring in response to loads created by winds on rooftops, wherein GNSS rovers and base stations are mounted on the rooftop surface for monitoring rooftop deflection by collecting and processing GNSS signals transmitted from the GNSS satellite constellations, shown while there is no wind-driven damage;

FIG. 208 is an elevated side view of the building illustrated in FIG. 199, showing the positioning on the rover's structural roof support trusses of the building;

FIG. 209 is a perspective view of a building with a relatively flat roof surface, on which a GNSS system network of the present invention is installed and deployed for real-time roof membrane (i.e. surface) displacement and deflection monitoring in response to wind-driven loads created by winds on rooftops, wherein rovers and base stations are mounted on the rooftop surface for monitoring rooftop deflection by collecting and processing GNSS signals transmitted from the GNSS satellite constellations, wherein there is shown some serious wind-driven damage caused to the rooftop surface;

FIG. 210 is an elevated side view of the building illustrated in FIG. 209, showing the repositioning of the GNSS rovers on structural roof support trusses, when yielding to the wind driven load imposed on the building roof membrane, and the wind-driven rooftop surface damaged as reflected in FIG. 209;

FIG. 211 is a system block diagram of the GNSS system network of the present invention installed and configured for monitoring wind-driven roof membrane displacement on buildings, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement data extraction processing, (iii) one or more GNSS base stations to support RTK correction of the GNSS signals, (iv) one or more client computing systems for transmitting instructions and receiving alerts and notifications and supporting diverse administration, operation and management functions on the system network, and (v) a cell tower for supporting cellular data communications across the system network, and (vi) a data center supporting web servers, application servers, database and datastore servers, and SMS/text and email servers;

FIG. 212 is a system block type schematic diagram for each GNSS rover unit deployed on the GNSS system network of the present invention as depicted in FIG. 211, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, and a compass instrument;

FIG. 213 shows a chart illustrating the real-time monitoring of roof membrane displacement using the GNSS system network of present invention operating in its roof membrane monitoring and alert mode, illustrating along a common timeline, a RTK-corrected GNSS deflection data stream, moving averaged GNSS displacement data streams with time averaging displacement data extraction processing, station attitude (e.g. pitch angle, roll angle and heading), and automated generation of displaced (rover) station alerts, rooftop windspeed, windspeed alerts and regional windspeed, using the methods of the present invention;

FIGS. 214A, 214B and 214C, taken together, show the steps carried out in the communication and information processing method supported by the GNSS system platform of the present invention applied to rooftop application for monitoring wind-driven roof membrane displacement, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the GNSS system network;

FIG. 215 is a first elevated side view of a building with a relatively flat roof surface, on which a GNSS system network of the present invention is installed and deployed for real-time foundation settling monitoring in response to whatever forces may act upon the building foundation, wherein rovers and base stations are mounted on the rooftop surface for monitoring rooftop displacement (due to foundation settling) by collecting and processing GNSS signals transmitted from the GNSS satellite constellations;

FIG. 216 is a second elevated side view of the building shown in FIG. 215, illustrating the settling of the building foundation building and displacement of the rovers within the GNSS system network;

FIG. 217 is a third elevated side view of the building shown in FIG. 215, on which the GNSS system network of the present invention is installed and deployed for real-time structural failure monitoring in response to whatever forces may act upon the building, wherein rovers and base stations are mounted on the rooftop surface for monitoring structural failure in the building by collecting and processing GNSS signals transmitted from the GNSS satellite constellations;

FIG. 218 is a fourth elevated side view of the building illustrated in FIG. 215, showing the positioning on the rovers over the structural roof support trusses, and the roof trusses showing structural failure in response to loading imposed on the building;

FIG. 219 is a system block diagram of the GNSS system network of the present invention installed and configured for monitoring structural failure in buildings, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging displacement/deflection data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, and (vi) a data center supporting web servers, application servers, database and datastore servers, and SMS/text and email servers;

FIG. 220 is a system block type schematic diagram for each GNSS rover unit deployed on the GNSS system network of the present invention as depicted in FIG. 215, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, a compass;

FIG. 221 shows a chart illustrating the real-time monitoring of structural failure using the GNSS system network of present invention operating in its roof membrane monitoring and alert mode, illustrating, along a common timeline, a RTK-corrected GNSS deflection data stream, moving averaged GNSS displacement data streams with time averaging displacement data extraction processing, station attitude (e.g. pitch angle, roll angle and heading), and automated generation of structural failure or foundation settling alerts, using the method of the present invention;

FIGS. 222A, 222B and 222C, taken together, show the steps carried out in the method of monitoring structural displacement response using the GNSS system network of present invention operating in foundation settling and structural failure monitoring and alert mode, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the GNSS system network;

FIG. 223 is a perspective view of a building with a relatively flat roof surface, on which a GNSS system network of the present invention is installed and deployed for real-time seismic activity monitoring in response to seismic activity in the vicinity of the building, wherein GNSS rovers and base stations are mounted on the rooftop surface for monitoring rooftop deflection by collecting and processing GNSS signals transmitted from the GNSS satellite constellations;

FIGS. 224 and 225 provide perspective views of the building illustrated in FIG. 223, showing the positioning on a bracket-mounted controller on the exterior surface of the building;

FIG. 226 is a system block diagram of the GNSS system network of the present invention installed and configured for monitoring seismic activity around a building and its response to a fault in the earth and/or shock waves generated within the earth during an earth quake, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time averaging seismic data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, (v) a data center supporting web servers, application servers, database and datastore servers, and SMS/text and email servers, and (vi) a USGS seismic detection server and data center for providing real-time seismic information to be used with the system;

FIG. 227 is a system block type schematic diagram for each GNSS rover unit deployed on the GNSS system network of the present invention as depicted in FIG. 226, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, a compass;

FIG. 228 shows a chart illustrating the real-time monitoring of structural displacement response using the GNSS system network of present invention operating in its rain ponding monitoring and alert mode, illustrating, along a common timeline, RTK-corrected GNSS deflection data stream, moving averaged GNSS displacement data streams with time averaging displacement data extraction processing, and automated generation of structural displacement alerts, remote USGS accelerometer data and USGS earthquake alerts, using the method of the present invention;

FIGS. 229A, 229B and 229C, taken together, show the steps carried out in the communication and information processing method supported by the system platform of the present invention applied to rooftop application for monitoring seismic activity and seismic-driven structural displacement response using system of present invention operating in early warning seismic monitoring and alert mode, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded and vibration (linear accelerations) thresholds are met or exceeded, the Application Server automatically sends email and/or SMS alerts and/or notifications to registered Users over the GNSS system network;

FIG. 230 is a perspective view of a bridge over a road or waterway, on which a GNSS system network of the present invention is installed and deployed for real-time bridge monitoring in response to seismic and other activity in the vicinity of the bridge, wherein GNSS rovers and base stations are mounted on the bridge surface for collecting and processing GNSS signals transmitted from the GNSS satellite constellations, for monitoring any deflection and/or displacement the bridge structure may experience over time due to seismic or other activity;

FIGS. 231 and 232 provide perspective views of the close-up view of the bridge structure illustrated in FIG. 230, showing the mounting of GNSS rovers on various structures of the bridge and the GNSS base station on the exterior surface of one of the concrete support foundations of the bridge, operating within the GNSS system network of the present invention;

FIG. 233 is an elevated side view of the bridge structure depicted in FIGS. 230 through 232, shown when not experiencing or demonstrating vertical deflection due to roadway loading and/or surrounding activity;

FIG. 234 is an elevated side view of the bridge structure depicted in FIGS. 230 through 232, shown when experiencing vertical deflection between foundations due to excessive roadway loading;

FIG. 235 is a plan view of the bridge shown in FIGS. 230 through 233, when not experiencing or demonstrating lateral bridge span or member displacement;

FIG. 236 is a plan view of the bridge shown in FIGS. 230 through 233, when experiencing and/or demonstrating lateral bridge span or member displacement;

FIG. 237 is a system block diagram of the GNSS system network of the present invention installed and configured for monitoring vertical and lateral bridge span displacement in response to bridge roadway loading and/or shock waves generated within the earth during an earth quake, comprising (i) a cloud-based TCP/IP network architecture with a plurality of GNSS satellites transmitting GNSS signals towards the earth and objects below, (ii) a plurality of GNSS rovers of the present invention mounted on the surfaces of the bridge structure for receiving and processing transmitted GNSS signals during monitoring using time averaging seismic data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, (vi) a data center supporting web servers, application servers, database and datastore servers, and SMS/text and email servers, and (vii) a USGS seismic detection server and data center for providing real-time seismic information to be used with the system network;

FIG. 238 is a system block type schematic diagram for each GNSS rover unit deployed on the GNSS system network of the present invention as depicted in FIG. 237, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, and a compass;

FIG. 239 shows a chart illustrating the real-time monitoring of structural displacement response using the system network of present invention operating in its bridge displacement and vibration monitoring and alert mode, illustrating, along a common timeline, RTK-corrected GNSS deflection data stream, moving averaged GNSS displacement data streams with time averaging displacement data extraction processing, and automated generation of structural displacement alerts, remote USGS accelerometer data and USGS earthquake alerts, using the method of the present invention;

FIGS. 240A, 240B and 240C, taken together, show the steps carried out in the communication and information processing method supported by the GNSS system network of the present invention applied to monitoring bridge displacement and vibrational response using system of present invention operating in displacement and vibrational-response monitoring and alert mode, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded and vibration (linear accelerations) thresholds are met or exceeded, the Application Server automatically sends email and/or SMS alerts and/or notifications to registered Users over the GNSS system network;

FIG. 241 is a perspective view of a GNSS system network of the present invention installed in a region of the earth's surface and deployed for real-time monitoring of soil movement in response to seismic activity, and rainfall, wherein at least one or more base station is mounted in the vicinity of a region of earth to be monitored by the GNSS system network of the present invention, and a plurality of rovers are mounted in the ground surface over the spatial extent of the regions as illustrated for purposes of monitoring the region of earth by collecting and processing GNSS signals transmitted from the GNSS satellite constellations, wherein the GNSS base unit provides RTK corrected GNSS signals;

FIG. 242 provides a close-up cross-sectional view of a GNSS rover secured in the ground surface by way of a stake-like base component shown in FIG. 243, enabling the secure mounting of the GNSS rover unit in the earth surface so that GNSS signal reception and position monitoring of the phase center location of its antenna, during monitoring operations performed by the GNSS system network of the present invention;

FIG. 243 provides a perspective view of a GNSS rover secured in the ground surface by way of the stake-like base component, enabling the secure mounting of the rover unit in the earth surface so that GNSS signal reception and antenna phase center position monitoring is supported during monitoring operations performed by the GNSS system network of the present invention;

FIG. 244 provides a close-up cross-sectional view of a GNSS rover secured in the ground surface by way of a screw-like base component shown in FIG. 245, enabling the secure mounting of the rover unit in the earth surface so that GNSS signal reception and position monitoring of the phase center location of its antenna, during monitoring operations performed by the GNSS system network of the present invention;

FIG. 245 provides a perspective view of a GNSS rover secured in the ground surface by way of the screw-like base component, enabling the secure mounting of the rover unit in the earth surface so that GNSS signal reception and corresponding "antenna phase center" displacement monitoring is supported during the remote monitoring operations performed by the GNSS system network of the present invention;

FIG. 246A1 is a perspective view of the GNSS system network of the present invention installed in a region of the earth's surface as shown in FIG. 241, where the soil has not yet moved in response to seismic activity and/or rainfall;

FIG. 246A2 is a cross-section view of the land region above a roadway being remotely monitored using the GNSS system network of the present invention;

FIG. 246B1 is a perspective view of the GNSS system network of the present invention installed in a region of the earth's surface as shown in FIG. 246A1, where the soil has started moving toward the roadway below in response to seismic activity and/or rainfall;

FIG. 246B2 is the cross-section view of the moving land region of FIG. 246B1 being remotely monitored using the GNSS system network of the present invention;

FIG. 247A is a perspective view of a body of water impounded within an Earth embankment being monitored by the GNSS water impoundment movement monitoring system of the present invention installed within the water impoundment;

FIG. 247B is a perspective view of an end portion of the water impoundment illustrated in FIG. 247A showing the GNSS rovers installed in the top rim region of the embankment, and function as GNSS measurement stations intact within the Earth soil;

FIG. 248A is a perspective view of the body of water impounded within the Earth embankment shown in FIGS. 247A and 246B, being monitored by the GNSS water impoundment movement monitoring system of the present invention, showing an embankment breach monitored by the GNSS system network of the present invention;

FIG. 248B is a perspective view of the body of water impounded within the Earth embankment shown in FIG. 248A, being monitored by the GNSS water impoundment movement monitoring system of the present invention, showing the embankment breach monitored by displaced GNSS measurement stations;

FIG. 249A is a perspective view of a body of water impounded within the Earth embankment and dam embankment, being monitored by the GNSS system network with its GNSS rover stations installed at measurement stations around embankment;

FIG. 249B is a perspective view of the body of water impounded within the Earth embankment and dam embankment shown in FIG. 249A, being monitored by the GNSS system network, showing an embankment breach and both intact measurement stations (GNSS rovers), and displaced measurement stations (GNSS rovers) caused by the embankment breach;

FIG. 250 is a system block diagram of the GNSS system network of the present invention installed and configured for monitoring soil and earth movement in response to shock waves generated within the earth during an earth quake and/or heavy rainfall, or embankment breaches as shown in FIGS. 246A through 249B, wherein the GNSS system network comprises (i) a cloud-based TCP/IP network architecture with a plurality of GNSS satellites transmitting GNSS signals towards the earth and objects below, (ii) a plurality of GNSS rovers 6 mounted in the Earth soil, the embankments and/or dam structures, for receiving and processing transmitted GNSS signals during monitoring using time-averaging displacement data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, (vi) a data center supporting web servers, application servers, database and datastore servers, and SMS/text and email servers, and (vii) a USGS seismic detection server and data center for providing real-time seismic information to be used with the GNSS system network;

FIG. 251 is a system block type schematic diagram for each GNSS rover unit deployed on the GNSS system network of the present invention as depicted in FIG. 250, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, a roof surface liquid pressure sensor, an atmospheric pressure sensor, a drain freeze sensor, a snow depth sensor, auxiliary sensors, and a compass;

FIG. 252 shows a chart illustrating the real-time monitoring of structural displacement response using the GNSS system network of present invention operating in its soil movement/displacement monitoring and alert mode, illustrating, along a common timeline, a RTK-corrected GNSS deflection data stream, moving averaged GNSS displacement data streams with time averaging displacement data extraction processing, accelerometer data, and automated generation of seismic vibration, displacement and or alerts, remote USGS accelerometer data and USGS earthquake alerts, using the method of the present invention;

FIGS. 253A, 253B and 253C, taken together, show the steps carried out in the communication and information processing method supported by the GNSS system platform of the present invention applied to monitoring soil displacement and response monitoring using system of present invention operating in displacement response monitoring and alert mode, involving the processing of GNSS signals received locally at a point on or behind the surface of the stationary and/or mobile system to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the GNSS system network;

FIG. 254 is a perspective view of a GNSS system network of the present invention installed in a region of the earth's surface and deployed for real-time monitoring of the movement of a (gas or liquid transport) pipeline before settling in response to seismic activity and/or rainfall, wherein at least one or more GNSS base station is mounted in the vicinity of a region of earth to be monitored by the GNSS system network of the present invention, and a plurality of rovers are mounted on the pipeline as illustrated for purposes of monitoring the region of the pipeline by collecting and processing GNSS signals transmitted from the GNSS satellite constellations, wherein the GNSS base unit provides RTK corrected GNSS signals;

FIG. 255 is a perspective view of a GNSS system network of the present invention installed in a region of the earth's surface and deployed for real-time monitoring of the movement of a (gas or liquid transport) pipeline after settling in response to seismic activity and/or rainfall;

FIG. 256 is a perspective view of a portion of the pipeline before the pipeline settling shown in FIG. 254;

FIG. 257 is a perspective view of a portion of the pipeline after the pipeline settling shown in FIG. 255;

FIG. 258 is a system block diagram of the GNSS system network of the present invention installed and configured for monitoring pipeline movement in response to shock waves generated within the earth during an earth quake and/or heavy rainfall, comprising (i) a cloud-based TCP/IP network architecture with a plurality of GNSS satellites transmitting GNSS signals towards the earth and objects below, (ii) a plurality of GNSS rovers of the present invention mounted on the rooftop surface of building for receiving and processing transmitted GNSS signals during monitoring using time-averaging displacement data extraction processing, (iii) one or more GNSS base stations to support RTK correction of the GNSS signals, (iv) one or more client computing systems for transmitting instructions and receiving alerts and notifications and supporting diverse administration, operation and management functions on the system network, (v) a cell tower for supporting cellular data communications across the system network, (vi) a data center supporting web servers, application servers, database and datastore servers, and SMS/text and email servers, and (vii) a USGS seismic detection server and data center for providing real-time seismic information to be used with the GNSS system network;

FIG. 259 is a system block type schematic diagram for each GNSS rover unit deployed on the GNSS system network of the present invention as depicted in FIG. 258, shown comprising a cellular XCVR with antenna, an Internet gateway XCVR with antenna, a base to rover radio with antenna, a multiband GNSS RCVR with antennas, a microprocessor with a memory architecture and a user I/O, a battery, a solar (PV) panel, a charge controller, a wind speed sensor, a compass, a 3 axis accelerometer, a snow pressure sensor, camera(s), temp & humidity sensors, an atmospheric pressure sensor, a snow depth sensor, auxiliary sensors, and a compass;

FIG. 260 is a perspective view of a GNSS system network of the present invention installed in the hull of a ship and deployed for real-time monitoring of distortion or deformation of the ship's hull in response to loading and/or environmental forces (e.g. iceberg), wherein a plurality of rovers are mounted on the ship's hull as illustrated for purposes of monitoring the ship's hull by collecting and processing GNSS signals transmitted from the GNSS satellite constellations, to automatically determine spatial deformation and/or deflection with respect to its locally embedded coordinate reference system;

FIG. 261 is a perspective view of the ship's hull shown in FIG. 260;

FIG. 262 is a plan view of the ship's hull shown in FIG. 260;

FIG. 263 is an elevated side view of the ship's hull shown in FIG. 260

Figure 264:
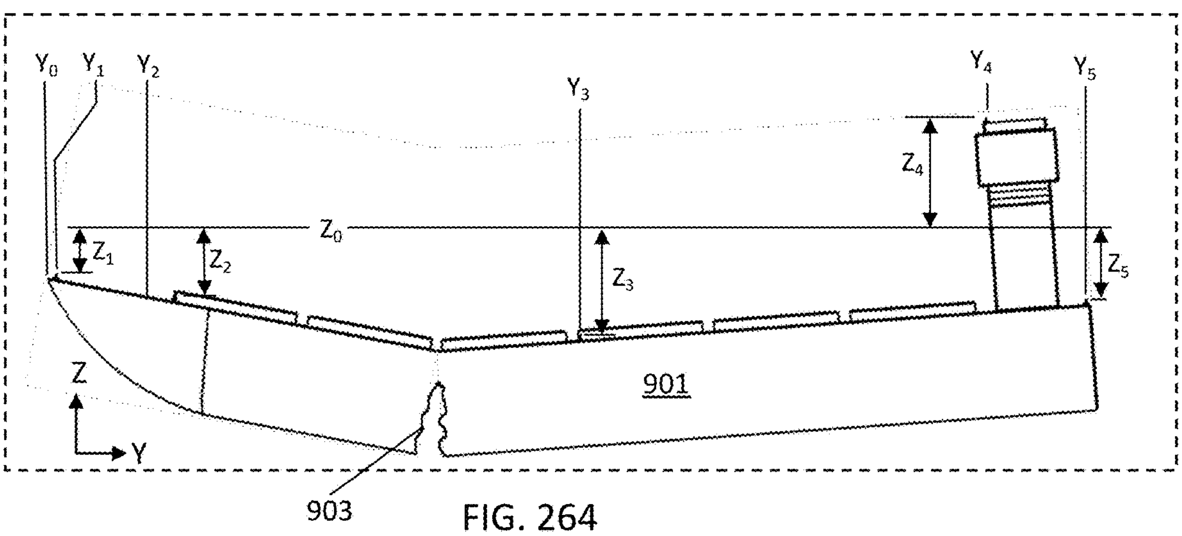
Figure 265:
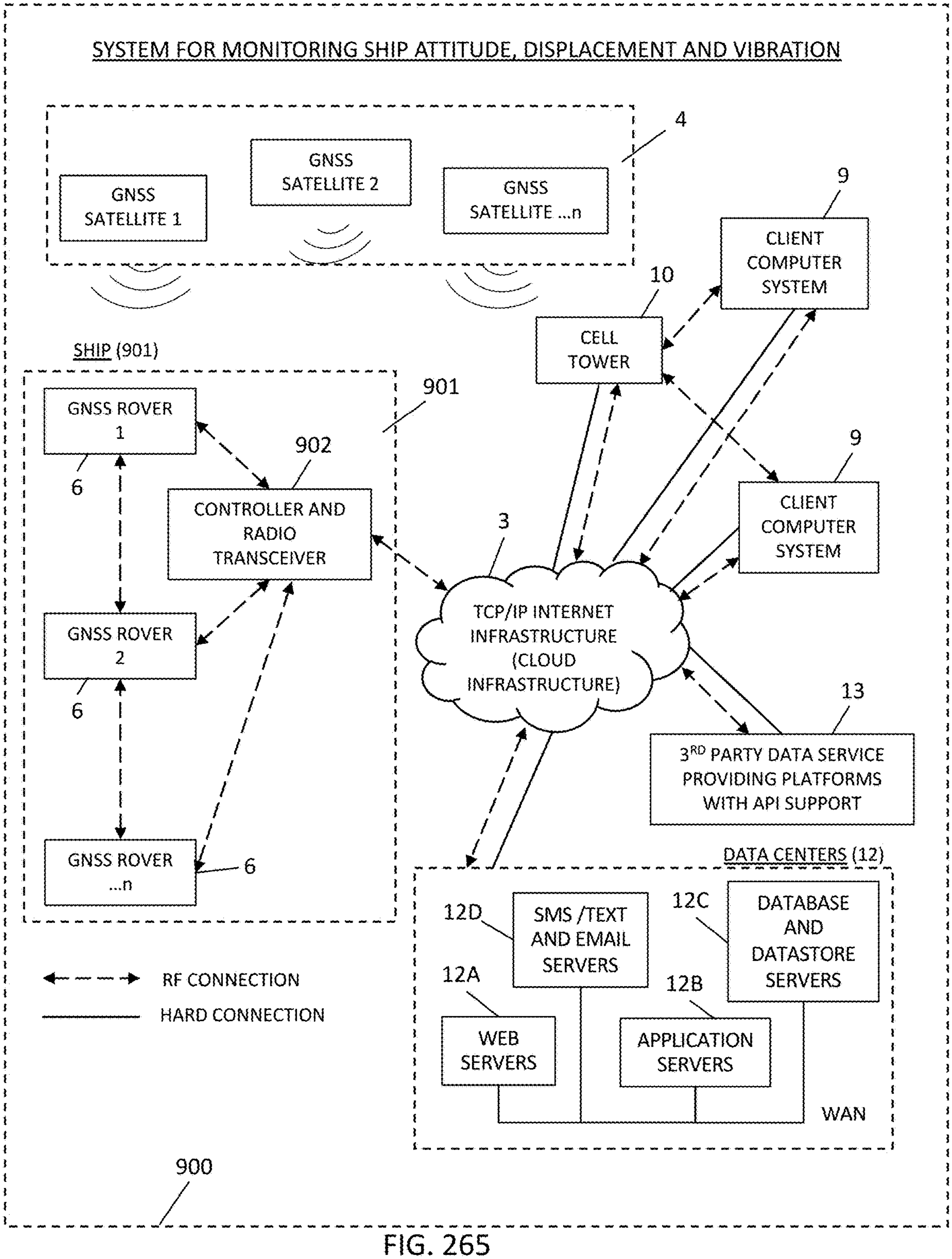
Figure 266:
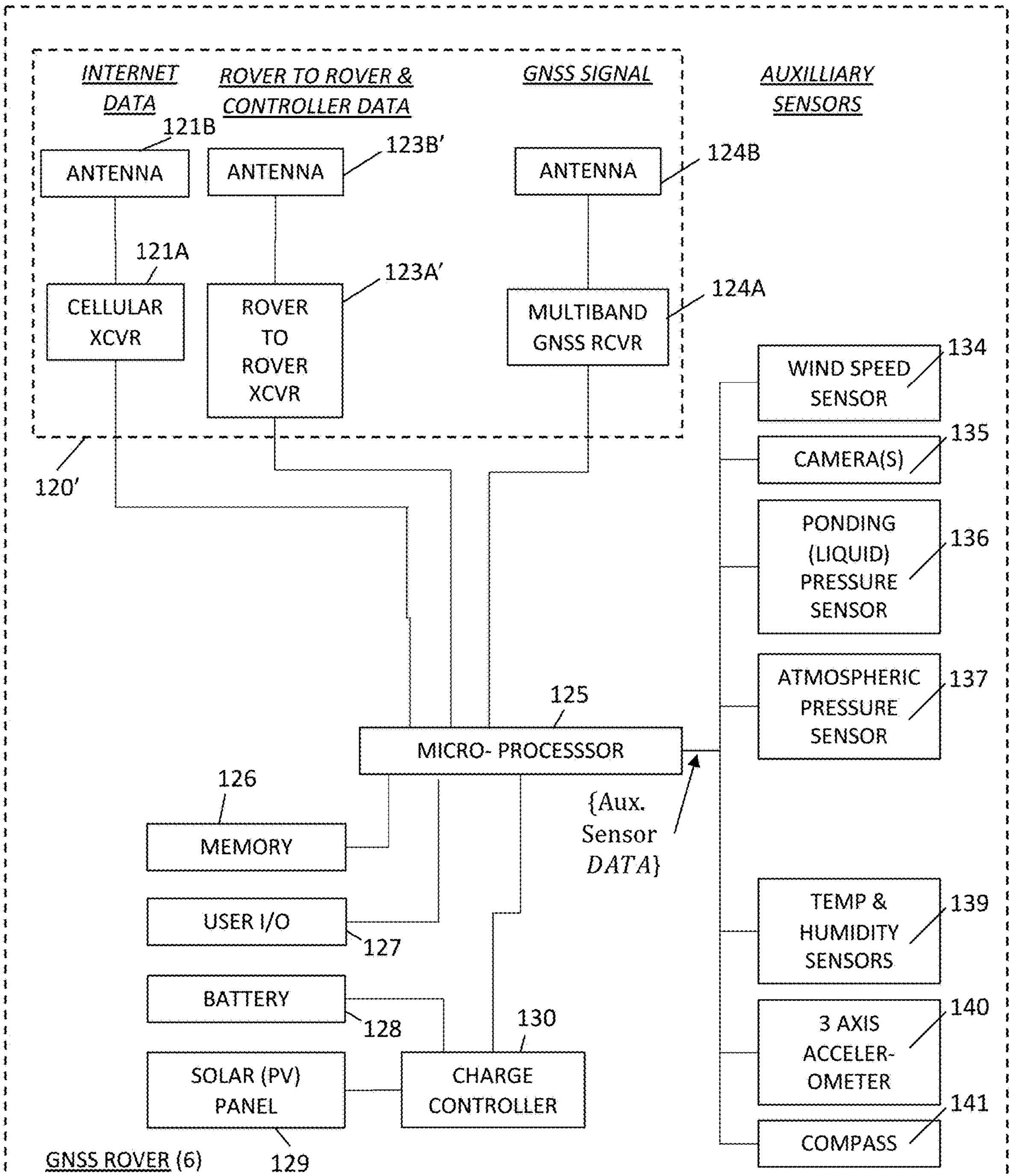
Figure 267:
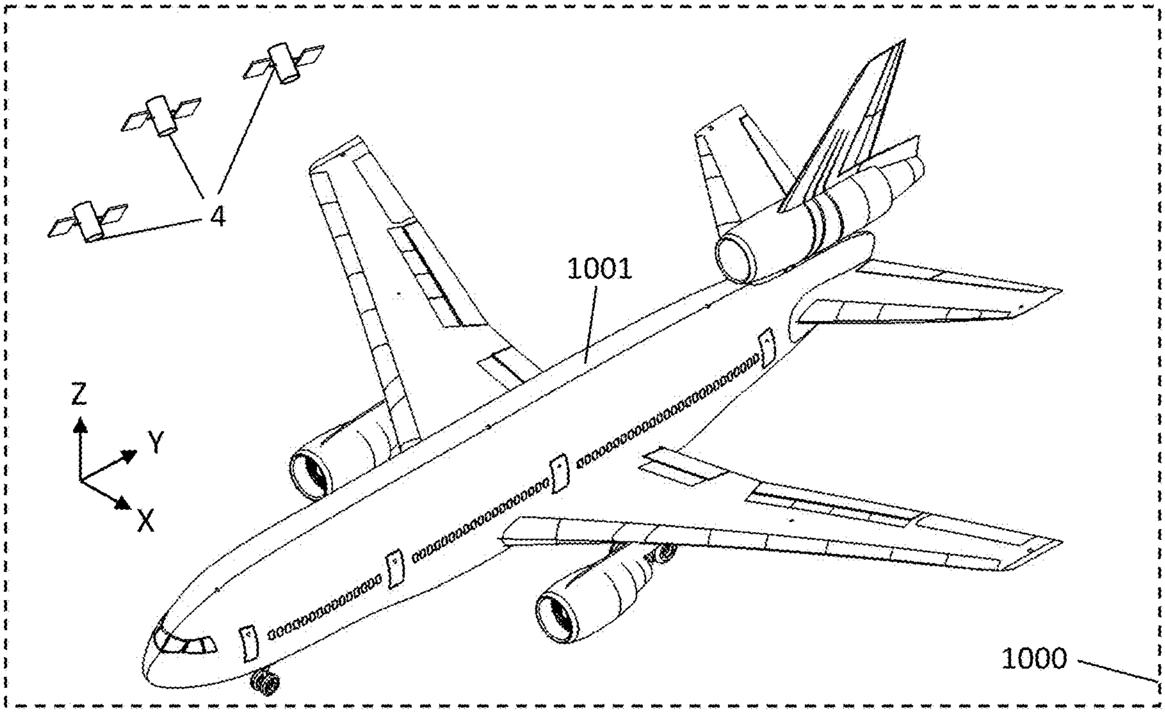
Figure 268:
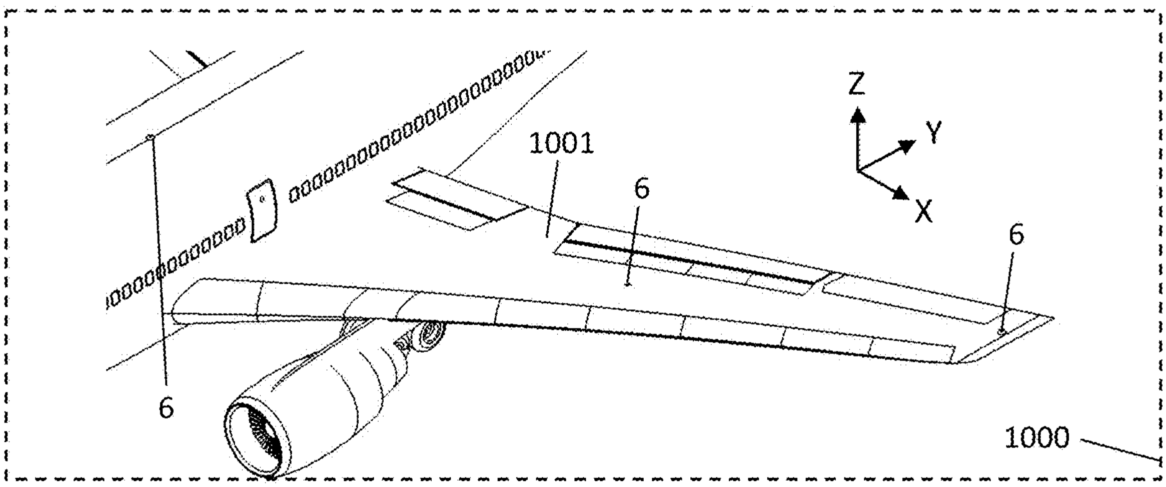
Figure 269:
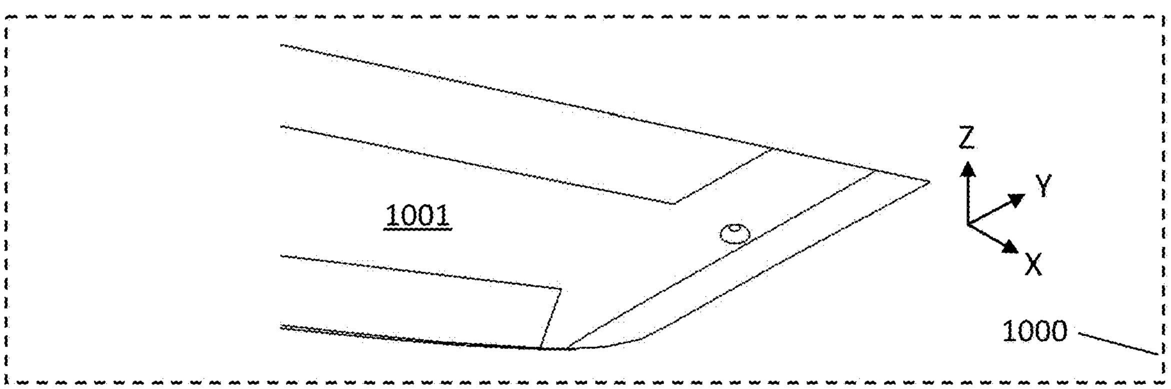
Figure 270:
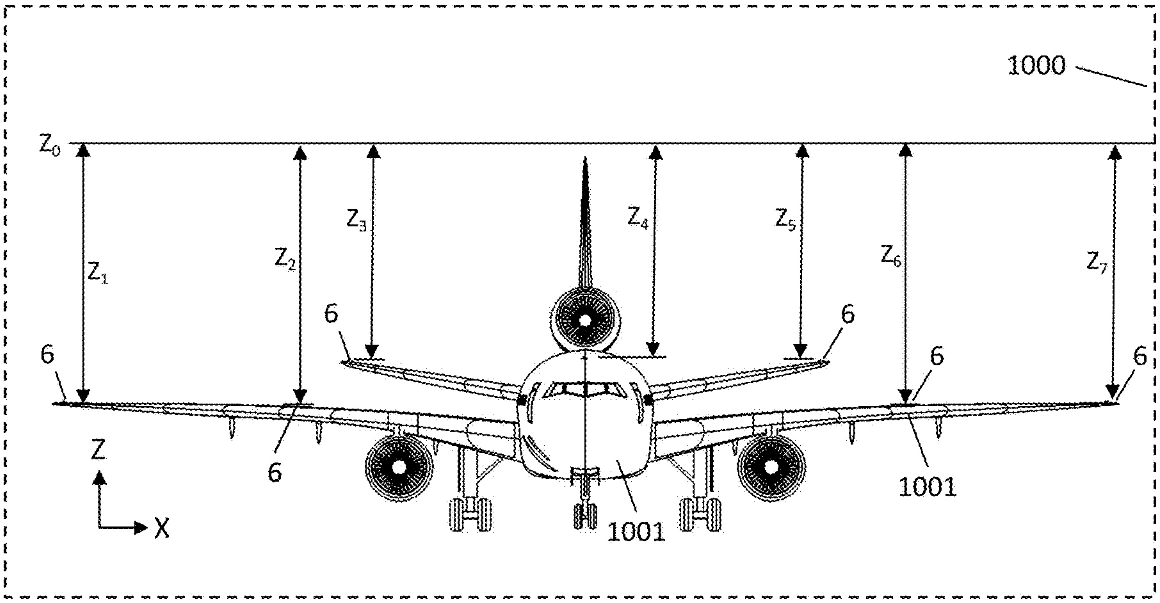
Figure 271:
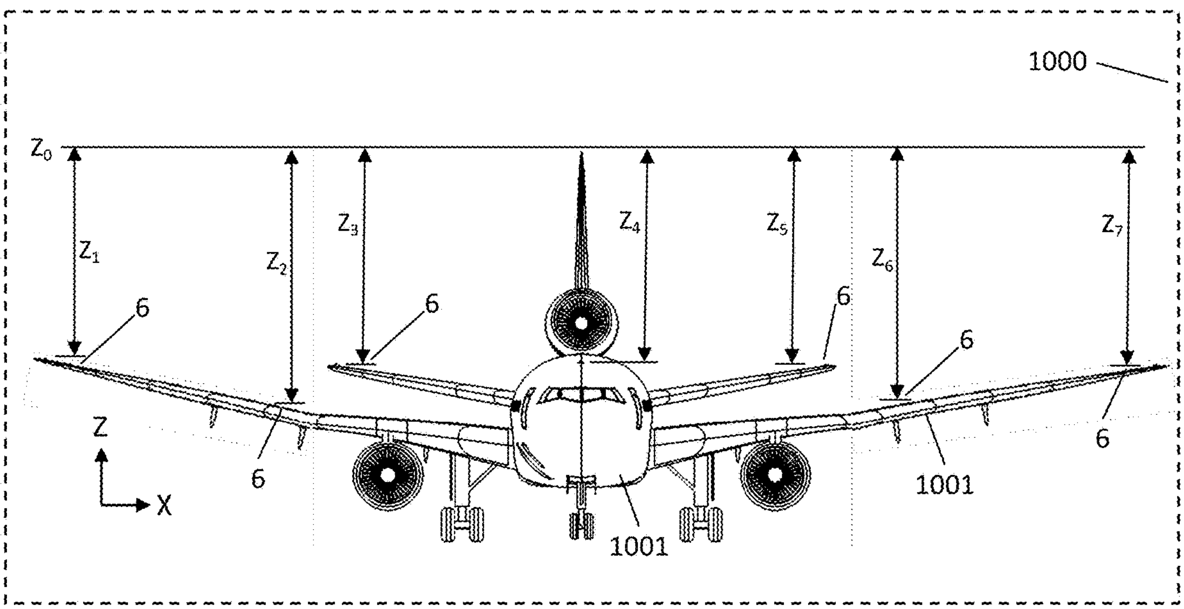
Figure 272:
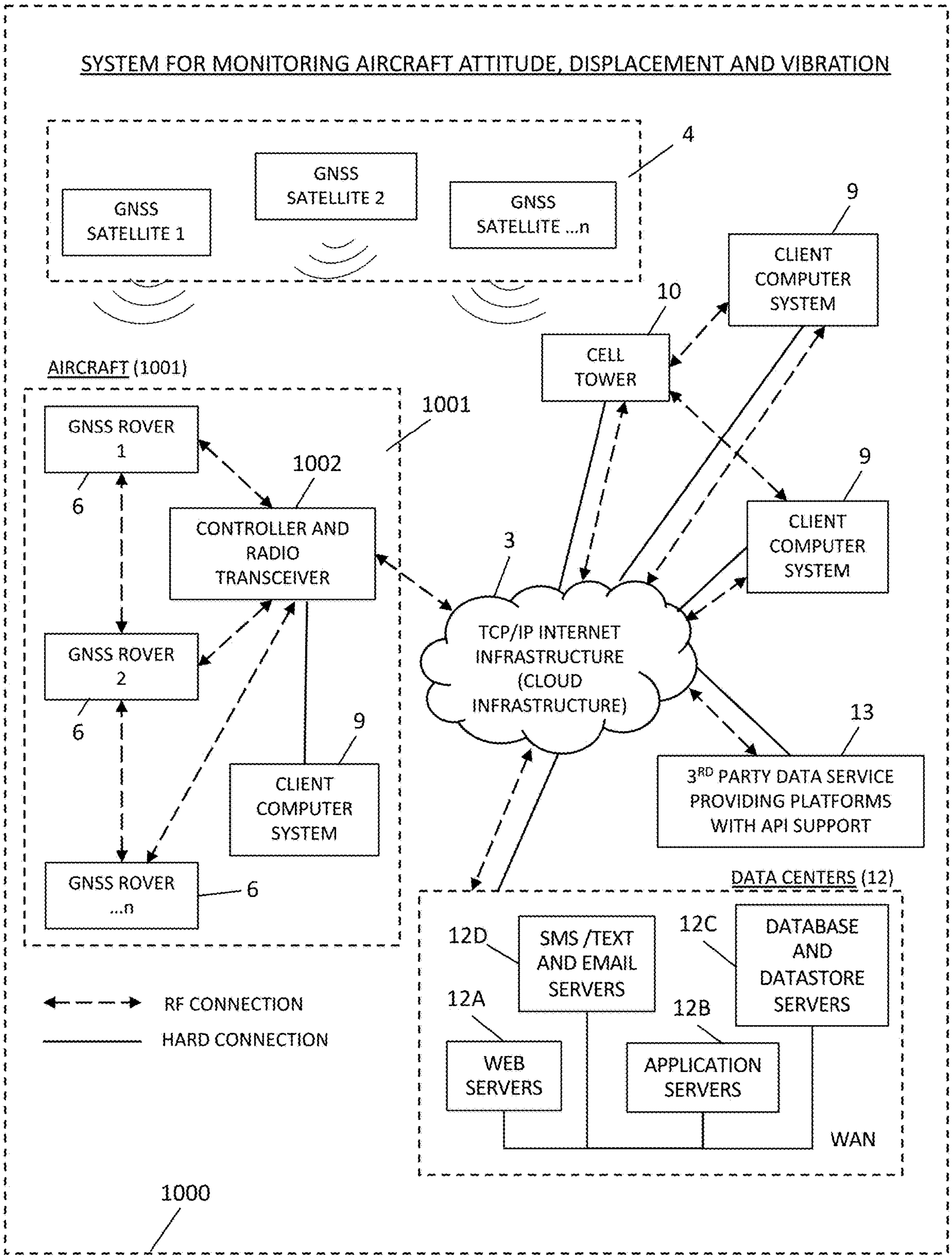
Figure 273:
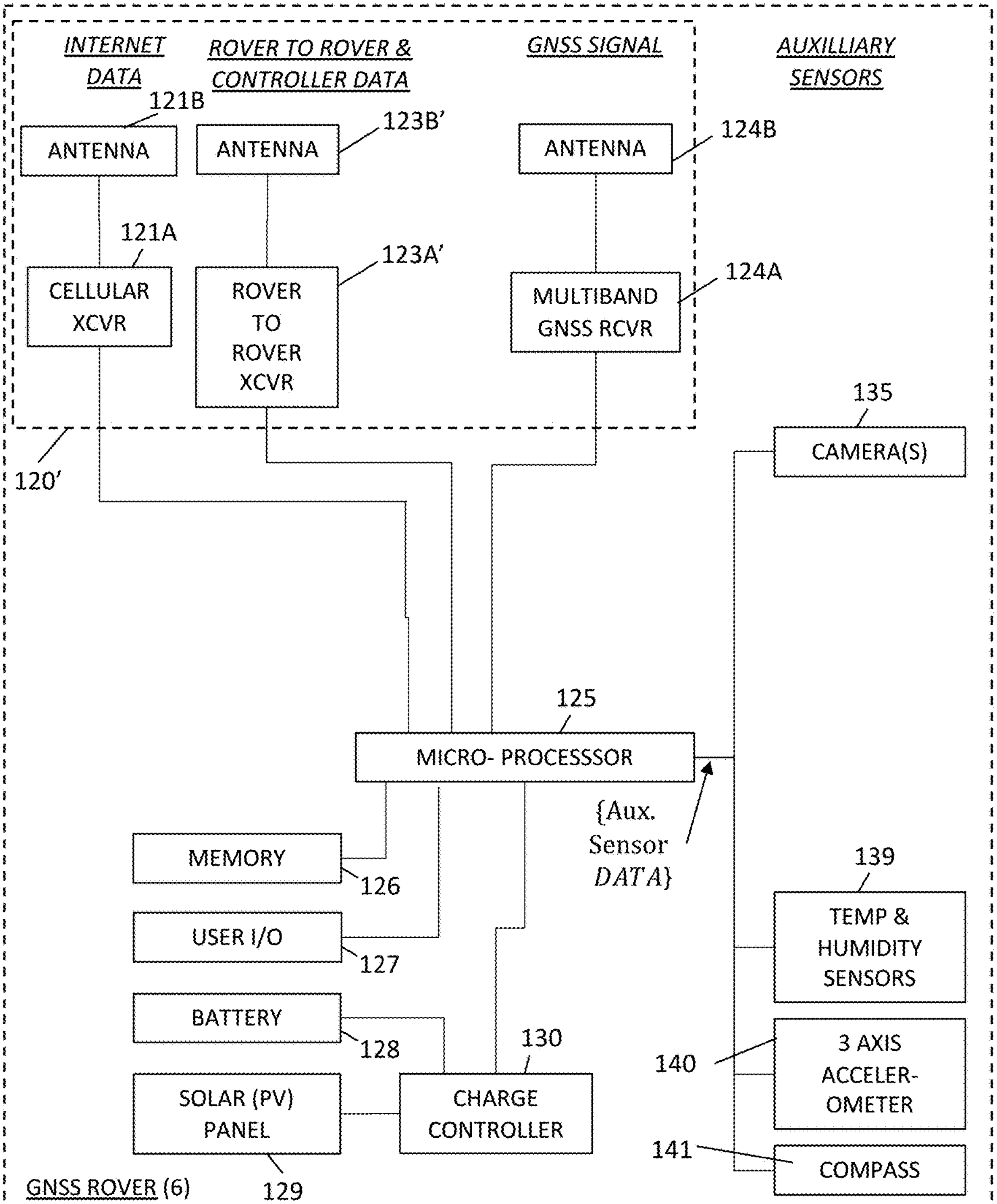
Figure 274:
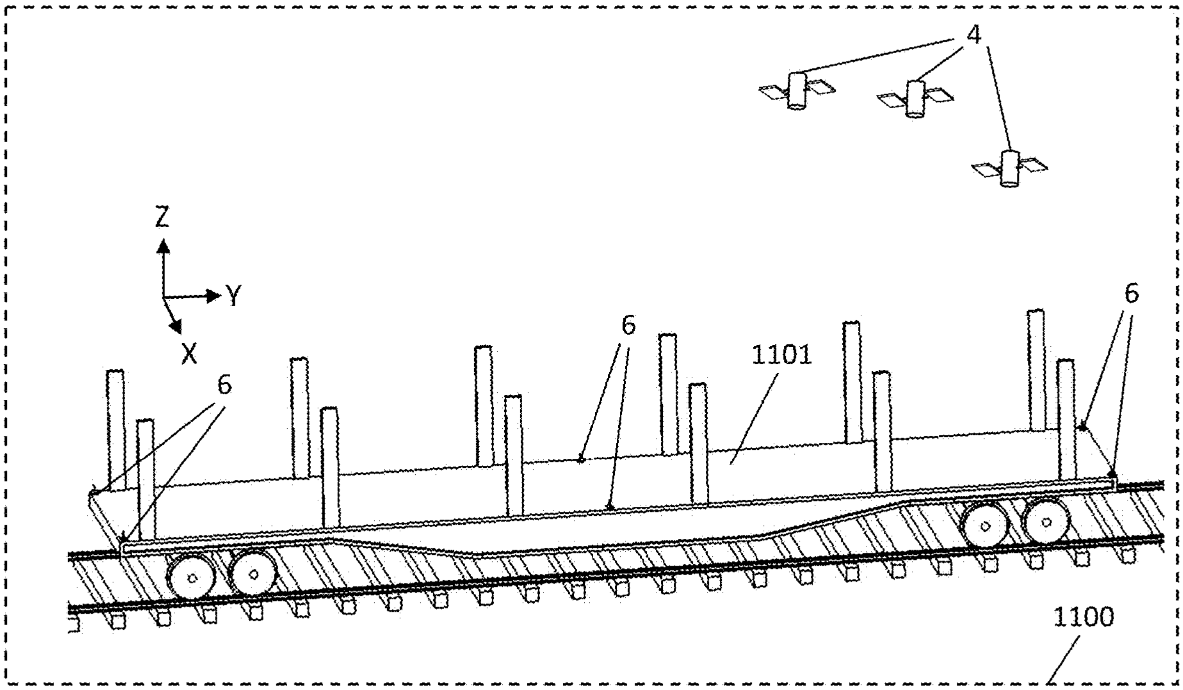
Figure 275:
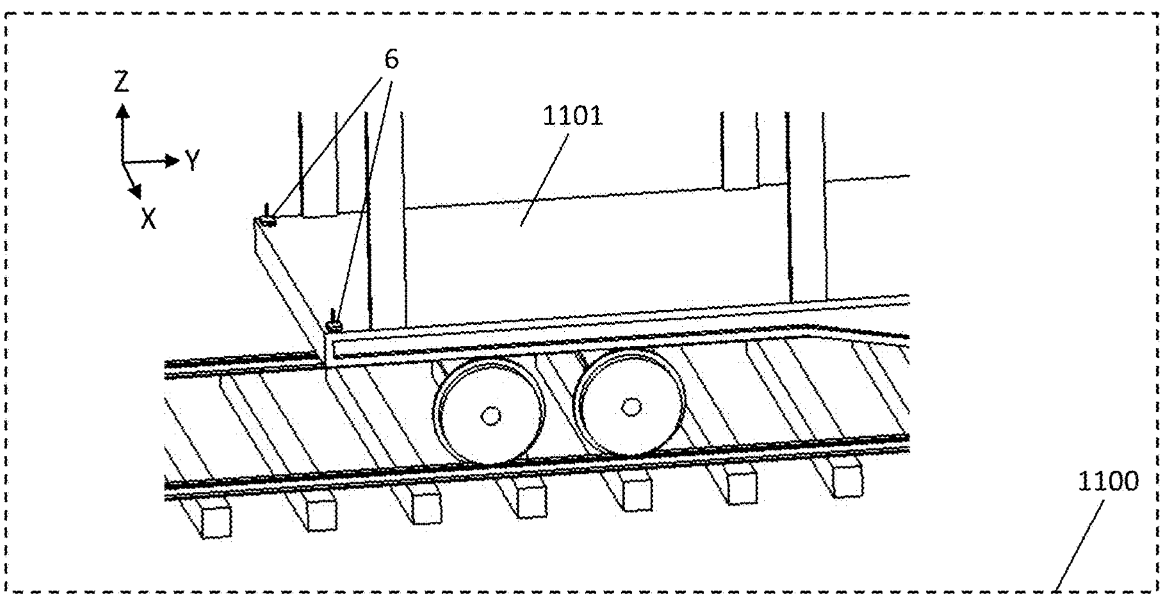
Figure 276:
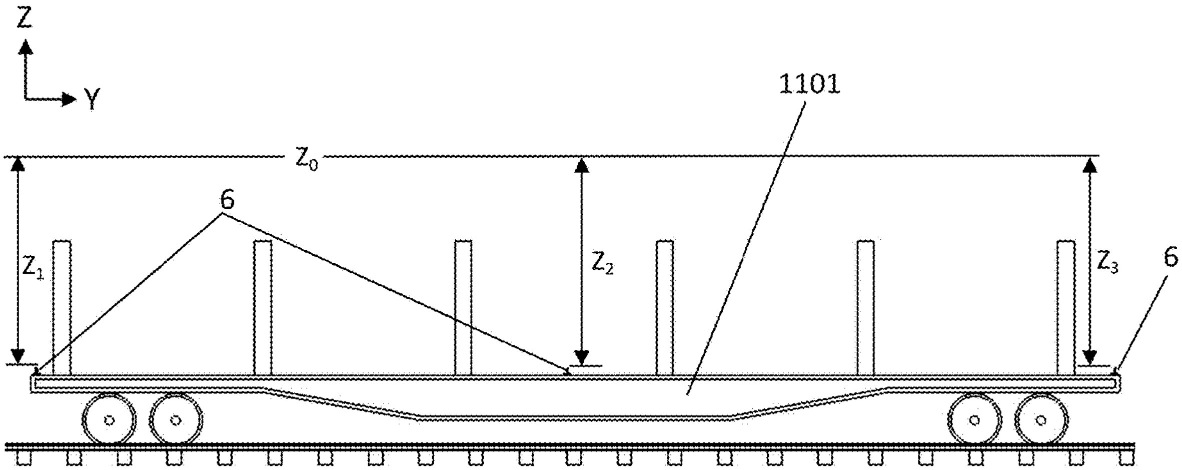
Figure 277:
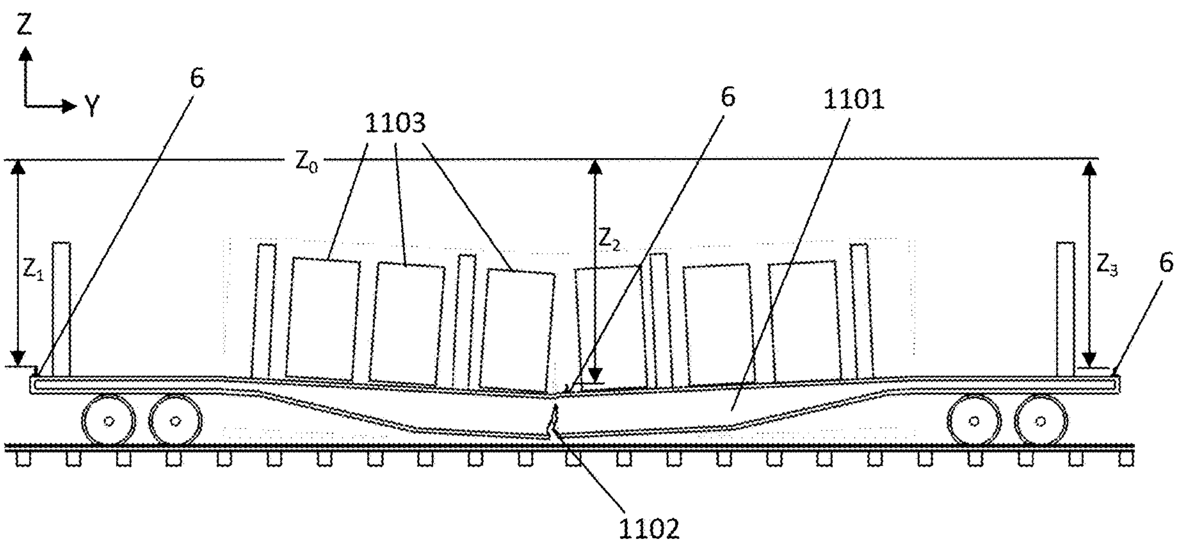
Figure 278:
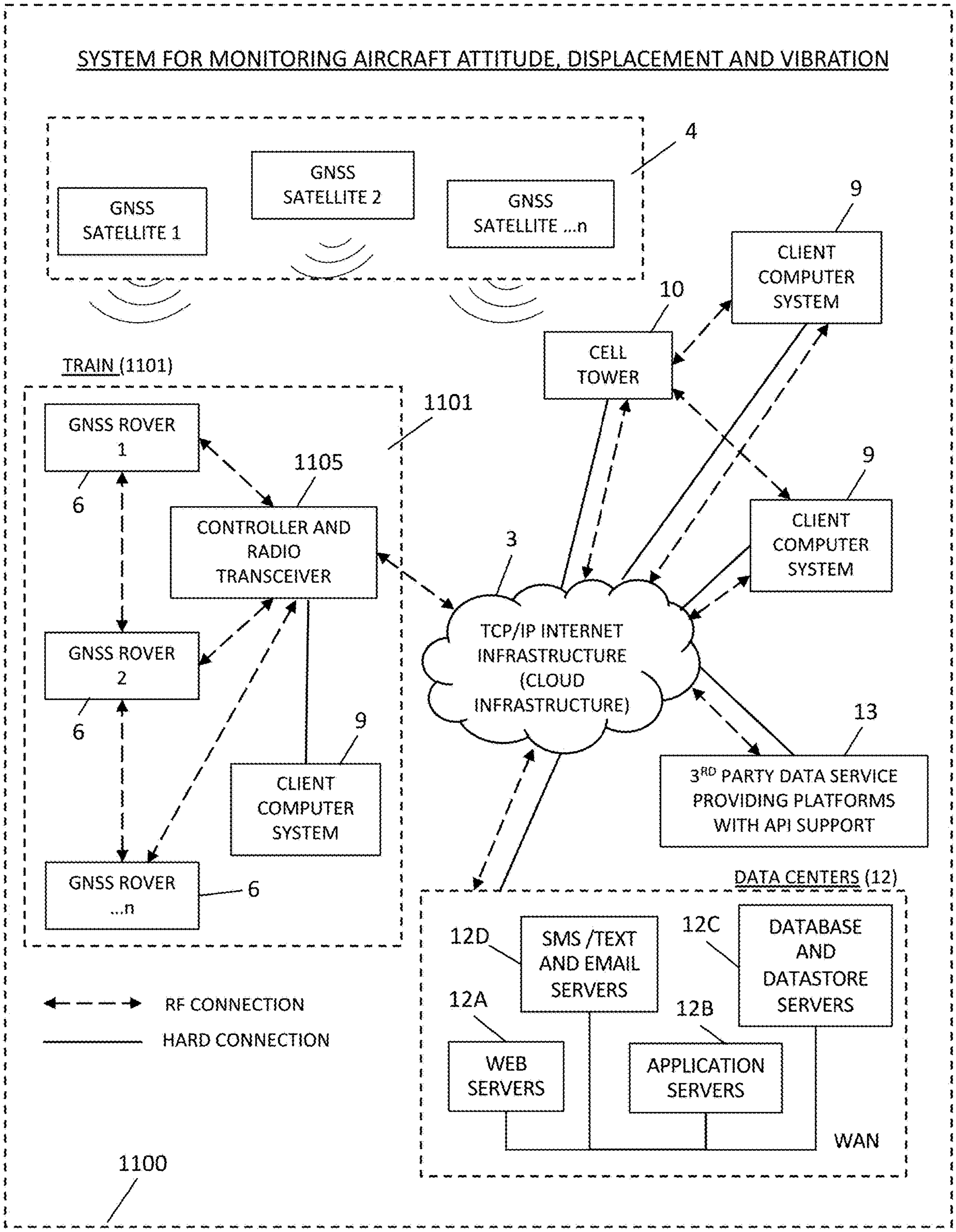
Figure 279:
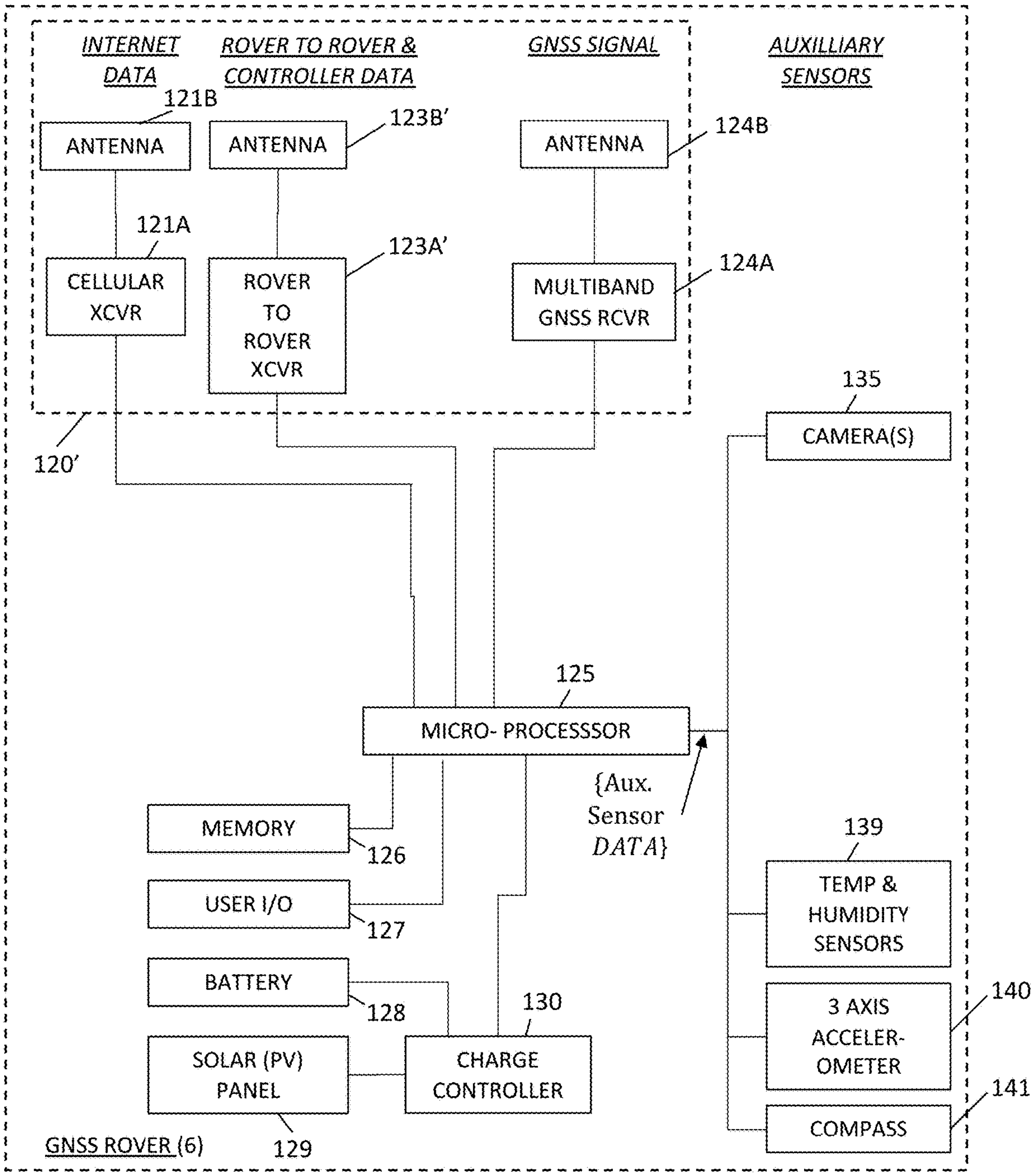
Figure 280:
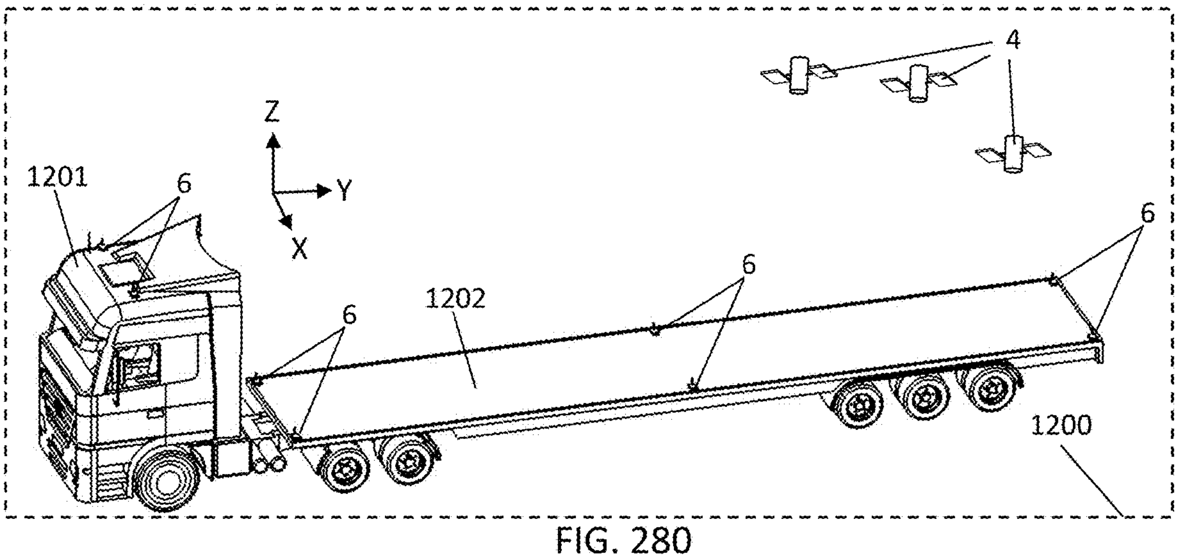
Figure 281:
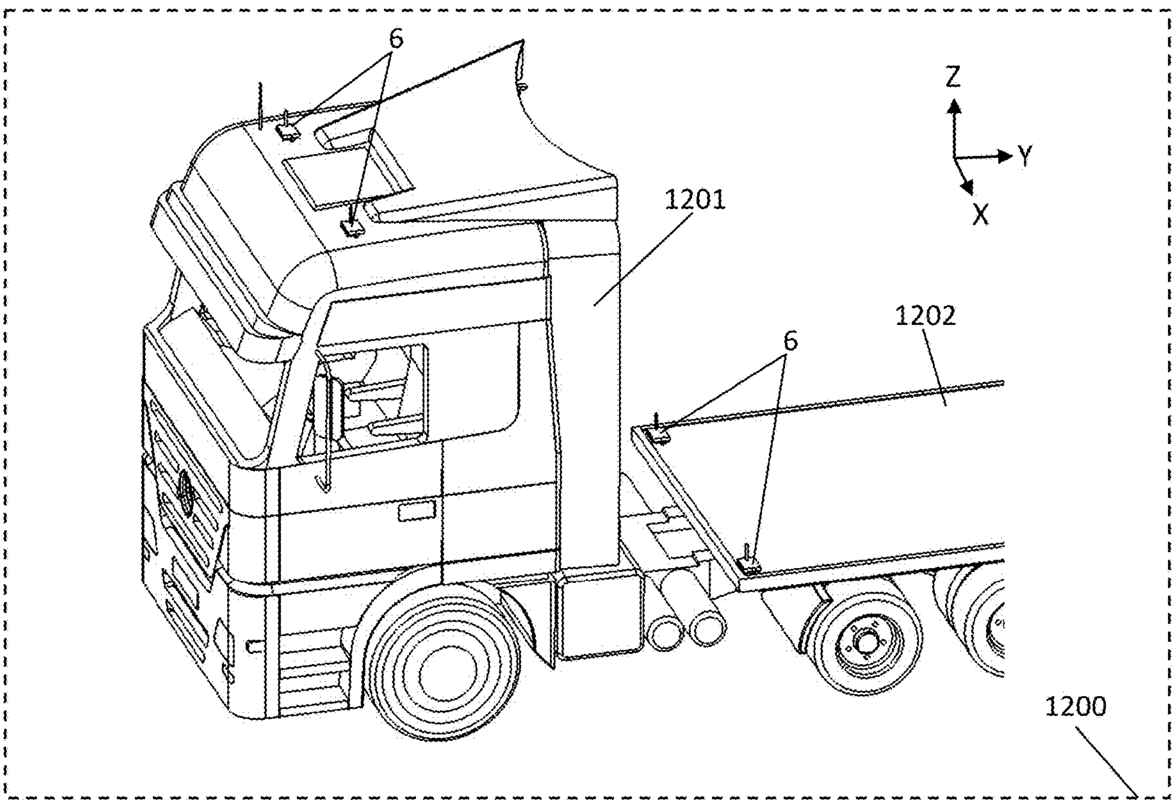
Figure 282:
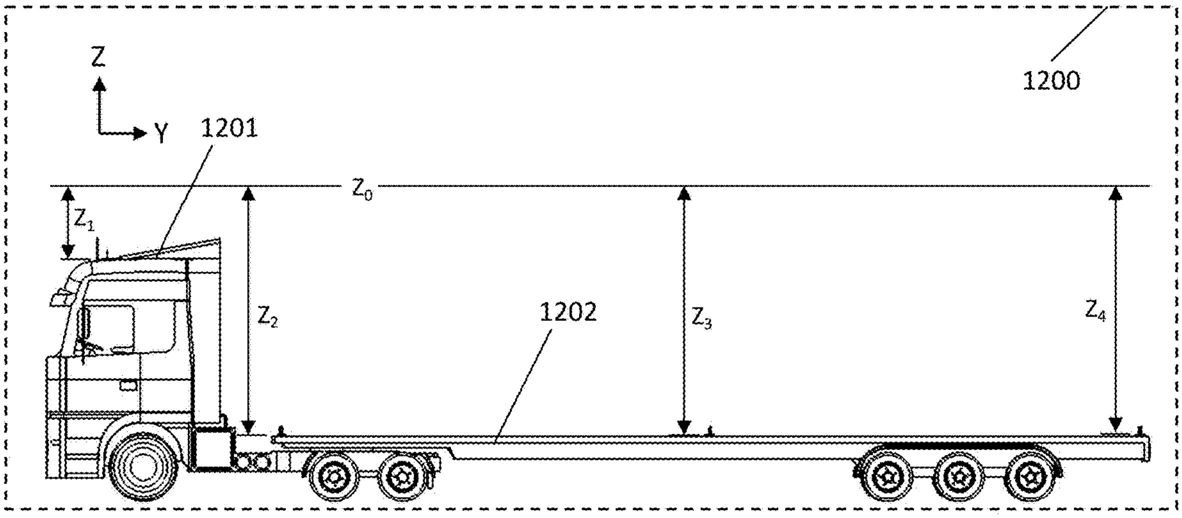
Figure 283:
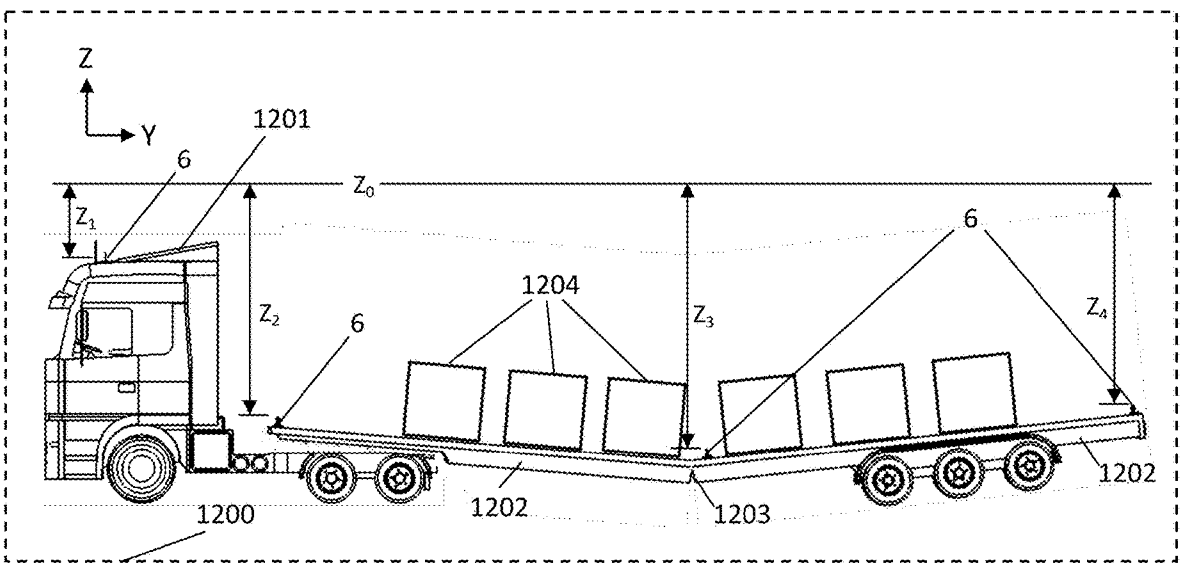
Figure 284:
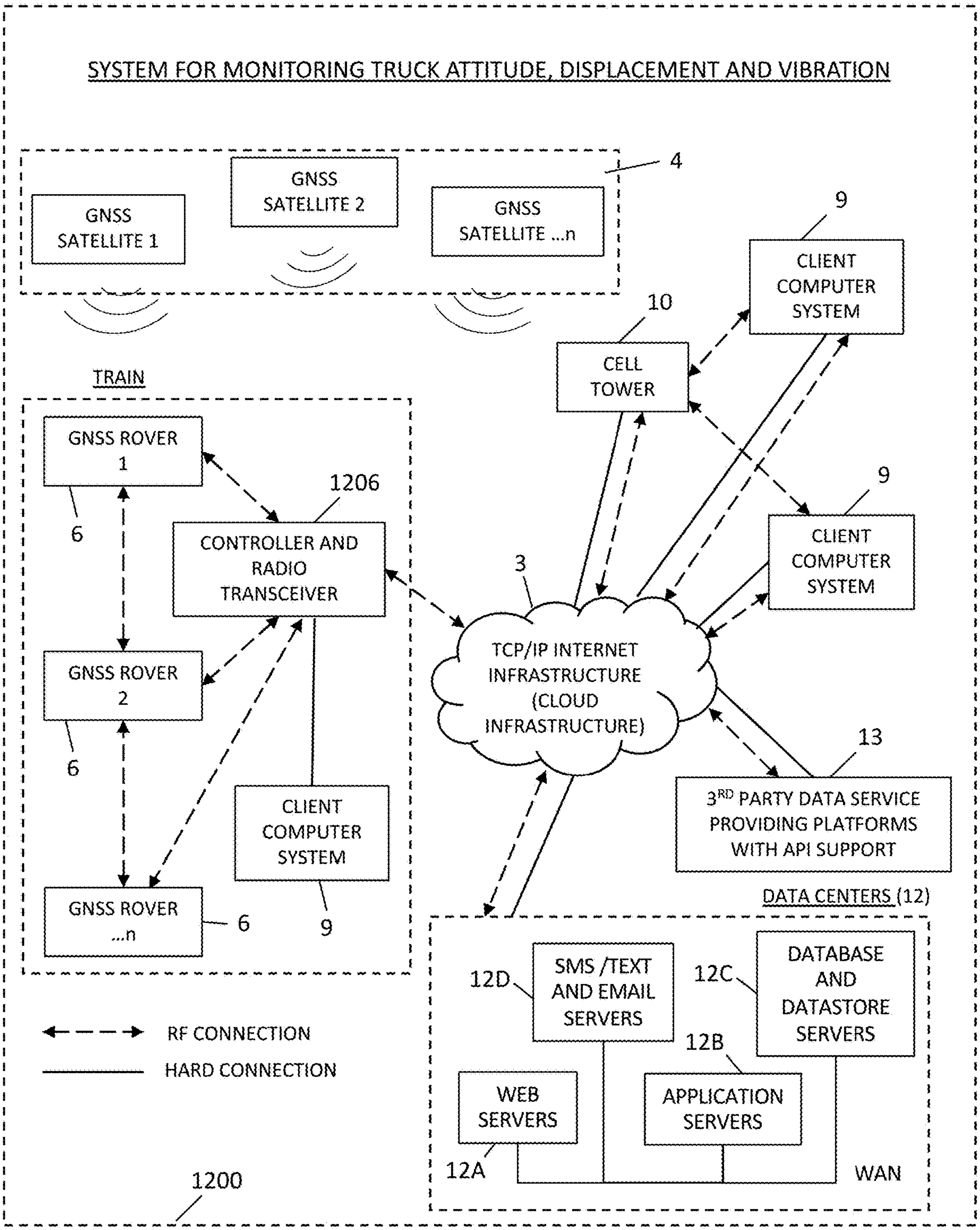
Figure 285:
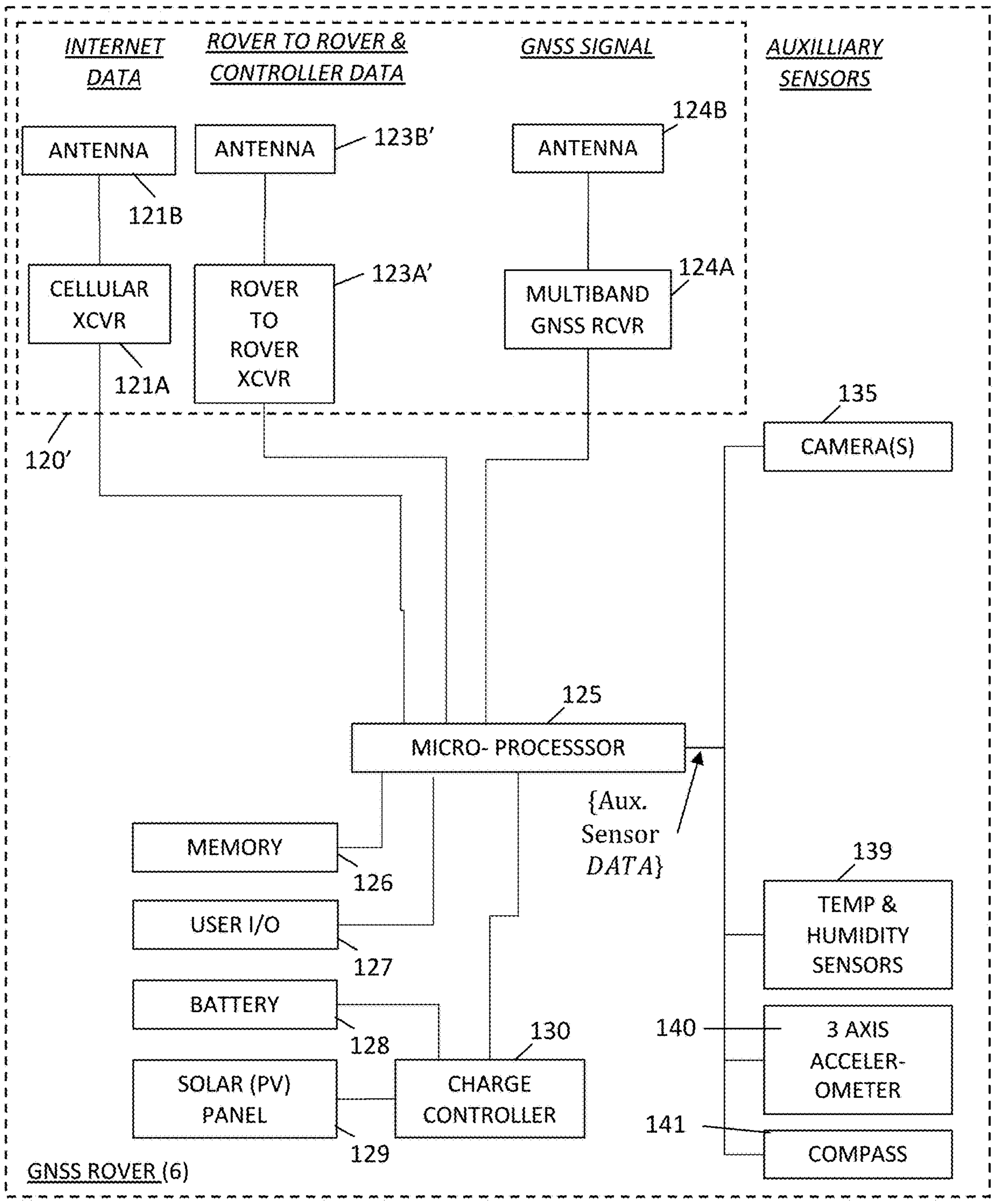

FIG. 264 is an elevated side view of the ship's hull shown in FIG. 260, after responding to forces created by internal and/or external loads;

FIG. 265 is a perspective view of a GNSS system network of the present invention installed in the ship's hull of FIG. 260 and deployed for real-time monitoring of the ship's hull in response to internal and/or external loading, wherein a plurality of rovers are mounted in the ship's hull as illustrated for purposes of monitoring the ship's hull by collecting and processing GNSS signals transmitted from the GNSS satellite constellations, and a controller and radio transceiver for transmitting GNSS signals to local or remote signal processors to automatically determine spatial deformation;

FIG. 266 is a system block type schematic diagram for each GNSS rover unit deployed on the GNSS system network of the present invention as depicted in FIG. 265, shown comprising a cellular XCVR with antenna, an Internet gateway XCVR with antenna, a rover to rover radio with antenna, a multiband GNSS RCVR with antennas, a microprocessor with a memory architecture and a user I/O, a battery, a solar (PV) panel, a charge controller, a 3 axis accelerometer, camera(s), temp & humidity sensors, an atmospheric pressure sensor, auxiliary sensors, and a compass;

FIG. 267 is a perspective view of a GNSS system network of the present invention installed in the aircraft's fuselage and deployed for real-time monitoring of distortion or deformation of the aircraft in response to loading and/or environmental force, wherein a plurality of rovers are mounted on the aircraft as illustrated for purposes of monitoring the region of the aircraft by collecting and processing GNSS signals transmitted from the GNSS satellite constellations, to automatically determine spatial deformation and/or deflection with respect to its locally embedded coordinate reference system;

FIG. 268 is a perspective view of the aircraft wing shown in FIG. 267;

FIG. 269 is a perspective view of the aircraft wing shown in FIG. 267, with at least one GNSS rover mounted thereon;

FIG. 270 is an elevated front view of the aircraft shown in FIG. 267;

FIG. 271 is an elevated front view of the aircraft shown in FIG. 267, after responding to forces created by internal and/or external loads;

FIG. 272 is a perspective view of a GNSS system network of the present invention installed in the aircraft of FIG. 267 and deployed for real-time monitoring of the aircraft in response to internal and/or external loading, wherein a plurality of rovers are mounted on the aircraft as illustrated for purposes of monitoring the aircraft by collecting and processing GNSS signals transmitted from the GNSS satellite constellations, and a controller and radio transceiver for transmitting GNSS signals to local or remote signal processors to automatically determine spatial deformation;

FIG. 273 is a system block type schematic diagram for each GNSS rover unit deployed on the GNSS system network of the present invention as depicted in FIG. 267, shown comprising a cellular XCVR with antenna, an Internet gateway XCVR with antenna, a rover to rover radio with antenna, a multiband GNSS RCVR with antennas, a microprocessor with a memory architecture and a user I/O, a battery, a solar (PV) panel, a charge controller, a 3 axis accelerometer, camera(s), temp & humidity sensors, an atmospheric pressure sensor, auxiliary sensors, and a compass;

FIG. 274 is a perspective view of a GNSS system network of the present invention installed in the railcar and deployed for real-time monitoring of distortion or deformation of the railcar in response to loading and/or environmental forces, wherein a plurality of rovers are mounted on the railcar as illustrated for purposes of monitoring the railcar by collecting and processing GNSS signals transmitted from the GNSS satellite constellations, to automatically determine spatial deformation and/or deflection with respect to its locally embedded coordinate reference system;

FIG. 275 is a perspective view of the railcar shown in FIG. 274;

FIG. 276 is an elevated side view of the railcar shown in FIG. 274;

FIG. 277 is an elevated side view of the railcar shown in FIG. 274, after responding to forces created by internal and/or external loads;

FIG. 278 is a perspective view of a GNSS system network of the present invention installed in the railcar of FIG. 260 and deployed for real-time monitoring of the railcar in response to internal and/or external loading, wherein a plurality of rovers are mounted in the railcar as illustrated for purposes of monitoring the railcar by collecting and processing GNSS signals transmitted from the GNSS satellite constellations, and a controller and radio transceiver for transmitting GNSS signals to local or remote signal processors to automatically determine spatial deformation;

FIG. 279 is a system block type schematic diagram for each GNSS rover unit deployed on the GNSS system network of the present invention as depicted in FIG. 275, shown comprising a cellular XCVR with antenna, an Internet gateway XCVR with antenna, a rover to rover radio with antenna, a multiband GNSS RCVR with antennas, a microprocessor with a memory architecture and a user I/O, a battery, a solar (PV) panel, a charge controller, a compass, a 3-axis accelerometer, camera(s), temp & humidity sensors, an atmospheric pressure sensor, auxiliary sensors, and a compass;

FIG. 280 is a perspective view of a GNSS system network of the present invention installed in the tractor and trailer and deployed for real-time monitoring of distortion or deformation of the tractor and trailer in response to loading and/or environmental forces, wherein a plurality of rovers are mounted on and/or in the tractor trailer as illustrated for purposes of monitoring the same by collecting and processing GNSS signals transmitted from the GNSS satellite constellations, to automatically determine spatial deformation and/or deflection with respect to its locally embedded coordinate reference system;

FIG. 281 is a perspective view of the tractor trailer shown in FIG. 280;

FIG. 282 is a plan view of the tractor trailer shown in FIG. 280;

FIG. 283 is an elevated side view of the tractor trailer shown in FIG. 280, after responding to forces created by internal and/or external loads;

FIG. 284 is a perspective view of a GNSS system network of the present invention installed in the tractor trailer of FIG. 280 and deployed for real-time monitoring of the tractor trailer in response to internal and/or external loading, wherein a plurality of rovers are mounted on and/or in the tractor trailer as illustrated for purposes of monitoring the tractor trailer by collecting and processing GNSS signals transmitted from the GNSS satellite constellations and a controller and radio transceiver for transmitting GNSS signals to local or remote signal processors to automatically determine spatial deformation; and FIG. 285 is a system block type schematic diagram for each GNSS rover unit deployed on the GNSS system network of the present invention as depicted in FIG. 280, shown comprising a cellular XCVR with antenna, an Internet gateway XCVR with antenna, a rover to rover radio with antenna, a multiband GNSS RCVR with antennas, a microprocessor with a memory architecture and a user I/O, a battery, a solar (PV) panel, a charge controller, a compass, a 3 axis accelerometer, camera(s), temp & humidity sensors, an atmospheric pressure sensor, auxiliary sensors, and a compass.

DETAILED DESCRIPTION OF THE ILLUSTRATIVE EMBODIMENTS OF THE PRESENT INVENTION

Referring to the figures in the accompanying Drawings, the illustrative embodiments of the system and will be described in great detail, wherein like elements will be indicated using like reference numerals.

Brief Overview of the GNSS System Network of the Present Invention

FIG. 1 shows a GNSS network of the present invention 1 configured for remotely monitoring of the displacement, distortion and/or deformation of virtually any type of stationary and/or mobile system 2 having a physical embodiment with boundary conditions, and being tracked by the GNSS network. As shown in FIG. 1, the GNSS system network 1 comprises: (i) a cloud-based TCP/IP network architecture 3 supporting a plurality of GNSS satellites 4 (4A, 4B, . . . 4N) transmitting GNSS signals towards the earth 5 and objects below; (ii) a plurality of GNSS rovers of the present invention 6 mounted on the rooftop surfaces of buildings 2 for receiving and processing transmitted GNSS signals during monitoring using time averaging seismic data extraction processing; (iii) an Internet Gateway 7 providing the GNSS rovers 6 access to the Internet communication infrastructure 3; (iv) one or more GNSS base stations 8 to support RTK correction of the GNSS signals; (v) one or more client computing systems 9 for transmitting instructions and receiving alerts and notifications and supporting diverse administration, operation and management functions on the system network 1; (vi) a cell tower 10 for supporting cellular data communications across the system network 1; (vii) a data center 11 supporting web servers 12A, application servers 12B, database and datastore servers 12C, and SMS/text and email servers 12D; and (viii) a local weather station 13 (e.g. including NOAA, and other national and state weather services).

FIG. 2 shows the system architecture for each global navigation satellite system (GNSS) satellite 4 that is deployed within the GNSS system network of the present invention of FIG. 1. As shown, each GNSS satellite 4A comprises: a propulsion system 4A1; solar panels 4A2; L band antennas 4A3; radio transmitters and receivers 4A4; and atomic clocks 4A5.

FIG. 3 shows the system architecture for the internet gateway 7 deployed in the GNSS system network of the present invention of FIG. 1. As shown, the internet gateway 7 comprises: a micro-processor 7A with a supporting a memory architecture; a LAN transceiver 7B; a GUI-based user display 7C; a LAN port 7D; an RF transceiver 7E with an antenna 7F; a manager 7G; and a viewer 7H.

Specification of the Network Architecture of the GNSS System Network of the Present Invention In general, FIG. 1 illustrates the network architecture of the GNSS system network 1 for the case where the system network is implemented as a stand-alone platform designed to work independent from, but alongside of one or more networks deployed on the Internet. As shown in FIG. 1, the GNSS system network 1 is shown comprising various system components, including a cellular phone and SMS messaging systems 12D, and one or more industrial-strength data centers 12, preferably mirrored with each other and running Border Gateway Protocol (BGP) between its router gateways, in a manner well known in the data center art. As shown in FIG. 1, each data center 12 comprising: a cluster of communication servers 12A for supporting http and other TCP/IP based communication protocols on the Internet; cluster of application servers 12B; a cluster of email processing servers 12D; cluster of SMS servers 12D; and a cluster of RDBMS servers 18 configured within an distributed file storage and retrieval ecosystem/system, and interfaced around the TCP/IP infrastructure of the Internet 3 well known in the art. For details regarding such system engineering considerations and requirements, reference should be made to Applicant's published U.S. patent application Publication Ser. No. 15/794,263, incorporated herein by reference in its entirety as if set forth fully herein.

As shown, the system network architecture also comprises: a plurality of Web-enabled client machines 9 (e.g. desktop computers, mobile computers such as iPad, and other Internet-enabled computing devices with graphics display capabilities, etc.) running native mobile applications and mobile web browser applications supported modules supporting client-side and server-side processes on the system network of the present invention; and numerous media servers 13 (e.g. Google, Facebook, NOAA, etc.) operably connected to the infrastructure of the Internet. The network of mobile computing systems 9 will run enterprise-level mobile application software 15, operably connected to the TCP/IP infrastructure of the Internet. Each mobile computing system is provided with GPS-tracking and having wireless internet connectivity with the TCP/IP infrastructure of the Internet 3, using various communication technologies (e.g. GSM, Bluetooth and other wireless networking protocols well known in the wireless communications arts).

In general, regardless of the method of implementation employed, the system network of the present invention 1 will be in almost all instances, realized as an industrial-strength, carrier-class Internet-based network of object-oriented system design. Also, the system network will be deployed over a global data packet-switched communication network comprising numerous computing systems and networking components, as shown. As such, the information network of the present invention is often referred to herein as the "system" or "system network".

Preferably, although not necessary, the system network 1 would be designed according to object-oriented systems engineering (DOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application described above. Such practices are well known in the computer programming, networking and digital communication arts.

Specification of Database Schema for the Database Component Used on the GNSS System Network of the Present Invention During the design and development of the GNSS system network, a data schema will be created for the object-oriented system-engineered (DOSE) software component thereof, for execution on a client-server architecture. In general, the software component of the system network will consist of classes, and these classes can be organized into frameworks or libraries that support the generation of graphical interface objects within GUI screens, control objects within the application or middle layer of the enterprise-level application, and enterprise or database objects represented within the system database (RDBMS) 12C. Preferably, the RDBMS will be structured according to a database schema comprising enterprise objects, represented within the system database (e.g. RDBMS), and including, for example: building owner; building manager; building insurer; system user ID; building ID, building location; building property value; client workstation ID for computer workstation deployed on the system network; and many other objects used to model the many different aspects of the system being developed. These objects and the database schema will be used and reflected in a set of object-oriented software modules developed for the system. Each software module contains classes (written in an object-oriented programming language) supporting the system network of the present invention including, for example, the user registration module, GNSS rover registration module, GNSS base station registration module, mobile client computer registration module, user account management module, log-in module, settings module, contacts module, search module, data synchronization module, help module, and many other modules supporting the selection, delivery and monitoring of system monitoring related services supported on the system network of the present invention.

Different Ways of Implementing the Client Machines and Devices on the System Network of the Present Invention In one illustrative embodiment, the enterprise-level system network of the present invention is supported by a robust suite of hosted services delivered to (i) Web-based client subsystems 9 using an application service provider (ASP) model, and also to (ii) remote monitoring services deployed for various kinds of stationary and/or mobile systems to be monitored, as described above and below. In this embodiment, the Web-enabled mobile clients 9 can be realized using a web-browser application running on the operating system (OS) of a computing device 9 (e.g. Linux, Application IOS, etc.) to support online modes of system operation. It is understood, however, that some or all of the services provided by the system network can be accessed using Java clients, or a native client application, 15 running on the operating system (OS) of a client computing device 9, to support both online and limited off-line modes of system operation.

Specification of System Architecture of an Exemplary Mobile Computing System Deployed on the GNSS System Network of the Present Invention FIG. 117 illustrates the system architecture of an exemplary mobile computing system (e.g. system component) 9 deployed on the GNSS system network 1 and supporting the many services offered by system network servers. As shown, the mobile computing device 9 can include a memory interface 52, one or more data processors, image processors and/or central processing units 54, and a peripherals interface 56. The memory interface 52, the one or more processors 54 and/or the peripherals interface 56 can be separate components or can be integrated in one or more integrated circuits. One or more communication buses or signal lines can couple the various components in the mobile device. Sensors, devices, and subsystems can be coupled to the peripherals interface 56 to facilitate multiple functionalities. For example, a motion sensor 60, a light sensor 62, and a proximity sensor 64 can be coupled to the peripherals interface 56 to facilitate the orientation, lighting, and proximity functions. Other sensors 66 can also be connected to the peripherals interface 56, such as a positioning system (e.g., GPS receiver), a temperature sensor, a biometric sensor, a gyroscope, or other sensing device, to facilitate related functionalities. A camera subsystem 70 and an optical sensor 72, e.g., a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 74, which can include radio frequency receivers and transmitters and/or optical (e.g., infrared) receivers and transmitters. The specific design and implementation of the communication subsystem 74 can depend on the communication network(s) over which the mobile computing device 9 is intended to operate. For example, a mobile device 100 may include communication subsystems 224 designed to operate over a GSM network, a GPRS network, an EDGE network, a Wi-Fi or WiMax network, and a Bluetooth™ network. In particular, the wireless communication subsystems 74 may include hosting protocols such that the mobile computing device 9 may be configured as a base station for other wireless devices. An audio subsystem 76 can be coupled to a speaker 78 and a microphone 80 to facilitate voice-enabled functions, such as voice recognition, voice replication, digital recording, and telephony functions. The I/O subsystem 90 can include a touch screen controller 92 and/or other input controller(s) 94. The touch-screen controller 92 can be coupled to a touch screen 96. The touch screen 96 and touch screen controller 92 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 96. The other input controller(s) 94 can be coupled to other input/control devices 98, such as one or more buttons, rocker switches, thumb-wheel, infrared port, USB port, and/or a pointer device such as a stylus. The one or more buttons (not shown) can include an up/down button for volume control of the speaker 78 and/or the microphone 80. Such buttons and controls can be implemented as a hardware objects, or touch-screen graphical interface objects, touched and controlled by the system user. Additional features of mobile computing device 9 can be found in U.S. Pat. No. 8,631,358 incorporated herein by reference in its entirety.

Figure 4:
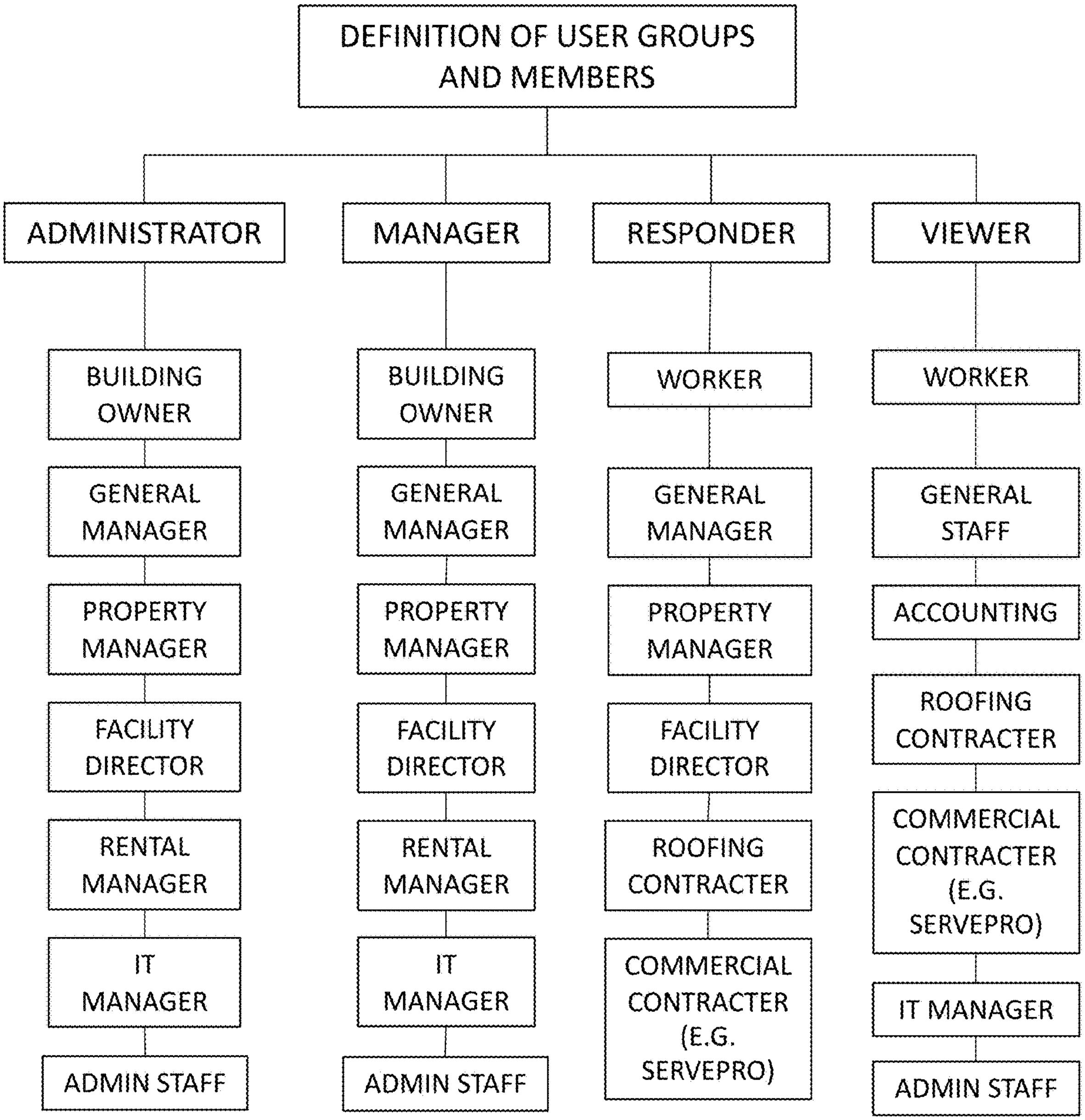
FIG. 4 is a Table Defining User Groups and Members supported by the GNSS system network of the present invention depicted in FIG. 1, namely: (i) Administrators including Building Owners, Property Managers, General Managers, Facility Directors, Rental Managers, IT Managers, and Admin Staff Members; (ii) Managers including Building Owners; Property Managers, General Managers, Facility Directors, Rental Managers, IT Managers, and Admin Staff Members; (iii) Responders including Workers, General Managers, Property Managers, Facility Directors, Roofing Contractors, and Commercial Contractors (e.g. SERVICE PRO); and (iv) Viewers including Workers, General Staff, Accounting, Roofing Contractors, Commercial Contractors (e.g. SERVICE PRO), IT Managers, and Admin Staff Members.

Specification of User Groups and Members Supported on the GNSS System Network of the Present Invention Referring to FIG. 4, there is shown a Table Defining User Groups and Members supported by the GNSS system network of the present invention depicted in FIG. 1. As shown, these User Groups and Members might include: (i) Administrators including Building Owners, Property Managers, General Managers, Facility Directors, Rental Managers, IT Managers, and Admin Staff Members; (ii) Managers including Building Owners; Property Managers, General Managers, Facility Directors, Rental Managers, IT Managers, and Admin Staff Members; (iii) Responders including Workers, General Managers, Property Managers, Facility Directors, Roofing Contractors, and Commercial Contractors (e.g. SERVICE PRO); and (iv) Viewers including Workers, General Staff, Accounting, Roofing Contractors, Commercial Contractors (e.g. SERVICE PRO), IT Managers, and Admin Staff Members.

Figure 5A:
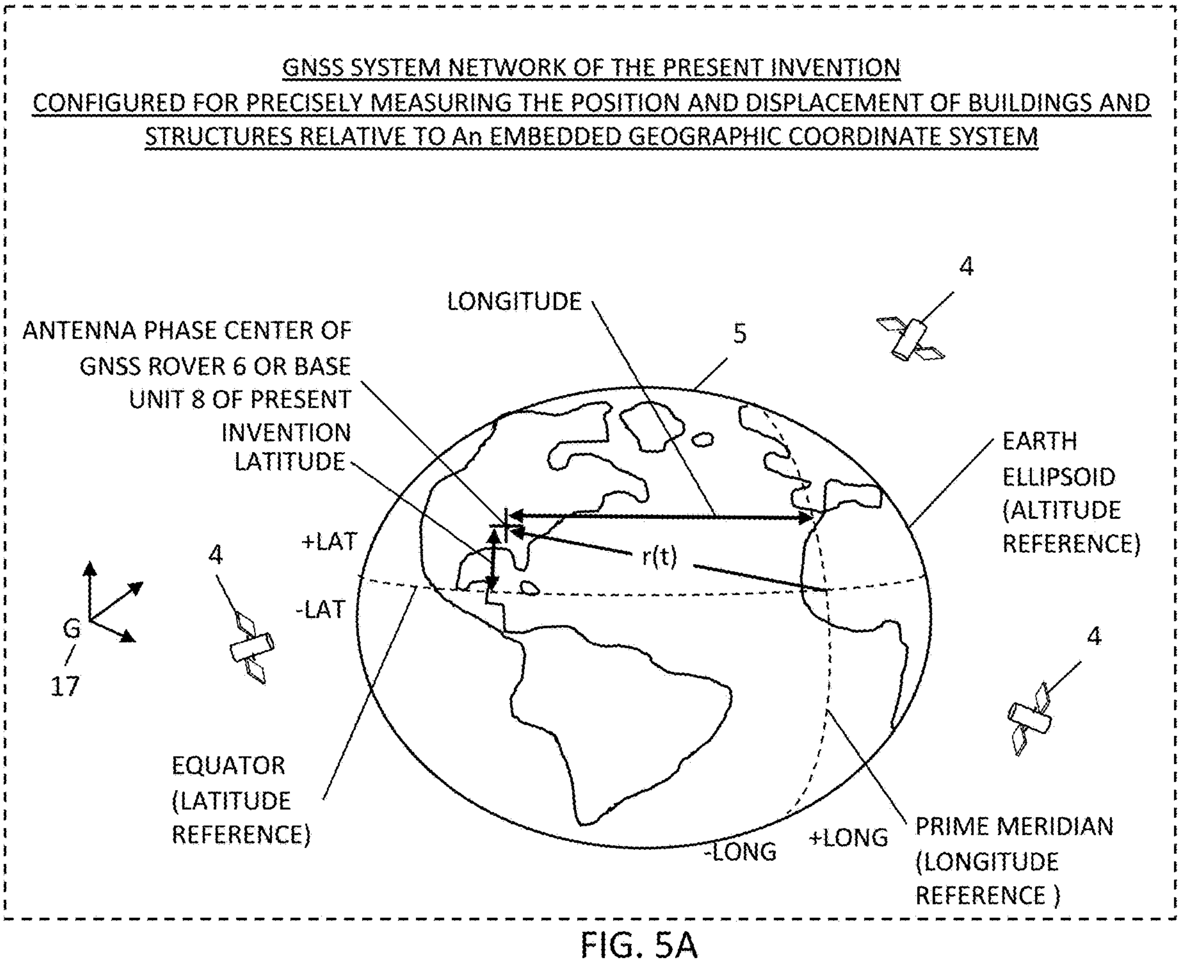
FIGS. 5A and 5B shows perspective and elevated views of the Earth, along with a constellation of GNSS satellites orbiting around the Earth, and the GNSS system network of the present invention deployed for precise measurement of positioning and displacement of objects and surfaces (e.g. building and civil structures) relative to the geographic coordinate reference system G, embedded within the Earth, tracking (i) latitude coordinates measuring the number of degrees north or south of the equator, longitude coordinates measuring the number of degrees east or west of the prime meridian, and altitude coordinates measuring the height above ocean sea level.
Figure 5B:
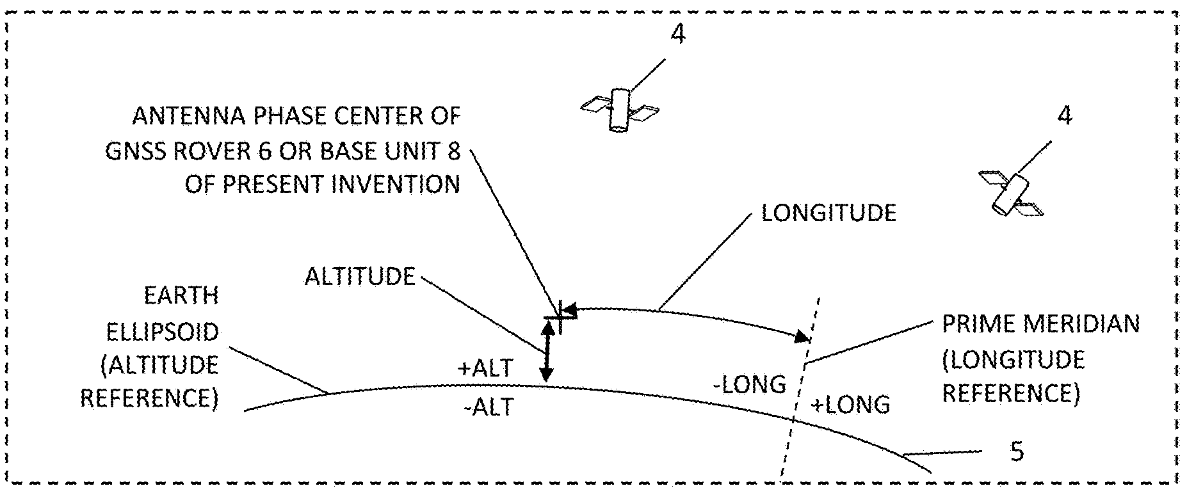

Referring to FIGS. 5A and 5B, there is shown perspective and elevated views of the Earth, along with a constellation of GNSS satellites 4 orbiting around the Earth 5. As shown, the GNSS system network 1 is deployed for precise measurement of positioning and displacement of objects and surfaces (e.g. building and civil structures) relative to the geographic coordinate reference system G, embedded within the Earth 5. This involves tracking (i) latitude coordinates measuring the number of degrees north or south of the equator, (ii) longitude coordinates measuring the number of degrees east or west of the prime meridian, and (iii) altitude coordinates measuring the height above ocean sea level. Collectively, these coordinates allows for precise specification of objects such as systems relative to the geographic coordinate reference system. It is understood that these coordinates can be transformed into coordinates locally specified in any other coordinate reference system that may be defined and embedded somewhere on the Earth. Such coordinate transforms will typically involve using homogenous transformations, and other mathematical techniques that consider relative coordinate frame translations and rotations, to achieve the required transformations to carry out the coordinate transformations. For more technical details regarding coordinate transformation, reference should be made to Coordinates and Transformations, MIT ECCS 6.837 Wojciech Matusik, https://ocw.mit.edu/course/electrical-engineering-and-computer-science/6-837-computer-graphics-fall-2012/lecture-notes/MIT6_837F12_Lec03.pdf, incorporated herein by reference.

Figure 6A:
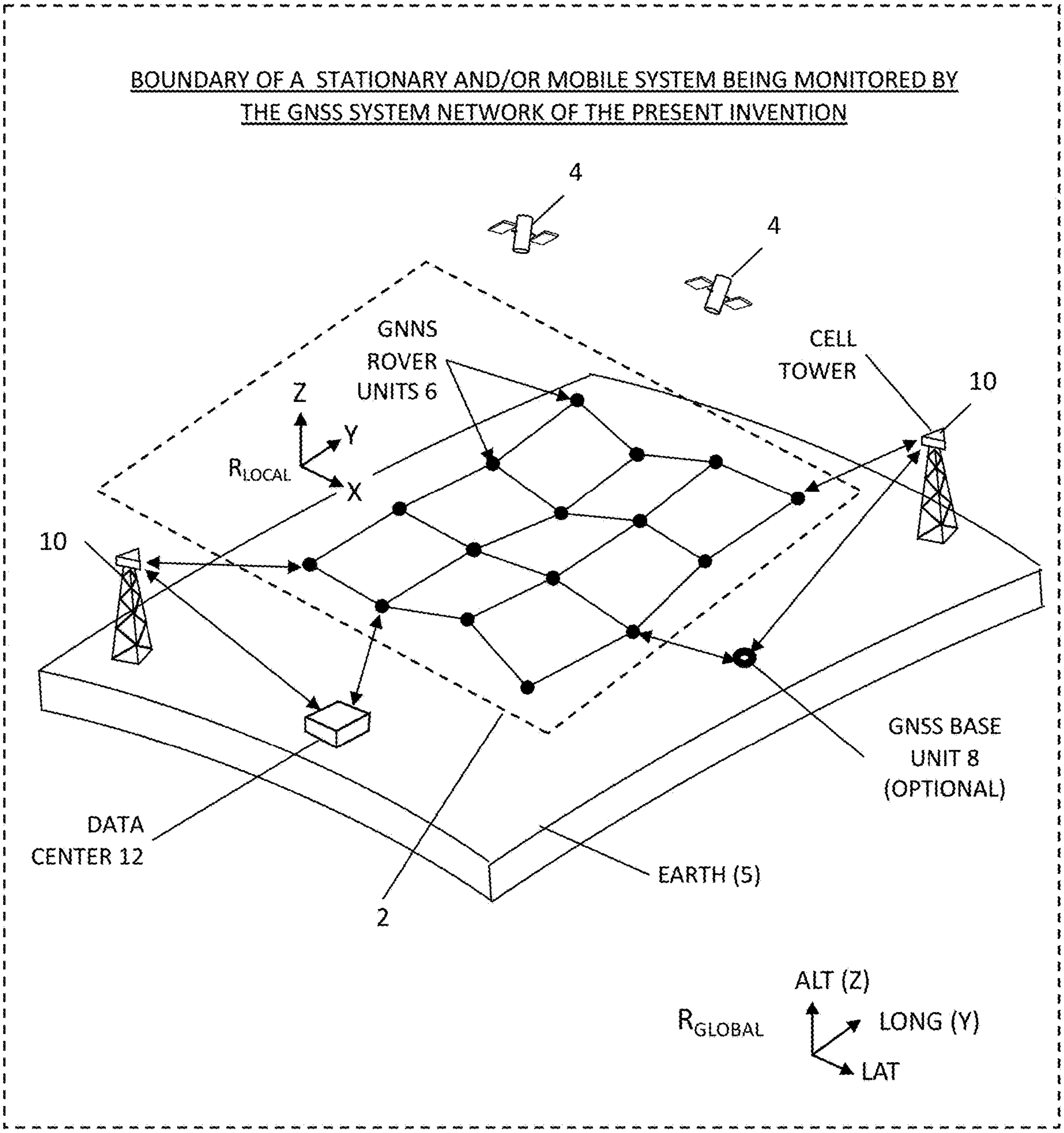
FIG. 6A is a schematic illustration of the GNSS system network of the present invention, supporting multiple GNSS rovers (ii) embodied within the boundary of a stationary and/or mobile system being monitored by the GNSS system network of the present invention, (ii) receiving GNSS signals transmitted from GNSS satellites orbiting the Earth, and (iii) determining the geo-location (GPS coordinates) and time-stamp of each GNSS rover while the stationary and/or mobile system is being monitored for spatial displacement, distortion and/or deformation using GNSS-based rover data processing methods practiced aboard the system as illustrated in FIG. 6B, or remotely within the application and database servers of the data center of the GNSS system network as illustrated in FIG. 6C.

Specification of GNSS System Network Employed to Remotely Monitor the Displacement, Distortion and/or Deformation of Stationary and/or Mobile Systems in which a Set of GNSS Rover Units are Embedded and Operated to Collect and Process GNSS Signals from a Constellations of GNSS Satellites FIG. 6A shows the GNSS system network of the present invention 1 supporting multiple GNSS rovers 6 embodied within the boundary of a stationary and/or mobile system 2 being monitored by the GNSS system network of the present invention 1. Each GNSS rover unit 6 receives GNSS signals transmitted from GNSS satellites 4 orbiting the Earth. The received GNSS signals are processed locally and/or remotely to determine the geo-location (GPS coordinates) and time-stamp of each GNSS rover 6, while monitoring for spatial displacement, distortion and/or deformation using GNSS-based rover data processing methods. As will be described in greater detail hereinafter, these data processing methods can be locally practiced aboard the system 2 as illustrated in FIG. 6B, or remotely practiced within the application and database servers 12B of the data center 12 of the GNSS system network 1, as illustrated in FIG. 6C.

Figure 6B:
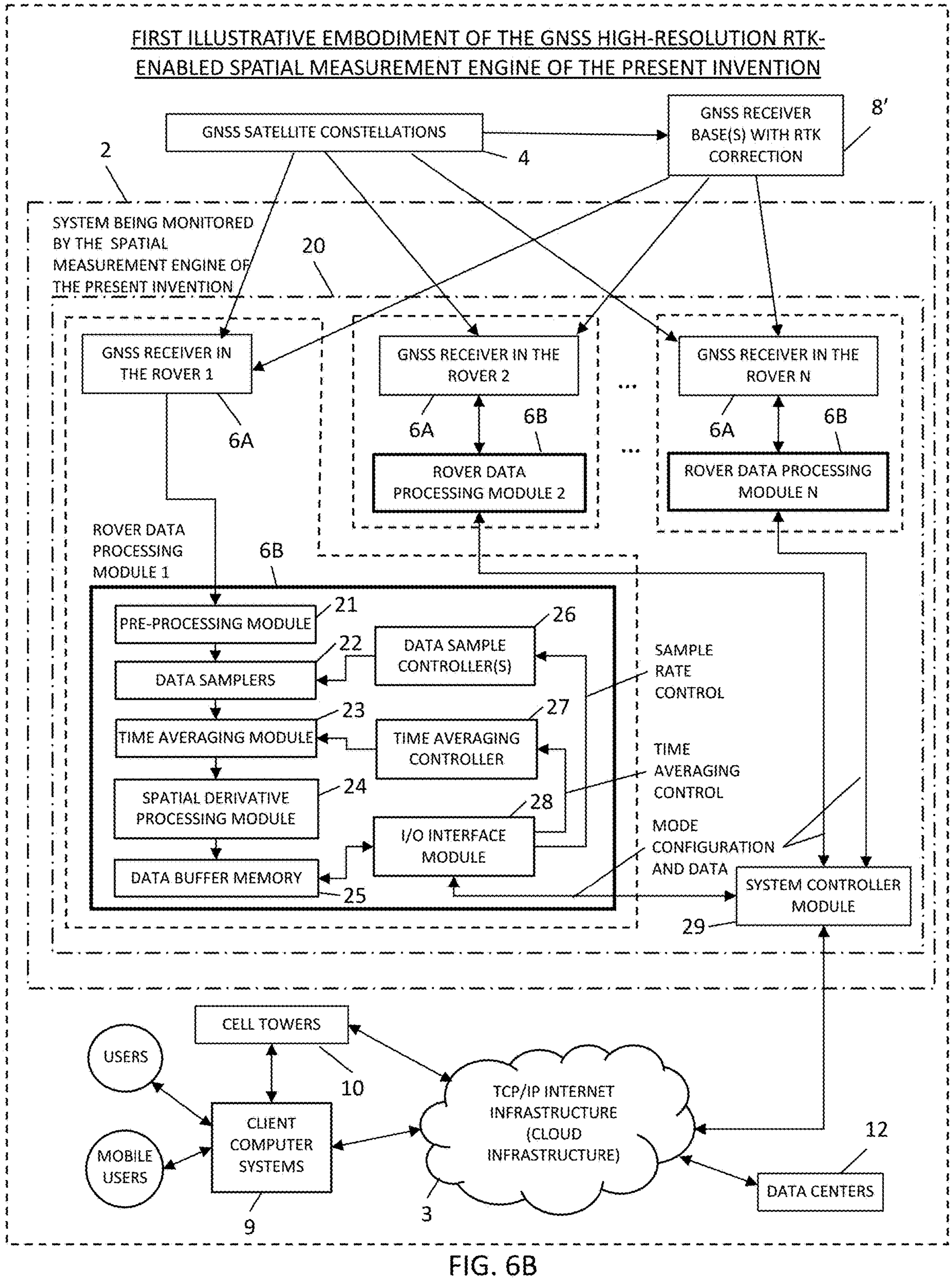
FIG. 6B is a block system diagram illustrating a first method of implementing the GNSS system network of the present invention enabling high-resolution monitoring of spatial displacement, distortion and/or deformation of a stationary and/or mobile system using a spatial measurement engine accordance with the principles of the present invention, wherein the spatial measurement engine comprises (i) GNSS receivers embedded within the boundary of a stationary and/or mobile system to be monitored, (ii) the GNSS receivers receiving GNSS signals transmitted from GNSS satellites orbiting the Earth, and (iii) a rover data processing module aboard the system for monitoring of spatial displacement, distortion and/or deformation of a stationary and/or mobile system, using a preprocessing module, a bank of data samplers controlled by data sample controllers, a time averaging module controlled by a time averaging controller, a data buffer memory for buffering data from the time averaging module, and an I/O Interface module for receiving module configuration data to configure the mode of the multi-mode data processing module, time-averaging control data for controlling the time-averaging controller, and sample-rate control data for controlling the data sample controller, and a spatial derivative processing module connected to the I/O interface module.

FIG. 6B illustrates a first method of implementing the GNSS system network of the present invention enabling high-resolution monitoring of spatial displacement, distortion and/or deformation of a stationary and/or mobile system using a spatial measurement engine 20 accordance with the principles of the present invention.

As shown in FIG. 6B, the spatial measurement engine 20 comprises: (i) GNSS receivers 6A embedded within the boundary of a stationary and/or mobile system 2 to be monitored; (ii) the GNSS receivers 6A receiving GNSS signals transmitted from GNSS satellites orbiting the Earth 5; and (iii) a rover data processing module 6B aboard the system for monitoring of spatial displacement, distortion and/or deformation of a stationary and/or mobile system 2. As shown, each rover data processing module 6B comprises: a preprocessing module 21, a bank of data samplers 22 controlled by data sample controllers 26, a time averaging module 23 controlled by a time averaging controller 27, a spatial derivative processing module 24 connected to the I/O interface module, a data buffer memory 25 for buffering data from the spatial derivative processing module 24, and an I/O Interface module 28 for receiving data from data buffer memory 25 and transferring same to system controller module 29, and receiving module configuration data to configure the mode of the multi-mode data processing module, time averaging control data for controlling the time averaging controller, and sample rate control data for controlling the data sample controller.

Figure 6C:
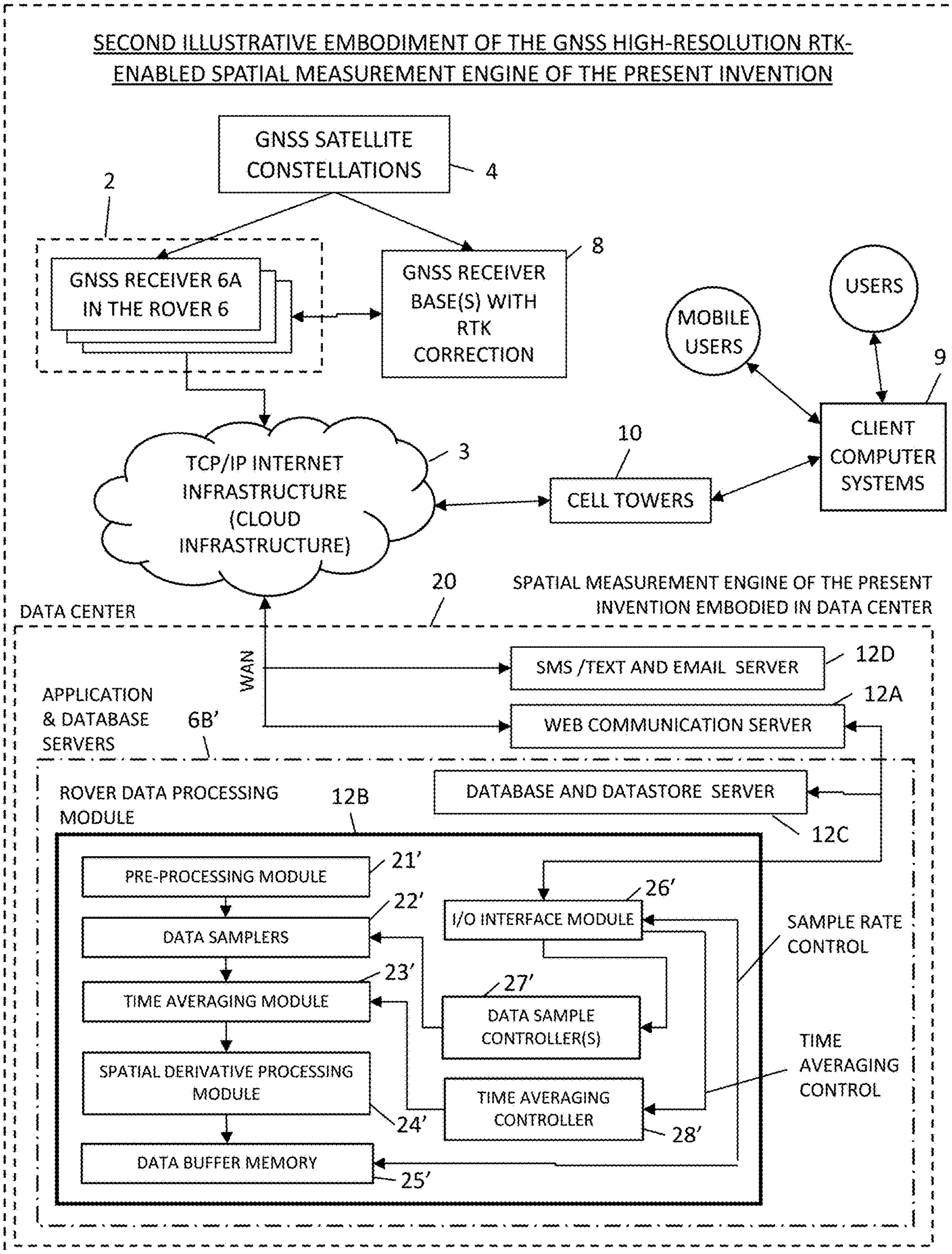
FIG. 6C is a block system diagram illustrating a second method of implementing the GNSS system network of the present invention enabling high-resolution monitoring of spatial displacement, distortion and/or deformation of a stationary and/or mobile system using a spatial measurement engine accordance with the principles of the present invention, wherein the spatial measurement engine comprises (i) GNSS receivers embedded within the boundary of a stationary and/or mobile system to be monitored, (ii) the GNSS receivers receiving GNSS signals transmitted from GNSS satellites orbiting the Earth, and (iii) a rover data processing module aboard the application and database servers of a data center, for monitoring of spatial displacement, distortion and/or deformation of a stationary and/or mobile system, using a preprocessing module, a bank of data samplers controlled by data sample controllers, a time averaging module controlled by a time averaging controller, a data buffer memory for buffering data from the time averaging module, and an I/O Interface module for receiving module configuration data to configure the mode of the multi-mode data processing module, time averaging control data for controlling the time averaging controller, and sample rate control data for controlling the data sample controller, and a spatial derivative processing module connected to the I/O interface module.

FIG. 6C illustrates a second method of implementing the GNSS system network of the present invention 1 enabling high-resolution monitoring of spatial displacement, distortion and/or deformation of a stationary and/or mobile system using a spatial measurement engine 20 accordance with the principles of the present invention.

As shown in FIG. 6C, the spatial measurement engine 20 comprises: (i) GNSS receivers 6 embedded within the boundary of a stationary and/or mobile system 2 to be monitored; (ii) the GNSS receivers 6A' receiving GNSS signals transmitted from GNSS satellites 4 orbiting the Earth 5; and (iii) a rover data processing module 6B' aboard the application and database servers 12C of a data center 12 for monitoring of spatial displacement, distortion and/or deformation of a stationary and/or mobile system. As shown, the rover data processing module 6B' hosted at the data center 12 comprises: a preprocessing module 21", a bank of data samplers 22' controlled by data sample controllers 26', a time averaging module 23' controlled by a time averaging controller 26', a data buffer memory 25' for buffering data from the time averaging module 23', and an I/O Interface module 28' for receiving module configuration data to configure the mode of the multi-mode data processing module, time averaging control data for controlling the time averaging controller 23', and sample rate control data for controlling the data sample controller 26', and a spatial derivative processing module 24' connected to the data buffer memory 25' which is connected to the I/O interface module 28 for storage in the datastore server 12C.

Figure 7A:
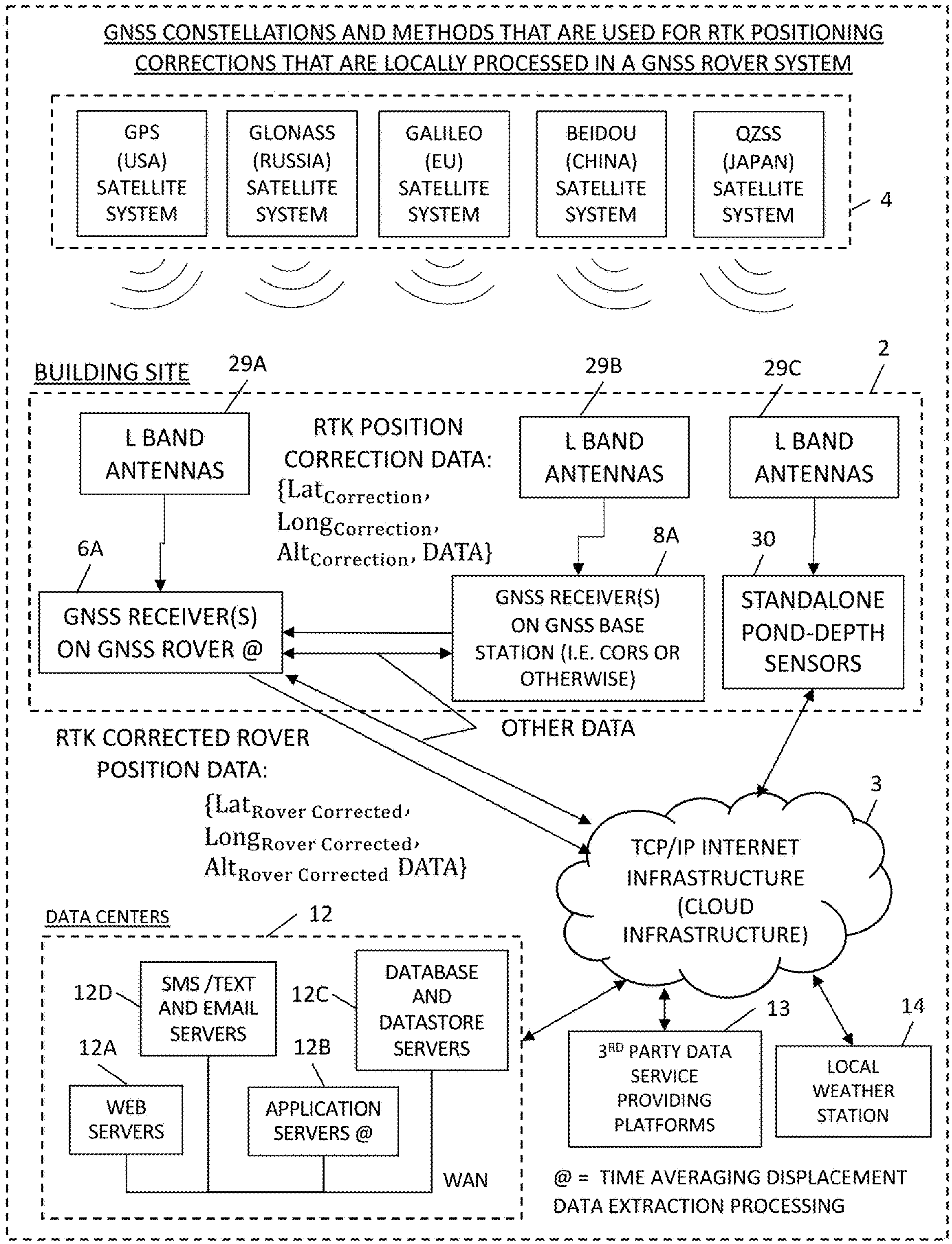
FIG. 7A is a schematic system block diagram of the GNSS system network of the present invention shown installed and deployed across one or more building sites (e.g. housing systems) comprising: (i) a plurality of GNSS constellations including the GPS (USA) satellite system, the GLONASS (Russia) satellite system, GALILEO (EU) satellite system, the BEIDOU (China) satellite system, and the QZSS (Japan) satellite system, (ii) GNSS rovers having GNSS receivers with L band antennas mounted on the building site and employing onboard time-averaging data extraction processing principles according to the present invention as illustrated in FIGS. 6A and 6B, (iii) at least one GNSS base station (or CORS station) having a GNSS receiver with L band antennas supporting RTK correction, and standalone Pond-Depth Sensors with L band antennas, and (iv) data centers supporting the functions of the present invention.

Specification of GNSS System Network Using RTK Positioning Corrections Processed in GNSS Rover Units FIG. 7A shows the GNSS system network of the present invention 1 shown installed and deployed across one or more building sites (e.g. housing systems) 2 comprising: (i) a plurality of GNSS constellations 4 including the GPS (USA) satellite system, the GLONASS (Russia) satellite system, GALILEO (EU) satellite system, the BEIDOU (China) satellite system, and the QZSS (Japan) satellite system; (ii) GNSS rovers 6 having GNSS receivers 6A with L band antennas 29A mounted on the building site and employing onboard time-averaging data extraction processing principles according to the present invention as illustrated in FIGS. 6A and 6B; (iii) at least one GNSS base station (or CORS station) 8 having a GNSS receiver 8A with L band antennas 29B supporting RTK correction, and standalone Pond-Depth Sensors 30 with L band antennas 29C; and (iv) data centers 12 supporting the functions of the present invention.

Figure 7B:
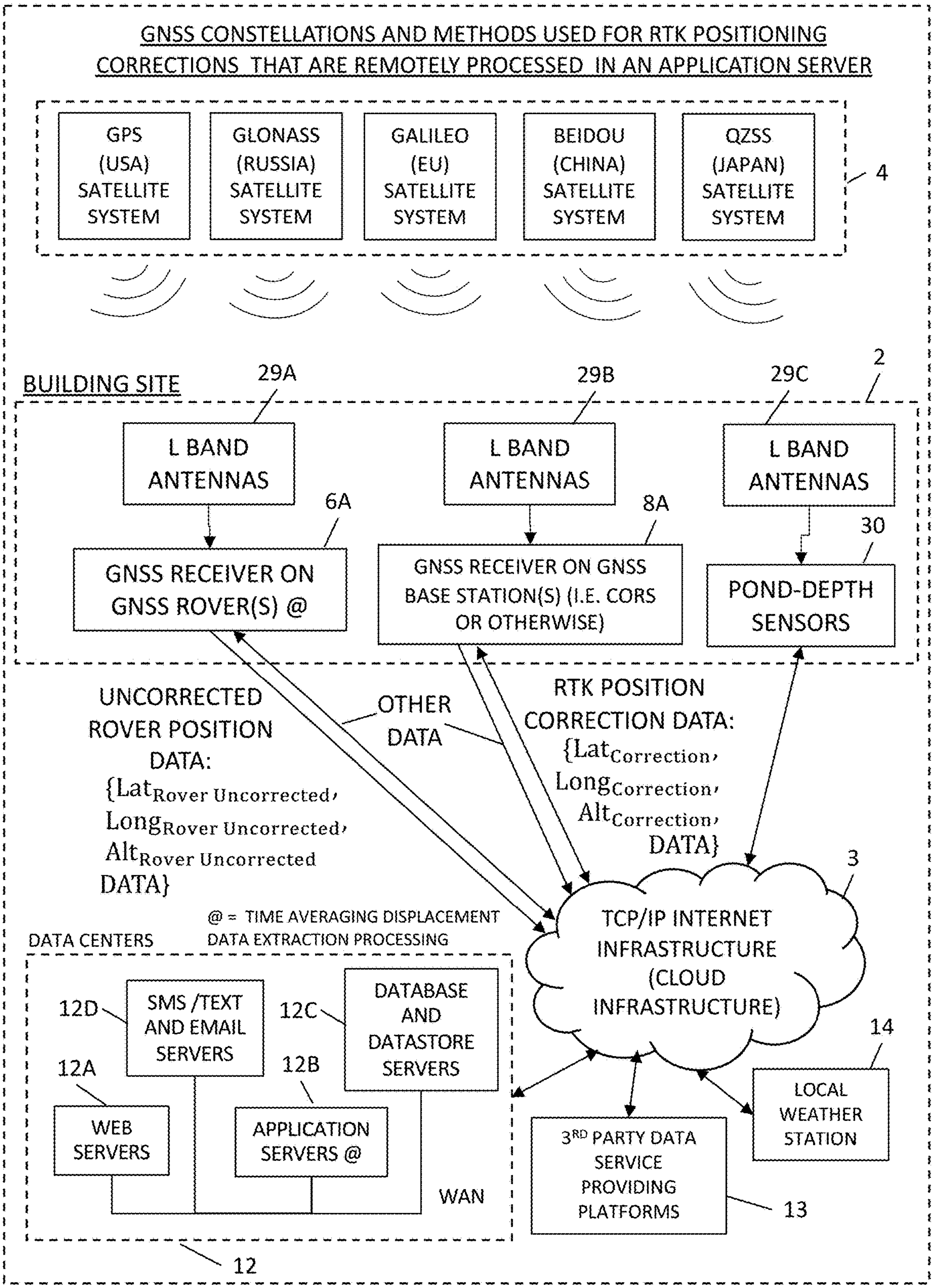
FIG. 7B is a schematic system block diagram of the GNSS system network of the present invention shown installed and deployed across one or more building sites (e.g. housing systems) comprising: (i) a plurality of GNSS constellations including the GPS (USA) satellite system, the GLONASS (Russia) satellite system, GALILEO (EU) satellite system, the BEIDOU (China) satellite system, and the QZSS (Japan) satellite system, (ii) GNSS rovers having GNSS receivers with L band antennas mounted on the building site, (iii) at least one GNSS base station (or CORS station) having a GNSS receiver with L band antennas supporting RTK correction, and standalone Pond-Depth Sensors with L band antennas, and (iv) data centers supporting remote time-averaging data extraction processing principles according to the present invention illustrated in FIGS. 6A and 6C.

FIG. 7B shows the GNSS system network of the present invention 1 shown installed and deployed across one or more building sites (e.g. housing systems) 2 comprising: (i) a plurality of GNSS constellations 4 including the GPS (USA) satellite system, the GLONASS (Russia) satellite system, GALILEO (EU) satellite system, the BEIDOU (China) satellite system, and the QZSS (Japan) satellite system; (ii) GNSS rovers 6 having GNSS receivers 6A with L band antennas 29A mounted on the building site 2; (iii) at least one GNSS base station (or CORS station) 8 having a GNSS receiver 8A with L band antennas 29B supporting RTK correction, and standalone Pond-Depth Sensors 30 with L band antennas 29A; and (iv) data centers 12 supporting remote time-averaging data extraction processing principles according to the present invention illustrated in FIGS. 6A, 6B and 6C.

Figure 8B:
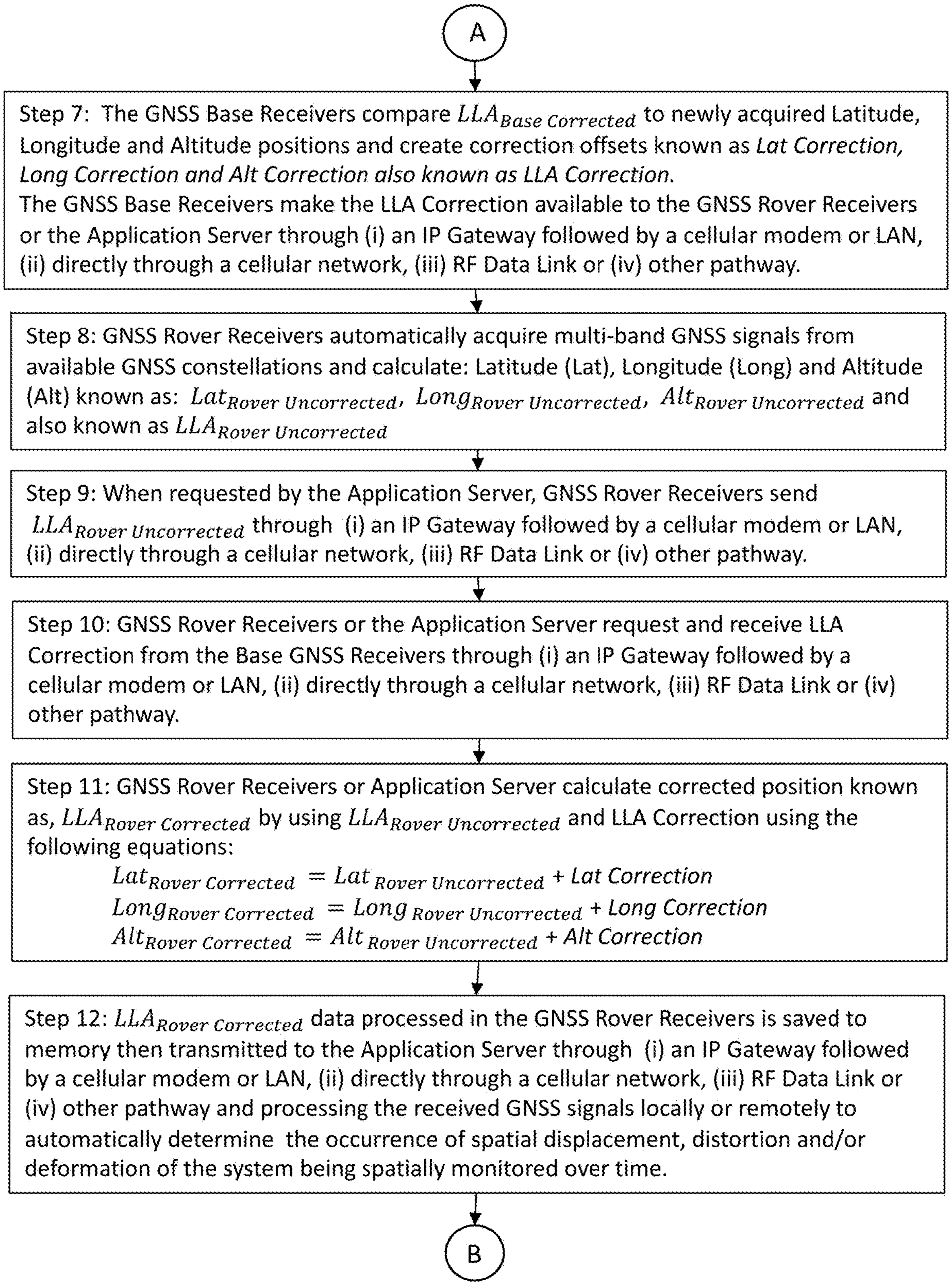

FIGS. 8A, 8B and 8C provide a flow chart describing the primary steps of the communication and information processing method supported on the generalized embodiment of the GNSS system platform of the present invention.

As recited in Step 1 of FIG. 8A, within the Network Database of a GNSS system network of the present invention 1, the Administrator registers stationary and/or mobile systems 2 (e.g. buildings, bridges, hillsides, ground vehicles, aircrafts, watercrafts, etc.) to be automatically spatially monitored for structural displacement, distortion and/or deformation beyond predetermined thresholds, and generating notifications and/or alarms to administrators and/or managers of the spatially-monitored system. As shown, the GNSS system network 1 comprises: (i) a plurality of GNSS Rover Units embedded within the boundary of the monitored system 4, for receiving GNSS signals from GNSS satellites 4 and processing the received GNSS signals locally or remotely to automatically determine the occurrence of spatial displacement, distortion and/or deformation of the monitored system over time; (ii) one or more mobile computing systems 9 operably connected to the system network, and each supporting a Web Application; and (iii) a remote data center 12 supporting Web, Application and Database Servers 12A, 12B, 12C operably connected to the system network to provide a remote web user interface, and read/write and process data regarding the spatial monitoring functions supported by the GNSS system network.

As recited in Step 2 of FIG. 8A, the Administrator creates deflection, deformation and/or displacement limits and thresholds for the monitored system and registers limits and thresholds in the Database.

As recited in Step 3 of FIG. 8A, Administrator registers alert thresholds in the Database 12C for each virtual zone based upon acceptable structural deflection and/or displacement.

As recited in Step 4 of FIG. 8A, GNSS Rover Receivers 6A embedded within the system being monitored receiving GNSS signals transmitted from constellations of GNSS satellites orbiting the Earth.

As recited in Step 5 of FIG. 8A, the GNSS Base Receivers 8B, automatically acquire multi-band GNSS signals from available GNSS constellations 4 and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time (t) and are also known as $LLAT_{Base\ Uncorrected}$. The process continues for hours or days.

As recited in Step 6 of FIG. 8A, the GNSS Base Receivers 8B use the dataset to calculate a precise Latitude, Longitude and Altitude.

As recited in Step 7 of FIG. 8B, the GNSS Base Receivers 8B compare to newly acquired Latitude, Longitude and Altitude positions and create correction offsets known as Lat Correction, Long Correction and Alt Correction also known as LLA Correction. The GNSS Base Receivers 8B make the LLA Correction available to the GNSS Rover Receivers 6A or the Application Server through (i) an IP Gateway 7 followed by a cellular modem or LAN, (ii) directly through a cellular network, (iii) RF Data Link or (iv) other pathway.

As recited in Step 8 of FIG. 8B, the GNSS Rover Receivers 6A automatically acquire multi-band GNSS signals from available GNSS constellations 4 and calculate: Latitude (Lat), Longitude (Long) and Altitude (Alt).

As recited in Step 9 of FIG. 8B, when requested by the Application Server 12B, GNSS Rover Receivers 6A send through (i) an IP Gateway 7 followed by a cellular modem or LAN, (ii) directly through a cellular network, (iii) RF Data Link or (iv) other pathway.

As recited in Step 10 of FIG. 8B, the GNSS Rover Receivers 6A or the Application Server 12B request and receive LLA Correction from the Base GNSS Receivers 8B through (i) an IP Gateway 7 followed by a cellular modem or LAN, (ii) directly through a cellular network 10, (iii) RF Data Link or (iv) other pathway.

As recited in Step 11 of FIG. 8B, the GNSS Rover Receivers 6A or Application Server 12B calculate corrected position known as $LLA_{Rover\ Corrected}$, by using and LLA Correction using the following equations: =

$$Lat_{Rover\ Corrected} = Lat_{Rover\ Uncorrected} + Lat\ Correction$$

$$Long_{Rover\ Corrected} = Long_{Rover\ Uncorrected} + Long\ Correction$$

$$Alt_{Rover\ Corrected} = Alt_{Rover\ Uncorrected} + Alt\ Correction$$

As recited in Step 12 of FIG. 8B, the $LLA_{Rover\ Corrected}$ data processed in the GNSS Rover Receivers 6A is saved to memory then transmitted to the Application Server 12B through (i) an IP Gateway 7 followed by a cellular modem or LAN, (ii) directly through a cellular network, (iii) RF Data Link or (iv) other pathway and processing the received GNSS signals locally or remotely to automatically determine the occurrence of spatial displacement, distortion and/or deformation of the system being spatially monitored over time.

Figure 20:
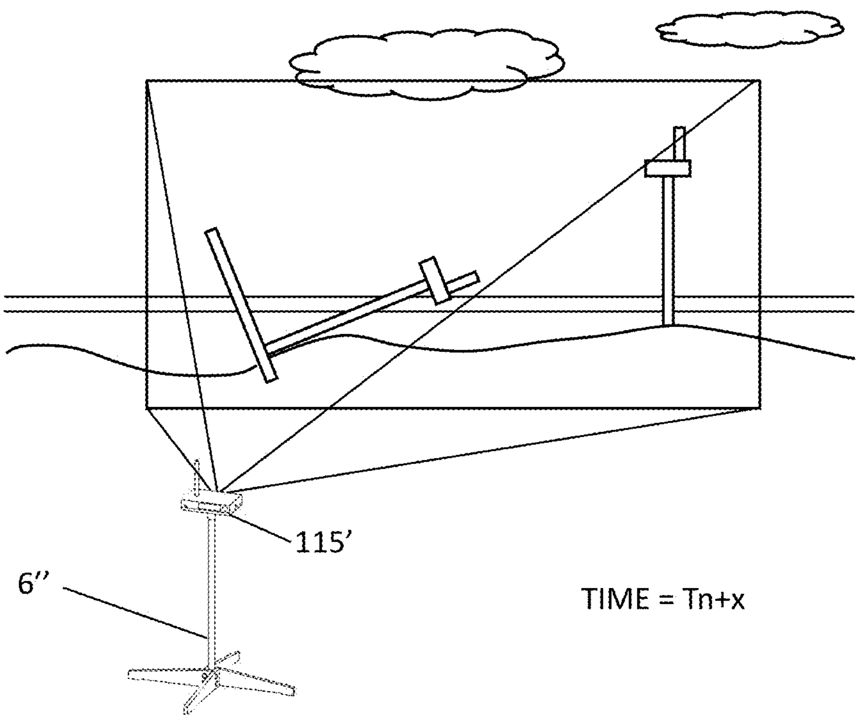
FIG. 20 shows a second perspective view of a pole-mounted GNSS rover unit employed in the GNSS system network installation illustrated in FIGS. 12 and 15, shown installed near a rooftop drain cove, and detecting motion and changes in the digital images captured by the digital camera system operating in its video capture mode.

As recited in Step 13 of FIG. 8C, the Rovers 6 and Bases 8 save and send Auxiliary Sensor Data including: snow and ponding depth, wind speed, solar panel heading/current, station pitch/roll, temperature and camera images, shown in FIG. 20, to the Application Server 12B through (i) an IP Gateway 7 followed by a cellular modem or LAN, (ii) directly through a cellular network, (iii) RF Data Link or (iv) other pathway.

As recited in Step 14 of FIG. 8C, the Application Server 12B saves the $LLA_{Rover\ Corrected}$ data and Auxiliary Sensor Data to the Database.

As recited in Step 15 of FIG. 8C, the Application Server 12B accesses the data from the Database 12 and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$

As recited in Step 16 of FIG. 8C, the Application Server 12B sends and Auxiliary Sensor Data to the Web App 15 for display on mobile and/or desktop computing devices.

As recited in Step 17 of FIG. 8C, the received GNSS signals are locally or remotely processed to automatically determine the occurrence of spatial displacement, distortion and/or deformation of the system being spatially monitored over time If and when structural movement thresholds are met or exceeded by the system being monitored, the Application Server 12B automatically sends email and/or SMS alerts and/or notifications to registered Users over the GNSS system network.

As recited in Step 18 of FIG. 8C, if and when the structural movements of the system being monitored have returned to below alert thresholds, then the Application Server 12B automatically sends email and SMS alerts and/or notifications to registered users.

It is appropriate at this juncture to briefly review how the Real-Time Kinematic (RTK) process operates.

The geo-positioning technique is commonly referred to as code-based positioning, because the GNSS receiver correlates with and uses the GNSS signals transmitted by four or more GNSS satellites 4 to determine the ranges to the satellites. From these ranges and satellites, the GNSS receiver can establish its position to within a few meters. RTK (Real-Time Kinematic) is a technique that uses carrier-based ranging and provides positions that are orders of magnitude more precise than those available through code-based positioning. The basic concept of RTK is to reduce and remove errors common to a base station and rover. RTK is used for applications that require higher accuracies, such as centimeter-level positioning, up Range Calculation. At a very basic conceptual level, the range is calculated by determining the number of carrier cycles at the rover station, then multiplying this number by the carrier wavelength. The calculated ranges still include errors from such sources as satellite clock and ephemerides, and delays. To eliminate these errors and to take advantage of the precision of carrier-based measurements, requires measurements to be transmitted from the GNSS base station 8 to the GNSS rover station 6. A complicated process called "ambiguity resolution" is needed to determine the number of whole cycles. Using a complex process, high precision GNSS receivers can resolve the ambiguities almost instantaneously.

GNSS rovers 6 determine their position using algorithms that incorporate ambiguity resolution and differential corrections. The position accuracy achievable by the rover depends on, among other things, its distance from the "baseline" and the accuracy of the differential corrections. Corrections are as accurate as the known station and the quality of the GNSS base station's satellite observations. Site selection is important for minimizing environmental effects such as interference and multipath, as is the quality of the GNSS base station 8 and rover Network RTK. The GNSS system network RTK is based on the use of several widely spaced permanent stations.

Depending on the implementation, data from the permanent stations is regularly communicated to a central processing station. On demand terminals, which transmit their approximate location to the central station, the central station calculates information or corrected position to the RTK user terminal. The benefit of this approach is an overall RTK base station 8 is required. Depending on the implementation, data may be transmitted over cellular medium. Source of Positional Errors in GNSS-based positioning systems are due to a variety of factors such as GNSS satellite atomic position error, ionosphere and troposphere effects and receiver clock error among other sources.

Specification of the GNSS System Network Using Comprising GNSS Rover Stations and Onsite GNSS Base Station Using Internet Gateway and LAN-Based Internet Access for Carrying Out RTK Position Correction Over a Cloud-Based TCP/IP Network Architecture FIG. 9 shows a system schematic block diagram of the first embodiment of the GNSS-based system network of the present invention 100 comprising GNSS rover stations 6 and onsite GNSS base station 8 using internet gateway 7 and LAN-based internet access 32 for carrying out RTK position correction over a cloud-based TCP/IP network architecture 3. As shown in FIG. 9, the GNSS system network 100 comprises: (i) a plurality of GNSS satellites 4 transmitting GNSS signals towards the earth and objects below; (ii) a plurality of GNSS rovers of the present invention 6 mounted on the rooftop surfaces of buildings 2 having an internet gateway 7 and building LAN 32, for receiving and processing transmitted GNSS signals during monitoring using time averaging seismic data extraction processing; (iii) an internet gateway 7 providing the GNSS rovers 6 access to the Internet communication infrastructure 3; (iv) one or more GNSS base stations 8 to support RTK correction of the GNSS signals; (v) one or more client computing systems 9 for transmitting instructions and receiving alerts and notifications and supporting diverse administration, operation and management functions on the system network; (vi) a cell tower 10 for supporting cellular data communications across the system network 100; and (vii) a data center 12 supporting web servers 12A, application servers 12B, database and datastore servers 12C, and SMS/text and email servers 12D; (viii) a local weather station servers 14.

Figure 10:
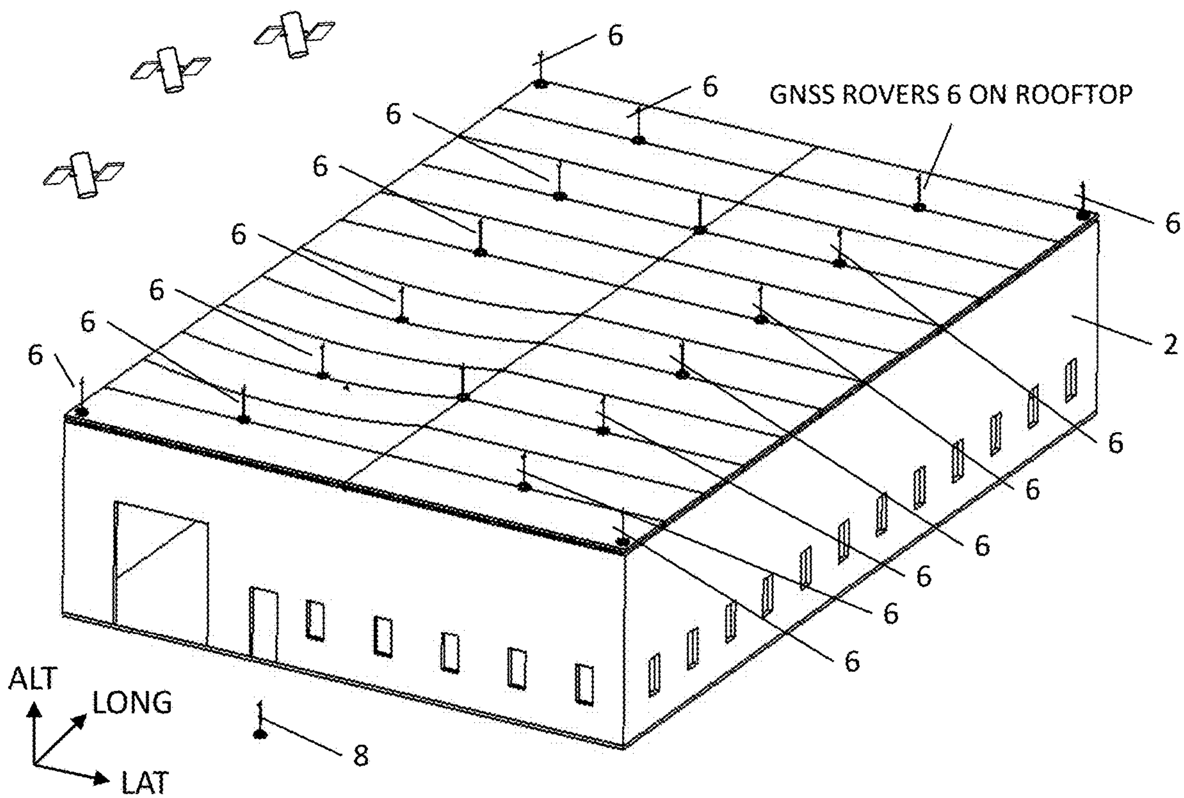
FIG. 10 shows a schematic representation of a building system, in which the GNSS system network of the present invention illustrated in FIGS. 1 through 8 is installed and deployed for spatial monitoring, wherein its GNSS rovers are installed on the building roof (i.e. embedded within the system boundaries) and an onsite GNSS base unit/station is mounted on the premises of the building shown in FIG. 10.

FIG. 10 shows a building system, in which the GNSS system network 10 illustrated in FIGS. 1 through 8 is installed and deployed for spatial monitoring, wherein its GNSS rovers 6 are installed on the building roof 8A (i.e. embedded within the system boundaries) and an onsite GNSS base unit/station 8 is mounted on the premises of the building 8 shown in FIG. 10.

FIG. 11 shows the building system 2 being spatially monitored by the GNSS system network of FIG. 9, with the onsite RTK-correcting GNSS base unit 8 mounted on the premises thereof.

Figure 12:
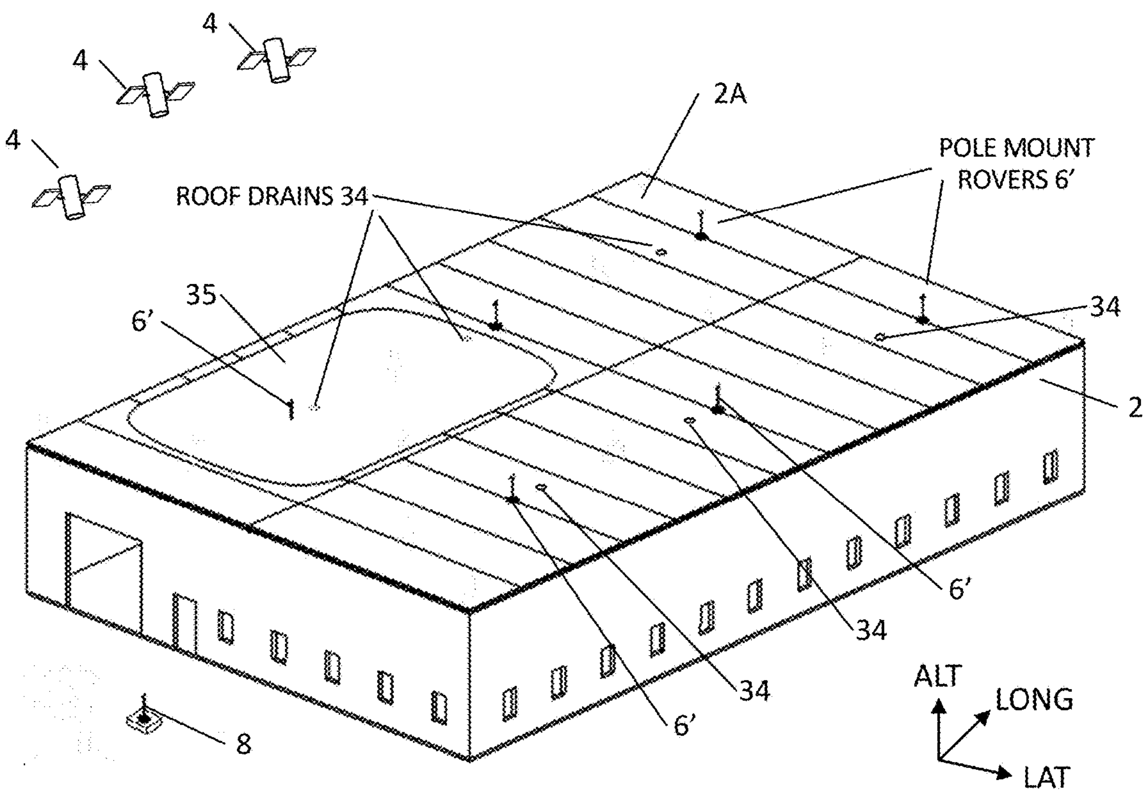
FIG. 12 shows a building system being spatially monitored by the GNSS system network of the present invention depicted in FIGS. 1 through 8, supporting pole-mounted GNSS rovers shown in FIGS. 13, 14A and 14B mounted near roof drains and equipped with snow pressure and windspeed sensors, for spatial monitoring the building system structure, and also the pooling of water on its rooftop surface which can cause great structural damage if roof drains or scuppers are obstructed and prevented from draining the flow of water.
Figure 13:
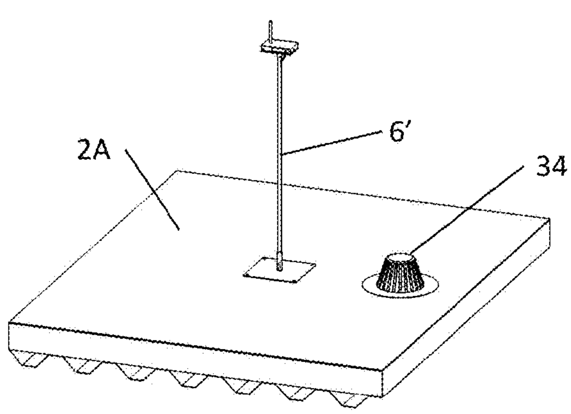
FIG. 13 show a close up view of a pole mounted GNSS rover unit employed in the GNSS system network and installation illustrated in FIG. 12, shown installed near a rooftop drain cover.

FIG. 12 shows a building system 8 being spatially monitored by the GNSS system network 100 depicted in FIGS. 1 through 8, supporting pole-mounted GNSS rovers 6' shown in FIGS. 13 and 14 mounted near roof drains and equipped with snow pressure and windspeed sensors 112, for spatial monitoring (i) the building system structure 2, and also (ii) the pooling of water 35 on its rooftop surface which can cause great structural damage if roof drains or scuppers are obstructed and prevented from draining the flow of water.

FIG. 13 show a close up view of a pole mounted GNSS rover unit 6' employed in the GNSS system network and installation illustrated in FIG. 12, shown installed near a rooftop drain cover 34.

Figure 14A:
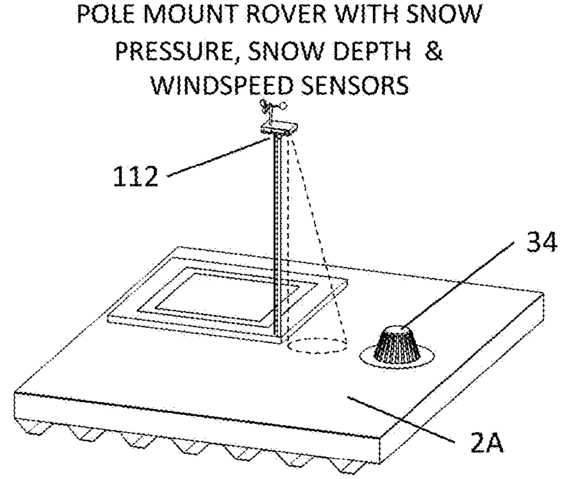
FIG. 14A shows a close up view of the pole-mounted GNSS rover unit of FIG. 12 with snow pressure and windspeed sensors employed in the GNSS system network and installation illustrated in FIG. 12, and also laser-based snow depth measurement instrumentation for measuring the depth of snow on the rooftop surface using a LADAR-based laser beam measuring distance by time of flight of the light beam.

FIG. 14A shows the pole-mounted GNSS rover unit 6' of FIG. 12 with snow pressure and windspeed sensors 105 employed in the GNSS system network and installation illustrated in FIG. 12, and also laser-based snow depth measurement instrumentation 107 for measuring the depth of snow on the rooftop surface using an integrated LADAR-based laser beam system 17 configured for measuring distance by time of flight of the light beam over an extended period of time.

Figure 14B:
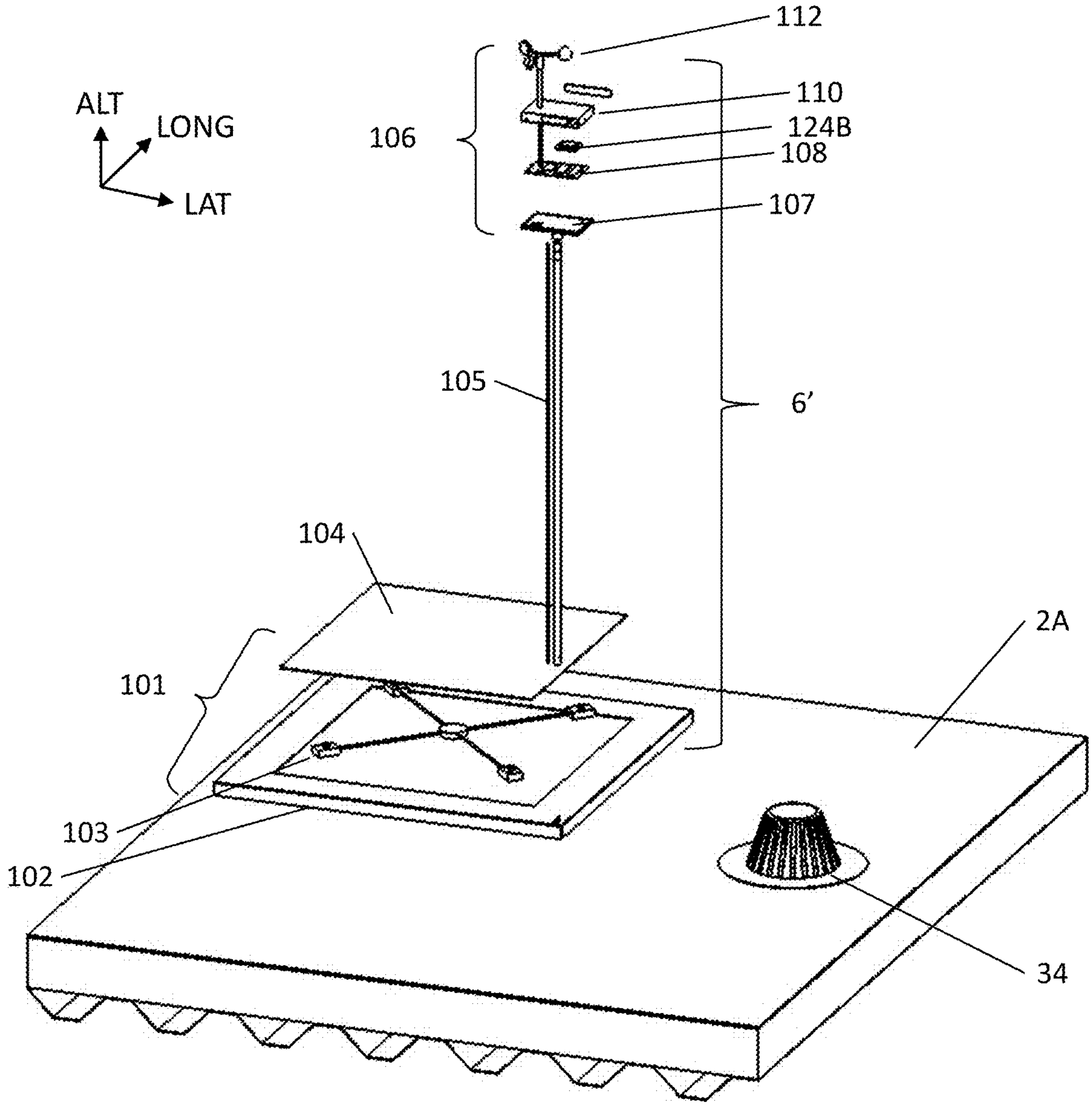
FIG. 14B shows an exploded diagram of the pole-mounted GNSS rover unit shown in FIGS. 13 and 14A, wherein its base component is shown comprising a base platform for support on a roof or planar surface, mounting an array of electronic load-cells supporting a snow load weight plate or surface, for measuring the weight of the snow load thereon, and sending electrical signals along the mounting pole (or via a Bluetooth wireless link) to the controller component.

FIG. 14B shows the pole-mounted GNSS rover unit 6' shown in FIGS. 13 and 14A, wherein its base component 101 comprises: a base platform 102 supportable on a roof or planar surface 8A; an array of electronic load-cells 103 mounted within the base platform 102 and supporting a snow load weight plate or surface 104, for (i) measuring the weight of the snow load thereon, and (ii) transmitting electrical signals along the mounting pole (or via a Bluetooth wireless link) 105 to the controller component 106 supported thereby.

Figure 15:
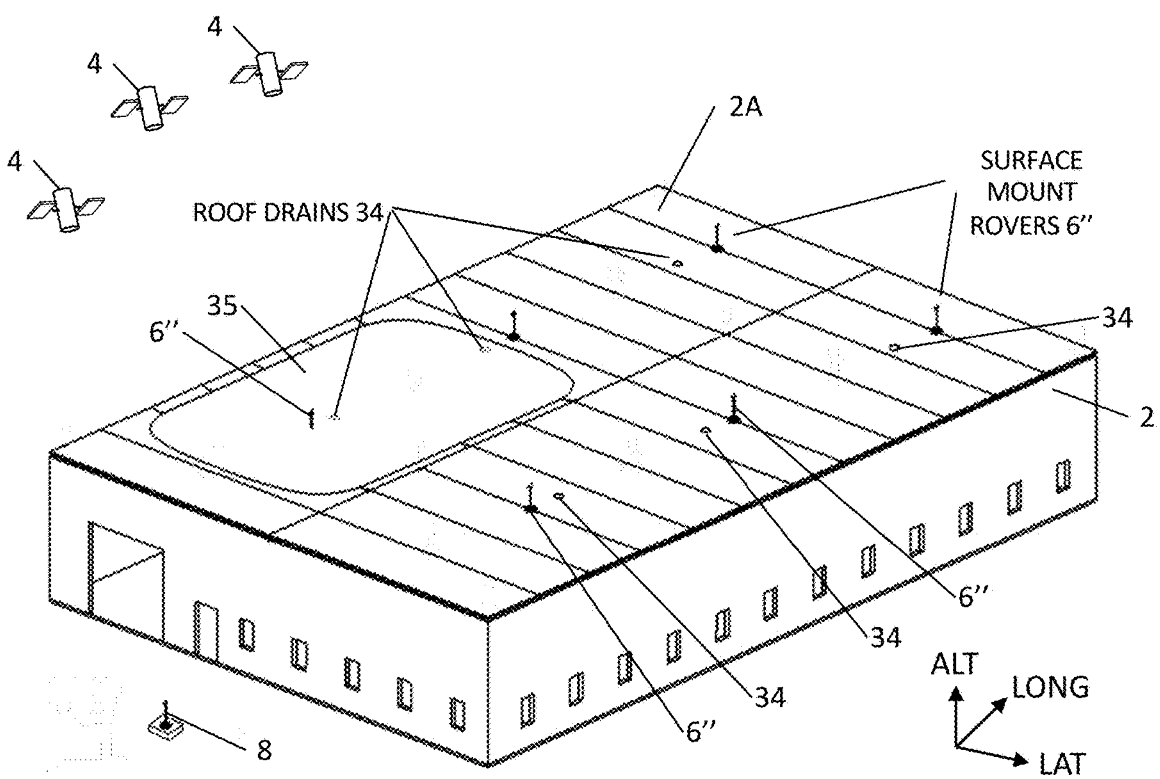
FIG. 15 shows a building system being monitored by the GNSS system network of the present invention and depicted in FIGS. 1 through 9, supporting surface-mounted GNSS rovers shown in FIGS. 12 and 13 mounted near roof drains, for spatial monitoring the building system and also the pooling of water on its rooftop surface which can obstruct drains, prevent water flow and drainage and cause great property damage.

FIG. 15 shows a building system 2 being monitored by the GNSS system network 100 depicted in FIGS. 1 through 9, supporting surface-mounted GNSS rovers 6' shown in FIGS. 12 and 13 mounted near roof drains 34, for spatial monitoring the building system and also the pooling of water on its rooftop surface which can obstruct drains, prevent water flow and drainage and cause great property damage.

Figure 16:
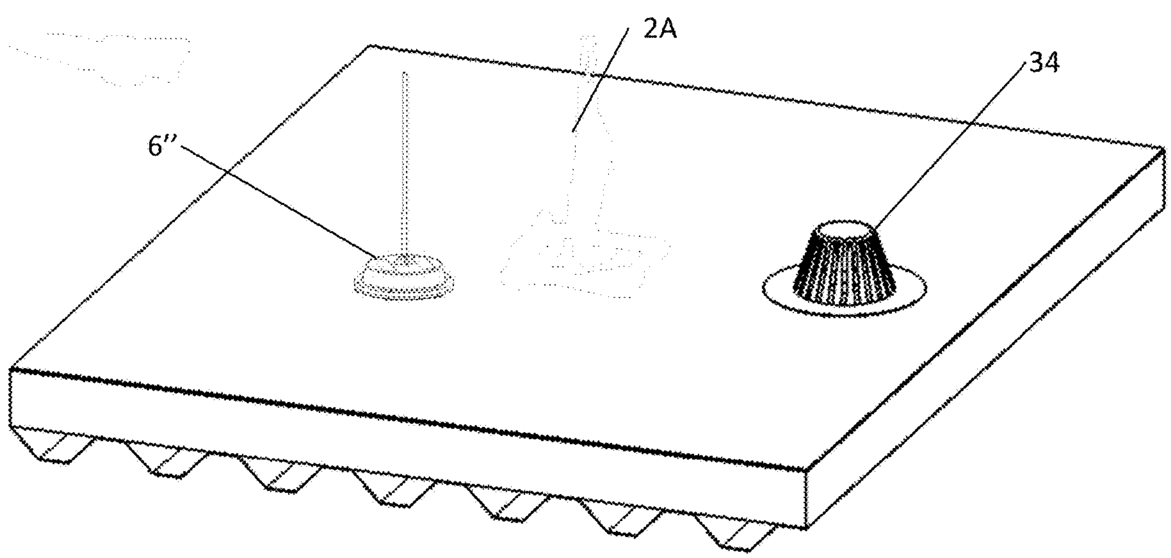
FIG. 16 shows a close up view of a surface-mounted GNSS rover unit employed in the GNSS system network installation illustrated in FIG. 12, shown installed near a rooftop drain cover.

FIG. 16 shows the surface-mounted GNSS rover unit 6' employed in the GNSS system network installation illustrated in FIGS. 12 and 15, shown installed near a rooftop drain cover 34

Figure 17:
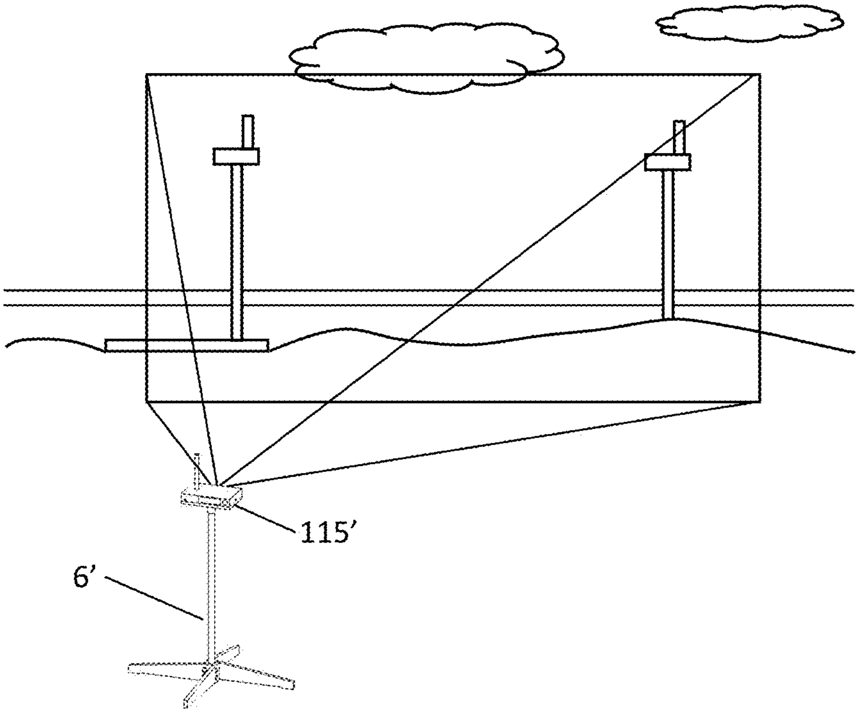
FIG. 17 shows a first perspective view of a pole-mounted GNSS rover unit employed in the GNSS system network installation illustrated in FIG. 12, shown installed near a rooftop drain cover, and illustrating the scope and projection of its integrated high-density digital camera system with still and video capture modes, supported by broad field of views (FOVs) overlooking the rooftop surface.

FIG. 17 shows a pole-mounted GNSS rover unit 6' employed in the GNSS system network installation illustrated in FIG. 12, shown installed near a rooftop drain cover 34. FIG. 17 illustrates the scope and projection of its integrated high-density digital camera system 115' with still and video capture modes, supported by broad field of views (FOVs) overlooking the rooftop surface 8A.

Figure 18:
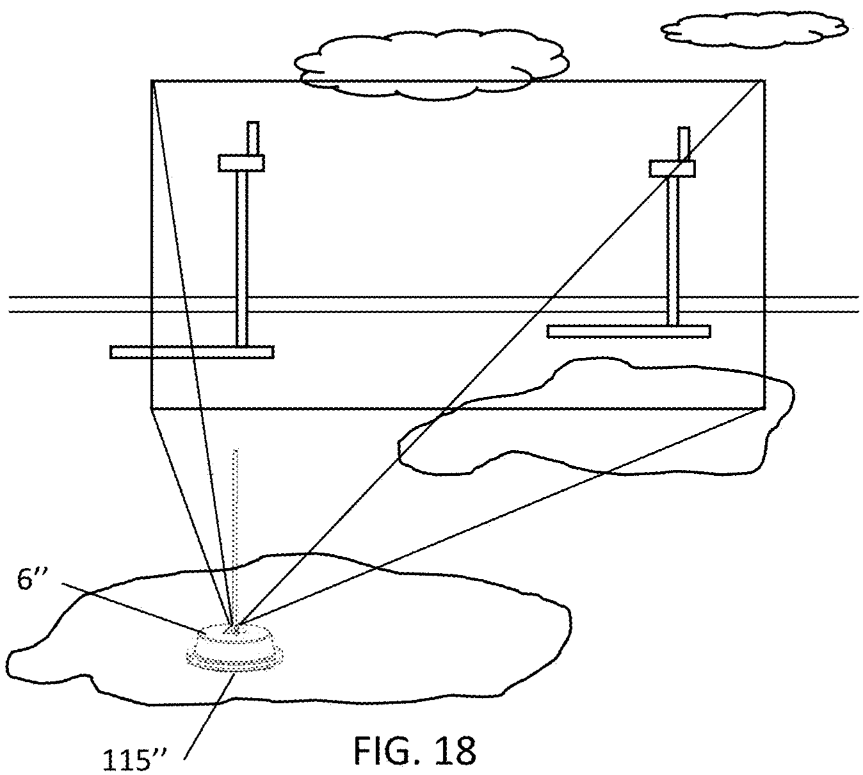
FIG. 18 shows a second perspective view of a surface-mounted GNSS rover unit employed in the GNSS system network installation illustrated in FIG. 12, shown installed near a rooftop drain cover and detecting motion and changes in the digital images captured by the digital camera system operating in its video capture mode.

FIG. 18 shows a second perspective view of a surface-mounted GNSS rover unit 6" employed in the GNSS system network installation illustrated in FIG. 12, shown installed near a rooftop drain cover 34. As shown in FIG. 18, the digital camera system is detecting motion and changes in the digital images captured by the digital camera system 115" operating in its video capture mode.

Figure 19:
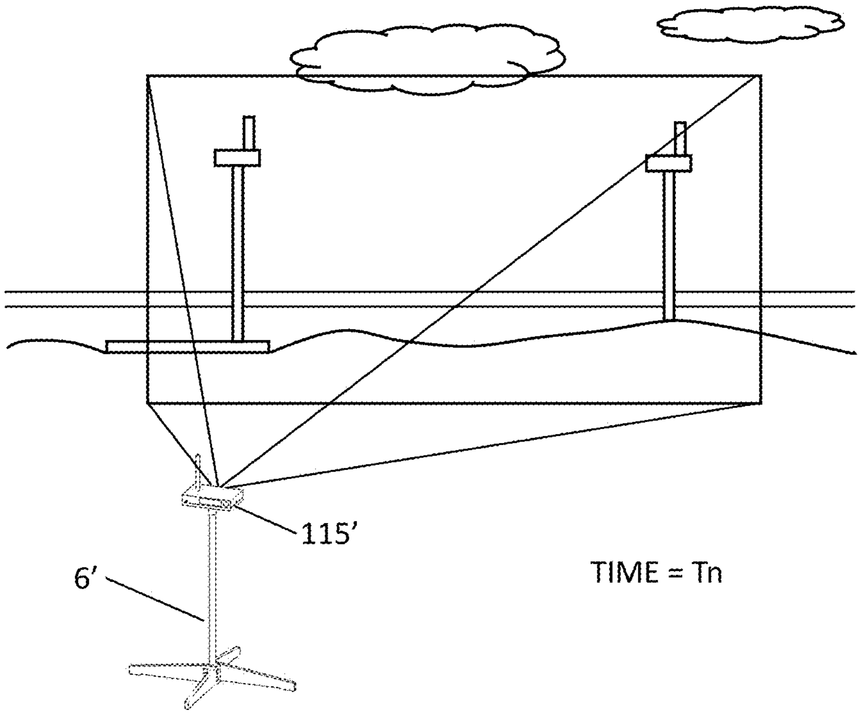
FIG. 19 shows a second perspective view of a pole-mounted GNSS rover unit employed in the GNSS system network installation illustrated in FIGS. 12 and 15, shown installed near a rooftop drain cover, and illustrating the scope and projection of its integrated high-density digital camera system with still and video capture modes, supported by broad field of views (FOVs) overlooking the rooftop surface.

FIG. 19 shows a second perspective view of a pole-mounted GNSS rover unit 6' employed in the GNSS system network installation illustrated in FIGS. 12 and 15, shown installed near a rooftop drain cover 34. FIG. 19 illustrates the scope and projection of its integrated high-density digital camera system 115' with still and video capture modes, supported by broad field of views (FOVs) overlooking the rooftop surface 8A.

FIG. 20 shows a second perspective view of a pole-mounted GNSS rover unit 6' employed in the GNSS system network installation illustrated in FIGS. 12 and 15, and installed near a rooftop drain cove. As shown in FIG. 20, the digital camera system 115' is detecting motion and changes in the digital images captured by the digital camera system 115' operating in its video capture mode.

Figure 21:
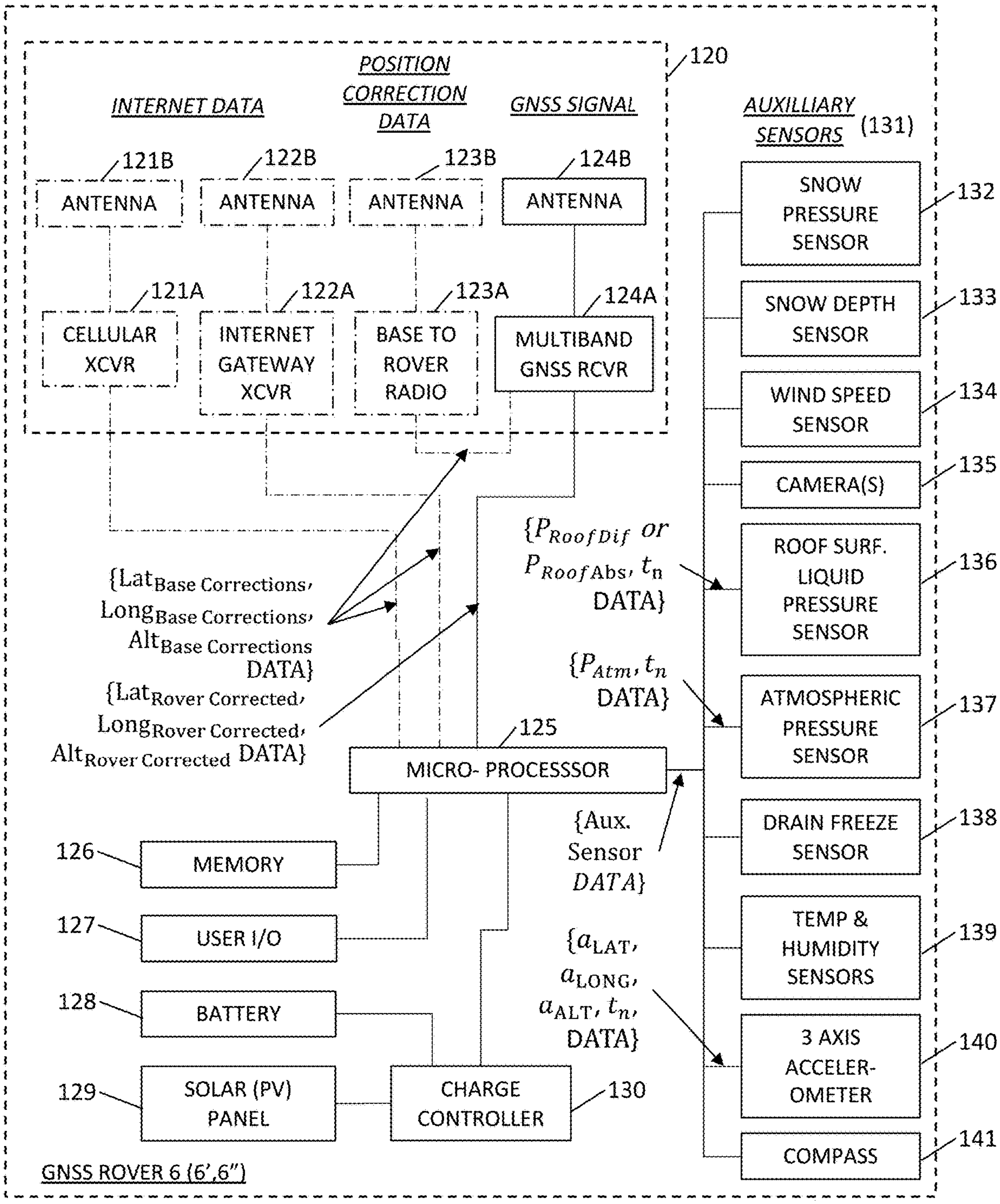
FIG. 21 shows a system block diagram for GNSS rover system/unit deployed on the GNSS system network of FIGS. 1, 12 and 15, shown comprising (i) radio signal subsystems supporting (a) internet data flow using a cellular transceiver (XCVR) with antenna and an internet gateway transceiver (XCVR), (b) RTK position correction data flow using base to rover radio signal transceivers, and (c) GNSS signal reception using multiband GNSS transceivers, (ii) a programmed microprocessor and supporting memory architecture for supporting all control and operating functions, provided with a user I/O interface, battery power module, solar PV panel and charge controller, and (iii) an array of ancillary sensors including, but not limited to, snow pressure sensors, snow depth sensor, wind-speed sensor, digital cameras, roof-surface liquid pressures sensor, atmospheric pressure sensor, drain freeze sensor, temperature and humidity sensors, 3-axis accelerometers, and electronic compass instrument, configured and arranged for receiving corrected GNSS signals and determining the position of the GNSS rover relative to a global reference system, and differential displacement of the GNSS rover over time as determined by the by the spatial measurement engine of the present invention schematically depicted in FIGS. 6A, 6B and 6C.

FIG. 21 shows the GNSS rover system/unit 6 (6', 6") deployed on the GNSS system network 1 of FIGS. 1, 12 and 15, as comprising: (i) radio signal subsystems 120 supporting (a) internet data flow using a cellular transceiver (XCVR) 121A with antenna 121B and an internet gateway transceiver (XCVR) 122A and antenna 122B, (b) RTK position correction data flow using base to rover radio signal transceivers 123A and antennas 123B, and (c) GNSS signal reception using multiband GNSS transceivers 124A and antennas 124B; (ii) a programmed microprocessor 125 and supporting memory architecture 126 for supporting all control and operating functions, provided with a user I/O interface 127, battery power module 128, solar PV panel 129 and charge controller 130; and (iii) an array of ancillary sensors 131 including, but not limited to the following: snow pressure sensors 132, snow depth sensor 133, wind-speed sensor 134, digital cameras 135, roof-surface liquid pressures sensor 136, atmospheric pressure sensor 137, drain freeze sensor 138, temperature and humidity sensors 139, 3-axis accelerometers 140, and an electronic compass instrument 141. Each GNSS rover unit 6 (6', 6") is configured and arranged for receiving corrected GNSS signals transmitted from the GNSS satellites 4, and determining (i) the position of the GNSS rover relative to a global reference system, and (ii) differential displacement of the GNSS rover 6, relative to other GNSS rovers embedded within the system 2, over time, as determined by the by the spatial measurement engine of the present invention 20, as schematically depicted in FIGS. 6A, 6B and 6C.

Figure 22:
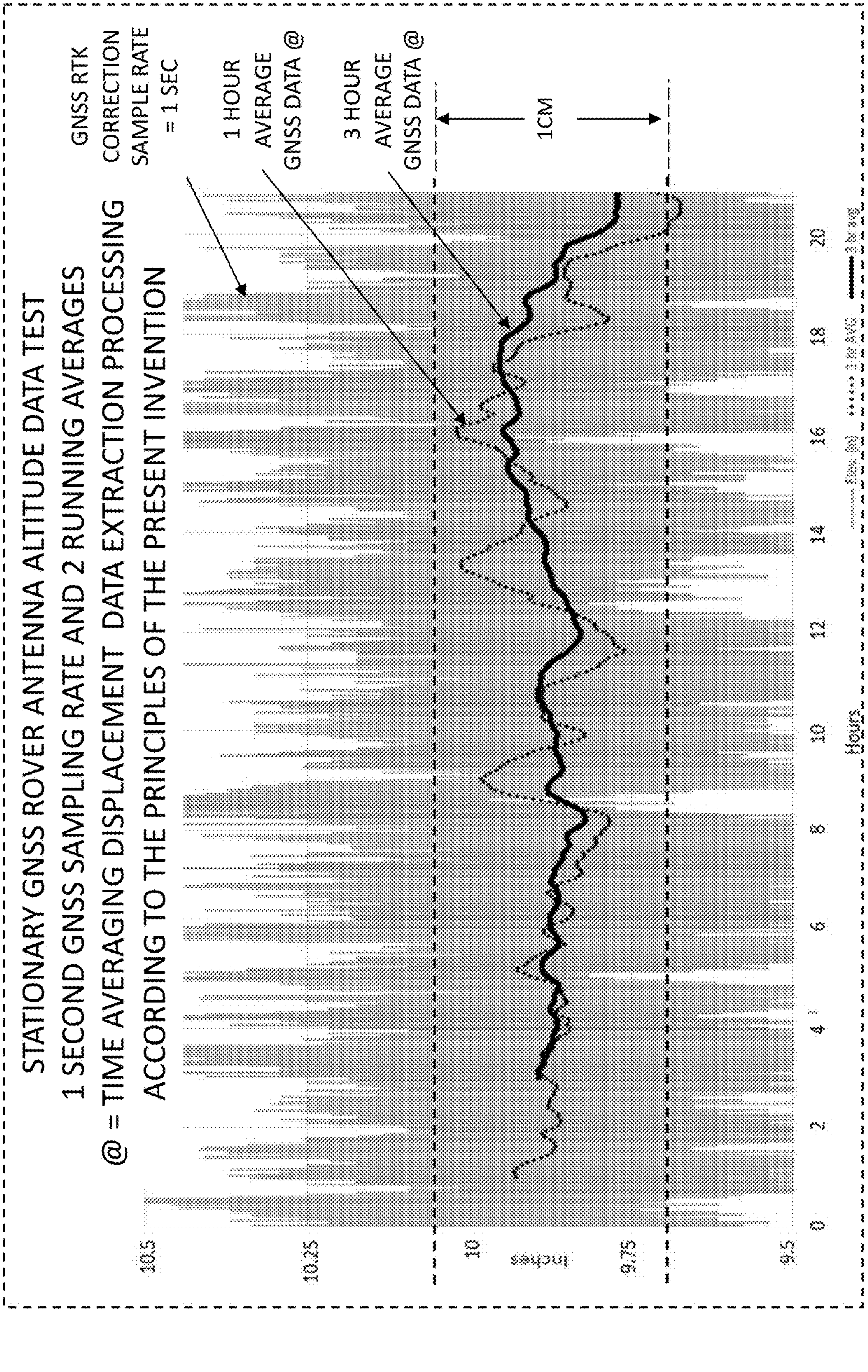
FIG. 22 is a graphical data characteristic representation for a stationary GNSS rover antenna altitude data test conducted when operating the GNSS rover at a 1 second GNSS RTK-corrected sampling rate and 2 running time-based averages (i.e. 1 hour average and 3 hour average)

FIG. 22 shows a graphical data characteristic representation for a stationary GNSS rover antenna altitude data test which is conducted when operating the GNSS rover at a 1 second GNSS RTK-corrected sampling rate and 2 running time-based averages (i.e. 1 hour average and 3 hour average) plotted against time. This graphical representation illustrates the operation of the method of time-averaging based displacement data extraction processing carried out according to the principles of the present invention (@). This method has been empirically tested and shown to enable at least 1 CM spatial displacement resolution when using a 5 minute RTK-corrected data sampling rate and 1 hour time-averaging based displacement data extraction processing.

FIG. 23 shows a graphical data characteristic representation for a stationary GNSS rover antenna altitude data test which is conducted when operating the GNSS rover at a 5 minute GNSS RTK-corrected sampling rate and 2 running time-based averages (i.e. 1 hour average and 3 hour average) plotted against time. This graphical representation illustrates the operation of the method of time-averaging based displacement data extraction processing carried out according to the principles of the present invention (@). This method has been empirically tested and shown to enable at least 1 CM spatial displacement resolution when using a 5 minute s RTK-corrected data sampling rate and 1 hour time-averaging based displacement data extraction processing.

FIG. 24 shows a graphical data characteristic representation for a stationary GNSS rover antenna altitude data test which is conducted when operating the GNSS rover at a 15 minute GNSS RTK-corrected sampling rate and 2 running time-based averages (i.e. 1 hour average and 3 hour average) plotted against time. This method illustrates the operation of the method of time-averaging based displacement data extraction processing carried out according to the principles of the present invention (@). This method has been empirically tested and shown to enable at least 1 CM spatial displacement resolution when using a 5 minute s RTK-corrected data sampling rate and 1 hour time-averaging based displacement data extraction processing.

FIG. 25 shows a graphical representation of a computer simulation of a GNSS Rover Antenna supported on a building roof beam undergoing displacement and deflection under the weight of a snow load, conducted using a 5 minute GNSS RTK-corrected sampling rate and 1 hour running time-based data averaging process, plotted against time. This graphical representation illustrates the operation of the method of time-averaging based displacement data extraction processing carried out according to the principles of the present invention (@) and enabling at least 1 CM spatial displacement resolution.

FIG. 26 shows a building system being monitored by the GNSS system network of the present invention depicted in FIGS. 1 through 8, supporting pole-mounted GNSS rovers having ponding sensors shown in FIGS. 27 and 28, respectively, mounted near roof drains, specially adapted for monitoring the pooling of water on the rooftop surface which can cause great structural damage if and when the roof drains or scuppers should happened to become obstructed and prevent water flow and drainage.

FIG. 27 shows a pole mounted GNSS rover unit 6 with integrated pond-depth sensor 30 employed in the GNSS system network installation 1 illustrated in FIG. 26, installed near a rooftop drain cover 34.

FIG. 28 shows a pole-mounted GNSS rover unit 61 with integrated pond-depth sensor 30, and snow pressure sensor 132 and windspeed sensors 134 as well for deployment in the GNSS system network installation illustrated in FIG. 26.

FIGS. 29A and 29B shows a pole-mounted GNSS rover 6' with an integrated pond-depth sensor, as shown in FIGS. 26 and 27 mounted near roof drains 34, also adapted for automated monitoring the pooling of water on the rooftop surface and communication over the wireless GNSS system network. As shown, the GNSS rover unit 6' comprises: a base stand portion weight 101 for stable support on a rooftop surface for sensing the pooling of water of the rooftop surface 2A; and an upper controller portion 106 containing electronics and radio communication equipment, supported above the stand portion 101 by a hollow pole or otherwise tubular structure 105.

FIG. 30A shows the upper surfaces of the controller portion 106 of the pond-depth sensing GNSS rover unit deployed in FIGS. 29A and 29B, and revealing its compact water-proof housing, support pole, and antennas.

FIG. 30B also shows the pond-depth sensing GNSS rover unit 106 deployed in FIGS. 29A and 29B, and its internal printed circuit (PC) board 108, support plate 107, water sealing gasket 107A, compact water-proof housing 110, support pole 105, antenna module 124B with L1 and L2, and solar panel 111.

FIG. 31 shows the under surfaces of the controller portion 106 of the pond-depth sensing GNSS rover unit 6' deployed in FIGS. 29A and 29B, and revealing its compact water-proof housing, support pole, and antennas.

FIG. 32 shows the controller portion of the GNSS rover unit 6' of the FIGS. 29A, 29B, 30A, 30B and 31, and illustrates particularly the precise location of (i) the Antenna Reference Point (ARP) embedded within the PC board, (ii) the Mechanical Antenna Phase Center, and L1, L2 Phase Centers, and L1 and L2 Vertical and Horizontal Offsets, within the physical controller portion 106 of the GNSS rover unit 6'.

FIG. 33 shows the pond-depth sensing GNSS rover unit 6' in FIGS. 30A through 32 provided with a first portable weighted base component 101' adapted to sense the development (e.g. pooling) of a water pond on a rooftop surface 8A.

FIG. 34 shows the pond-depth sensing GNSS rover unit 6' in FIGS. 30A through 32 provided with a second portable weighted base component 101, shown in FIG. 29A, adapted to sense the development (e.g. pooling) of a water pond on a rooftop surface 2A.

FIG. 35 shows the pond-depth sensing GNSS rover unit 6' in FIGS. 30A through 32 provided with a third portable weighted base component 101" adapted to sense the development of a water pond on a rooftop surface, as shown in FIGS. 30A, 30B and 31.

FIG. 36 shows a pond-depth sensing GNSS rover unit 6' provided with shows the pond-depth sensing GNSS rover unit in FIGS. 30A through 32 employing a permanently-mounted roof mount (i.e. base component) design 101'" enabling the sensing of water ponding on a rooftop surface 2A.

FIG. 37 shows the pond-depth sensing GNSS rover unit 6' of FIG. 36, with its base component 101'" being permanently-mounted on a building roof surface with mounting screws 197. adhesive and capped with a rubber membrane 198 and adhesive.

FIG. 38 shows the pond-depth sensing GNSS rover unit 6' of FIG. 36 provided with an external pond-depth sensor 145

FIG. 39 shows the pond-depth sensing GNSS rover unit 6' of FIGS. 36 through 38 permanently-mounted to the roof surface 2A by its roof mount (component) design enabling the sensing of water ponding on a rooftop surface 2A.

FIG. 40 shows the GNSS rover system 6' deployed on the GNSS system network 1 depicted in FIG. 26, as comprising within its controller housing the following components, namely: (i) radio signal subsystems 120 supporting (a) internet data flow using a cellular transceiver (XCVR) 121A with antenna 121B and an internet gateway transceiver (XCVR) 122A with antenna 122B, (b) RTK position correction data flow using base to rover radio signal transceivers 123A with antenna 123B, and (c) GNSS signal reception using multiband GNSS transceivers 124A and antenna 124B; (ii) a programmed microprocessor 125 and supporting a memory architecture 126 for supporting the functions of the system, and also provided with a user I/O interface 127, battery power module 128, solar PV panel 129 and charge controller 130; and (iii) an array of integrated ancillary sensors 131A including, but not limited to, temperature and humidity sensors 139, snow depth sensor 133, wind-speed sensor 134, digital cameras 135, roof-surface liquid pressure sensor 136, atmospheric pressure sensor 137, electronic compass instrument 141, and 3-axis accelerometers. The unit 6 further includes external sensors including a snow pressure sensor 132 and a drain freeze sensor 138. As described herein, these components are configured and arranged for receiving corrected GNSS signals and determining the position of the GNSS rover relative to a global reference system, and local or remote signal processing to determine spatial displacement, distortion and/or deformation of the system being monitored by the spatial measurement engine of the present invention 120 schematically depicted in FIGS. 6A, 6B and 6C.

FIG. 41 describing the primary steps of a GNSS rover communication and information processing method supported within the GNSS rover system 6 in FIGS. 29A through 40.

As recited in Step 1 of FIG. 41, the GNSS Rover Receivers 6A automatically acquire multi-band GNSS signals from available GNSS constellations 4 and calculate: Latitude (Lat), Longitude (Long) and Altitude (Alt), as described.

As recited in Step 2 of FIG. 41, when requested by the Application Server 12B, GNSS Rover Receivers 6A send $LLA_{Rover\ Uncorrected}$ through (i) an IP Gateway followed by a cellular modem or LAN, (ii) directly through a cellular network, (iii) RF Data Link or (iv) other pathway.

As recited in Step 3 of FIG. 41, the GNSS Rover Receivers 6A or the Application Server 12B request and receive LLA Correction from the Base GNSS Receivers through (i) an IP Gateway followed by a cellular modem or LAN, (ii) directly through a cellular network, (iii) RF Data Link or (iv) other pathway.

As recited in Step 4 of FIG. 41, the GNSS Rover Receivers or Application Server calculate corrected position known as, $LLA_{Rover\ Corrected}$ by using $LLA_{Rover\ Uncorrected}$ and LLA Correction using the following equations $$Lat_{Rover\ Corrected}=Lat_{Rover\ Uncorrected}+\text{Lat Correction}$$

$$Long_{Rover\ Corrected}=Long_{Rover\ Uncorrected}+\text{Long Correction}$$

$$Alt_{Rover\ Corrected}=Alt_{Rover\ Uncorrected}+\text{Alt Correction}$$

As recited in Step 5 of FIG. 41, the data processed in the GNSS Rover Receivers is saved to memory, then transmitted to the Application Server through (i) an IP Gateway followed by a cellular modem or LAN, (ii) directly through a cellular network, (iii) RF Data Link or (iv) other pathway, for processing and automatically determine spatial displacement, distortion and/or deformation within the system being monitored by the spatial measurement engine of the present invention;

As recited in Step 6 of FIG. 41, the GNSS Rovers and Bases save and send Auxiliary Sensor Data including snow and ponding depth, wind speed, solar panel heading/current, station pitch/roll, temperature and camera images, shown in FIG. 40, to the Application Server through (i) an IP Gateway followed by a cellular modem or LAN, (ii) directly through a cellular network, (iii) RF Data Link or (iv) other pathway, for processing and automated determination of rooftop windspeed, and other atmospheric disturbances in the region of the GNSS Rover and/or Base Units.

Overview Specification of Three Different Methods and Instrument Designs for Sensing and Measuring the Depth of Water Ponding (i.e. Pond-Depth) on Rooftop and Other Planar Surfaces Using a Pole-Mounted GNSS Rover Station Having an Integrated Pond-Depth Sensing Instrument Several different methods and instrument designs come to mind for used in constructing a pole-mounted GNSS rover station 6 (6', 6") having an integrated Pond-Depth Sensing Instrument 150. These methods and designs will be concisely described below The first method and instrument design (M1) employs providing a pressure tube 105 between the GNSS rover controller housing 106 and the building roof surface 2A (on which water ponding occurs). Then, a first single-port absolute pressure sensor is mounted in the controller housing 106 for sensing the roof surface liquid pressure, and a second single-port absolute pressure sensor is mounted in the controller housing (or elsewhere) for sensing an atmospheric pressure reference. This first instrument design is illustrated in the embodiments set forth in FIGS. 42A and 42B, and 46, 47, 48, 52, 53, 54, 55, 56, 57, 59 60, 61, 62, 63, 86, 87, 88, 89, 90, and 92.

A variation of the first method and instrument design employs providing a pressure tube 154 between the GNSS rover controller housing 106 and the building roof surface 2A (on which water ponding occurs). Then, a single dual-port differential pressure sensor is mounted in the controller housing 106 having a first port for sensing the roof surface liquid pressure and a second port for sensing the atmospheric pressure reference. This second instrument design is illustrated in the embodiments set forth in FIGS. 43, 70, 71, 72, 73, 93, 94, 95, and 96.

The second method and instrument design (M2) employs providing an electrical cable 1 between the GNSS rover controller housing 106 and the building roof surface 2A (on which water ponding occurs). Then, a first single port absolute pressure sensor is connected to the electrical cable for sensing the liquid roof surface pressure, and a second absolute pressure sensor mounted in the controller housing (or elsewhere) for sensing the atmospheric pressure reference. This third instrument design is illustrated in the embodiments set forth in FIGS. 42A and 42B.

With the above overview, these three different instrument designs will be described in greater detail and specification herein below.

Specification of a First Method of Pressure Sensing and Measurement within a GNSS Rover Stations Having Integrated Pond-Depth Sensing Instrument FIG. 42A shows a pond-depth sensing instrument system for integration within a GNSS rover system of the present invention. The purpose of the pond-depth sensing instrument is to measure the depth of water ponding on a rooftop or like surface using a first method of pressure measurement (M1) described below.

As illustrated in FIG. 42A, this first method comprises the steps of: (a) employing a first "local" absolute pressure sensor (reference) for measuring the atmospheric reference using a first strain gauge sensor 151 mounted on a first sensing membrane within pressure test measurement chamber and producing an output voltage ($V_{atm}$); (b) employing a second absolute pressure sensor 152 for measuring the pressure of the liquid and the atmosphere using as second strain gauge sensor mounted on a second sensing membrane within pressure test measurement chamber and producing an output voltage ($V_{atm}$); and using a signal processor 153 for computing the difference between these pressure measurements to provide the pressure of the liquid and then scaling this measure with a conversion factor k1 to compute the depth of liquid (i.e. pond-depth) in the instrument test region, where $P_{Liquid}=P_{ATM+Liquid}-P_{ATM}$, and height of liquid depth $H=P_{Liquid}/p_{water}$.

FIG. 42B shows a schematic representation of a pond-depth sensing instrument system of the present invention for integration within a GNSS rover system of the present invention, and measuring the depth of ponding on a rooftop or like surface using a first method of pressure measurement (M1).

As illustrated in FIG. 42B, a variation of the first method comprises the steps of: (a) employing a first "remote" pressure reference (e.g. NOAA, NMS, etc.) or other remote sensing station 155, for measuring the atmospheric reference; (b) employing a second absolute pressure sensor 156 for measuring the pressure of the liquid and the atmosphere using as second strain gauge sensor mounted on a sensing membrane within pressure test measurement chamber and producing an output voltage ($V_{atm}$); and (c) using a signal processor 157 for computing the difference between these pressure measurements to provide the pressure of the liquid and then scaling this measure with a conversion factor k1 to compute the depth of liquid (i.e. pond-depth) in the instrument test region, where $P_{Liquid}=P_{ATM+Liquid}-P_{ATM}$, and height of liquid depth $H=P_{Liquid}/p_{water}$. Using this method, it is possible for the GNSS rover to accurately measure the depth of water ponding (e.g. collecting) on the surface of a building rooftop or other structure requiring remote monitoring using a mobile computing device (e.g. smartphone).

Specification of a Second Method of Pressure Sensing and Measurement within GNSS Rover Stations Having Integrated Pond-Depth Sensing Instrument FIG. 43 shows a pond-depth sensing instrument system 130 for integration within the GNSS rover system of the present invention. The purpose of the pond-depth sensing instrument 130 is to measure the depth of water ponding on a rooftop or like surface using a second method of pressure measurement (M2). As illustrated in FIG. 43, the second method comprises the steps of: (a) employing a differential pressure sensor 158 for measuring the atmospheric reference using a strain gauge sensor mounted on a sensing membrane within pressure test measurement chamber and producing an output voltage ($V_{Liquid}$); and (b) using a signal processor 159 for scaling the measured liquid pressure with a conversion factor k2 to compute the depth of liquid (i.e. pond-depth) in the instrument test region, where $P_{Liquid}=(V_{Liquid})*k2$, and height of liquid depth $H=P_{Liquid}/p_{water}$.

Specification of GNSS-Based Pond-Depth Sensing Instruments of the Present Invention FIG. 44A shows the rooftop pond-depth sensing instrument system in FIG. 42, employing an absolute pressure sensor 152 and Method M1, and shown operating without liquid in its pond-depth sensing chamber, and producing zero pond-depth value H=0. FIG. 44B shows the rooftop pond-depth sensing instrument system of FIG. 42, employing an absolute pressure sensor 152 and Method M1, and shown operating with liquid in its pond-depth sensing chamber, and producing a non-zero pond-depth value H.

FIG. 45A shows the rooftop pond-depth sensing instrument system of FIG. 43, employing a differential pressure sensor 158 and Method M2, and shown operating without liquid in its pond-depth sensing chamber, and producing zero pond-depth value H. FIG. 45B shows the rooftop pond-depth sensing instrument system employing a differential pressure sensor 158 and Method M2, and shown operating with liquid in its pond-depth sensing chamber, and producing a non-zero pond-depth value H.

Specification of a GNSS Rover System with an Integrated In-Pole Pond-Depth Sensing Instrument Using Method M1 and Two Pressure Sensors FIGS. 46, 47 and 48 show a GNSS rover system 6' with an integrated in-pole pond-depth sensing instrument 130 illustrated in FIGS. 422 and 42B using method M1. As shown, the GNSS rover system 6' comprises: a GNSS controller portion 106 having a base housing, the PC board 108 with antenna element, upper housing with antenna cover 110, and a hollow support pole 105 mounted to the base housing 107 supporting the PC board 108 and its onboard absolute pressure sensors 151 and 152. FIG. 47 shows the GNSS rover system shown in FIG. 46, as comprising: the base housing 110, the PC board with antenna element 108A for mounting on the base housing plate 107, an upper housing with antenna cover 110, and the hollow support pole 105 connecting to the bottom of the base housing support plate 107. FIG. 48 shows the GNSS rover system depicted in FIGS. 46 and 47, with the base housing plate 107 supporting the PC board 108 with antenna element, the upper housing with antenna cover 110, and the hollow support pole 105 connected to the base housing support plate providing fluid/air communication between the absolute pressure sensor 152 and the bottom of the hollow support pole 105 where the ponding of water develops and is available for sensing and monitoring. As shown in FIG. 48, atmospheric pressure sensor 151 mounted on PC board 108 senses the atmospheric pressure which factors into the water ponding height measurement illustrated in FIGS. 42A, 44A and 44B. Alternatively, the atmospheric pressure sensor 151 can be realized by a remote pressure sensor reference 155 illustrated in FIG. 42B and transmitted to microprocessor 157, and factored with the liquid pressure sensed by pressure sensor 156.

Specification of a GNSS Rover System with an Integrated In-Pole Pond-Depth Sensing Instrument Using Method M1 and Two Pressure Sensors with Pressure Sensing Tube Connected to Bottom of Support Pole FIGS. 49A and 49B show a GNSS rover system 6' with an integrated in-pole pond-depth sensing instrument as shown in FIG. 42, using method M1. As shown, the GNSS rover system 6" comprises: a GNSS controller portion 6A' having a base housing 107 with PC board 108 and 124B antenna element; an upper housing 110, and a hollow support pole 105 having a pressure sensing tube 160 mounted therealong and connected to a sensing port in the base plate 204; and a funnel 162 at the bottom end of the support tube 105 for sensing the depth of ponding of water on a rooftop surface 2A, above which the bottom end of the support tube 210 is supported via a support base structure 204 on roof deck 2A next to a roof deck drain 34.

FIGS. 50A, 50B and 50C show the GNSS rover system 6' depicted in FIGS. 49A and 49B, comprising: a controller housing 107, 110; a hollow support pole 105; a pressure sensing tube 106 mounted therealong and connected to a sensing port in the base plate; and funnel 162 at the bottom end of the support tube 160 for sensing the depth of water ponding on a rooftop surface, above which the bottom end of the support tube is inserted in the support base structure.

FIG. 50D shows the GNSS rover system 6' in FIGS. 49A, 49B, 50A, 50B and 50C comprising: four CMOS cameras 135 with image formation optics, mounted on PC board 108 with a microprocessor and memory architecture 124A and Bluetooth transceiver chip; an OLED display panel 1314 and supporting interface and driver; the GNSS chip 124A and its antenna strips 121A, 121B, 121B and 121C; a rubber gasket seal 107A for sealing the housing halves 110 and 107; a photo-voltaic (PV) polar panel 1313 for collecting photonic energy from the Sun and generating electrical power at an output voltage with an output current; a battery power storage module 128 for storing electrical power produced from the PV panel 1313 and supporting power conditioning electronics; a set of screws 1318 for fastening the housing halves 110 and 107; an LED power indicator 1323'; solid-state pressure sensing transducers (i.e. sensor) 203A (152) mounted on the PC board 135 for sensing and measuring the pressure of water ponding on a roof or other surface; a solid-state pressure sensor 203B (151) for sensing local atmospheric pressure required for pressure measurement method M1 illustrated in FIG. 42A; a pressure sensing tube 160 coupled to the pressure sensor 203A and a funnel structure 162 with screen cover 208 mounted at the bottom of the base 207 as shown in FIGS. 50C and 50D, so that pressure forces exerted at the end of the pressure sensing tube 160 is transmitted to the solid-state pressure sensor 203 mounted on the PC board 108; a support pipe 105 connected to the base 207 for supporting the GNSS rover controller 6A' about the base 207; and adhesive patches 1302 attached to the bottom of the base 207 for mounting the base 207 and connected controller 6A' to the roof surface 2A without causing damage thereto.

Specification of Method of Testing Water Ponding Pressure Sensing Mode of the GNSS Rover System of the Present Invention FIGS. 51A and 51B show the GNSS rover system in FIG. 49A, with its upper unit 6' and pressure sensing tube 160 removed from the support base structure 207. In FIG. 51C, the upper unit 6' and pressure sensing tube 160 is placed in the bucket of water 1332 to be used for testing, near a roof drain 34 and support base structure on the roof deck 2A.

FIG. 51C shows a side cross-sectional view of the GNSS rover system shown in FIGS. 49A and 51B, showing the upper unit 6' and pressure sensing tube 160 removed from the support base structure 207 and placed in the bucket of water 1332 during testing, located alongside a roof drain 34 and the support base structure 207 on the roof deck 2A.

As shown in FIGS. 108A and 108B, the steps of a test procedure is disclosed for use with GNSS rover system in FIG. 49 and other pond sending rovers disclosed throughout herein.

As indicated at Step 1 in FIG. 108A, the User presses the Power button on the Rover to wake up the unit from Sleep Mode.

As indicated at Step 2 in FIG. 108A, the User presses the Mode button on the Rover to enter the unit into Test Mode.

As indicated at Step 3 in FIG. 108A, the User removes the Rover from its support base structure.

As indicated at Step 4 in FIG. 108A, the User lowers the Rover into a ½ full bucket of water, and adjusts the water until it reaches a predetermined height (e.g. 4 inches) indicated by the Test Depth Mark on the Antenna Tube or Support Mast of the Rover.

As indicated at Step 5 in FIG. 108A, the User presses the Mode Button on the Rover to initiate sampling the water depth pressure sensor known as $P_{PRES\ SENSOR}$.

As indicated at Step 6 in FIG. 108A, the Rover obtains the atmospheric pressure known as $P_{ATM}$ by one of the following (i) sampling the Rover's atmospheric pressure sensor (ii) requesting the atmospheric pressure from the Data Center.

As indicated at Step 7 in FIG. 108A, the Rover calculates the ponding Water Depth known as H using the formula:

$$H = \frac{P_{LIQUID}}{\rho_{WATER}}$$

$$P_{LIQUID} \approx P_{ATM+LIQUID} - P_{ATM}$$

$$P_{ATM+LIQUID} \approx P_{PRES\ SENSOR}$$

As indicated at Step 8 in FIG. 108B, the Rover outputs the calculated Water Depth on the Rover's display for the User.

As indicated at Step 9 in FIG. 108B, the Rover sends the calculated Water Depth data to the Application Server 12B.

As indicated at Step 10 in FIG. 108B, the Application Server 12B compares calculated Water Depth to predetermined minimum and maximum values to determines if the Rover's operation has passed or failed.

As indicated at Step 11 in FIG. 108B, the Application Server (i) records the Pass/Fail status, date and time of the test in the Database 12C, (ii) indicates the Pass/Fail status of the sensor on the Web App Server 12A.

As indicated at Step 12 in FIG. 108B, the Application Server 12B sends the Pass/Fail status to the Rover.

As indicated at Step 13 in FIG. 108B, the Rover outputs the Pass/Fail status on the Rover's display.

As indicated at Step 14 in FIG. 108B, if the Rover passes the test, then User returns the Rover to the Structural Support Base.

As indicated at Step 15 in FIG. 108B, if the Rover fails the test, then the User takes further action to resolve the problem.

Specification of a GNSS Rover System with an Integrated In-Pole Pond-Depth Sensing Instrument Using Method M1 and Two Pressure Sensors with Pressure Sensing Tube Connected to Fixed Chamber in Pole Bottom FIGS. 52, 53 and 54 show a GNSS rover system 6' with an integrated in-pole pond-depth sensing instrument 130 as shown in FIG. 42, using the method M1. As illustrated in FIG. 52, the GNSS rover system comprises: a GNSS controller portion 106 having a base housing 107, a PC board 108 with antenna element 108A, an upper housing 110 with antenna cover 110A; and a hollow support pole 105 having a pressure sensing tube 160 mounted therealong and connected to a fixed pressure measurement chamber 105A at the bottom end of the support tube 105 for sensing the depth of ponding of water on a rooftop surface 2A, above which the bottom end of the support tube 105 is supported via a support base structure 101.

FIG. 53 shows the GNSS rover system 6' shown in FIG. 52, with its base housing, the PC board 108 with pressure sensor 152, an antenna element 108A, upper housing 110 with antenna cover, and the hollow support pole 105. FIG. 54 shows a the GNSS rover system depicted in FIGS. 52 and 53, with its base portion, the PC board 108 with antenna element 108A, the upper housing 110 with antenna cover 110A, and the broken and cut-away hollow support pole 105.

As shown in FIG. 54, one end of the pressure sensing tube 160 is connected to the pressure sensor 152 on the PC board 108, while the other end of the pressure sensing tube is configured in the hollow support pole 105 for sensing the pressure of water ponding at the end of the support tube 105B, and in turn, measuring the height of water ponding in inches or other units of height measurement. As shown in FIG. 53, the reference pressure sensor 151 is also mounted on the PC board 108 for measuring the local reference pressure, required to practice the method of atmospheric pressure and water ponding depth measurement illustrated in FIGS. 44A and 44B.

Specification of a GNSS Rover System with an Integrated In-Pole Pond-Depth Sensing Instrument Using Method M1 and Two Pressure Sensors with One Sensor Connected to Cable End FIG. 55 shows a GNSS rover system 6' with an integrated in-pole pond-depth sensing instrument 130 as shown in FIG. 42, using the method M1. As illustrated, the GNSS rover system 6' comprises: a GNSS controller portion 106 having a base housing, a PC board 108 with antenna element, an upper housing with antenna cover; and a hollow support pole 105 having a cable 170 mounted therealong and extending outside the support tube 105 and terminating in one absolute pressuring sensor 152 mounted at the cable end, for sensing the depth of ponding of water near a drain on a rooftop surface 2A. FIG. 56 shows the GNSS rover system of FIG. 55, showing its controller portion 106, its absolute pressure sensor 172 (i.e. 152 in FIGS. 44A and 44B) at end of cable passed through the hollow support tube 170. FIG. 57 shows the controller portion 106 of the GNSS rover system 6' with its controller top housing portion 110 and controller base housing portion 107, with a PC board 108 mounted therebetween, and a windspeed measuring instrument 173 mounted on the top of the housing 110A and connected to the PC board 108. FIG. 58 shows the absolute pressure sensor 172 mounted at the end of cable 170 passed through the support tube 105 of the GNSS rover integrated pond-depth sensing instrument 130. FIG. 59 shows the cable end portion 171 of the pond-depth sensing instrument subsystem in FIG. 58, for integration into the GNSS rover system. FIG. 60 shows the cable end 171 shown in FIG. 59, with the absolute pressure sensor 172 mounted in a pressure sensing cage 172A, 172B, within mounting device 176 and threaded cap 175, protecting the pressure sensor 172, while the reference pressure sensor 151 is mounted on the PC board 108 as described hereinabove. In order to practice method M1 illustrated in FIGS. 44A and 44B, the reference atmospheric pressure sensor 151 is mounted on the PC board 108, to measure local atmospheric pressure required by method M1.

Specification of a GNSS Rover System with an Integrated In-Pole Pond-Depth Sensing Instrument Using Method M1 and Two Pressure Sensors Mounted in One End of Cable FIG. 61 shows a GNSS rover system 6' provided with an integrated in-pole pond-depth sensing instrument as shown in FIG. 42, using the method M1. As illustrated in FIG. 61, the GNSS rover system comprises: a GNSS controller portion 106 having a base housing 107, a PC board 108 with antenna element 108A, an upper housing 110 with antenna cover 110A; and a hollow support pole 105 having a cable 160 mounted therealong and extending to the bottom of the support tube and terminating in an absolute pressuring sensor 152 mounted at the cable end 160, inside and towards the end of the hollow support tube 105. The reference pressure sensor 151 is mounted on the PC board 108 as described hereinabove, according to Method 1 described in FIGS. 42A and/or 42B.

As arranged, the pond depth sensing instrument is capable of sensing the depth of ponding of water on a rooftop surface 2A near the bottom of the support tube 105 orthogonal to the support base 101''' typically located near a rooftop rain drain 34.

FIG. 62 shows the GNSS rover system in FIG. 61, with one of its pressure sensors 152 mounted to the end of a cable 160 mounted at the bottom end of the hollow support tube 105, immediately above the bottom of the base support plate 101'', where water is allowed to pool on a roof-top surface 2A. FIG. 63 shows the hollow support tube 105 employed in the GNSS rover system in FIG. 61, where the pressure sensor 172 (152) is mounted. The atmospheric pressure sensor 151 is mounted within the controller 106 to carry out the method M1 illustrated in FIGS. 42A, 44A and 44B and described above.

Specification of the Communication and Information Processing Method Used when Measuring the Pond-Depth on a Planar Surface Using Two Independent Absolute Pressure Sensors Arranged According to the First Method M1

FIG. 64 describes the primary steps involved in practicing the first communication and information processing method when measuring the pond-depth on a planar surface using two independent absolute pressure sensors 151 and 152 arranged according to the first method M1 described above.

As recited in Step 1 of FIG. 64, the GNSS Rovers 6' equipped with the pond-depth sensing instrument 130 are placed in locations of interest on the roof such as near a roof drain, roof scupper or at other low points in the roof where water might collect.

As recited in Step 2 of FIG. 64, during dry rooftop conditions, the Rover 6'' or Standalone Pond-Depth Sensor pressure sensors 152 and 151 read the Liquid Pressure of the rooftop surface 2A and the Atmospheric Pressure at the rooftop surface with values known as $P_{Roof\ Abs\ t0}$ and $P_{Atm\ t0}$ respectively, where pressure P is measured in pounds per square inch absolute [PSIA] and t is time.

As recited in Step 3 of FIG. 64, when requested by the Application Server, the Rover 6' or Standalone Pond-Depth Sensor 152 sends $P_{Roof\ Abs\ t0}$ and $P_{Atm\ t0}$ through (i) an IP Gateway followed by a cellular modem or LAN, (ii) directly through a cellular network, (iii) RF Data Link or (iv) other pathway.

As recited in Step 4 of FIG. 64, periodically the Rover or Standalone Pond-Depth Sensor pressure sensors read the Rooftop Surface Liquid Pressure and Atmospheric Pressures with values known as $P_{Roof\ Abs\ tn}$ and $P_{Atm\ tn}$ where n is incremented with time.

As recited in Step 5 of FIG. 64, when a nonzero water depth or close to nonzero water depth is detected, the Rover will increase its sampling rate. The sampling rate returns to the normal sampling rate once the water depth has returned to zero or close to zero.

As recited in Step 6 of FIG. 64, when requested by the Application Server, the Rover or Standalone Pond-Depth Sensor sends $P_{Roof\ Abs\ tn}$ and $P_{Atm\ tn}$ through (i) an IP Gateway followed by a cellular modem or LAN, (ii) directly through a cellular network, (iii) RF Data Link or (iv) other pathway.

As recited in Step 7: of FIG. 64, the Rover, Standalone Pond-Depth Sensor or Application Server calculates the depth of rooftop ponding of water measured in inches, known as $D_{tn}$, using the following equations: $D_{tn}$=

$((P_{Roof Abs\ tn}-P_{Roof Abs\ t0})-(P_{Atm\ tn}-P_{Atm\ t0}))*27.71$ in/psi and drainage rate $DR_{tn}$ using the following equation: $DR_{tn}=((D_{tn-1}-D_{tn})/(t_n-t_{n-1})$ As recited in Step 8 of FIG. 64, the Rover 6' or Standalone Pond-Depth Sensor 130 saves water depth in inches ($D_{tn}$) and drainage rate in inches/min ($DR_{tn}$) to memory.

As recited in Step 9: of FIG. 64, the Rover 6' or Standalone Pond-Depth Sensor 130 periodically sends water depth in inches or cm ($D_{tn}$) and drainage rate in inches/min or cm/min ($DR_{tn}$) to the Application Server or when the Application Server request the data.

Measuring Pond-Depth when Using Two Absolute Pressure Sensors Mounted with the GNSS Rover of the Present Invention with Integrated Pond-Depth Sensing Instrumentation FIG. 65 shows plots of the absolute roof surface pressure and atmospheric pressure measured by both absolute pressure sensors employed in the pond-depth sensing instrument system of FIGS. 42A and 42B (supporting Method M1), and the pond-depth measured and calculated (in inches) by the pond-depth sensing instrument system over the passage of time, including the occurrence of a rain event, steady atmospheric pressure, and no drain clogging.

FIG. 66 shows a plot of the absolute roof surface pressure and atmospheric pressure measured by both absolute pressure sensors employed in the pond-depth sensing instrument system of FIGS. 42A and 42B, and the pond-depth measured and calculated by the instrument system over the passage of time, including the occurrence of a rain event, steady atmospheric pressure and slow draining.

FIG. 67 shows a plot of (i) the absolute roof surface pressure and atmospheric pressure measured by both absolute pressure sensors employed in the pond-depth sensing instrument system of FIGS. 42A and 42B (Method M1), and (ii) the pond-depth measured and calculated (in inches) by the instrument system over the passage of time including the occurrence of a rain event, a dip in atmospheric pressure and slow draining.

FIG. 68 shows a plot of (i) the absolute roof surface pressure and atmospheric pressure (PSIA) measured by both absolute pressure sensors employed in the pond-depth sensing instrument system of FIGS. 42A and 42B, and (ii) the pond-depth measured and calculated (in inches) by the instrument system over the passage of time including the occurrence of a rain event, a dip in atmospheric pressure and slow draining.

FIG. 69 shows an empirical test of the pond-depth sensing instrument system according to the design shown in FIGS. 42A and 42B, showing (i) pressure measurements at the building roof deck surface and at atmospheric reference measured by two absolute pressure sensors, and (ii) water-depth/pond-depth observed and water/pond depth calculated, plotted against moments or points in time.

Specification of a GNSS Rover System of the Present Invention Provided with an Integrated in-Pole Pond-Depth Sensing Instrument Using One Differential Pressure Sensor Mounted with the GNSS Rover and Operating According to Method M2

FIGS. 70, 71 and 72 show a GNSS rover system 6' provided with an integrated in-pole pond-depth sensing instrument 130 as shown in FIG. 43 using Method M2. As shown, the GNSS rover system comprises: a GNSS controller portion 106 having a base housing 107, the PC board 108 with antenna element 108A, upper housing 110 with antenna cover 110A, and a hollow support pole 105 mounted to the base housing 107. As shown in FIG. 71, a solid-state differential-type pressure sensor 153 is mounted on the PC board 107, and functions within method M2 as illustrated in FIGS. 43, 45A and 45B.

FIGS. 73 and 74 show the GNSS rover system 6' provided with the integrated in-pole pond-depth sensing instrument 130 using the Method M1 illustrated in FIGS. 42A and 42B, or using the Method M2 illustrated in FIG. 43. As shown, the GNSS rover system 6' comprises: a GNSS controller portion 106 having a base housing 107; a PC board 108 with antenna element 108A; an upper housing 110 with antenna cover 110A; a hollow support pole 105 connected to a support base structure 165; and solid-state pressure sensor(s) 151, 152 mounted on PC board 108 for sensing and measuring pond-depth H and displaying such measurements on mobile smartphones and mobile computing systems deployed on the system network of the present invention.

FIGS. 75A and 75B show the GNSS rover system 6' shown in FIG. 73 provided with an integrated in-pole pond-depth sensing instrument of FIG. 43 using Method M1, or as shown in FIG. 43 using Method M2. As shown, the GNSS rover system comprises: a GNSS controller portion 106 having a base housing 107; a PC board 108 with antenna element 108A, upper housing 110 with antenna cover 110A; a hollow support pole 105 connected to a weighted block-like support base structure for sensing pond-depth at the bottom surface of the base structure 165; and solid-state pressure sensor(s) 151, 152 mounted on the PC board 108 for sensing and measuring pond-depth H and displaying such measurements on mobile smartphones and mobile computing systems deployed on the system network of the present invention.

FIGS. 76A and 76B show the GNSS rover system provided with an integrated in-pole pond-depth sensing instrument of FIG. 42 using method M1, or as shown in FIG. 43 using Method M2. As shown, the GNSS rover system comprises: a GNSS controller portion 106 having a base housing 107; a PC board 108 with antenna element 108A; an upper housing 110 with antenna cover 110A; a hollow support pole 105 connected to a flat plat support base structure for sensing pond-depth at the bottom surface of the base structure 101'; and solid-state pressure sensor(s) 151, 152 for sensing and measuring pond-depth H and displaying such measurements on mobile smartphones and mobile computing systems deployed on the system network of the present invention. As shown, the base structure is bonded to the roof deck 2A or other surface using adhesive 199, double sided tape or mastic putty.

FIGS. 77 and 78 show the GNSS rover system 6' provided with an integrated in-pole pond-depth sensing instrument 130 of FIG. 42 using Method M1, or as shown in FIG. 43 using Method M2. As shown, the GNSS rover system 6' comprises: a GNSS controller portion 106 having a base housing 107, an PC board 108 with antenna element 108A; an upper housing 110 with antenna cover 110A; a hollow support pole 105 connected to a support base structure 166 for sensing pond-depth on a planar surface 2A; and solid-state pressure sensor(s) 151, 152 for sensing and measuring pond-depth H and displaying such measurements on mobile smartphones and mobile computing systems deployed on the system network of the present invention.

Specification of the Method of Communication and Information Processing Method Used During Pond-Depth Measurement when Using a Differential Pressure Sensor and Method M2

FIG. 79 describes the steps of a communication and information processing method subset used during pond-depth measurement when using differential pressure sensor 153 and Method M2.

As indicated in Step 1 of FIG. 79, each GNSS Rover 6' is equipped with automated pond-depth sensing instrumentation are placed in locations of interest on the roof, such as near a roof drain 34, roof scupper or at other low points in the roof where water might collect.

As indicated in Step 2 of FIG. 79, during dry rooftop conditions the GNSS Rover's or Standalone Pond-Depth Sensor's differential pressure sensor 153 reads the Rooftop Surface Liquid Pressure with respect to Atmospheric Pressure with value known as $P_{Roof\ t0}$ where pressure P is measured in pounds per square inch (PSI) and t is time.

As indicated in Step 3 of FIG. 79, when requested by the Application Server 12B, the Rover 6' or Standalone Pond-Depth Sensor sends $P_{Roof\ t0}$ through (i) an IP Gateway 7 followed by a cellular modem or LAN, (ii) directly through a cellular network 10, (iii) RF Data Link or (iv) other pathway.

As indicated in Step 4 of FIG. 79, periodically the Rover or Standalone Pond-Depth Sensor pressure sensors read the Rooftop Surface Liquid Pressure where $P_{Roof\ tn}$ is incremented with time.

As indicated in Step 5 of FIG. 79, when a nonzero water depth or close to nonzero water depth is detected, the Rover will increase its sampling rate. The sampling rate returns to the normal sampling rate once the water depth has returned to zero or close to zero.

As indicated in Step 6 of FIG. 79, when requested by the Application Server, the Rover or Standalone Pond-Depth Sensor sends $P_{Roof\ tn}$ a request (i.e. a digital packet-based request) through (i) the IP Gateway followed by a cellular modem or LAN, (ii) directly through a cellular network, (iii) RF Data Link or (iv) other pathway.

As indicated in Step 7 of FIG. 79, the Rover, Standalone Pond-Depth Sensor or Application Server calculates rooftop ponding water depth in inches, known as $D_{tn}$, using the following equation: $D_{tn}=(P_{roof\ tn}-P_{roof\ t0})*27.71$ and drainage rate $DR_{tn}$ using the following equation: $DR_{tn}=((D_{tn-1}-D_{tn})/(t_n-t_{n-1})$ As indicated in Step 8 of FIG. 79, the Rover or Standalone Pond-Depth Sensor saves water depth in inches ($D_{tn}$) and drainage rate in inches/min ($DR_{tn}$) to memory local or remote on Database Server 12C.

As indicated in Step 9 of FIG. 79, the Rover or Standalone Pond-Depth Sensor periodically sends water depth in inches or cm ($D_{tn}$) and drainage rate in inches/min or cm/min ($DR_{tn}$) to the Application Server 12C or when the Application Server request the data.

Specification of Measuring Pond-Depth Using a GNSS Rover System Employing Integrated Pond-Depth Sensing Instrument Using One Differential Pressure Sensor FIG. 80 shows a plot of (i) the roof surface pressured measured by the differential pressure sensor 153 employed in the pond-depth sensing instrument system of FIG. 43 integrated into the GNSS rover system 6', and (ii) the pond-depth measured and calculated (in inches) by the instrument system over the passage of time, including the occurrence of a rain event and no drain clogging.

FIG. 81 shows a plot of (i) the roof surface pressure measured by the differential pressure sensor 153 employed in the pond-depth sensing instrument system of FIG. 43 integrated into the GNSS rover system 6', and (ii) the pond-depth measured and calculated by the instrument system over the passage of time, including the occurrence of a rain event, and slow draining.

Overview Specification for Methods of Pond-Depth Sensing Using Instrumentation Embodied in a Surface-Mounted GNSS Rover System of the Present Invention A first method of measuring pond depth using instrumentation in a surface-mounted (i.e. puck-type) GNSS rover system 6", as illustrated in FIG. 42B, involved using one single-port absolute pressure sensor 152 for sensing roof deck liquid pressure using an external atmospheric pressure reference, such as data from a local weather station or a surface mount GNSS rover 6" operating from a non-submerged location.

A second method of measuring pond depth, as illustrated in FIG. 42A, using instrumentation in a surface-mounted GNSS rover system 6" involved using two single-port absolute pressure sensors 151 and 152 for sensing roof deck liquid pressure, and also the atmospheric pressure reference mounted on the antenna tube.

A third method of measuring pond depth illustrated in FIG. 43, using instrumentation in a surface-mounted GNSS rover system involved using a dual-port differential pressure sensor 158 having a first port for sensing roof deck liquid pressure, and a second port venting near the top of the antenna mast for sensing the atmospheric pressure reference.

Specification of GNSS System Network of the Present Invention Deployed on Building Rooftop with Surface-Mounted GNSS Rover Systems Employing Integrated Pond-Depth Sensing Instrumentation FIG. 82 shows a building structure 2 having a roof surface 2A, upon which the GNSS system network 1 is deployed and operating. As shown, each GNSS rover system 6' is realized as a surface-mounted GNSS rover device and employs an integrated pond-depth sensing instrument 130" using absolute pressure sensors 151, 152 as shown in FIGS. 42A and/or 42B. Typically, each GNSS rover is mounted nearby a roof drain 34 to automatically, and continuously or periodically, monitor the rooftop drain region for possible pooling of rainwater, generating measurements of measured on pond-depth and sending notifications thereof to individuals having concern for the condition of the building rooftop surface.

FIG. 83 shows one GNSS surface-mounted rover device 6" shown in deployed in FIG. 82, mounted in the vicinity of a rooftop drain 34 and capable of monitoring and measuring the pond-depth of rainwater collected in the monitoring range of the rover device.

FIG. 84 shows the GNSS surface-mounted rover system of FIGS. 82 and 83. As shown, the GNSS surface-mounted rover system 6" employs (i) an externally generated atmospheric pressure measurement 151 (e.g. transmitted from NOAA 155 and) received by the surface-mounted GNSS rover system 6", and (ii) a local absolute pressure sensor 152 for measuring the pond surface pressure level for use in computing pond-depth measurements using the method M1 of FIG. 42A.

FIG. 85 shows the surface-mounted GNSS rover device of FIG. 84, employing a pond-depth sensing instrument subsystem as shown in FIG. 42A, using an external atmospheric pressure sensor 151 from a remote source such as NOAA server 14 to provide the atmospheric pressure measurement for method M1 illustrated in FIGS. 42B, and 44A and 44B.

FIGS. 86 and 87 show the surface-mounted GNSS rover device of FIG. 84, with its base housing portion 170, its PC board 172 equipped with an integrated color video/still-frame camera system on chip (SOC) 172A, a solar modules 129, an RTK antenna 123B, an optically-transparent cover housing portion 171, a waterproof sealing ring 170B, a set of fastening screws 177, and an atmospheric air pressure sensing tube 175.

FIGS. 88 and 89 show the GNSS surface-mounted rover system 6" deployed in FIGS. 82 and 83, as employing an integrated pond-depth sensing instrument system as shown in FIG. 42B using a pair of local absolute pressure sensors 151, 152 (155, 156) for measuring local atmospheric and pond surface pressure levels for use in pond-depth calculations.

FIGS. 90A, 90B and 90C show the surface-mounted GNSS rover device of FIG. 84, showing its base housing portion, its PC board with integrated color video/still-frame camera system on chip (SOC) 135, its solar modules 129, its RTK antenna 123A, its optically-transparent cover housing portion, its waterproof sealing ring 170B, a set of fastening screws 177, and an atmospheric air pressure sensing tube 175.

FIGS. 91 and 92 shows the GNSS surface-mounted rover system deployed in FIGS. 82 and 83, as employing an integrated pond-depth sensing instrument system as shown in FIG. 43 using a single differential pressure sensor 158.

FIGS. 93A and 93B show the surface-mounted GNSS rover device of FIG. 91, with its base housing portion 170, its PC board 172 with integrated color video/still-frame camera system on chip (SOC) 135, its solar modules 129, its RTK antenna 123A, its optically-transparent cover housing portion 170, its waterproof sealing ring 170B, a set of fastening screws 177, and an atmospheric air pressure sensing tube 174.

FIG. 94A shows an elevated perspective view of the GNSS surface-mounted rover device 6" shown fastened to a surface-mounted holding cradle 1301. Flexible arms 1301' extend upward and engage features on the surface-mounted GNSS rover device 6", holding it in place from the elements especially when submerged in water and buoyant. Ponding water on the roof deck or other surface is free to flow inward toward the pressure sensor via grooves 1339 shaped into the surface mount holding cradle 1301;

FIG. 94B shows an exploded perspective view of the GNSS surface-mounted rover system shown removed from a surface-mounted holding cradle 1301. The cradle is secured to a roof or other surface to be monitored using double-sided tapes 1302, mastic putty, adhesives or fasteners. Flexible arms 1301' extending upward can be flexed outward to release the surface-mounted GNSS rover 6" device for maintenance, inspection, replacement or calibration. Radially placed grooves 1339 allow ponding water to flow inwards toward the center of the cradle 1301;

FIG. 95 shows the surface-mounted GNSS rover system 6" depicted in FIGS. 82 through 94B, as containing within its GNSS rover controller housing 170, 171, the following components: (i) radio signal subsystems supporting (a) internet data flow using a cellular transceiver (XCVR) 121A with antenna 121B and an internet gateway transceiver (XCVR) 122A, (b) RTK position correction data flow using base to rover radio signal transceivers 123A with antenna 122B, and (c) GNSS signal reception using multiband GNSS transceivers 124A with antenna 124B; (ii) a programmed microprocessor and supporting memory architecture, provided with a user I/O interface 127, battery power module 128, solar PV panel 129 and charge controller 130; and (iii) an array of ancillary sensors including, but not limited to, wind-speed sensor, temperature and humidity sensors 139, digital cameras 135, roof-surface liquid pressures sensor 136, atmospheric pressure sensor 137, drain freeze sensor 138, 3-axis accelerometers 140, electronic compass instrument 141, snow pressure sensors and snow depth sensor, configured and arranged for receiving corrected GNSS signals and determining the position of the GNSS rover relative to a global reference system, and differential displacement of the GNSS rover over time as determined by the spatial measurement engine of the present invention 120 schematically depicted in FIG. 26, and further including external sensors including a drain freeze sensor 138.

Specification of Method of Communication and Information Processing Used when Making Pond-Depth Measurements with Two Absolute Pressure Sensors Using the Method M1

FIG. 96 describing the steps of communication and information processing method when making pond-depth measurements using the Method M1 illustrated in FIGS. 42A and/or 42B using two absolute pressure sensors 151 and 152.

As indicated in Step 1 of FIG. 96, the GNSS rovers 6" equipped with pond-depth sensing instrument are placed in locations of interest on the roof such as near a roof drain or at other low points in the roof where water might collect.

As indicated in Step 2 of FIG. 96, during dry rooftop conditions the Rover or Standalone Pond-Depth Sensor pressure sensors read the Rooftop Surface Liquid Pressure and Atmospheric Pressure with values known as $P_{Roof\ Abs\ t0}$ and $P_{Atm\ t0}$ where pressure P is measured in pounds per square inch absolute (PSIA) and t is time.

As indicated in Step 3 of FIG. 96, when requested by the Application Server, the Rover or Standalone Pond-Depth Sensor sends $P_{Roof\ Abs\ t0}$ and $P_{Atm\ t0}$ through (i) an IP Gateway followed by a cellular modem or LAN, (ii) directly through a cellular network, (iii) RF Data Link or (iv) other pathway.

As indicated in Step 4 of FIG. 96, as indicated in Step 1 of FIG. 96, periodically the Rover or Standalone Pond-Depth Sensor pressure sensors read the Rooftop Surface Liquid Pressure and Atmospheric Pressures with values known as $P_{Roof\ Abs\ tn}$ and $P_{Atm\ tn}$ and where n is incremented with time.

As indicated in Step 5 when a nonzero water depth or close to nonzero water depth is detected, the Rover will increase its sampling rate. The sampling rate returns to the normal sampling rate once the water depth has returned to zero or close to zero.

As indicated in Step 6 of FIG. 96, when requested by the Application Server, the Rover or Standalone Pond-Depth Sensor sends $P_{Roof\ Abs\ tn}$ and $P_{Atm\ tn}$ digital packets through (i) an IP Gateway followed by a cellular modem or LAN, (ii) directly through a cellular network, (iii) RF Data Link or (iv) other pathway.

As indicated in Step 7 of FIG. 96, the Rover, Standalone Pond-Depth Sensor or Application Server calculates rooftop ponding water depth in inches, known as $D_{tn}$, using the following equation: $D_{tn}=(P_{Roof\ tn}-P_{Roof\ t0})*27.71$ and drainage rate $DR_{tn}$ using the following equation: $DR_{tn}=((D_{tn-1}-D_{tn})/(t_n-t_{n-1})$ As indicated in Step 8 of FIG. 96, the Rover or Standalone Pond-Depth Sensor saves water depth in inches ($D_{tn}$) and drainage rate in inches/min ($DR_{tn}$) to memory.

As indicated in Step 9 of FIG. 96, the Rover or Standalone Pond-Depth Sensor periodically sends water depth in inches or cm ($D_{tn}$) and drainage rate in inches/min or cm/min ($DR_{tn}$) to the Application Server or when the Application Server request the data.

FIG. 97 shows a plot of (i) the absolute atmospheric pressure and the roof surface pressure measured by a pair of absolute pressure sensors 151 and 152 employed in the pond-depth sensing instrument system of FIG. 95 and operated according to FIG. 96, and (ii) the pond-depth measured and calculated (in inches) by the instrument system over the passage of time, including the occurrence of a rain event, steady atmospheric pressure and no draining.

FIG. 98 shows a plot of (i) the absolute atmospheric pressure and the roof surface pressure measured by a pair of absolute pressure sensors 151 and 152 employed in the pond-depth sensing instrument system of FIG. 95 and operated according to FIG. 96, and (ii) the pond-depth measured and calculated (in inches) by the instrument system over the passage of time, including the occurrence of a rain event, steady atmospheric and slow drain.

FIG. 99 shows a plot of (i) the absolute atmospheric pressure and the roof surface pressure measured by a pair of absolute pressure sensors 151 and 152 employed in the pond-depth sensing instrument system of FIG. 95 and operated according to FIG. 96, and the pond-depth measured and calculated (in inches) by the instrument system over the passage of time, including the occurrence of a rain event, dip in atmospheric pressure and no draining.

FIG. 100 shows a plot of (i) the absolute atmospheric pressure and the roof surface pressure measured by a pair of absolute pressure sensors 151 and 152 employed in the pond-depth sensing instrument system of FIG. 95 and operated according to FIG. 96, and (ii) the pond-depth measured and calculated (in inches) by the instrument system over the passage of time, including the occurrence of a rain event, dip in atmospheric pressure and slow draining.

Specification of the Method for Pond-Depth Measurement According to Method 2 Using A Single Differential Pressure Sensor FIG. 101 describes the steps of a method for pond-depth measurement according to Method 2 illustrated in FIG. 43 using a single differential pressure sensor 158.

As indicated in Step 1 of FIG. 101, the GNSS rovers equipped with Pond-depth sensing instrument are placed in locations of interest on the roof such as near a roof drain, roof scuppers or at other low points in the roof where water might collect.

As indicated in Step 2 of FIG. 101, during dry rooftop conditions the Rover's or Standalone Pond-Depth Sensor's differential pressure sensor 158 reads the Rooftop Surface Liquid Pressure with respect to Atmospheric Pressure with value known as $P_{Roof\ t0}$ where pressure P is measured in pounds per square inch (PSI) and t is time.

As indicated in Step 3 of FIG. 101, when requested by the Application Server, the Rover or Standalone Pond-Depth Sensor sends $P_{Roof\ t0}$ through (i) an IP Gateway followed by a cellular modem or LAN, (ii) directly through a cellular network, (iii) RF Data Link or (iv) other pathway.

As indicated in Step 4 of FIG. 101, periodically the Rover or Standalone Pond-Depth Sensor pressure sensors read the Rooftop Surface Liquid Pressure $P_{Roof\ tn}$ where n is incremented with time.

As indicated in Step 5 of FIG. 101 when a nonzero water depth or close to nonzero water depth is detected, the Rover will increase its sampling rate. The sampling rate returns to the normal sampling rate once the water depth has returned to zero or close to zero.

As indicated in Step 6 of FIG. 101, when requested by the Application Server 12B, the Rover or Standalone Pond-Depth Sensor sends $P_{Roof\ tn}$ through (i) an IP Gateway followed by a cellular modem or LAN, (ii) directly through a cellular network, (iii) RF Data Link or (iv) other pathway.

As indicated in Step 7 of FIG. 101, the Rover, Standalone Pond-Depth Sensor or Application Server 12B calculates rooftop ponding water depth in inches, known as $D_{tn}$, using the following equation: $D_{tn}=(P_{Roof\ tn}-P_{Roof\ t0})*27.71$ and drainage rate $DR_{tn}$ using the following equation: $DR_{tn}=((D_{tn-1}-D_{tn})/(t_n-t_{n-1})$ As indicated in Step 8 of FIG. 101, the Rover or Standalone Pond-Depth Sensor saves the computed water depth in inches ($D_{tn}$) and drainage rate in inches/min ($DR_{tn}$) to memory.

As indicated in Step 9 of FIG. 101, the Rover or Standalone Pond-Depth Sensor periodically sends water depth in inches or cm ($D_{tn}$) and drainage rate in inches/min or cm/min ($DR_{tn}$) to the Application Server or when the Application Server request the data.

Specification of the GNSS Rover Communication and Information Processing Method

FIG. 102 shows a flow chart describing the steps of a GNSS rover communication and information processing method.

As indicated at Step 1 in FIG. 102, the GNSS Rover Receivers automatically acquire multi-band GNSS signals from available GNSS constellations and calculate: Latitude (Lat), Longitude (Long) and Altitude (Alt).

As indicated at Step 2 in FIG. 102, when requested by the Application Server, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated at Step 3 in FIG. 102, the GNSS Rover Receivers or the Application Server 12B request and receive LLA Correction from the Base GNSS Receivers through (i) an IP Gateway followed by a cellular modem or LAN, (ii) directly through a cellular network, (iii) RF Data Link or (iv) other pathway.

As indicated at Step 4 in FIG. 102, the GNSS Rover Receivers or Application Server 12B calculate corrected position known as $LLA_{Rover\ Corrected}$ by using $LLA_{Rover\ Uncorrected}$ and LLA Correction using the following equations:

$$Lat_{Rover\ Corrected}=Lat_{Rover\ Uncorrected}+\text{Lat Correction}$$

$$Long_{Rover\ Corrected}=Long_{Rover\ Uncorrected}+\text{Long Correction}$$

$$Alt_{Rover\ Corrected}=Alt_{Rover\ Uncorrected}+\text{Alt Correction}$$

As indicated at Step 5 in FIG. 102, $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway and processing the received GNSS signals locally or remotely to automatically determine the occurrence of spatial displacement, distortion and/or deformation of the system being spatially monitored over time.

As indicated at Step 6 in FIG. 102, the Rovers 6, 6', 6" and Bases 8 save and send Auxiliary Sensor Data including: snow and ponding depth, wind speed, solar panel heading/current, station pitch/roll, temperature and camera images, shown in FIG. 95, to the Application Server 12B through (i)

an IP Gateway followed by a cellular modem or LAN, (ii) directly through a cellular network, (iii) RF Data Link or (iv) other pathway.

Specification of a GNSS System Network of the Present Invention Deployed and Operating on a Building Structure Having a Roof Surface, Wherein Each GNSS Rover System is Realized as a Surface-Mounted Rover Device and Employs an Integrated Pond-Depth Sensing Instrument Using Absolute Pressure Sensors FIGS. 103A, 103B, 103C and 103D show a building structure 2 having a roof surface 2A upon which the GNSS system network of the present invention is deployed and operating. As shown, each GNSS rover system (e.g. unit or module) 1301 is realized as a surface-mounted rover device and employs an integrated pond-depth sensing instrument using absolute pressure sensors 152, 151 as shown in FIGS. 42A and/or 42B, and typically mounted nearby a roof drain 34 or scupper 34A to automatically and continuously or periodically monitor the rooftop drain or scupper region 34, 34A for possible pooling of rainwater.

FIG. 103C shows one GNSS surface-mounted rover device 1301 deployed in FIGS. 103A and 103B, mounted in the vicinity of a rooftop drain or scupper 34 and capable of monitoring and measuring the pond-depth of rainwater collected in the monitoring range of the surface-mounted rover device 1301.

FIG. 103D shows the base component 1301A of the GNSS surface-mounted rover device 1301 being removed from its snap-type mounting cradle 1302 in the vicinity of a rooftop drain or scupper 34 and capable of monitoring and measuring the pond-depth of rainwater collected in the monitoring range of the surface-mounted rover device. Removal of device 1301A from its roof-mounted mounting cradle 1302 is to enable simple testing and calibration as shown in FIGS. 106A, 106B AND 106C, or for servicing and/or replacement as the case may be.

FIGS. 104A and 104B show the GNSS rover system 1300 provided with an integrated in housing pond-depth sensing instrument as shown in FIG. 42, using the method M1, comprising: a GNSS controller portion having a waterproof lower housing; a PC board; an antenna element 121B 122B; an antenna cover 1319; test depth mark 210; and marker pole 1321 and marker flag 1322.

FIG. 104C shows the GNSS rover system in FIG. 106A provided with an integrated in housing pond-depth sensing instrument, its antenna tube 1319, a dipole antenna 121B 122B, marker flag staff bushing 1320, flexible marker flag staff 1321 made from metal, fiberglass or plastic and marker flag 1322.

FIGS. 104C, 104F, 104G and 104J show the GNSS rover system 1301 as comprising a collection of components, namely: an upper housing portion 1316 having a display aperture and apertures for buttons; a lower housing portion 1304 with a reservoir 1338 for receiving a pressure sensing assembly formed around the solid-state pressure sensor 152 mounted on PC board 1309 and surrounded around antifreeze liquid 1306 enclosed between a double-sided tape disk or adhesive layer 1308 on the PC board 1309 and a pressure membrane 1305, with a spacer disc 1307, disposed between the layer 1308 and pressure membrane 1305; a sealing gasket 107A; a solar panel 129 connected to a battery power module 128 for powering components on the PC board 1309; a user display 1314 connected to the PC board 1309 for viewing through the aperture formed in the upper housing portion 1316; a multiband GNSS antenna 124B operably connected to a multiband GNSS receiver 124, data transceivers 121A, 122A, and microprocessor 125, pushbutton tactile switches 1310, supported on the PC board 1309. A display panel laminate 1317 with printed graphics is mounted on the top surface of the upper housing portion 1316 as shown in GIGS. 104C and 104I.

As shown in FIGS. 104I and 104H, the lower housing 1304 is releasably supported within the base cradle 1302 with its flexible arms engage the upper and lower housing sections of the unit 1301A. As shown, the base cradle 1302 is mounted to the roof surface using double side tape, mastic putty or adhesive 1303 to bond the cradle base 1302 to the roof deck 2A.

As shown in FIG. 104J, the rubber membrane 1305 keeps dirt and debris from clogging the opening of the pressure sensor 152. Antifreeze fluid 1306 fills the void reservoir bounded by the membrane 1305, spacer disk 1308 and PC board 1309. As shown, the membrane 1305 is “top hat” shaped. The flange of the top hat is sandwiched between the controller housing 1304 and the double sided adhesive tape 1307. The spacer disk 1308 reduces fluid volume and is shaped to help purge air through the center hole 1307A while antifreeze fluid 1306 is filled from above, before the PC board 1309 is lowered into place onto of the double sided tape strip 1307. As shown in FIG. 104J, the presence of water on the roof deck 2A applies hydrostatic pressure to the bottom of the rubber membrane 1305, which via the antifreeze. Since the rubber membrane is inherently flexible, hydrostatic pressure readily transfers to the incompressible antifreeze fluid above and consequently to the pressure sensor 152. The double sided tape blocks water from entering the internal volume of the controller 1301A.

As shown in FIG. 104D, by depressing the Power Button 1336 and Menu Selection Button 1337, the display cycles through outputs such as water depth, battery level, solar charging level, radio signal strength (RSSI), a solar panel and user display.

As shown in FIGS. 104C, 104F, 104I and 104J, grooves 1339 are formed in the support base 1302 to allow the flow of water in and out from beneath the solid-state pressure sensor 152 mounted on the bottom surface of the PC board 1309.

As shown in FIGS. 104E and 104G, grooves 1339 in cradle base 1302 and passages 1338 in lower housing portion 1304 allow the free flow movement of liquid water towards the pressure sensor 152.

In FIG. 105A, the GNSS rover system 1301 is provided with a camera housing 1301B mounted on top of the antenna tube 1319. As shown, the camera housing 1301B comprises: a housing lid 1323; a lower housing 1324; camera view ports 1325; and a marker flag 1321 1322. The test depth mark 210 is used for functional testing of the Rover 1301. PC board 1327 supports CCD or CMOS cameras 1326 with image formation optics that peer through view ports 1325 when the PC board 1327 is mounted in housing 1324 with top housing cover 1323 mounted with its antenna element 1321 through port 1323'.

FIG. 105F shows the upper camera housing 1301B being mounted on top of the antenna tube 1319, with camera view ports 1325, printed circuit board 1327 supporting cameras 1326 and data communications antenna 121B 122B, mounted within the housing 1327. As shown in FIGS. 105F and 105G, a marker flag socket 1323' and marker flag staff 1321 are mounted on the.

FIG. 105G shows the upper camera housing 1301B mounted on top of the antenna tube 1319. The housing 1324 comprises: camera view ports 1325; atmospheric pressure port 1313; and a time of flight range finder sensor aperture. Inside the housing is a printed circuit board 1327 supporting cameras 1326, pressure sensor 151 for atmospheric reference, "time of flight" (ToF) IR laser range finder 1328 for measuring the snow depth on the roof surface and an alternative to water depth measurement.

FIG. 106A shows a perspective view of the GNSS rover system provided with an integrated in housing pond-depth sensing instrument as shown in FIG. 42, using the method M1, comprising a GNSS controller portion 1301 having a waterproof lower housing, a PC board, an antenna element, an antenna cover and marker flag being lifted from the roof surface 2A connection base next to bucket of water 1332 to be used for testing system performance and operation.

FIG. 106D shows one GNSS surface-mounted rover device 1301 shown deployed in FIGS. 105A and 105B, mounted to its support base 1302 that is mounted to base plate 1334 held to the roof using an object, such as a brick 1335, when it is not possible to directly affix the support base to the roof deck 2A. FIG. 106E shows one GNSS surface-mounted rover device 1301 deployed in FIGS. 105A and 105B, comprising: a support base 1302, a base plate brick 1335 and roof deck 2A. FIG. 106F shows one GNSS surface-mounted rover device deployed in FIGS. 105A and 105B, while removed from the support base for testing or replacement.

As shown in FIG. 7, the GNSS system network 1300 comprises: (i) a cloud-based TCP/IP network architecture with a plurality of GNSS satellites 4 transmitting GNSS signals towards the earth and objects below; (ii) a plurality of GNSS rovers 6 (i.e. 1301) mounted on the rooftop surface of building for receiving and processing transmitted GNSS signals during monitoring, sampling water pressure to determine ponding depth and sampling air pressure locally or remotely for making corrections due to changes to atmospheric pressure; (iii) one or more client computing systems 9 for transmitting instructions and receiving alerts and notifications and supporting diverse administration, operation and management functions on the system network; (iv) a cell tower 10 for supporting cellular data communications across the system network 1300; and (v) a Data Center(s) 12 supporting Web Servers 12A, Application Servers 12B, Database 12C and Datastore Servers 12C, and SMS/text and email servers 12D.

Specification of Method of Testing Water Ponding Pressure Sensing Mode of the GNSS Rover System of the Present Invention FIGS. 106A and 106B show the GNSS rover system 1301, with its base unit 1301A and pressure sensing tube 210 removed from the roof mounting support base 1302. In FIG. 106C, the base unit 1301A and pressure sensing tube 1319 is placed in the bucket of water 1332 to be used for testing, near a roof drain 34 and support base structure on the roof deck 2A.

FIG. 106C shows a side cross-sectional view of the GNSS rover system 1301 showing the upper unit 1301A and pressure sensing tube 1319 removed from the roof mounting base 1302 and placed in the bucket of water 1332 during testing, located alongside a roof drain 34 and the support base structure 207 on the roof deck 2A.

As shown in FIGS. 108A and 108B, the steps of a test procedure is disclosed for use with GNSS rover system in FIG. 49 and elsewhere throughout herein.

As indicated at Step 1 in FIG. 108A, the User presses the Power Button on the Rover 1301A to wake up the unit from Sleep Mode.

As indicated at Step 2 in FIG. 108A, the User presses the Mode Button on Rover 1301A to enter the unit into Test Mode.

As indicated at Step 3 in FIG. 108A, the User removes the Rover 1301A from its support base structure 1302.

As indicated at Step 4 in FIG. 108A, the User lowers the Rover 1301A into a ½ full bucket of water, and adjusts the water until it reaches a predetermined height (e.g. 4 inches) indicated by the Test Depth Mark 210 on the Antenna Tube 121A, 121A or Support Mast 1319 of the Rover 1301A.

As indicated at Step 5 in FIG. 108A, the User presses the Mode button on the Rover 1301A to initiate sampling the water depth pressure sensor 152 known as $P_{PRES\ SENSOR}$.

As indicated at Step 6 in FIG. 108A, the Rover '30' obtains the atmospheric pressure known as $P_{ATM}$ by one of the following (i) sampling the Rover's atmospheric pressure sensor 152, (ii) requesting the atmospheric pressure from the Data Center.

As indicated at Step 7 in FIG. 108A, the Rover calculates the water depth know as H using:

$$H = \frac{P_{LIQUID}}{\rho_{WATER}}$$

$$P_{LIQUID} \approx P_{ATM+LIQUID} - P_{ATM}$$

$$P_{ATM+LIQUID} \approx P_{PRES\ SENSOR}$$

As indicated at Step 8 in FIG. 108B, the Rover outputs the calculated water depth on the Rover's display for the User.

As indicated at Step 9 in FIG. 108B, the Rover sends the calculated water depth data to the Application and Database Servers.

As indicated at Step 10 in FIG. 108B, the Application Server compares calculated water depth to predetermined minimum and maximum values to determines if the Rover's operation has passed or failed.

As indicated at Step 11 in FIG. 108B, the Application Server (i) records the Pass/Fail status, date and time of the test in the Database, (ii) indicates the Pass/Fail status of the sensor on the Web App.

As indicated at Step 12 in FIG. 108B, the Application Server sends the Pass/Fail status to the Rover.

As indicated at Step 13 in FIG. 108B, the Rover outputs the Pass/Fail status on the Rover's display.

As indicated at Step 14 in FIG. 108B, if the Rover passes the test the User returns the Rover 1301A to the Structural Support Base 1302.

As indicated at Step 15 in FIG. 108B, if the Rover fails the test the User takes further action to resolve the problem.

Specification of Monitoring Drain Response Using System of Present Invention Operating in Ponding Monitoring and Alert Mode FIG. 109A shows a graphical representation of the pond-depth measured and calculated (in inches) in the pond-depth sensing instrument system of FIGS. 104A and 105A and operated by the instrument system over the passage of time, including the occurrence of a rain event, values below the safe water depth limit, inactive ponding depth alert status and inactive slow draining alert status.

FIG. 109B shows a graphical representation of the pond-depth measured and calculated (in inches) in the pond-depth sensing instrument system FIGS. 104A and 105A and operated by the instrument system over the passage of time, including the occurrence of a rain event, values above the safe water depth limit, active ponding depth alert status and inactive slow draining alert.

FIG. 109C shows a graphical representation of the pond-depth measured and calculated (in inches) in the pond-depth sensing instrument system of FIGS. 104A and 105A and operated by the instrument system over the passage of time, including the occurrence of a rain event, values below the safe water depth limit, inactive ponding depth alert status and active slow draining alert.

Specification of the GNSS Base Controller of the Present Invention Deployed for Monitoring Deflection and/or Displacement FIGS. 110A, 110B and 110C shows a GNSS base station 8 as deployed in FIGS. 1 and 8, comprising: a GNSS controller portion 180 having a base housing; a PC board 183 with antenna element 183A and pressure sensors 136, 137 and other components represented in FIG. 111C; upper housing with antenna cover 185A; and a hollow support pole 190 mounted to a base housing 195.

FIG. 111A shows a building structure 2 in which the GNSS system network of the present invention is deployed for monitoring deflection and/or displacement. As shown, the GNSS base station 2B is shown mounted external to the building on a stationary region of the building 2, in capable of movement or deflection.

FIG. 111B shows a building structure in which the GNSS system network of the present invention is deployed for monitoring deflection and/or displacement. As shown, the GNSS base station 8 is shown mounted external to the building on a stationary region of the building 2, using a set of deep threaded mounting bolts 196 driven into the stationary region 2B, to prevent movement or deflection.

FIG. 111C shows a GNSS base station system 8 deployed on the GNSS system network of the present invention depicted in FIG. 82. As shown, the GNSS base station system 8 comprises, within the GNSS base controller housing 180: (i) radio signal subsystems supporting (a) internet data flow using a cellular transceiver (XCVR) 121A with antenna 121B and an internet gateway transceiver (XCVR) 122A with antenna 122B, (b) RTK position correction data flow using base to rover radio signal transceivers 123A and antenna 123B, and (c) GNSS signal reception using multi-band GNSS transceivers 124A with antenna 124B; (ii) a programmed microprocessor 125 and supporting memory architecture 126, provided with a user I/O interface 127; battery power module 128; a solar PV panel and charge controller 129; and (iii) an array of ancillary sensors (131D0 including, but not limited to, snow pressure sensors 132, snow depth sensor 133, wind-speed sensor 134, digital cameras 135, roof-surface liquid pressure sensor 136, atmospheric pressure sensor 137, drain freeze sensor 138, temperature and humidity sensors 139, 3-axis accelerometers 140, and electronic compass instrument 141 configured and arranged for computing corrected GNSS signals and determining the position of the GNSS base station 8 relative to a global reference system, and determining differential displacement of the GNSS rover over time as determined by the spatial measurement engine of the present invention 120 schematically depicted in FIG. 26, and further including external sensors including a snow pressure sensor 132 and a drain freeze sensor 138.

FIG. 112A shows a set of GNSS rover units 8 are deployed on the building rooftop 2A, wherein one GNSS base unit 8 is assigned as active primary base unit communicating with the other GNSS rover units. One GNSS rover unit is assigned as a GNSS rover and a secondary inactive GNSS base (backup) unit in accordance with the principles of the present invention.

FIG. 112B shows the set of GNSS rover units 8 are deployed on the building rooftop 2A, wherein the first GNSS base unit 8 has been disabled, and the backup GNSS rover unit 8 has been assigned as an active secondary GNSS base unit, communicating with the GNSS rover units, in accordance with the principles of the present invention.

Specification of the Method of Base Communication and Information Processing Carried Out by an Active GNSS Base Station According to the Principles of the Present Invention FIG. 113 describes the primary steps of the method of base communication and information processing carried out by an active GNSS base station 8 according to the principles of the present invention, generating and transmitting LAT, LONG and ALT Correction offsets to the GNSS rovers units mounted on the building.

As indicated at Step 1 of FIG. 113, the GNSS Base Receivers, automatically acquire multi-band GNSS signals from available GNSS constellations and creates a dataset of: Latitude (Lat), Longitude (Long) and Altitude (Alt). The process continues for hours or days.

Step 2: As indicated at Step 2 of FIG. 113, the GNSS Base Receivers 6A use the $LLAT_{Base\ Uncorrected}$ dataset to calculate a precise Latitude, Longitude and Altitude.

As indicated at Step 3 of FIG. 113, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

As indicated at Step 4 of FIG. 113, the GNSS Rover Receivers or the Application Server 2B request and receive LLA Correction from the Base GNSS Receivers through (i) an IP Gateway followed by a cellular modem or LAN, (ii) directly through a cellular network, (iii) RF Data Link or (iv) other pathway, and processing the received GNSS signals locally or remotely to automatically determine the occurrence of spatial displacement, distortion and/or deformation of the system being spatially monitored over time.

As indicated at Step 5 of FIG. 113, the Rovers and Bases save and send Auxiliary Sensor Data including: snow and ponding depth, wind speed, solar panel heading/current, station pitch/roll, temperature and camera images, shown in FIG. 110, to the Application Server through (i) an IP Gateway followed by a cellular modem or LAN, (ii) directly through a cellular network, (iii) RF Data Link or (iv) other pathway.

Specification of Client Computer Systems Deployed on Each GNSS System Network of the Present Invention FIGS. 114 and 115 show a tablet-type client computer system 9B and a mobile phone type client computer system 9C, respectively, each having a touch-screen GUI and deployed on each GNSS system network of the present invention disclosed and taught herein. As shown in FIG. 116, the laptop-type client computer system 9C comprises a keyboard interface and GUI display screen. Collectively, these client computing systems 9A, 9B and 9C are indicated by reference number 9 in the patent Drawings.

FIG. 117 shows the general system architecture of any mobile client system 9 for use on the system network of the present invention. As shown, the system 9 comprises: a Processor(s) 54; a Memory Interface 52; Memory 100 for storing Operating System Instructions, Electronic Messaging Instructions, Communication Instructions, GUI Instructions, Sensor Processing Instructions, Phone Instructions, Web Browsing Instructions, Media Processing Instructions, GPS/Navigation Instructions, Camera Instructions, Other Software Instructions, and GUI Adjustment Instructions; Peripherals Interface 256; Touch-Screen Controller 92; Other Input Controller(s) 94; Touch Screen 96; Other Input/Control Devices 98; I/O Subsystem 99; Other Sensor(s) 66; Motion Sensor 60; Light Sensor 62; Proximity Sensor 64; Camera Subsystem 70; Wireless Communication Subsystem(s) 74; and Audio Subsystem 77 supported by speakers 78 and microphones 80.

Specification of Services for Specific User Groups Enabled on the System Network of the Present Invention FIG. 118 lists the Services for Specific User Groups enabled on the System Network of the present invention. As shown, the list of services comprises: services available to administrators, managers, responders, and viewers, selected from the group of services consisting of (i) setup system, (ii) manage stations, (iii) initiate system test, (iv) enable system, (v) initiate communications, (vi) view station status and monitor data for: ponding, rooftop and ground-based imaging, deflection and displacement measurements, snow pressure, wind speed, temperature and structural vibrations, (vii) receive alerts and notifications, respond and report, (viii) define administrator.

Specification of Method of Setting Up the System Network of the Present Invention in any Given Deployment Environment FIG. 119 describes the primary steps involving in a preferred method of setting up the system network of the present invention in any given deployment environment. As shown, the method comprising the steps of: (a) defining company (e.g. address, email, phone # and business contact); (b) defining monitoring class (e.g. buildings, bridges, natural structures (e.g. hillsides, glacier, etc.); (c) defining Class Locations (e.g. address, lat/log.); (d) defining Zones (e.g. creating zone regions and deflection/deformation/movement limits; (e) defining users (e.g. names, email, number, access level, privileges, affiliation, roles, alert preferences); (f) defining administrators (e.g. only done by Administrators); and (g) defining data parameters (e.g. units of measure, simple moving averaging (SMA), length, etc.).

Specification of the Method of Setting Up System on the System Network of the Present Invention FIG. 120 shows a graphical user interface (GUI) used during the method of system set-up for Company/Class/Location, as depicted in FIG. 119. As shown, the GUI illustrates various graphical icons and objects supporting various end-user functions including, for example, set up system, managing stations, testing system, enabling systems/communications, viewing conditions/status, setting alerts/responses, and managing company/class/location, data parameters and zones. As shown in FIG. 120, an exemplary company "RRG" has been named and its location has been specified along with its class.

FIG. 121 shows a graphical user interface (GUI) used during the method of system set-up for Zones, as depicted in FIG. 119. As shown, the GUI illustrates various graphical icons and objects supporting various end-user function including, for example, set up system, managing stations, testing system, enabling systems/communications, viewing conditions/status, setting alerts/responses, and managing company/class/location, data parameters and zones. The zone of an exemplary building has been specified using the GUIs tools supported on the platform in the illustrated embodiment the zone is specified in terms of name, region and warning limits however it is understood that other parameters may be used to specify a Zone on the platform.

FIG. 122 shows a graphical user interface (GUI) used during the method of system setup for Zones as depicted in FIG. 121. As shown, the GUI illustrates various graphical icons and objects supporting various end-user function including, for example, setup system, managing stations, testing system, enabling systems/communications, viewing conditions/status, setting alerts/responses, and managing company/class/location, data parameters and zones. As shown in FIG. 122, multiple zones can be configured with unique characteristics.

FIG. 123 shows a graphical user interface (GUI) used during the method of system set-up for Users, as depicted in FIG. 119. As shown, the GUI illustrates various graphical icons and objects supporting various end-user function including, for example, setup system, managing stations, testing system, enabling systems/communications, viewing conditions/status, setting alerts/responses, and managing company/class/location, data parameters and zones. As shown in FIG. 123, usernames, contact information and alert notifications are entered.

FIG. 124 shows a graphical user interface (GUI) used during the method of system set-up for Data Parameters as illustrated in FIG. 119. As shown, the GUI illustrates graphical icons and objects supporting various end-user function including, for example, setup system, managing stations, testing system, enabling systems/communications, viewing conditions/status, setting alerts/responses, and managing company/class/location, data parameters and zones. As shown in FIG. 124, Data Parameters are specified controlling position averaging and sampling and data transmission intervals.

Specification of the Method of Managing Stations Deployed on the System Network of the Present Invention FIG. 125 describes the method of managing stations deployed on the system network of the present invention. As shown, the method comprises the steps of: (a) Assigning a Base or Rover, (b) Defining Operating Parameters (e.g. Sample Rate, RF Power Levels, Health Thresholds); (c) Initiating Firmware Updates; and (d) Initiating Resets.

FIG. 126 shows a graphical user interface (GUI) used during the method of managing stations, involving assignment of stations, as illustrated in FIG. 125. As shown, the GUI illustrates various graphical icons and objects supporting various end-user function including, for example, setup system, managing stations, testing system, enabling systems/communications, viewing conditions/status, setting alerts/responses, and managing company/class/location, data parameters and zones. As shown in FIG. 126, station names are specified along with Base or Rover assignment.

FIG. 127 shows a graphical user interface (GUI) used during the method of managing stations, involving defining parameters/updates and resets, as illustrated in FIG. 125. As shown, the GUI illustrates various graphical icons and objects supporting various end-user function including, for example, setup system, managing stations, testing system, enabling systems/communications, viewing conditions/status, setting alerts/responses, and managing company/class/location, data parameters and zones. As shown in FIG. 127, stations can be marked for reset and firmware updates along with setting other operational parameter.

Specification of the Method of Initiate System Testing on the System Network of the Present Invention FIG. 128 describes the steps carried out the method of initiate system testing on the system network of the present invention. As shown, the method comprises the steps of: (a) Calibrating and Test Deflection and Displacement Sensor;

(b) Calibrating and Test Pond-Depth Sensor; (c) Testing the Alert, Response and Reporting System; and (d) Testing the User Messaging System.

FIG. 129 shows a graphical user interface (GUI) used during the method of set-up for system test involving calibrate and test as illustrated in FIG. 128. As shown, the GUI illustrates various graphical icons and objects supporting various end-user function including, for example a graphical user interface (GUI) used during the method of set-up illustrated in FIG. 128, illustrating various graphical icons and objects supporting various end-user function including, for example, setup system, managing stations, testing system, enabling systems/communications, viewing conditions/status, setting alerts/responses, and managing company/class/location, data parameters and zones. As shown in FIG. 129, stations can be put into test mode to confirm a specified movement initiated by the user without triggering accidental alert notifications to users.

FIG. 130 shows a graphical user interface (GUI) used during the method of system test involving alert and reporting test as illustrated in FIG. 128. As shown, the GUI illustrates various graphical icons and objects supporting various end-user function including, for example, setup system, managing stations, testing system, enabling systems/communications, viewing conditions/status, setting alerts/responses, and managing company/class/location, data parameters and zones. As shown in FIG. 130, user contact information is displayed, system test messages are composed and message recipients are identified.

Specification of Method of Enabling System and Initiating Communications on the System Network of the Present Invention FIG. 131 describes a method of enabling system and initiating communications on the system network of the present invention. As shown, the method comprises the steps of: (a) Enabling/Disabling System; and (b) Messaging Users (email, text, web and mobile apps).

FIG. 132 shows a graphical user interface (GUI) used during the method of enabling systems and communications as illustrated in FIG. 131. As shown, the GUI illustrates various graphical icons and objects supporting various end-user function including, for example, setup system, managing stations, testing system, enabling systems/communications, viewing conditions/status, setting alerts/responses, and managing company/class/location, data parameters and zones. As shown in FIG. 132, user contact information is displayed, messages are composed informing users that the system is enabled and they are selected to receive alerts.

Specification of a Method of View Structural Conditions and Station Status on the System Network of the Present Invention FIG. 133 describes a method of view structural conditions and station status on the system network of the present invention. As shown, the method comprising the steps of: (a) Viewing Current Values Table; (b) Viewing Location-wide Heat Map (Choose parameters to display such as: deflection or displacement (X,Y,Z), snow pressure, snow depth, ponding depth, vibrations, etc. for a building, bridge or natural structure); (c) Viewing Data Graphs (Choose parameter and time/date range); (d) Viewing Still Images and Video; (e) Viewing Station Status; and (f) Exporting Data.

FIG. 134 shows a graphical user interface (GUI) used during the method of viewing conditions and status using tables, as illustrated using various graphical icons and objects supporting various end-user functions. As shown in FIG. 134, tabularized data is displayed and includes Deflection, Alert Level, Zone Location and Deflection Limit assigned to the Zone.

Figure 135A:
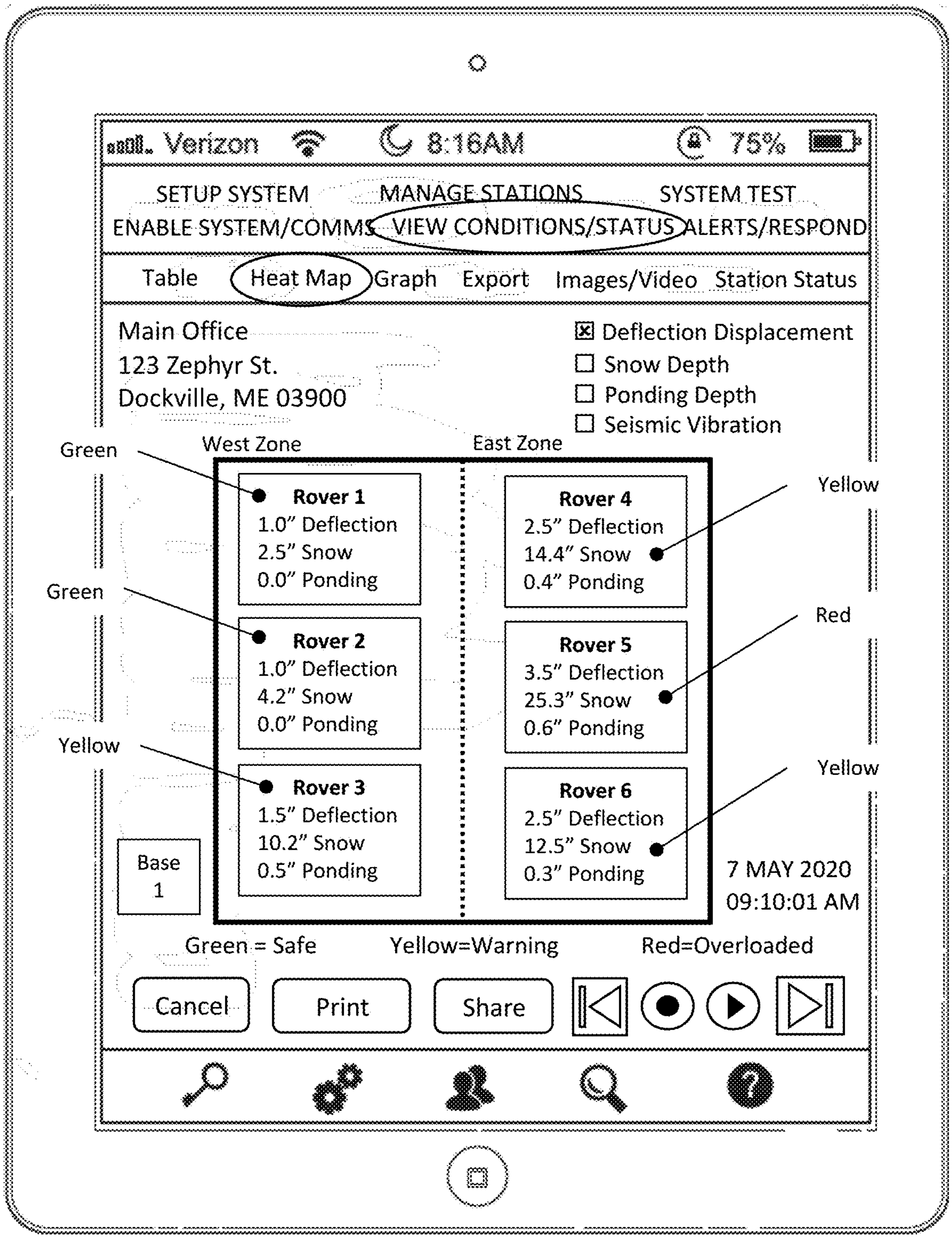

FIGS. 135A, 135B1, 135B2 and 135B3 shows a graphical user interface (GUI) used during the method of viewing conditions and status using heat map as illustrated. As shown in FIG. 135A data including but not limited to Deflection, Snow and Ponding Depth and Seismic activity is displayed. Deflection is shown in the form of a color indexed heat map. Historical data can be reviewed using the play, stop, cue forward and cue back buttons. Images can be digitally shared, printed or viewed collectively as a video such as the water impoundment failure example shown in FIG. 135B1, FIG. 135B2 and FIG. 135B2.

FIG. 136 shows a graphical user interface (GUI) used during the method of viewing conditions and status using heat map as illustrated. As shown in FIG. 136 data including but not limited to Deflection, Snow and Ponding Depth is displayed. Snow Depth is shown in the form of a color indexed heat map.

FIG. 137 shows a graphical user interface (GUI) used during the method of viewing conditions and status using heat map illustrated. As shown in FIG. 137 data including but not limited to Deflection, Ponding Depth and Drainage Rate Status is displayed. Ponding Depth and Drainage Rate are shown in the form of a color indexed heat map.

FIG. 138 shows a graphical user interface (GUI) used during the method of viewing conditions and status using heat map illustrated. As shown in FIG. 138 data including but not limited to Deflection, Snow and Ponding Depth is displayed. Seismic Vibration is shown in the form of a color indexed heat map.

FIG. 139 shows a graphical user interface (GUI) used during the method of viewing conditions and status using a graph illustrated. As shown in FIG. 139 historical data including but not limited to Deflection, Snow and Ponding Depth and Seismic activity is displayed in graphical form.

FIG. 140 shows a graphical user interface (GUI) used during the method of viewing conditions and status using images/video as illustrated. As shown in FIG. 140, an exemplary location "Main Office", Station "Rover 2", Camera "East" has been selected to display a view of the roof top. Timestamped previously recorded images can be viewed FIG. 141 shows a graphical user interface (GUI) used during the method of viewing conditions and status using images/video as illustrated. As shown in FIG. 140, an exemplary location "Main Office", Station "Rover 2", Camera "East" has been selected to display a video of the roof top. Movements within the camera view can be used to trigger video recording.

Specification of the Method of Receiving Alerts and Notifications, Responding and Reporting on the System Network of the Present Invention FIG. 142 describes the steps of the method of receiving alerts and notifications, responding and reporting on the system network of the present invention. As shown, the method comprises the steps of: (a) enabling Alerts of monitoring rooftop events where thresholds have been exceeded and define required Responses; (b) viewing Alert and Response Status; (c) creating and Submit Plans and Reports; and (d) receiving and Respond to Alerts and Notifications.

FIG. 143 shows a graphical user interface (GUI) used during the method of alerts/response setup/enable as illustrated. As shown in FIG. 143, when Alert and Notifications are enabled, Responders can be sent requests for Alert acknowledgement and submissions of a Site Investigation Plan, Risk Mitigation Plan and Risk Mitigation Report.

Managers can be sent requests to approve Site Investigation and Risk Mitigation Plans, and to acknowledge project completion.

FIG. 144 shows a graphical user interface (GUI) used during the method of alerts/response status as illustrated. As shown in FIG. 144, the real time status of the various stages of the alert, planning and reporting system are displayed. Alerts, plans and reports can be also be accessed from this page.

FIG. 145 shows a graphical user interface (GUI) used during the method of alerts/response in plans and reports as illustrated. As shown in FIG. 145 an exemplary Site Investigation Plan has been composed and is ready for submission.

FIG. 146 shows a graphical user interface (GUI) used when the system sends out a notification to an end-user that a system alert has been generated and requires a user response to specific rooftop snow loading condition at a particular location on a specific building rooftop.

FIG. 147 shows a graphical user interface (GUI) used when the system sends out a notification to an end-user that a system alert has been generated and requires a user response to specific rooftop ponding condition at a particular location on a specific building rooftop.

FIG. 148 shows a graphical user interface (GUI) used when the system sends out a notification to an end-user that a system alert has been generated and requires a user response to specific seismic activity condition at a particular location.

Specification of the Method of Communication and Information Processing Supported on the First Illustrated Embodiment of the System Platform of the Present Invention FIGS. 150A, 150B and 150C describe a method of communication and information processing supported on the first illustrated embodiment of the system platform of the present invention.

As indicated at Step 1 of FIG. 150A, the Administrator registers buildings to be monitored in the GNSS system network Database of a System for automatically detecting structural movement and/or displacement beyond predetermined thresholds and generating notifications and/or alarms to administrators and/or managers of the building, where the system comprises (i) a plurality of GNSS Rover Units (GNSS Rovers) installed at locations on the building and operably connected to the TCP/IP infrastructure of an wireless communication network ("Network") to provide position using GNSS Rover Receivers and auxiliary sensor data. (ii) at least one GNSS Base Station installed on or about the measurement site operably connected to the GNSS system network, to provide position error correction data using GNSS Base Receivers (iii) one or more mobile computing systems operably connected to the GNSS system network, each supporting Web Application, and (iv) a remote Data center supporting Web, Application and Database Servers operably connected to the GNSS system network to provide a remote user web interface, perform calculations, and read/write and process data.

As indicated at Step 2 of FIG. 150A, the Administrator creates virtual geolocated zones with similar deflection or movement limits and registers them in the Database.

As indicated at Step 3 of FIG. 150A, the Administrator registers alert thresholds in the Database for each virtual zone based upon acceptable structural deflection and/or displacement.

As indicated at Step 4 of FIG. 150A, as shown in FIG. 8, constellations of GNSS satellites send time and satellite position data continuously.

As indicated at Step 5 of FIG. 150A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated at Step 6 of FIG. 150A, the GNSS Base Receivers use the $LLAT_{Base\ Uncorrected}$ dataset to calculate a precise Latitude, Longitude and Altitude.

As indicated at Step 7 of FIG. 150B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers through an RF Data Link.

As indicated at Step 8 of FIG. 150B, the GNSS Rover Receivers automatically acquire multi-band GNSS signals from available GNSS constellations and calculate: Latitude (Lat), Longitude (Long) and Altitude (Alt).

As indicated at Step 9 of FIG. 150B, the GNSS Rover Receivers request and receive LLA Correction from the Base GNSS Receivers through an RF Data Link.

As indicated at Step 10 of FIG. 150B, GNSS Rover Receivers calculate corrected position known as, $LLA_{Rover\ Corrected}$ by using $LLA_{Rover\ Uncorrected}$ and LLA Correction using the following equations:

$$Lat_{Rover\ Corrected}=Lat_{Rover\ Uncorrected}+\text{Lat Correction}$$

$$Long_{Rover\ Corrected}=Long_{Rover\ Uncorrected}+\text{Long Correction}$$

$$Alt_{Rover\ Corrected}=Alt_{Rover\ Uncorrected}+\text{Alt Correction}$$

As indicated at Step 11 of FIG. 150B, the data processed in the GNSS Rover Receivers is saved to memory then transmitted to the Application Server through an IP Gateway followed by the LAN.

As indicated at Step 12 of FIG. 150C, the Rovers and Bases save and send Auxiliary Sensor Data including: snow and ponding depth, wind speed, solar panel heading/current, station pitch/roll, temperature and camera images, shown in FIG. 20, to the Application Server through an IP Gateway followed by the LAN.

As indicated at Step 13 of FIG. 150C, the Application Server saves the $LLA_{Rover\ Corrected}$ data and Auxiliary Sensor Data to the Database.

As indicated at Step 14 of FIG. 150C, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as $LLA_{SMA\ t}$.

As indicated at Step 15 of FIG. 150C, the Application Server sends and Auxiliary Sensor Data to the Web App for display on mobile and/or desktop computing devices.

As indicated at Step 16 of FIG. 150C, Processing the received GNSS signals locally or remotely to automatically determine the occurrence of spatial displacement, distortion and/or deformation of the system being spatially monitored over time, and when spatial displacement, distortion and/or deformation thresholds are met or exceeded, the Application Server automatically sends email and/or SMS alerts and/or notifications to registered Users over the GNSS system network.

As indicated at Step 17 of FIG. 150C, when the structural movements have returned to below alert thresholds, the Application Server automatically sends email and SMS alerts and/or notifications to registered users.

Specification of the Method of Communication and Information Processing Supported on the Second Illustrated Embodiment of the System Platform of the Present Invention, Employing RTK Correction Processing at the GNSS Rovers Systems FIG. 151 shows the second embodiment of the GNSS-based system network of the present invention 200 deploying a plurality of rover stations and an onsite base station on a building being monitored by the GNSS system network As shown, the GNSS system network 200 comprises: (i) a cloud-based TCP/IP network architecture with a plurality of GNSS satellites 4 transmitting GNSS signals towards the earth 5 and objects and systems moving thereabouts; (ii) a plurality of GNSS rovers 6 of the present invention mounted on the rooftop surface 2A of a building 8 for receiving and processing transmitted GNSS signals during monitoring using time averaging data extraction and spatial derivative processing techniques performed locally or remotely; (iii) one or more GNSS base stations 8 to support RTK correction of the GTSS signals; (iv) one or more client computing systems 9 for transmitting instructions and receiving alerts and notifications and supporting diverse administration, operation and management functions on the system network 200; (v) a cell tower 10 for supporting cellular data communications across the system network; and (vi) a data center 12 supporting web servers 12A, application servers 12B, database and datastore servers 12C, and SMS/text and email servers 12D.

Specification of the GNSS System Network Deployed for Monitoring a Building Rooftop, while Using RTK Correction Data Supplied by the Onsite GNSS Base Station and RTK Correction Processing within Each Deployed GNSS Rover Station for High-Spatial Resolution Accuracy FIG. 152 shows a building on which the GNSS system network 200 of FIG. 151 is deployed for purposes of monitoring the building rooftop, while using RTK correction data supplied by the onsite GNSS base station 8 and RTK correction processing within each deployed rover station 6 for high-spatial resolution accuracy. In FIG. 153, the onsite GNSS base station 8 is shown mounted on the exterior of the building in a highly stationary manner.

Specification of Communication and Information Processing Method Supported on the Second Illustrative Embodiment of the System Platform of the Present Invention FIGS. 154A, 154B and 154C describes the communication and information processing method supported on the second illustrative embodiment of the system platform of the present invention 200.

As indicated at Step 1 of FIG. 154A, the Administrator registers buildings to be monitored in the GNSS system network database of a system network for automatically detecting structural movement and/or displacement beyond predetermined thresholds and generating notifications and/or alarms to administrators and/or managers of the building.

As described, the system comprises: (i) a plurality of GNSS Rover Units (GNSS Rovers) installed at locations on the building and operably connected to the TCP/IP infrastructure of a wireless communication network ("Network") to provide position using GNSS Rover Receivers and auxiliary sensor data; (ii) at least one GNSS Base Station installed on or about the measurement site operably connected to the GNSS system network, to provide position error correction data using GNSS Base Receivers; (iii) one or more mobile computing systems 9 operably connected to the GNSS system network, each supporting Web Application; and (iv) a remote data center supporting Web, Application and Database Servers 12A, 12B and 12C operably connected to the GNSS system network 200 to provide a remote user web interface, perform calculations, and read/write and process data.

As indicated at Step 2 of FIG. 154A, the Administrator creates virtual geolocated zones with similar deflection or movement limits and registers them in the database.

As indicated at Step 3 of FIG. 154A, the Administrator registers alert thresholds in the Database for each virtual zone based upon acceptable structural deflection and/or displacement.

As indicated at Step 4 of FIG. 154A, the constellations of GNSS satellites send time and satellite position data continuously.

As indicated at Step 5 of FIG. 154A, the GNSS Base Receivers, automatically acquire multi-band GNSS signals from available GNSS constellations and creates a dataset of: Latitude (Lat), Longitude (Long) and Altitude (Alt), over a period of time (t). The process continues for hours or days.

As indicated at Step 6 of FIG. 154A, the GNSS Base Receivers use the $LLAT_{Base\ Uncorrected}$ dataset to calculate a precise Latitude, Longitude and Altitude.

As indicated at Step 7 of FIG. 154B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers through an IP Gateway followed by a cellular modem.

As indicated at Step 8 of FIG. 154B, the GNSS Rover Receivers automatically acquire multi-band GNSS signals from available GNSS constellations and calculate: Latitude (Lat), Longitude (Long) and Altitude (Alt).

As indicated at Step 9 of FIG. 154B, the GNSS Rover Receivers request and receive LLA Correction from the Base GNSS Receivers through an RF Data Link.

As indicated at Step 10 of FIG. 154B, the GNSS Rover Receivers calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 11 of FIG. 154B, the data processed in the GNSS Rover Receivers is saved to memory then transmitted to the Application Server through an IP Gateway followed by a cellular modem.

As indicated at Step 12 of FIG. 154C, the Rovers and Bases save and send Auxiliary Sensor Data including: snow and ponding depth, wind speed, solar panel heading/current, station pitch/roll, temperature and camera images, shown in FIG. 40, to the Application Server through an IP Gateway followed by a cellular modem.

As indicated at Step 13 of FIG. 154C, the Application Server saves the $LLA_{Rover\ Corrected}$ data and Auxiliary Sensor Data to the Database.

As indicated at Step 14 of FIG. 154C, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as $LLA_{SMA\ t}$.

As indicated at Step 15 of FIG. 154C, the Application Server sends $LLA_{SMA\ t}$ and Auxiliary Sensor Data to the Web App for display on mobile and/or desktop computing devices.

As indicated at Step 16 of FIG. 154C, the processing the received GNSS signals locally or remotely to automatically determine the occurrence of spatial displacement, distortion and/or deformation of the system being spatially monitored over time, and when spatial displacement, distortion and/o deformation thresholds are met or exceeded, the Application Server automatically sends email and/or SMS alerts and/or notifications to registered Users over the GNSS system network 200.

As indicated at Step 17 of FIG. 154C, when the structural movements have returned to below alert thresholds, the Application Server automatically sends email and SMS alerts and/or notifications to registered users.

Specification of the GNSS-Based System Network of the Third Embodiment of the Present Invention Employing Rover Stations and Onsite Base Station Using Cellular-Based Internet Access for Carrying Out RTK Correction FIG. 155 shows the third embodiment of the GNSS-based system network of the present invention 300 employing rover stations and onsite base station using cellular-based internet access for carrying out RTK correction.

As shown in FIG. 155, the GNSS system network 300 comprises: (i) a cloud-based TCP/IP network architecture with a plurality of GNSS satellites 4 transmitting GNSS signals towards the earth and objects below; (ii) a plurality of GNSS rovers of the present invention 6 mounted on the rooftop surface 2A of building 2 for receiving and processing transmitted GNSS signals during monitoring using time averaging displacement/deflection data extraction processing; (iii) one or more GNSS base stations 8 to support RTK correction of the GTSS signals; (iv) one or more client computing systems for transmitting instructions and receiving alerts and notifications and supporting diverse administration, operation and management functions on the system network 300; (v) a cell tower 10 for supporting cellular data communications across the system network 300; and (vi) a data center 12 supporting web servers, application servers, database and datastore servers, 12A, 12B and 12C and SMS/text and email servers 12D.

FIG. 156 shows a building on which the GNSS system network 300 of FIG. 155 is deployed for purposes of monitoring the building rooftop 2A, while using RTK correction data supplied by the onsite GNSS base station and RTK correction processing within each deployed rover station for high-spatial resolution accuracy.

FIG. 157 shows the building of FIG. 156, wherein the onsite GNSS base station 8 is mounted on the exterior of the building in a highly stationary manner.

Specification of the Communication and Information Processing Method Supported on the Third Illustrated Embodiment of the System Platform of the Present Invention FIGS. 158A, 158B and 158C show a communication and information processing method supported on the third illustrated embodiment of the system platform of the present invention.

As indicated at Step 1 of FIG. 158A, the Administrator registers buildings to be monitored in the GNSS system network 300 for automatically detecting structural movement and/or displacement beyond predetermined thresholds and generating notifications and/or alarms to administrators and/or managers of the building. As described, the system network 300 comprises (i) a plurality of GNSS Rover Units (GNSS Rovers) 6 installed at locations on the building and operably connected to the TCP/IP infrastructure of a wireless communication network ("Network") to provide position using GNSS Rover Receivers and auxiliary sensor data; (ii) at least one GNSS Base Station 6 installed on or about the measurement site operably connected to the GNSS system network, to provide position error correction data using GNSS Base Receivers; (iii) one or more mobile computing systems operably connected to the GNSS system network, each supporting Web Application, and (iv) a remote Data center supporting Web, Application and Database Servers operably connected to the GNSS system network 300 to provide a remote user web interface, perform calculations, and read/write and process data.

As indicated at Step 2 of FIG. 158A, the Administrator creates virtual geolocated zones with similar deflection or movement limits and registers them in the Database.

As indicated at Step 3 of FIG. 158A, the Administrator registers alert thresholds in the Database for each virtual zone based upon acceptable structural deflection and/or displacement.

As indicated at Step 4 of FIG. 158A, the constellations of GNSS satellites send time and satellite position data continuously.

As indicated at Step 5 of FIG. 158A, the GNSS Base Receivers, automatically acquire multi-band GNSS signals from available GNSS constellations 4 and creates a dataset of: Latitude (Lat), Longitude (Long) and Altitude (Alt) over a period of time (t). The process continues for hours or days.

As indicated at Step 6 of FIG. 158A, the GNSS Base Receivers use the $LLAT_{Base\ Uncorrected}$ dataset to calculate a precise Latitude, Longitude and Altitude.

As indicated at Step 7 of FIG. 158B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers directly through a cellular network 10.

As indicated at Step 8 of FIG. 158B, the GNSS Rover Receivers automatically acquire multi-band GNSS signals from available GNSS constellations and calculate: Latitude (Lat), Longitude (Long) and Altitude (Alt).

As indicated at Step 9 of FIG. 158B, the GNSS Rover Receivers request and receive LLA Correction from the Base GNSS Receivers directly through a cellular network 10.

As indicated at Step 10 of FIG. 158B, GNSS Rover Receivers calculate corrected position known as, by using and LLA Correction using the following equations:

$$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 11 of FIG. 158B, $LLA_{Rover\ Corrected}$ the data processed in the GNSS Rover Receivers is saved to memory then transmitted to the Application Server directly through a cellular network 10.

As indicated at Step 12 of FIG. 158C, the Rovers and Bases save and send Auxiliary Sensor Data including: snow and ponding depth, wind speed, solar panel heading/current, station pitch/roll, temperature and camera images, disclosed herein, to the Application Server directly through a cellular network 10.

As indicated at Step 13 of FIG. 158C, Application Server saves the $LLA_{Rover\ Corrected}$ data and Auxiliary Sensor Data to the Database.

As indicated at Step 14 of FIG. 158C, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$.

As indicated at Step 15 of FIG. 158C, Application Server sends and Auxiliary Sensor Data to the Web App for display on mobile and/or desktop computing devices.

As indicated at Step 16 of FIG. 158C, the processing the received GNSS signals locally or remotely to automatically determine the occurrence of spatial displacement, distortion and/or deformation of the building system being spatially monitored over time, and when spatial displacement, distortion and/o deformation thresholds are met or exceeded, the Application Server automatically sends email and/or SMS alerts and/or notifications to registered Users over the GNSS system network;

As indicated at Step 17 of FIG. 158C, when the structural movements have returned to below alert thresholds, the Application Server automatically sends email and SMS alerts and/or notifications to registered users.

Specification of the GNSS-Based Object Tracking Network of the Fourth Illustrative Embodiment of the Present Invention Deploying Rover Stations and Offsite Base Station Using Cellular-Based Internet Access for Carrying Out RTK Position Correction FIG. 159 shows a system block diagram of the fourth embodiment of the GNSS-based system network of the present invention 400 deploying rover stations and offsite base station using cellular-based internet access for carrying out RTK position correction. As shown, the system network comprises: (i) a cloud-based TCP/IP network architecture with a plurality of GNSS satellites transmitting GNSS signals towards the earth 5 and objects below; (ii) a plurality of GNSS rovers 6 of the present invention mounted on the rooftop surface of building for receiving and processing transmitted GNSS signals during monitoring using time averaging displacement/deflection data extraction processing; (iii) one or more GNSS base stations 8 to support RTK correction of the GNSS signals; (iv) one or more client computing systems for transmitting instructions and receiving alerts and notifications and supporting diverse administration, operation and management functions on the system network 8; (v) a cell tower for supporting cellular data communications across the system network; and (vi) a data center 12 supporting web servers, application servers, database and datastore servers 12A, 12B and 12C, and SMS/text and email servers 12D.

FIG. 160 shows a building with a relatively flat roof surface 2A, on which the GNSS system network of the present invention 400 is installed and deployed for real-time roof beam and surface displacement and deflection monitoring in response to loads created by snow, rain ponding, and/or seismic activity. As illustrated, RTK position correction processing occurs within the roof-mounted GNSS rover devices 6.

Specification of the Communication and Information Processing Method Supported on the Fourth Illustrated Embodiment of the System Platform FIGS. 161A, 161B and 161C shows a communication and information processing method supported on the fourth illustrated embodiment of the system platform of the present invention.

As indicated at Step 1 of FIG. 161A, the Administrator registers buildings to be monitored in the system network database for automatically detecting structural movement and/or displacement beyond predetermined thresholds and generating notifications and/or alarms to administrators and/or managers of the building. As described, the system comprises: (i) a plurality of GNSS Rover Units (GNSS Rovers) installed at locations on the building and operably connected to the TCP/IP infrastructure of a wireless communication network ("Network") to provide position using GNSS Rover Receivers and auxiliary sensor data; (ii) at least one GNSS Base Station installed remote of the measurement site operably connected to the GNSS system network, to provide position error correction data using GNSS Base Receivers; (iii) one or more mobile computing systems operably connected to the GNSS system network, each supporting Web Application; and (iv) a remote data center supporting Web, Application and Database Servers 12A, 12B and 12C operably connected to the GNSS system network 400 to provide a remote user web interface, perform calculations, and read/write and process data.

As indicated at Step 2 of FIG. 161A, the Administrator creates virtual geolocated zones with similar deflection or movement limits and registers them in the database.

As indicated at Step 3 of FIG. 161A, the Administrator registers alert thresholds in the Database for each virtual zone based upon acceptable structural deflection and/or displacement.

As indicated at Step 4 of FIG. 161A, as shown in FIG. 159, constellations of GNSS satellites 4 send time and satellite position data continuously.

As indicated at Step 5 of FIG. 161A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated at Step 6 of FIG. 161A, the GNSS Base Receivers use the $LLAT_{Base\ Uncorrected}$ dataset to calculate a precise Latitude, Longitude and Altitude.

As indicated at Step 7 of FIG. 161B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers through (i) an IP Gateway followed by a cellular modem or LAN, (ii) directly through a cellular network, (iii) RF Data Link or (iv) other pathway.

As indicated at Step 8 of FIG. 161B, the GNSS Rover Receivers automatically acquire multi-band GNSS signals from available GNSS constellations and calculate: Latitude (Lat), Longitude (Long) and Altitude (Alt).

As indicated at Step 9 of FIG. 161B, the GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

As indicated at Step 10 of FIG. 161B, the GNSS Rover Receivers calculate corrected position known as, by using and LLA Correction using the following equations: =+Lat Correction=+Long Correction=+Alt Correction.

As indicated at Step 11 of FIG. 161B, the data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

As indicated at Step 12 of FIG. 161C, the Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

As indicated at Step 13 of FIG. 161C, the Application Server saves the $LLA_{Rover\ Corrected}$ data and Auxiliary Sensor Data to the Database.

As indicated at Step 14 of FIG. 161C, the Application Server accesses the data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$.

Step 15: As indicated at Step 15 of FIG. 161C, the Application Server sends $LLA_{SMA\ t}$ and Auxiliary Sensor Data to the Web App for display on mobile and/or desktop computing devices.

As indicated at Step 16 of FIG. 161C, the processing the received GNSS signals locally or remotely to automatically determine the occurrence of spatial displacement, distortion and/or deformation of the system being spatially monitored over time, and when spatial displacement, distortion and/o deformation thresholds are met or exceeded, the Application Server automatically sends email and/or SMS alerts and/or notifications to registered Users over the GNSS system network 400.

As indicated at Step 17 of FIG. 161C, when the structural movements have returned to below alert thresholds, the Application Server automatically sends email and SMS alerts and/or notifications to registered users.

Brief Overview of NTRIP Protocol (Networked Transport of RTCM Via Internet Protocol) and the CORS Protocol (Continuously Operating Reference Station) Protocol While the terms are often used synonymously in the industry, NTRIP and CORS are different things. NTRIP (Network Transport of RTCM via Internet Protocol) and CORS (Continuously Operating Reference Station) are forms of RTK differential correction that are done through the use of a cellular modem and base station network. This means that instead of using the traditional base station and radio to send correction data to a rover, data is sent using the internet to a cellular modem with a data plan. In order to use this type of correction you must have a cellular modem, a receiver capable of RTK correction and a cellular data plan. You are also required to register with your local NTRIP provider. This will include creating a username and password as well as obtaining a port and IP address for the cell modem to access the network.

One of the primary benefits to using NTRIP in areas where network connectivity is available is that one is capable of achieving sub-inch RTK accuracies without having to purchase and manage a base station oneself. RTK accuracy allows for a level of repeatability that cannot be achieved through most other types of correction. There are four formats supported by NTRIP/CORS: CMR, CMR+, RTCM 2.x and RTCM 3.x. CMR, CMR+ and RTCM 2.x are only capable of using GPS, whereas RTCM 3.x is capable of using GPS and GLONASS.

Brief Description on how NTRIP and CORS Protocols Operate

The Hypertext Transfer Protocol (HTTP) is designed as an application-level protocol for distributed collaborative hypermedia information systems. HTTP is primarily used for bulk traffic, where each object has a clearly defined beginning and end. HTTP is widely used for IP streaming applications, which include the RTCM application. Ntrip, which uses HTTP, is implemented in three programs: Ntripsource, NtripServer and NtripCaster. Described below.

NTRIP Source Program

The Ntripsource provide continuous GNSS data (e.g. RTCM-3.2 corrections) as streaming data. A single source represents GNSS data referring to a specific location. Source description parameters as compiled in the source-table specify the format in use (e.g. RTCM 2.0, RTCM 3, and Raw), the recognized navigation system (e.g. GPS, GPS+ GLONASS), location coordinates and other information.

NTRIP Server Program

The Ntrip Server is used to transfer GNSS data of a Ntripsource to the NtripCaster. Before transmitting GNSS data to the NtripCaster using the IP connection, the NtripServer sends an assignment of the mount point. Server passwords and mount points must be defined by the administrator of the NtripCaster and handed over to the administrators of the participating NtripServer. An NtripServer in its simplest setup is a computer program running on a PC that sends correction data of an Ntripsource (e.g. as received via the serial communication port from a GNSS receiver) to the NtripCaster.

The Ntrip protocol may be used for the transport of RTCM data of a virtual reference station following the so-called VRS concept. Based on data from a number of reference stations, RTCM corrections are derived for a virtual point at the user's approximate position. Data for this virtual reference station represent a single Ntripsource that can be transmitted by an NtripServer NTRIP Caster Program The NtripCaster is basically an HTTP server supporting a subset of HTTP request/response messages and adjusted to low-bandwidth streaming data (from 50 up to 500 Bytes/sec per stream).

The NtripCaster accepts request-messages on a single port from either the NtripServer or the NtripClient. Depending on these messages, the NtripCaster decides whether there is streaming data to receive or to send.

Specification of the GNSS-Based Network of the Fifth Illustrative Embodiment of the GNSS System Network of the Present Invention Comprising of Rover Stations and CORS Base Stations Using Internet Access for Carrying Out RTK Position Correction FIG. 162 shows the fifth embodiment of the GNSS-based system network of the present invention 500 comprising rover stations 6 and CORS base stations 8' using Internet access for carrying out RTK position correction. As shown, the GNSS system network 500 comprises: (i) a cloud-based TCP/IP network architecture 3 with a plurality of GNSS satellites 4 transmitting GNSS signals towards the earth and objects below; (ii) a plurality of GNSS rovers of the present invention 6 mounted on the rooftop surface 2A of building for receiving and processing transmitted GNSS signals during monitoring using time averaging displacement/deflection data extraction processing; (iii) one or more GNSS base stations 8 to support RTK correction of the GNSS signals; (iv) one or more client computing systems 9 for transmitting instructions and receiving alerts and notifications and supporting diverse administration, operation and management functions on the system network; (v) a cell tower 10 for supporting cellular data communications across the system network; and (vi) a data center 12 supporting web servers, application servers, database and datastore servers 12A, 12B and 12C, and SMS/text and email servers 12D.

FIG. 163 shows a building with a relatively flat roof surface, on which a system network of the present invention 500 is installed and deployed for real-time roof beam and surface displacement and deflection monitoring in response to loads created by snow, rain ponding, and/or seismic activity. As shown, rovers 6 are mounted on the rooftop surface and continuously operating reference station (CORS) base stations are mounted on and/or around the building, and wherein RTK correction takes place within the roof-mounted rover devices. FIG. 164 shows the continuously operating reference station (CORS) base stations mounted on the building roof surface. Alternatively, FIG. 165 shows the continuously operating reference station (CORS) base stations mounted around the building perimeter.

Specification of the Communication and Information Processing Method Supported on the Fifth Illustrated Embodiment of the System Platform of the Present Invention FIGS. 166A, 166B and 166C show the communication and information processing method supported on the fifth illustrated embodiment of the system platform of the present invention 500.

As indicated at Step 1 of FIG. 166A, the Administrator registers buildings to be monitored in the GNSS system network Database of a System for automatically detecting structural movement and/or displacement beyond predetermined thresholds and generating notifications and/or alarms to administrators and/or managers of the building. As shown, the system network 500 comprises: (i) a plurality of GNSS Rover Units (GNSS Rovers) 6 installed at locations on the building and operably connected to the TCP/IP infrastructure of an wireless communication network ("Network") to provide position using GNSS Rover Receivers and auxiliary sensor data; (ii) at least one GNSS Base Station 8 installed on, or about, or remote of, the measurement site operably connected to the GNSS system network 500, to provide position error correction data using GNSS Base Receivers; (iii) one or more mobile computing systems 9 operably connected to the GNSS system network 500, each supporting Web Application; and (iv) a remote data center 12 supporting Web, Application and Database Servers 12A, 12B and 12C operably connected to the GNSS system network 500 to provide a remote user web interface, perform calculations, and read/write and process data.

As indicated at Step 2 of FIG. 166A, the Administrator creates virtual geolocated zones with similar deflection or movement limits and registers them in the Database.

As indicated at Step 3 of FIG. 166A, the Administrator registers alert thresholds in the Database for each virtual zone based upon acceptable structural deflection and/or displacement.

As indicated at Step 4 of FIG. 166A, as shown in FIG. 162, constellations of GNSS satellites 4 send time and satellite position data continuously.

As indicated at Step 5 of FIG. 166A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated at Step 6 of FIG. 166A, the GNSS Base Receivers use the $LLAT_{Base\ Uncorrected}$ dataset to calculate a precise Latitude, Longitude and Altitude.

As indicated at Step 7 of FIG. 166B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers through (i) an IP Gateway followed by a cellular modem or LAN, (ii) directly through a cellular network 10, (iii) RF Data Link or (iv) other pathway.

As indicated at Step 8 of FIG. 166B, the GNSS Rover Receivers automatically acquire multi-band GNSS signals from available GNSS constellations 4 and calculate: Latitude (Lat), Longitude (Long) and Altitude (Alt).

As indicated at Step 9 of FIG. 166B, the GNSS Rover Receivers request and receive LLA Correction from the Base GNSS Receivers directly through a cellular network 10.

As indicated at Step 10 of FIG. 166B, the GNSS Rover Receivers calculate corrected position known as, $LLA_{Rover\ Corrected}$ by using $LLA_{Rover\ Uncorrected}$ and LLA Correction using the following equations:

$$Lat_{Rover\ Corrected}=Lat_{Rover\ Uncorrected}+\text{Lat Correction}$$

$$Long_{Rover\ Corrected}=Long_{Rover\ Uncorrected}+\text{Long Correction}$$

$$Alt_{Rover\ Corrected}=Alt_{Rover\ Uncorrected}+\text{Alt Correction}$$

As indicated at Step 11 of FIG. 166B, the data processed in the GNSS Rover Receivers is saved to memory then transmitted to the Application Server directly through a cellular network 10.

As indicated at Step 12 of FIG. 166C, the GNSS Rovers save and send Auxiliary Sensor Data including: snow and ponding depth, wind speed, solar panel heading/current, station pitch/roll, temperature and camera images, disclosed herein, to the Application Server directly through a cellular network 10.

Step 13: As indicated at Step 13 of FIG. 166C, the Application Server saves the $LLA_{Rover\ Corrected}$ data and Auxiliary Sensor Data to the Database 12.

As indicated at Step 14 of FIG. 166C, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$.

As indicated at Step 15 of FIG. 166C, as indicated at Step 16 of FIG. 166C, as indicated at Step 15 of FIG. 166C, the Application Server sends $LLA_{SMA\ t}$ and Auxiliary Sensor Data to the Web App for display on mobile and/or desktop computing devices 9.

As indicated at Step 16 of FIG. 166C, the processing the received GNSS signals locally or remotely to automatically determine the occurrence of spatial displacement, distortion and/or deformation of the system being spatially monitored over time, and when spatial displacement, distortion and/o deformation thresholds are met or exceeded, the Application Server 12B automatically sends email and/or SMS alerts and/or notifications to registered Users over the GNSS system network 500.

As indicated at Step 17 of FIG. 166C, when the structural movements have returned to below alert thresholds, the Application Server automatically sends email and SMS alerts and/or notifications to registered users.

Specification of the GNSS-Based System Network of the Sixth Embodiment of the Present Invention Comprising of Rover Stations Using Cellular-Based Internet Access and Continuously Operating Reference Stations (CORS) Base(S) for Carrying Out RTK Position Correction at the App Server of the GNSS System Network FIG. 167 shows the GNSS-based system network of the sixth embodiment of the present invention 600 comprising of rover stations 6 using cellular-based internet access and continuously operating reference stations (CORS) base(s) 8' for carrying out RTK position correction at the server/web app of the GNSS system network 600. As shown, the system network 600 comprises: (i) a cloud-based TCP/IP network architecture with a plurality of GNSS satellites 4 transmitting GNSS signals towards the earth and objects below; (ii) a plurality of GNSS rovers of the present invention mounted on the rooftop surface of building for receiving and processing transmitted GNSS signals during monitoring using time averaging displacement/deflection data extraction processing; (iii) one or more CORS base stations 8' to support RTK correction of the GNSS signals; (iv) one or more client computing systems 9 for transmitting instructions and receiving alerts and notifications and supporting diverse administration, operation and management functions on the system network; (v) a cell tower 10 for supporting cellular data communications across the system network; and (vi) a data center 12 supporting web servers, application servers, database and datastore servers 12A, 12B and 12C, and SMS/text and email servers 12D.

FIG. 168 shows a building with a relatively flat roof surface 2A, on which a system network of the present invention 600 is installed and deployed for real-time roof beam and surface displacement and deflection monitoring in response to loads created by snow, rain ponding, and/or seismic activity. As shown, the GNSS rovers 6 are mounted on the rooftop surface and continuously operating reference station (CORS) base units or stations 8' are mounted on and/or around the building. Also, the RTK position correction takes place within the roof-mounted rover devices. FIG. 169 shows the continuously operating reference station (CORS) base stations 8' mounted on the building roof surface. FIG. 170 shows the continuously operating reference station (CORS) base stations 8' mounted around the building perimeter.

Specification of the Communication and Information Processing Method Supported on the Sixth Illustrated Embodiment of the System Platform of the Present Invention FIGS. 171A, 171B and 171C describe the steps of a communication and information processing method supported on the sixth illustrated embodiment of the system platform of the present invention.

As indicated at Step 1 in FIG. 171A, the Administrator registers buildings to be monitored in the GNSS system network database 12C for automatically detecting structural movement and/or displacement beyond predetermined thresholds and generating notifications and/or alarms to administrators and/or managers of the building. As described, the system network comprises: (i) a plurality of GNSS Rover Units (GNSS Rovers) installed at locations on the building and operably connected to the TCP/IP infrastructure of a wireless communication network ("Network") to provide position using GNSS Rover Receivers and auxiliary sensor data; (ii) at least one GNSS Base Station installed on, or about, or remote of, the measurement site operably connected to the GNSS system network, to provide position error correction data using GNSS Base Receivers (iii) one or more mobile computing systems operably connected to the GNSS system network, each supporting Web Application; and (iv) a remote data center 12 supporting Web, Application and Database Servers 12A, 12B and 12C operably connected to the GNSS system network 600 to provide a remote user web interface, perform calculations, and read/write and process data.

As indicated at Step 2 in FIG. 171A, the Administrator creates virtual geolocated zones with similar deflection or movement limits and registers them in the Database.

As indicated at Step 3 in FIG. 171A, Administrator registers alert thresholds in the Database for each virtual zone based upon acceptable structural deflection and/or displacement.

As indicated at Step 4 in FIG. 171A, as shown in FIG. 167, constellations of GNSS satellites send time and satellite position data continuously.

As indicated at Step 5 in FIG. 171A, the GNSS Base Receivers, automatically acquire multi-band GNSS signals from available GNSS constellations and creates a dataset of:

Latitude (Lat), Longitude (Long) and Altitude (Alt) over a period of time (t). The process continues for hours or days.

As indicated at Step 6 in FIG. 171A, the GNSS Base Receivers use the $LLAT_{Base\ Uncorrected}$ dataset to calculate a precise Latitude, Longitude and Altitude.

As indicated at Step 7 in FIG. 171B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the Application Server directly through a cellular network.

As indicated at Step 8 in FIG. 171B, the GNSS Rover Receivers automatically acquire multi-band GNSS signals from available GNSS constellations 4 and calculate: Latitude (Lat), Longitude (Long) and Altitude (Alt).

As indicated at Step 9 in FIG. 171B, when requested by the Application Server, or on interval, GNSS Rover Receivers send $LLA_{Rover\ Uncorrected}$ directly through a cellular network.

As indicated at Step 10 in FIG. 171B, the Application Server requests and receives LLA Correction from the Base GNSS Receivers directly through a cellular network.

As indicated at Step 11 in FIG. 171B, the Application Server calculate corrected position known as, by using and LLA Correction using the following equations:

$$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 12 in FIG. 171C, the Rovers save and send Auxiliary Sensor Data including: snow and ponding depth, wind speed, solar panel heading/current, station pitch/roll, temperature and camera images, disclosed herein, to the Application Server directly through a cellular network.

As indicated at Step 13 in FIG. 171C, the Application Server saves the $LLA_{Rover\ Corrected}$ data and Auxiliary Sensor Data to the Database.

As indicated at Step 14 in FIG. 171C, the Application Server accesses the $LLA_{Rover\ Corrected}$ data from the database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$ As indicated at Step 15 in FIG. 171C, Application Server sends and Auxiliary Sensor Data to the Web App for display on mobile and/or desktop computing devices.

As indicated at Step 16 in FIG. 171C, the processing the received GNSS signals locally or remotely to automatically determine the occurrence of spatial displacement, distortion and/or deformation of the system being spatially monitored over time, and when spatial displacement, distortion and/o deformation thresholds are met or exceeded, the Application Server automatically sends email and/or SMS alerts and/or notifications to registered Users over the GNSS system network.

As indicated at Step 17 in FIG. 171C, when the structural movements have returned to below alert thresholds, the Application Server automatically sends email and SMS alerts and/or notifications to registered users.

Exemplary GNSS System Network Deployments, Installations and Alert/Response Configurations FIGS. 172 and 173 show a building on which the GMSS system network of the present invention 600 is installed, configured and deployed in accordance with the principles of the present invention. As illustrated in FIG. 172, the schematic depicts the placement of six (6) GNSS rovers 6 over the roof joists 701, supported by columns 702, and between beam spans of the building 2 at roof joist midspan, for the purpose of monitoring deflection zones and limits using the GNSS system network 600 and its monitoring methods using the stationary GNSS base 8 to provide precise RTK-based position correction data, wherein DL1=10 M span and DL2=15 M span, and ZONE 1 span (L): 10 M Deflection Limit: DL1=L/240=4.2 CM, and ZONE 2 SPAN (L): 15 M Deflection Limit: DL2=L/240=6.2 CM.

FIGS. 174 and 175 show an exemplary pole-mounted GNSS rover 6 arranged in its operational position and deflection test position, respectively, attained by sliding the telescopic pole sections relative to each other and locking the upper pole section into its deflection test position. As shown FIGS. 174 and 175, the upper pole section is placed/moved into its deflection test position by placing the upper pole section at an extended D test height above the roof surface 2A.

As shown in FIG. 177, when the upper pole section is configured in its deflection test position, the bottom pole section is located at DTEST=H2−H1. As shown in FIG. 176, when the upper pole section 105 is configured in the operational position, the bottom of the upper pole section 105 is located at a zero reference height, and the GNSS rover 6 is ready and configured for operation.

Specification of Exemplary Method of Designing, Installing and Operating the GNSS System Network of the Present Invention FIGS. 178A and 178B describe the steps involved in practicing the method of designing, installing and operating the GNSS system network of the present invention (e.g. 1, 100, 200, 300, 400, 500, 600, 800, 900, 1000, 1100 and 1200) on a particular building or civil structure which is to be remotely monitored in accordance with the principles of the present invention disclosed herein.

As indicated at Step 1 in FIG. 178A, for given building, the method involves determining which rooftop spans are sufficiently long to monitor using present invention As indicated at Step 2 in FIG. 178A, the method involves determining number of joists (beams) to monitor.

As indicated at Step 3 in FIG. 178A, the method involves assigning a GNSS Rover at mid span of selected joists Step 4: As indicated at Step 4 in FIG. 178A, the method involves installing GNSS Rovers using either a ballasted or permanent mount.

As indicated at Step 5 in FIG. 178A, the method involves assigning a GNSS Base to a stationary object (relative to earth) at the building site.

As indicated at Step 6 in FIG. 178A, the method involves installing GNSS Base.

As indicated at Step 7 in FIG. 178A, the method involves initiating GNSS Rovers and GNSS Base.

As indicated at Step 8 in FIG. 178A, the method involves launching Web App on client computer and create/login to user account.

As indicated at Step 9 in FIG. 178A, the method involves assigning GNSS Rovers and GNSS Base to user account.

As indicated at Step 10 in FIG. 178A, the method involves creating other users for the account and add contact information including: email addresses and phone numbers, alert message format and frequency, general rooftop data update format and frequency.

As indicated at Step 11 in FIG. 178A, the method involves adding aforementioned building to be monitored.

As indicated at Step 12 in FIG. 178B, the method involves creating virtual zone(s) for each rooftop joist type (deflection) region.

As indicated at Step 13 in FIG. 178B, the method involves assigning a maximum allowable deflection based upon span to each zone.

As indicated at Step 14 in FIG. 178B, the method involves assigning a warning threshold as a percentage of max. allowable deflection for each zone.

As indicated at Step 15 in FIG. 178B, the method involves initiating high accuracy position acquisition mode for the base.

As indicated at Step 16 in FIG. 178B, the method involves acquiring latitude, longitude and altitude position data from each rover.

As indicated at Step 17 in FIG. 178B, the method involves testing system by adjusting each Rover's mast height by $h_d$ for the test period.

As indicated at Step 18 in FIG. 178B, the method involves after test period, returning the mast height to the normal operating position.

Step 19: As indicated at Step 19 in FIG. 178B, the method involves reviewing test data and confirming that each station has accurately registered the changes in mast height. When completed the system is now ready for use.

As indicated at Step 20 in FIG. 178B, the method involves receiving alerts as rooftop conditions change and if system errors occur.

As indicated at Step 21 in FIG. 178B, the method involves receiving periodic rooftop condition updates such as weather conditions, images and system status.

As indicated at Step 22 in FIG. 178B, the method lastly involves reviewing "heat map" plots of deflection and/or movements for various time spans.

Specification of the Method of Receiving Alerts and Notifications, and Responding and Reporting High Snow Load Events and the Like Using the GNSS System Network of the Present Invention Deployed on One or More Buildings and/or Structures Under Remote Monitoring and Management FIG. 179 describes the steps carried out when performing the method of receiving alerts and notifications, and responding and reporting high snow load events and the like using the system network of the present invention deployed on one or more buildings and/or structures under remote monitoring and management.

As indicated at Step 1 in FIG. 179, the method involves setting up and Enabling System.

As indicated at Step 2 in FIG. 179, the method involves detecting an occurrence of an event when Zone Thresholds are exceeded.

As indicated at Step 3 in FIG. 179, the method involves the system sending out Notifications.

As indicated at Step 4 in FIG. 179, the method involves the Responder acknowledging Notification.

As indicated at Step 5 in FIG. 179, the method involves the Responder submitting Site Investigation Plan.

As indicated at Step 6 in FIG. 179, the method involves the Manager approving Site Investigation Plan.

As indicated at Step 7 in FIG. 179, the method involves the Responder conducting Site Investigation and reports findings.

As indicated at Step 8 in FIG. 179, the method involves the Manager providing comments and requests Responder(s) to provide Risk Mitigation Plan.

As indicated at Step 9 in FIG. 179, the method involves the Responder(s) submitting Risk Mitigation Plan.

Step 10: As indicated at Step 10 in FIG. 179, the method involves the Manager approving Risk Mitigation Plan.

As indicated at Step 11 in FIG. 179, the method involves the Responder initiating Risk Mitigation Plan.

As indicated at Step 12 in FIG. 179, the method involves the Responder providing Risk Mitigation Plan progress and indicates when completed.

As indicated at Step 13 in FIG. 179, the method involves the Zone Thresholds returning to safe levels.

As indicated at Step 14 in FIG. 179, the method involves the Responder submitting report verifying risk mitigation and includes recommendations.

As indicated at Step 15 in FIG. 179, the method involves the Manager reviewing and signing off as completed.

Specification of a Building with a Relatively Flat Roof Surface, on which a GNSS System Network of the Present Invention is Installed and Deployed for Real-Time Roof Beam and Surface Displacement and Deflection Monitoring in Response to Loads Created by Snow, Rain Ponding, and/or Seismic Activity FIG. 180 shows a building 2 with a relatively flat roof surface, on which a GNSS system network of the present invention 800 is installed and deployed for real-time roof beam and surface displacement and deflection monitoring in response to loads created by snow, rain ponding, and/or seismic activity. As shown, the GNSS rovers 6 and base stations 8 are mounted on the rooftop surface 2A for monitoring rooftop deflection by collecting and processing GPS signals transmitted from the GNSS satellite constellations 4.

FIG. 181A shows the building of FIG. 180 a relatively flat roof surface 2A, on which a GNSS system network 800 is installed and deployed for real-time roof beam and surface displacement and deflection monitoring in response to loads created by snow, rain ponding, and/or seismic activity. As shown, the rovers and base stations 6 and 8 are mounted on the rooftop surface for monitoring rooftop deflection by collecting and processing GPS signals transmitted from the GNSS satellite constellations 4, and when there is no loading on the rooftop 2A to be monitored by the system network 800. FIG. 181B is a perspective view of a building with a relatively flat roof surface, on which a GNSS system network 800 is installed and deployed for real-time roof beam and surface displacement and deflection monitoring in response to loads created by snow, rain ponding, and/or seismic activity.

FIG. 182 shows the building in FIGS. 181A and 181B, revealing structural beams (i.e. trusses) supporting the roof surface skin 2A, upon which GNSS rovers 6 and GNSS base stations 8 are mounted on the rooftop surface for monitoring rooftop deflection by collecting and processing GPS signals transmitted from the GNSS satellite constellations 4.

FIG. 183 shows the building 2 illustrated in FIGS. 181A, 181B and 182, showing the structural roof support trusses 803A, 803B, yielding to the snow load 801 imposed on the building roof surface 2A.

FIG. 184 shows one of the GPS-tracking rovers with antenna mounted on the roof surface of the building shown in FIGS. 181A, 181B, 182 and 183, without snow loading.

FIG. 185 shows one of the GPS-tracking rovers 6 with antenna mounted on the roof surface of the building 2 shown in FIGS. 181A, 181B, 182 and 183, with snow loading 802 causing the roof support truss 803A, 803B deflecting downward, causing the "phase center location (PCL)" of each antenna to be displaced and detected by time-averaging of GNSS signals processed over the GNSS system network 800, as illustrated in FIG. 24.

FIG. 186 shows a structural ceiling joist (i.e. roof support truss) 803A, 803B employed within the building shown in FIG. 181A through 185, with rovers 6 mounted above the structural joist, and illustrating the deflection limit established by the measure L/240 being monitored in real-time by the GNSS system network 800, when live loading create 0 deflection conditions.

FIG. 187 shows structural ceiling joist (i.e. roof support truss) 803A, 803B employed within the building shown in FIG. 181A through 185, with rovers 6 mounted above the structural joist, and illustrating the deflection limit established by the measure L/240 being monitored in real-time by the GNSS system network 800, when live loading create <L/240 deflection conditions.

FIG. 188 shows a structural ceiling joist (i.e. roof support truss) 803A, 803B employed within the building shown in FIG. 181A through 185, with rovers 6 mounted above the structural joist, and illustrating the deflection limit established by the measure L/240 being monitored in real-time by the GNSS system network 800, when live loading create >L/240 deflection conditions.

FIG. 189 shows a system block diagram of the GNSS system network of the present invention installed and configured for monitoring snow and/or rain load driven structural deflection and displacement of buildings. As shows, the GNSS system network 800 comprises: (i) a cloud-based TCP/IP network architecture 3 with a plurality of GNSS satellites 4 transmitting GNSS signals towards the earth 5 and objects below; (ii) a plurality of GNSS rovers 6 mounted on the rooftop surface of building 2 for receiving and processing transmitted GNSS signals during monitoring using time averaging displacement data extraction processing; (iii) one or more GNSS base stations 8 to support RTK correction of the GNSS signals; (iv) one or more client computing systems 9 for transmitting instructions and receiving alerts and notifications and supporting diverse administration, operation and management functions on the GNSS system network 800; (v) a cell tower 100 for supporting cellular data communications across the system network 800; and (vi) a data center supporting web servers, application servers, database and datastore servers 12A, 12B and 12C, and SMS/text and email servers 12D.

FIG. 190 shows each GNSS rover unit 6 deployed on the GNSS system network 800 as depicted in FIG. 189. As shown, each GNSS rover unit 6 comprises: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; a drain freeze sensor 138; temp & humidity sensors 139; a 3 axis accelerometer 140; and a compass 141.

FIG. 191 illustrates the real-time monitoring of structural displacement response using the GNSS system network 800 operating in its snow load monitoring and alert mode, and showing, along a common timeline, RTK-corrected GNSS deflection data stream, moving averaged GNSS deflection data streams with time averaging displacement data extraction processing, and automated generation of structural deflection alerts using the method of the present invention.

FIGS. 192A, 192B and 192C describes the steps of communication and information processing method supported by the system platform 800 applied to rooftop application for monitoring snow load driven structural deflection and displacement.

As indicated at Step 1 in FIG. 192A, the Administrator registers buildings to be monitored in the GNSS system network database 12C for automatically detecting structural movement and/or displacement beyond predetermined thresholds and generating notifications and/or alarms to administrators and/or managers of the building, bridge, hillside. As shown, the system network 800: comprises: (i) a plurality of GNSS Rover Units (GNSS Rovers) 6 installed at locations on the building 2, and operably connected to the TCP/IP infrastructure 3 of a wireless communication network ("Network") to provide position using GNSS Rover Receivers and auxiliary sensor data; (ii) at least one GNSS Base Station 8 installed on, or about, or remote of, the measurement site operably connected to the GNSS system network 800, to provide position error correction data using GNSS Base Receivers 8; (iii) one or more mobile computing systems 9 operably connected to the GNSS system network 800, each supporting Web Application, and (iv) a remote data center 12 supporting Web, Application and Database Servers 12A, 12B, 12C operably connected to the GNSS system network 800 to provide a remote user web interface, perform calculations, and read/write and process data.

As indicated at Step 2 in FIG. 192A, the Administrator creates virtual geolocated zones with similar deflection or movement limits and registers them in the Database.

As indicated at Step 3 in FIG. 192A, the Administrator registers alert thresholds in the Database for each virtual zone based upon acceptable structural deflection and/or displacement.

As indicated at Step 4 in FIG. 192A, as shown in FIG. 191, constellations of GNSS satellites send time and satellite position data continuously.

As indicated at Step 5 in FIG. 192A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated at Step 6 in FIG. 192A, the GNSS Base Receivers use the $LLAT_{Base\ Uncorrected}$ dataset to calculate a precise Latitude, Longitude and Altitude.

As indicated at Step 7 in FIG. 192B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

As indicated at Step 8 in FIG. 192B, the GNSS Rover Receivers automatically acquire multi-band GNSS signals from available GNSS constellations and calculate: Latitude (Lat), Longitude (Long) and Altitude (Alt).

As indicated at Step 9 in FIG. 192B, when requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated at Step 10 in FIG. 192B, the GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

As indicated at Step 11 in FIG. 192B, the GNSS Rover Receivers or Application Server calculate corrected position known as $LLA_{Rover\ Corrected}$ by using and LLA Correction using the following equations:

$$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 12 in FIG. 192B, the data processed in the GNSS Rover Receivers is saved to memory then transmitted to the Application Server through (i) an IP Gateway followed by a cellular modem or LAN, (ii) directly through a cellular network 10, (iii) RF Data Link or (iv) other pathway.

As indicated at Step 13 in FIG. 192C, the Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

As indicated at Step 14 in FIG. 192C, the Application Server saves the $LLA_{Rover\ Corrected}$ data and Auxiliary Sensor Data to the Database.

As indicated at Step 15 in FIG. 192C, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}.$$

This averaged dataset is known as: $LLA_{SMA\ t}$.

As indicated at Step 16 in FIG. 192C, the Application Server sends $LLA_{SMA\ t}$ and Auxiliary Sensor Data to the Web App for display on mobile and/or desktop computing devices 9.

As indicated at Step 17 in FIG. 192C, the processing the received GNSS signals locally or remotely to automatically determine the occurrence of spatial displacement, distortion and/or deformation of the system being spatially monitored over time, and when spatial displacement, distortion and/o deformation thresholds are met or exceeded, the Application Server automatically sends email and/or SMS alerts and/or notifications to registered Users over the GNSS system network 800.

As indicated at Step 18 in FIG. 192C, when the structural movements have returned to below alert thresholds, the Application Server automatically sends email and SMS alerts and/or notifications to registered users.

Specification of a Building with a Relatively Flat Roof Surface, on which a GNSS System Network of the Present Invention is Installed and Deployed for Real-Time Roof Beam and Surface Displacement and Deflection Monitoring in Response to Loads Created by Rain Ponding on Rooftops FIG. 193 shows a building with a relatively flat roof surface, on which a GNSS system network of the present invention 810 is installed and deployed for real-time roof beam and surface displacement and deflection monitoring in response to loads created by rain ponding 811 on rooftops 2A. As shown, the GNSS rovers 6 and GNSS base stations 8 are mounted on the rooftop surface for monitoring rooftop deflection by collecting and processing GPS signals transmitted from the GNSS satellite constellations 4.

FIG. 194 shows the building illustrated in FIG. 193, showing the structural roof support trusses 813A and 813B, yielding to the rain ponding load imposed on the building roof surface 2A.

FIG. 195A shows the GNSS system network 810 installed and configured for monitoring rain ponding (load) driven structural deflection and displacement of buildings 2. As shown, the GNSS system network 810 comprises: (i) a cloud-based TCP/IP network architecture 3 with a plurality of GNSS satellites 4 transmitting GNSS signals towards the earth Sand objects below; (ii) a plurality of GNSS rovers 6 mounted on the rooftop surface 2A of building 8 for receiving and processing transmitted GNSS signals during monitoring using time averaging displacement/deflection data extraction processing; (iii) one or more GNSS base stations 8 to support RTK correction of the GNSS signals; (iv) one or more client computing systems 9 for transmitting instructions and receiving alerts and notifications and supporting diverse administration, operation and management functions on the system network 810; (v) a cell tower 10 for supporting cellular data communications across the system network; and (vi) a data center 12 supporting web servers, application servers, database and datastore servers 12A, 12B and 12C, and SMS/text and email servers 12D.

FIG. 195B shows each GNSS rover unit deployed on the GNSS system network 810 as depicted in FIG. 195A. As shown, each GNSS rover unit 6 comprises: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; a drain freeze sensor 138; temp & humidity sensors 139; a 3 axis accelerometer 140; and a compass 141.

FIG. 196 illustrates the real-time monitoring of structural displacement response using the system network 810 operating in its rain ponding monitoring and alert mode, and showing, along a common timeline, RTK-corrected GNSS deflection data stream, moving averaged GNSS deflection data streams with time averaging displacement data extraction processing, and automated generation of structural deflection alerts and ponding depth alerts, using the method of the present invention.

FIGS. 197A, 197B and 197C describes the communication and information processing method supported by the system platform 810 applied to rooftop application for monitoring ponding 811 and water load driven structural deflection and displacement.

As indicated at Step 1 in FIG. 197A, the Administrator registers buildings to be monitored in the GNSS system network database 12B for automatically detecting structural movement and/or displacement beyond predetermined thresholds and generating notifications and/or alarms to administrators and/or managers of the building, bridge, hillside. As shown, the GNSS system network 810 comprises: (i) a plurality of GNSS Rover Units (GNSS Rovers) 6 installed at locations on the building, and operably connected to the TCP/IP infrastructure 3 of an wireless communication network ("Network") to provide position using GNSS Rover Receivers 6 and auxiliary sensor data; (ii) at least one GNSS Base Station 8 installed on, or about, or remote of, the measurement site operably connected to the GNSS system network 810, to provide position error correction data using GNSS Base Receivers; (iii) one or more mobile computing systems 9 operably connected to the GNSS system network 810, each supporting Web Application; and (iv) a remote data center 12 supporting Web, Application and Database Servers 12A, 12B and 12C operably connected to the GNSS system network 810 to provide a remote user web interface, perform calculations, and read/write and process data.

As indicated at Step 2 in FIG. 197A, the Administrator creates virtual geolocated zones with similar deflection or movement limits and registers them in the Database.

As indicated at Step 3 in FIG. 197A, the Administrator registers alert thresholds in the Database for each virtual zone based upon acceptable structural deflection and/or displacement.

As indicated at Step 4 in FIG. 197A, as shown in FIG. 197, constellations of GNSS satellites send time and satellite position data continuously.

As indicated at Step 5 in FIG. 197A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated at Step 6 in FIG. 197A, the GNSS Base Receivers use the dataset to calculate a precise Latitude, Longitude and Altitude.

As indicated at Step 7 in FIG. 197B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

As indicated at Step 8 in FIG. 197B, the GNSS Rover Receivers automatically acquire multi-band GNSS signals from available GNSS constellations and calculate: Latitude (Lat), Longitude (Long) and Altitude (Alt).

As indicated at Step 9 in FIG. 197B, when requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated at Step 10 in FIG. 197B, the GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

As indicated at Step 11 in FIG. 197B, the GNSS Rover Receivers or Application Server calculate corrected position known as, $LLA_{Rover\ Corrected}$ by using $LLA_{Rover\ Uncorrected}$ and using the following equations:

$$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 12 in FIG. 197B, the data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

As indicated at Step 13 in FIG. 197C, the Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

As indicated at Step 14 in FIG. 197C, the Application Server saves the $LLA_{Rover\ Corrected}$ data and Auxiliary Sensor Data to the Database.

As indicated at Step 15 in FIG. 197C, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}.$$

This averaged dataset is known as: $LLA_{SMA\ t}$.

As indicated at Step 16 in FIG. 197C, the Application Server sends $LLA_{SMA\ t}$ and Auxiliary Sensor Data to the Web App for display on mobile and/or desktop computing devices.

As indicated at Step 17 in FIG. 197C, the processing the received GNSS signals locally or remotely to automatically determine the occurrence of spatial displacement, distortion and/or deformation of the system being spatially monitored over time, and when spatial displacement, distortion and/or deformation thresholds are met or exceeded, and/or pond-depth thresholds are met or exceeded, the Application Server automatically sends email and/or SMS alerts and/or notifications to registered Users over the GNSS system network 810.

Step 18: As indicated at Step 18 in FIG. 197C, when the structural movements have returned to below alert thresholds, the Application Server automatically sends email and SMS alerts and/or notifications to registered users.

Specification of a Municipal Storm Water Collection and Drain System Installed in a Roadside Surface with the GNSS System Network of the Present Invention Installed and Deployed Therein FIG. 198A1 shows a municipal storm water collection and drain system installed in a roadside surface 821, showing the GNSS system network 820 installed and deployed in this particular system, with its GNSS rover units 6' installed in catch basins 823 and around grates 822 to monitor structural deflection, displacement and/or distortion as well as the depth of water in the catch basins.

FIG. 198A2 shows the municipal storm water collection and drain system in FIG. 198A1, further illustrating the installation of GNSS rover units 6' below the drain grates 822 within the catch basins connected to the drain pipes 824 deployed in the system, so as to monitor structural deflection, displacement and/or distortion as well as the depth of water in these drain pipes 824.

FIG. 198A3 shows a catch basin region shown in FIG. 198A2, illustrating the mounting of the GNSS rover controller in the roadside surface above the drain grate 822, with a pressing sensing tube extending though the catch basin 823 and into the drain pipe 824 so as to monitor the depth of water developing in the drain pipe and catch basis at any particular moment in time, while the GPS coordinates of the GNSS rover 6' with integrated pond-depth sensing is being tracked and recorded on GNSS system network servers back at a data center.

FIG. 198B1 shows the municipal storm water collection and drain system shown in FIG. 198A2, illustrating unobstructed pathways along the pipe drain 824 shown therein, which the water level sensing instrumentation automatically senses during monitoring by the system network of the present invention 820.

FIG. 198B2 shows the municipal storm water collection and drain system shown in FIG. 198A2, illustrating an obstruction existing a catch basin along the drain pathway, causing backed-up fluid in a downstream catch basin 823, which the water level sensing instrumentation automatically senses during monitoring by the system network of the present invention 820.

FIG. 198C shows the GNSS system network 820 installed and configured for monitoring rain ponding (load) driven structural deflection and displacement of buildings. As shown, the GNSS system network 820 comprises: (i) a cloud-based TCP/IP network architecture 3 with a plurality of GNSS satellites 4 transmitting GNSS signals towards the earth 5 and objects below; (ii) a plurality of GNSS rovers 6' mounted in the catch basins 824 for receiving and processing transmitted GNSS signals during monitoring using time averaging displacement/deflection data extraction processing; (iii) one or more GNSS base stations 8 to support RTK correction of the GNSS signals; (iv) one or more client computing systems for transmitting instructions and receiving alerts and notifications and supporting diverse administration, operation and management functions on the system network 820; (v) a cell tower 10 for supporting cellular data communications across the system network 820; and (vi) a data center 12 supporting web servers, application servers, database and datastore servers 12A, 12B and 12C, and SMS/text and email servers 12D.

FIG. 198D shows each GNSS rover unit 6 as comprising: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; a drain freeze sensor 138; temp & humidity sensors 139; a 3 axis accelerometer 140; and a compass 141.

FIG. 198E illustrates the real-time monitoring of structural displacement response using the GNSS system network 820, operating in its rain ponding monitoring and alert mode, illustrating, along a common timeline, RTK-corrected GNSS deflection data stream, moving averaged GNSS deflection data streams with time averaging displacement data extraction processing, and automated generation of structural deflection alerts and ponding depth alerts, using the method of the present invention.

FIGS. 198F, 198F2 and 198F3 describes the communication and information processing method supported by the system platform 820 when installed within a road surface application, and configured and deployed for the purposes of real-time monitoring of ponding and/or water collection, resulting in water load driven structural deflection, Earth displacement and/or erosion, and possible loss and/or damage to property and life. As illustrated, the method involves the processing of GNSS signals received by GNSS rovers 6' installed in the drain catch basins, to automatically determine the occurrence of spatial displacement, distortion and/or deformation of the Earth-based system being spatially monitored over time, and when spatial displacement, distortion and/or deformation thresholds are met or exceeded, and/or pond-depth/wall-collection thresholds are met or exceeded, then the Application Server automatically sends email and/or SMS alerts and/or notifications to registered Users over the GNSS system network 820.

As indicated at Step 1 of FIG. 198F1, the Administrator registers buildings to be monitored in the Network Database of a System for automatically detecting structural movement and/or displacement beyond predetermined thresholds and generating notifications and/or alarms to administrators and/or managers of the building, bridge, hillside. As shown, the GNSS system network 820 comprises: (i) a plurality of GNSS Rover Units (GNSS Rovers) installed at locations on the building, and operably connected to the TCP/IP infrastructure of a wireless communication network ("Network") to provide position using GNSS Rover Receivers and auxiliary sensor data; (ii) at least one GNSS Base Station installed on, or about, or remote of, the measurement site operably connected to the network 820, to provide position error correction data using GNSS Base Receivers, (iii) one or more mobile computing systems operably connected to the Network, each supporting Web Application, and (iv) a remote data center 12 supporting Web, Application and Database Servers operably connected to the Network to provide a remote user web interface, perform calculations, and read/write and process data.

As indicated at Step 2 of FIG. 198F1, the Administrator creates virtual geolocated zones with similar deflection or movement liquid depth limits and registers them in the Database.

As indicated at Step 3 of FIG. 198F1, the Administrator registers alert thresholds in the Database for each virtual zone based upon acceptable structural deflection and/or displacement.

As indicated at Step 4 of FIG. 198F1, as shown in FIG. 198C, constellations of GNSS satellites 4 send time and satellite position data continuously.

As indicated at Step 5 of FIG. 198F1, the GNSS Base Receivers, automatically acquire multi-band GNSS signals from available GNSS constellations 4 and creates a dataset of: Latitude (Lat), Longitude (Long) and Altitude (Alt) known as: $Lat_{Base\ Uncorrected}$, $Long_{Base\ Uncorrected}$, $Alt_{Base\ Uncorrected}$ over a period of time (t) and are also known as $LLAT_{Base\ Uncorrected}$. The process continues for hours or days.

As indicated at Step 6 of FIG. 198F1, the GNSS Base Receivers use the $LLAT_{Base\ Uncorrected}$ dataset to calculate a precise Latitude, Longitude and Altitude known as: $Lat_{Base\ Corrected}$, $Long_{Base\ Corrected}$ and $Alt_{Base\ Corrected}$ and also known as $LLA_{Base\ Corrected}$.

As indicated at Step 7 of FIG. 198F2, The GNSS Base Receivers compare $LLA_{Base\ Corrected}$ to newly acquired Latitude, Longitude and Altitude positions and create correction offsets known as Lat Correction, Long Correction and Alt Correction also known as LLA Correction.

As indicated at Step 7 of FIG. 198F2, the GNSS Base Receivers make the LLA Correction available to the GNSS Rover Receivers or the Application Server through (i) an IP Gateway followed by a cellular modem or LAN, (ii) directly through a cellular network 10, (iii) RF Data Link or (iv) other pathway.

As indicated at Step 8 of FIG. 198F2, the GNSS Rover Receivers automatically acquire multi-band GNSS signals from available GNSS constellations and calculate: Latitude (Lat), Longitude (Long) and Altitude (Alt) known as: $Lat_{Rover\ Uncorrected}$, $Long_{Rover\ Uncorrected}$, $Alt_{Rover\ Uncorrected}$ and also known as $LLA_{Rover\ Uncorrected}$.

As indicated at Step 9 of FIG. 198F2, when requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated at Step 10 of FIG. 198F2, the GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

As indicated at Step 11 of FIG. 198F2, the GNSS Rover Receivers or Application Server calculate corrected position known as, $LLA_{Rover\ Corrected}$ by using $LLA_{Rover\ Uncorrected}$ and LLA Correction using the following equations:

$$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 12 of FIG. 198F2, the $LLA_{Rover\ Corrected}$ data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

As indicated at Step 13 of FIG. 198F3, the Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

As indicated at Step 14 of FIG. 198F3, the Application Server saves the $LLA_{Rover\ Corrected}$ data and Auxiliary Sensor Data to the Database.

As indicated at Step 15 of FIG. 198F3, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$

As indicated at Step 16 of FIG. 198F3, the Application Server sends $LLA_{SMA\ t}$ and Auxiliary Sensor Data to the Web App for display on mobile and/or desktop computing devices 9.

As indicated at Step 17 of FIG. 198F3, the processing the received GNSS signals locally or remotely to automatically determine the occurrence of spatial displacement, distortion and/or deformation of the system being spatially monitored over time, and when spatial displacement, distortion and/or deformation thresholds are met or exceeded, and/or the liquid-depth thresholds have been exceeded within one or more of the catch basins within the storm drain system, the Application Server automatically sends email and/or SMS alerts and/or notifications to registered Users over the Network.

As indicated at Step 18 of FIG. 198F3, when the structural movements and liquid level depths have returned to below alert thresholds, the Application Server automatically sends email and SMS alerts and/or notifications to registered users.

Specification of a Building with a Relatively Flat Roof Surface, on which a System Network of the Present Invention is Installed and Deployed for Real-Time Wind-Driven Roof Structural Damage Monitoring in Response to Loads Created by Winds on Rooftops, Wherein Rovers and Base Stations are Mounted on the Rooftop Surface for Monitoring Rooftop Deflection by Collecting and Processing GPS Signals Transmitted from the GNSS Satellite Constellations FIG. 199 shows a building with a relatively flat roof surface, on which a system network of the present invention 830 is installed and deployed for real-time wind-driven roof structural damage monitoring in response to loads created by winds on rooftops. As shown, the GNSS rovers 6 and base stations 8 are mounted on the rooftop surface 2A for monitoring rooftop deflection by collecting and processing GPS signals transmitted from the GNSS satellite constellations 4, and there is no wind-driven structural damage experienced by the building 8. FIG. 200 shows the positioning of rovers on the structural roof support trusses of the building.

FIG. 201 shows the building of FIG. 199, on which the system network 830 is installed and deployed for real-time wind-driven structural roof damage monitoring in response to loads created by winds on rooftops 2A. As shown, there is some serious wind-driven structural damage caused to the rooftop surface. FIG. 202 shows the positioning of the rovers on structural roof support trusses, yielding in response to the rain ponding load imposed on the building roof surface, and the wind-driven rooftop structural surface damaged reflected in FIG. 201.

FIG. 203 shows the system network of the present invention installed and configured on the building of FIGS. 199 through 202, for monitoring rain ponding (load) driven structural deflection and displacement of buildings. As shown, the GNSS system network 830 comprises: (i) a cloud-based TCP/IP network architecture 3 with a plurality of GNSS satellites 4 transmitting GNSS signals towards the earth 5 and objects below; (ii) a plurality of GNSS rovers 6 mounted on the rooftop surface of building for receiving and processing transmitted GNSS signals during monitoring using time averaging displacement/deflection data extraction processing; (iii) one or more GNSS base stations 8 to support RTK correction of the GNSS signal; (iv) one or more client computing systems 9 for transmitting instructions and receiving alerts and notifications and supporting diverse administration, operation and management functions on the system network 830; (v) a cell tower 10 for supporting cellular data communications across the system network 830; and (v) a data center 12 supporting web servers, application servers, database and datastore servers 12A, 12B and 12C, and SMS/text and email servers 12D.

FIG. 204 shows each GNSS rover unit deployed on the system network 830 as depicted in FIG. 203. As shown, each GNSS rover unit 6 comprises: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; a drain freeze sensor 138; temp & humidity sensors 139; a 3 axis accelerometer 140; and a compass 141.

FIG. 205 illustrates the real-time monitoring of structural displacement response of the building 2 shown in FIGS. 109 through 202 using the GNSS system network 830 operating in its rain ponding monitoring and alert mode, and illustrating, along a common timeline, RTK-corrected GNSS deflection data stream, moving averaged GNSS deflection data streams with time averaging displacement data extraction processing, and automated generation of structural displacement alerts, rooftop windspeed, windspeed alerts and regional windspeed, using the method of the present invention.

FIGS. 206A, 206B and 206C describe the communication and information processing method supported by GNSS system platform 830 of FIGS. 199 through 202, applied to rooftop application for monitoring wind activity and structural displacement response using system network 830 operating in wind monitoring and alert mode.

As indicated at Step 1 of FIG. 206A, the Administrator registers buildings to be monitored in the GNSS system network database 12C for automatically detecting structural movement and/or displacement beyond predetermined thresholds and generating notifications and/or alarms to administrators and/or managers of the building, bridge, hillside. As shown, the GNSS system network 830 comprises: (i) a plurality of GNSS Rover Units (GNSS Rovers) 6 installed at locations on the building, and operably connected to the TCP/IP infrastructure of an wireless communication network ("Network") to provide position using GNSS Rover Receivers and auxiliary sensor data; (ii) at least one GNSS Base Station 8 installed on, or about, or remote of, the measurement site operably connected to the GNSS system network 830, to provide position error correction data using GNSS Base Receivers; (iii) one or more mobile computing systems 9 operably connected to the GNSS system network 830, each supporting Web Application; and (iv) a remote data center 12 supporting Web, Application and Database Servers 12A, 12B and 12C operably connected to the GNSS system network 830 to provide a remote user web interface, perform calculations, and read/write and process data.

As indicated at Step 2 of FIG. 206A, the Administrator creates virtual geolocated zones with similar deflection or movement limits and registers them in the Database.

As indicated at Step 3 of FIG. 206A, the Administrator registers alert thresholds in the Database for each virtual zone based upon acceptable structural deflection and/or displacement.

As indicated at Step 4 of FIG. 206A, as shown in FIG. 205, constellations of GNSS satellites 4 send time and satellite position data continuously.

As indicated at Step 5 of FIG. 206A, the GNSS Base Receivers, automatically acquire multi-band GNSS signals from available GNSS constellations 4 and creates a dataset of: Latitude (Lat), Longitude (Long) and Altitude (Alt) over a period of time (t). The process continues for hours or days.

As indicated at Step 6 of FIG. 206A, the GNSS Base Receivers use the $LLAT_{Base\ Uncorrected}$ dataset to calculate a precise Latitude, Longitude and Altitude.

As indicated at Step 1 of FIG. 206B, the GNSS Base Receivers compare to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

As indicated at Step 8 of FIG. 206B, the GNSS Rover Receivers automatically acquire multi-band GNSS signals from available GNSS constellations and calculate: Latitude (Lat), Longitude (Long) and Altitude (Alt).

As indicated at Step 9 of FIG. 206B, when requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated at Step 10 of FIG. 206B, the GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

As indicated at Step 11 of FIG. 206B, the GNSS Rover Receivers or Application Server calculate corrected position known as, $LLA_{Rover\ Corrected}$ by using and LLA Correction using the following equations:

$$Lat_{Rover\ Corrected}=Lat_{Rover\ Uncorrected}+\text{Lat Correction}$$

$$Long_{Rover\ Corrected}=Long_{Rover\ Uncorrected}+\text{Long Correction}$$

$$Alt_{Rover\ Corrected}=Alt_{Rover\ Uncorrected}+\text{Alt Correction}$$

As indicated at Step 12 of FIG. 206B, the data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

As indicated at Step 13 of FIG. 206C, the Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

As indicated at Step 14 of FIG. 206C, the Application Server saves the $LLA_{Rover\ Corrected}$ data and Auxiliary Sensor Data to the Database.

As indicated at Step 15 of FIG. 206C, Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$.

As indicated at Step 16 of FIG. 206C, Application Server acquires remote weather data from regional weather stations and sends the data to the Web App 15 for display on mobile and/or desktop computing devices 9.

As indicated at Step 17 of FIG. 206C, the Application Server sends $LLA_{SMA\ t}$ and Auxiliary Sensor Data to the Web App 15 for display on mobile and/or desktop computing devices 9.

As indicated at Step 1 of FIG. 206C, the processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the GNSS system network 830.

As indicated at Step 19 of FIG. 206C, when the structural movements have returned to below alert thresholds, the Application Server automatically sends email and SMS alerts and/or notifications to registered users.

Specification of a Building with a Relatively Flat Roof Surface, on which a GNSS System Network of the Present Invention is Installed and Deployed for Real-Time Wind-Driven Roof Membrane Displacement and Deflection Monitoring in Response to Loads Created by Winds on Rooftops FIG. 207 shows a building with a relatively flat roof surface 2A, on which a GNSS system network of the present invention 840 is installed and deployed for real-time wind-driven roof membrane (i.e. surface) displacement and deflection monitoring in response to loads created by winds on rooftops, wherein GNSS rovers 6 and base stations 8 are mounted on the rooftop surface 2A for monitoring rooftop deflection by collecting and processing GNSS signals transmitted from the GNSS satellite constellations 4, shown while there is no wind-driven damage. FIG. 208 shows the positioning on the rover's structural roof support trusses of the building.

FIG. 209 shows the GNSS rovers 6 and base stations 8 mounted on the rooftop surface for monitoring rooftop deflection by collecting and processing GNSS signals transmitted from the GNSS satellite constellations 4. As shown in FIG. 209, there is some serious wind-driven damage caused to the rooftop surface.

FIG. 210 showing the repositioning of the GNSS rovers on structural roof support trusses, in response to the wind driven load imposed on the building roof membrane 2A, and the wind-driven rooftop surface damaged as reflected in FIG. 209.

FIG. 211 shows the GNSS system network shown deployed in FIGS. 207 through 209. As shown, the GNSS system network 840 comprises: (i) a cloud-based TCP/IP network architecture 3 with a plurality of GNSS satellites 4 transmitting GNSS signals towards the earth 5 and objects below; (ii) a plurality of GNSS rovers 6 mounted on the rooftop surface of building for receiving and processing transmitted GNSS signals during monitoring using time averaging displacement data extraction processing; (iii) one or more GNSS base stations 8 to support RTK correction of the GNSS signals; (iv) one or more client computing systems 9 for transmitting instructions and receiving alerts and notifications and supporting diverse administration, operation and management functions on the system network 840; and (v) a cell tower 10 for supporting cellular data communications across the system network 840; and (vi) a data center 12 supporting web servers, application servers, database and datastore servers 12A, 12B and 12C, and SMS/text and email servers 12D.

FIG. 212 shows each GNSS rover unit 6 deployed on the GNSS system network 840 as depicted in FIG. 211. As shown, each GNSS rover unit 6 comprises: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; a drain freeze sensor 138; temp & humidity sensors 139; a 3 axis accelerometer 140; and a compass 141.

FIG. 213 illustrates the real-time monitoring of roof membrane displacement using the GNSS system network 840 operating in its roof membrane monitoring and alert mode, and illustrating along a common timeline, a RTK-corrected GNSS deflection data stream, moving averaged GNSS displacement data streams with time averaging displacement data extraction processing, station attitude (e.g. pitch angle, roll angle and heading), and automated generation of displaced (rover) station alerts, rooftop windspeed, windspeed alerts and regional windspeed, using the methods of the present invention.

FIGS. 214A, 214B and 214C describes the communication and information processing method supported by the GNSS system platform 840 applied to rooftop application for monitoring wind-driven roof membrane displacement.

As indicated at Step 1 in FIG. 214A, the Administrator registers buildings to be monitored in the GNSS system network database 12C for automatically detecting structural movement and/or displacement beyond predetermined thresholds and generating notifications and/or alarms to administrators and/or managers of the building, bridge, hillside. As shown, the system network 840 comprises: (i) a plurality of GNSS Rover Units (GNSS Rovers) 6 installed at locations on the building, and operably connected to the TCP/IP infrastructure of an wireless communication network ("Network") to provide position using GNSS Rover Receivers and auxiliary sensor data; (ii) at least one GNSS Base Station 8 installed on, or about, or remote of, the measurement site operably connected to the GNSS system network 840, to provide position error correction data using GNSS Base Receivers; (iii) one or more mobile computing systems 9 operably connected to the GNSS system network 840, each supporting Web Application 15; and (iv) a remote data center 12 supporting Web, Application and Database Servers 12A, 12B and 12C operably connected to the GNSS system network 840 to provide a remote user web interface, perform calculations, and read/write and process data.

As indicated at Step 2 in FIG. 214A, the Administrator creates virtual geolocated zones with similar deflection or movement limits and registers them in the Database.

As indicated at Step 3 in FIG. 214A, the Administrator registers alert thresholds in the Database for each virtual zone based upon acceptable structural deflection and/or displacement.

As indicated at Step 4 in FIG. 214A, as shown in FIG. 213, constellations of GNSS satellites 4 send time and satellite position data continuously.

As indicated at Step 5 in FIG. 214A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated at Step 6 in FIG. 214A, the GNSS Base Receivers use the dataset to calculate a precise Latitude, Longitude and Altitude.

As indicated at Step 7 in FIG. 214B, GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

As indicated at Step 8 in FIG. 214B, the GNSS Rover Receivers automatically acquire multi-band GNSS signals from available GNSS constellations and calculate: Latitude (Lat), Longitude (Long) and Altitude (Alt).

As indicated at Step 9 in FIG. 214B, when requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated at Step 10 in FIG. 214B, the GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

As indicated at Step 11 in FIG. 214B, the GNSS Rover Receivers or Application Server calculate corrected position known as, by using and LLA Correction using the following equations:

$$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 12 in FIG. 214B, the data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

As indicated at Step 13 in FIG. 214B, Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

As indicated at Step 14 in FIG. 214B, the Application Server saves the $LLA_{Rover\ Corrected}$ data and Auxiliary Sensor Data to the Database.

As indicated at Step 15 in FIG. 214C, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}.$$

This averaged dataset is known as: $LLA_{SMA\ t}$.

As indicated at Step 16 in FIG. 214B, The Application Server sends $LLA_{SMA\ t}$ and Auxiliary Sensor Data to the Web App 15 for display on mobile and/or desktop computing devices 9.

As indicated at Step 16 in FIG. 214B, the processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the GNSS system network 840.

As indicated at Step 18 in FIG. 214B, when the structural movements have returned to below alert thresholds, the Application Server automatically sends email and SMS alerts and/or notifications to registered users.

Specification of a Building with a Relatively Flat Roof Surface, on which a GNSS System Network of the Present Invention is Installed and Deployed for Real-Time Foundation Settling Monitoring in Response to Whatever Forces May Act Upon the Building Foundation FIG. 215 shows a building with a relatively flat roof surface, on which a GNSS system network of the present invention 850 is installed and deployed for real-time foundation settling monitoring in response to whatever forces may act upon the building foundation. As shown, the GNSS rovers 6 and base stations 8 are mounted on the rooftop surface 2A for monitoring rooftop displacement (due to foundation settling) by collecting and processing GNSS signals transmitted from the GNSS satellite constellations.

FIG. 216 shows the building shown in FIG. 215, illustrating the settling of the building foundation 852A, 852B, 852C and displacement of the rovers 6 within the GNSS system network 850.

FIG. 217 shows the building 2 shown in FIG. 215, on which the GNSS system network of the present invention is installed and deployed for real-time structural failure monitoring in response to whatever forces may act upon the building. As shown, the GNSS rovers 6 and base stations 8 are mounted on the rooftop surface for monitoring structural failure in the building by collecting and processing GNSS signals transmitted from the GNSS satellite constellations 4.

FIG. 218 shows the building illustrated in FIG. 215, showing the positioning on the rovers over the structural roof support trusses 851A, 851B, and the roof trusses showing structural failure in response to loading imposed on the building 2.

FIG. 219 shows the GNSS system network 850 installed and configured for monitoring structural failure in buildings. As shown, the GNSS system network 850 comprises: (i) a cloud-based TCP/IP network architecture 3 with a plurality of GNSS satellites 4 transmitting GNSS signals towards the earth and objects below; (ii) a plurality of GNSS rovers 6 mounted on the rooftop surface of building 2 for receiving and processing transmitted GNSS signals during monitoring using time averaging displacement/deflection data extraction processing; (iii) one or more GNSS base stations 8 to support RTK correction of the GNSS signals; (iv) one or more client computing systems 9 for transmitting instructions and receiving alerts and notifications and supporting diverse administration, operation and management functions on the system network 850; (v) a cell tower 10 for supporting cellular data communications across the system network 850; and (vi) a data center supporting web servers, application servers, database and datastore servers 12A, 12B and 12C, and SMS/text and email servers 12D.

FIG. 220 shows each GNSS rover unit 6 deployed on the GNSS system network 850 as depicted in FIG. 215. As shown, each GNSS rover unit 6 comprises: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; a drain freeze sensor 138; temp & humidity sensors 139; a 3 axis accelerometer 140; and a compass 141.

FIG. 221 illustrates the real-time monitoring of structural failure using the GNSS system network 850 operating in its roof membrane monitoring and alert mode, and showing, along a common timeline, a RTK-corrected GNSS deflection data stream, moving averaged GNSS displacement data streams with time averaging displacement data extraction processing, station attitude (e.g. pitch angle, roll angle and heading), and automated generation of structural failure or foundation settling alerts, using the method of the present invention.

FIGS. 222A, 222B and 222C describes the method of monitoring structural displacement response using the GNSS system network 850 operating in foundation settling and structural failure monitoring and alert mode.

As indicated at Step 1 of FIG. 222A, the Administrator registers buildings to be monitored in the GNSS system network database 12C for automatically detecting structural movement and/or displacement beyond predetermined thresholds and generating notifications and/or alarms to administrators and/or managers of the building, bridge, hillside; As shown, the GNSS system network 850 comprises: (i) a plurality of GNSS Rover Units (GNSS Rovers) 6 installed at locations on the building, and operably connected to the TCP/IP infrastructure 3 of an wireless communication network ("Network") to provide position using GNSS Rover Receivers and auxiliary sensor data; (ii) at least one GNSS Base Station 8 installed on, or about, or remote of, the measurement site operably connected to the GNSS system network 850, to provide position error correction data using GNSS Base Receivers; (iii) one or more mobile computing systems 9 operably connected to the GNSS system network 850, each supporting Web Application 15; and (iv) a remote Data center supporting Web, Application and Database Servers 12A, 12B and 12C operably connected to the GNSS system network 850 to provide a remote user web interface, perform calculations, and read/write and process data.

As indicated at Step 2 of FIG. 222A, the Administrator creates virtual geolocated zones with similar deflection or movement limits and registers them in the Database.

As indicated at Step 3 of FIG. 222A, the Administrator registers alert thresholds in the Database for each virtual zone based upon acceptable structural deflection and/or displacement.

As indicated at Step 4 of FIG. 222A, as indicated at Step 4 of FIG. 22A, as shown in FIG. 221, constellations of GNSS satellites send time and satellite position data continuously.

As indicated at Step 5 of FIG. 222A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated at Step 6 of FIG. 222A, the GNSS Base Receivers use the $LLAT_{Base\ Uncorrected}$ dataset to calculate a precise Latitude, Longitude and Altitude.

As indicated at Step 7 of FIG. 222B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

As indicated at Step 8 of FIG. 222B, GNSS Rover Receivers automatically acquire multi-band GNSS signals from available GNSS constellations and calculate: Latitude (Lat), Longitude (Long) and Altitude (Alt).

As indicated at Step 9 of FIG. 222B, when requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated at Step 10 of FIG. 222B, the GNSS Rover Receivers or the Application Server request and receive LLA Correction from the Base GNSS Receivers through (i)

an IP Gateway followed by a cellular modem or LAN, (ii) directly through a cellular network, (iii) RF Data Link or (iv) other pathway.

As indicated at Step 11 of FIG. 222B, the GNSS Rover Receivers or Application Server calculate corrected position known as $LLA_{Rover\ Corrected}$, by using $LLA_{Rover\ Uncorrected}$ and LLA Correction using the following equations $$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 12 of FIG. 222B, the data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

As indicated at Step 13 of FIG. 222C, the Rovers and Bases save and send Auxiliary Sensor Data including: snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

As indicated at Step 14 of FIG. 222C, the Application Server saves the $LLA_{Rover\ Corrected}$ data and Auxiliary Sensor Data to the Database.

As indicated at Step 15 of FIG. 222C, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$.

As indicated at Step 16 of FIG. 222C, Application Server sends $LLA_{SMA\ t}$ and Auxiliary Sensor Data to the Web App for display on mobile and/or desktop computing devices.

As indicated at Step 17 of FIG. 222C, the processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the GNSS system network 850.

As indicated at Step 18 of FIG. 222C, when the structural movements have returned to below alert thresholds, the Application Server automatically sends email and SMS alerts and/or notifications to registered users.

Specification of a Building with a Relatively Flat Roof Surface, on which a GNSS System Network of the Present Invention is Installed and Deployed for Real-Time Seismic Activity Monitoring in Response to Seismic Activity in the Vicinity of the Building FIG. 223 show a building with a relatively flat roof surface, on which a GNSS system network of the present invention 860 is installed and deployed for real-time seismic activity monitoring in response to seismic activity in the vicinity of the building 2. As shown, the GNSS rovers and base stations are mounted on the rooftop surface for monitoring rooftop deflection by collecting and processing GNSS signals transmitted from the GNSS satellite constellations 4.

FIGS. 224 and 225 show the positioning on a bracket-mounted controller on the exterior surface of the building 2.

FIG. 226 shows the GNSS system network 860 installed and configured for monitoring seismic activity around a building and its response to a fault in the earth and/or shock waves generated within the earth during an earth quake. As shown, the GNSS system network 860 comprises: (i) a cloud-based TCP/IP network architecture 3 with a plurality of GNSS satellites $ transmitting GNSS signals towards the earth 5 and objects below; (ii) a plurality of GNSS rovers 6 mounted on the rooftop surface of building 2 for receiving and processing transmitted GNSS signals during monitoring using time averaging seismic data extraction processing; (iii) one or more GNSS base stations 8 to support RTK correction of the GNSS signals; (iv) one or more client computing systems for transmitting instructions and receiving alerts and notifications and supporting diverse administration, operation and management functions on the system network; (v) a cell tower 10 for supporting cellular data communications across the system network 860; (v) a data center supporting web servers, application servers, database and datastore servers 12A, 12B and 12C, and SMS/text and email servers 12D; and (vi) a USGS seismic detection server 861 and data center 12 for providing real-time seismic information to be used with the system.

FIG. 227 shows each GNSS rover unit 6 deployed on the GNSS system network 860 as depicted in FIG. 226. As shown, each GNSS rover unit 6 comprises: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; a drain freeze sensor 138; temp & humidity sensors 139; a 3 axis accelerometer 140; and a compass 141.

FIG. 228 illustrates the real-time monitoring of structural displacement response using the GNSS system network 860 operating in its rain ponding monitoring and alert mode, and showing, along a common timeline, RTK-corrected GNSS deflection data stream, moving averaged GNSS displacement data streams with time averaging displacement data extraction processing, and automated generation of structural displacement alerts, remote USGS accelerometer data and USGS earthquake alerts, using the method of the present invention.

FIGS. 229A, 229B and 229C describe the communication and information processing method supported by the system platform 860 applied to rooftop application for monitoring seismic activity and seismic-driven structural displacement response using system network 860 operating in early warning seismic monitoring and alert mode.

As indicated at Step 1 in FIG. 229A, the Administrator registers location to be monitored in the GNSS system network database 12C for automatically detecting (i) structural movement, (ii) displacement (iii) vibrations (accelerations) beyond predetermined thresholds and generating notifications and/or alarms to administrators and/or managers of the building, bridge, hillside. As shown, the GNSS system network 860 comprises: (i) a plurality of GNSS Rover Units (GNSS Rovers) 6 installed at locations on the building 2, and operably connected to the TCP/IP infrastructure 3 of an wireless communication network ("Network") to provide position using GNSS Rover Receivers and auxiliary sensor data; (ii) at least one GNSS Base Station 8 installed on, or about, or remote of, the measurement site operably connected to the GNSS system network 860, to provide position error correction data using GNSS Base Receivers; (iii) one or more mobile computing systems 9 operably connected to the GNSS system network 860, each supporting Web Application 15; and (iv) a remote data center 12 supporting Web; Application and Database Servers 12A, 12B and 12C operably connected to the GNSS system network 860 to provide a remote user web interface, perform calculations, and read/write and process data.

As indicated at Step 2 in FIG. 229A, the Administrator creates virtual geolocated zones with similar deflection or movement limits and registers them in the Database.

As indicated at Step 3 in FIG. 229A, the Administrator registers alert thresholds in the Database for each virtual zone based upon acceptable structural deflection and/or displacement.

As indicated at Step 4 in FIG. 229A, as shown in FIG. 228, constellations of GNSS satellites send time and satellite position data continuously.

As indicated at Step 5 in FIG. 229A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated at Step 6 in FIG. 229A, the GNSS Base Receivers use the dataset to calculate a precise Latitude, Longitude and Altitude.

As indicated at Step 7 in FIG. 229B, the GNSS Base Receivers compare to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

As indicated at Step 8 in FIG. 229B, the GNSS Rover Receivers automatically acquire multi-band GNSS signals from available GNSS constellations and calculate: Latitude (Lat), Longitude (Long) and Altitude (Alt).

As indicated at Step 9 in FIG. 229B, when requested by the Application Server or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated at Step 10 in FIG. 229B, the GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

As indicated at Step 11 in FIG. 229B, the GNSS Rover Receivers or Application Server calculate corrected position known as $LLA_{Rover\ Corrected}$, by using $LLA_{Rover\ Uncorrected}$ and LLA Correction using the following equations:

$$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 12 in FIG. 229B, the data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

As indicated at Step 13 in FIG. 229C, the Rovers and Bases save and send Auxiliary Sensor Data including: structural vibrations (liner accelerations) known as LAT, LONG, ALT,n, snow and ponding depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

As indicated at Step 14 in FIG. 229C, the Application Server saves the $LLA_{Rover\ Corrected}$ data and Auxiliary Sensor Data to the Database.

As indicated at Step 15 in FIG. 229C, the Application Server accesses the $LLA_{Rover\ Corrected}$ data from the Database and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$.

As indicated at Step 16 in FIG. 229C, the Application Server sends $LLA_{SMA\ t}$ and Auxiliary Sensor Data to the Web App for display on mobile and/or desktop computing devices.

As indicated at Step 17 in FIG. 229C, the processing the received GNSS signals locally or remotely to automatically determine the occurrence of spatial displacement, distortion and/or deformation of the system being spatially monitored over time, and when spatial displacement, distortion and/or deformation thresholds are met or exceeded and vibration (linear accelerations) thresholds are met or exceeded, the Application Server automatically sends email and/or SMS alerts and/or notifications to registered Users over the GNSS system network.

As indicated at Step 18 in FIG. 229C, when the structural movements have returned to below alert thresholds, the Application Server automatically sends email and SMS alerts and/or notifications to registered users.

Specification of a Bridge Over a Road or Waterway, on which a GNSS System Network of the Present Invention is Installed and Deployed for Real-Time Bridge Monitoring in Response to Seismic and Other Activity in the Vicinity of the Bridge FIG. 230 shows a bridge over a road or waterway, on which a GNSS system network of the present invention 870 is installed and deployed for real-time bridge monitoring in response to seismic and other activity in the vicinity of the bridge. As shown, the GNSS rovers 6 and base stations 8 are mounted on the bridge surface 871 for collecting and processing GNSS signals transmitted from the GNSS satellite constellations 4, for monitoring any deflection and/or displacement the bridge structure may experience over time due to seismic or other activity.

FIGS. 231 and 232 show the bridge structure illustrated in FIG. 230, showing the mounting of GNSS rovers 6 on various structures 871 of the bridge and the GNSS base station 8 on the exterior surface of one of the concrete support foundations 872 of the bridge, operating within the GNSS system network 870.

FIG. 233 show the bridge structure depicted in FIGS. 230 through 232, when not experiencing or demonstrating vertical deflection due to roadway loading and/or surrounding activity.

FIG. 234 show the bridge structure depicted in FIGS. 230 through 232, when experiencing vertical deflection between foundations due to excessive roadway loading.

FIG. 235 show the bridge shown in FIGS. 230 through 233, when not experiencing or demonstrating lateral bridge span or member displacement.

FIG. 236 show the bridge shown in FIGS. 230 through 233, when experiencing and/or demonstrating lateral bridge span or member displacement.

FIG. 237 is a system block diagram of the GNSS system network 870 installed and configured for monitoring vertical and lateral bridge span displacement in response to roadway loading and/or shock waves generated within the earth during an earth quake. As shown, the system network 870 comprises: (i) a cloud-based TCP/IP network architecture 3 with a plurality of GNSS satellites 4 transmitting GNSS signals towards the earth 5 and objects below; (ii) a plurality of GNSS rovers 6 mounted on the bridge surfaces 871 for receiving and processing transmitted GNSS signals during monitoring using time averaging seismic data extraction processing; (iii) one or more GNSS base stations 8 to support RTK correction of the GNSS signals; (iv) one or more client computing systems 9 for transmitting instructions and receiving alerts and notifications and supporting diverse administration, operation and management functions on the system network; (v) a cell tower 10 for supporting cellular data communications across the system network, (vi) a data center supporting web servers, application servers, database and datastore servers 12A, 12B and 12C, and SMS/text and email servers 12D, and (vii) a USGS seismic detection server 861 and data center 12 for providing real-time seismic information to be used with the system network 870.

FIG. 238 shows each GNSS rover unit 6 deployed on the GNSS system network 870 s depicted in FIG. 237. As shown, each GNSS rover unit 6 comprises: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; a drain freeze sensor 138; temp & humidity sensors 139; a 3 axis accelerometer 140; and a compass 141.

FIG. 239 illustrates the real-time monitoring of structural displacement response using the system network 870 operating in its bridge displacement and vibration monitoring and alert mode, and showing, along a common timeline, RTK-corrected GNSS deflection data stream, moving averaged GNSS displacement data streams with time averaging displacement data extraction processing, and automated generation of structural displacement alerts, remote USGS accelerometer data and USGS earthquake alerts, using the method of the present invention.

FIGS. 240A, 240B and 240C describes the communication and information processing method supported by the GNSS system network 870 applied to monitoring bridge displacement and vibrational response using system network 870 operating in displacement and vibrational-response monitoring and alert mode.

As indicated at Step 1 of FIG. 240A, the Administrator registers bridges to be monitored in the GNSS system network database 12C for automatically detecting (i) structural movement, (ii) displacement, (iii) vibrations (accelerations) beyond predetermined thresholds and generating notifications and/or alarms to administrators and/or managers of the bridge. As shown, the GNSS system network 870 comprises: (i) a plurality of GNSS Rover Units (GNSS Rovers) 6 installed at locations on the bridge and operably connected to the TCP/IP infrastructure 3 of a wireless communication network ("Network") to provide position using GNSS Rover Receivers and auxiliary sensor data; (ii) at least one GNSS Base Station 8 installed on, or about, or remote of, the measurement site operably connected to the GNSS system network 870, to provide position error correction data using GNSS Base Receivers; (iii) one or more mobile computing systems 9 operably connected to the GNSS system network 870, each supporting Web Application 15; and (iv) a remote Data center supporting Web, Application and Database Servers 12A, 12B and 12C operably connected to the GNSS system network 860 to provide a remote user web interface, perform calculations, and read/write and process data.

As indicated at Step 2 of FIG. 240A, the Administrator creates virtual geolocated zones with similar deflection or movement limits and registers them in the Database.

As indicated at Step 3 of FIG. 240A, the Administrator registers alert thresholds in the Database for each virtual zone based upon acceptable structural deflection and/or displacement.

As indicated at Step 4 of FIG. 240A, as shown in FIG. 239, constellations of GNSS satellites 4 send time and satellite position data continuously.

As indicated at Step 5 of FIG. 240A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated at Step 6 of FIG. 240A, the GNSS Base Receivers use the dataset to calculate a precise Latitude, Longitude and Altitude.

As indicated at Step 7 of FIG. 240A, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

As indicated at Step 8 of FIG. 240B, the GNSS Rover Receivers automatically acquire multi-band GNSS signals from available GNSS constellations and calculate: Latitude (Lat), Longitude (Long) and Altitude (Alt).

As indicated at Step 9 of FIG. 240B, when requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated at Step 10 of FIG. 240B, the GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

As indicated at Step 11 of FIG. 240B, the GNSS Rover Receivers or Application Server calculate corrected position known as $LLA_{Rover\ Corrected}$, by using $LLA_{Rover\ Uncorrected}$ and LLA Correction using the following equations:

$$Lat_{Rover\ Corrected} = Lat_{Rover\ Uncorrected} + \text{Lat Correction}$$

$$Long_{Rover\ Corrected} = Long_{Rover\ Uncorrected} + \text{Long Correction}$$

$$Alt_{Rover\ Corrected} = Alt_{Rover\ Uncorrected} + \text{Alt Correction}$$

As indicated at Step 12 of FIG. 240B, the data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

As indicated at Step 13 of FIG. 240C, the Rovers and Bases save and send Auxiliary Sensor Data including: structural vibrations (liner accelerations) known as $a_{LAT}$, $a_{LONG}$, $a_{ALT}$, $t_n$ wind speed, solar panel heading/current, station pitch/roll, temperature and camera images, shown in disclosed herein, to the Application Server through (i) an IP Gateway followed by a cellular modem or LAN, (ii) directly through a cellular network, (iii) RF Data Link or (iv) other pathway.

As indicated at Step 14 of FIG. 240C, the Application Server saves the $LLA_{Rover\ Corrected}$ data and Auxiliary Sensor Data to the Database.

As indicated at Step 15 of FIG. 240C, the Application Server accesses the $LLA_{Rover\ Corrected}$ data from the Database and processes the data using a simple moving average (SMA) method to further improve each Rover's latitudinal, longitudinal and altitudinal positional accuracy using the equations recited in FIG. 240C.

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$

As indicated at Step 16 of FIG. 240C, the Application Server sends $LLA_{SMA\ t}$ and Auxiliary Sensor Data to the Web App for display on mobile and/or desktop computing devices 9.

As indicated at Step 17 of FIG. 240C, the processing the received GNSS signals locally or remotely to automatically determine the occurrence of spatial displacement, distortion and/or deformation of the system being spatially monitored over time, and when spatial displacement, distortion and/or deformation thresholds are met or exceeded and vibration (linear accelerations) thresholds are met or exceeded, the Application Server automatically sends email and/or SMS alerts and/or notifications to registered Users over the GNSS system network 870.

As indicated at Step 18 of FIG. 240B, the When the structural movements have returned to below alert thresholds, the Application Server automatically sends email and SMS alerts and/or notifications to registered users.

Specification of a GNSS System Network of the Present Invention Installed in a Region of the Earth's Surface and Deployed for Real-Time Monitoring of Soil Movement in Response to Seismic Activity, and Rainfall FIG. 241 shows a GNSS system network of the present invention 880 installed in a region of the earth's surface 5 and deployed for real-time monitoring of soil movement in response to seismic activity, and rainfall. As shown, at least one or more base station 8 is mounted in the vicinity of a region of earth to be monitored by the GNSS system network 880, and a plurality of rovers 6 are mounted in the ground surface over the spatial extent of the regions as illustrated for purposes of monitoring the region of earth 5 by collecting and processing GNSS signals transmitted from the GNSS satellite constellations 4. In this illustrative embodiment of the present invention, the GNSS base unit 8 provides RTK corrected GNSS signals.

FIGS. 242 and 243 show a GNSS rover 6 secured in the ground surface by way of a stake-like base component. This rover mounting method enables the secure mounting of the GNSS rover unit 6 in the earth surface 5A so that GNSS signal reception and position monitoring of the phase center location of its antenna, during monitoring operations performed by the GNSS system network 880.

FIGS. 244 and 245 show a GNSS rover 6 secured in the ground surface by way of a screw-like base component. This rover mounting method enables the secure mounting of the rover unit 6 in the earth surface 5A so that GNSS signal reception and position monitoring of the phase center location of its antenna, during monitoring operations performed by the GNSS system network of the present invention.

FIG. 246A1 shows the GNSS system network 880 installed in a region of the earth's surface 5A as shown in FIG. 241, where the soil 5A has not yet moved in response to seismic activity and/or rainfall.

FIG. 246A2 shows the land region above a roadway being remotely monitored using the GNSS system network 880.

FIG. 246B1 shows the GNSS system network of the present invention installed in a region of the earth's surface 5A as shown in FIG. 246A1, where the soil 5A has started moving toward the roadway below in response to seismic activity and/or rainfall.

FIG. 246B2 shows the moving land region 5A of FIG. 246B1 being remotely monitored using the GNSS system network 880.

FIG. 247A shows a body of water 886 impounded within an Earth embankment 885 being monitored by the GNSS water impoundment movement monitoring system 880 installed within the water impoundment.

FIG. 247B shows an end portion of the water impoundment 886 illustrated in FIG. 247A showing the GNSS rovers 6 installed in the top rim region of the embankment 885, and function as GNSS measurement stations 6 intact within the Earth soil.

FIG. 248A shows the body of water 886 impounded within the Earth embankment 885 shown in FIGS. 247A and 246B, being monitored by the GNSS water impoundment movement monitoring system 880, showing an embankment breach 887 monitored by the GNSS system network of the present invention 880.

FIG. 248B shows the body of water 886 impounded within the Earth embankment 885 shown in FIG. 248A, while being monitored by the GNSS water impoundment movement monitoring system 880. FIG. 248A also shows an embankment breach 887 being monitored by way of tracking displaced GNSS measurement stations 6.

FIG. 249A shows the body of water 886 impounded within an Earth embankment and a dam embankment 888 being monitored by the GNSS system network 880 with its GNSS rover stations 6 installed at measurement stations around the dam 888 and its embankment.

FIG. 249B shows the body of water 886 impounded within the Earth embankment and dam embankment 888 shown in FIG. 249A, being monitored by the GNSS system network 880. FIG. 249B also shows an embankment breach 889 and both intact measurement stations (GNSS rovers) 6, and displaced measurement stations (GNSS rovers) 6 caused by the embankment breach 889.

FIG. 250 shows the GNSS system network 880 installed and configured for monitoring soil and earth movement (in response to shock waves generated within the earth during an earth quake and/or heavy rainfall or embankment or dam breaches, etc.). As shown, the GNSS system network 880 comprises: (i) a cloud-based TCP/IP network architecture 3 with a plurality of GNSS satellites 4 transmitting GNSS signals towards the earth 5 and objects below; (ii) a plurality of GNSS rovers 6 mounted on the dam and surrounding embankment 888 for receiving and processing transmitted GNSS signals during monitoring using time-averaging displacement data extraction processing; (iii) one or more GNSS base stations 8 to support RTK correction of the GNSS signals; (iv) one or more client computing systems 9 for transmitting instructions and receiving alerts and notifications and supporting diverse administration, operation and management functions on the system network 880; (v) a cell tower 10 for supporting cellular data communications across the system network 880; (vi) a data center 12 supporting web servers, application servers, database and datastore servers 12A, 12B and 12C, and SMS/text and email servers 12D; and (vii) a USGS seismic detection server 861 and data center 12 for providing real-time seismic information to be used with the GNSS system network 880.

FIG. 251 shows each GNSS rover unit 6 deployed on the GNSS system 880 as depicted in FIG. 250. As shown, each GNSS rover unit 6 comprises: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; a drain freeze sensor 138; temp & humidity sensors 139; a 3 axis accelerometer 140; and a compass 141.

FIG. 252 illustrates the real-time monitoring of structural displacement response using the GNSS system network 880 operating in its rain ponding monitoring and alert mode, and showing, along a common timeline, a RTK-corrected GNSS deflection data stream, moving averaged GNSS displacement data streams with time averaging displacement data extraction processing, accelerometer data, and automated generation of seismic vibration, displacement and or alerts, remote USGS accelerometer data and USGS earthquake alerts, using the method of the present invention.

FIGS. 253A, 253B and 253C describe the communication and information processing method supported by the GNSS system platform 880 applied to monitoring soil displacement and response monitoring using system of present invention operating in displacement response monitoring and alert mode.

As indicated Step 1 in FIG. 253A, the Administrator registers hillsides to be monitored in the GNSS system network database 12C for automatically detecting soil movement beyond predetermined thresholds and generating notifications and/or alarms to administrators and/or managers of the hillside. As show the GNSS system network 880 comprises: (i) a plurality of GNSS Rover Units (GNSS Rovers) 6 installed at locations on the hillside and operably connected to the TCP/IP infrastructure of an wireless communication network ("Network") to provide precise position data using GNSS Rover Receivers and auxiliary sensor data; (ii) at least one GNSS Base Station 8 installed on, or about, or remote of, the measurement site operably connected to the GNSS system network 880, to provide position error correction data using GNSS Base Receivers; (iii) one or more mobile computing systems 9 operably connected to the GNSS system network 880 each supporting Web Application 15; and (iv) a remote data center 12 supporting Web, Application and Database Servers operably connected to the GNSS system network 880 to provide a remote user web interface, perform calculations, and read/write and process data.

As indicated Step 2 in FIG. 253A, the Administrator creates virtual geolocated zones with similar movement limits and registers them in the Database.

As indicated Step 3 in FIG. 253A, the Administrator registers alert thresholds in the Database for each virtual zone based upon acceptable soil movement.

As indicated Step 4 in FIG. 253A, as shown in FIG. 252, constellations of GNSS satellites send time and satellite position data continuously.

As indicated Step 5 in FIG. 253A, the GNSS Base Receivers, automatically acquire multi-band GNSS signals from available GNSS constellations and creates a dataset of: Latitude (Lat), Longitude (Long) and Altitude (Alt) over a period of time (t). The process continues for hours or days.

As indicated Step 6 in FIG. 253A, the GNSS Base Receivers use the $LLAT_{Base\ Uncorrected}$ dataset to calculate a precise Latitude, Longitude and Altitude.

As indicated Step 7 in FIG. 253B, the GNSS Base Receivers compare $LLA_{Base\ Corrected}$ to newly acquired Latitude, Longitude and Altitude positions and create correction offsets known as Lat Correction, Long Correction and Alt Correction also known as LLA Correction. The GNSS Base Receivers make the LLA Correction available to the GNSS Rover Receivers or the Application Server through (i) an IP Gateway followed by a cellular modem or LAN, (ii) directly through a cellular network, (iii) RF Data Link or (iv) other pathway.

As indicated Step 8 in FIG. 253B, the GNSS Rover Receivers automatically acquire multi-band GNSS signals from available GNSS constellations and calculate: Latitude (Lat), Longitude (Long) and Altitude (Alt).

As indicated Step 9 in FIG. 253B, when requested by the Application Server, or on interval, GNSS Rover Receivers send $LLA_{Rover\ Uncorrected}$ through (i) an IP Gateway followed by a cellular modem or LAN, (ii) directly through a cellular network, (iii) RF Data Link or (iv) other pathway.

As indicated Step 10 in FIG. 253B, the GNSS Rover Receivers or the Application Server request and receive LLA Correction from the Base GNSS Receivers through (i) an IP Gateway followed by a cellular modem or LAN, (ii) directly through a cellular network, (iii) RF Data Link or (iv) other pathway.

As indicated Step 11 in FIG. 253B, the GNSS Rover Receivers or Application Server calculate corrected position known as, $LLA_{Rover\ Corrected}$ by using $LLA_{Rover\ Uncorrected}$ using the following equations:

$$Lat_{Rover\ Corrected}=Lat_{Rover\ Uncorrected}+Lat\ Correction$$

$$Long_{Rover\ Corrected}=Long_{Rover\ Uncorrected}+Long\ Correction$$

$$Alt_{Rover\ Corrected}=Alt_{Rover\ Uncorrected}+Alt\ Correction$$

As indicated Step 12 in FIG. 253B, the data processed in the GNSS Rover Receivers is saved to memory then transmitted to the Application Server through (i) an IP Gateway followed by a cellular modem or LAN, (ii) directly through a cellular network, (iii) RF Data Link or (iv) other pathway.

As indicated Step 13 in FIG. 253C, the Rovers and Bases save and send Auxiliary Sensor Data including: snow depth, wind speed, solar panel heading/current, station pitch/roll, temperature and camera images, disclosed herein, to the Application Server through (i) an IP Gateway followed by a cellular modem or LAN, (ii) directly through a cellular network, (iii) RF Data Link or (iv) other pathway.

As indicated Step 14 in FIG. 253C, the Application Server saves the $LLA_{Rover\ Corrected}$ data and Auxiliary Sensor Data to the Database 12C.

As indicated Step 15 in FIG. 253B, the Application Server accesses the $LLA_{Rover\ Corrected}$ data from the Database 12C and processes the data using a simple moving average (SMA) method to further improve each Rover's latitudinal, longitudinal and altitudinal positional accuracy using the following equations:

$$Lat_{SMAt} = \frac{Lat_{t-1} + Lat_{t-2} + Lat_{t-3} + Lat_{t-n}}{n}$$

$$Long_{SMAt} = \frac{Long_{t-1} + Long_{t-2} + Long_{t-3} + Long_{t-n}}{n}$$

$$Alt_{SMAt} = \frac{Alt_{t-1} + Alt_{t-2} + Alt_{t-3} + Alt_{t-n}}{n}$$

This averaged dataset is known as: $LLA_{SMA\ t}$

As indicated Step 16 in FIG. 253C, the Application Server sends $LLA_{SMA\ t}$ and Auxiliary Sensor Data to the Web App 15 for display on mobile and/or desktop computing devices 9.

As indicated Step 17 in FIG. 253C, the processing the received GNSS signals locally or remotely to automatically determine the occurrence of spatial displacement, distortion and/or deformation of the system being spatially monitored over time, and when spatial displacement, distortion and/or deformation thresholds are met or exceeded, or windspeed thresholds have been exceeded, the Application Server automatically sends email and/or SMS alerts and/or notifications to registered Users over the GNSS system network 880.

Specification of a GNSS System Network of the Present Invention Installed in a Region of the Earth's Surface and Deployed for Real-Time Monitoring of the Movement of a (Gas or Liquid Transport) Pipeline Before Settling in Response to Seismic Activity and/or Rainfall FIG. 254 shows a GNSS system network of the present invention 890 installed in a region of the earth's surface and deployed for real-time monitoring of the movement of a (gas or liquid transport) pipeline 891 before settling in response to seismic activity and/or rainfall. As shown, at least one or more GNSS base station 8 is mounted in the vicinity of a region of earth 5 to be monitored by the GNSS system network 890, and a plurality of GNSS rovers 6 are mounted on the pipeline 891 as illustrated for purposes of monitoring the region of the pipeline by collecting and processing GNSS signals transmitted from the GNSS satellite constellations. 4 In this illustrative embodiment of the present invention, the GNSS base unit 8 provides RTK corrected GNSS signals.

FIG. 255 shows a GNSS system network of the present invention installed in a region of the earth's surface 5 and deployed for real-time monitoring of the movement of a (gas or liquid transport) pipeline 891 after settling in response to seismic activity and/or rainfall.

FIG. 256 shows the pipeline 891 shown in FIG. 254, before the pipeline settling.

FIG. 257 shows the pipeline 891 shown in FIG. 255, after the pipeline settling.

FIG. 258 shows the GNSS system network 890 installed and configured for monitoring pipeline movement in response to shock waves generated within the earth during an earth quake and/or heavy rainfall. As shown, the GNSS system network 890 comprises: (i) a cloud-based TCP/IP network architecture with a plurality of GNSS satellites 4 transmitting GNSS signals towards the earth and objects below; (ii) a plurality of GNSS rovers 6 mounted the pipeline structure (891, 892) for receiving and processing transmitted GNSS signals during monitoring using time-averaging displacement data extraction processing; (iii) one or more GNSS base stations 8 to support RTK correction of the GNSS signals; (iv) one or more client computing systems 9 for transmitting instructions and receiving alerts and notifications and supporting diverse administration, operation and management functions on the system network 890; (v) a cell tower 10 for supporting cellular data communications across the system network 890; (vi) a data center 12 supporting web servers, application servers, database and datastore servers 12A, 12B and 12C, and SMS/text and email servers 12D; and (vii) a USGS seismic detection server 861 and data center 12 for providing real-time seismic information to be used with the GNSS system network 890.

FIG. 259 shows each GNSS rover unit 6 deployed on the GNSS system network 890 as depicted in FIG. 258. As shown, each GNSS rover unit 6 comprises: a cellular XCVR 121A with antenna 121B; an Internet gateway XCVR 122A with antenna 122B; a base to rover radio 123A with antenna 123B; a multiband GNSS RCVR 124A with antennas 124B; a micro-processor 125 with a memory architecture 126 and a user I/O 127; a battery 128; a solar (PV) panel 129; a charge controller 230; and auxiliary sensors 131 such as: a snow pressure sensor 132; a snow depth sensor 133; a wind speed sensor 134; camera(s) 135; roof surface liquid pressure sensor 136; an atmospheric pressure sensor 137; temp & humidity sensors 139; a 3 axis accelerometer 140; and a compass 141.

Specification of a GNSS System Network of the Present Invention Installed in the Hull of a Ship and Deployed for Real-Time Monitoring of Distortion or Deformation of the Ship's Hull in Response to Loading and/or Environmental Forces (e.g. Iceberg)

FIG. 260 shows a GNSS system network of the present invention 900 installed in the hull of a ship 901 and deployed for real-time monitoring of distortion or deformation of the ship's hull in response to loading and/or environmental forces (e.g. iceberg). As shown, a plurality of rovers 6 are mounted on the ship's hull 901 as illustrated for purposes of monitoring the ship's hull by collecting and processing GNSS signals transmitted from the GNSS satellite constellations 4, to automatically determine spatial deformation and/or deflection with respect to its locally embedded coordinate reference system.

FIGS. 261, 262 and 263 shows the ship's hull 901 shown in FIG. 260, from different points of view. In these views, the ship's hull is not breached, distorted or deformed due to loading internal and/or external loading.

FIG. 264 shows the ship's hull 901 shown in FIG. 260, after responding to forces created by internal and/or external loads.

FIG. 265 shows a GNSS system network 900 installed in the ship's hull of FIG. 260 and deployed for real-time monitoring of the ship's hull in response to internal and/or external loading. As shown, a plurality of rovers 6 are mounted in the ship's hull as illustrated for purposes of monitoring the ship's hull by collecting and processing GNSS signals transmitted from the GNSS satellite constellations 4. The GNSS system network 900 also includes a controller and radio transceiver 902 for transmitting GNSS signals to local or remote signal processors to automatically determine spatial deformation and/or distortion while stationary or in naval operation.

FIG. 266 shows each GNSS rover unit deployed on the GNSS system network 900 as depicted in FIG. 265. As shown, each GNSS rover unit 6 comprises: a cellular XCVR 121A with antenna 121B; a rover to rover radio 123A' with antenna 123B'; a multiband GNSS RCVR 124A with antennas 124B; a micro-processor 125 with a memory architecture 126 and a user I/O 127; a battery 128; a solar (PV) panel 129; a charge controller 230; and auxiliary sensors such as: a wind speed sensor 134; camera(s) 135; roof surface liquid pressure sensor 136; an atmospheric pressure sensor 137; temp & humidity sensors 139; a 3 axis accelerometer 140; and a compass 141.

Specification of a GNSS System Network of the Present Invention Installed in the Aircraft's Fuselage and Deployed for Real-Time Monitoring of Distortion or Deformation of the Aircraft in Response to Loading and/or Environmental Force FIG. 267 shows a GNSS system network of the present invention 1000 installed in the aircraft's fuselage and deployed for real-time monitoring of distortion or deformation of the aircraft 1001 in response to loading and/or environmental force. As shown, a plurality of rovers 6 are mounted on the aircraft 1001 as illustrated for purposes of monitoring the region of the aircraft by collecting and processing GNSS signals transmitted from the GNSS satellite constellations 4, to automatically determine spatial deformation and/or deflection with respect to its locally embedded coordinate reference system.

FIG. 268 shows the aircraft wing shown in FIG. 267. FIG. 269 at least one GNSS rover 6 mounted on the aircraft wing 1001.

FIG. 270 is an elevated front view of the aircraft 1001 shown in FIG. 267 experiencing normal loading.

FIG. 271 shows the aircraft 1001 of FIG. 267, after responding to forces created by internal and/or external loads.

FIG. 272 shows a GNSS system network 1000 installed in the aircraft 1001 of FIG. 267 and deployed for real-time monitoring of the aircraft in response to internal and/or external loading. As show, a plurality of rovers 6 are mounted on the aircraft as illustrated for purposes of monitoring the aircraft by collecting and processing GNSS signals transmitted from the GNSS satellite constellations 4, and a controller and radio transceiver 1002 are provided for transmitting GNSS signals to local or remote signal processors to automatically determine spatial deformation and/or distortion while stationary or in flight operation.

FIG. 273 shows each GNSS rover unit deployed on the GNSS system network of the present invention as depicted in FIG. 267. As shown, each GNSS rover unit 6 comprises: a cellular XCVR 121A with antenna 121B; a rover to rover radio 123A' with antenna 123B'; a multiband GNSS RCVR 124A with antennas 124B; a micro-processor 125 with a memory architecture 126 and a user I/O 127; a battery 128; a solar (PV) panel 129; a charge controller 230; and auxiliary sensors such as: camera(s) 135; temp & humidity sensors 139; a 3 axis accelerometer 140; and a compass 141.

Specification of a GNSS System Network of the Present Invention Installed in the Railcar and Deployed for Real-Time Monitoring of Distortion or Deformation of the Railcar in Response to Loading and/or Environmental Forces FIG. 274 shows a GNSS system network of the present invention 1100 installed in the railcar and deployed for real-time monitoring of distortion or deformation of the railcar 1101 in response to loading and/or environmental forces. As shown, a plurality of rovers 6 are mounted on the railcar body 1101 as illustrated for purposes of monitoring the region of the railcar by collecting and processing GNSS signals transmitted from the GNSS satellite constellations 4, to automatically determine spatial deformation and/or deflection with respect to its locally embedded coordinate reference system.

FIG. 275 shows the railcar 1101 shown in FIG. 274.

FIG. 276 shows an elevated side view of the railcar 1101 shown in FIG. 274.

FIG. 277 shows an elevated side view of the railcar 1101 shown in FIG. 274, after responding to forces created by internal and/or external loads 1103.

FIG. 278 shows a GNSS system network 1100 installed in the railcar 1101 of FIG. 260 and deployed for real-time monitoring of the railcar 1101 in response to internal and/or external loading. As shown, a plurality of rovers 6 are mounted in the railcar as illustrated for purposes of monitoring the railcar by collecting and processing GNSS signals transmitted from the GNSS satellite constellations 4, and a controller and radio transceiver 1105 are provided for transmitting GNSS signals to local or remote signal processors to automatically determine spatial deformation and/or distortion while stationary or in railway operation.

FIG. 279 shows each GNSS rover unit 6 deployed on the GNSS system network 1100 as depicted in FIG. 275. As shown, each GNSS rover unit 6 comprises: a cellular XCVR 121A with antenna 121B; a rover to rover radio 123A' with antenna 123B'; a multiband GNSS RCVR 124A with antennas 124B; a micro-processor 125 with a memory architecture 126 and a user I/O 127; a battery 128; a solar (PV) panel 129; a charge controller 230; and auxiliary sensors such as: camera(s) 135; temp & humidity sensors 139; a 3 axis accelerometer 140; and a compass 141.

Specification of a GNSS System Network of the Present Invention Installed in the Tractor and Trailer and Deployed for Real-Time Monitoring of Distortion or Deformation of the Tractor and Trailer in Response to Loading and/or Environmental Forces FIG. 280 shows a GNSS system network of the present invention installed in the tractor and trailer and deployed for real-time monitoring of distortion or deformation of the tractor and trailer in response to loading and/or environmental forces. As shown a plurality of rovers are mounted on the tractor trailer as illustrated for purposes of monitoring the same by collecting and processing GNSS signals transmitted from the GNSS satellite constellations, to automatically determine spatial deformation and/or deflection with respect to its locally embedded coordinate reference system.

FIG. 281 shows the tractor trailer 1201, 1202 shown in FIG. 280.

FIG. 282 shows a plan view of the tractor trailer 1201, 1202 shown in FIG. 280.

FIG. 283 shows the tractor trailer 1201, 1202 shown in FIG. 280, after responding to forces created by internal and/or external loads 1204.

FIG. 284 shows a GNSS system network of the present invention installed on the tractor and trailer 1201, 1202 of FIG. 280 and deployed for real-time monitoring of the tractor trailer in response to internal and/or external loading. As shown, a plurality of rovers 6 are mounted on the tractor trailer 1201 and trailer 1202 as illustrated for purposes of monitoring the tractor trailer by collecting and processing GNSS signals transmitted from the GNSS satellite constellations 4 and a controller and radio transceiver 1206 for transmitting GNSS signals to local or remote signal processors to automatically determine spatial deformation and/or distortion while stationary or in roadway operation.

FIG. 285 shows each GNSS rover unit 6 deployed on the GNSS system network 1200 as depicted in FIG. 285. As shown, each GNSS rover unit 6 comprises: a cellular XCVR 121A with antenna 121B; a rover to rover radio 123A' with antenna 123B'; a multiband GNSS RCVR 124A with antennas 124B; a micro-processor 125 with a memory architecture 126 and a user I/O 127; a battery 128; a solar (PV) panel 129; a charge controller 230; and auxiliary sensors such as: camera(s) 135; temp & humidity sensors 139; a 3 axis accelerometer 140; and a compass 141.

Commercially Available Technology for Practicing the Systems, Devices, Networks, and Methods of the Present Invention While there are many commercially available technologies and components that can be used to practice the many different systems, devices, networks and methods of the present invention, some preferred components by vendor/manufacturers are identified below with reference to the corresponding part/component reference numbers.

In the preferred embodiments, RTK-GNS receiver 124A can be realized using the Septentrio® Mosaic-H GNSS module (Model: mosaic-H) by Septentrio N.V, of Leuven, Belgium, https://www.septentrio.com/en/products/gnss-receivers/rover-base-receivers/receivers-module/mosaic-h. The Mosaic-H GNSS module has a dual-antenna input, to provide precise and reliable heading combined with centimeter-level RTK positioning. Dual antenna heading capabilities in such a small form factor opens the door to unmatched automation and navigation performance in both static and dynamic states combined with reduced power consumption. With dual antenna GNSS, heading & pitch or heading & roll information is available immediately from the start, removing reliance on movement and helping initialization of INS solutions. It also provides an alternative to magnet-based heading sensors, which can be effected by metal.

Gateway based-based wireless transceiver 122A can be realized using the XBEE-PRO® 900HP embedded long-range 900 MHZ OEM RF module by Digi International, of Hopkins, Minn., which supports RF line-of-sight ranges up to 28 miles* (with high-gain antennas), and data rates of up to 200 Kbps https://www.digi.com/resources/library/data-sheets/ds_xbeepro900hpttps://www.septentrio.com/en/products/gnss-receivers/rover-base-receivers/receivers-module/mosaic-h.

Alternatively, Gateway based-based wireless transceiver 122A can be realized using the LoRa Transceiver module (Specification No. BP-ABZ-C) by muRata (China) Investment Co., Ltd, https://wireless.murata.com/pub/RFM/data/type_abz.pdf The absolute solid-state pressure sensor 136, 137, 151, 152, 155, 156, and 172, can be realized using Honeywell ABP Series piezoresistive silicon pressure sensor (Model ABPDNNT005PGAA3) https://sensing.honeywell.com/honeywell-sensing-basic-board-mount-pressure-abp-series-datasheet-32305128-en.pdf. The ABP Series piezoresistive silicon pressure sensors offer a ratiometric analog or digital output for reading pressure over the specified full scale pressure span and temperature range. They are calibrated and temperature compensated for sensor offset, sensitivity, temperature effects and accuracy errors (which include non-linearity, repeatability and hysteresis) using an on-board Application Specific Integrated Circuit (ASIC). Calibrated output values for pressure are updated at approximately 1 kHz for analog and 2 kHz for digital. All products are designed and manufactured according to ISO 9001 standards.

The differential solid-state pressure sensor 153 and 158, can be realized using Honeywell 24PC Series piezoresistive silicon pressure sensor (Model 24PCBFA6D) https://sensing.honeywell.com/index.php?ci_id=49846&1a The time of flight snow depth sensor 133, 1328 can be realized using the ST Time of Flight (ToF) IF laser ranging sensor Model VL53L1X by STMicroelectronics NV, of Geneva, Switzerland, https://www.st.com/resource/en/datasheet/v15311x.pdf

Modifications of the Illustrative Embodiments of the Present Invention

The present invention has been described in great detail with reference to the above illustrative embodiments. It is understood, however, that numerous modifications will readily occur to those with ordinary skill in the art having had the benefit of reading the present disclosure.

For example, in alternative embodiments of the present invention described hereinabove, the system can be realized as a stand-alone application, or integrated as part of a larger system network possibly offering building environmental control services to building owners and managers. Such alternative system configurations will depend on particular end-user applications and target markets for products and services using the principles and technologies of the present invention.

These and all other such modifications and variations are deemed to be within the scope and spirit of the present invention as defined by the accompanying Claims to Invention.

What is claimed is:

1. A building-rooftop remote-monitoring, alert-generation and notification system network configured for remote automated monitoring of (i) the depth of water and/or snow present on the rooftop surface of a building, and (ii) the loading of the rooftop surface, including displacements, distortions and/or deformations of said rooftop surface, caused by water and/or snow accumulated on the rooftop surface of the building, said building-rooftop remote-monitoring, alert-generation and notification system network comprising:

a water and/or snow depth monitoring mode supporting automated generation of alerts when monitored water and/or snow depth exceeds predetermined water/snow depth thresholds set for water and/or snow on said building rooftop;

a rooftop load monitoring mode supporting automated generation of alerts when monitored rooftop loading exceeds predetermined rooftop load thresholds set for said building rooftop;

a wireless communication infrastructure for supporting data communication between systems deployed on said building-rooftop remote-monitoring, alert-generation and notification system network;

a plurality of GNSS satellites transmitting GNSS signals towards the earth and objects on said earth;

a plurality of GNSS rover systems mounted on the rooftop surfaces of a building for receiving and processing transmitted GNSS signals during rooftop load monitoring operations supported over said building-rooftop remote-monitoring, alert-generation and notification system network;

one or more mobile computing systems for transmitting instructions and receiving alerts and notifications and supporting administrative and management functions on said building-rooftop remote-monitoring, alert-generation and notification system network; and web, application and database servers for generating a web-based graphical user interfaces (GUIs), performing calculations, and reading/writing and processing of data on said building-rooftop remote-monitoring, alert-generation and notification system network, and generating alerts and transmitting notifications to said mobile computing systems;

wherein each said GNSS rover system mounted on the rooftop surface includes a water and/or snow depth sensor integrated within said GNSS rover system and adapted for automated monitoring of the depth of water and/or snow present on the rooftop surface, and generating a first alert signal in response to detection of monitored water and/or snow depth exceeding a predetermined water/snow depth threshold, and said first alert signal being used for automatically generating a first notification for transmission to and display on said mobile computing systems; and wherein said GNSS signals received and corrected by said GNSS rover system are automatically processed for automated monitoring of rooftop loading on the rooftop surface, and generating a second alert signal in response to detection of the rooftop loading on the rooftop surface exceeding a predetermined rooftop load threshold, and said second alert signal being used for automatically generating a second notification for transmission to and display on said mobile computing systems.

2. The building-rooftop remote-monitoring, alert-generation and notification system network of claim 1, wherein said data center transmits said first notification to one or more mobile computing systems in response to said first alert signal generation, and transmits said second notification to one or more mobile computing systems in response to said second alert signal generation.

3. The building-rooftop remote-monitoring, alert-generation and notification system network of claim 1, wherein said GNSS rover systems are further installed in, on and/or about said monitored building, and configured for monitoring one or more of the following events selected from the group consisting of (i) structural failure in said monitored building, (ii) settling of the foundation of said monitored building, and (iii) wind-driven damage to said monitored building.

4. The building-rooftop remote-monitoring, alert-generation and notification system network of claim 1, which further comprises one or more GNSS base station systems to support correction of said GNSS signals.

5. The building-rooftop remote-monitoring, alert-generation and notification system network of claim 4, wherein each said GNSS base station system comprises one of (i) an on-site base station for RTK position data correction, (ii) a Continuously Operating Reference Station (CORS) for position data correction, and (iii) a Network Transport of RTCM via Internet Protocol (ENTRIP) base station for correction of position data.

6. The building-rooftop remote-monitoring, alert-generation and notification system network of claim 4, wherein said GNSS rover system has a GNSS receiver with an L band antenna supporting one or more GNSS frequencies mounted on the building rooftop, and employing onboard time-averaging data extraction processing; and wherein said GNSS base station system has a GNSS receiver with L band antennas supporting one or more GNSS frequencies and RTK correction.

7. The building-rooftop remote-monitoring, alert-generation and notification system network of claim 4, wherein each said GNSS rover system employs a pole-mounted mechanism or a surface-mounted mechanism, adapted for mounting on said rooftop surface; and wherein said GNSS rover system comprises:

(i) radio signal subsystems supporting (a) Internet data flow using a cellular or other wireless protocol transceiver (XCVR) with antenna and an internet gateway transceiver (XCVR), (b) position correction data flow using base to rover radio signal transceivers; and (c) GNSS signal reception using multiband GNSS transceivers;

(ii) a programmed microprocessor and supporting memory architecture for supporting control and operating functions, provided with a user I/O interface, a battery power module, a solar photo-voltaic (PV) panel and a charge controller; and (iii) an array of ancillary sensors selected from the group consisting of a wind-speed sensor, a digital camera, temperature and humidity sensors, 3-axis accelerometers, and an electronic compass instrument.

8. The building-rooftop remote-monitoring, alert-generation and notification system network of claim 1, wherein said plurality of GNSS satellites comprise: the GPS (USA) satellite system, the GLONASS (Russia) satellite system, the GALILEO (EU) satellite system, the BEIDOU (China) satellite system, the QZSS (Japan) satellite system; and the IRNSS (India) satellite system.

9. The building-rooftop remote-monitoring, alert-generation and notification system network of claim 1, wherein each said GNSS rover system is a pole-mounted GNSS rover system comprising a water and/or snow depth sensor for automated monitoring of the depth of water pooling, snow and/or ice on the rooftop surface, which can increase rooftop loading.

10. The building-rooftop remote-monitoring, alert-generation and notification system network of claim 9, wherein said precipitation sensor comprises a time-of-flight (TOF)

light beam projected onto the rooftop surface of the building for automated monitoring of water and/or snow depth on the rooftop surface, which can increase rooftop loading.

11. The building-rooftop remote-monitoring, alert-generation and notification system network of claim 1, wherein each said GNSS rover system is a surface-mounted GNSS rover system comprising a water and/or snow depth sensor for automated monitoring of the depth of water and/or snow on the rooftop surface, which can increase rooftop loading.

12. The building-rooftop remote-monitoring, alert-generation and notification system network of claim 1, wherein said GNSS rover system further comprises an integrated digital camera system having still and video capture modes, adapted for detection of motion and changes in digital images captured by said digital camera system operating in the video capture mode.

13. The building-rooftop remote-monitoring, alert-generation and notification system network of claim 1, wherein each said GNSS rover system comprises:

a base stand portion for support on the rooftop surface; and an upper controller portion supported above said base stand portion and containing a water and/or snow depth sensor employing an energy-beam for sensing the depth of water and/or snow on said rooftop surface.

14. The building-rooftop remote-monitoring, alert-generation and notification system network of claim 1, wherein each said mobile computing system comprises:

a memory storage device for storing instructions selected from the group consisting of operating system instructions, electronic messaging instructions, communication instructions, GUI instructions, sensor processing instructions, phone instructions, web browsing instructions, media processing instructions, GPS/navigation instructions, camera instructions, other software instructions, and GUI adjustment instructions;

a processor(s) for executing said instructions;

a touch screen display for display information; and a wireless communication subsystem(s) for communication with said wireless communication infrastructure.

15. The building-rooftop remote-monitoring, alert-generation and notification system network of claim 1, wherein when said building-rooftop remote-monitoring, alert-generation and notification system network is operating in said water and/or snow depth monitoring mode, first alerts are automatically generated and first notifications are transmitted to said mobile computing systems for the users thereof; and wherein when said building-rooftop remote-monitoring, alert-generation and notification system network is operating in rooftop loading monitoring mode, second alerts are automatically generated, and second notifications transmitted to one or more of said mobile computing systems for the users thereof.

16. A method for automatically and remotely monitoring of (i) the depth of water and/or snow present on the rooftop surface of a building, and (ii) the loading of the rooftop surface, including displacements, distortions and/or deformations of said rooftop surface, caused by water and/or snow accumulated on the rooftop surface of the building, said method comprising:

(a) providing a building rooftop remote-monitoring, alert-generation and notification system network including (i) a plurality of GNSS rover systems installed at locations on the rooftop of the building and operably connected to a wireless communication infrastructure, (ii) one or more mobile computing systems operably connected to and deployed on said wireless communication infrastructure, and (iii) web, application and database servers operably connected to said wireless communication infrastructure and configured for generating a web-based graphical user interfaces (GUIs), performing calculations, and reading/writing and processing of data on said building rooftop remote-monitoring, alert-generation and notification system network, and generating alerts and transmitting notifications to said mobile computing systems;

(b) each said GNSS rover system receiving GNSS signals from GNSS satellites, and automatically processing received GNSS signals to monitor rooftop loading of the rooftop surface being monitored;

(c) each said GNSS rover system includes an integrated water and/or snow depth sensor for automated monitoring of the depth of water and/or snow on the rooftop surface, which contributes to loading on the rooftop surface of said building;

(d) if and when water and/or snow depth thresholds are exceeded for said rooftop surface being monitored, automatically generating first alerts and notifications to said mobile computing systems; and (e) if and when rooftop loading thresholds are exceeded for said rooftop surface being monitored, automatically generating second alerts and transmitting notifications to said mobile computing systems.

17. The method of claim 16, wherein each said GNSS rover system is a pole-mounted GNSS rover system comprising a water and/or snow depth sensor for monitoring of the water and/or snow depth on the rooftop surface, which can increase rooftop loading.

18. The method of claim 17, wherein said precipitation sensor comprises a time-of-flight (TOF) light beam projected onto the rooftop surface of the building for monitoring of the depth of water and/or snow on the rooftop surface, which can increase rooftop loading.

19. The method of claim 16, wherein each said GNSS rover system is a surface-mounted GNSS rover system comprising a water and/or snow depth sensor for monitoring of the depth of water and/or snow on the rooftop surface, which can increase rooftop loading.

20. The method of claim 16, wherein each said GNSS rover system comprises:

a base stand portion for support on the rooftop surface; and an upper controller portion supported above said base stand portion and containing a water and/or snow depth sensor employing an energy-beam for monitoring the depth of water and/or snow on said rooftop surface.

* * * * *